US005826265A

United States Patent [19]
Van Huben et al.

[11] Patent Number: 5,826,265
[45] Date of Patent: Oct. 20, 1998

[54] DATA MANAGEMENT SYSTEM HAVING SHARED LIBRARIES

[75] Inventors: Gary Alan Van Huben; Joseph Lawrence Mueller; Steve Yun Xiao; Joyce Chang Mak, all of Poughkeepsie, N.Y.

[73] Assignee: International Business Machines Corporation, Armonk, N.Y.

[21] Appl. No.: 761,320

[22] Filed: Dec. 6, 1996

[51] Int. Cl.$^6$ .................................................. G06F 17/30
[52] U.S. Cl. .......................... 707/8; 707/9; 707/3; 707/4; 707/10; 707/102; 707/103
[58] Field of Search ............................ 707/3, 4, 10, 102, 707/103, 8, 9

[56] References Cited

U.S. PATENT DOCUMENTS

| | | | |
|---|---|---|---|
| 4,141,078 | 2/1979 | Bridges, Jr. et al. | 235/380 |
| 5,201,047 | 4/1993 | Maki et al. | 395/600 |
| 5,280,614 | 1/1994 | Munroe et al. | 395/677 |
| 5,287,459 | 2/1994 | Gniewek | 395/275 |
| 5,297,279 | 3/1994 | Bannon et al. | 707/103 |
| 5,321,605 | 6/1994 | Chapman et al. | 395/600 |
| 5,333,312 | 7/1994 | Wang | 395/600 |
| 5,333,315 | 7/1994 | Saether et al. | 395/600 |
| 5,333,316 | 7/1994 | Champagne et al. | 395/600 |
| 5,396,616 | 3/1995 | Venable | 395/500 |
| 5,418,949 | 5/1995 | Suzuki | 395/600 |
| 5,504,885 | 4/1996 | Alashqur | 707/4 |
| 5,515,488 | 5/1996 | Hoppe et al. | 707/3 |
| 5,548,749 | 8/1996 | Kroenke et al. | 707/102 |
| 5,560,005 | 9/1996 | Hoover et al. | 707/10 |
| 5,684,987 | 11/1997 | Mamiya et al. | 707/103 |
| 5,737,737 | 4/1998 | Hikida et al. | 707/3 |

OTHER PUBLICATIONS

Software Maintenance Features For Library System, IBM System Products Division, Rochester, MN Mar. 1988 IEEE.
Automatic Data Acquisition for VLSA CAD Database Management, University of South Carolina, Columbia, SC. IEEE Proceeding —1989 Southeastcon, Session 11B1, May 1989.
Design Data Modeling with Versioned Conceptual Configuration, Institute of Information Science and Electronics, University of Tsukuba, Japan. Jul. 1989 IEEE.
Relational Databases for SSC DEsign and Control, SSC Central Design Group, Lawrence Berkeley Laboratory, Berkely, CA. Sep. 1989 IEEE.
* Using A Relational Database As An Index To A Distributed Object Database In Engineering Design Systems, Department of Computer Science and Rensselaer Design Research Center, Rensselaer Polytechnic Institute, Troy, NY. Oct. 1989. IEEE.
Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.
"Beyond EDA" published in Electronic Business, vol. 19, No. 6, Jun. 1993 pp. 42–46, 48.

*Primary Examiner*—Thomas G. Black
*Assistant Examiner*—Shahid Alam
*Attorney, Agent, or Firm*—Lynn L. Augspurger

[57] ABSTRACT

A design control system suitable for use in connection with the design of integrated circuits and other elements of manufacture having many parts which need to be developed in a concurrent engineering environment with inputs provided by users and or systems which may be located anywhere in the world providing a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service.

26 Claims, 318 Drawing Sheets

FIGURE 2

File  Return  Filter  Owner  Status                           Help

235 — NAME  [          ]

236 — LIBRARY  [          ]

237 — TYPE  [          ]

238 — VERSION  [          ]

239 — LEVEL  [          ]

240 —

MODEL STATUS: VALID            MODEL OWNER: FORD

| NAME          | TYPE    | LIB    | VERS  | LEVEL | STATUS |
|---------------|---------|--------|-------|-------|--------|
| 0001 A ALU    | SCHEM   | CP_LIB | BASE  | ENGIN | VALID  |
| 0002 I ALU    | VHDL    | CP_LIB | BASE  | ENGIN | VALID  |
| 0003 O ALU    | SYNTHES | CP_LIB | BASE  | ENGIN | VALID  |
| 0004 I ADDER  | LAYOUT  | TECH   | HIPWR | QUAL  | INVAL  |
| 0005 A MULT_DIV | LAYOUT | TECH  | LOPWR | QUAL  | VALID  |
| 0006 I MULT1  | GATE    | TECH   | LOPWR | QUAL  | VALID  |
| 0007 I DIV1   | GATE    | TECH   | LOPWR | QUAL  | VALID  |
| 0008          |         |        |       |       |        |
| 0009          |         |        |       |       |        |

FIGURE 5a
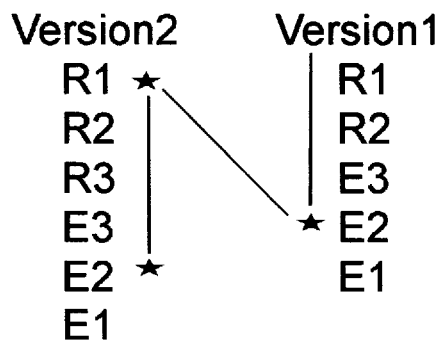
Starting at Version 2
Level E2
Search resumes at same
level in Version 1
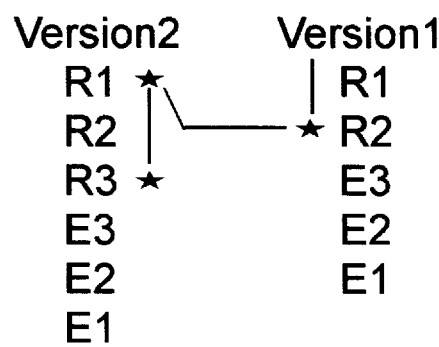
Starting at Version 2
Release Level R3
Search resumes at most
recent release level
in Version 1
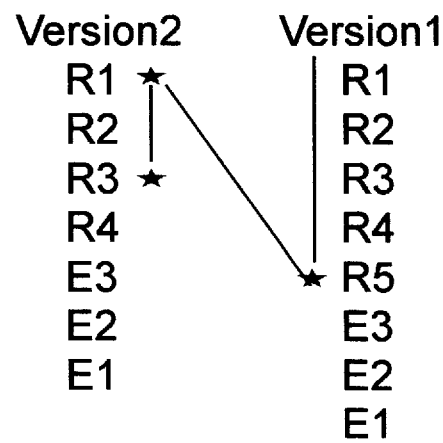
Starting at Version 2
Release Level R3
Search resumes at most
recent release level
in Version 1

Figure 11

| 11a | 11c |
|-----|-----|
| 11b | 11d |

FIGURE 13

```
                    INITIATE LIBRARY PROMOTE
22201
       NAME          [                              ]
22202
       VERSION       [                              ]
22203
       TYPE          [                              ]
22204                SOURCE            DESTINATION         22206
       LIBRARY    [          ][▽]   [              ][▽]
                                                           22207
       LEVEL      [          ][▽]   [              ][▽]
22205                                                      22208
                  DEST ENTRY LEVEL   [              ][▽]

☐ VIA LIST                ☐ RESET UPDT LOCK
       ▦ FOREGROUND CHECKING     ☐ HIGH PRIORITY
22209  ▦ VIA COPY                ☐ OVERRIDE PARMS
              AVAILABLE TO CONTROLLED FILES ONLY
       ☐ BOM PROMOTE             ☐ RETAIN SOURCE
       ☐ ANCHOR ONLY
22210
```

Figure 16

| 16a | 16c | 16f |
|-----|-----|-----|
| 16b | 16d | 16g |
|     | 16e |     |

Figure 17

| 17a |
|-----|
| 17b |

Figure 18

| 18a | 18c |
|-----|-----|
| 18b | 18d |

Figure 19

| 19a |
|-----|
| 19b |
| 19c |

Figure 20

| 20a | 20b |
|-----|-----|

| 21a | 21d |
|-----|-----|
| 21b | 21e |
| 21c | 21f |

Figure 22

| 22a | 22c |
|-----|-----|
| 22b | 22d |

Figure 24

| 24a | 24c |
|-----|-----|
| 24b | 24d |

Figure 25

| 25a |
|-----|
| 25b |

Figure 26

| 26a |
|-----|
| 26b |

Figure 28

| 28a | 28c |
|-----|-----|
| 28b | 28d |

Figure 29

| 29a |
|-----|
| 29b |

Figure 30

| 30a |
|-----|
| 30b |

Figure 31

| 31a |
|-----|
| 31b |

Figure32

| 32a |
|-----|
| 32b |

Figure 34

| 34a | 34d |
|-----|-----|
| 34b | 34e |
| 34c | 34f |

Figure 39

| 39a | 39c |
|-----|-----|
| 39b | 39d |

Figure 40

| 40a | 40c |
|-----|-----|
| 40b | 40d |

Figure 42

| 42a | 42c |
|-----|-----|
| 42b |     |

Figure 44

| 44a |
|-----|
| 44b |
| 44c |

Figure 48

| 48a | 48d |
|-----|-----|
| 48b | 48e |
| 48c | 48f |

Figure 49

| 49a | |
|---|---|
| 49b | 49c |

Figure 49c
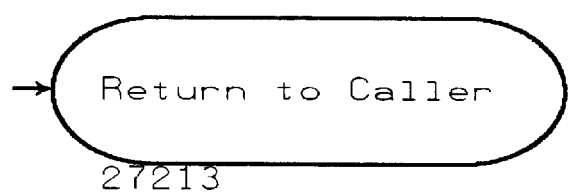
27213
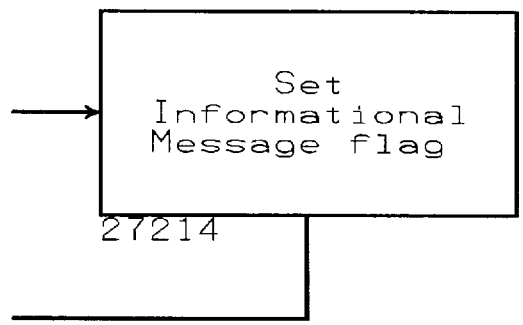
27214

Figure 50

| 50a |
|-----|
| 50b |
| 50c |

Figure 58

| 58a |
|-----|
| 58b |

Figure 59

| 59a | 59c |
|-----|-----|
| 59b | 59d |

Figure 61

| 61a | 61c |
|-----|-----|
| 61b | 61d |

Figure 63

| 63a | 63c |
|-----|-----|
| 63b | 63d |

Figure 64

| 64a | |
|-----|-----|
| 64b | 64d |
| 64c | 64e |

Figure 65

| 65a | 65c |
|-----|-----|
| 65b | 65d |

Figure 67

| 67a |
|-----|
| 67b |

Figure 68

| 68a |
|-----|
| 68b |
| 68c |

Figure 69

| 69a | 69c |
|-----|-----|
| 69b | 69d |

Figure 69c
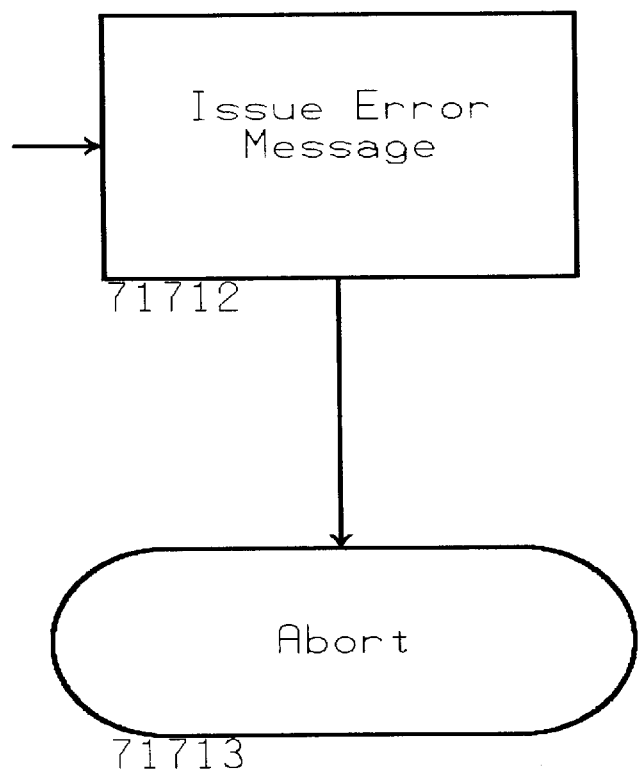
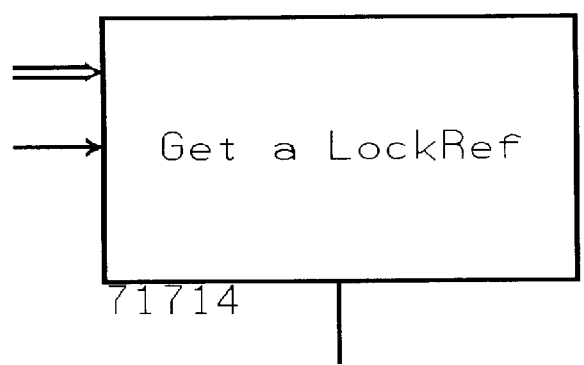

Figure 70

| 70a | 70c |
|-----|-----|
| 70b | 70d |

Figure 71

| 71a |
|-----|
| 71b |

Figure 72

| 72a | 72c |
|-----|-----|
| 72b | 72d |

Figure 73

| 73a | 73d |
|-----|-----|
| 73b | 73e |
| 73c |     |

Figure 74

| 74a | 74c |
|-----|-----|
| 74b | 74d |

FIGURE 77

| | | | | | | |
|---|---|---|---|---|---|---|
| File Return Filter Owner Status | | | | | | Help |
| | MODEL STATUS | | | INVALID | | |
| | MODEL OWNER | | | FORD | | |
| | NAME | TYPE | LIB | VERS | LEVEL | STATUS |
| 0001 A | ALU | SCHEM | CP_LIB | BASE | ENGIN | VALID |
| 0002 I | ALU | VHDL | CP_LIB | BASE | ENGIN | VALID |
| 0003 O | ALU | SYNTHES | CP_LIB | BASE | ENGIN | VALID |
| 0004 I | ADDER | LAYOUT | TECH | HIPWR | QUAL | INVAL |
| 0005 A | MULT_DIV | LAYOUT | TECH | LOPWR | QUAL | VALID |
| 0006 I | MULT1 | GATE | TECH | LOPWR | QUAL | VALID |
| 0007 I | DIV1 | GATE | TECH | LOPWR | QUAL | VALID |
| 0008 | | | | | | |
| 0009 | | | | | | |
| 0010 | | | | | | |
| 0011 | | | | | | |
| 0012 | | | | | | |

FIGURE 82b

```
38421 ─────┐    3
38422,3,4 ┌─  N PROC_12 N MACH INSTALL 5 16 ( PARMS
           │   N PROC_13 N MACH CREATE 1  4  ( PARMS
           └─  N PROC_14 N MACH  *      * *  ( PARMS
38425,6,7 ┌─  RESULT = 0
           │   RESULT < 4
           └─  20 < RESULT < 40
38428 ─────    2
38429 ─────    /LIB/PRJ/A_BOMB MANHATTAN SCHEM 1
38430,    ┌─  34212 1000 735
31,32     │   34213 1000 738
          └─  34214 1000 744
38433 ─────    /LIB/PRJ/H_BOMB MANHATTAN LAYOUT 1
38434,    ┌─  34212 2000 735
35,36     │   34213 2000 738
          └─  34214 2000 744
```

FIGURE 84

```
                LIBRARY PROCESS EXCEPTION FORM
38211
        NAME    [                        ]              38217
38212
        LIBRARY [                        ][▽]           38218
        TYPE    [                        ][▽]           38219
38213   VERSION [                        ][▽]           38220
38214   LEVEL   [                        ][▽]
38215                  PROCESS TYPE
38623           ● PRE   ○ POST   ○ DILP
```

FIGURE 86

```
                VIEW / EDIT LIBRARY PROCESS RESULTS
38211
         NAME   [                          ]              38217
38212
         LIBRARY [                         ] [▽]          38218
         TYPE    [                         ] [▽]
                                                          38219
38213    VERSION [                         ] [▽]
                                                          38220
38214    FILE    [                         ] [▽]
         LEVEL                                            38825
38215    PROC    [                         ] [▽]
         LEVEL
38824
                        PROCESS TYPE

● PRE   ○ POST   ○ DILP   ○ FOREGROUND
38826
```

FIGURE 88

```
39201 ———— H SCHEMATIC FULL
39202,3,4 ⎡ M /HOME/ALU.SCHEM SCHEMATIC A 43E2
          | M /HOME/ALU.BEHAV DATAFLOW I 71E2
          ⎣ M /HOME/ALU.GATE SYNTHESIS O 9022
39205 ———— R GATEGEN /HOME/ALU.SCHEM SCHEMATIC 0
39206,7 ⎡ K /TOOLS/BIN/AUTOSYN 648A
        ⎣ K /TOOLS/RULES/SR71_TECH 3129
39208 ———— P /HOME/ALU.PEDFILE PED 08BC
```

Figure 91

| 91a | 91c |
|-----|-----|
| 91b | 91d |

Figure 95

| 95a | 95d |
|-----|-----|
| 95b | 95e |
| 95c | 95f |

Figure 97

| 97a | 97c |
|-----|-----|
| 97b | 97d |

FIGURE 102

| | | | |
|---|---|---|---|
| XXX/XX/00 | WL1 | NONE | NONE |
| XXX/XX/WL1 | VL1 | YY | REPOS1 |
| XXX/XX/VL1 | VL2 | NY | REPOS1 |
| ASIC/XX/CD1 | CD3 | YY | REPOS1 |
| ASIC/XX/CD2 | CD3 | YY | REPOS1 |
| ASIC/XX/CD3 | VL1 | NY | REPOS1 |
| ASIC/XX/WL2 | WL3 | YY | REPOS1 |
| ASIC/XX/WL3 | VL2 | NY | REPOS1 |
| ASIC/V1/VL2 | AR3 | NY | REPOS2 |
| ASIC/V1/AR3 | AR2 | NN | REPOS2 |
| ASIC/V1/AR2 | AR1 | NN | REPOS2 |
| ASIC/V1/AR1 | *** | NN | REPOS2 |
| ASIC/V1/ARP3 | ARP2 | YN | REPOS2 |
| ASIC/V1/ARP2 | AR2 | YN | REPOS2 |
| ASIC/V1/ARP1 | AR1 | YN | REPOS2 |
| FIRM/XX/FD1 | FD2 | YY | REPOS1 |
| FIRM/XX/FD2 | VL1 | NY | REPOS1 |
| FIRM/V1/VL2 | FR2 | NY | REPOS3 |
| FIRM/V1/FR2 | FR1 | NN | REPOS3 |
| FIRM/V1/FRP1 | FR1 | YN | REPOS3 |
| FIRM/V1/FR1 | *** | NN | REPOS3 |

152 — rows 1-3
153 — rows 4-9
154 — rows 10-16
155 — rows 17-18
156 — rows 19-22

DATA MANAGEMENT SYSTEM HAVING SHARED LIBRARIES

COPYRIGHT NOTICE AND AUTHORIZATION

This patent document contains material which is subject to copyright protection.

(C) Copyright International Business Machines Corporation 1995, 1996 (Unpublished). All rights reserved. Note to US Government Users—Documentation related to restricted rights—Use, duplication, or disclosure is subject to restrictions set forth in any applicable GSA ADP Schedule Contract with International Business Machines Corporation.

The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

This invention is related to a Computer Integrated Design Control System and Method for concurrent engineering, and particularly to methods useful in connection with the design, development and manufacturing of complex electronic machines such as computer systems and their complex electronic parts.

RELATED APPLICATIONS

The preferred embodiment of our claimed invention is described in detail herein. Our preferred embodiment may desireably interact with other inventions which may be considered related applications filed concurrently herewith, having inventors in common with this our preferred embodiment of this invention.

For convenience of understanding, these other applications describe various systems, methods and processes for data management particularly suited for use with this invention, our Data Management System having Shared Libraries.

The related applications include the application entitled Data Management System and Method for Concurrent Engineering which provides greater detail about our Aggregation Manager for a Data Management system, and Data Management System for Problems, Releases and Parts for Computer Integrated Design Control which describes a method for managing problems, releases and multiple releases, and Data Management System and Processes describing how various processes and utilities interact, and our detailed description in our application entitled Data Management System for Concurrent Engineering.

All of these related applications are filed concurrently herewith, and their disclosures are incorporated herein by this reference. All are commonly assigned to International Business Machines Corporation, Armonk, N.Y.

GLOSSARY OF TERMS

While dictionary meanings are also implied by certain terms used here, the following glossary of some terms may be useful.

AFS Andrew File System—File Management System developed by Transarc Inc. and used on Unix/AIX Networks.
API Application Program(ming) Interface.
ASC Accredited Standards Committee (ANSI)
BOM Bill of Materials
CIM Computer Integrated Manufacturing
CR Control Repository
CRC Cyclic Redundancy Check
CLSI Compiler VHDL Analyzer developed by Compass Design Systems
DCS Design Control System. Our Design Control System incorporates Data Management System processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system.
DILP Designer Initiated Library Process
DM Data Manager or Data Management
DMCU Data Management Control Utilities
DMS Data Management System
DR Data Repository
EC Engineering Change
EDA Electronic Design Automation
GUI Graphical User Interface
PDM Product Data Management
PIM Product Information Management
PN Part Number
RAS Random Access Storage
sim static inline memory
tape-out Delivery of a coherent set of design data to manufacturing. Also known as Release Internal Tape (RIT) within IBM.
TDM the Cadence Team Design Manager (most currently Version 4.4)
VHDL Very High-level Design Language—A high level language comprised of standards supported by IEEE and the EDA industry. The language is widely used in the electronics and computer industry and by the military as an alternative to Verilog and ADA, other high level computer coding languages.

BACKGROUND OF THE INVENTION

As Data Management systems grow more complex, they have more users interacting with them, and issues such as performance, data integrity, work-load management, batch processing, efficiency and continuous availability need to be solved. Many systems on the market today can only handle small numbers of users simultaneously, offer little or no expansion capabilities and frequently require manual intervention to process data through the system. In addition, the mechanisms for maintaining data integrity, ownership, and file management are either limited in capability or are unable to prevent loss of data and/or collisions under certain conditions. With the growing presence of distributed computing, and the increased need for sharing large amounts of data across an enterprise, a solution is required to address these problems for a computer integrated design control system for concurrent engineering and other applications.

In the article entitled "Beyond EDA (electronic design automation)", published in Electronic Business Vol.19, No.6 June 1993 P42–46, 48, it was noted that while billions of dollars have been spent over the past (then and still last) five years for electronic design automation systems (EDA) and software to help companies cut their design cycle; a huge gulf remains between design and manufacturing. To eliminate the gulf and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of U.S. Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's View-Data in Sections which compare with and refer to the Sections of our own preferred "Computer Integrated Design Control System" as set forth at the beginning of our detailed description of our invention. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, if one of the members of the BOM disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

This invention relates to storing, moving, retrieving and managing data in a system comprised of one or more shared public libraries interacting with one or more private libraries arranged in a client server environment. Elements of the system may exist on a homogenous computer platform, or the elements may be scattered across multiple platforms in a heterogeneous environment. The Design Control System incorporates processes for hardware design, software development, manufacturing, inventory tracking, or any related field which necessitates execution of repetitive tasks against multiple iterations of data in a quality controlled environment and our invention enables sharing of libraries in this environment for concurrent engineering.

Our invention provides a design control system usable in a concurrent engineering process which can cooperate in a distributed environment worldwide to enable a design to be processed with many concurrent engineering people and processes. The system we employ uses a data management control program tangibly embodying a program of instructions executable by a supporting machine environment for performing method steps by an aggregation manager of a data management system having a library organization which receives a request of a user initiated from said displayed client screen and fulfills the request by providing results via our data management system's aggregation manager.

Our invention provides an improved way to make or import a model, and provides a dynamic way to track the model during its course through its design phase. We provide a way to track the BOM.

In order to make a common model, we display for creation of a model one or more control screen sections as part of a control panel input screen allowing creation of a model by interactive user activity, by importing a file listing, by searching of a library of files in said data management system and importing a located file, or by use of an application program interface with a collection of model management utilities. Our sections of said control screen panel include:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor.

Our model thus consists of one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said such component acting as one anchor and further consisting of one or more associated components each of which is a data object in said data management system. In accordance with our invention our components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file. All components of a model are either static and thus does not move through said data management system but is tracked by the system or dynamic and moves through said data management system with its associated model as part of an action of promoting a model when a model is promoted, a dynamic member being labeled as an input or an output with respect to its associated anchor, while both anchors and components may be labeled as static.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

This, along with many other changes have been made as detailed in the description of our invention which follows.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates our preferred embodiment's data entry.

Figure 11:
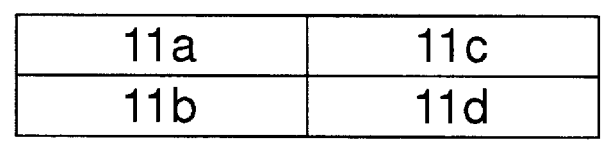

FIG. 11 shows the interconnection of FIG. 11a thru 11d

FIG. 13 depicts a data entry screen for initiating a Promote.

Figure 16:
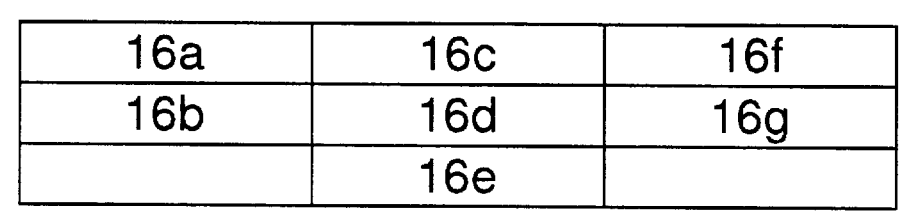

FIG. 16 shows the interconnection of FIG. 16a thru 16g.

FIG. 17 shows the interconnection of FIG. 17a and 17b.

Figure 18:
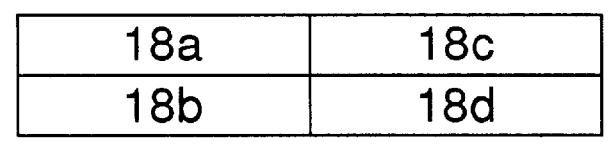

FIG. 18 shows the interconnection of FIG. 18a thru 18d.

FIG. 19 shows the interconnection of FIG. 19a thru 19c.

FIG. 20 shows interconnection of FIG. 20a and 20b.

FIG. 21 shows the interconnection of FIG. 21a thru 21f.

Figure 22:
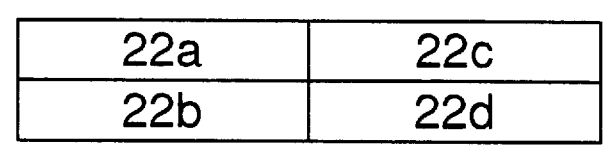

FIG. 22 shows interconnection of FIG. 22a thru 22d.

Figure 24:
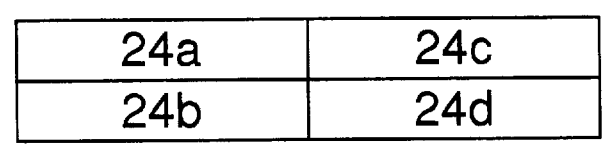

FIG. 24 shows interconnection of FIG. 24a thru 24d.

FIG. 25 shows interconnection of FIG. 25a and 25b.

FIG. 26 shows interconnection of FIG. 26a and 26b.

FIG. 28 shows interconnection of FIG. 28a thru 28d.

FIG. 29 shows interconnection of 29a and 29b.

FIG. 30 shows interconnection of 30a and 30b.

FIG. 31 shows interconnection of 31a and 31b.

FIG. 32 shows interconnection of 32a and 32b.

Figure 34:
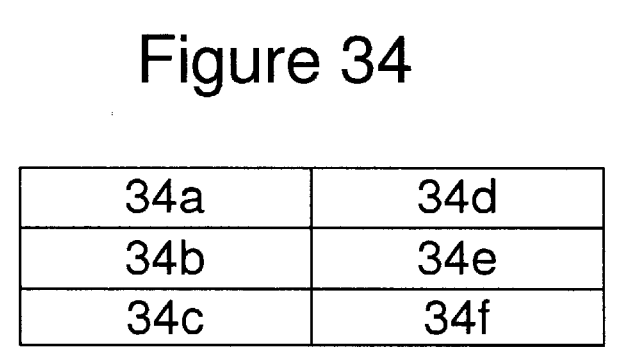

FIG. 34 shows interconnection of 34a thru 34f.

Figure 39:
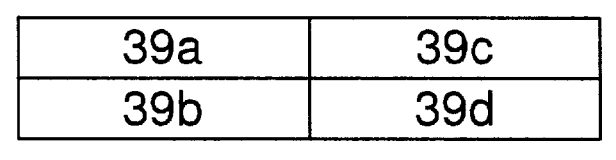

FIG. 39 shows interconnection of 39a thru 39d.

Figure 40:
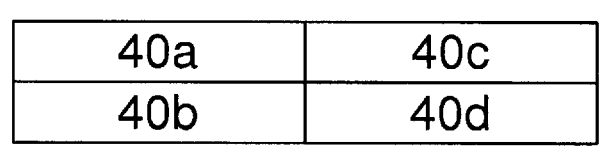

FIG. 40 shows the interconnection of FIG. 40a thru 40d.

FIG. 42 shows the interconnection of FIG. 42a thru 42c.

FIG. 44 shows interconnection of FIG. 44a thru 44c.

Figure 48:
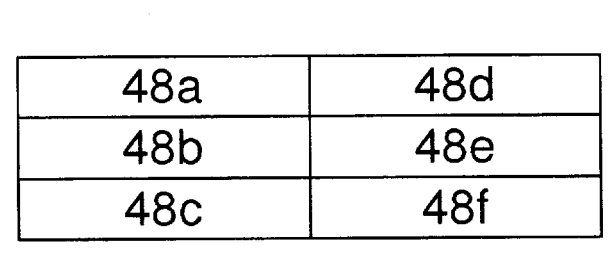

FIG. 48 shows interconnection of FIG. 48a thru 48f.

FIG. 49 shows interconnection of FIG. 49a thru 49c.

FIG. 49a thru 49c describes the FILEDELA Process.

FIG. 50 shows interconnection of FIG. 50a thru 50c.

FIG. 58 shows the interconnection of FIG. 58a and 58b.

FIG. 59 shows the interconnection of FIG. 59a and 59d.

FIG. 61 shows the interconnection of FIG. 61a thru 61d.

Figure 63:
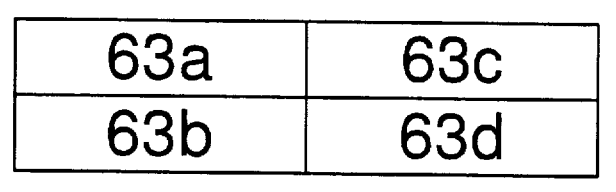

FIG. 63 shows the interconnection of FIG. 63a thru 63d.

Figure 64:
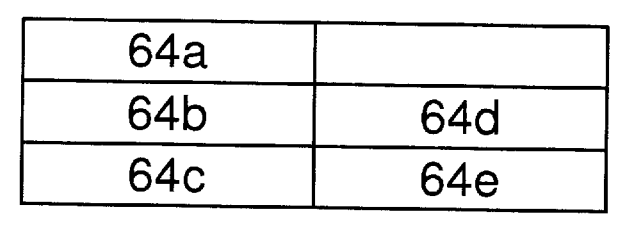

FIG. 64 shows the interconnection of FIG. 64a thru 64e.

Figure 65:
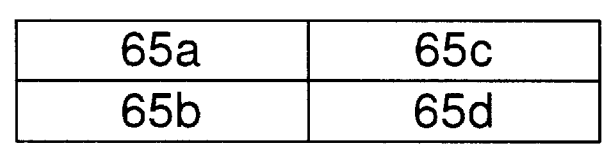

FIG. 65 shows the interconnection of FIG. 65a thru 65d.

FIG. 67 shows the interconnection of FIG. 67a and 67b.

FIG. 68 shows the interconnection of FIG. 68a thru 68c.

FIG. 69 shows the interconnection of FIG. 69a thru 69d.

FIG. 69a thru 69d describes the QRMDLSET Process.

FIG. 70 shows the interconnection of FIG. 70a thru 70d.

FIG. 71 shows the interconnection of FIG. 71a and 71b.

Figure 72:
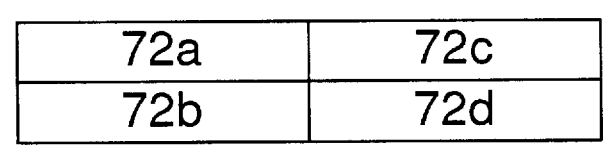

FIG. 72 shows the interconnection of FIG. 72a thru 72d.

FIG. 73 shows the interconnection of FIG. 73a thru 73e.

FIG. 73a thru 73e describes the QRMFIMOD Process.

Figure 74:
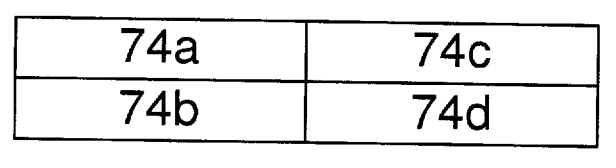

FIG. 74 shows the interconnection of FIG. 74a thru 74d.

FIG. 74a thru 74d describes the QRSUPMFI Process.

Figure 75:
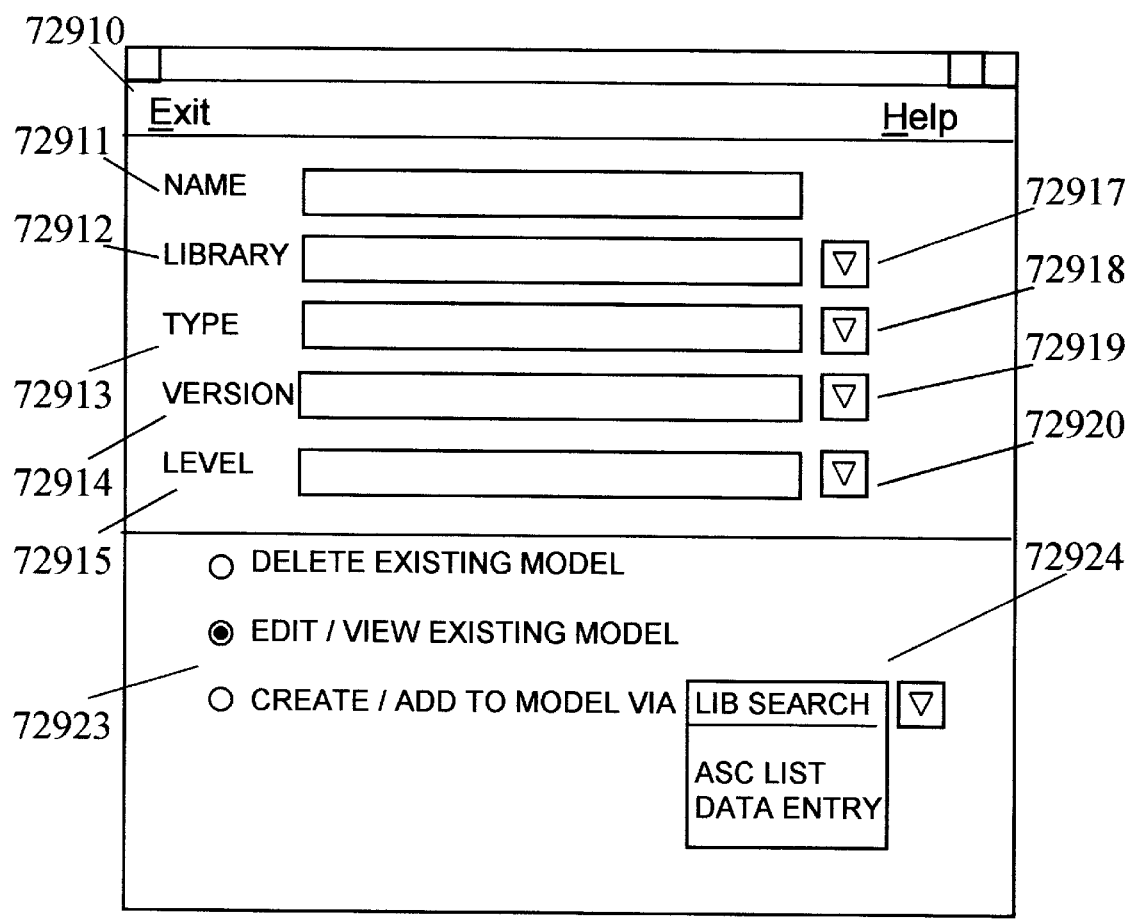

FIG. 75 shows the main menu for the Model Management Utilities

Figure 76:
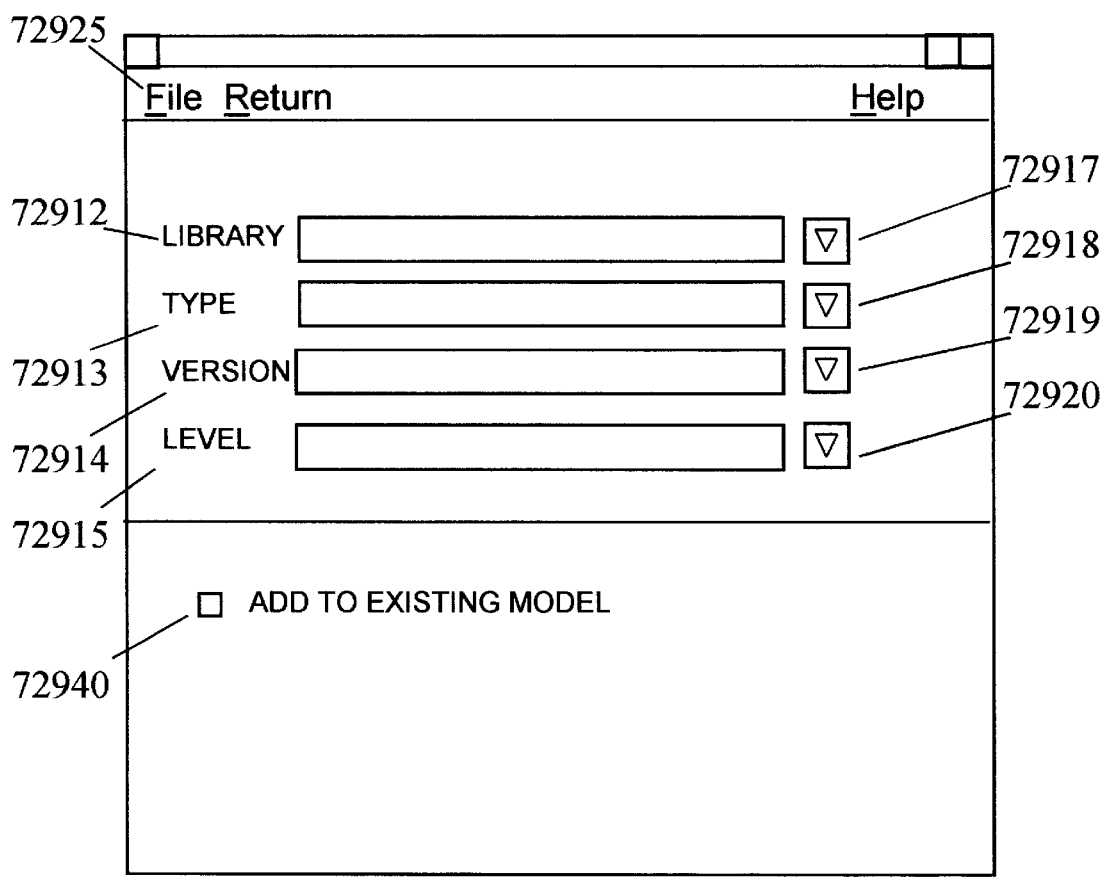

FIG. 76 illustrates the data entry screen for launching a Library Search used in creating Models.

FIG. 77 shows the main screen for editing and viewing existing Models.

Figure 78:
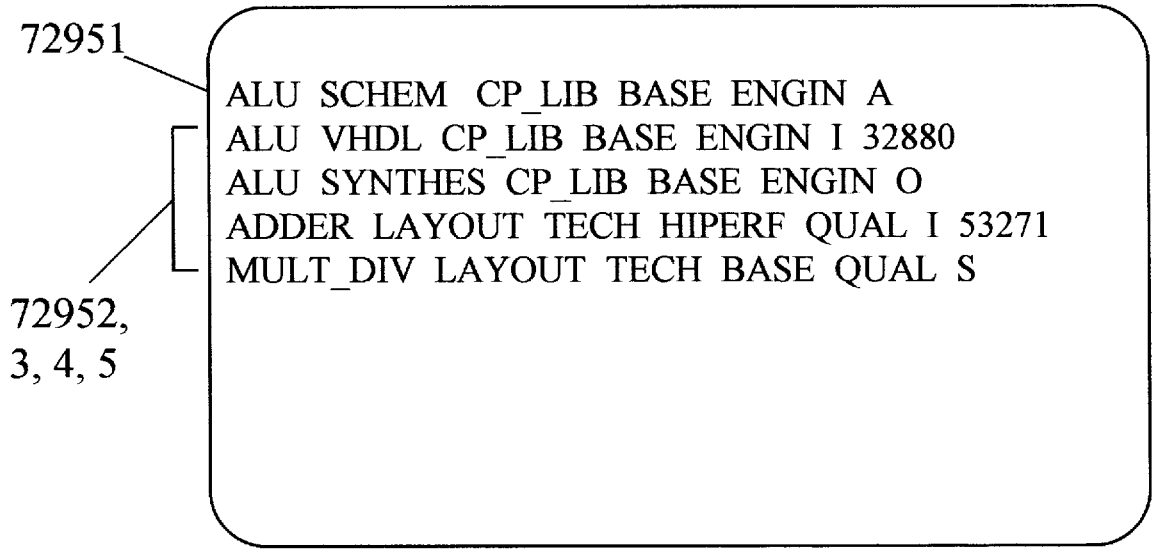

FIG. 78 diagrams a sample text file which may used to import the information required to create a Model.

Figure 79:
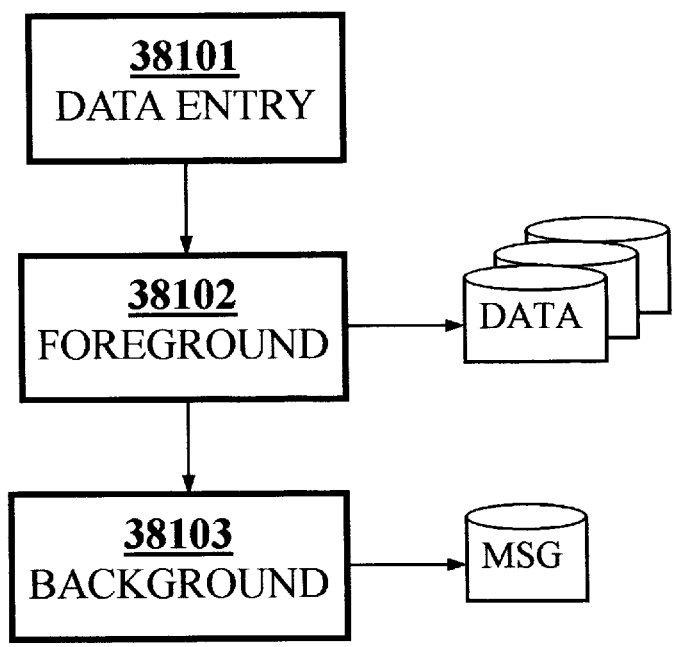

FIG. 79 shows the high level flowchart for a Library Process

Figure 80:
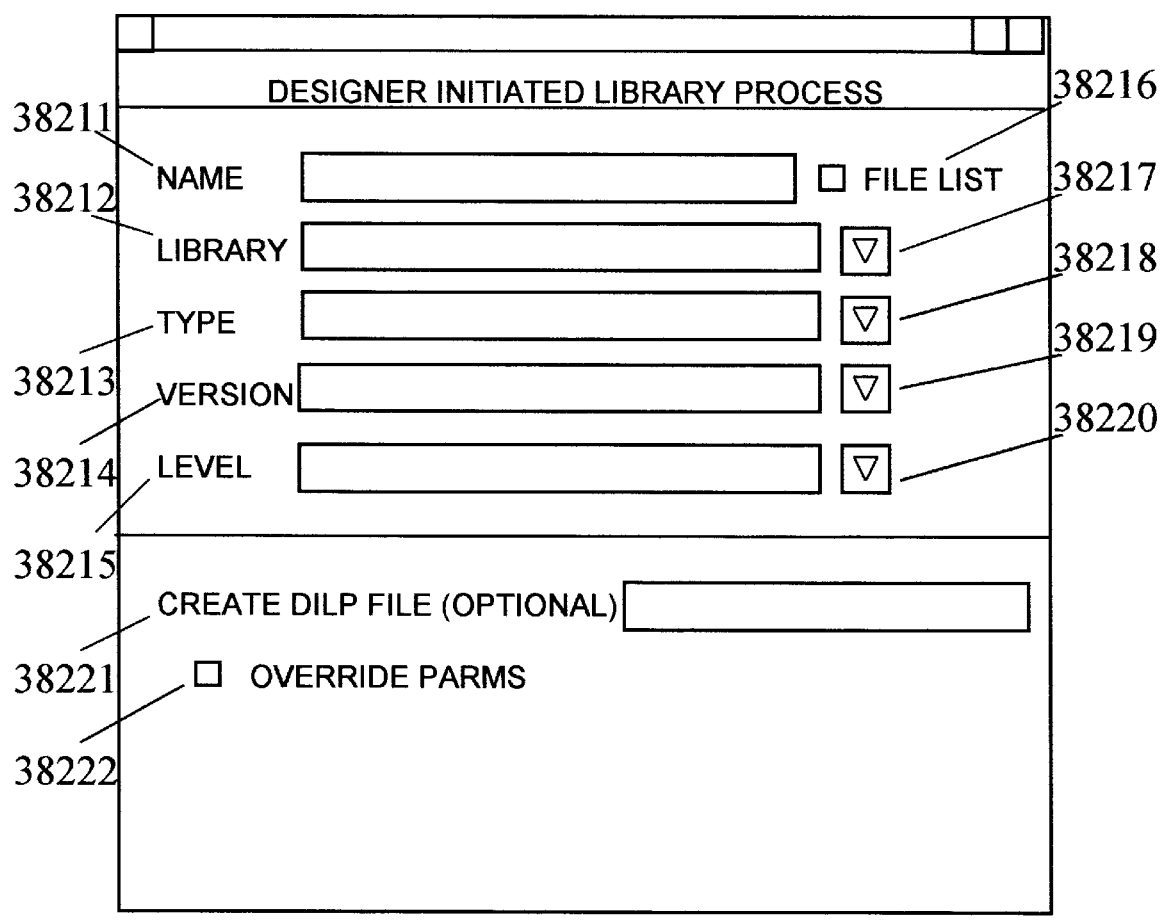
Figure 81A:
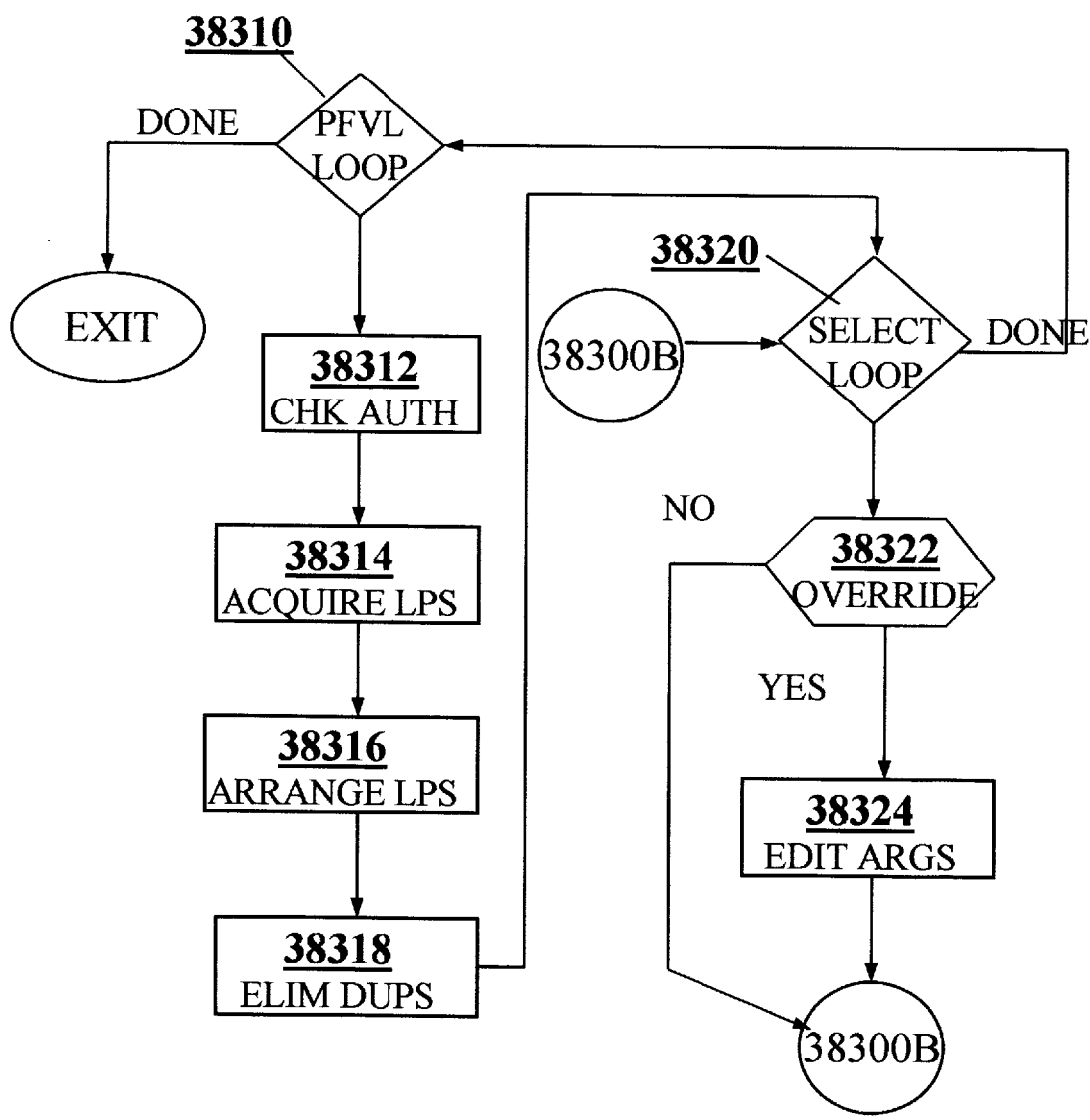
Figure 81B:
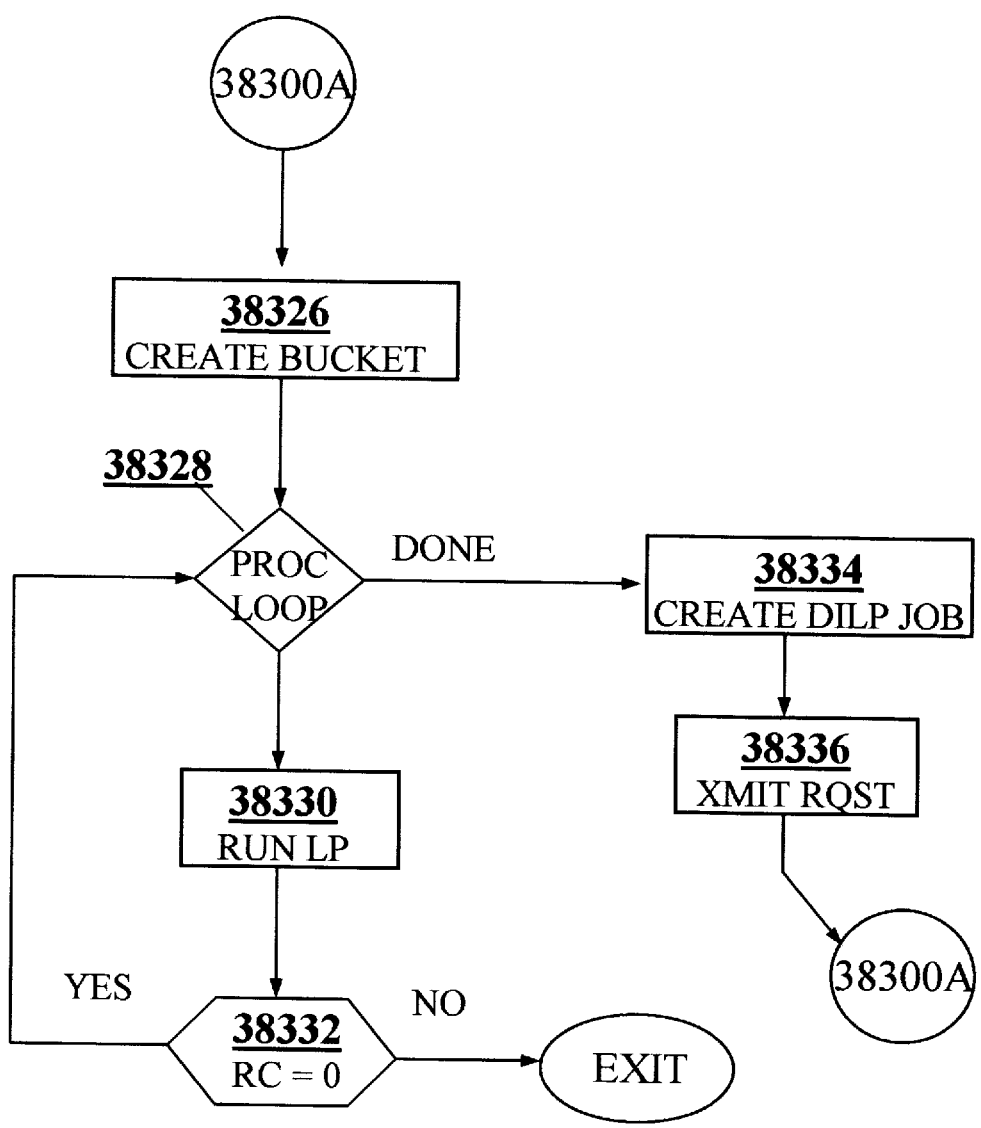

FIG. 80 shows the Data Entry screen for a user to launch a Designer Initiated Library Process FIG. 81a and 81b diagrams the algorithm for Library Foreground Processing.

Figure 82A:
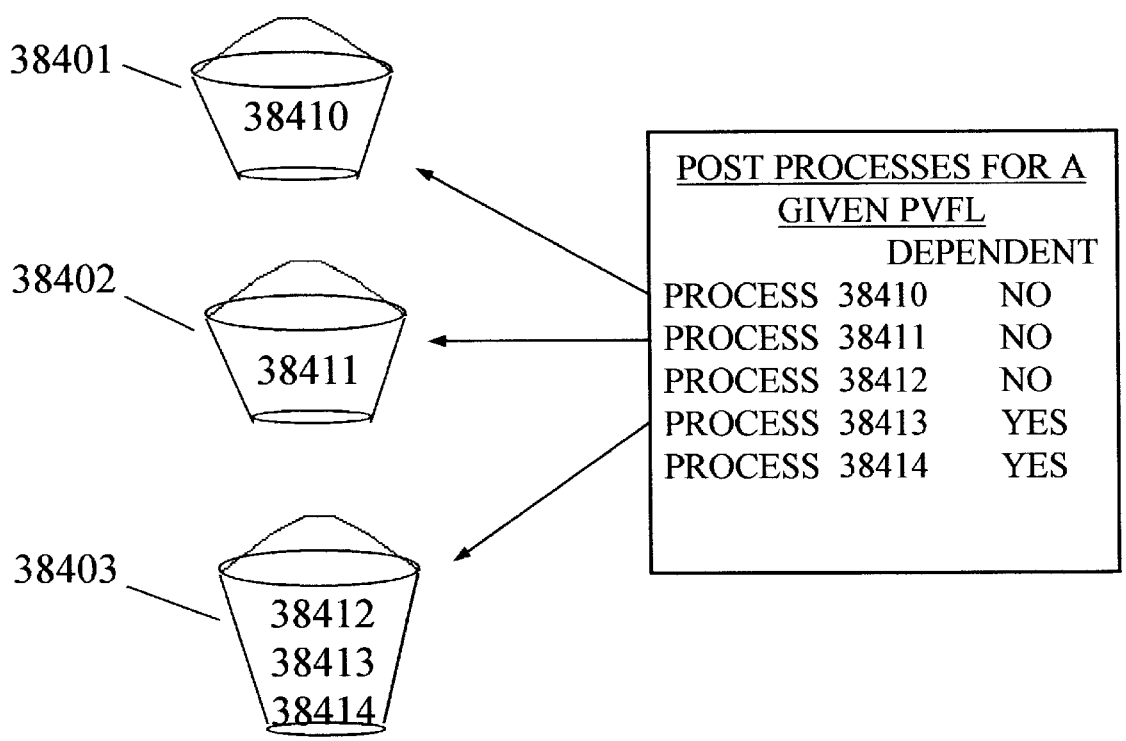

FIG. 82a and 82b illustrates the concept of Buckets with their informational content.

Figure 83A:
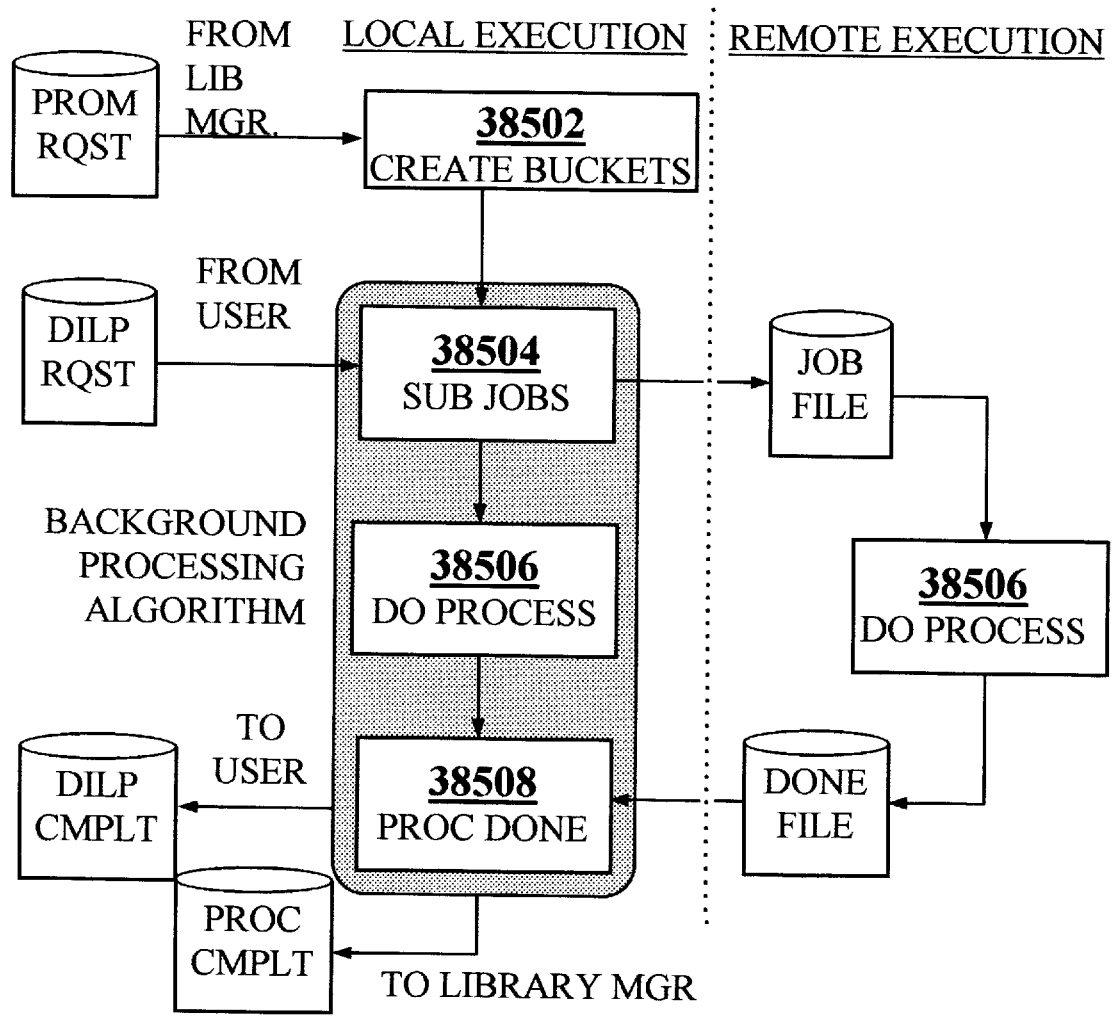
Figure 83B:
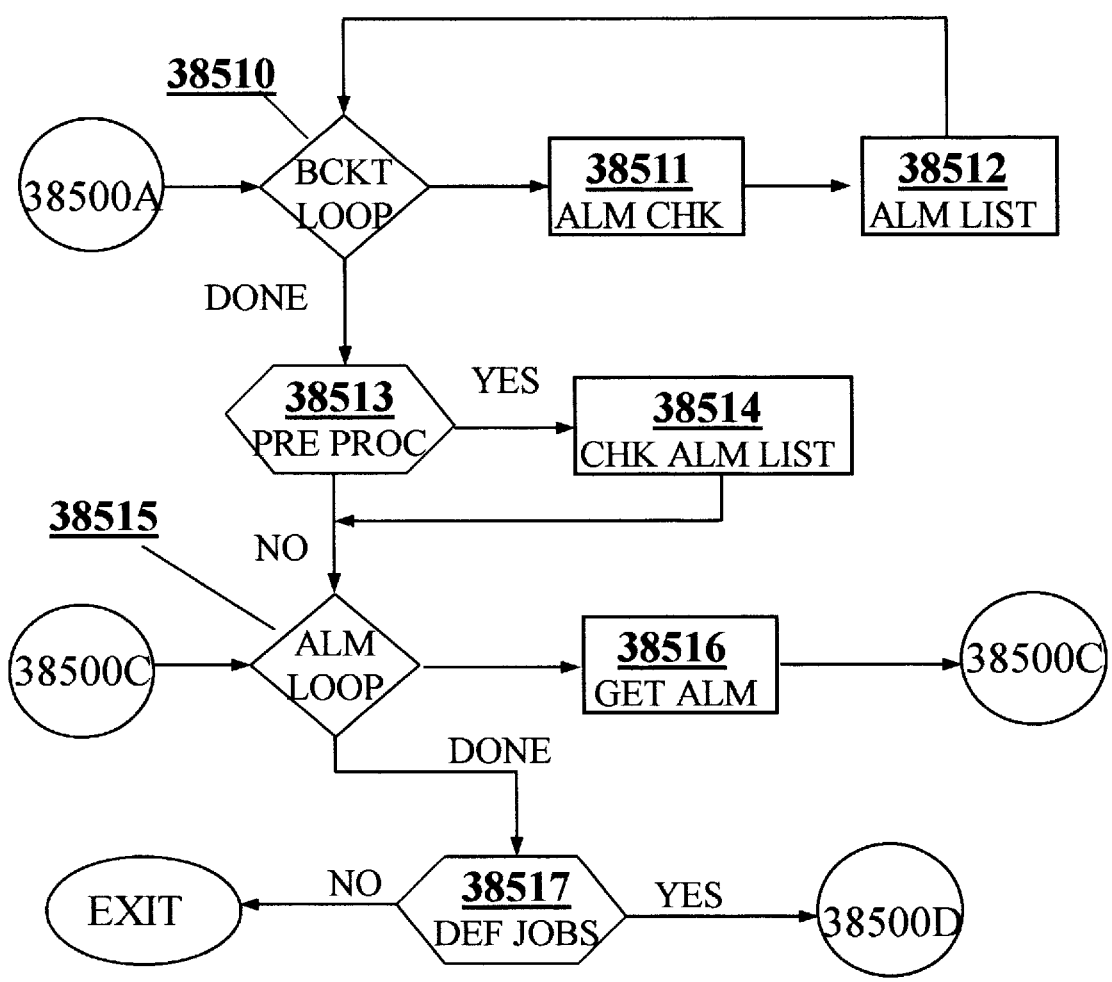
Figure 83C:
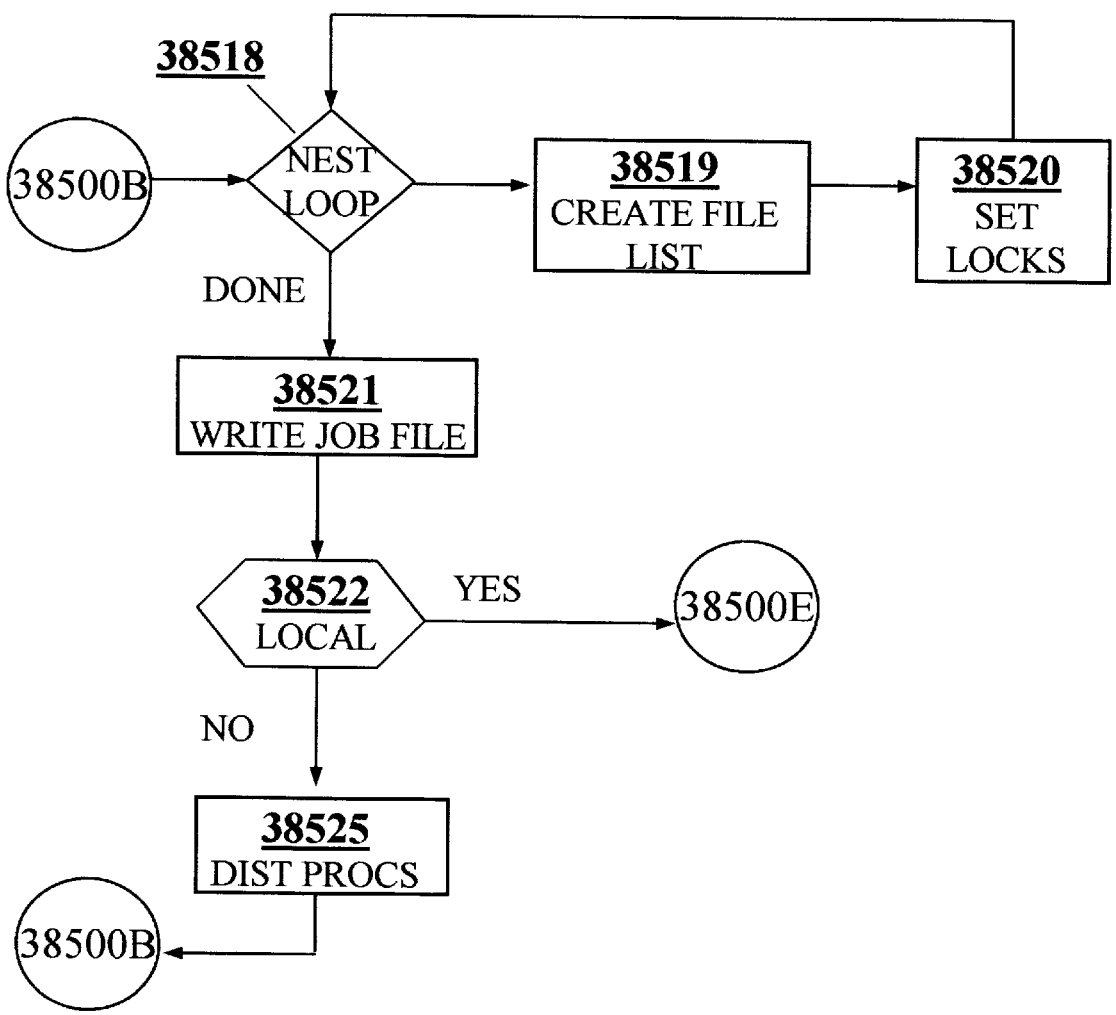
Figure 83D:
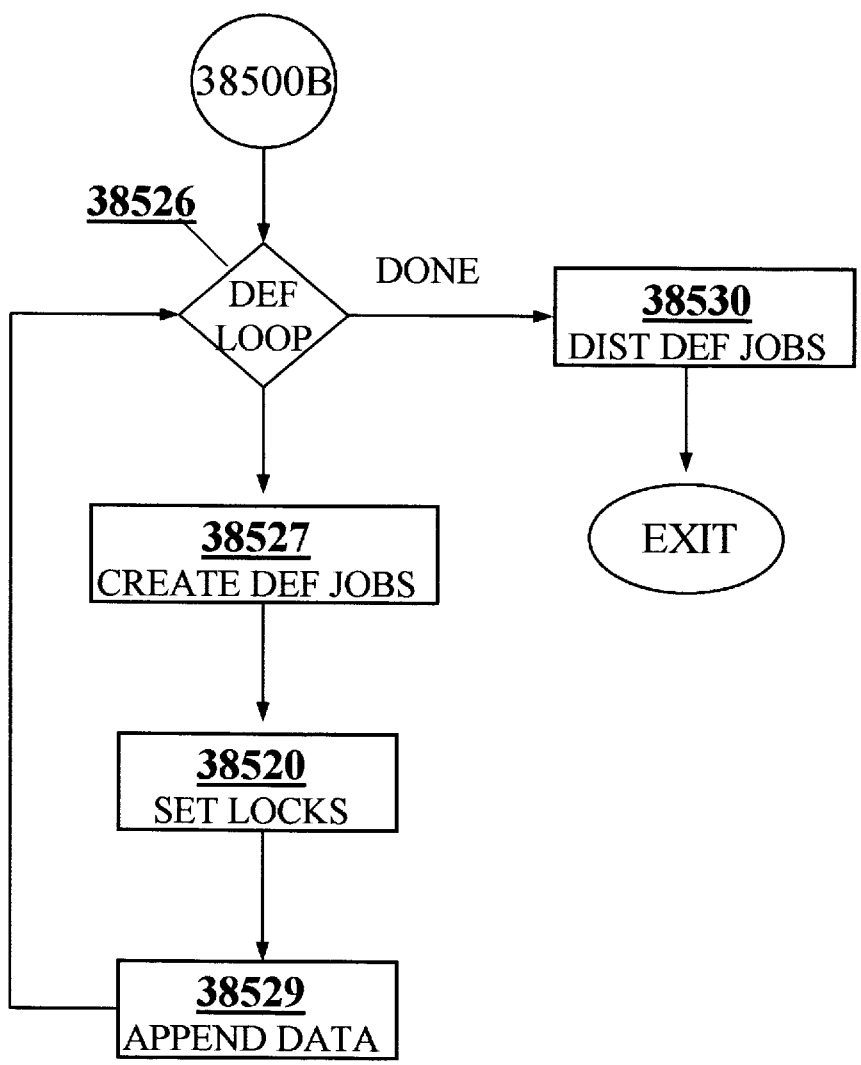
Figure 83E:
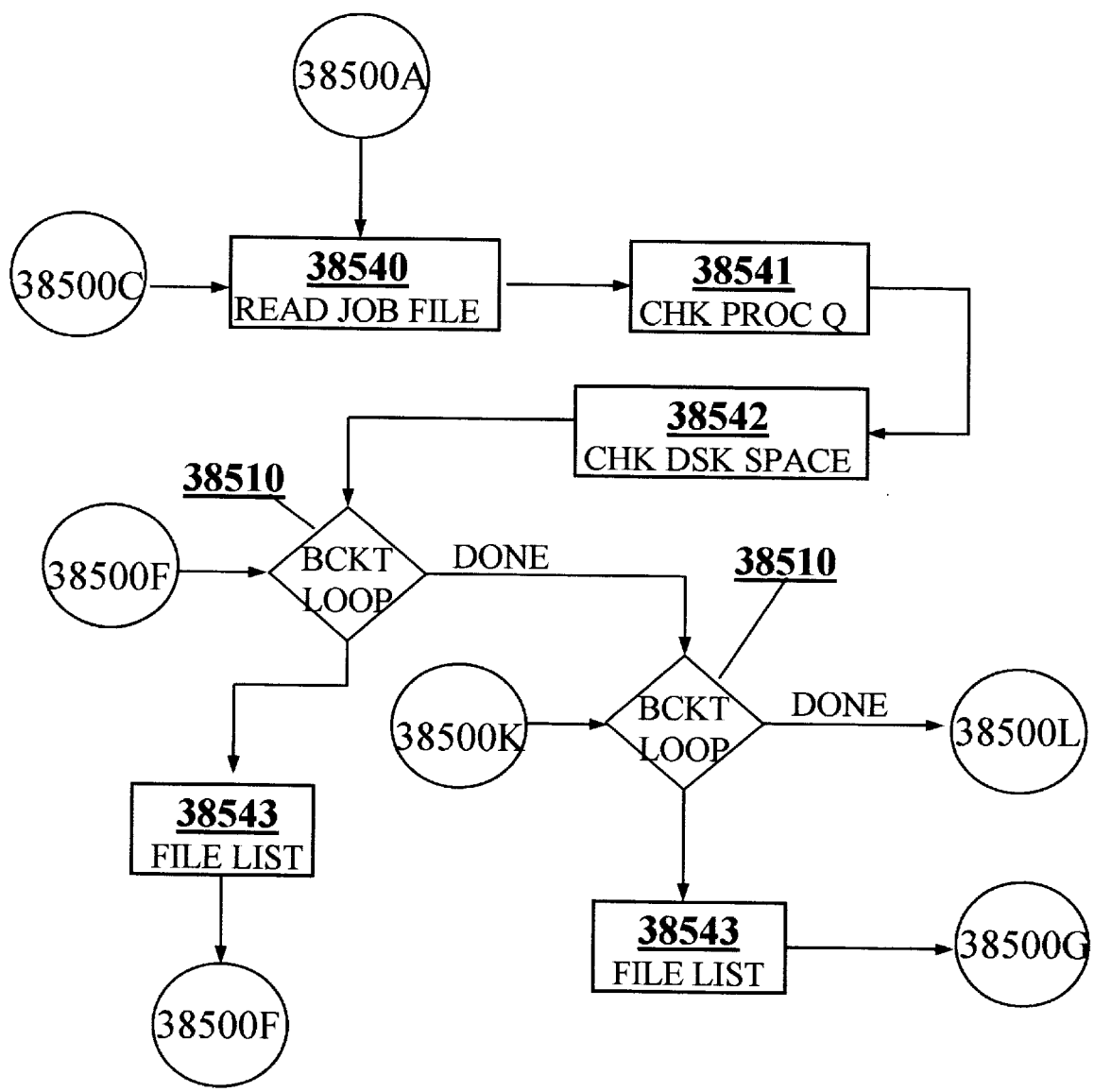
Figure 83F:
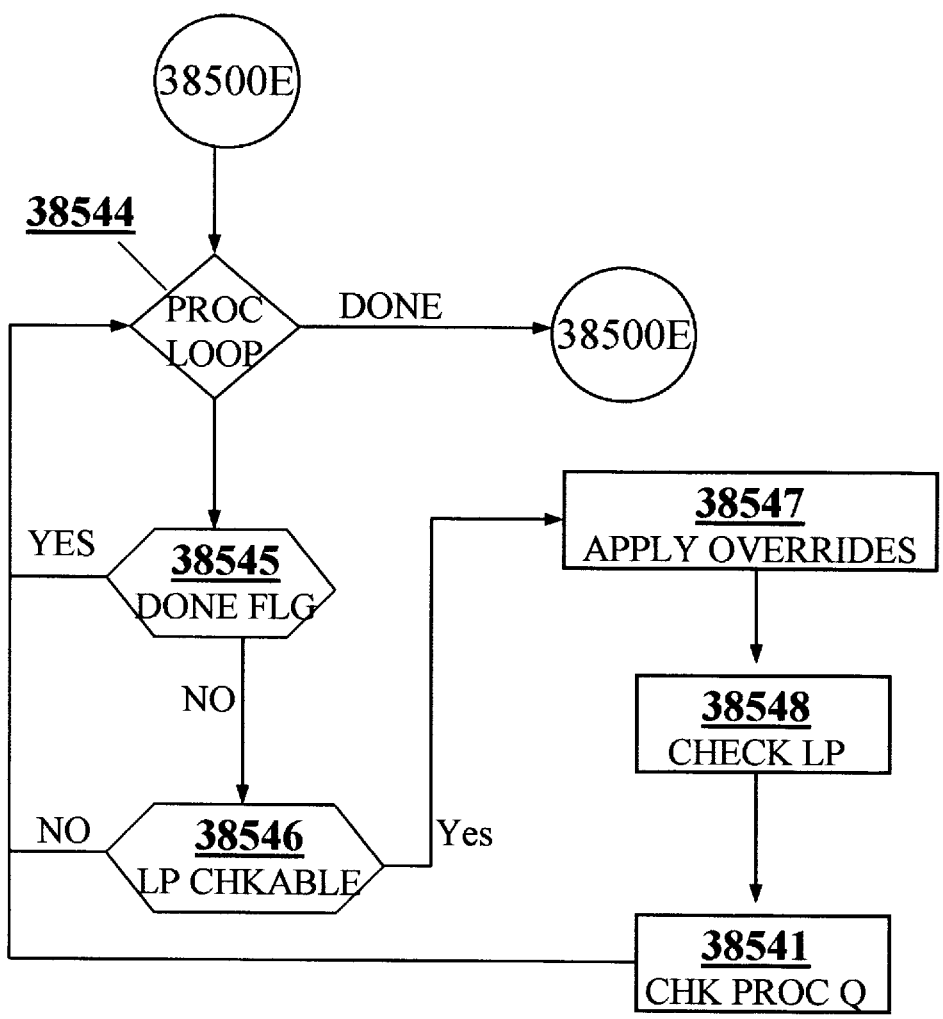
Figure 83G:
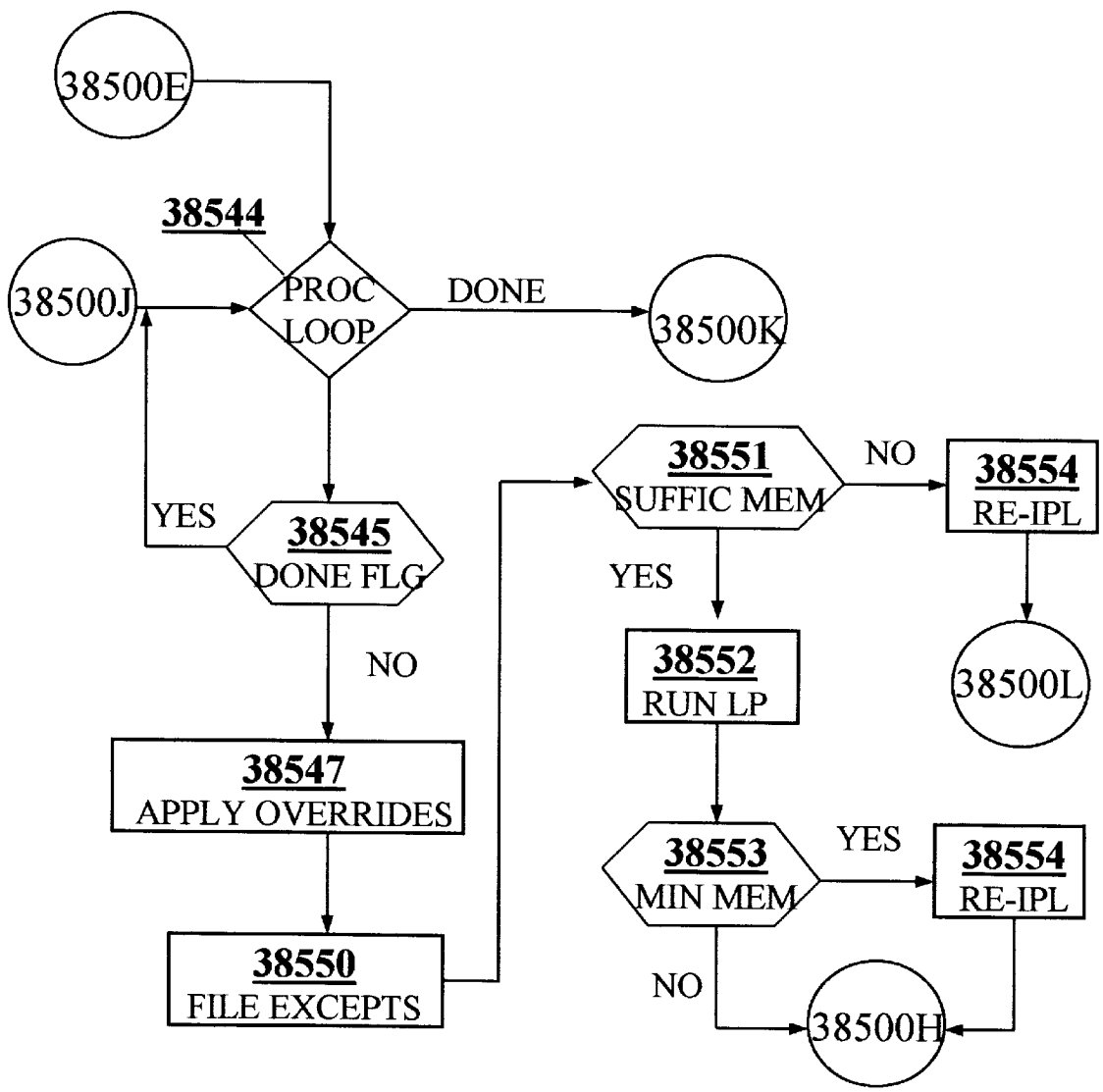
Figure 83H:
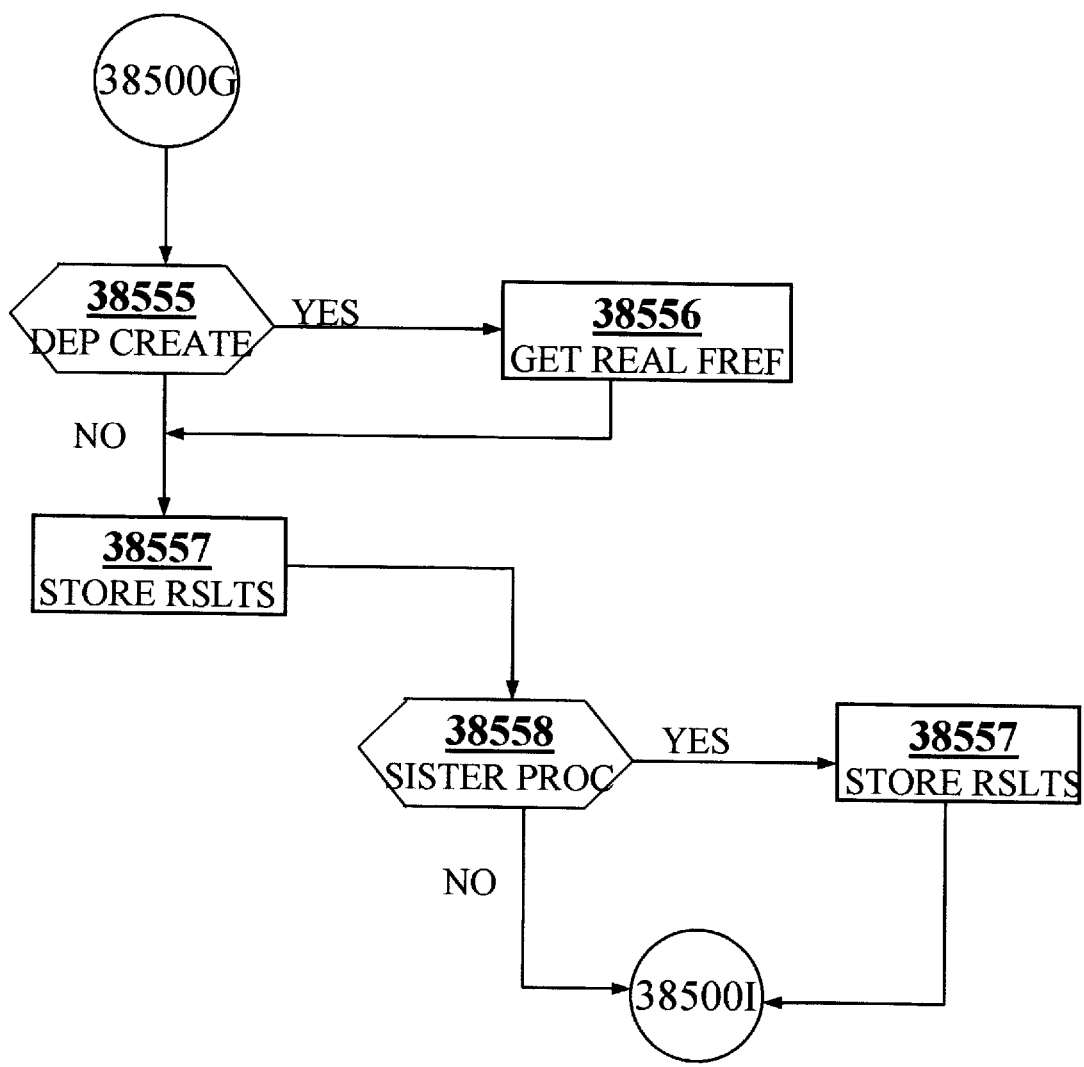
Figure 83I:
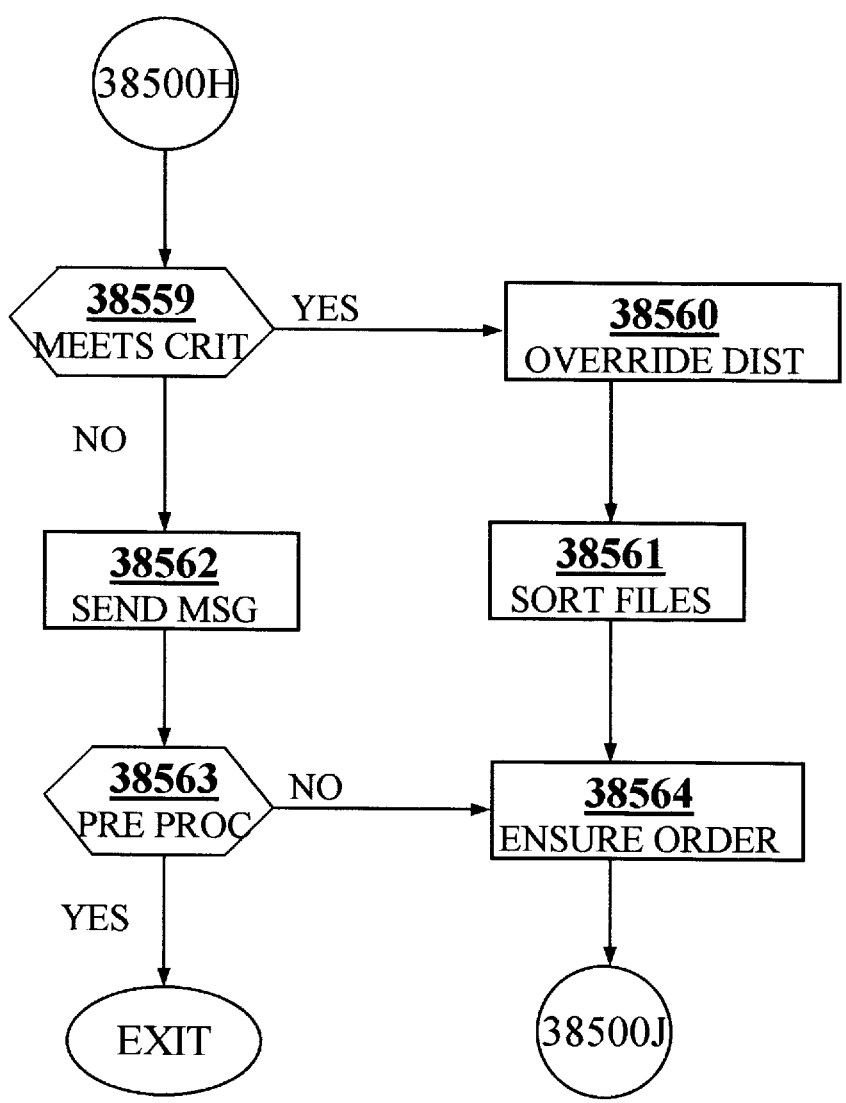
Figure 83J:
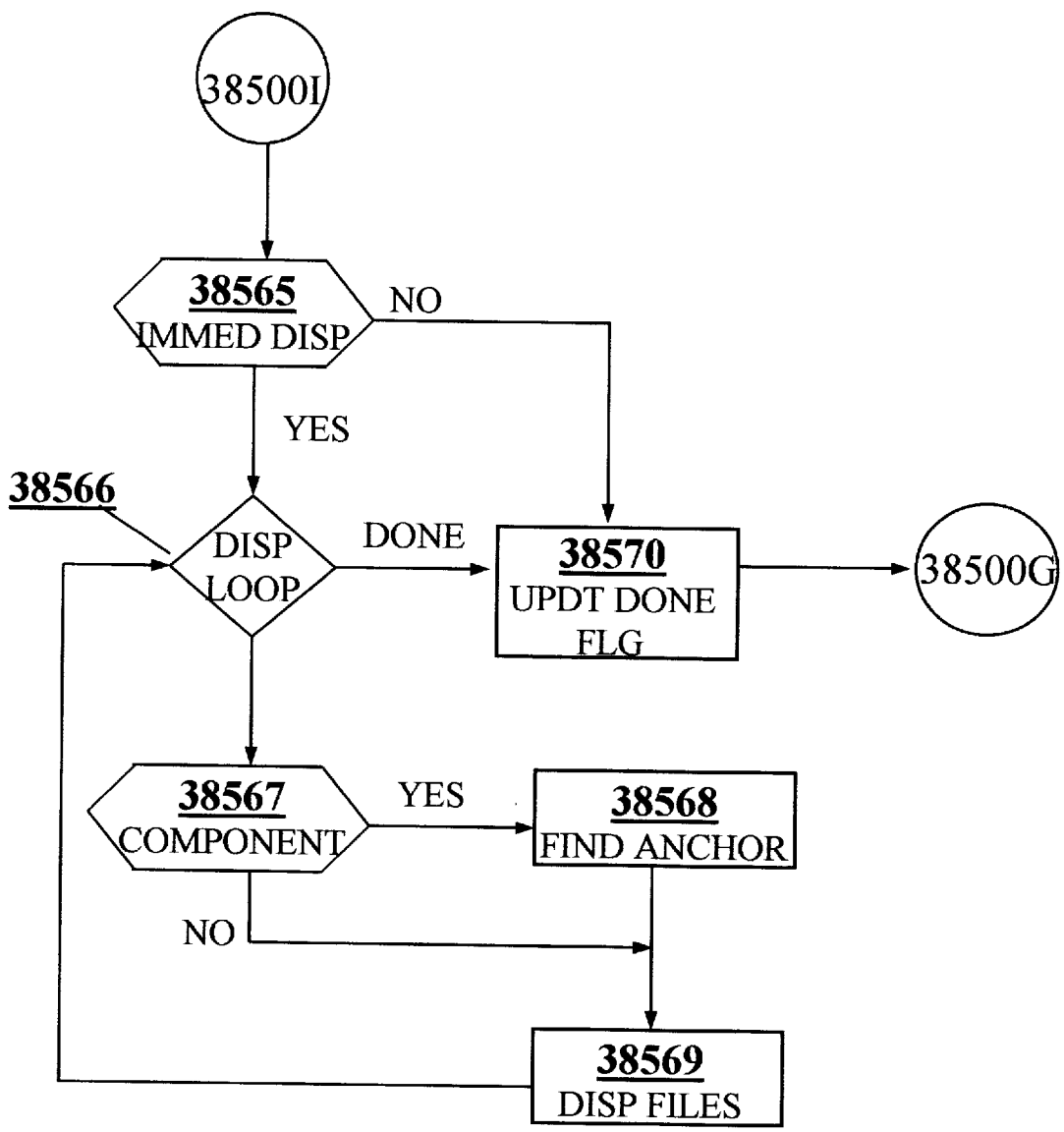
Figure 83K:
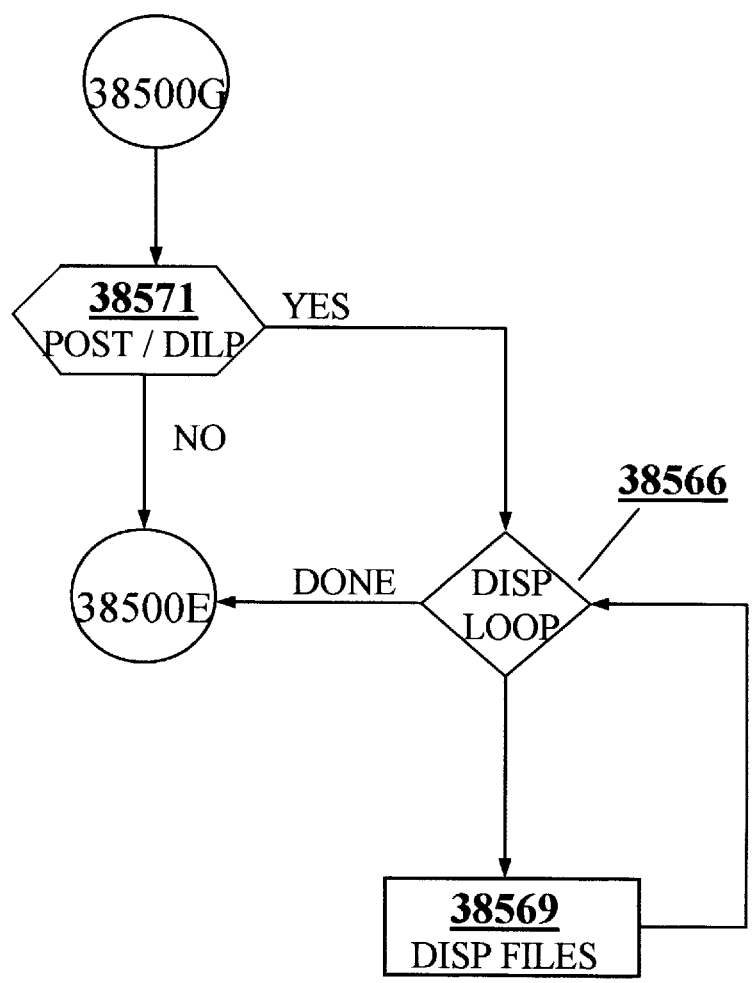
Figure 83I:
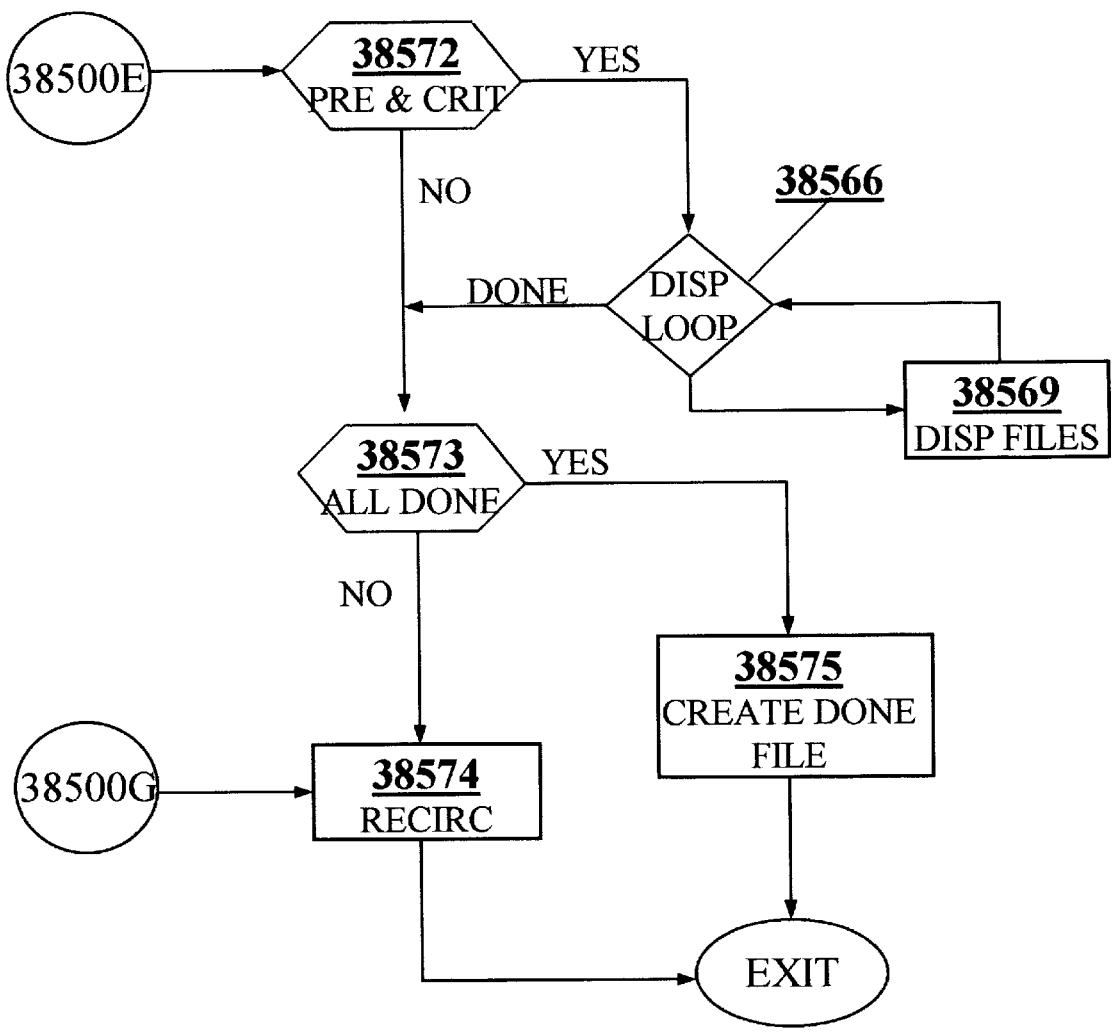
Figure 83M:
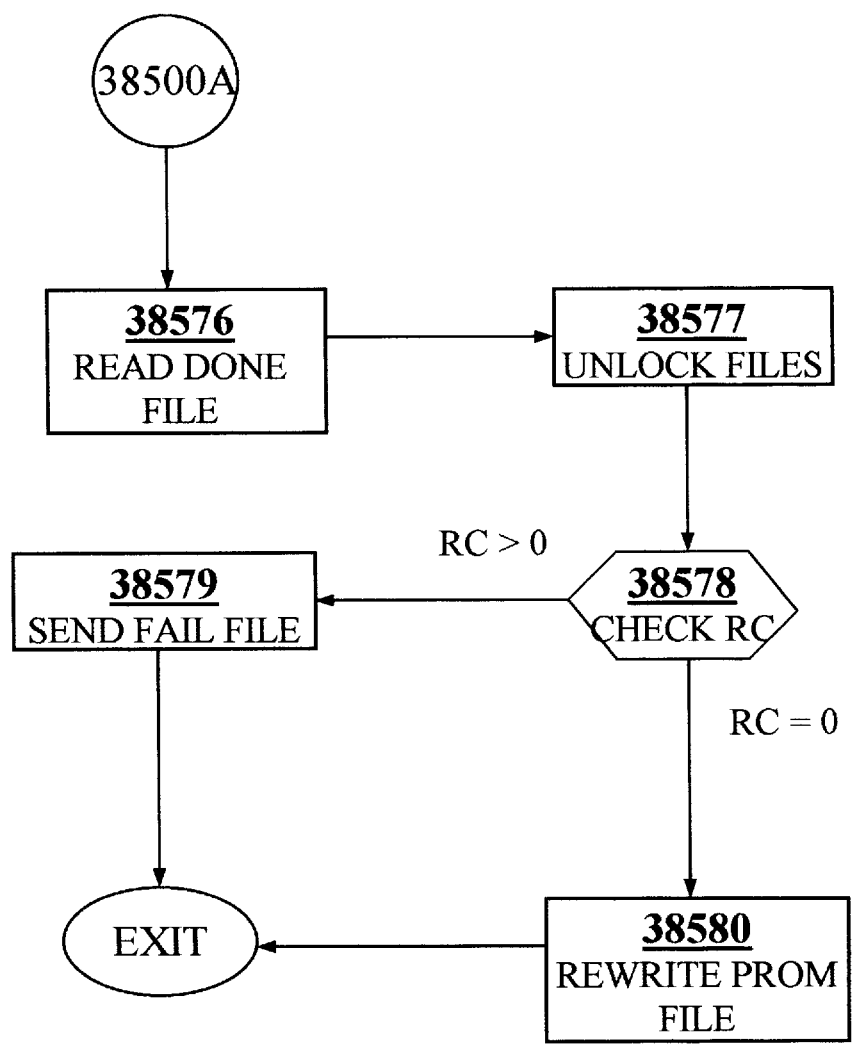
Figure 83N:
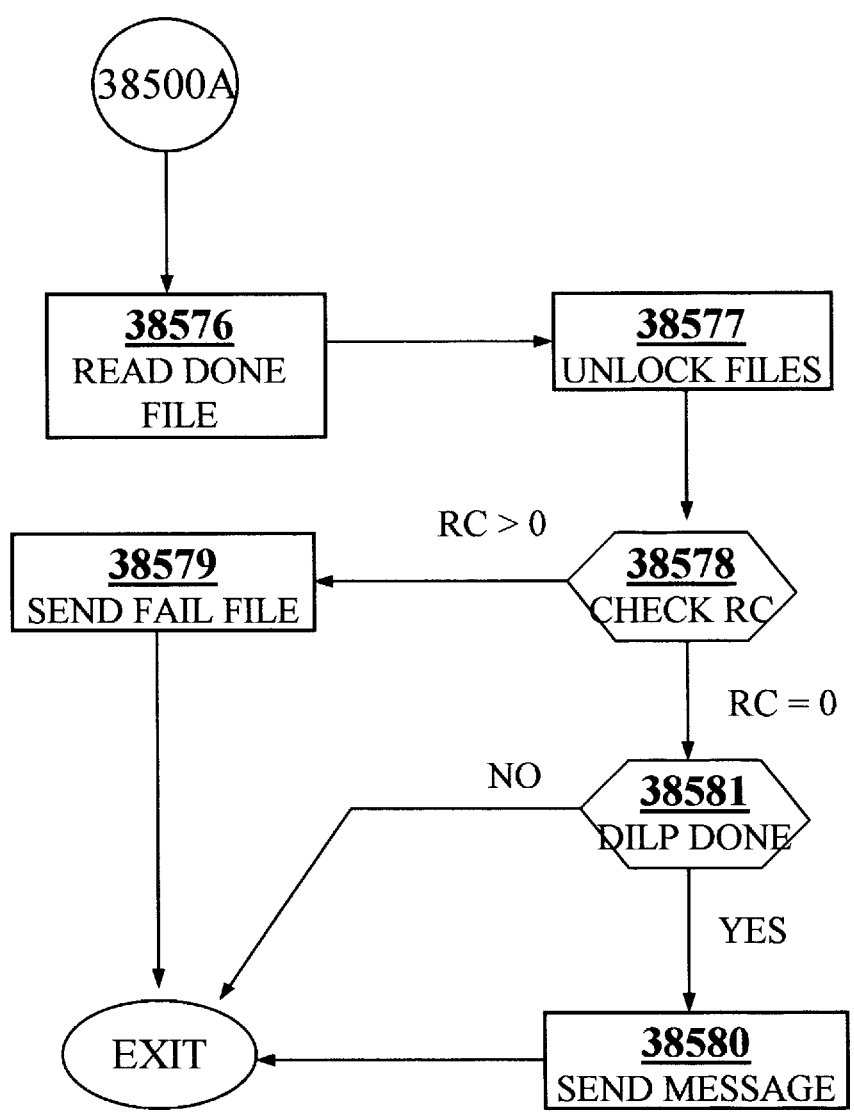

FIG. 83a thru 83n diagrams the algorithm for Library Background Processing. This algorithm is used by Step 38103 in FIG. 79 or it can be initiated by promotion (movement) of a file through the Data Management System.

FIG. 84 shows the Library Process Exception screen which allows a user to exclude a file from Library Processing.

Figure 85:
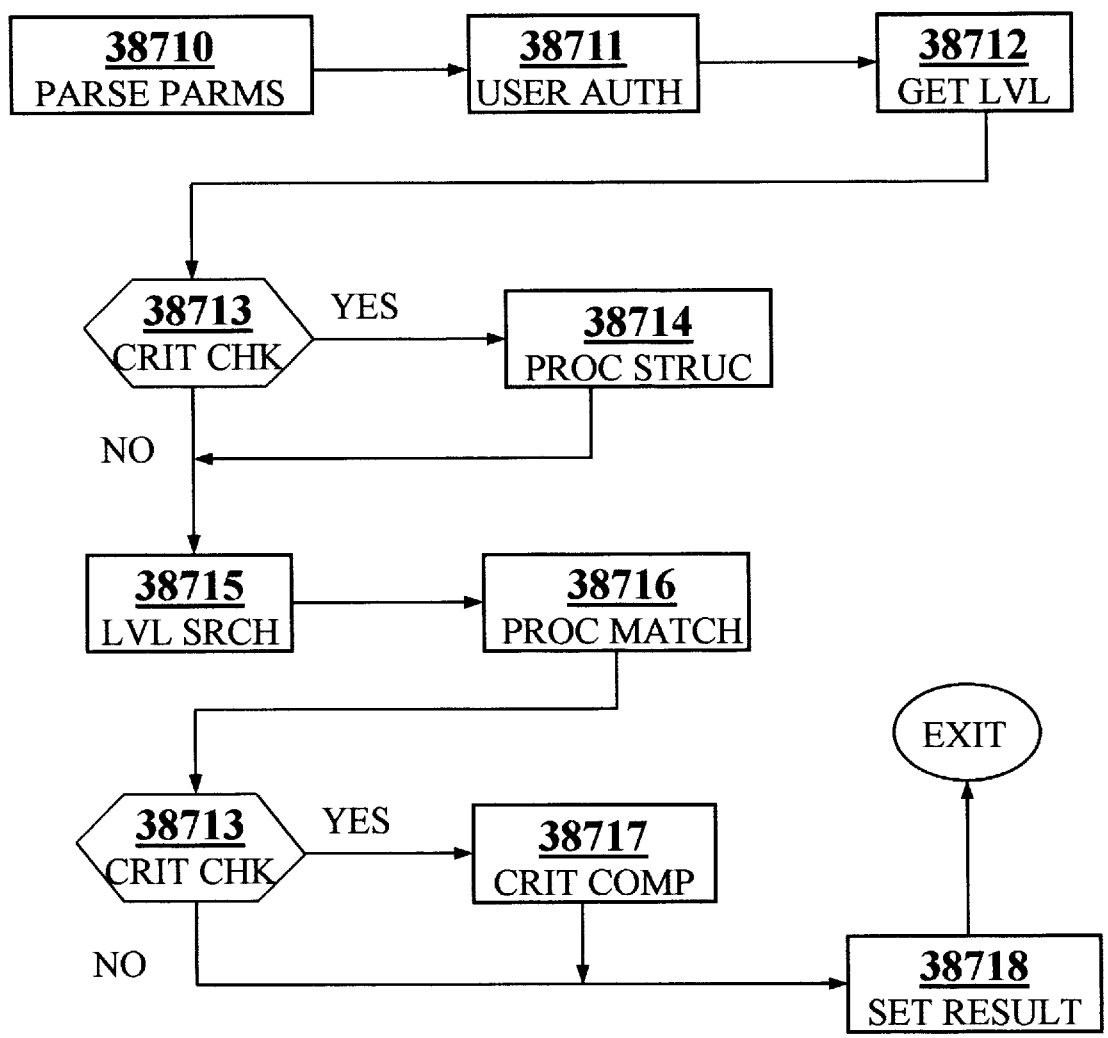

FIG. 85 diagrams the detailed algorithm for setting Level Independent Pseudo Process results into the Control Repository.

FIG. 86 shows the user screen which enables one to view, and in certain cases edit, the results of Library Processes.

Figure 87:
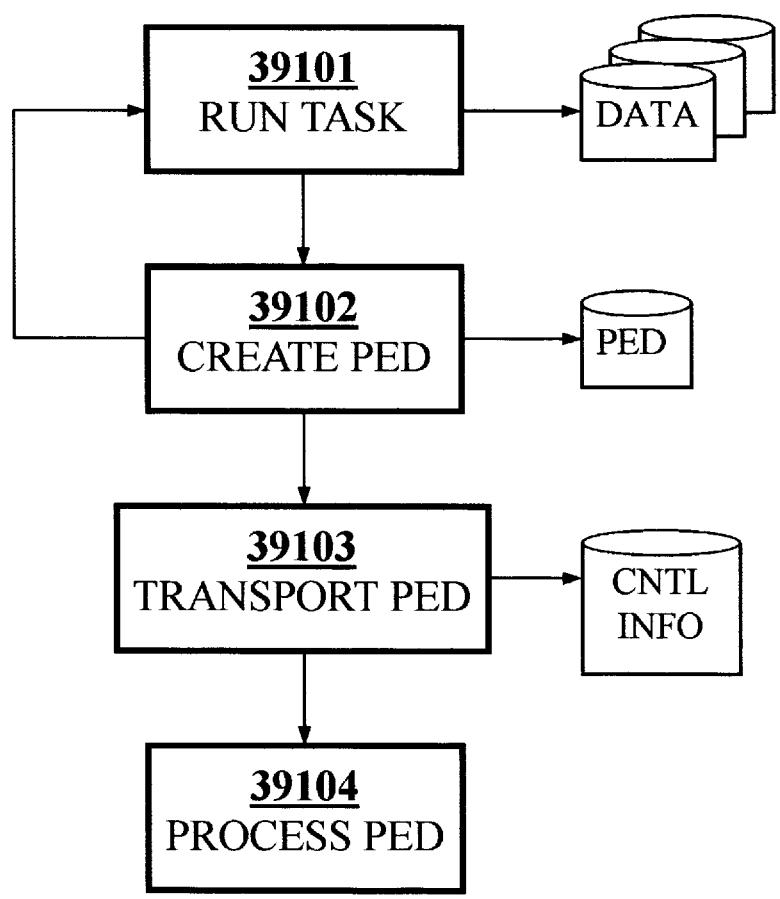

FIG. 87 shows the overall flowchart for External Data Control.

FIG. 88 is an example PEDigree file.

Figure 89A:
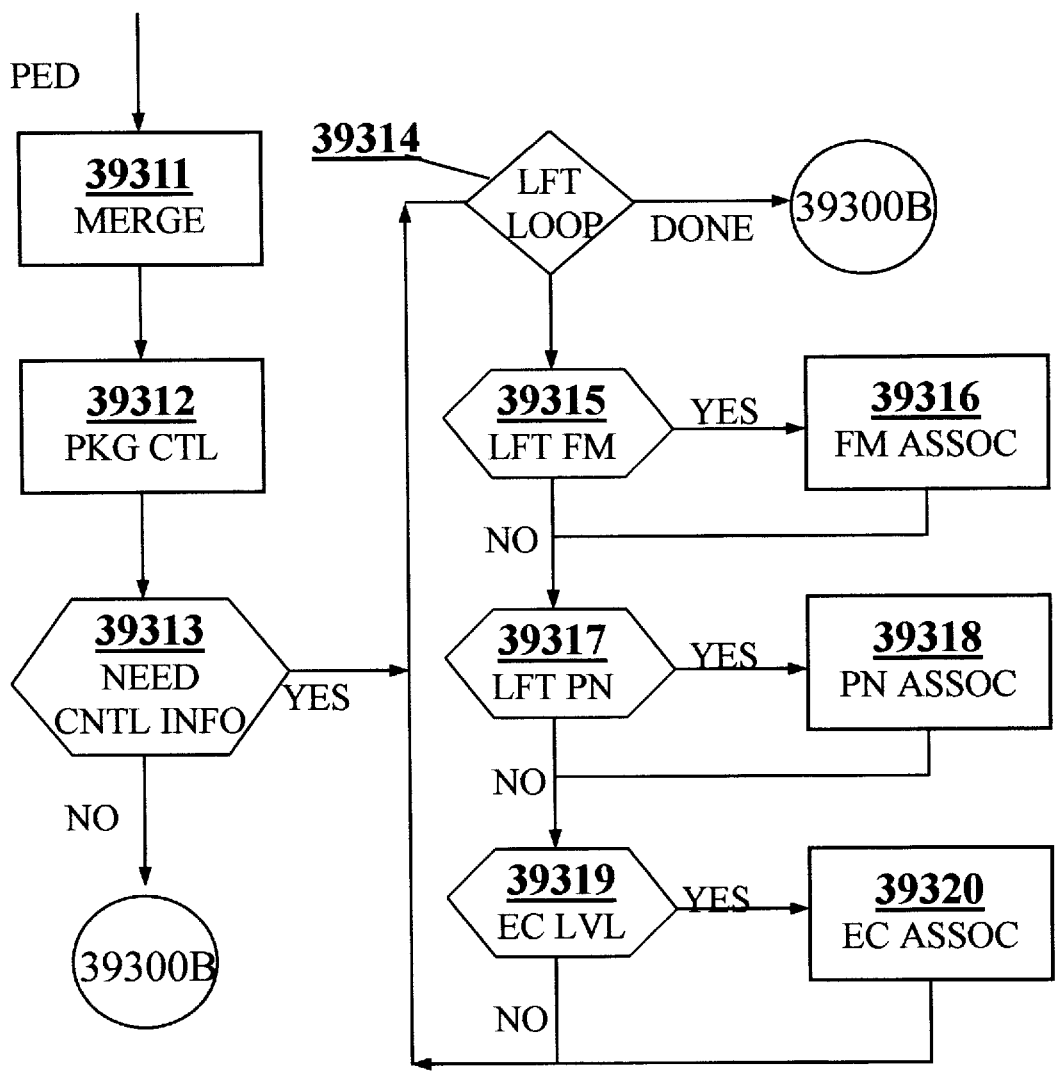
Figure 89B:
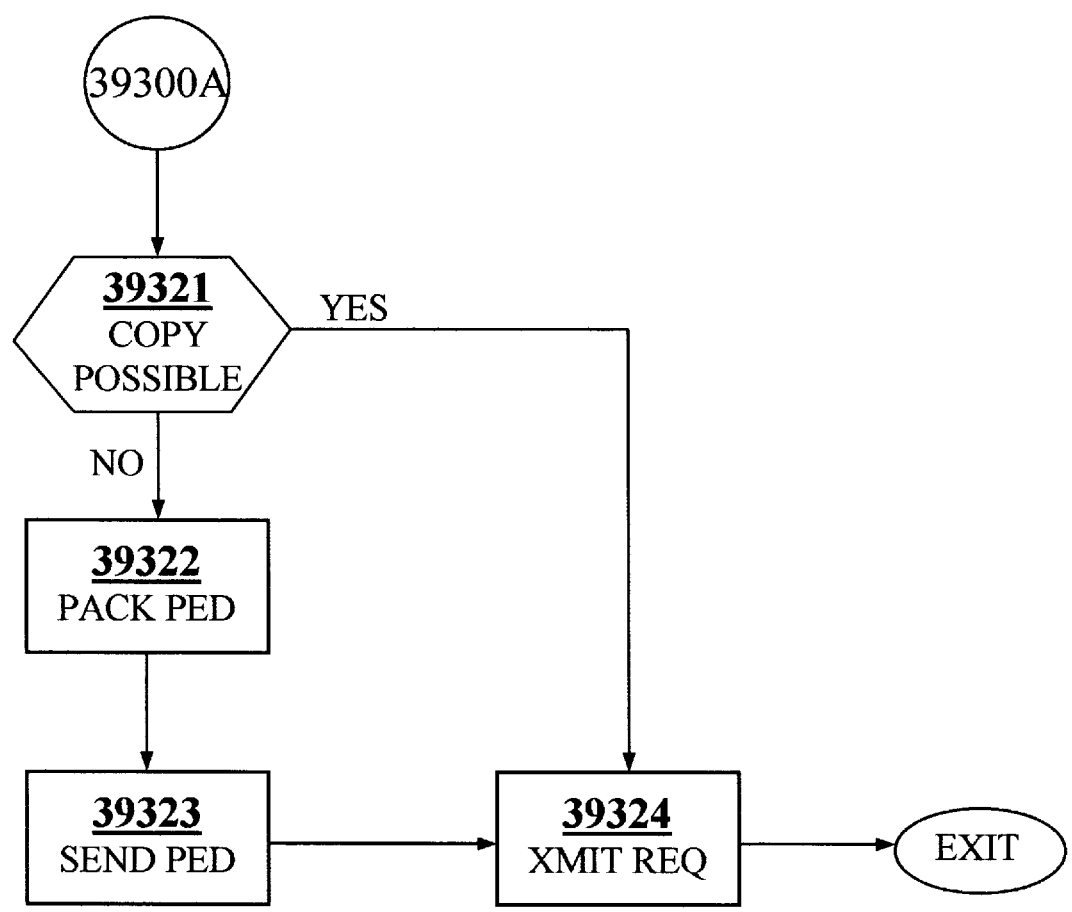

FIG. 89a and 89b diagrams the algorithm for transporting a PED file.

Figure 90A:
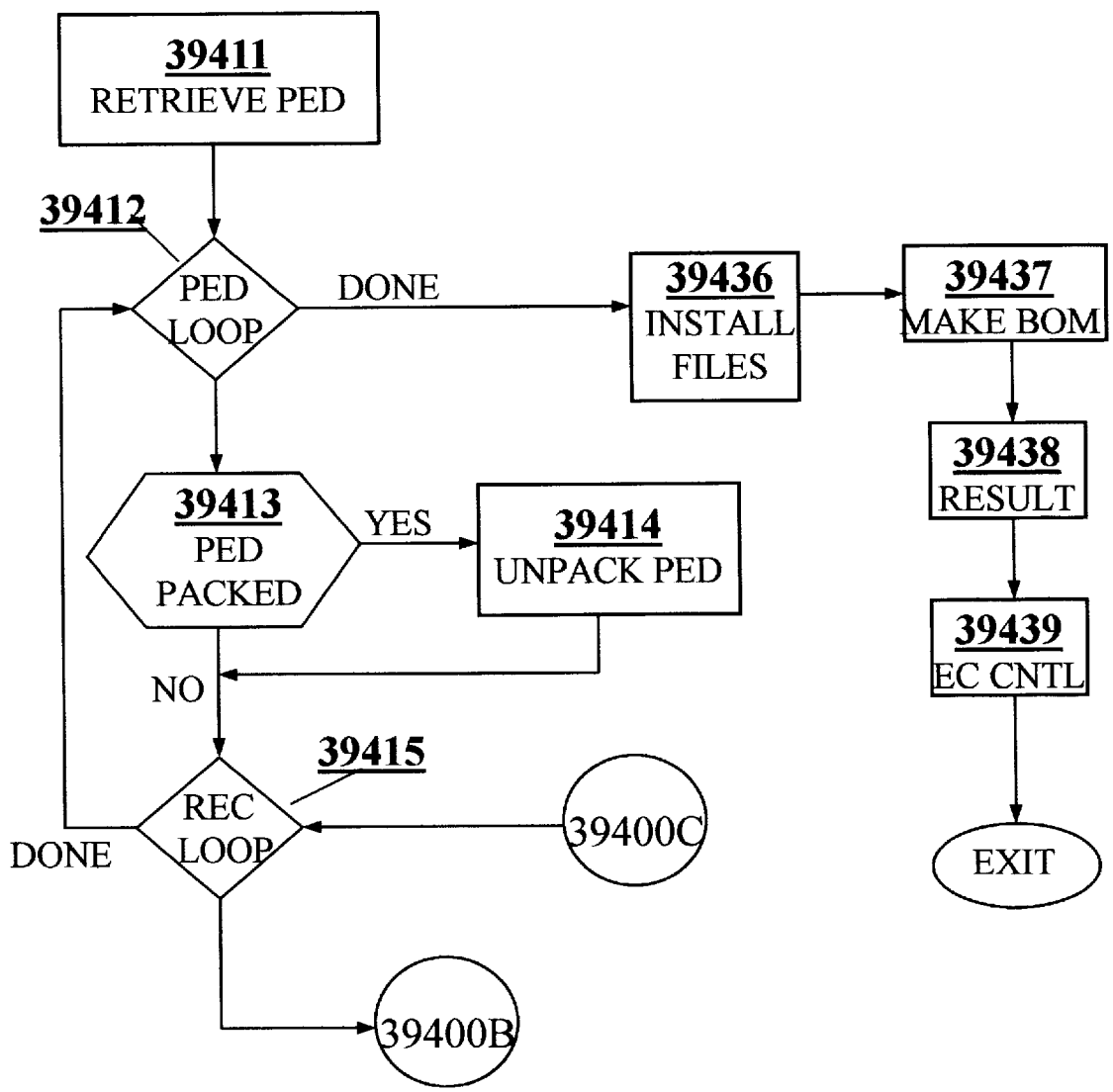
Figure 90B:
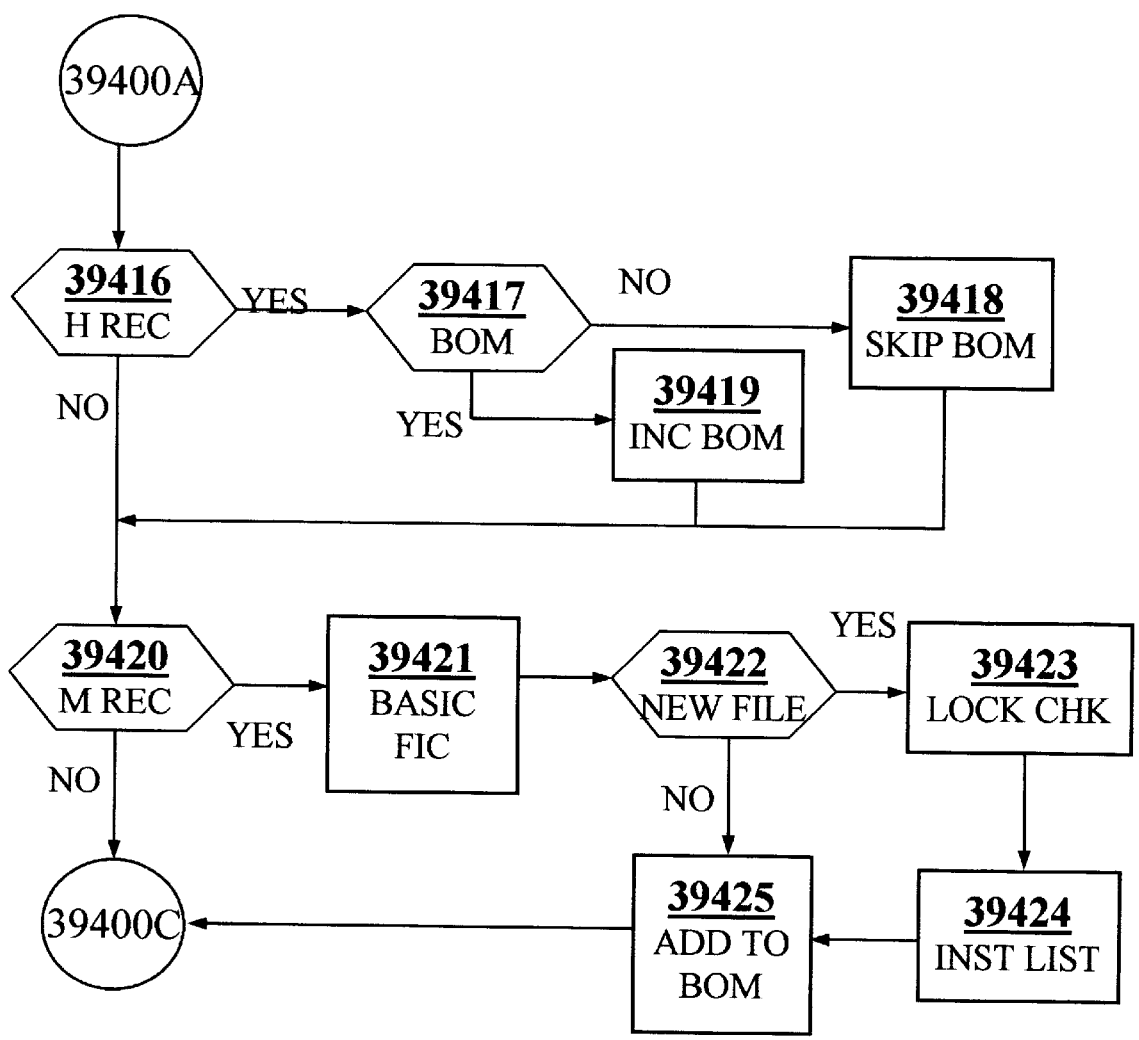
Figure 90C:
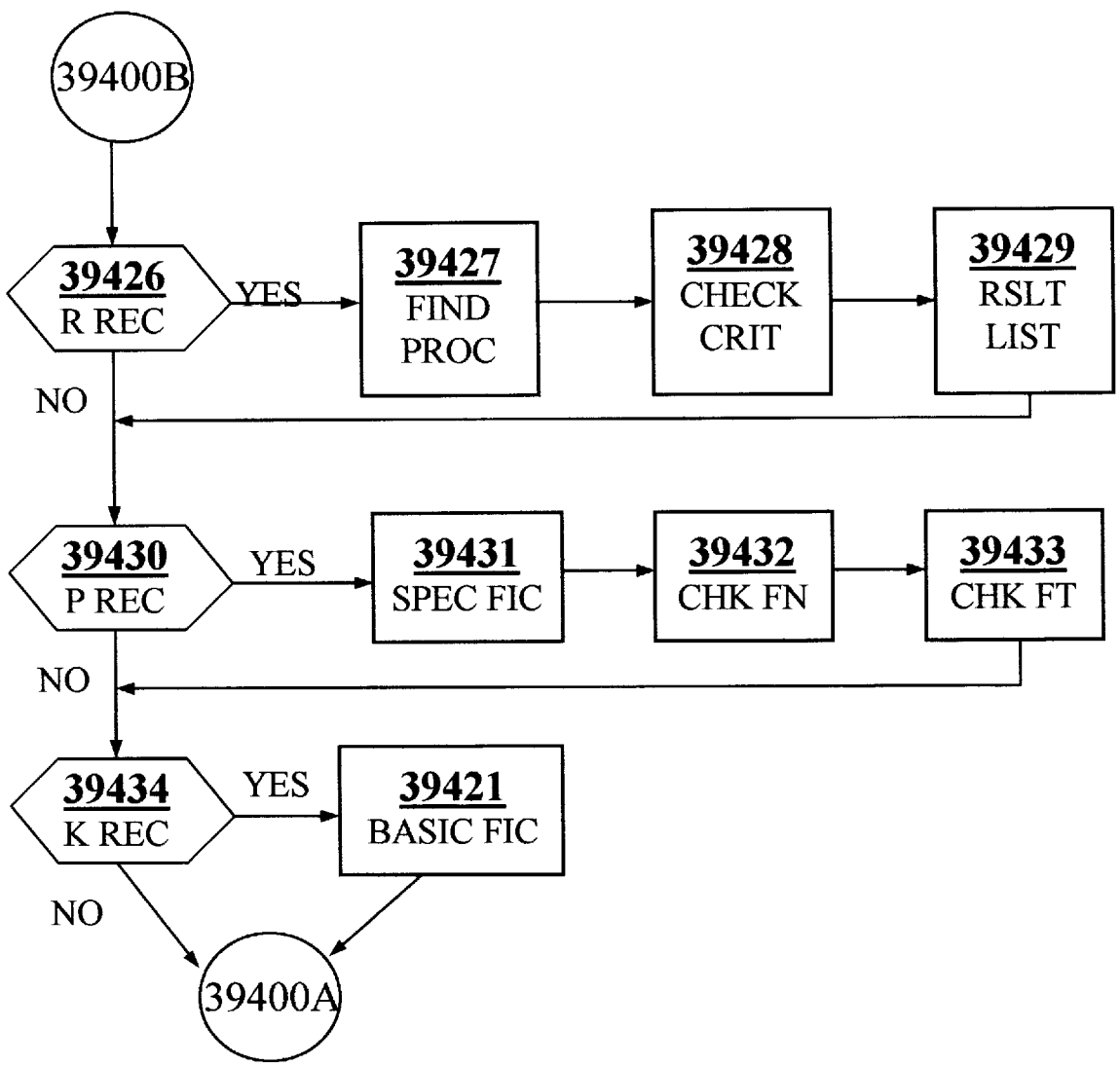
Figure 91A:
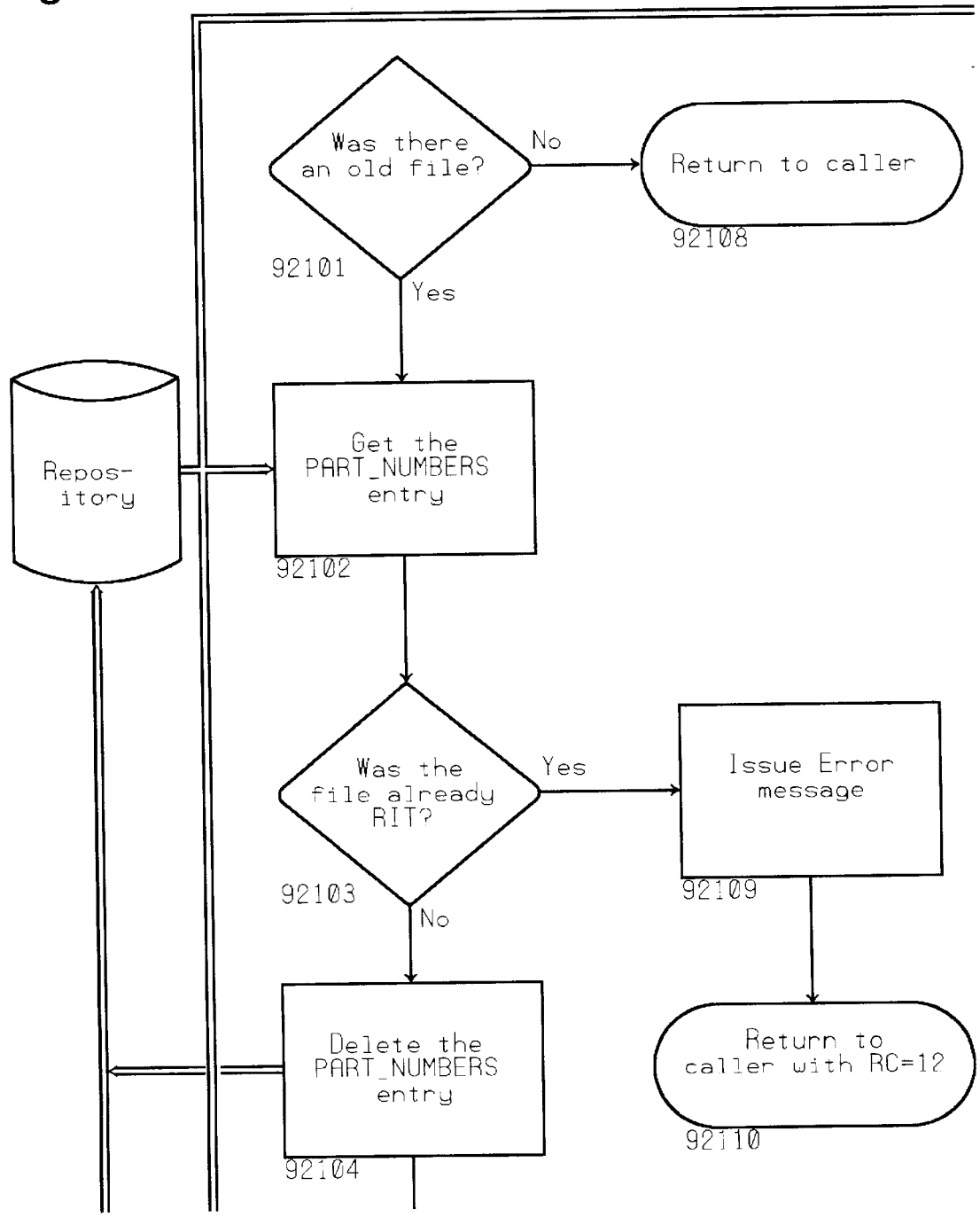
Figure 91B:
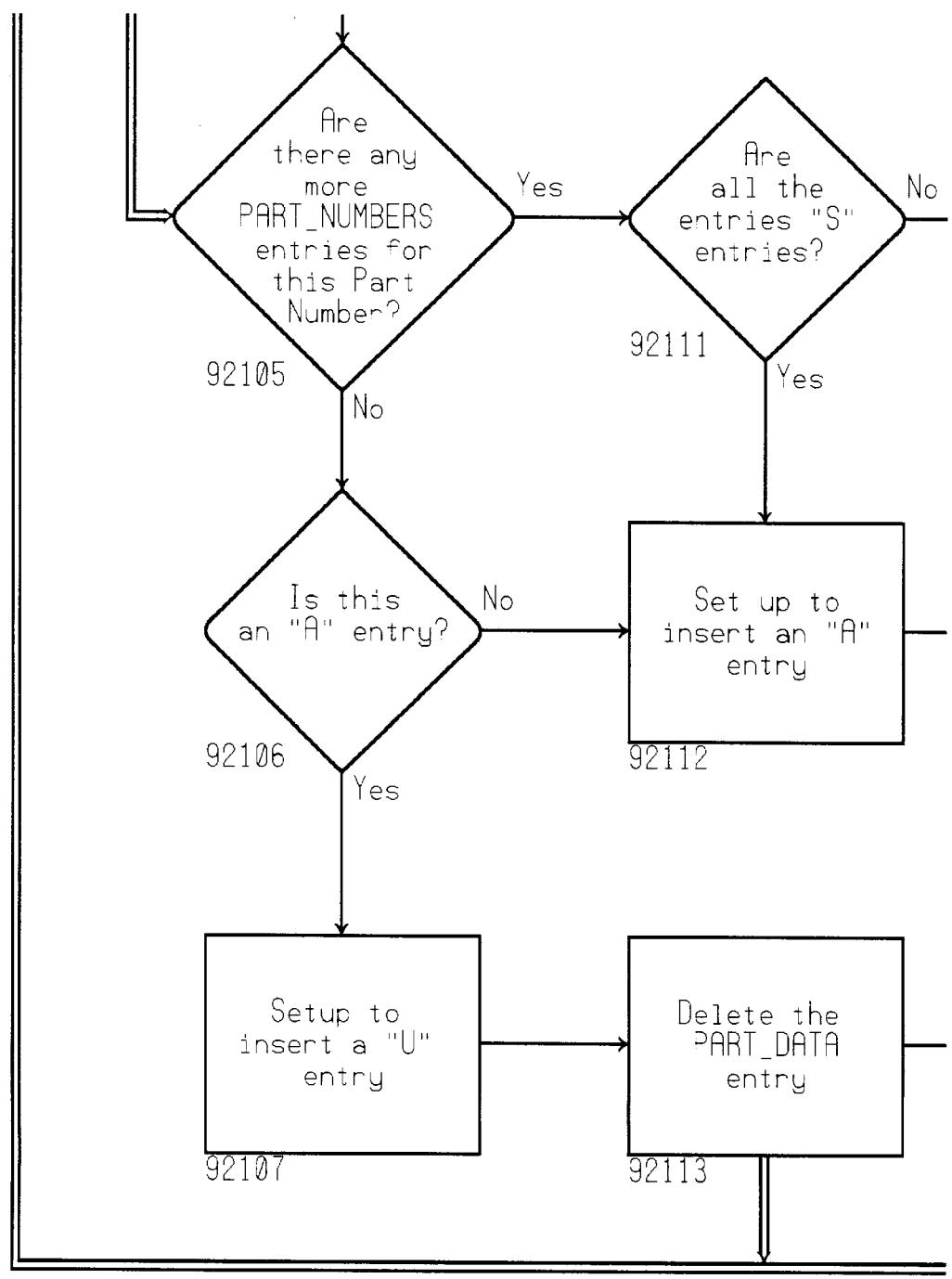
Figure 91C:
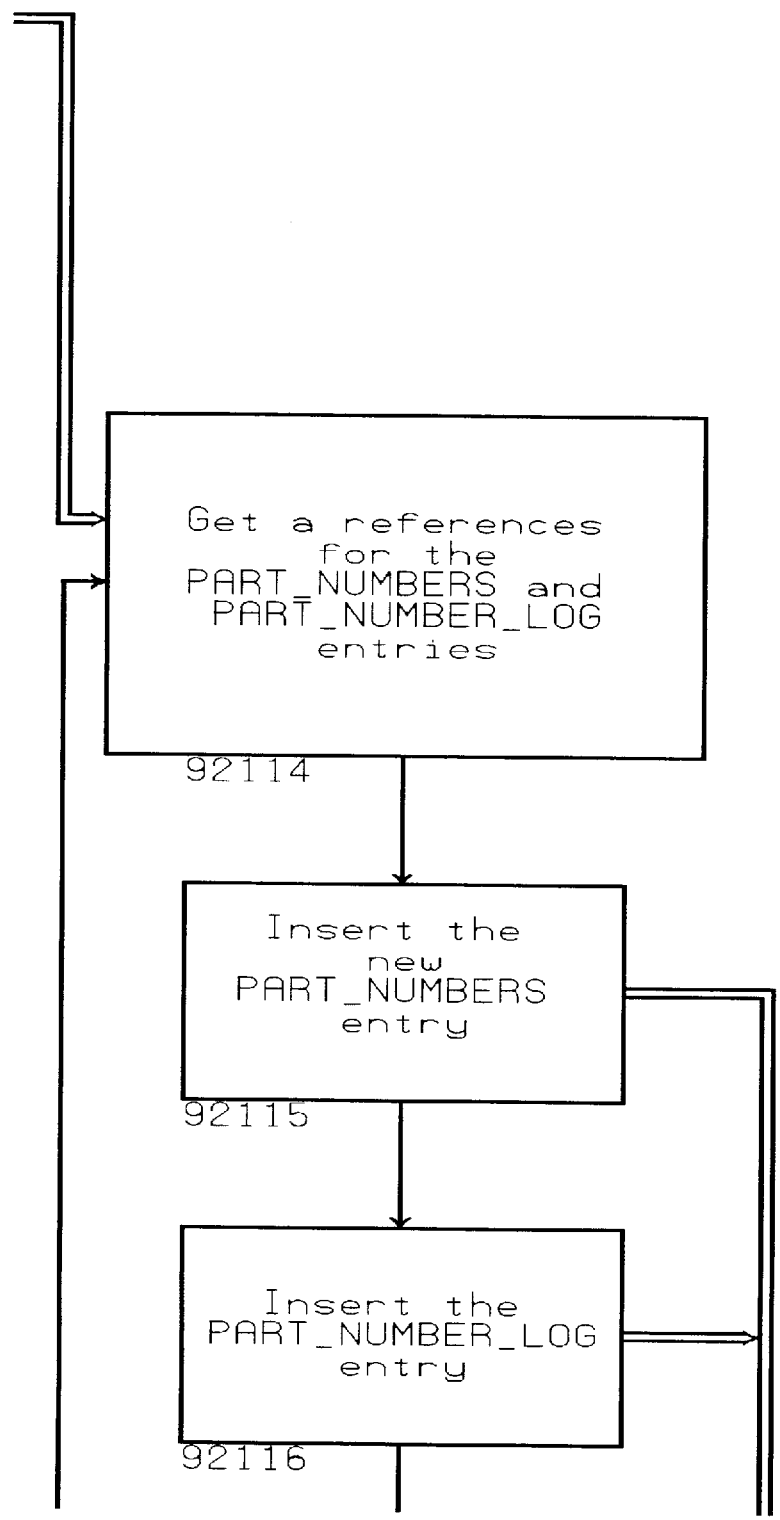
Figure 91D:
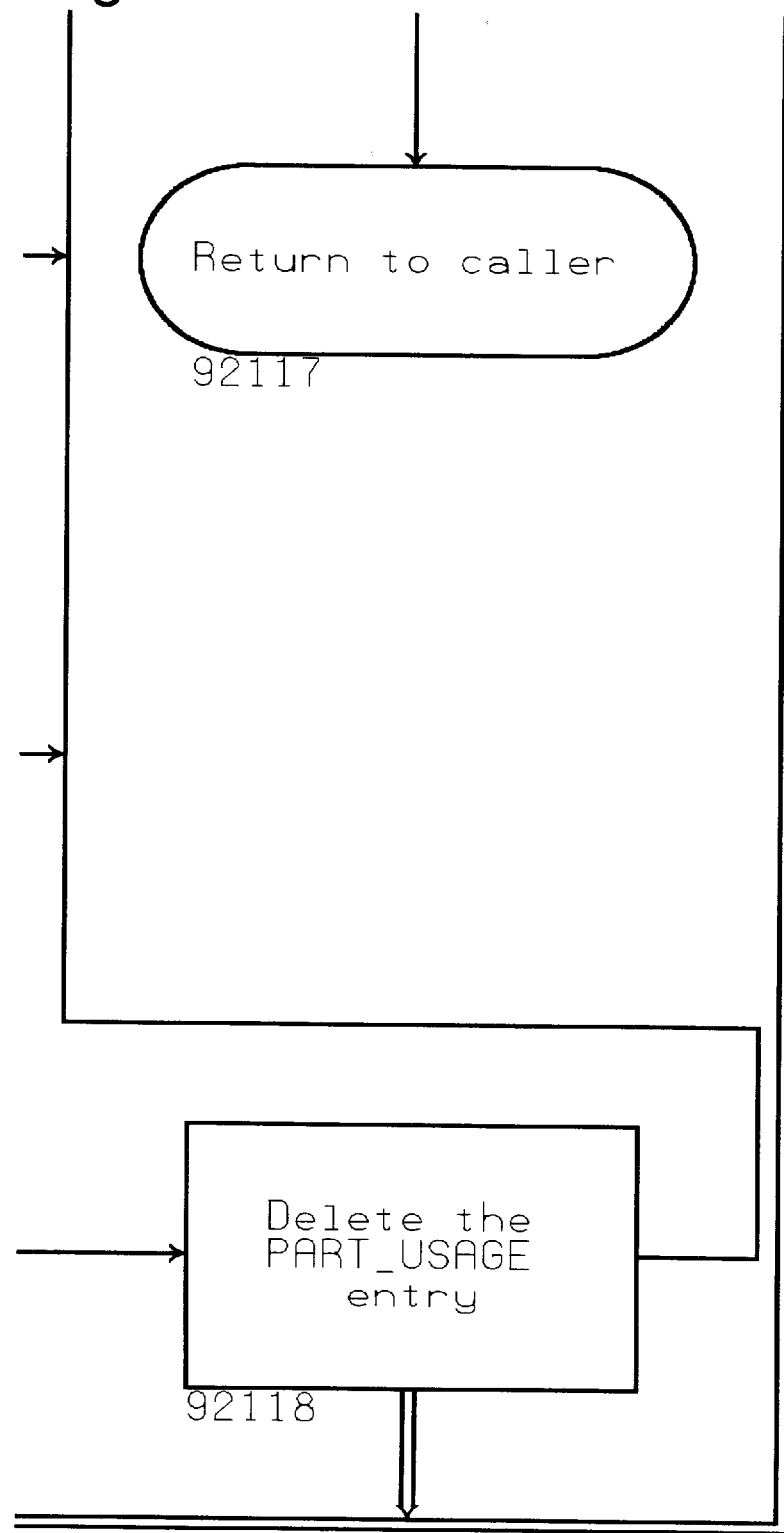

FIG. 90a thru 90c diagrams the algorithm for processing a PED file.

Figure 91:
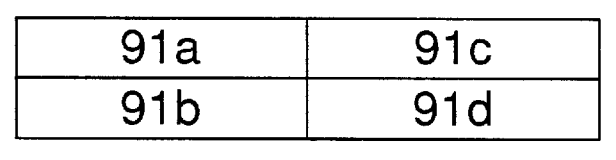

FIG. 91 shows the interconnection of FIG. 91a thru 91d.

FIG. 91a thru 91d illustrates our PNODIS Process.

Figure 92:
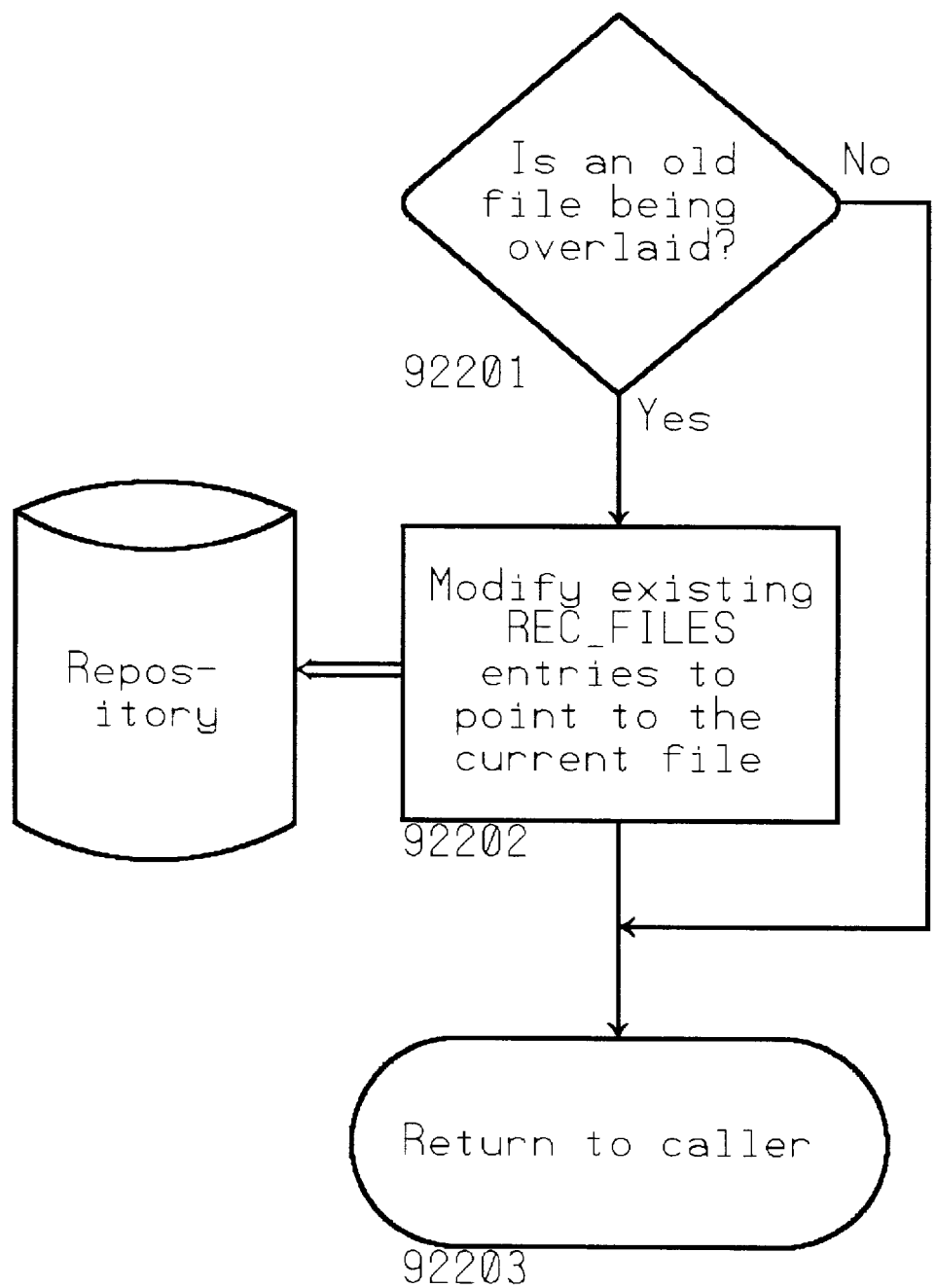

FIG. 92 illustrates our RECMOD1A Process.

Figure 93:
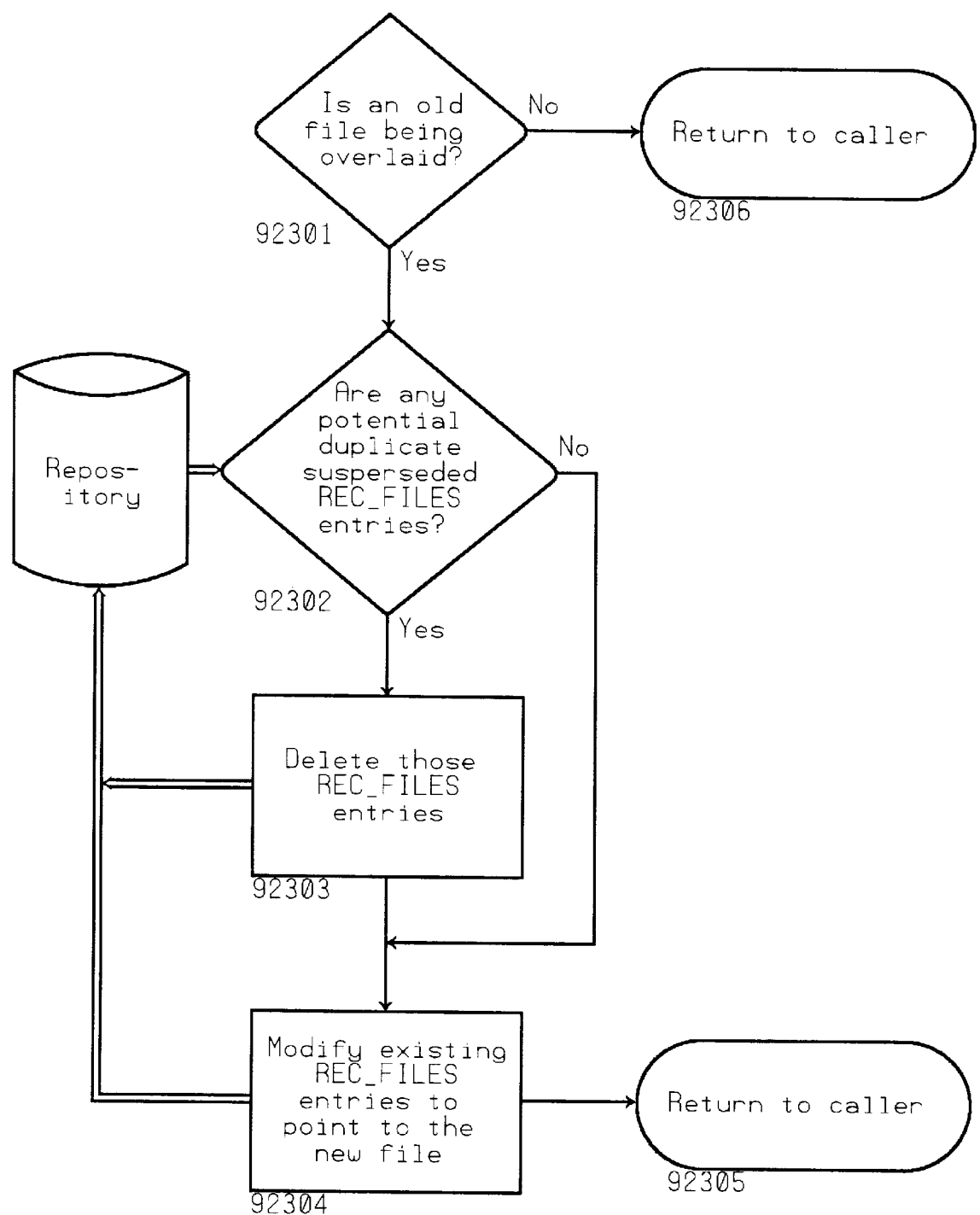

FIG. 93 illustrates our RECMOD1B Process.

Figure 94:
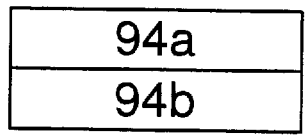
Figure 94A:
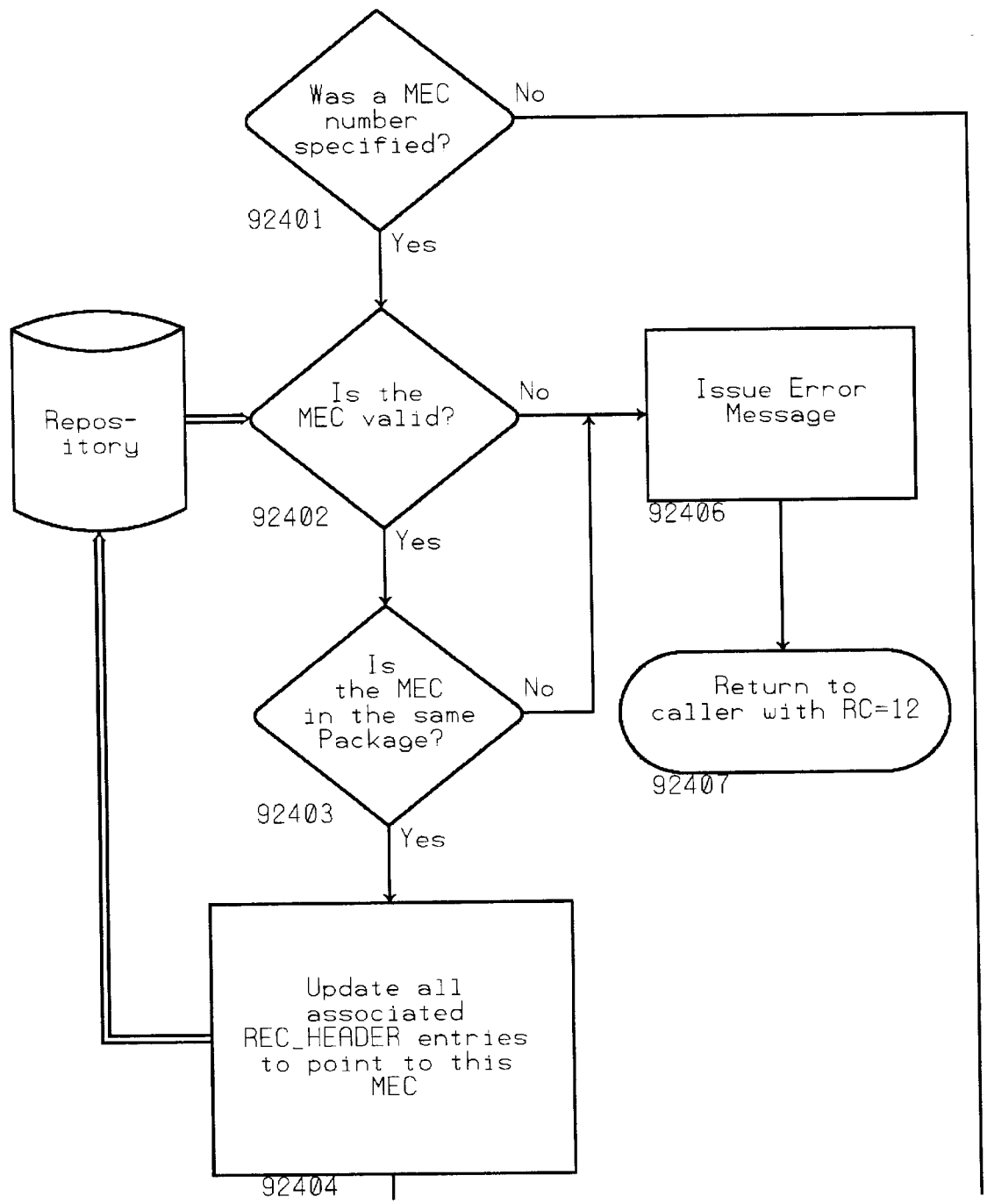
Figure 94B:
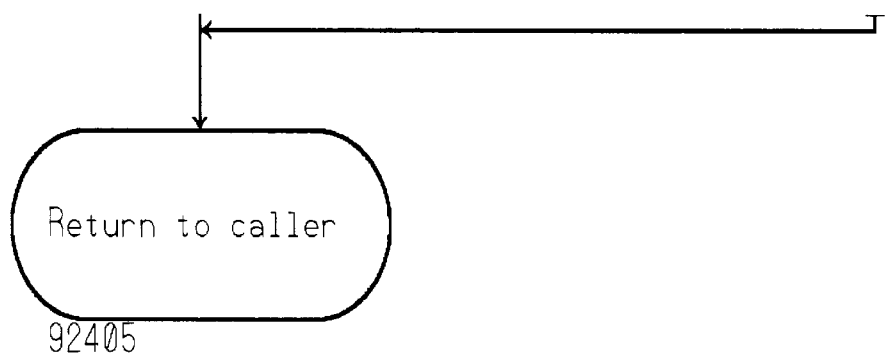
Figure 95A:
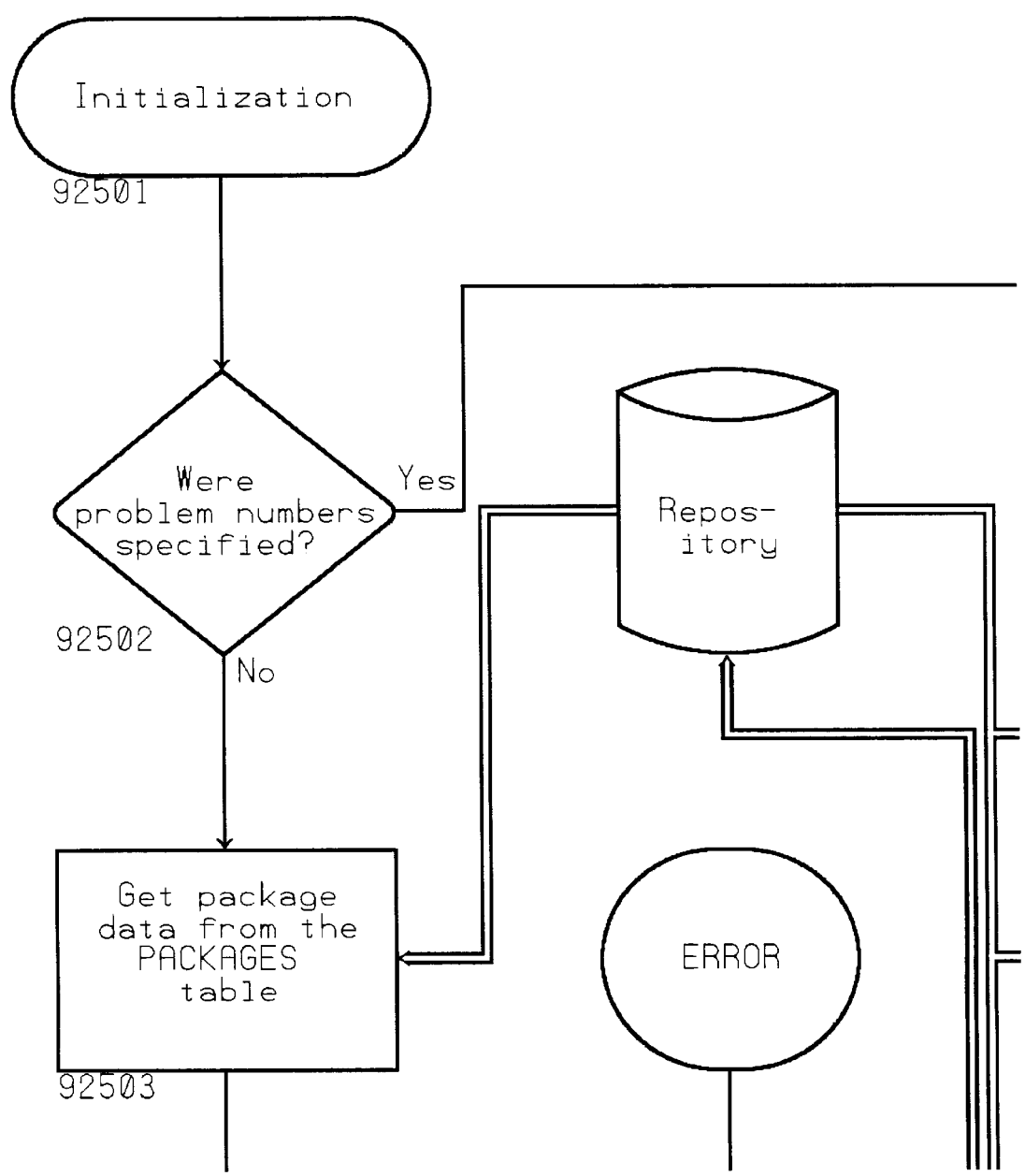
Figure 95B:
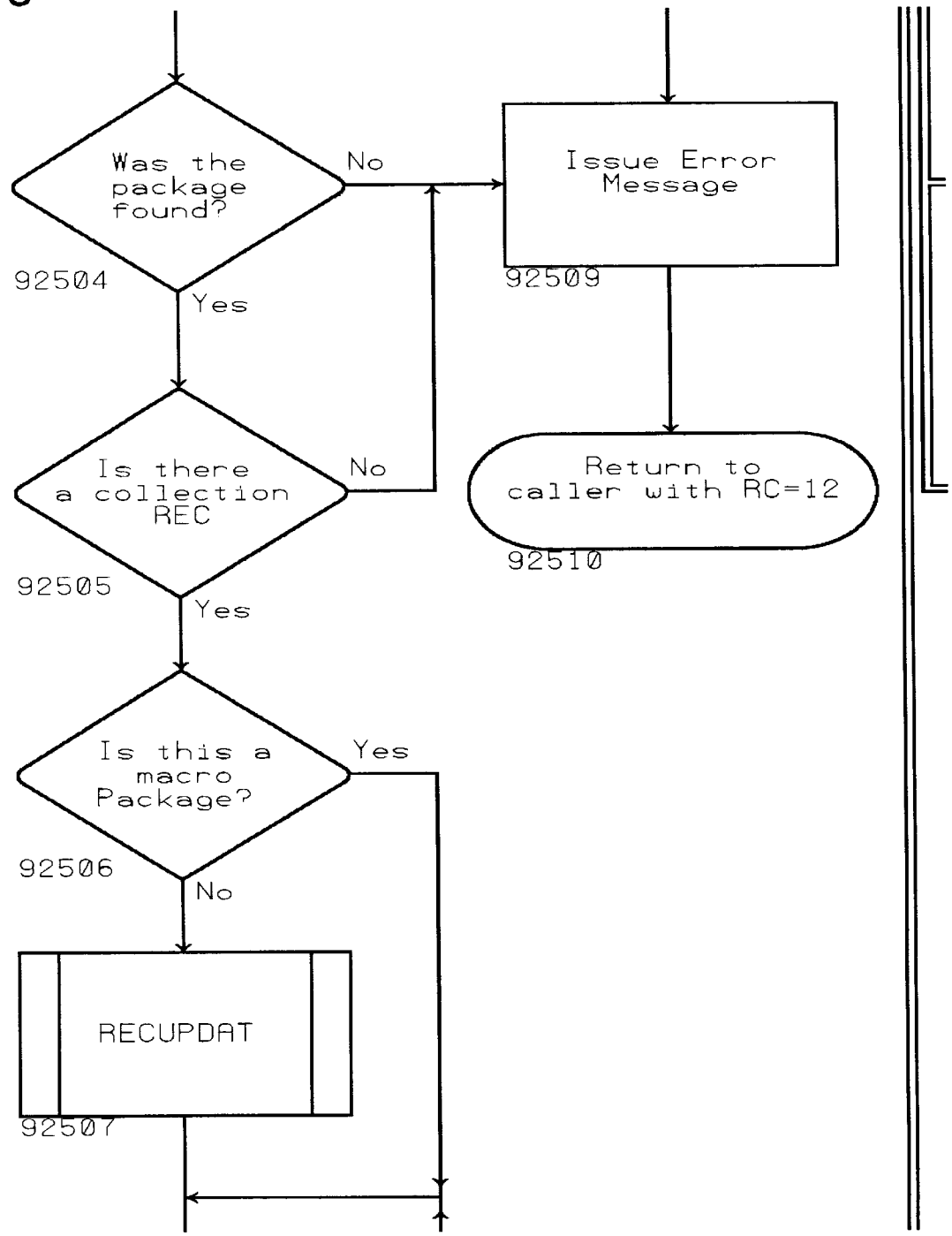
Figure 95C:
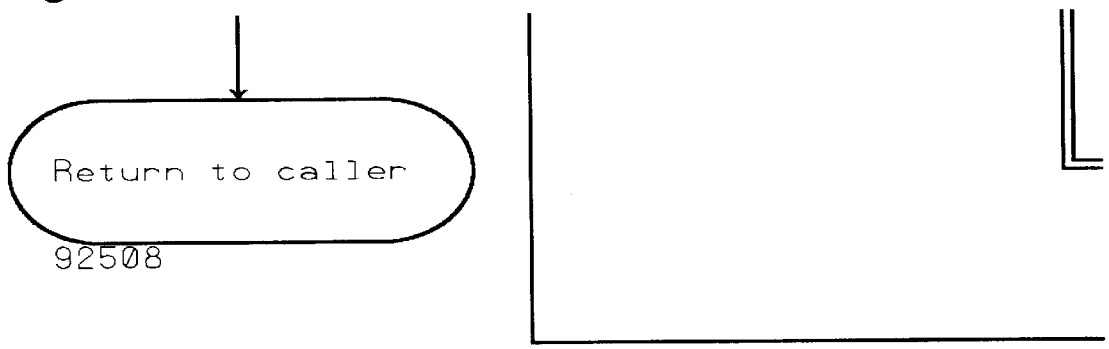
Figure 95D:
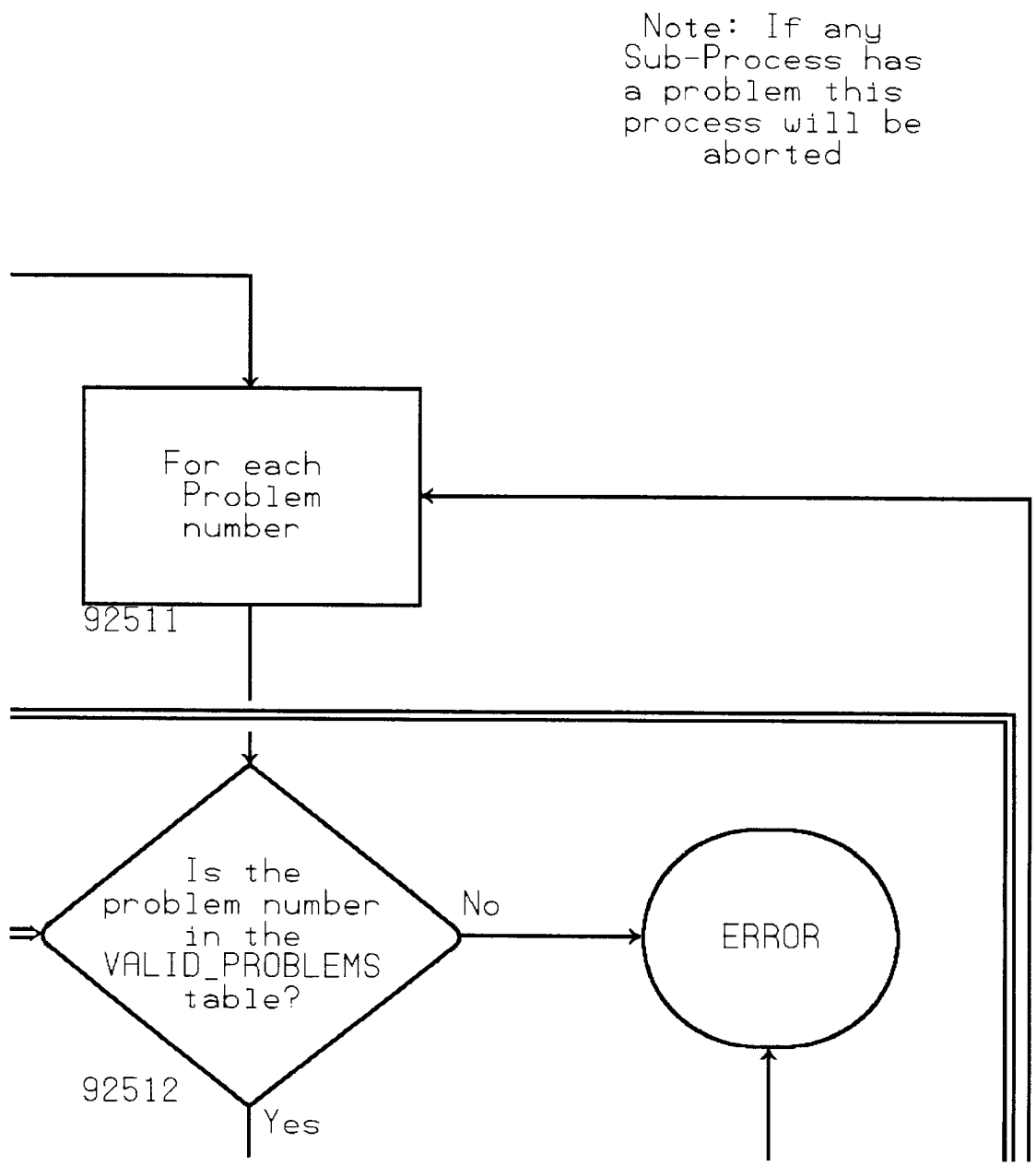
Figure 95E:
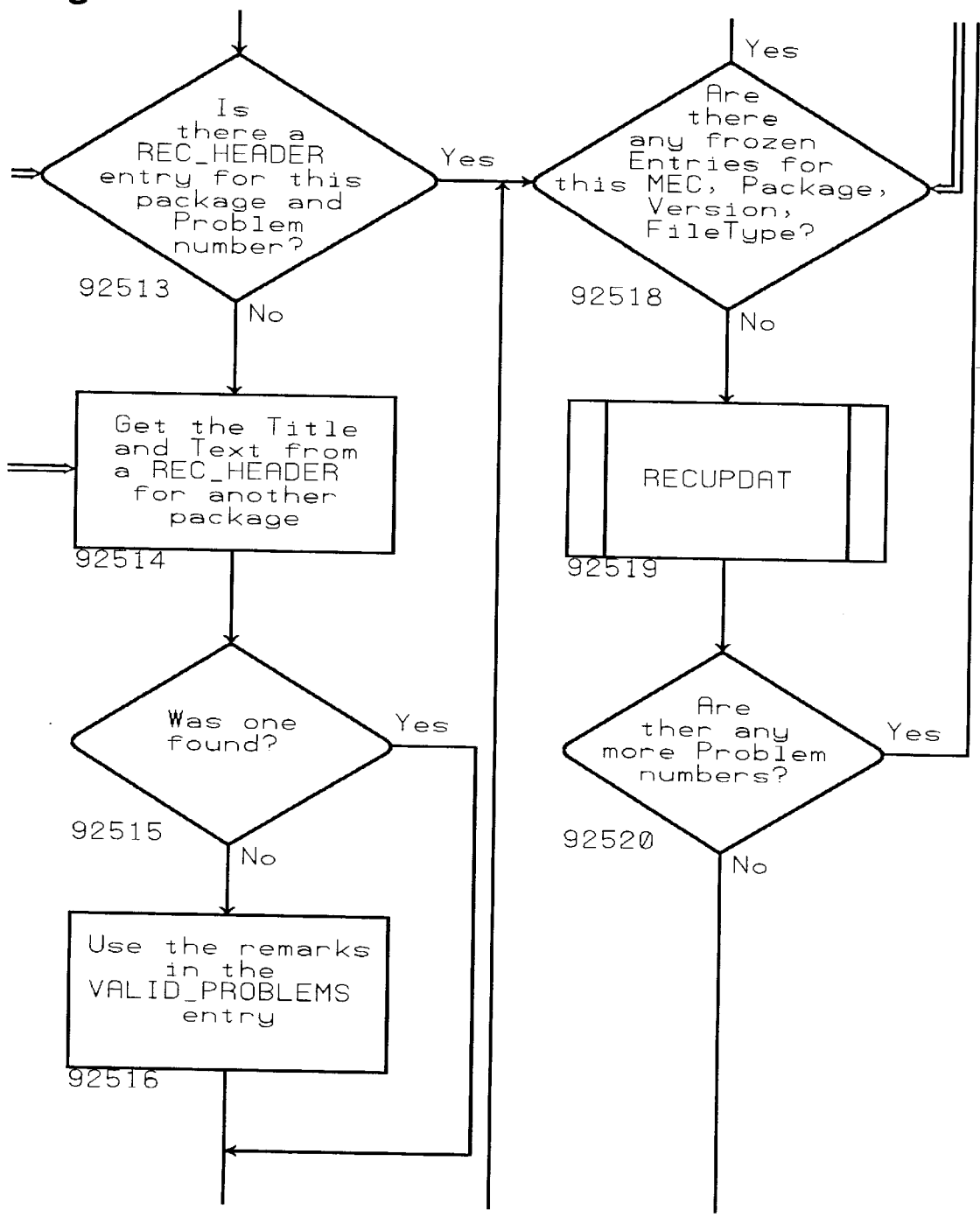
Figure 95F:
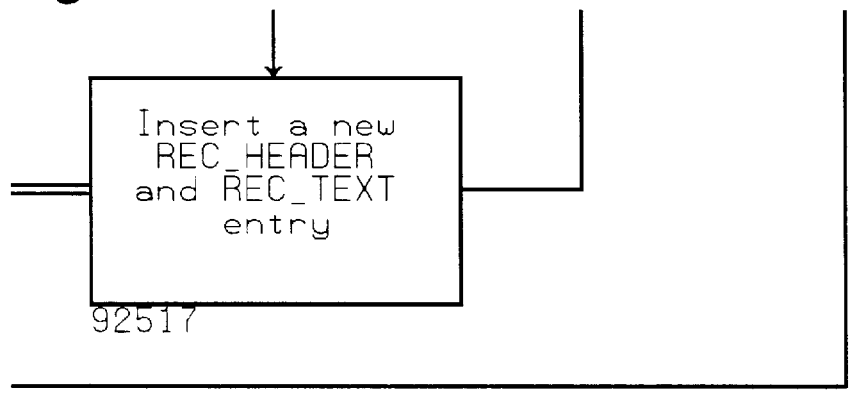

FIG. 94 shows the interconnection of FIG. 94a and 94b.

FIG. 94a and 94b illustrates our RECMOD2 Process.

Figure 95:
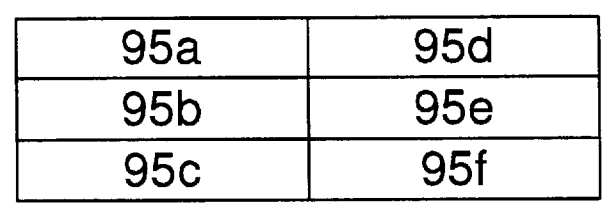

FIG. 95 shows the interconnection of FIG. 95a thru 95f.

FIG. 95a thru 95f illustrates our RECMOD3A Process.

Figure 96:
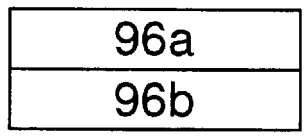
Figure 96A:
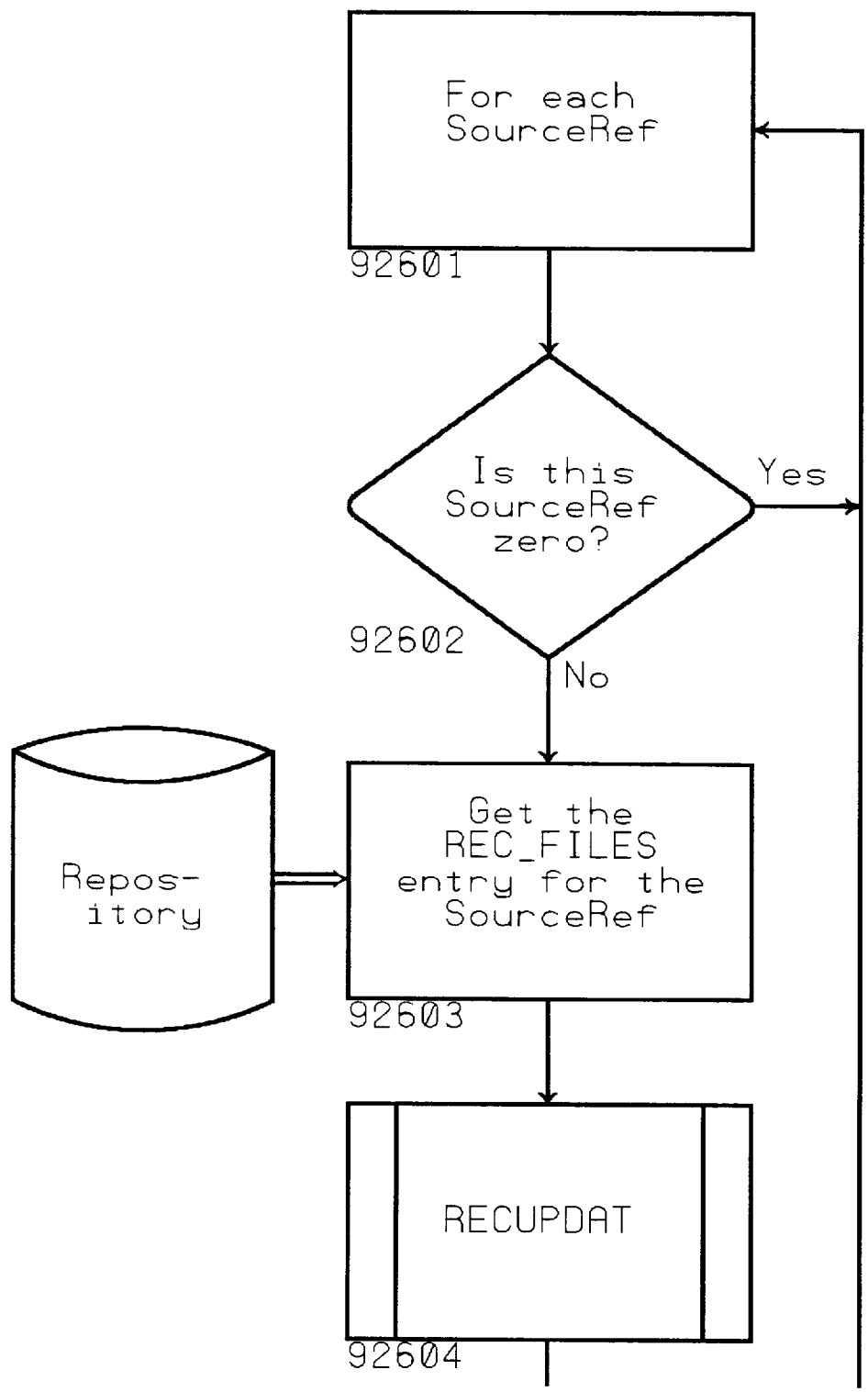
Figure 96B:
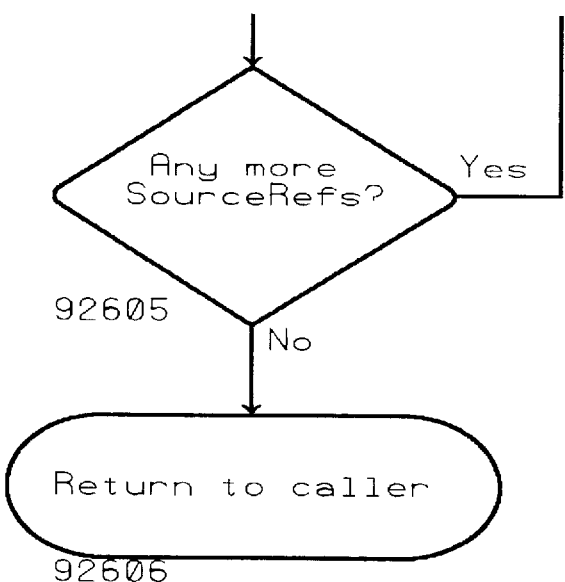
Figure 97A:
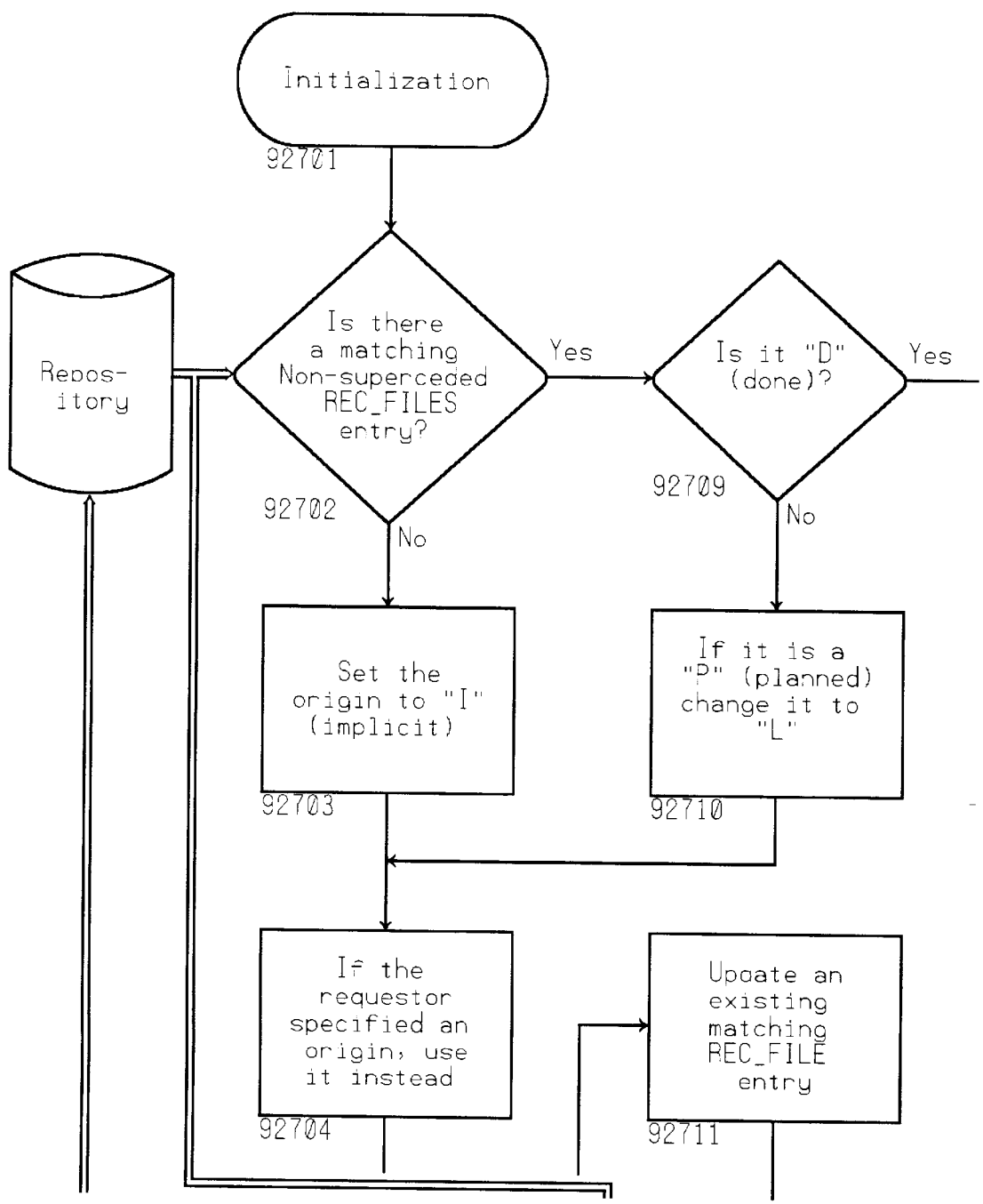
Figure 97B:
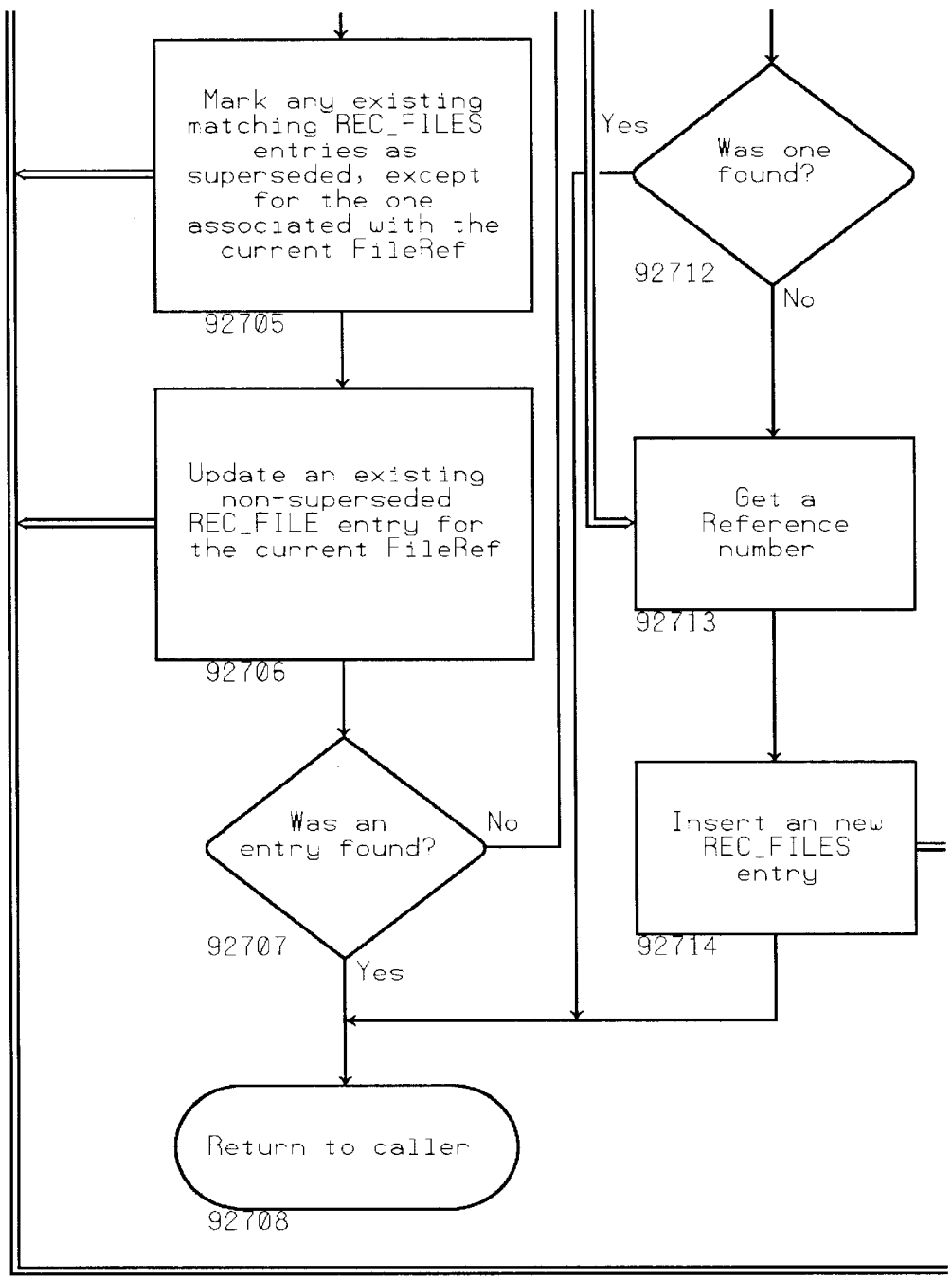
Figure 97C:
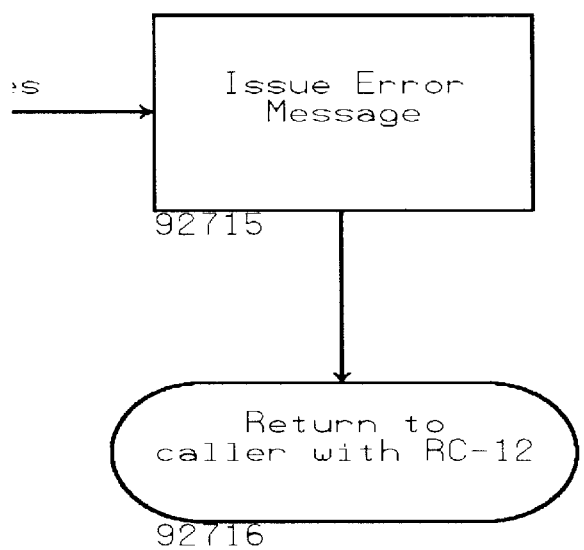
Figure 97D:

FIG. 96 shows the interconnection of FIG. 96a and 96b.

FIG. 96a and 96b illustrates our RECMOD3B Process.

Figure 97:
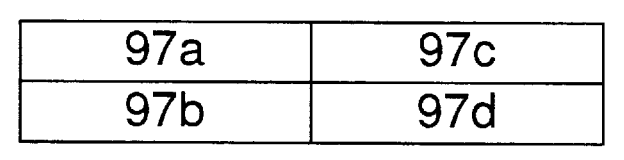

FIG. 97 shows the interconnection of FIG. 97a thru 97d.

FIG. 97a thru 97d illustrates our RECUPDAT Process.

Figure 98:
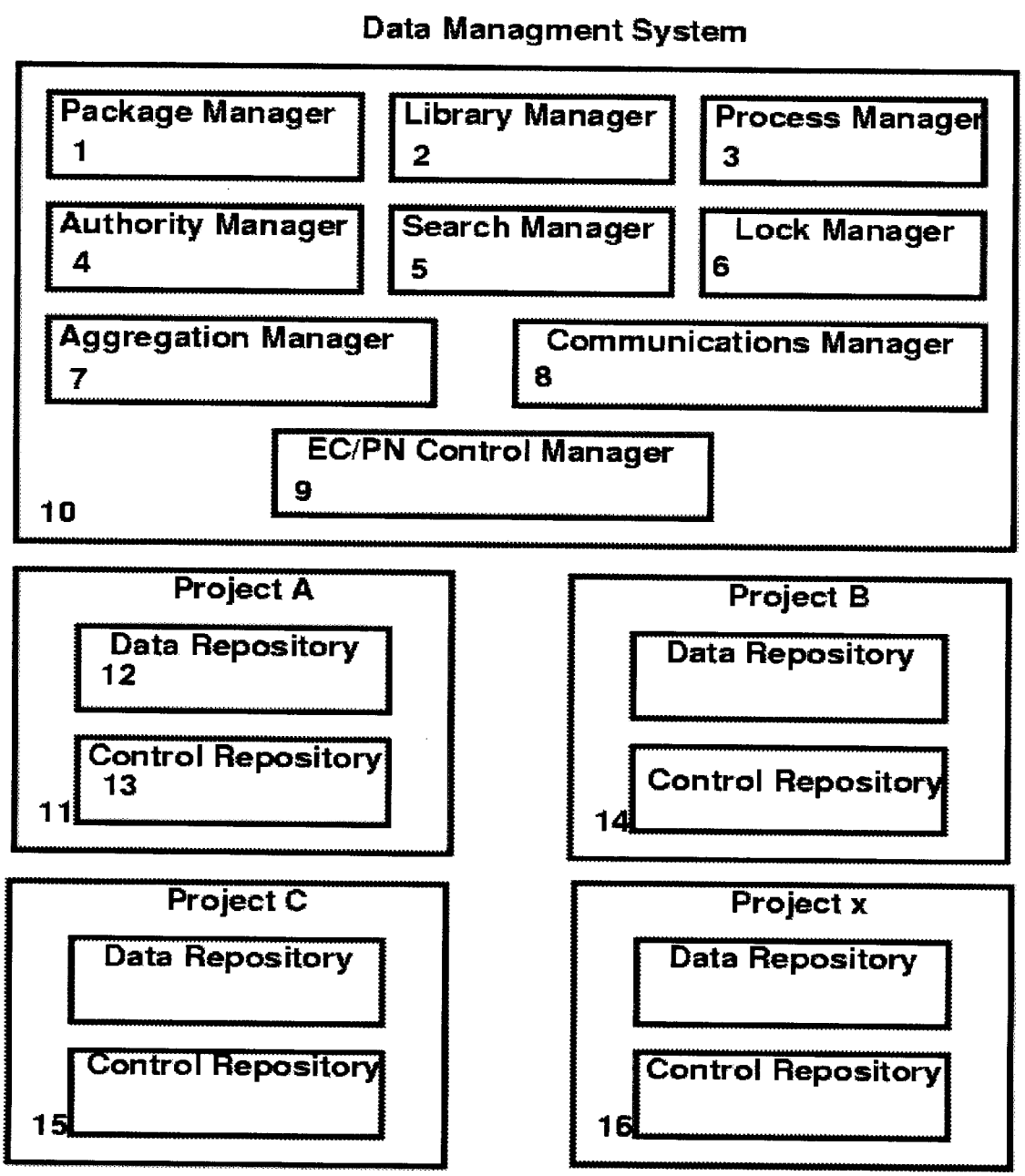

FIG. 98 illustrates the Overall Structure of our Design Control System's Data Management facilities.

Figure 99:
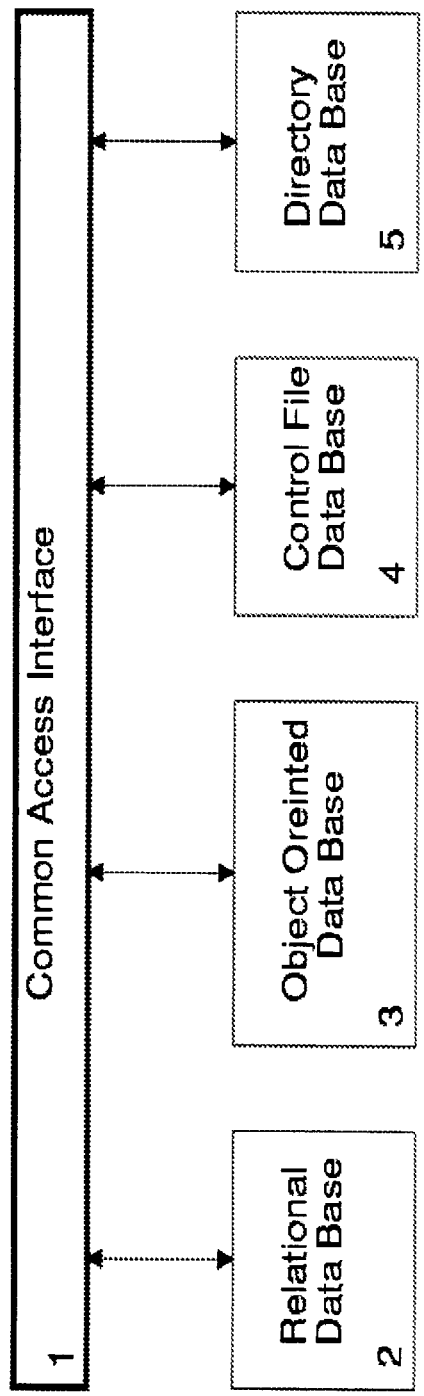

FIG. 99 illustrates the Control Repository.

Figure 100:
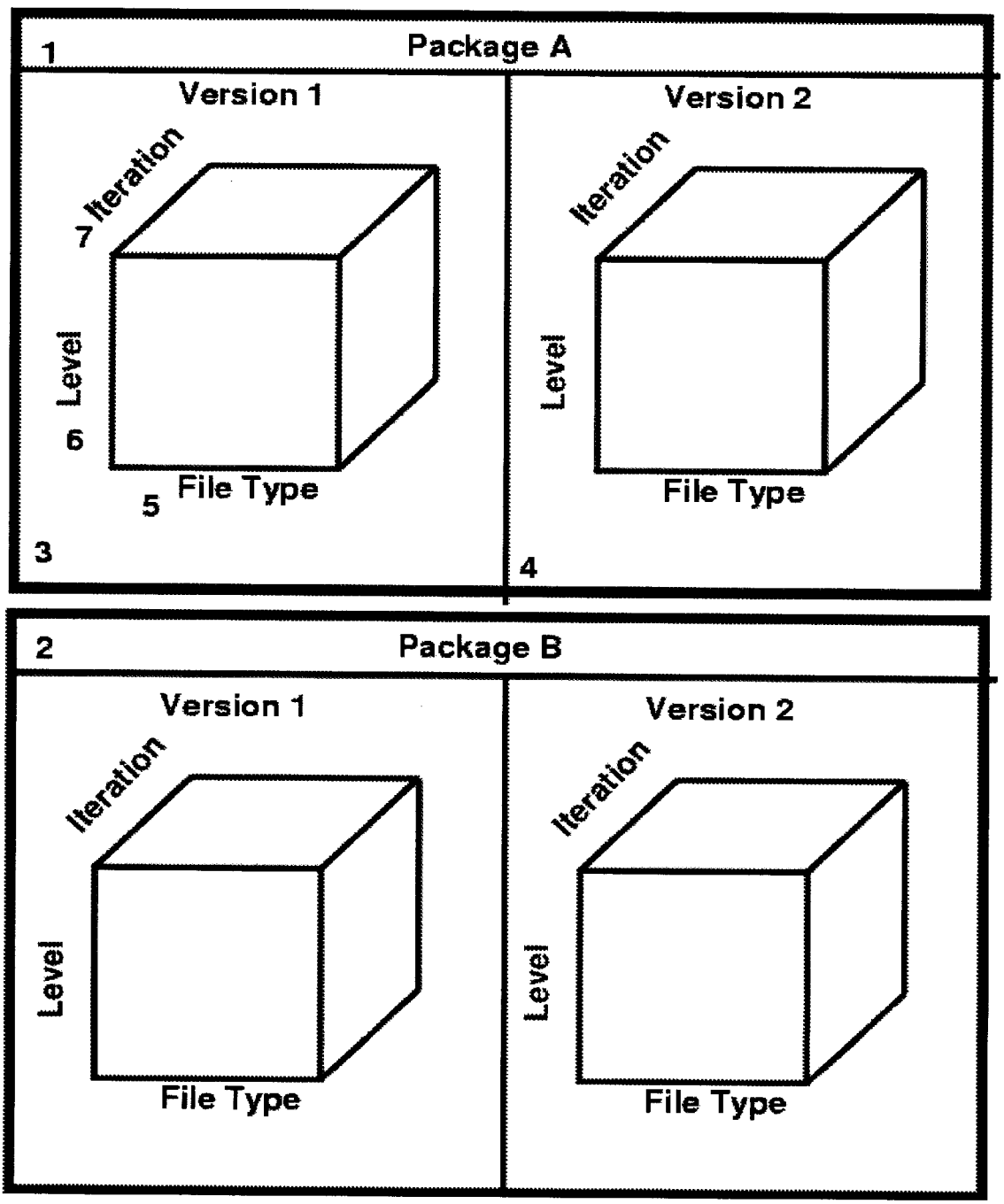

FIG. 100 illustrates the Data Repository.

Figure 101:
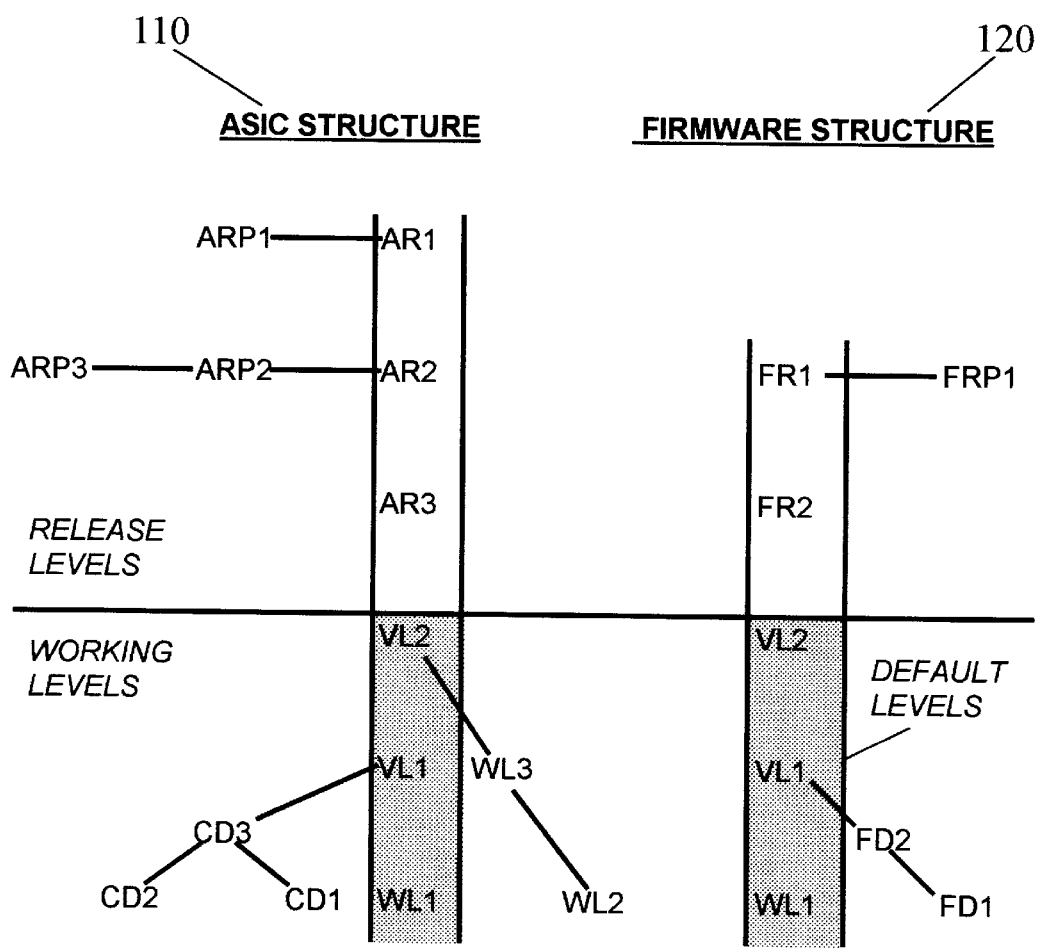

FIG. 101 illustrates the Inverted Tree Library Structure

FIG. 102 illustrates the Library Structure File.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineering project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
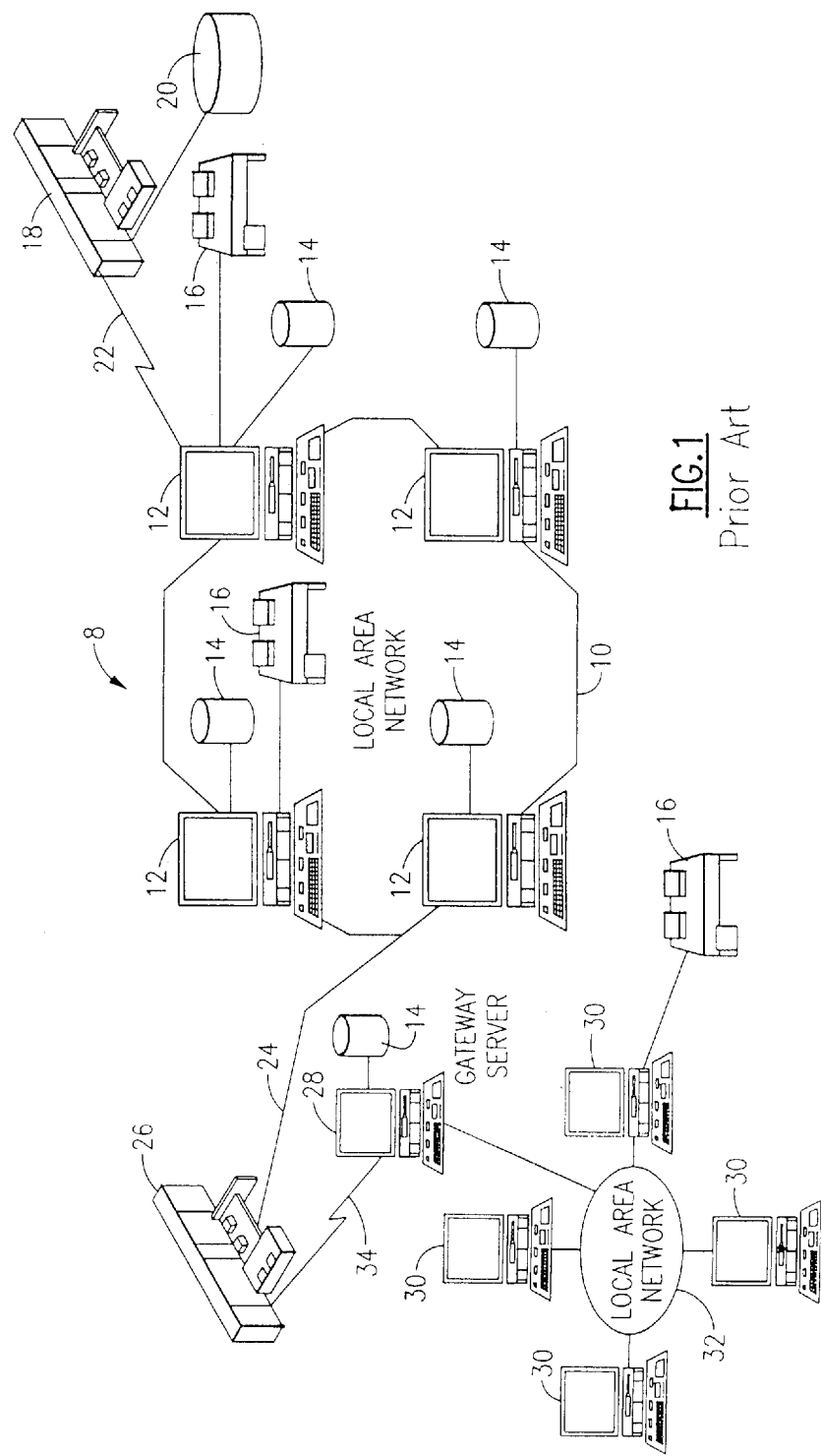
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 26 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S/390 platforms or IBM's RISC System/6000 Scalable POWERparallel Systems (SP) platform for design control information. (AIX, S/390, RS/6000, RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexity of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers when-ever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependant on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form of a database (relational, object oriented, etc.) or using a flat-file system. The actual implementation is usually based on the environment.

As we have said, and as illustrated by the machine to person interface depicted by FIG. 2, our program of instructions executable by a supporting machine environment for performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235, 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the system by importing a file listing providing the data of screen sections, by searching of a library of files in said data management system and importing a located file containing the data of screen sections, or by use of an application program interface with a collection of model management utilities, all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as are bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created or otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DCS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc. Instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell (design component). This segregation is a fundamental building block to Design Control Systems since certain types of data require more design control than other types. Our DCS allows each individual type to be controlled on a level and version basis within a library. The DCS is capable of tracking any data type from any point tool, even third party vendors.

Levels (Section 1.4)

Each Public Library consists of n levels which are established by the Data Manager. The naming of the levels (239) are arbitrary, but each denotes a degree of quality of the design. Data moves into and out of levels via a "promotion" mechanism. There are two types of levels in the DCS, Engineering (or working) and Release Levels.

Figure 3:
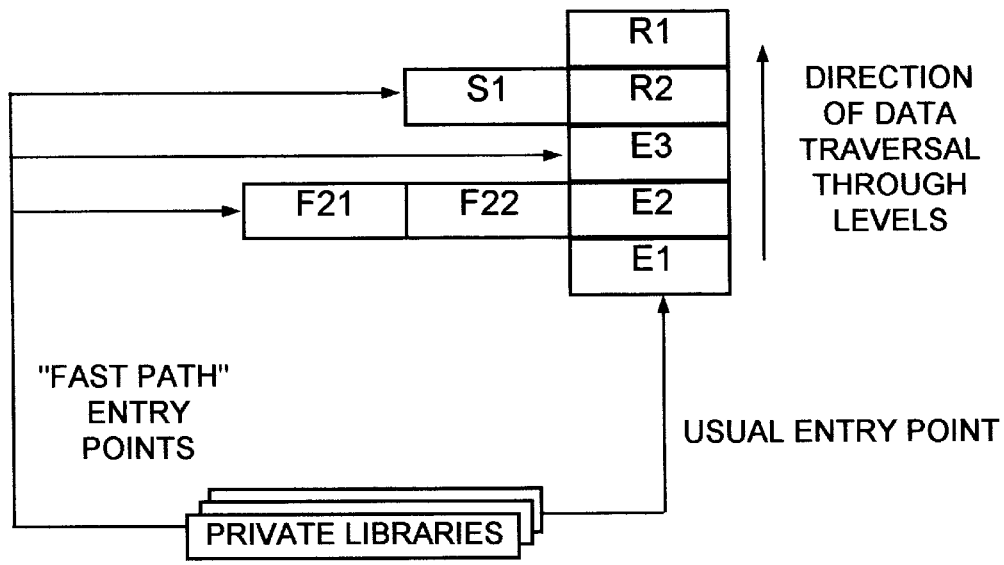
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3. E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any pre-processes defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manager creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to reconfigure the Engineering Levels at any time based on these rules:

The connections between levels can be changed at any time. (i.e. E1 →E2 →E3 can be changed to E1 →E3 →E2.)

A level can be removed as long as no data reside in that level.

A level can be added at any time.

The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:

The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.

If the level to which the data is being promoted to has any entry criteria, it is checked to ensure the data passes the criteria.

Versions (Section 1.5)

Figure 4:
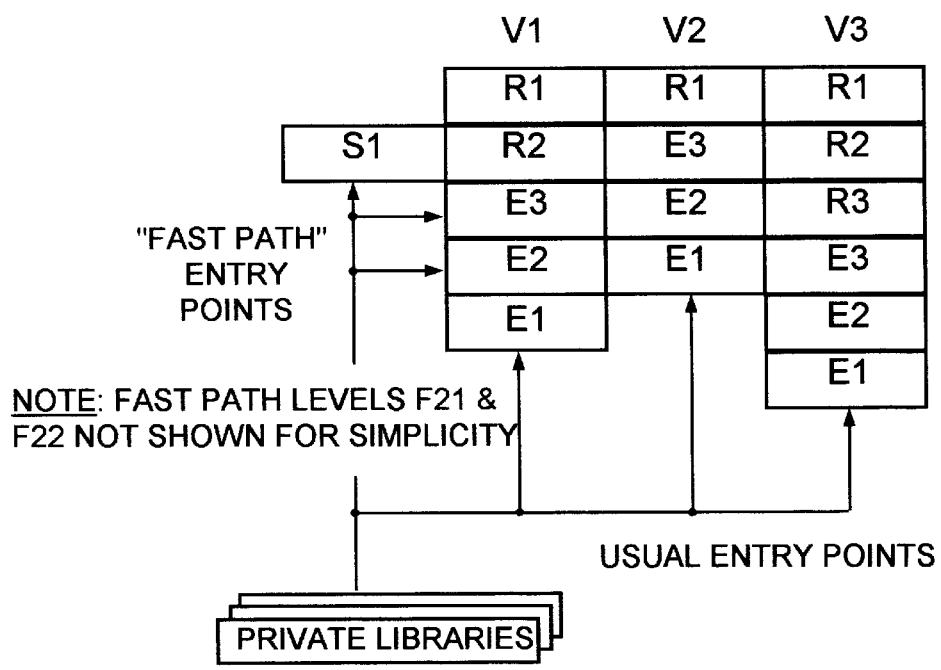
FIG. 4 illustrates our preferred Design Control System Level Structure with Versions.

Each public library consists of n versions which are defined by the Data Manager. The concept of versions exist to support parallel design efforts. All versions have the same Engineering (Working) Levels, but have different Release Levels depending on the frequency of tape-outs for that version. Data in separate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent. Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5B:
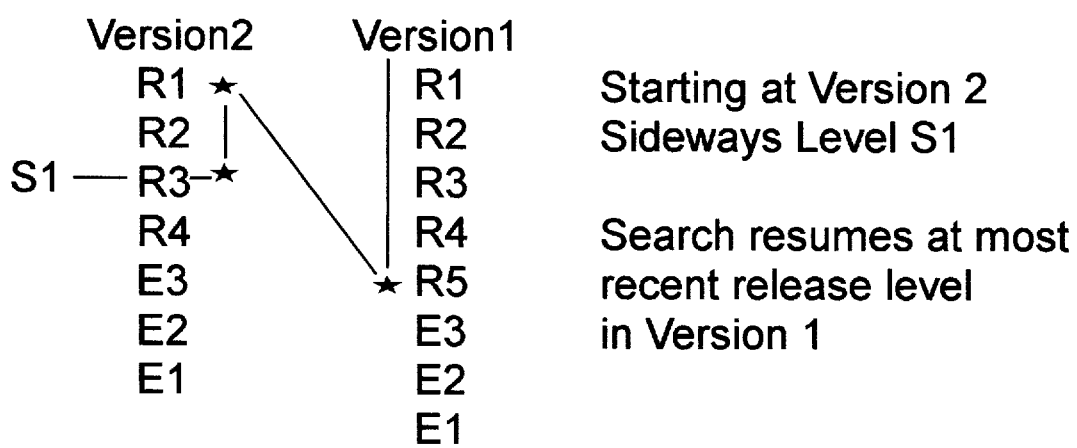
FIG. 5 (illustrated in parts FIG. 5a and 5b) illustrates our preferred Design Control System Library Search Examples.

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc
   This allows the utility to use a temporary cached copy of the search order information for performance reasons. Since this information may be obsolete, the absence of the option results in the actual Design Control Repository being accessed and the search performed from within it.

File
   Write the results into an external file.

Various Sorts
   They control the way the output is sorted and displayed.

Nosearch
   Only list data found at the starting level.

First/All
   Indicates whether to include all existences of a particular design component or only the first one in the search order.

Select
   Presents a selection list of all candidates so the user can choose those of interest.

Noversion
   Prevents the search from tracing back across version boundaries.

Levels
   Displays the search order based on the existing level structure.

Versions
   Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components
Type of Design Components
Level of Design Components
Version of Design Components Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock, Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

Figure 6:
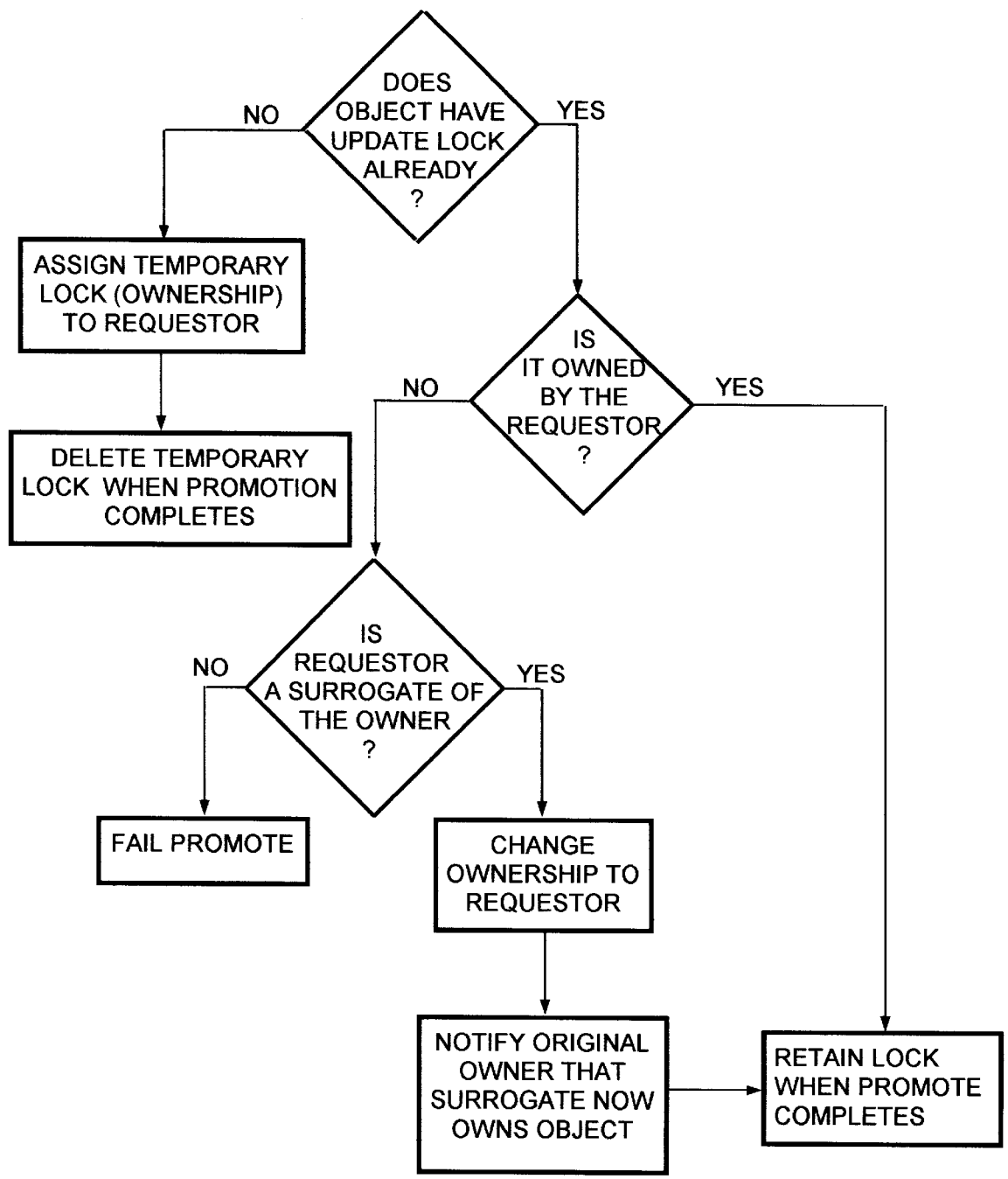
FIG. 6 illustrates our preferred Mechanism for Update Locks.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership. FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source.

The following features exist in the BOM Tracker:

It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist for the members of the grouping.

BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The user can manually create BOMs by selecting pieces of design interactively, filling in search criteria and initiating a library search, or importing a simple text list. In addition, an API exists for point tools to create a BOM listing and pass it into the DCS.

The power of the BOM Tracker is augmented with our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.

Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.

The BOM Tracker also supports the concept of a "support" object. This can be a design component, a piece of information, documentation, etc., that can be associated and promoted with a BOM but never causes BOM invalidation.

BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMs. It recursively checks all BOMs it encounters until it's at the top of the hierarchy. All BOMs found will be invalidated (if they are currently valid) and the owners notified.

BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually reset locks.

The DCS supports the concept of a BOM promote, which means the user can request that all the contents of the BOM be promoted simultaneously. This increases data integrity by helping to ensure a matching set of design data traverse through the library in sync.

BOMs can contain members who reside at different levels, different versions and even different libraries. The DCS will only promote those members which exist in the current library, and reside in an Engineering Level below the target level. If a member exists in a different version and is also below the target level, it will also be promoted.

There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
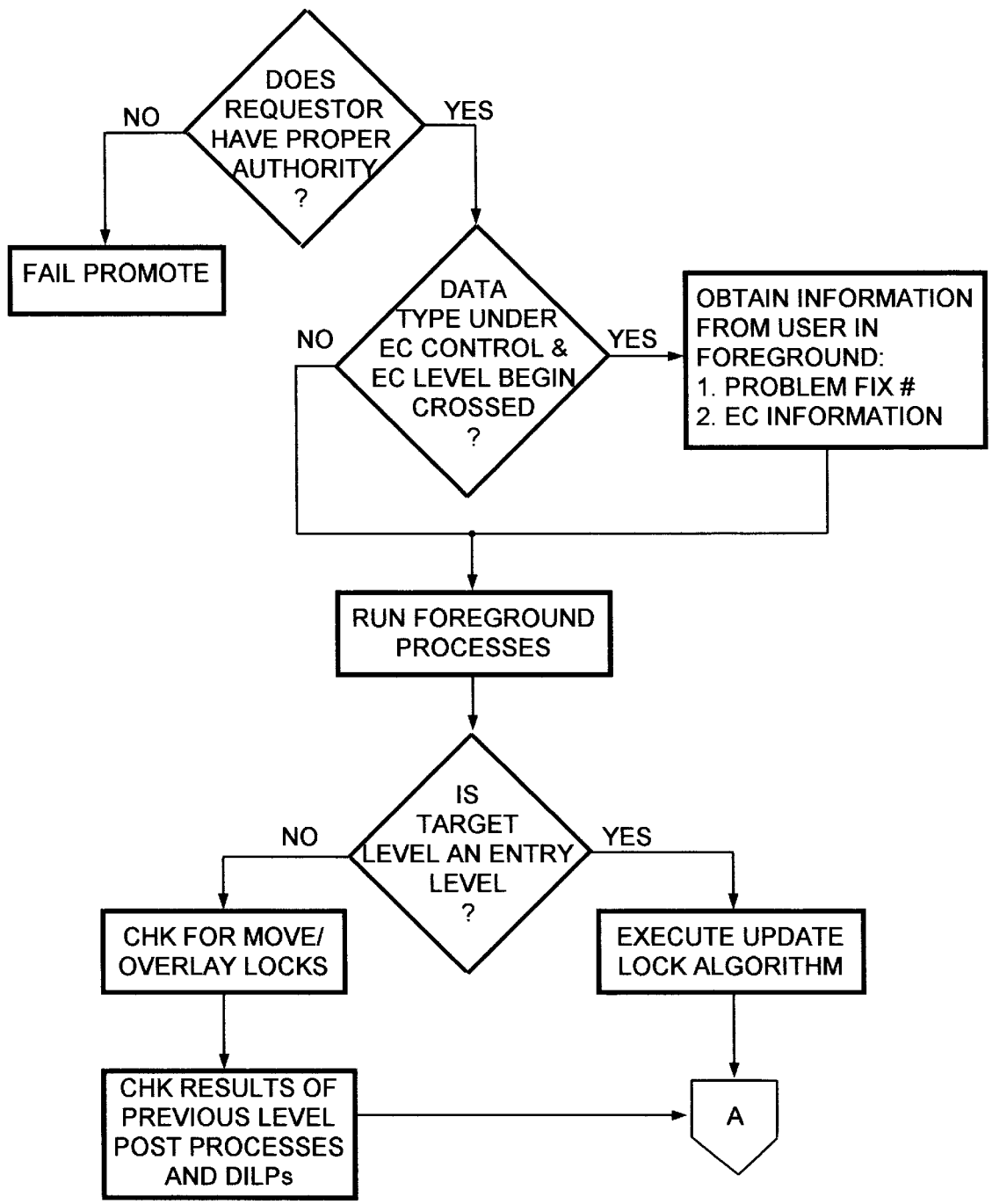
FIG. 7 (illustrated in parts FIG. 7a and 7b) illustrates our preferred Promotion Mechanism.
Figure 7B:
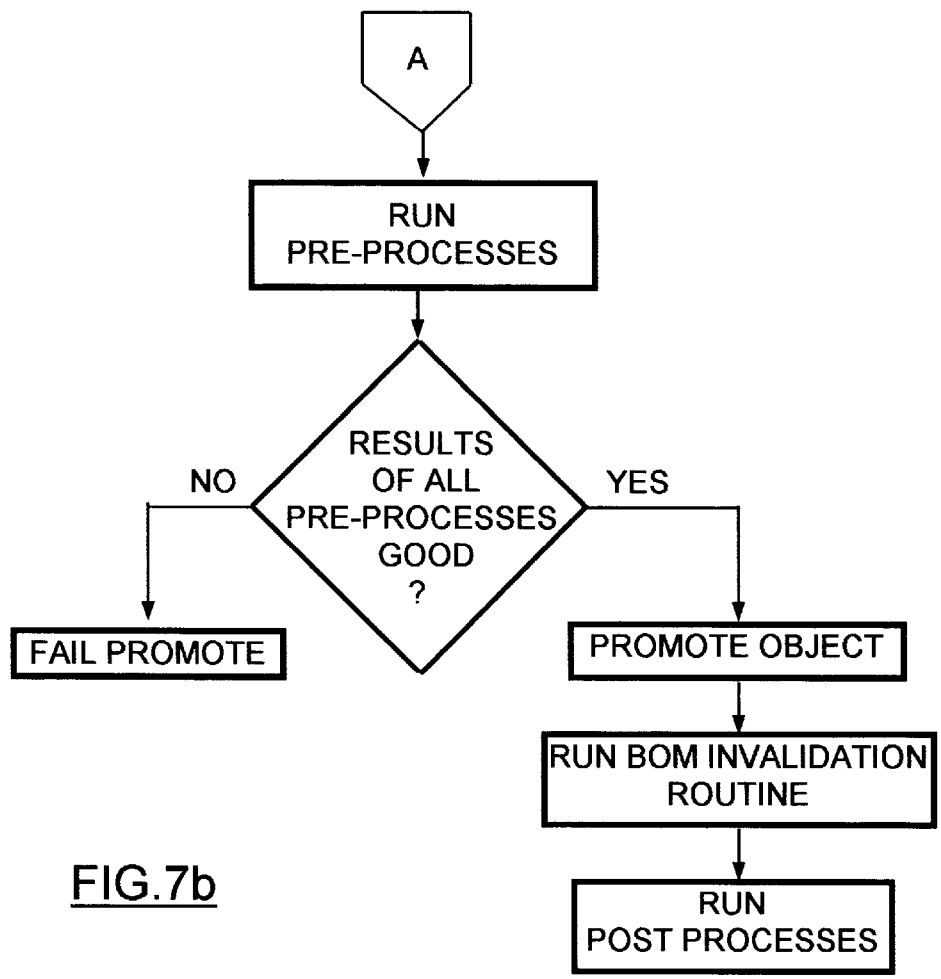

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results for each design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions:

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependant on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the user to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled Processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing:
> This is the conduit by which the user enters any information required to run the tool. Menus may be presented or the user may interact in some other way.

Pre-Processing:
> This refers to a library controlled process that is launched prior to the data being promoted to the target level. The process must finish and complete successfully, based on the promotion criteria of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing:
> This refers to a library controlled process that is launched after the data arrives at the target level. The results of the process are used as promotion criteria to the next level.

Designer Initiated Library Processes (DILP):
> This is very similar to a post process, but instead of the DCS launching the process, it's manually launched by the designer.
> DILPs usually exist to retry Post-Processes which failed. This eliminates the need for the user to re-promote the data just to initiate the processing. If a DILP is used to recover a failing Post-Process, and the DILP is successful, the good result will overwrite the bad result from the Post-Process. Just because DILPs are primarily used to recover failing Post-Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes:
> These are special types of process which are more like process results than actual processes. They exist as a means to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of data. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of process can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this, the DCS provides an Application Program Interface (API) through which third party tools can communicate. When the task completes, the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer Initiated Library Process in that the user launches a task against some design component(s). However, unlike DILPs which require that the design components be under the control of a Public Library, this type of processing is done on data in Private Libraries and designer's work spaces.

External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as the process may match that at a later level. The concept of External Data Processing exists to increase productivity by allowing the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing. The role of the utility is to create the Pedigree information which contains a listing of the input and output data, the results, and some type of data identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree
2. Check the data identification code of the Pedigree itself.

These 2 steps are designed to ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

In one mode the Data Manager is offered a screen in which he can fill in the design component name, type, level, version, user ids, and the type of authority. For any field, except for the user ids, he can default it to "ALL".

In the other mode an authority profile can be called up and executed. An authority profile allows the Data Manager to pre-define the types of authorities for a given type of job. For example, profiles may exist for Designer, Technical Leader, Model Builder, etc. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks:
Setting Locks (Move, Overlay, Update, ALL)
Promoting design components and/or BOMs into levels (Engineering Levels, Release Level.
Creating BOMs
Initiating Library Processes
Setting Pseudo Process Results Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc. may be used to further enhance usability. Utilities exist to:

Define the library properties

The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections).

This is the means by which the Data Manager adds and deletes levels and versions. It also enables him to defined the interconnections of the levels, and the dependence of versions on other versions. A minimum interface consists of one screen for level structure and one for version structure. The level structure screen displays the current structure.

Define the types of data which will be under library control.

For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes

For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.

The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities.

See the previous Section 1.12 for details.

Define automatic data groupings (Subset of BOM Tracking)

This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without some of the optional members, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can be done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select an existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number. The status is immediately reflected as "working". Once the promotion is initiated the status will switch to "libraried". The DCS offers utilities to view or print reports showing which design components exist for a problem or which problems are fixed by a design component. The report generator allows the user to enter the problem number and see which design components are associated to it. Or the design component can be specified to see which problems it fixes. Finally, and EC identifier can be specified and all problem numbers and design components associated with the EC can be displayed.

Part Number/EC Control(Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;

Any single Design Fix # (number) can only be associated with a single EC;

One design component can have many Design Fix numbers, but they must all belong to the same EC; and Variations of a design component can exist in multiple ECs, but each must have a unique set of Design Fixes.

Figure 8A:
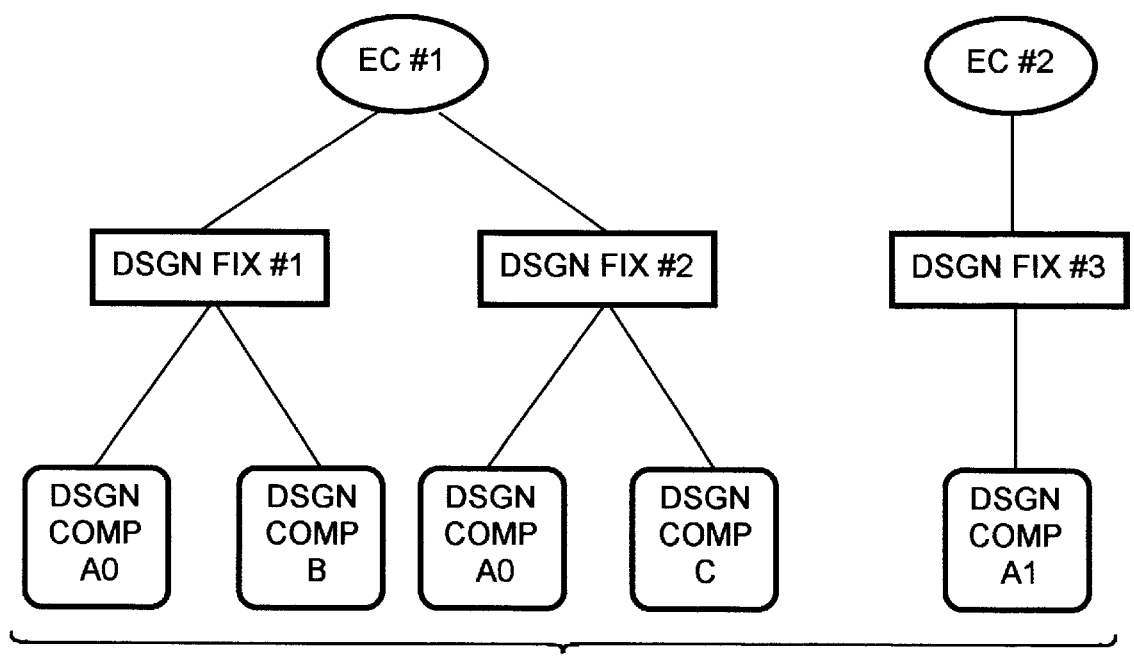
FIG. 8 (illustrated in parts FIG. 8a and 8b) illustrates our preferred Design Fix Management and EC Control.
Figure 8B:
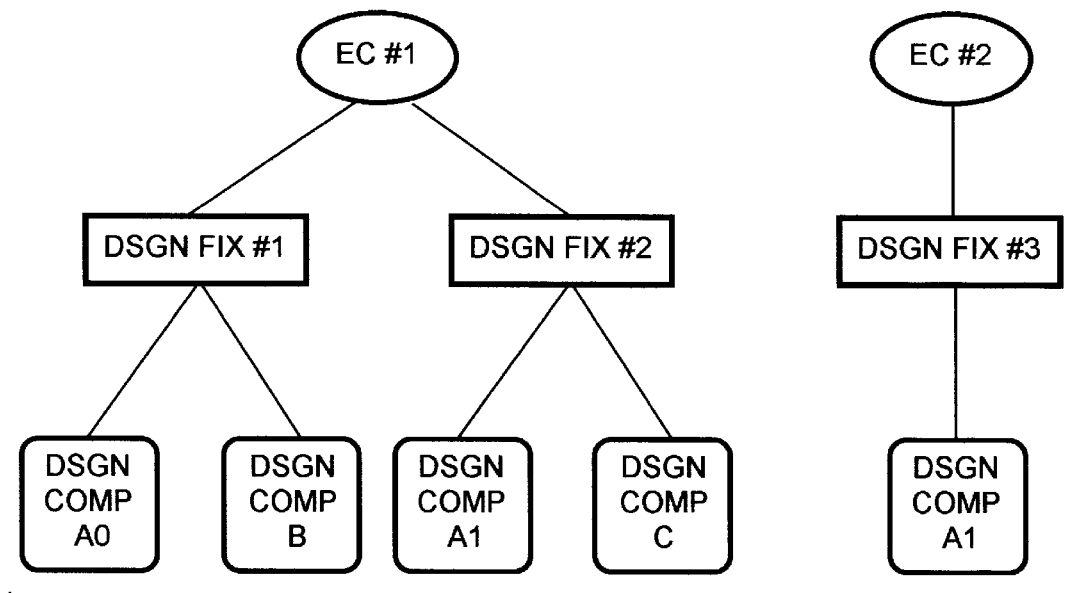

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0. The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another designer's data outside of the DCS. Nearly continuous availability is achieved by implementing the DCS in the following manner:

If the primary DCS server fails, the system can be brought up on another server with minimal human intervention. The physical locations of all libraries are determined by the Data Manager which permits the data to be strategically located throughout the network to improve availability.

Multiple paths exist to request information from the Control Repository. They provide alternate routes in the event of network or router problems.

Archiving and backing up data is accomplished with the following features:

The Design Control Repository can be archived onto tape or backed up to another repository by the Data Manager as often as deemed necessary. In the event of corruption, this back up copy can be restored into the primary repository.

All libraries can be archived to tape or backed up to alternate repositories defined by the Data Manager as often as deemed appropriate.

The DCS provides a utility which checks to see if a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.

The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to:

Initiate promote requests. The minimum interface requires the user to enter the name of a design component or select from a list, enter the level from which to begin the promote, the target level where the promote should terminate, a flag indicating whether it's a BOM promote, and the version.

Send results from External Data Processes to a library. This utility allows the user to enter the name of a Pedigree and the target level and version to which the Pedigree information should go.

Set up and manage a private library. The utility has fields where the user can specify the name of the library (if one is to be created), the library path where the repository will reside, the userids of the owners, and either the userids or authorization groups of those who can access it. These properties can be called up for modification at any time. Whenever the owner or access fields are altered, the DCS automatically updates the authority records within the Design Control Repository as well as the operating system (i.e. AFS) permissions of the directory where the library resides.

Create and monitor a Bill of Materials. The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASC text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results. The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components. The designer uses this to pre-associate problem fix numbers to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and pseudo process results through the World Wide Web. Key quality control indicators can be exported out of the DCS into an accessible format by users on the WWW. Usually these results would exist in a secure repository which could only be accessed by WWW users who are working on the project. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI)

to query information from the DCS or invoke Designer Initiated Library Processes (DILPs).

Actors & Objects (Section 1.19)

Figure 9:
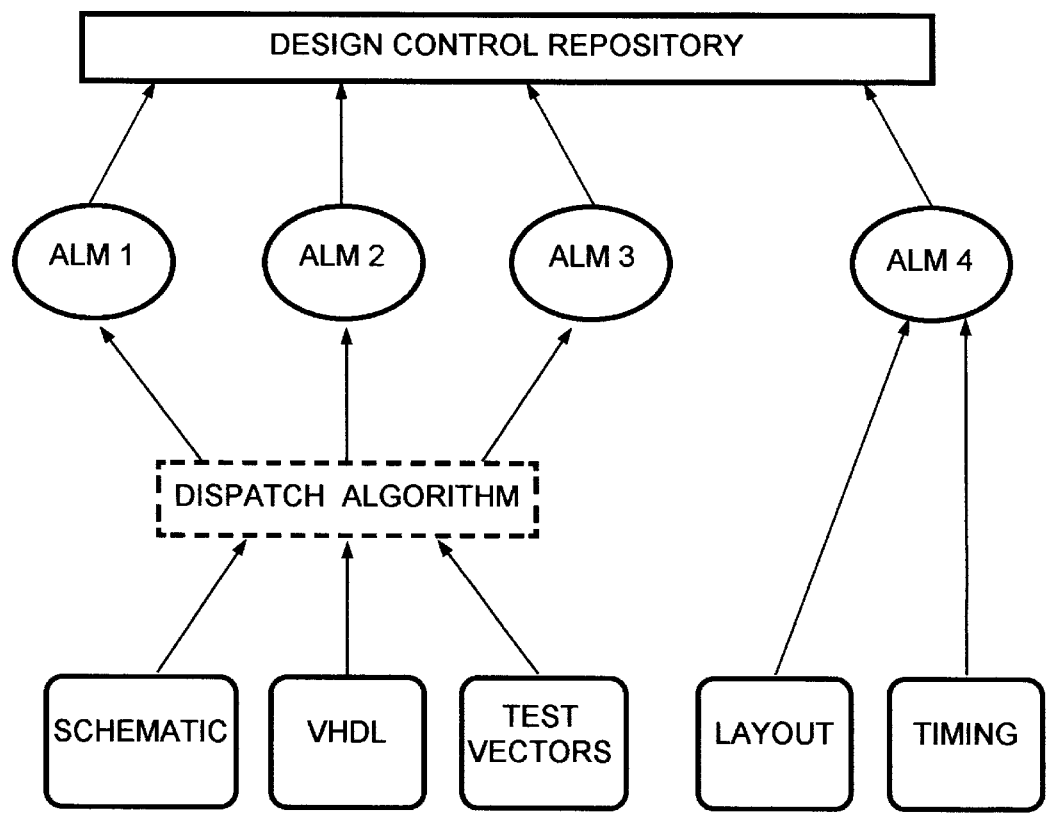
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on a mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference (fileref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended to the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
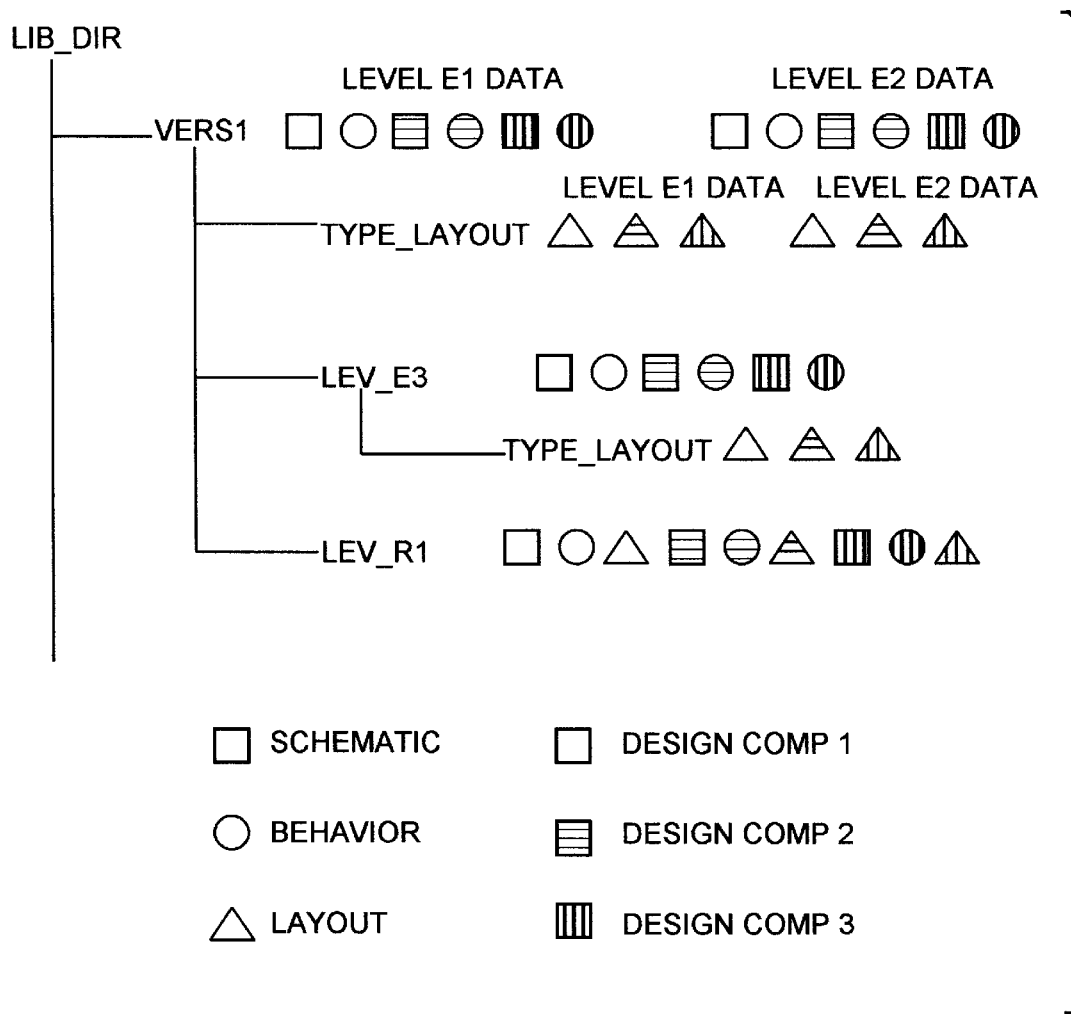
FIG. 10 illustrates our preferred Example of Location Independent Data Tracking.
Figure 11A:
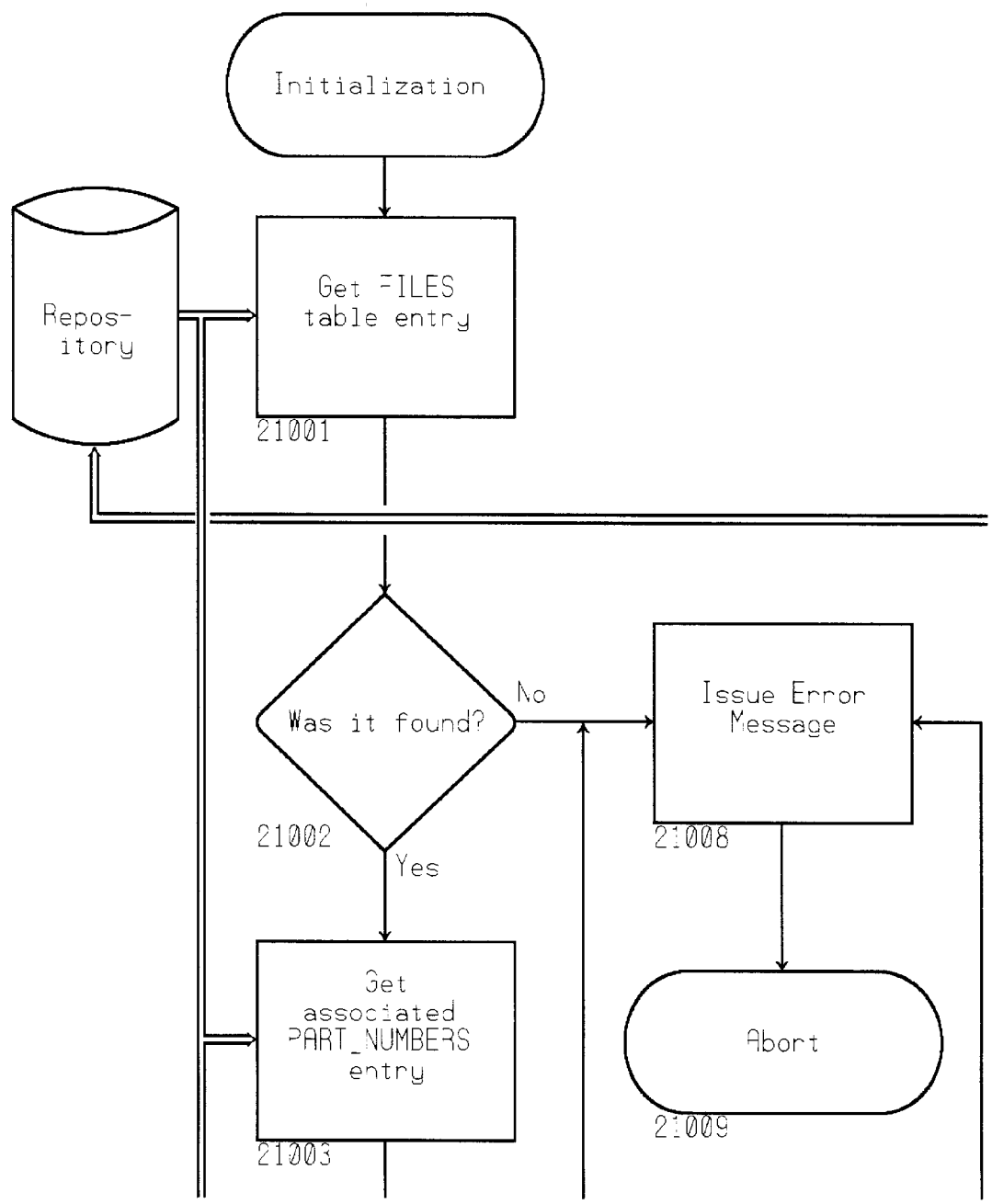
FIG. 11a thru 11d describes the QRFILDEL Process.
Figure 11B:
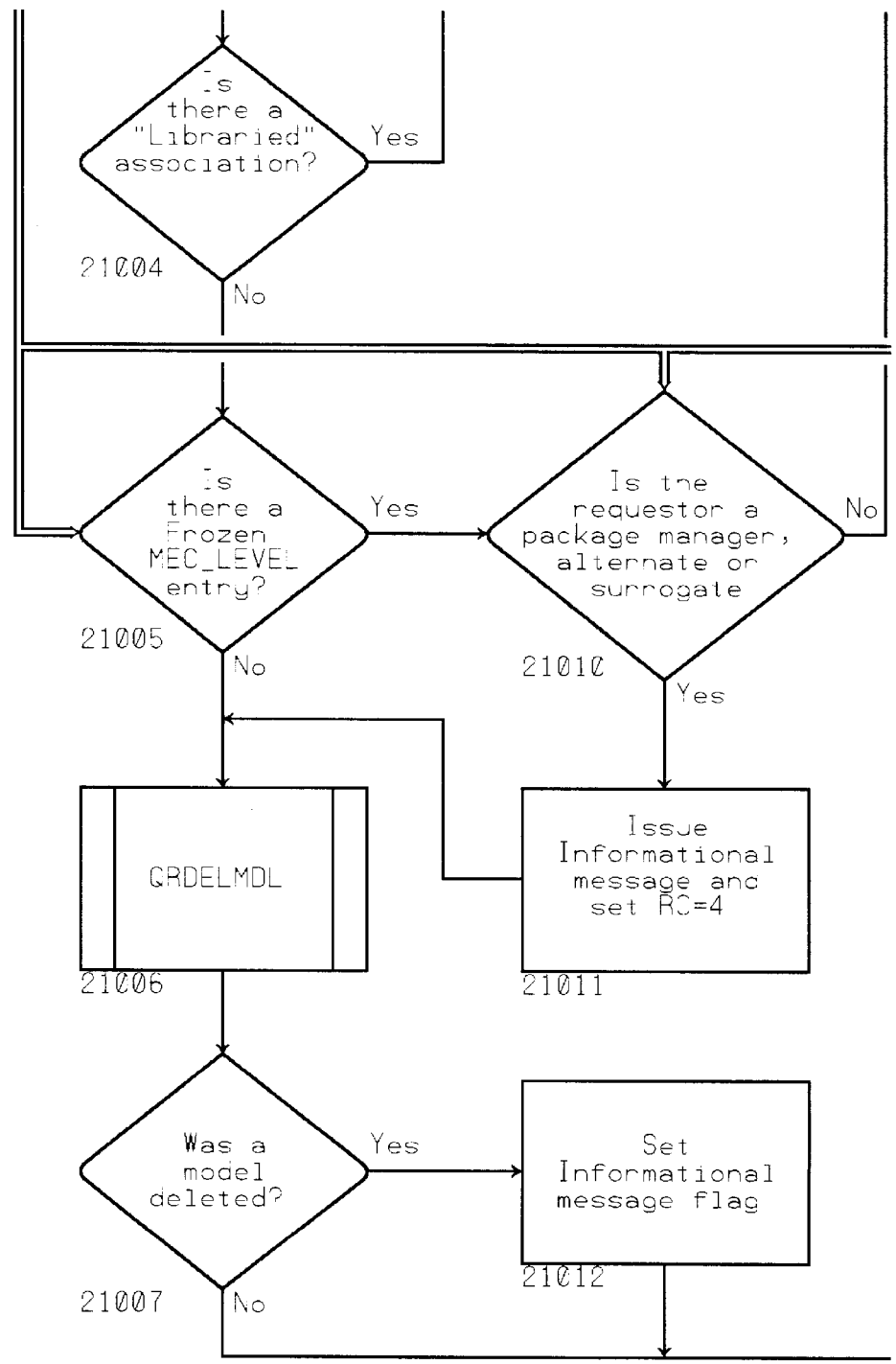
Figure 11C:
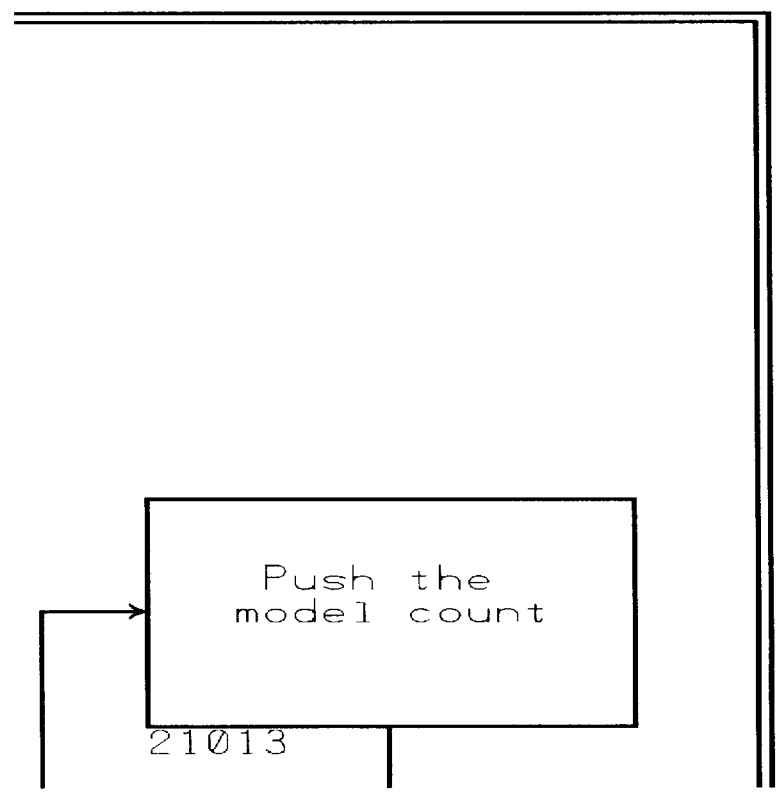
Figure 11D:
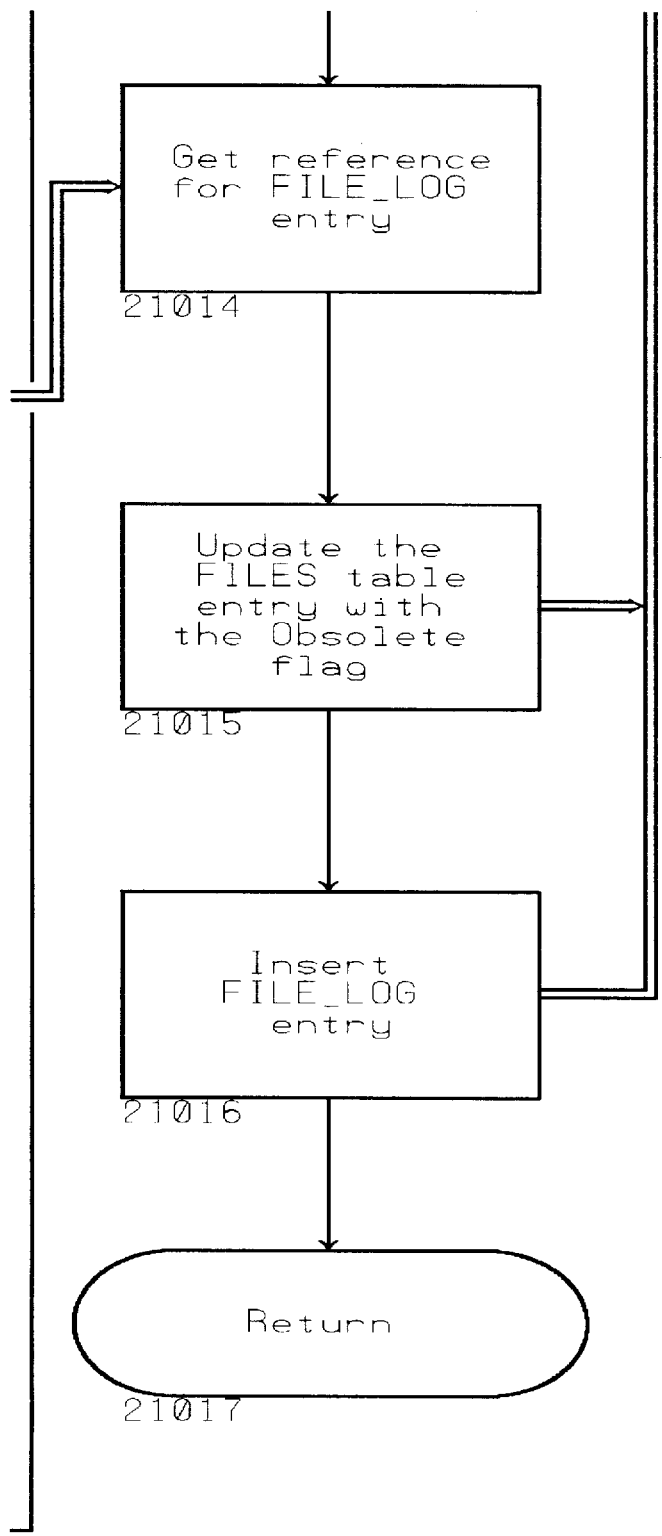

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be separate directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated only by level with no regard to type. This is seen in the release level repository LEV_R1. By offering this kind of flexibility, the DCS permits the Data Manager to group the data in the most advantageous way. In addition, the Data Manager could invoke Automatic Component Grouping, which would result in further subdirectories under VERS1, LEV_E3 and LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Preferred Embodiment for Managing Shared Libraries (2.0)

The present embodiment provides a controlled environment for the acquisition, movement, disposition and removal of data from a Data Management System. The embodiment is described from the perspective of an overall algorithm which manages data Libraries. This encompasses not only the storage management issues but the necessary interaction with a centralized Data Control Repository.

Our embodiment covers a broad array of implementations ranging from a system whereby the user constantly interacts with the Data Control Repository to acquire ownership, deposit or move up through the system described in the preferred embodiment which incorporates Automated Library Machines (ALM) with a sophisticated file movement algorithm.

The Library Management algorithm serves as the interface between the user and the Data Management system for routine data control functions. Our preferred embodiment interacts with the Lock and Authority Manager to permit an environment which allows multiple users to possess ownership in a data object, but ensures only one owner is updating an individual instance at any given time. A Check Out utility is provided for the user to request ownership to a piece of data, transfer ownership, or take ownership if they are an authorized surrogate of the current owner. Likewise, a utility exists to perform data deletion in a safe and controlled manner by ensuring only authorized Data Managers or valid data owners delete their own data without jeopardizing any other data.

An integral part of Library Management is establishment of private and public libraries. Often these public libraries are shared by many users which can create data integrity exposures if data is not properly stored into and moved through a public library. The overall algorithm manages the movement of the data between the actual physical locations specified under the established library structure. Since our embodiment permits data to reside across different computer platforms, the algorithm contains functions for handling cross-platform data transfers. Although our Library Management algorithm only requires a simple promotion algorithm in order to function, the present embodiment reveals a highly sophisticated File Movement Algorithm.

Lightly loaded Data Management Systems can usually support execution of the above Library Management functions in the client's environment where the user calls upon the Data Control Repository to initiate the function, and the repository immediately invokes the appropriate algorithm or utility. However, in large enterprises, this can lead to unacceptable performance degradation as many users simultaneously access the repository. Therefore, our Library Management algorithm is capable of supporting Automated Library Machines arranged in a variety of configurations to optimize performance. The use of ALMs also permit Automated Library Processing to occur. The Library Manager incorporates routines for properly installing any output created by an Automated Library Process into the DMS.

Finally, the Library Manager provides instant notification to the user for any service rendered. This occurs whether the task is executed in the user's environment or remotely on an Automated Library Machine. In the event a task fails to complete, error messages explain the problem. Successful operations also result in notification thus ensuring users possess situational awareness of their data at all times.

Our preferred embodiment describes a File Movement Algorithm which interfaces with other Managers in the overall Data Management System. This provides a great degree of data security while offering a plethora of automated features. The Promotion Algorithm interacts with the Authority and Lock Managers to ensure that users transfer data that they own from a private library into a public shared library. Furthermore, only authorized users may promote the data through the various library levels.

Upon initiating a promote request, the algorithm compares any recorded process results against pre-defined promotion criteria to ensure that only data which meets a quality standard may be elevated to the next level. The promotion algorithm offers a flexible means of promoting large volumes of data including features which handle heterogeneous types of data from different levels and versions within the same request. Interaction with the Aggregation Manager allows fast and efficient Bill of Material (BOM) promotes.

The promotion algorithm also works in conjunction with the Problem Fix and Release Manager to apply problem fix tracking, incremental change, part number and release control to any desired piece of data moving through the Data Management System. This includes interaction with the user to gather the appropriate information at promotion time as well as background checking to safeguard against data integrity violations such as a single part being associated with two different releases.

For environments such as our preferred embodiment, which incorporate Automated Library Machines, our promotion algorithm permits the user to pre-check a work request interactively prior to the request being sent to the ALM. This feature ensures the work request will complete successfully by running all the same checks which are normally run by the ALM prior to data movement. Since our embodiment permits the user to request a promote through multiple levels with a single invocation, this pre-qualification feature can greatly improve productivity.

In order to maximize throughput of large data volumes, our Library Management Algorithm employs Automated Library Machines to act as independent agents for the user community. These ALMs are service machines which use a virtual queue to accept work requests from users and perform Library or non-Library functions. The ALMs interface directly with the Data Control Repository through dedicated high speed ports in the Communication Manager. They can exist on clients, servers and on different computer platforms. Our preferred embodiment describes three basic configurations which permit the ALMs to perform any of the services requested by the Library Manager algorithm. The basic configuration is known as a Conventional system where a single ALM accepts all work requests and handles all services for the Library Manager, including any Automated Library Processing. The second configuration is Remote Execution Machines which is an extension of the Conventional system. Here, a single ALM receives all work requests from the user, and processes all promotion, installation, movement, and removal of data. However, additional ALMs may exist to perform Automated Library Processing. The ALMs interact with the Library Manager, Communication Manager and Promotion Algorithm to dispatch any desired library processing to a Remote Execution Machine, which executes the task and returns the results to the master ALM. The most powerful configuration is known Actor/Objects and this arrangement employs a pool of ALMs which serve as general purpose machines. They can perform any desired Library Management function, including Automated Library Processing. They can even interface with Remote Execution Machines to provide an environment with both general purpose machines and dedicated service machines. Each ALM can be programmed by the Data Manager to define the type of work requests it can process. This arrangement even includes a special Dispatcher ALM whose sole purpose is to dispatch user work requests to the next available Actor machine.

Automated Library Machines are special purpose Auto-Reader service machines which means they are capable of performing virtually any software task that can be invoked from a command line. These tasks can be completely independent of the Data Management System which permits an ALM to play multiple roles in a business environment. It can literally be processing a Data Management request one minute, and formatting a word processing document for printing the next minute. The underlying AutoReader mechanism incorporates features to enable automatic recovery in the event of a system crash. The Library Manager further enhances this by adding automatic retry of aborted library operations due to system problems.

File Promotion Process

The present embodiment incorporates a robust process for promoting data from a private library into a shared public library as well as moving data through a shared public library. Although it's especially suited to interact with Automated Library Machines and the other algorithms described in the other sections of the Preferred embodiment, this process does not require any of those elements to be present in the Data Management System (DMS).

In order to track data properly, our embodiment provides a conduit for data to enter, and travel through, the DMS in a safe and controlled manner. This ensures that all data is subjected to the proper checks regardless of the point of origin or final destination. The preferred embodiment depicts the overall flow of the promote, or data transfer, in FIG. 12.

Figure 12:
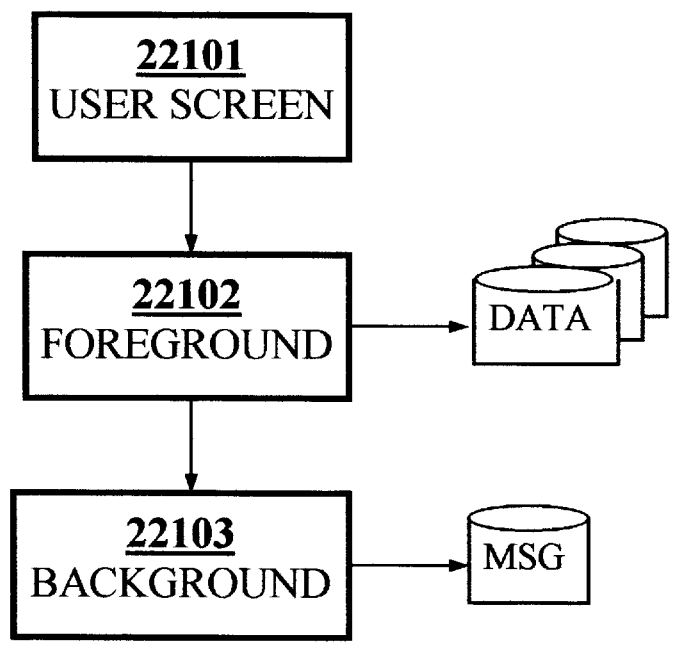
FIG. 12 illustrates the overall diagram of the Promote Process.

The flow begins with Step 22101 in FIG. 12 in which the user is presented with the Promotion Screen. FIG. 13 shows this screen, which permits the user to enter information about the file(s) they wish to process. Promotion can entail transferring data from the user's private library to a public library or moving data within a public library.

Turning our attention to FIG. 13 we see the promotion screen which consists of data entry fields 22201 through 22208. A single screen is used to either Put a file from a private library into the DMS or Promote a file from one level of the DMS to another. The type of action is determined by the user supplied information.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2(tm) application environments.

Field 22201 holds the name of the file to be promoted. If a single file is being promoted, the name is typed in directly. If the user desires a selection list, it is automatically invoked by simply leaving the field blank and completing the remainder of the form. Upon hitting Enter, a library search would be employed to obtain a selection list of files. The third method is to promote a group of files via a text-based list, edited in advance, in a prescribed format. This is covered below in the explanation of user options.

Fields 22202 and 22203 allow the user to enter the Version and Library File Type respectively. In the preferred embodiment a promotion is not permitted across versions nor can a file type change as a result of a promote.

Fields 22204 and 22205 convey the Source Library and Level information. In the case of a Put, the Source Library can be any valid private library in the DMS. The Level would default to User, but a valid entry level name can be entered. Field 22204 can also be the name of a public library. In this case, field 22205 would contain the starting level for the Promote. Each field has a "smart" drop down menu button associated with it. The Library button next to field 22204 displays a list of all public libraries in the DMS plus all private libraries owned by the user. The button next to field 22205 displays all valid levels for the Library entered in field 22204.

Fields 22206 through 22208 are almost identical to fields 22204 thru 22205, represent the Destination information. Field 22206 is the destination library which is frequently the name of a public library. As with field 22204, the drop down menu button next to field 22206 displays all libraries in the DMS. However, our embodiment also permits a private library owned by the user to be a valid entry. In this case, fields 22207 and 22208 default to User, but can be changed to the valid level names, and none of the options at the bottom of the screen apply. The resulting operation would be a simple file copy from the source private library to the destination private library, with the file being named according to the Destination Level information.

Returning to the general case, if field 22206 contains a public library then the user would fill in the destination level in field 22207. Once filled in, field 22208 automatically takes on the same value. In the case of a simple Put, field 22207 represents the final destination and is equivalent to the Destination Entry Level in field 22208. For a Put with Promote, field 22207 represents the destination level while field 22208 denotes the doorway through which the file should enter the DMS. Finally, in the case of a Promote, field 22207 again represents the Destination Level and field 22208 is ignored.

Turning our attention to the lower portion of the screen, we see two sets of push buttons. The first set, 22209, represent user options that pertain to any type of Put or Promote. Any number of these options can be invoked and they are defined as follows:

Via List The list of files to be processed will be read from a text based file. The user is presented with a dialog box requesting the name of the file. The names of the files will be read from this list, but all other information will be taken from fields 22202 through 22210.

Foreground Checking Pre-checks the data using the same checks that will take place during the background portion of the promotion. This allows the user to test the promote and ensure everything will work before the request is submitted to the DMS.

Via Copy is normally active for most environments. It enables the DMS to use a file copy operation as the preferred method for transferring data from the source to the destination. In certain environments, this may not be possible or desirable, so deselecting this option forces the data to be "sent" from the source to the destination.

Reset Update Lock is the means by which the user informs the DMS to remove any existing Update Lock from the file(s) and leave them in an unowned state at the completion of the promote.

High Priority Tells the DMS to process this request next assuming it's the only high priority item in the queue. If there are multiple requests with this priority, they are processed in FIFO order.

Override Process Parms Allows the user to add or modify the parameter passed to an underlying library process.

The last set of buttons is set 22210 which represent options only available during a Promote. This is because these options only pertain to data already under control of a DMS. Any number of them can be selected and they are:

BOM Promote Indicates the user wants the Bill of Materials associated with the file entered in field 22201 to be promoted. If the file doesn't have a BOM associated with it, the promote will fail.

Anchor Only Indicates to the DMS to only promote the anchor file of the BOM associated with the file entered in field 22201, but leave the members at their current locations.

Retain Source is usually "off" which enables the DMS to move the file from the source location to the destination. However, in certain environments it may be desirable to leave a copy of the file at the source location after the promote is completed, so this option exists for this purpose.

Figure 14A:
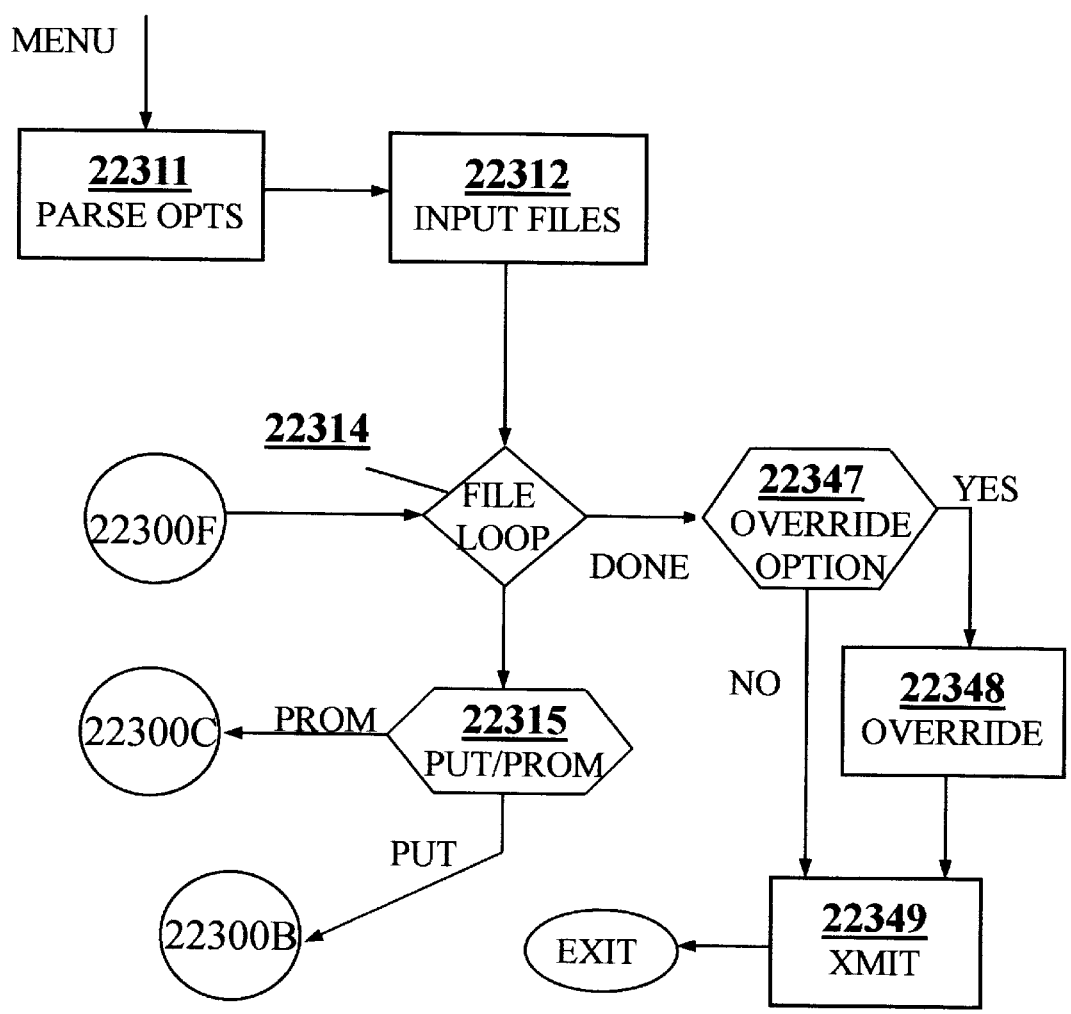
FIGS. 14a thru 14f describes the algorithm for Promote Foreground Processing.

Returning to the overall flowchart in FIG. 12, information entered in Step 22101 is now passed to Step 22102, Foreground Processing. The detailed algorithm for processing promotion requests in the foreground is described in FIGS. 14*a* thru 14*f*. It begins with Step 22311 of FIG. 14*a*, Parse Opts. Here all the information entered in Step 22101 is checked for validity. The following cases are examined:

If the Source and Destination Libraries are private libraries, then the Source and Destination Levels are allowed to be any combination of User and valid public levels. The user must have edit authority to the Destination private library. This results in a simple file copy with the name being adjusted according to the Destination level field.

If the Source Library is a private library and the Destination Library is public, then the following conditions must be met:
1. If the Source Level is User then the Destination Entry Level must be a valid entry point. The Destination Level must be the same or higher.
2. If the Source Level is a valid entry point, then the Destination Entry Level must be identical. The Destination Level can be the same or higher.

If the Destination and Destination Entry Levels are the same, this classifies as a simple put. If the Destination Level is higher, it's a combined Put with Promote.

If the Source Library is a valid public library, and the level is a valid level, then the Destination Library must be the same as the Source Library and the level must be higher than the Source Level. These conditions signify a Promote In this case the Destination Entry Level is ignored.

Any other combinations of these fields is considered an error condition and the promote terminates. In addition, the options are examined to set various flags which will be used to determine branching later in the algorithm.

Step 22312, Input Files follows Step 22311. Here, FIG. 13, entry field 22371, Name is examined for three possible responses. The simplest case is the name of a single file which implies only this file is to be promoted. Second, is a blank or some other keyword in which the user requests a library search of all files of the specified Library File Type starting at the specified Source Library, Level and Version. If any of these fields are invalid or missing, the user is prompted to enter the information. The standard Library Search manager is invoked to perform this task. At the completion of the search, the user is presented with a selection list of all files found. One or more files can be selected for promotion. The third possibility is that the ViaList user option in button field 22379 of FIG. 13 has been selected. This indicates that the user wants the foreground process to extract the names of the files from a text file. The user is prompted for the name of the file which lists the names of the files to process. All other information, besides the file name, is taken from the main screen.

Once the input file(s) are determined, the algorithm enters the File Loop in Step 22314. For the simple case of a single file being promoted, this loop is only exercised once. In the cases where a selection list or text file was used to provide a list of data to promote, all Steps between 22313 and 22347 are executed for each file.

Step 22315 asks the question "is this a Put or Promote? The answer to this question determines which way the program must branch. A Put refers to data entering a public library from a private library whereas a Promote refers to data moving through a public library. Our embodiment permits a Put followed by a Promote in the same request, but for purposes of resolving Step 22315, that request is treated like a simple Put. All Promotes continue to Step 22326 in FIG. 14*c* while Puts branch to Step 22316, Fig Info in FIG. 14*b*.

Figure 14B:
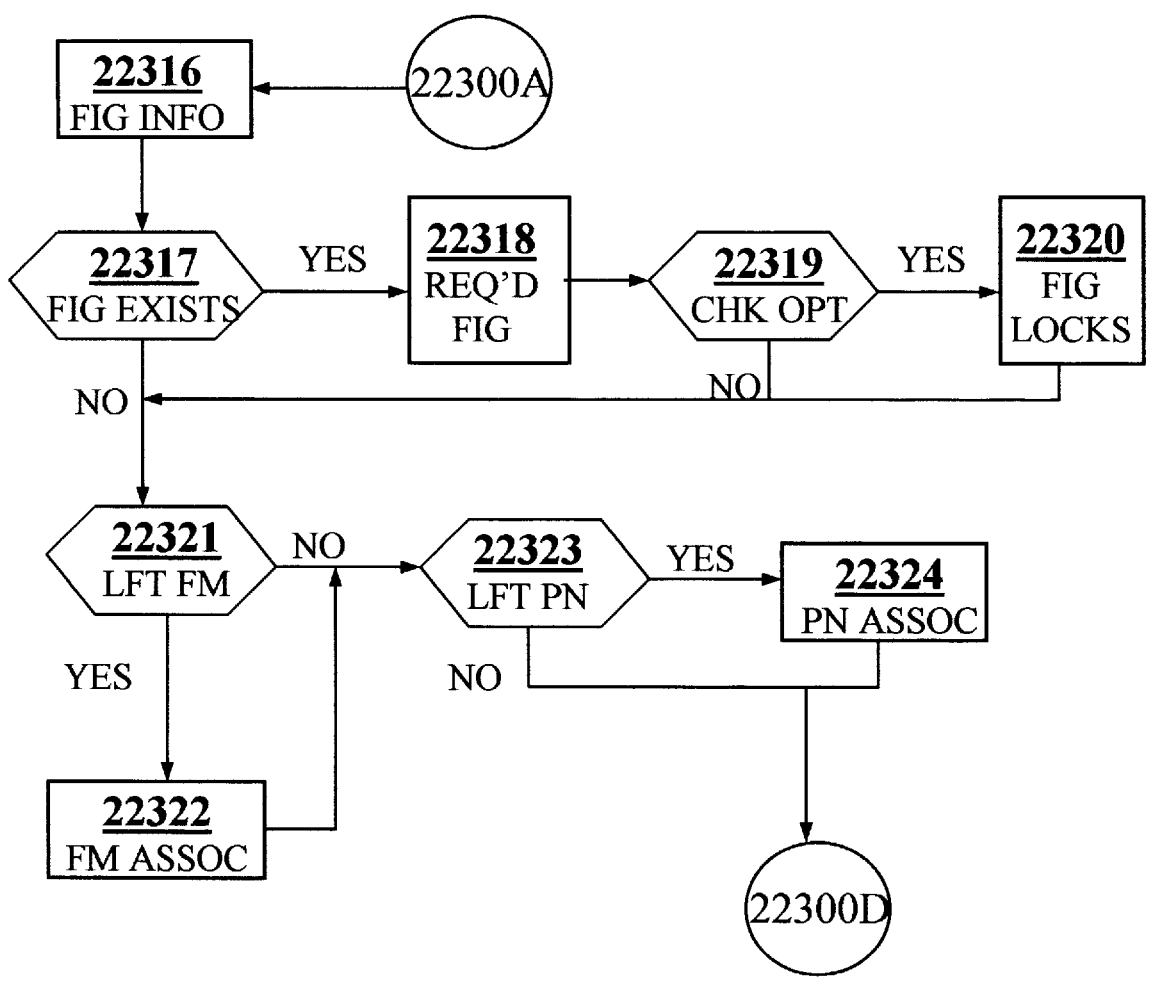

In Step 22316 of FIG. 14*b*, the program requests any Automatic File Group relative to the file being promoted. This information includes a flag indicating whether the candidate file is the master file of a file group, and if so, the list of Library File Types associated with that file group. By definition, all members of a file group share the same file name, library, version and level.

Step 22317 reviews the information returned in Step 22316 to see if a File Group Exists If so, the program continues with Step 22318. Otherwise, it branches to Step 22321. Steps 22318–22320 pertain to processing file groups. In Step 22318 the program checks for the existence of any Required Members of the File Group. These are denoted in the information returned in Step 22316. If a required member can't be found in the user's private library, an error message is issued and the promote is terminated. If an optional member doesn't exist, a warning is issued to the user, but the promotion continues.

Step 22319 examines the Check Option whose flag was set in Step 22311. If it's true, then the locks on the all existing subordinate files are examined, in Step 22320, Fig Locks, to ensure the user either owns the Update lock or is a surrogate for the owner. In addition, it ensures no other type of lock exists which would prevent the Put. Such an example would be an Overlay lock at the entry level. If the user is not the owner, our Lock Manager will Update Locks.

In our preferred embodiment, our embodiment maintains absolute data integrity by adhering to the following rule. The Foreground Check option, available to the user on the promotion screen in FIG. 13 only pertains to the foreground processing of the promote. It is ignored in the background, where full checking is done at all times. The option serves merely as a performance enhancement which allows the user to submit promotion requests with minimal checking. The advantage of the Check option is that an error free foreground session practically guarantees a successful promote in the background. However, depending on the environment and the implementation, the trade-off may be lengthy processing time on the client machine. For these situations, our embodiment offers the user the option of bypassing a series of foreground checks and "taking their chances" on the promote processing successfully in the background.

Steps 22321 and 22323 can be processed in either order, and they are used as decision points for Steps 22322 and 22324 respectively. In Step 22321, the program inspects the Fix Management information for the package. If the package is under Single Fix Mode or Engineering Change Mode, then the LFT FM, or Library File Type Fix Management, flag is examined for the LFT being processed. If the flag is on, Step 22322 is invoked, otherwise the program proceeds to Step 22323. In Step 22322, FM Assoc, the program attempts to associate the file being processed with a Problem Fix Number. If the package is under Single Fix Mode, the default Problem Fix Number is associated to the file. If the package is in Engineering Change Mode and the repository already has existing Fix Numbers for that file, they are presented on a user screen. This is usually done with another interrogation of the Control Repository. The user is given the choice of selecting one of the existing numbers or entering a new one. If no Fix Numbers exist, the user is prompted to enter a new one.

In Step 22323, the program checks to see if the Part Number Control Level is being crossed by comparing it to the Destination Level provided by the user in Step 22301. If the answer is "yes", then the LFT PN, or Library File Type Part Number, flag is examined for each LFT being processed. If the flag is on, Step 22324 is invoked, otherwise the program proceeds to Step 22325. In Step 22324, PN Assoc, the program attempts to associate the file being processed with a Part Number. If the repository already has an existing Part Number for that file, it is presented on a user screen. This is usually done with another interrogation of the Control Repository. The user is given the choice of selecting the existing PN or entering a new one. If no Part Number exists, the user is prompted to select a new one.

Since Steps 22321 through 22324 may be repeated for a large number of files, the Design Control System may be implemented in such a way that the DMS server returns all associated Part Number and Fix Management data for all files being processed with one large query. The client then sifts through the data to find the information necessary to interact with the user. The algorithm states the information that must be obtained from the Control Repository and the user, but permits a great deal of flexibility in the way it is acquired.

Figure 14C:
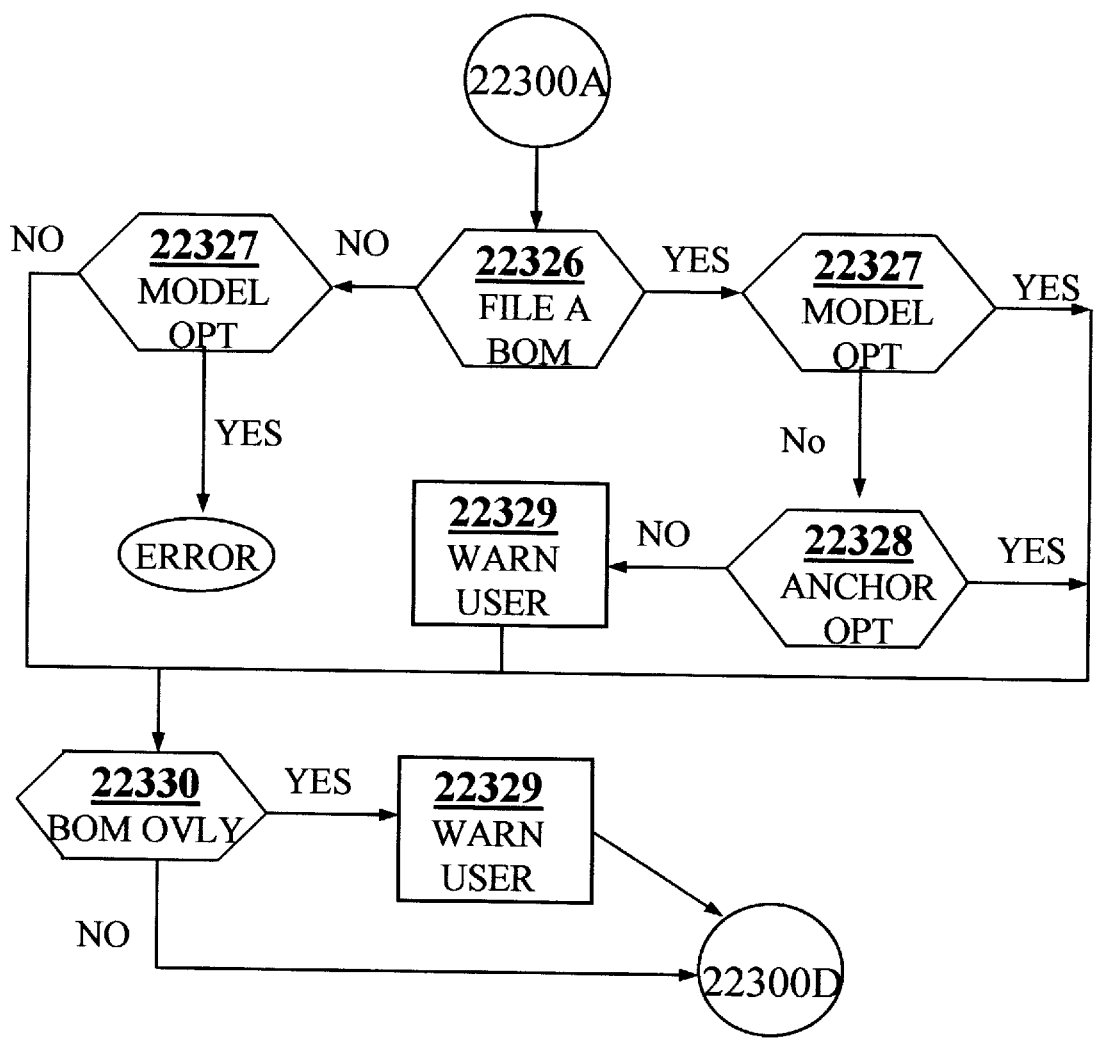
Figure 14D:
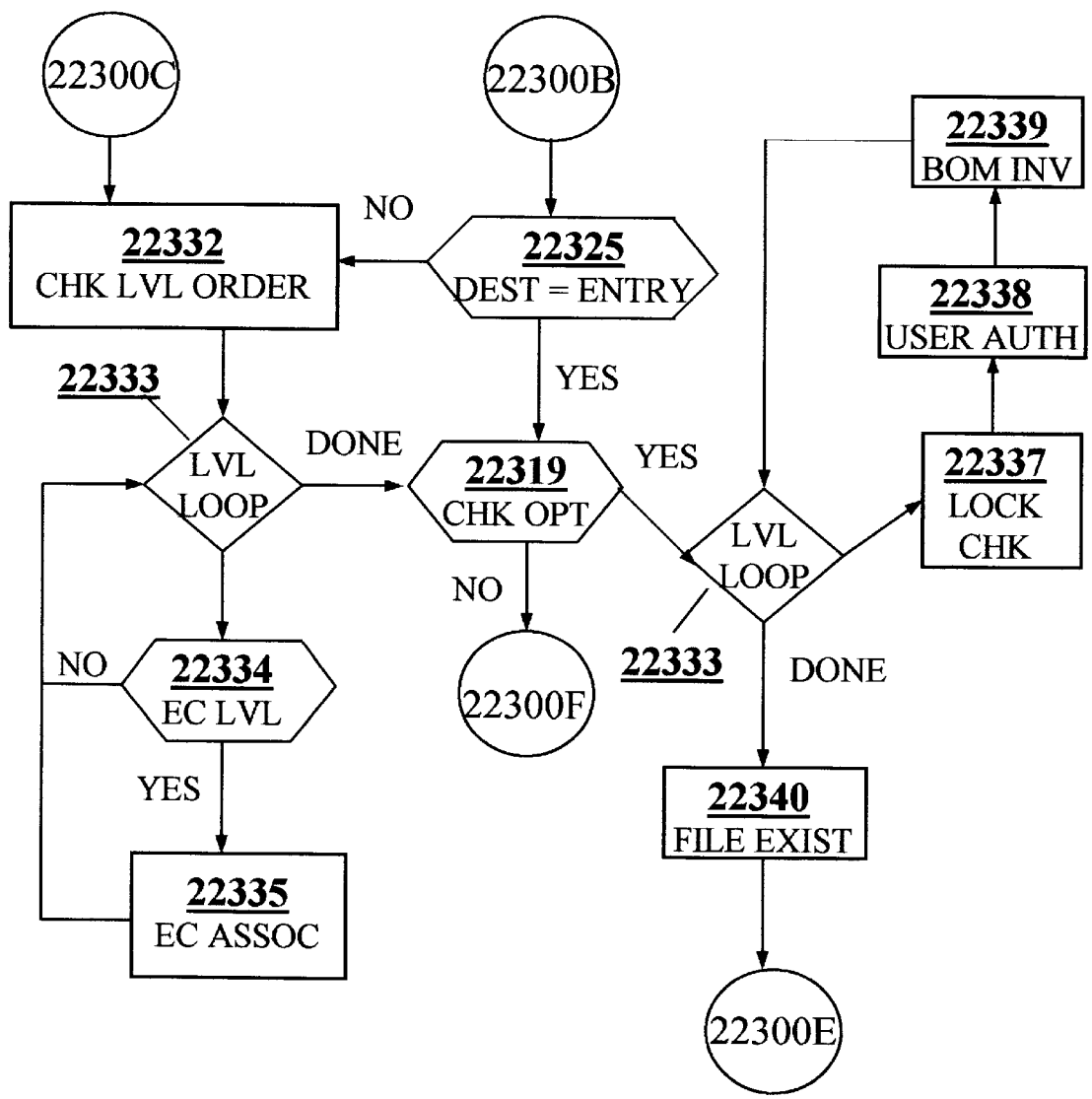

At this point the algorithm continues with Step 22325, Dest=Entry in FIG. 14d. In this step, the code determines if this is a simple Put or a Put/Promote combination by comparing the Destination Entry Level with the Destination Level. If they are the same, it's considered a simple Put. In this case the code proceeds to Step 22319. If the Target Level is higher than the Entry Level, it's considered a Put with Promote and continues to Step 22332.

Returning to the Put/Prom decision in Step 22315, if the user is requesting a promote, the code branches to Step 22326 in FIG. 14c. Here the control repository is queried to find out whether the file being promoted is the anchor file to a Bill of Materials (BOM). Regardless of the outcome, the Model Option flag in Step 22327 is examined. The answer to both questions yield four possibilities. If both answers are "yes" or both answers are "no" this is the normal case in which the algorithm proceeds to Step 22330. If the file is a BOM, but the BOM Promote Option was not specified in Step 22301, the Anchor Only Option flag in Step 22328 is examined. If this flag is on, then the user is requesting to promote only the anchor file and not the entire BOM. If the flag is off, a warning is presented to the user requesting that either the BOM Promote or Anchor Only Option must be selected. Finally, if the file is not a BOM, but the user specifies the BOM promote Option, an error message is displayed and the program terminates.

Continuing with Step 22330, the program checks to see if a BOM exists at any of the levels being promoted through with the same name as the file. If so, a warning is issued, in Step 22329, to the user indicating a BOM will be and subsequently deleted if the promote continues. The user is given the option to continue or abort the operation. If no BOM Overlay is imminent, or the user accepts the overlay, the algorithm proceeds to Step 22332 of FIG. 14d.

In Step 22332, Chk Lvl Order, the promotion path is examined to ensure a legal path exists from the Source Level to the Destination Level. In the case of a Put, where the Destination Level is not equal to the Entry Level in Step 22325, the Entry Level is also checked to ensure it's part of the path. If not, an error is displayed and the program terminates. Step 22333 is a Level Loop which must be set up so Steps 22334 and 22335 can be performed for each level in the promotion path.

Step 22334, EC LVL, is where the program checks to see if the EC Level is being crossed during the transport. This is done by determining if the Destination Level entered in step 22301 is at or above the EC Control Level. If the test resolves to a "yes" answer, the program must perform step 22335, EC Assoc. Here it queries the Control Repository for EC information regarding any Problem Fix Numbers and Part Numbers selected or entered in steps 22322 and 22324. For any Fix Number or Part Number not associated with an EC, the program prompts the user to select an EC from a list of existing EC Numbers or choose a new one.

Upon completing the loop, the Check Option flag in Step 22319 is examined again. If this flag is off, the program proceeds to Step 22345 in FIG. 14f. Otherwise, if the user requests the option, the Level Loop in Step 22333 is again invoked. Step 22337, Lock Check is performed to ensure no locks exist against the file at any of the levels being traversed. These include Update, Move, Overlay and Processing locks. If Update locks exist, the user must either be an owner or a surrogate of the owner. In the latter case, the user is given the opportunity to reset the lock, upon which notification would be sent to the current owner.

In Step 22338, the User's Authority is checked to ensure they can promote the file to that level. Finally, in Step 22339, a complete BOM Invalidation check is performed. There are two forms of this check. In the simplest case, the file is not a BOM, so the control repository is examined to see if any other BOMs will be invalidated by the movement of this file to the Destination Level. In the more complex case, the file is a BOM. Here the same check is made as in the simple case, but additional checks must be made for every member of the BOM to determine if their movement will invalidate any other BOM. In either case, the results of the pending invalidation are displayed for the user to examine, using our Aggregate Manager for this check, as BOMs may have many members.

It should be noted that the order of Steps 22337 through 22339 is not critical and is combined into single large queries in our preferred embodiment. Files being promoted from a Private Library into a Public Library employ the QRSUPGET function described in FIG. 34, while promotions within the Public Library utilize the QRSUPCHK routine, described in FIG. 16. Upon completion of these checks for each level, the program moves on to Step 22340 to ensure the File Exists. This not only means the file physically exists with the proper nomenclature in the directory corresponding to the Source Level, Package, Version and Library File Type, but this also means the control repository agrees that the file exists in that location. If for example, the user believes the file is at Level A, but the control repository is tracking it at Level B, this is a data integrity violation and the promote ceases.

Figure 14E:
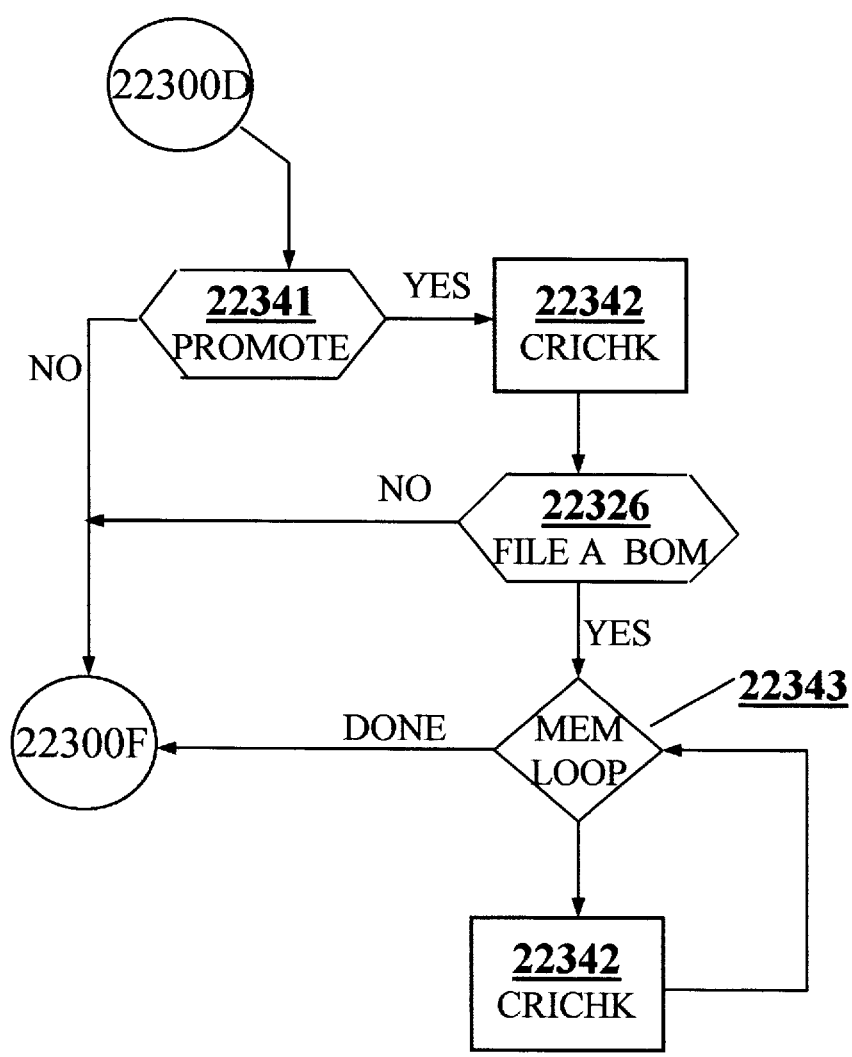
Figure 14F:
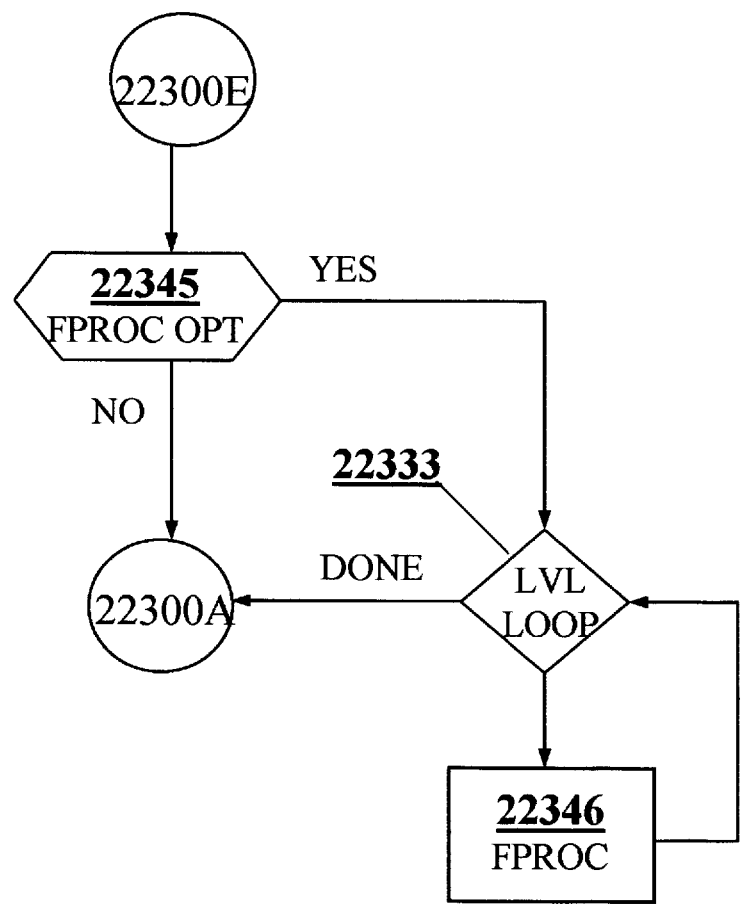

At this point, the algorithm proceeds to Step 22341 in FIG. 14e, where the question "is it a simple Promote" is asked. If so, Step 22342, Crichk is performed. For a promotion beginning at a library level (not one that is chained to a Put), the control repository is queried for any Post-Processes or DILPs defined at the Source Level. If there are any processes, then the process results for the file being promoted are examined to ensure they meet the proper promotion criteria. If any fail criteria, a warning is issued informing the user that the promotion will fail.

Next, Step 22326 is executed again to check if the file is a BOM. If so, a Member Loop is set up in Step 22343 where each member has their process results checked against any Post-Processes or DILPs which exist for those LFTs at the Source Level. This checking is the same as Step 22342.

If the answer to the Promote question in Step 22341 or the BOM test in Step 22326 is "no" the code proceeds to Step 22345. Likewise if the Member Loop in Step 22343 was exercised, the code proceeds upon exit to Step 22345 in FIG. 14f. In Step 22345, the Fproc Option flag is examined to see if the user is bypassing Foreground Processing. If the flag is off, the code returns to the top of the File Loop in Step 22314. If the flag is on, the Level Loop in Step 22333 is initiated again. For each level that the file will pass thru, Step 22346, Fproc will be called.

In the Fproc step the code queries the control repository for all foreground processes defined for that Library File Type at that level, version and package. Each process is then executed immediately in sequence so the user can enter the appropriate responses. These foreground processes are established by the Data Manager. Upon completion of the Level Loop, the code returns to the File Loop in Step 22314 of FIG. 14a. Once Steps 22314 thru 22346 are executed for all filed in the promote request, the algorithm proceeds to Step 22347, Override Option.

In Step 22347, the Override Option flag is examined. If it's off, the program proceeds to Step 22349. If it's on, then Step 22348, Override is executed. In this step the user is allowed to override any of the process parameters for the library processes that will be executed during the promotion. The algorithm queries the control repository for all Pre and Post-Processes defined for this Library File Type at this level, version and package. All of the process parameters are displayed on the screen, and the user can select and modify as many as desired. Once finished, the user "OK"s the modifications, and they are written into the control information which is used in the next step. The DMS will use these modified parameters to drive the library process, only if they exist. Otherwise it defaults to using those define by the Data Manager.

In step 22349, Xmit, the program gathers and transmits all of the necessary data to the Design Control System. In our preferred embodiment, the destination would be an Automated Library Machine which would access most of the information via a "copy" operation. The following types of information need to be transmitted:

The type of request: Put, Promote, or Mixed
The list of files being promoted. The following information must exist for each file in the list:
The Filename
The Library File Type
The Package
The Version
The Source Level, Entry level, Destination Level
Fix Numbers (if any)
Part Numbers (if any)
EC number (if any)
Any user selected options that pertain to the background operation.
The user's electronic id or e-mail address.
Information gathered during any foreground processing that occurred.
Information relating to any process parameters altered during the Override operation.

In addition, for Put operations the files themselves must be transferred from the user's private library. This includes all existing members of Automatic File Groups. Our preferred embodiment performs this by either having the Automated Library Machine copy the files or by sending them. The determination is made based on a user option called Via Copy which exists on the main input menu in FIG. 13. One other option on the main menu is the Emergency option which informs the DMS to treat this as the highest priority in the processing queue. This feature enables critical work to be processed ahead of older jobs.

Figure 15A:
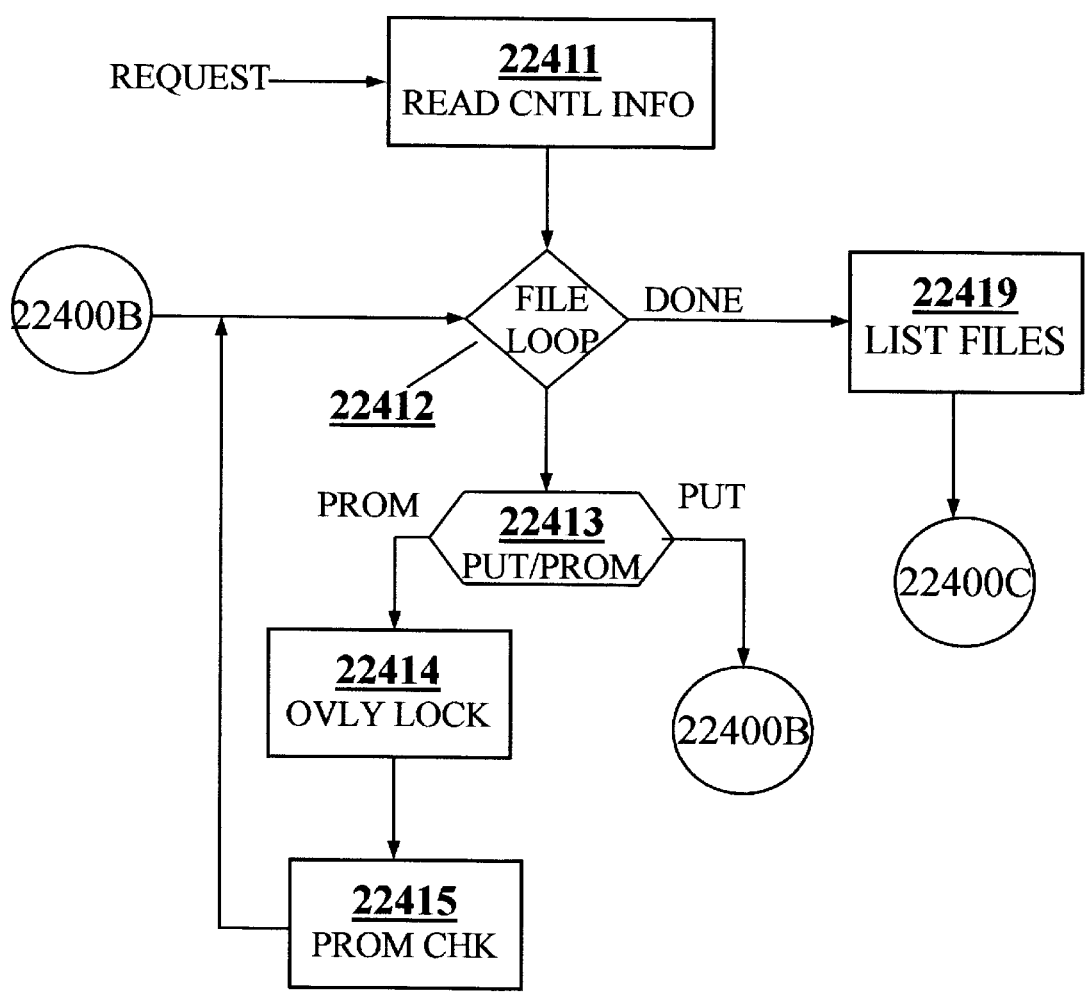
FIG. 15a thru 15e describes the algorithm for Promote Background Processing.
Figure 15B:
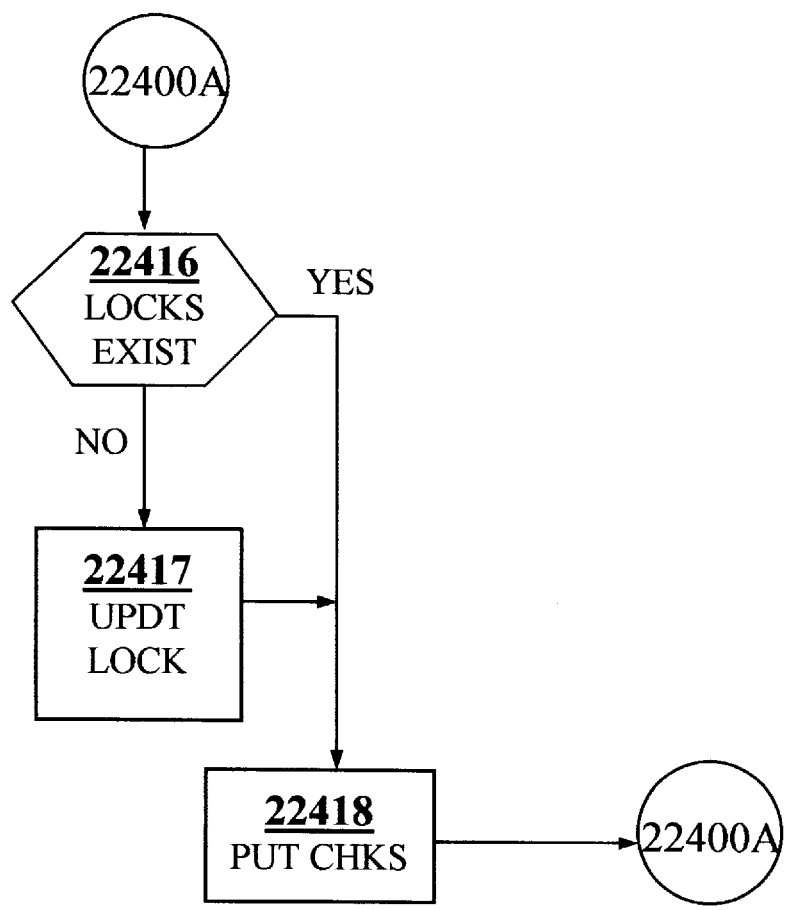

Returning to FIG. 12, the algorithm proceeds with the Background processing in Step 22103. In our preferred embodiment, the promote request from Step 22102, Foreground is transmitted to an Automated Library Machine (ALM) for processing. The first step is for the ALM to Read Control Information which is done in Step 22411 of FIG. 15a. Here, the names of the files in the promote request are stored into a data structure along with all pertinent control information like Problem Fix numbers, Part Numbers, EC Numbers, Entry Level & Destination Level for each file, and the user options. The options are further parsed to set flags. In our preferred embodiment, these requests are homogenous which means all files in the request move from the same source to the same destination. Since the Foreground step determined the type of request, it's contained in the control information and used to set the flag which is examined in Step 22413.

However, our embodiment also supports heterogeneous file movement. An example of this is two files where one moves from level A to B while the other moves from level C to D. Although this request can't be generated by the Foreground process in Step 22102, it can be created by 3rd party tools interfacing with the DMS. To accommodate this, the control file indicates the type of request as Mixed. In this case, Step 22413 must employ the same algorithm used in the Input Files step of FIG. 14a to determine if the request is a Put or Promote on a file-by-file basis. Since the control information contains the Source, Destination and Entry Level for each file, this is quite easily done.

At this point, the File Loop in step 22412 is entered in order to execute Steps 22414 thru 22418 on each file in the request. Step 22413 checks to see whether the request is a Put, Promote, or Mixed where:

Put means all files in the request are being promoted from a private library into the same level of a shared public library. The files may have to be promoted one or more times to reach the destination, but all files will travel the same path.
Promote means all files in the request are being promoted from one level of a shared public library to another. The files may have to be promoted one or more times to reach the destination, but all files will travel the same path.

Mixed means the request contains a mixture of files where 2 or more files may travel different paths. In this case the background algorithm must determine the promotion path for each individual file.

Note: Our preferred embodiment does not allow this type of request to be generated from the Foreground user interface, but 3rd party tools may create one.

In the case of a Promote (i.e. the file is being moved from one level of the DMS to a higher level), Step 22414 is employed to set an Overlay Lock on the file. The DMS uses this Overlay Lock to prevent a different ALM from moving the same file while this request is in progress. Next, Step 22415, Promote Check is called upon to do the following checks:

Ensure that the Source Level is valid and not a frozen Release Level.

Ensure that a valid path exists from the Source Level to Destination Level.

Determine the next higher level above the Source Level. (This may not be the Destination Level if this is a multi-level promote).

Obtain the physical location of the Source and Destination Levels.

Ensure the user is authorized to do this promote. For regular promotes, the user must have normal promote authority whereas for BOM promotes, Model Promote authority is required.

Ensure the file really exists in the DMS at the expected Source Level.

Check for any Processing or Move locks. Also look for any Overlay Locks at the next level.

Check all Post-Process and DILP criteria at the Source Level to ensure the file meets all of the criteria. In the case of a Bill of Materials (BOM) promote, each member of the BOM is also checked to ensure all criteria is met.

If the file is crossing the EC Control Level, and the file is under Problem Fix Management, check to ensure a proper EC number is provided.

If a BOM Promote is requested, a check is made to ensure a BOM is associated with the file being processed.

If a processing lock is detected, the promote request is recycled back into the DMS queue to await completion of the library process.

Note: If a processing lock exists, special hang detect code is used to determine if the file has been locked for an unusually long period of time. If so, the user is notified and advised to check on the process job.

Returning to Step 22413, if the request is a Put, then Step 22416 is employed to see if Update Locks Exist in the user's name, at the Destination Entry Level, for the file being processed. If not, one is acquired in Step 22417, Updt Lock. This lock may be permanent or temporary depending on the setting of a user controlled option which is discussed later. The reason for setting it at this time is to prevent someone from taking ownership of the file while the Put is in progress.

In Step 22418, Put Checks, a series of checks are performed against the file. Many of these are duplicates of those run in the Foreground in Step 22102, if the user specified the Check option during Step 22101. In our preferred embodiment, these checks are all done with a single query to the Control Repository. The following are performed:

A check is made to ensure no Processing, Move or Overlay locks exist on the file.

Ensures the user is authorized to Put this file to the Entry Level.

The physical location of the Entry Level and Source Level are acquired.

The File Reference number is generated.

The Lock Reference number is acquired.

The Entry Level is checked to ensure it's a valid entry point into the DMS. It may be a Sideways Release Level, but not a regular Release Level.

If any of the checks fail, the promotion terminates with an appropriate error message.

At this point the File Loop in Step 22412 is repeated until all files are exhausted. Upon exit from the loop, control proceeds to Step 22419, List Files. Here, the file information is re-written with the source and destination physical locations in preparation for the upcoming file transfer. The file name of this control file indicates whether the file transfer pertains to a Put or Promote.

Figure 15C:
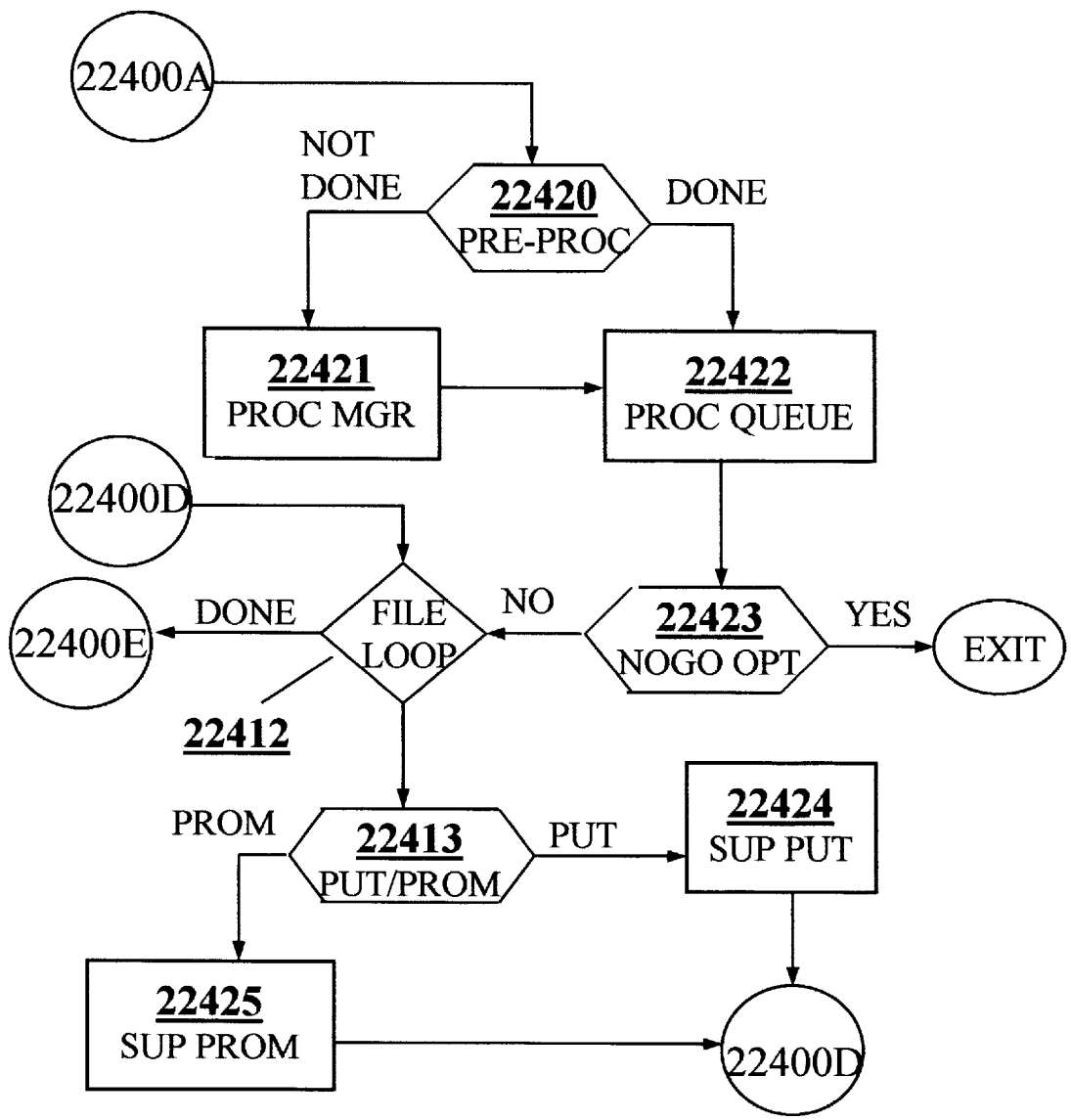

Upon completion of List Files, the Pre-Processing Done flag is examined in Step 22420 of FIG. 15c. The flag is set to "Done" if no Pre-Processing is required, or whenever the Process Manager completes all required Pre-Processes. If the answer is "no", then the Process Manager, in Step 22421, is employed to run any pre-processes that exist. The Process Manager processes all files in the list with a single invocation using control file generated in Step 22419. If any of the pre-processing fails, the promotion with an appropriate error message. At the completion of the Pre-Processing, the PreProcessing flag is set, and the Process Queue in Step 22422 is interrogated. Although the processing completed in Step 22421, it may have required work to be dispatched to other ALMs. In this situation, the DMS maintains data integrity by setting a Processing lock in the Process Queue. If the current ALM detects an outstanding lock in Step 22422, on the file being processed, it will recycle the promote request until the lock is cleared. This ensures that the order of execution for library processes is always maintained regardless of the distribution of workload.

Continuing with Step 22423, a special option flag denoted Nogo is checked. If it's set, the promotion terminates successfully even though no files were actually transferred. This is a mechanism the DMS uses to initiate library processing against a transient file which doesn't need to be permanently retained. For example, a transaction file may be promoted into the DMS for the sole purpose of initiating a library process to update a master file residing in the library. Once the master file is updated, the transaction file is no longer necessary so it can be discarded. In this case, the Nogo option terminates the Put without wasting time transferring and deleting the file. If the Nogo option doesn't exist, control proceeds with another File Loop Once again Step 22412 is invoked to loop through all the files in the request. In addition, Step 22413 is used to determine if this is a Put or Promote. In the case of a Put, Step 22424, Sup Put is exercised. In our preferred embodiment, this is performed via the QRSUPPUT routine, described in FIG. 47, which is responsible for updating all the necessary tables to indicate that the file now resides in the new Entry Level location. In addition, the Control Repository examines the Fix Management and Part Number flags for the current Package, File Type, Version, and Level (PFVL). It also checks to see if the EC or Part Number Control Levels are being crossed. Depending on the results of these flags and levels, it expects the corresponding Problem Fix numbers, Part Number and/or EC Number to be available. This information was gathered during Step 22102, Foreground Process The DMS updates all tables associated with Problem Fix Management and Part Number control at this time. If the file is overlaying an older version of the same file, the Problem Fix numbers from the old file are appended to those of the new file. Any previous iteration of the file, at a higher level, with the same Problem Fix Numbers as the file being promoted will result in the higher level Problem Fix Numbers being Superseded. Also, the locations of the File Group subordinate files are updated. If this query completes successfully, the file is officially promoted into the DMS, even though the file hasn't physically been transferred yet. In order to maintain absolute data integrity, the DMS always has the correct information. If a file physically resides in a state other than that reported by the DMS using a query, the file is in error and needs to be rectified.

If Step 22413 determines the request is a Promote, Step 22425, Sup Prom is invoked. In our preferred embodiment, this is a accomplished by the QRSUPPRM routine, described in FIG. 39, which is responsible for updating all the necessary tables to indicate that the file and all File Group subordinate files now reside at the level above the Source Level. For BOM promotes, the tables for all member files previously at the Source Level are updated as well. Members currently at the Destination Level or higher, or members in other libraries, will not be affected. In addition, the Control Repository examines the Part Number flag for the current Package, Version, Level and LFT. If it exists, and the Part Number Control Level is being crossed, it expects the corresponding Part Number to be available. Likewise, the DMS checks to see if the EC Level is being crossed, and if so, the appropriate EC Number must be present. This information was gathered during Step 22102, Foreground Process The DMS updates all tables associated with Problem Fix Management by appending any new Problem Fix Numbers to any existing numbers pertaining to the previous iteration of the file. Any previous iteration at a higher level with the same Problem Fix Numbers as the file being promoted, will result in the higher level Problem Fix Numbers being Superseded Subsequently, the DMS attaches all Problem Fix Numbers for this file to the EC Number. Also, the Part Number tables are updated, as necessary.

Figure 15D:
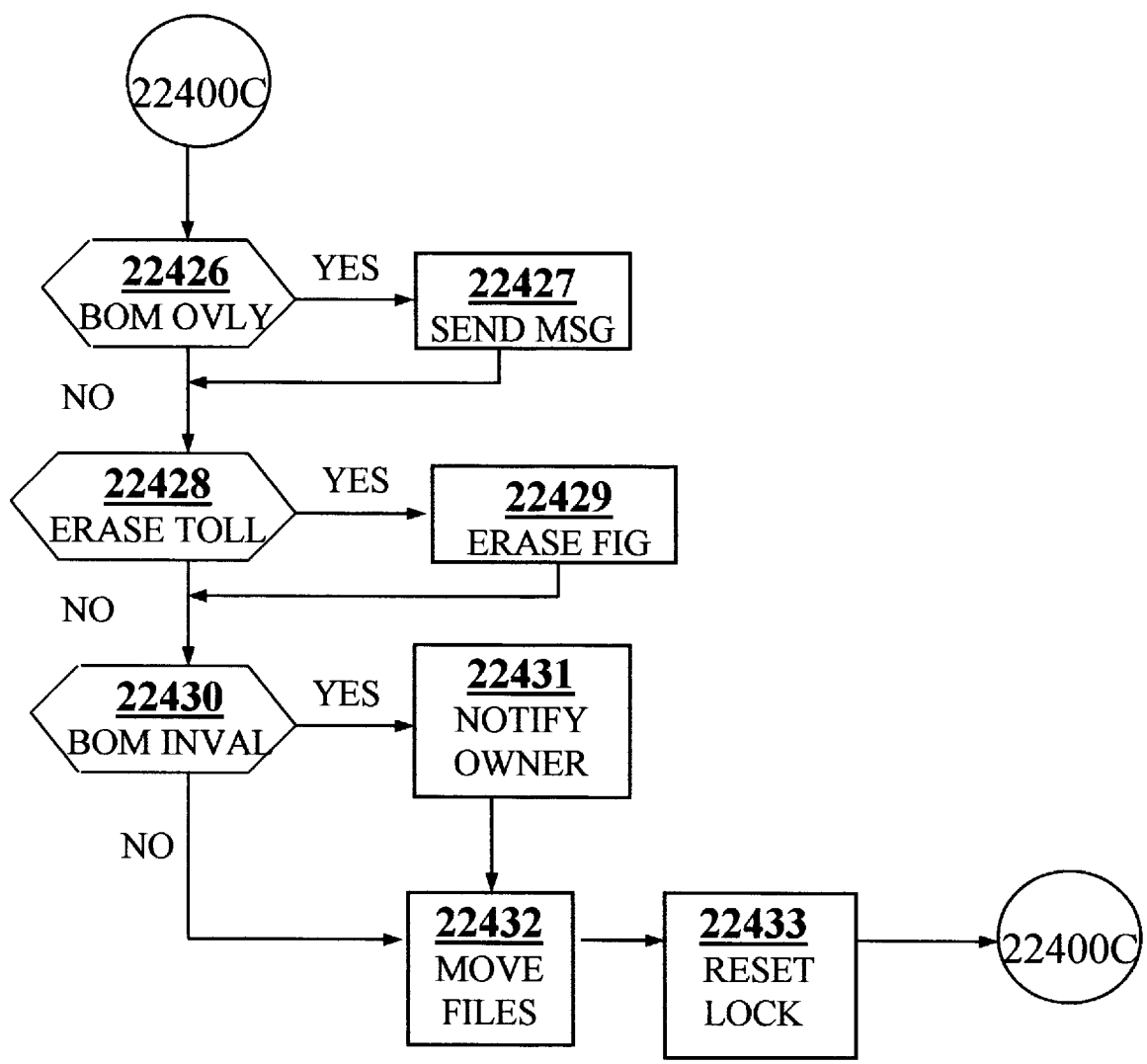

At this point control proceeds to FIG. 15*d* where various flags must be checked, and possible additional actions taken. In Step 22426, BOM Ovly, the Sup Put or Sup Prom return code is checked for an indicator that an existing BOM was overlaid by this promotion. If so, then Step 22427, Send Msg is invoked to send a message to the owner of the BOM informing them of the BOM eradication. Next, Step 22428, Erase Toll Fig is invoked to check if a file group exists for the file being promoted. If so, and the Erase-To-Level flag is set, then Step 22429, Erase Fig is invoked. Here, the program determines whether the subordinate file will be replaced by an incoming file. If not, the existing subordinate file is erased and a message is sent to the owner informing them of the file removal.

In Step 22430, the BOM Invalidate flag is checked. This indicates that the promotion of this file caused one or more BOMs somewhere in the DMS to be invalidated. This would happen if this file is a member of some other BOM. A sophisticated algorithm exists in the DMS to quickly check all BOMs in the system for the presence of this file. If an invalidation occurs, Step 22431 is invoked to Notify BOM Owners exactly which BOM was invalidated and which file caused the invalidation. It should be noted that Steps 22426 and 22428 and 22430 can be checked in any order.

The algorithm continues with Step 22432, Move Files. The method for moving data is very dependent upon several factors. These include the system environment, the existence and/or arrangement of Automated Library Machines, and the user options selected during initiation of the Put or Promote. If no ALMs exist in the DMS, it's assumed that the user's client environment has the proper read and write access to the data repositories. The code uses the appropriate combination of copy, delete and/or rename commands to accomplish the desired Move operation. However, if ALMs are employed, a Move algorithm is used to determine how this step is implemented. This algorithm is discussed in more detail below. For the moment it's assumed that a method is in place to copy, delete, and/or rename files throughout the entire DMS.

In our preferred embodiment Step 22432 is usually done with a file copy for a Put operation, but the system does support an environment where files can be sent, or otherwise transmitted. To accommodate this, a special option called "ViaCopy" exists on the main promotion menu. It defaults to an "on" position, but can be turned off to signify that the data files are being sent to the ALM's reader along with the control information. If the files are sent, they must be "read" into a temporary holding area while the promotion process takes place. Otherwise, they can reside in the user's private space until the actual transfer takes place. At this point the file is physically copied from the source location to the Entry Level. In addition, any subordinate files that belong to this file's Automatic File Group are also transferred to their destination.

For a promote, the preferred method is to move the file(s) from the source location to the destination location. This may result in a simple rename of the file(s) if both physical locations are identical, or it could result in the file(s) being physically moved from one server to another. The exception to this is if the Retain Source option is specified on the promotion screen in Step 22101. This would result in copying the file(s) from the source to the destination.

For a BOM Promote, a list of all BOM members is returned by the Control Repository in Step 22425. All members on this list are moved in the same manner as the Anchor file indicated in the main File List.

Similarly, if the current file is the Master of a File Group, a list of all subordinates are returned from the Control Repository during Step 22425. This list is used to move all the subordinates to their target destination.

For environments incorporating Automated Library Machines, the ALM must have a means to access and update any data within its own library. Whenever possible, all ALMs in a given library are provided with read and write authority to all physical data repositories. For example, in a simple DMS all data within a library would reside in a single directory, and the ALM would have read and write authority to that directory. However, since our embodiment permits different PFVLs to reside in separate repositories, this can't always be achieved. For instance, one PFVL may reside in a Unix or AIX directory, while another PFVL resides on a VM Minidisk. An ALM running in the Unix/AIX environment may not have direct write access to the VM Minidisk. The following algorithm is used to handle all types of file movements in the DMS, depending on the ALM configuration and platform environment.

In order to maximize efficiency, the ALM will always try to rename or move a file if the environment supports such an operation and the source and target PFVL reside in an amenable environment such as two Unix/AIX directories (same or different) or the same VM Minidisk. In this case, the ALM attaches to the target repository in a writable manner, and performs the move operation. Otherwise, the operation is performed by a combination of file copy followed by file deletion. In this case, the algorithm first determines if both the source and target repositories are writable by the ALM. Such is the case for a Conventional ALM system or an Actor/Object system running in a Unix/AIX environment. Here, the ALM directly performs the copy from the source to the target PFVL. Once the file is safely copied, the ALM deletes the source file. In an Actor/Object configuration in a VM environment, the Actor must send a message to the Object and pass a list of files to be copied and deleted. The Object runs a continuous message handler which allows multiple Actors to interrupt and initiate the copy and deletes. For situations such as a Conventional ALM arrangement running on a VM system, where the source and target PFVLs are on different account Minidisks, the ALM handling the promotion always has write access to the target PFVL. Therefore, it can directly perform the copy operation. The delete is handled by generating a file deletion request similar to that generated by the File Deletion routine. This job request is transmitted to the ALM with write authority for the source repository.

Figure 15E:
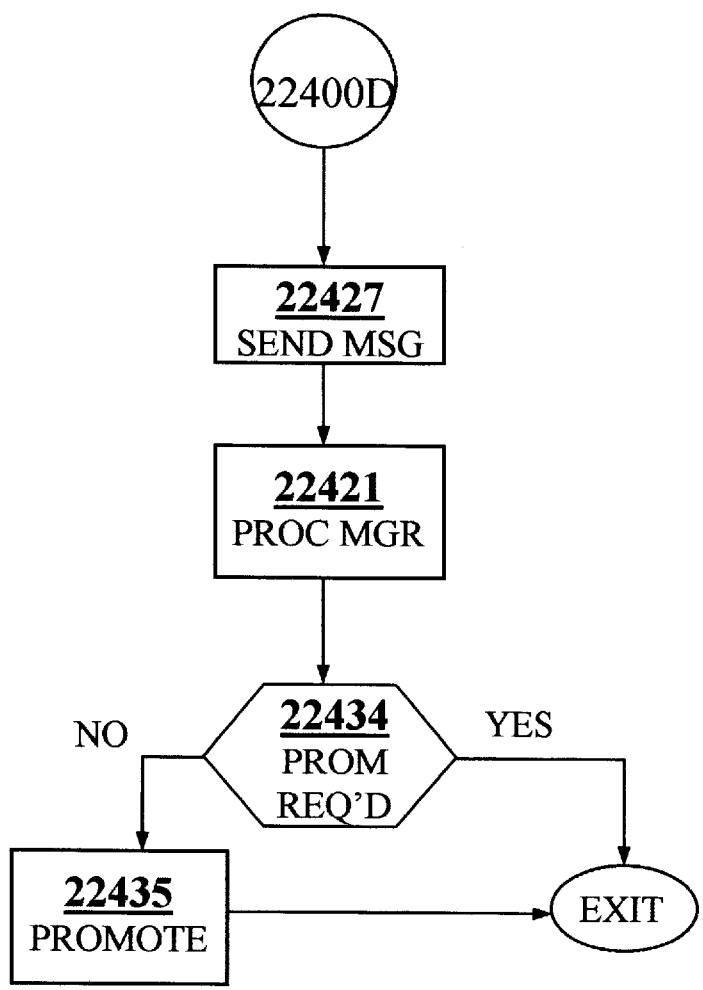
Figure 16A:
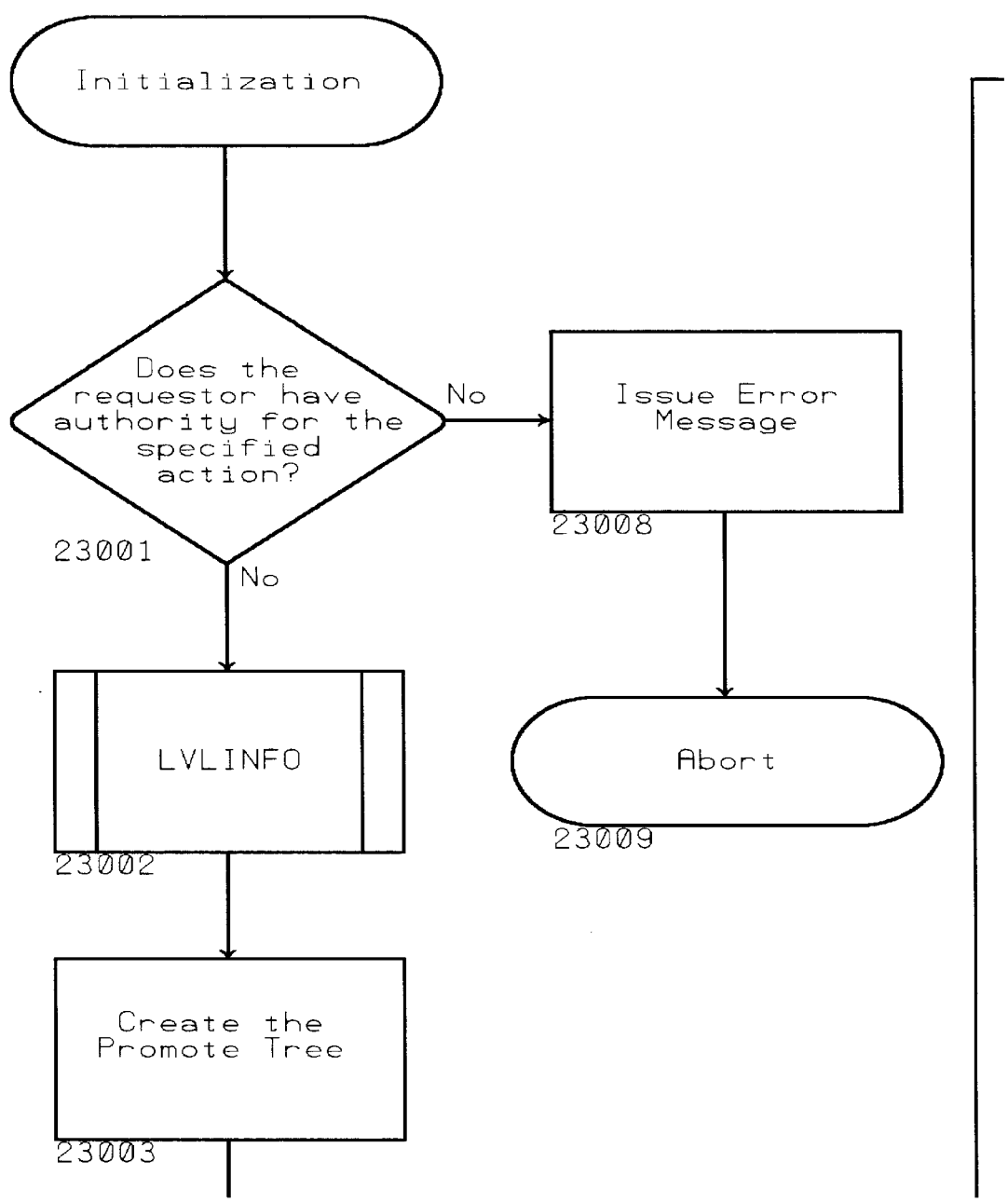
FIG. 16a thru 16g describes the QRSUPCHK Process.
Figure 16B:
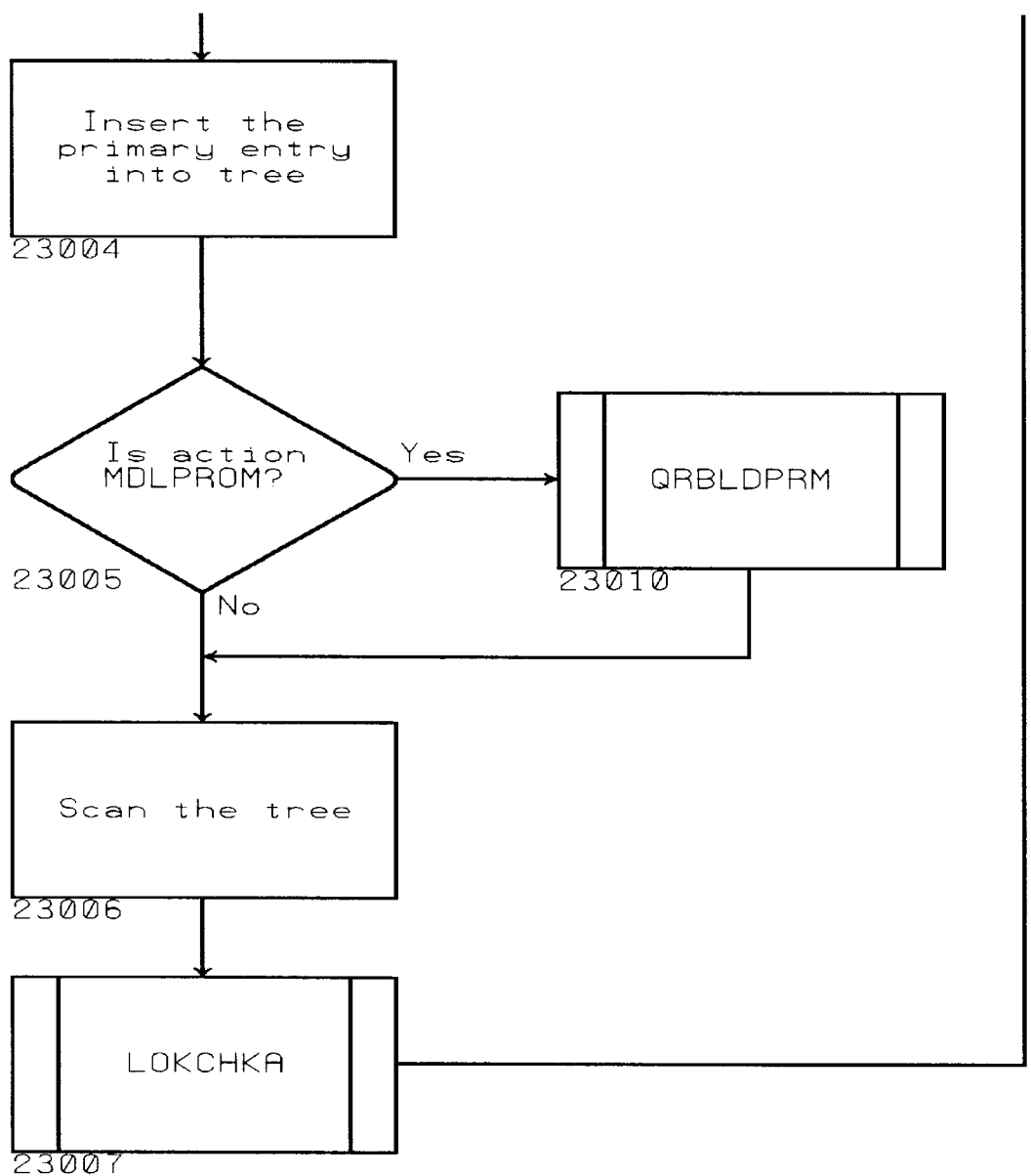
Figure 16C:
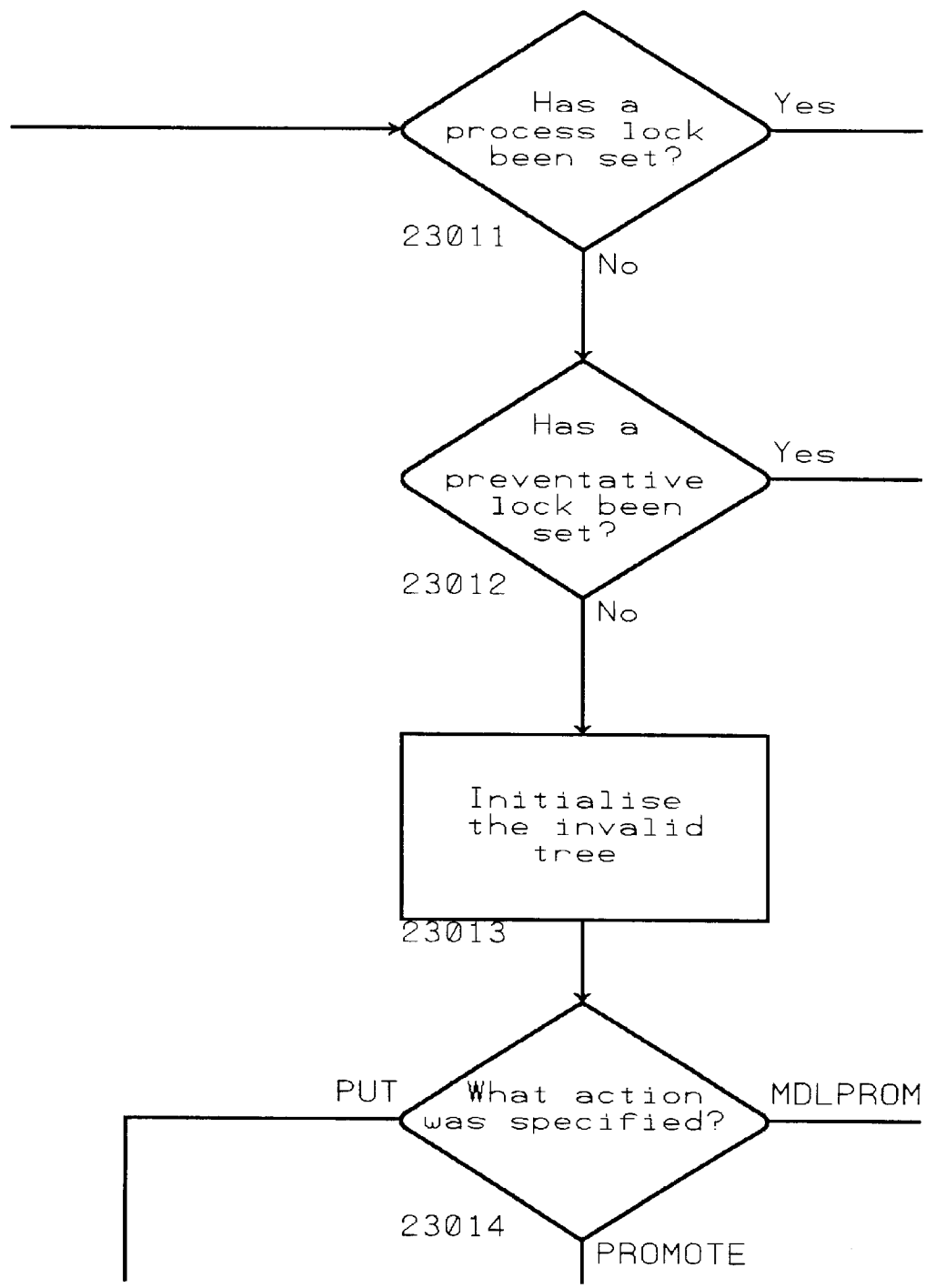
Figure 16D:
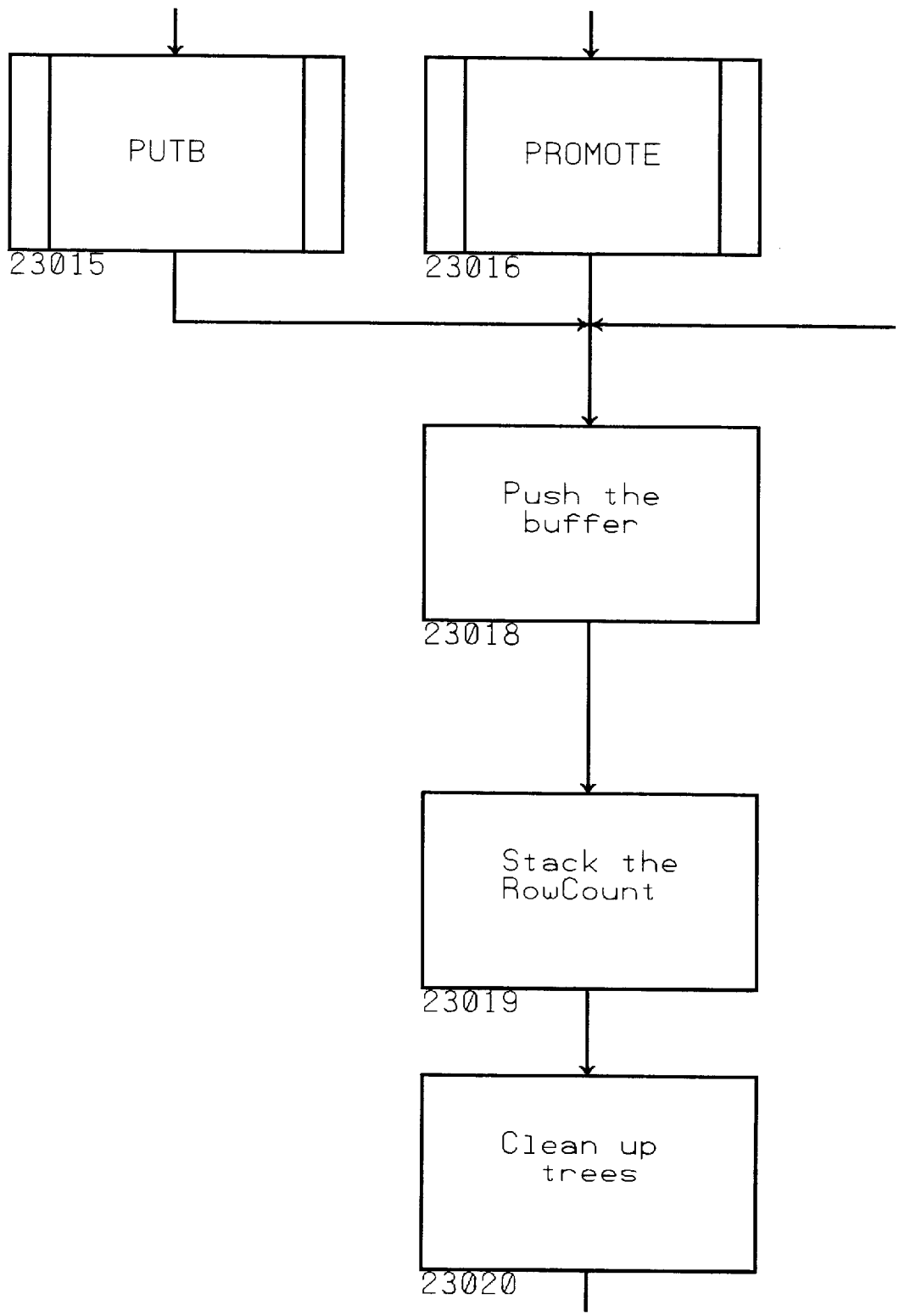
Figure 16E:
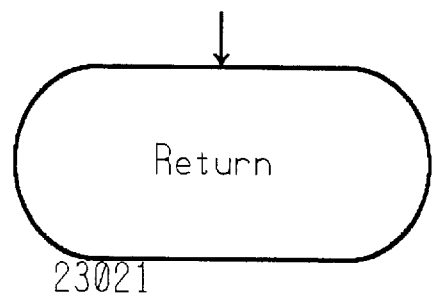
Figure 16F:
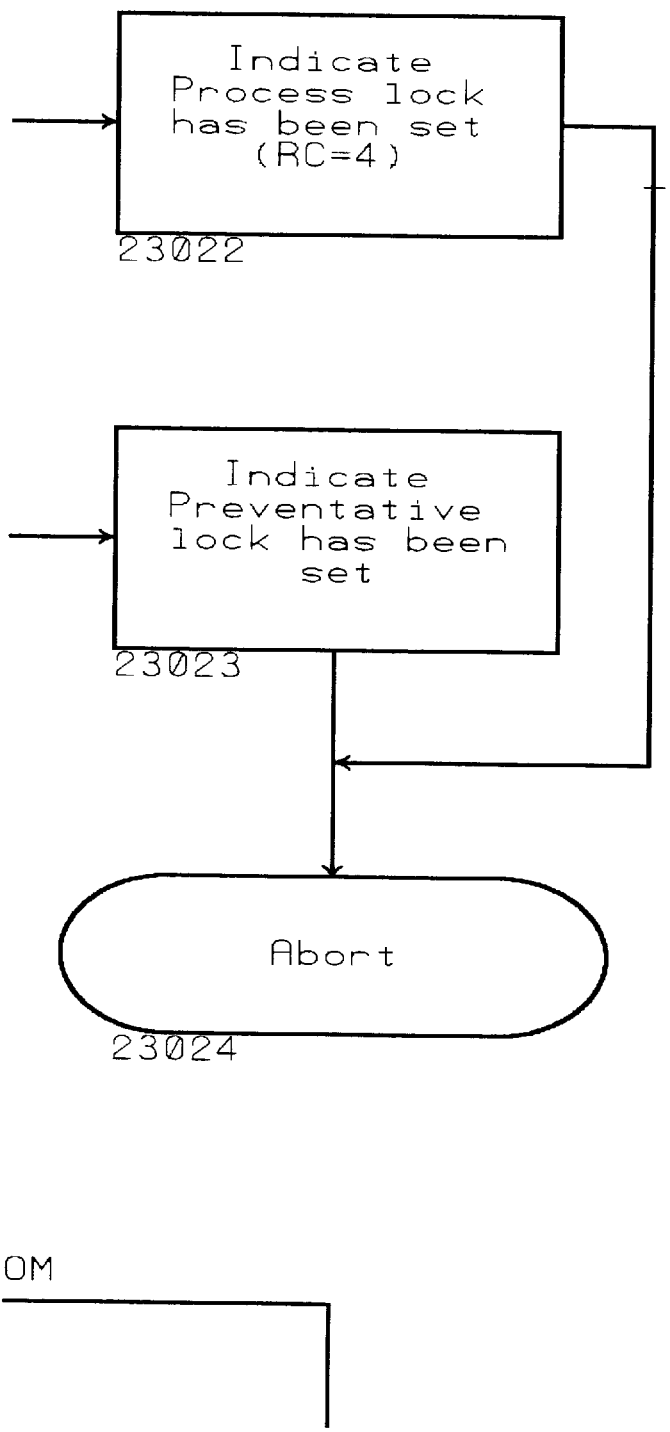
Figure 16G:
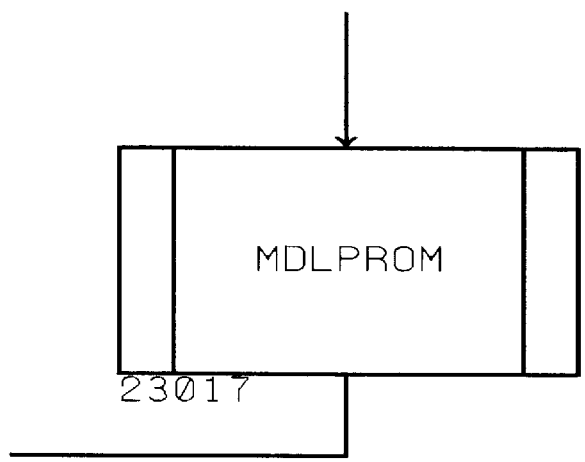
Figure 55A:
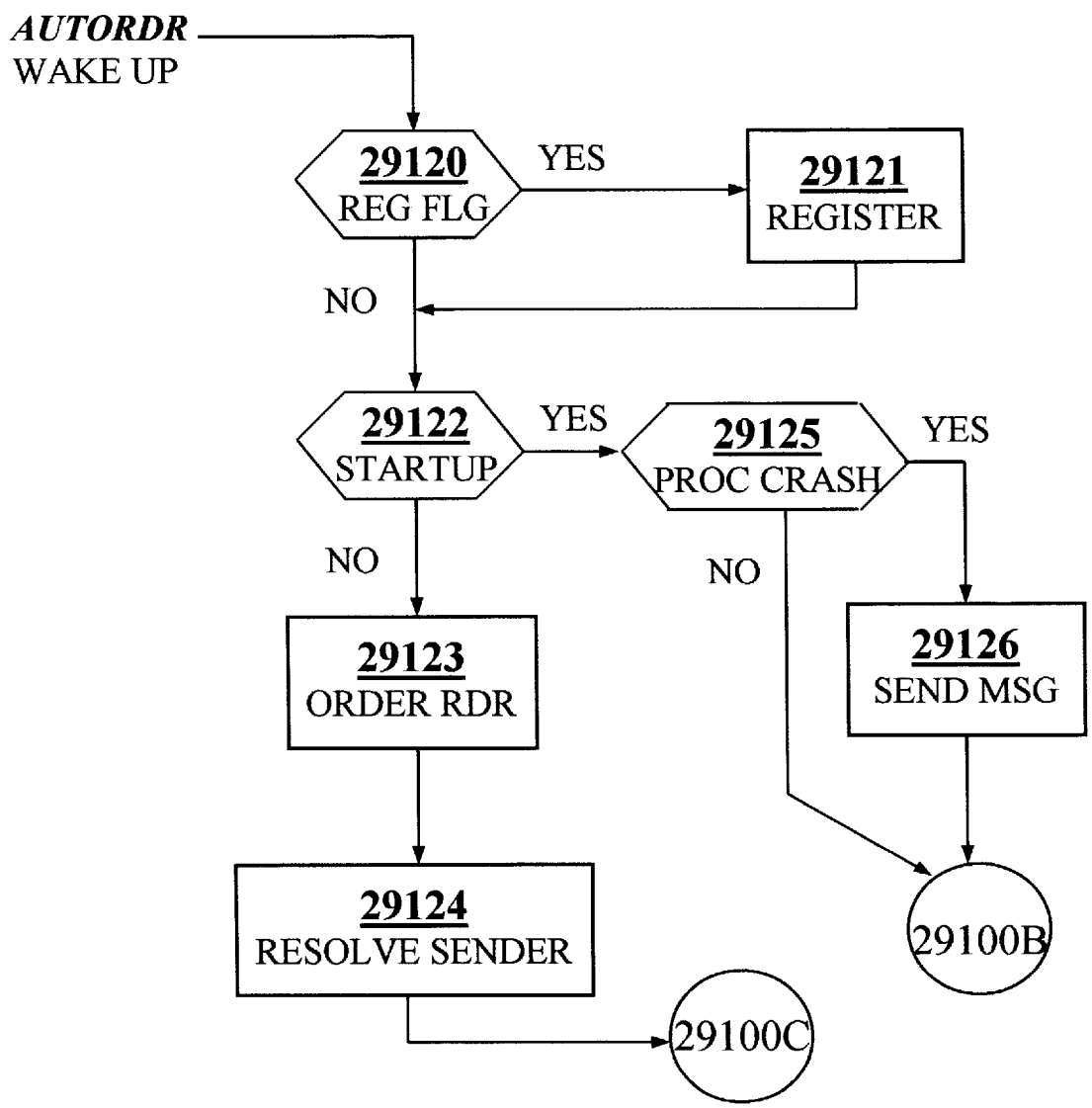
FIGS. 55a thru 55f describes the algorithm for running an Automated Library Machine (ALM).

For promotions involving the movement of data across different platforms, our embodiment incorporates the concept of a Cross-Platform Transfer. The method differs depending on the source and target platforms. Our embodiment will always try to use the ALM currently executing the Promotion algorithm to link to the target platform directly. In these cases, the underlying Actor/Object code sets up the appropriate file transfer protocol and copies the file from the source to the destination. It then deletes the file from the source repository. The most complex case is when the target environment can't be linked directly by the ALM. Such is the case when the ALM is running in a Unix/AIX environment, but the target PFVL is on a VM Minidisk. Achieving this file transfer involves using dedicated ALMs running on the source and target platform, which serve as agents to forward the work requests. The following steps are performed:

1. The ALM prepares a special Cross-Platform Transfer request file which contains the source and target level, the userid of the requestor, the type of promote, and a list of all files that need to move. This request file and the original promote request are copied into a special punch directory whose name is also contained in the request file.
2. The ALM currently processing the promote, establishes a socket connection with the VM agent to request a file transfer to VM.
3. The VM agent copies all the data from the punch directory, and the CrossPlatform Transfer request file to its working space.
4. The request is sent to the appropriate VM Actor, where it's handled by Steps 29162 and 29163 of the ALM algorithm. This algorithm is described in detail in FIG. 55c. Step 29163 takes care of transferring all the data as well as deleting the copies from the source repository.
5. At this point, the code exits the Promotion algorithm, and the remaining steps in FIG. 15d and 15e are performed by the code executed in Step 29163 of the ALM algorithm.

Note: Our embodiment only supports Cross Platform promotions using Actor/Object arrangements.

An alternate embodiment permits all the files in the DMS to reside in the same physical location. Symbolic links would serve as place holders and reside in the locations defined by the Data Manager for each PFVL. During a Put, the link would be created while the file is being copied into the master location. During a Promote, the file would be renamed and the corresponding link would be updated. Depending on the environment, this may provide performance or data maintenance advantages over the preferred embodiment.

The last step within the File Loop pertains to the Update and Overlay Locks established in Steps 22414 and 22417. In Step 22433, Rst Lock, the Reset Lock Option is examined. If it's on, this signifies the user's desire to leave the file in an "unowned" state at the completion of the Put or Promote, and the program resets any Update Lock that exists for this file at the new level. For promotes, an additional step is taken to reset the temporary Overlay Lock set in Step 22414 regardless of the Reset Lock Option.

Control is returned to Step 22412 in FIG. 15c until all files in the request are exhausted. Upon exit from the loop, control is passed to FIG. 15e. Here Step 22427 is again invoked to send a message to the user indicating a successful Put or Promote. The message includes the names of all files processed including Automated File Groups and members of a BOM.

Next, the DMS again invokes Step 22421, Process Manager to run any Post-Processes that exist for any of the files. Just like with Pre-Processes, the Process Manager handles the entire list of files with a single invocation.

That last steps in the operation attempt to determine whether additional promote requests are necessary. In Step 22434, Prom Req'd, the Destination Level is compared against the current level for each file in the list. For Puts, the current level is the Entry Level. For promotes, it's the Source Level. If any files are found with a Destination Level higher than the current level this indicates that further promotion is necessary, and Step 22435, Promote, is invoked to handle this. In this step, a promote request is actually created listing all files which require further movement. The control file also lists their newly acquired level as their source level and lists their Destination Level as the target level. The entire background algorithm is repeated with Step 22411, but using the newly created promotion request as the main input control file. Once the current level and Destination Level are the same, the promotion is complete.

Methods of Storing, Retrieving, and Managing Data in a Shared Library System

The present embodiment incorporates various algorithms and processes to permit data to be stored into, deleted, and retrieved from the Data Management System while maintaining absolute data integrity. The Data Management System (DMS) is comprised of one or more shared public libraries servicing one or more users in a client server environment. The users may also have private libraries where work is performed until such time that it is ready to be deposited into a public library for shared access. Our embodiment has the capability to provide continuous access of the shared libraries to large numbers of users.

These algorithms and processes are especially suited to interacting with the File Promotion Process and Automated Library Machines (described in the other sections of the Preferred Embodiment), although they will work without Automated Library Machines and with other File Promotion Algorithms.

In order to safely deposit data into the Data Management System, our preferred embodiment uses an Installation Algorithm described in FIG. 33a thru 33d. The algorithm is depicted in a library environment using Automated Library Machines configured in any arrangement, although one skilled in the art would appreciate that the algorithm can function in the absence of ALMs simply by executing in the client's foreground environment.

The most frequent initiator of install requests is the Process Manager. The Process Manager executes Automated Library Processes which create output data that must be deposited into the DMS. Our embodiment maintains close ties between the output data and the source data used to create it. If this output data can't be successfully installed into the DMS, the source data may be prevented from moving through the DMS or undergoing further processing until the problem is corrected. Because of the multitude of different types of Automated Library Processing, our preferred embodiment contemplates several types of install requests combined with a plurality of user options.

The following types of installs are supported:

Regular Install Deposits the output into the DMS under full data control. The output file may or may not be assigned a File Reference number and completely tracked by the Control Repository. Once installed, the file can be processed like any other file in the DMS. The install can be immediate, whereby the install is initiated and further processing suspends until it completes, or the install can be delayed which means further processing may continue while the Library Manager processes the install request.

High Performance (HP) Install Similar to a Regular Install, except it deals with groups of component files. This occurs during an Aggregate Install which always begins with an Anchor file undergoing a Regular Install, followed by all the related components undergoing a High Performance Install. The information necessary to install the group of files is conveyed through a special file transmitted with the Install Request.

Create DILP Install Used only on the output file of a Create DILP. This install is identical to a Regular Install with some additional steps that assign the process result to the output file once it's safely in the DMS. The necessary information is passed to the Install algorithm through a special file transmitted with the Install Request.

Regular Store Deposits the output into the Data Repository, but the file is not tracked by the Control Repository. These files exist for some other reason than data management, and don't require any DMS operations (promote, library processing, problem tracking, etc.). This type of disposition can be immediate or delayed.

The following options are supported for the above types of installs:

Result: Allows Pseudo Process Results to be set against files being installed.

Note: All information is exchanged via a Results File

Part Number: Allows Part Numbers to be assigned to files being installed.

Note: All information is exchanged via a Part Number File

Resolve: Allows Library Process Results to be primed for files being installed as long as the process structure for the installed files is identical to that of the source files. For example, if a file is copied from a source PFVL to a target PFVL, since the installed file is identical to the source file, any Library Process results for the source file can be automatically propagated to the target file.

Note: All information is exchanged via a Resolve File

Figure 33A:
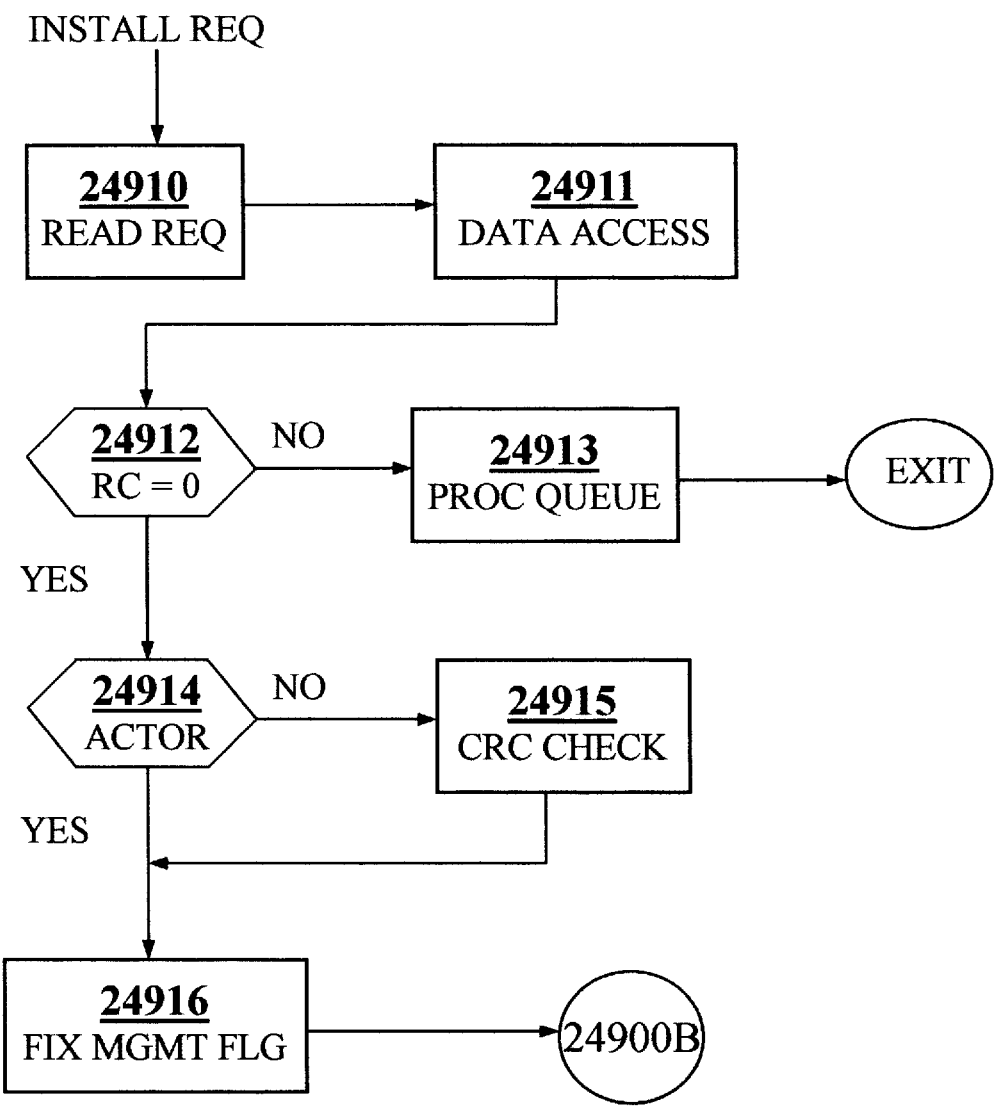
FIG. 33a thru 33d describes the algorithm for Installing files into the DMS.

Turning to FIG. 33a, the program begins by receiving an Install Request The Install Request contains the target Version and Level, the e-mail address of the user initiating the request, the File Name, Type and Package of the subject of the install, the Level Reference Number, one or more File Reference Numbers representing the data which was used to create the subject data, a multiplicity of user options, and a flag indicating whether a new File Reference number should be acquired for the subject data or whether an existing reference number should be retained. This information is generated by the algorithm responsible for creating new data which needs to be installed in the DMS. A typical example would be our Background Automated Library Processing.

In a Conventional System, this request may be transmitted from a Remote Execution Machine to a Primary ALM whose responsible for installing the data. In this case, the Install Request contains additional information regarding the Process Manager's Process Queue. This includes the Library Processing Phase (Pre, Post or DILP), the File Reference of the file used to set the Processing Lock and the Process Queue Reference Number. A Checksum or Cyclic Redundancy Code is also included to help detect transmission errors in the data. In an Actor/Object arrangement, the Actor can execute this algorithm directly, so there's no need to transmit the request. In this situation, no Process Queue entry is required and no CRC code is needed. However, the Install Request file is still created.

The algorithm begins with Step 24910, which Reads the request File into a data structure. In addition any user options are examined and for those requiring separate support files, the file names are assembled. The program also determines whether the ALM currently executing the algorithm is an Actor, and if it's not an Actor it checks to see if the request was sent from a different ALM. If so, the information in the Install Request is written into an Install Recovery file which is used by the ALM Algorithm, described in FIG. 55, to recover the install in the event of a system crash. Also, in a the case where the Install Request is transmitted, the subject data is also transmitted, so it is transferred into the ALM's working space.

Next, Step 24911 is invoked to perform a Data Access of the physical repository where the subject data will be deposited. This may be as simple as ensuring the ALM has the proper write authority (such as a Unix/AIX environment) or it may require linking media such as DASD in a VM environment.

Step 24912 tests for Return Code—0 from the previous step. A non-zero return code indicates that one or more physical repositories could not be located or accessed in the proper manner. This results in Step 24913 being called to possibly clear the Process Queue. Step 24913 tests to see if the Install Request was transmitted by a Remote Execution Machine. If so, the Process Queue Reference Number is used to delete that entry from the queue. Furthermore, if an entry exists and the Process Phase is a Pre-Process, then a special entry is added to the Process Queue in order to prevent any subsequent Library Processes or movements occurring against the source file used to generate the subject file being installed. This maintains data integrity in the DMS by ensuring that output data always matches input data, and input data may not be elevated to the next level unless all required Library Processes run successfully and the output is successfully deposited into the repository. Upon completion of Step 24913, the requestor is notified of the failed installation attempt and the program exits.

Returning to Step 24912, if the Return Code equals zero, then the physical repositories are ready to accept the data and control proceeds to Step 24914. In Step 24914, the Actor flag, set in Step 24910 is examined. If the flag indicates that the current ALM is not an Actor, then the Install Request was transmitted with a Cyclic Redundancy code which pertains to the data being installed. The program generates a new CRC Code using the subject data in the working area and compares this with the code embedded in the request file. If they don't match, a transmission error occurred which is a data integrity violation. This results in a message being returned to the requester, and the program aborting.

Assuming the transmission occurred successfully in a Conventional System, or if the current ALM is an Actor, then control continues with Step 24916 which sets the Fix Management Flag. This flag is passed to the underlying QRSUPGEN routine to tell it whether to propagate the Problem Fix Management data from the source files to the subject file. This flag is set to "true" if the Package is in Single Fix Tracking or Engineering Change Mode and the Library File Type has its Fix Management flag active.

Figure 33B:
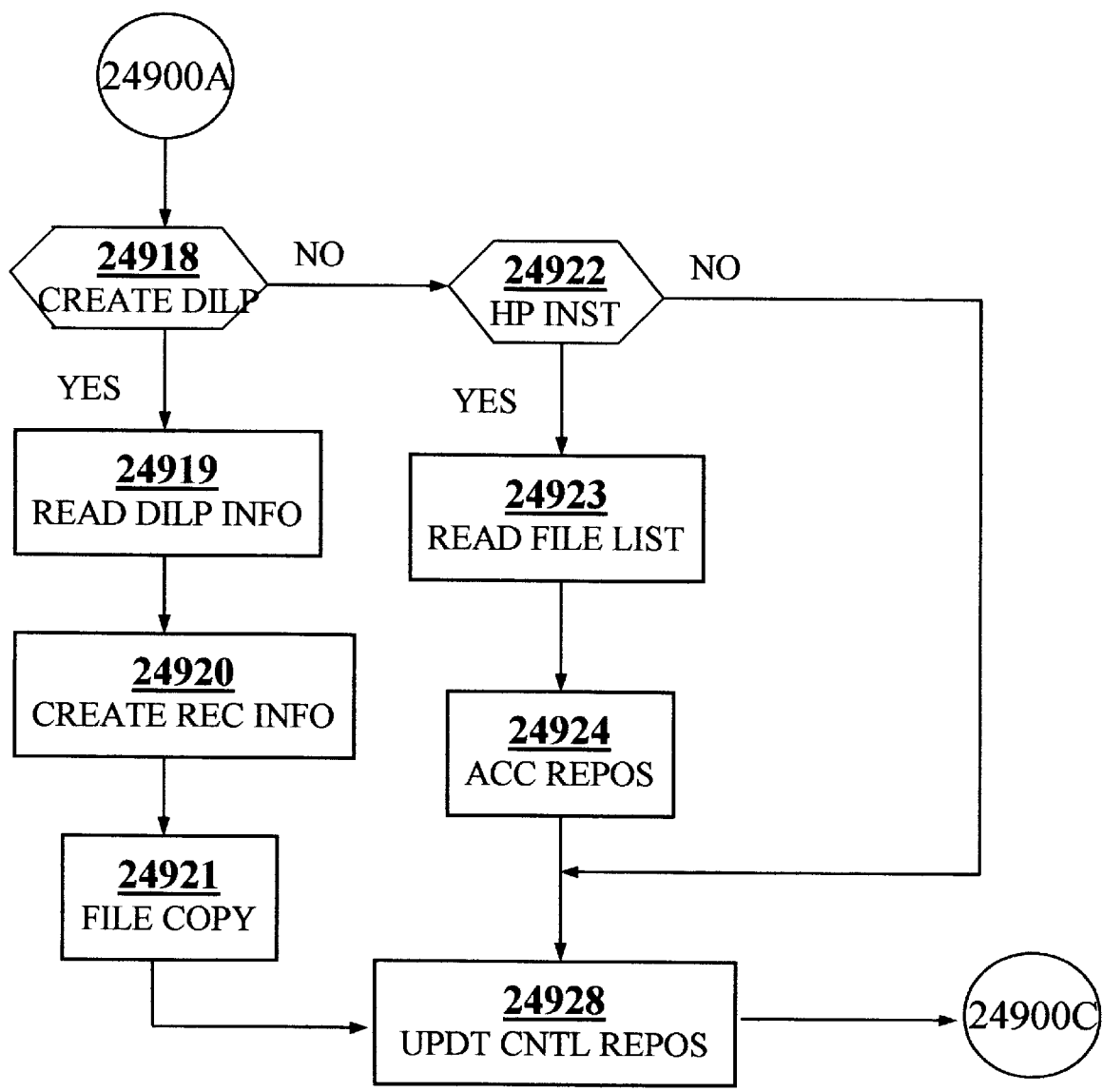

At this point, control is passed to Step 24918 in FIG. 33b. In the preferred embodiment, Step 24918 is exercised before Step 24922, but these are independent tests which can be performed in either order. In Step 24918, the Create DILP option is examined. If the current request is for output generated by a Create DILP, then Step 24919 is executed to Read the Create DILP Info. This information is stored in a separate file which accompanies the Install Request and the subject data. The file contains the true name of the output file, which may differ from the name contained in the Install Request. Create DILPs are part of our library process. This file also contains the Log and Process Reference Numbers of the Library Process which created the file, and the Library Process Return Code. Step 24920 is then invoked to Create Recovery Information. This consists of generating a Create DILP Recovery File which includes all the information in the Create DILP file along with the corresponding Control Repository command required to store the information in the DMS. In the event of a system crash, the ALM Algorithm in FIG. 55 will use this file to exercise all the steps necessary to recover and complete the installation.

Finally, Step 24921 performs a File Copy into the repository. The file is copied here temporarily so it's sure to exist in the event of a crash. However, if the subject file is overlaying an existing file, the existing file is backed up first. This enables the ALM Algorithm to completely and accurately reproduce the state of the DMS if the subject file is unable to be properly installed. A flag is written into the recovery file indicating whether an overlaid file has been backed up.

If the current request is not for a Create DILP, then Step 24922 is employed to test for a High Performance install. This option can be requested to install a group of files. Our embodiment requires that at least one member of the group to act as an Anchor file. This means it must endure all the normal checking of a regular install. The remaining files benefit from the High Performance install which eliminates certain checks that are redundant to those done on the Anchor file. The list of files to be installed is maintained in a separate file transmitted with the Install Request. Step 24923 Reads the File List into a data structure that will eventually be passed to the Control Repository.

Step 24924 is then invoked to Access All the Repositories necessary to accommodate the entire list of files. Since our embodiment permits the list to include files of differing PFVLs, and files may be physically segregated down to the PFVL granularity, a plurality of repositories may have to be acquired. The method of access is identical to that performed for the subject file in Step 24911.

Figure 28:
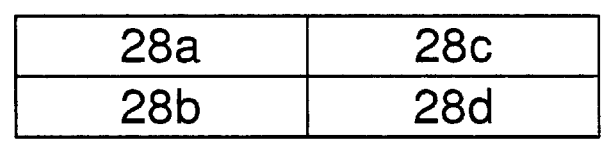

Whether the tests performed in Steps 24918 and 24922 are true or not, control eventually reaches Step 24928 which Updates the Control Repository. This step consists of updating all the necessary tables with the information required to track the subject file(s). In the case of a Create DILP or regular install, the QRSUPGEN routine, described in FIG. 28, is called. In addition to the File Name and PFVL information, the algorithm also passes the New File Reference flag, the Problem Fix Management flag, and any of the Source File Reference numbers pertaining to the source data used to create this data. In the case of a High Performance install, the same information is passed with the exception of the Problem Fix Management flag. Instead a list of the entire file group is passed. If an error occurs, such as the existence of a lock which prevents the install, and this is a Create DILP which necessitated the back up of an old subject file in Step 24921, then the backed up file is restored. All severe errors during this step result in a message being sent to the user, followed by the immediate termination of the installation.

Figure 33C:
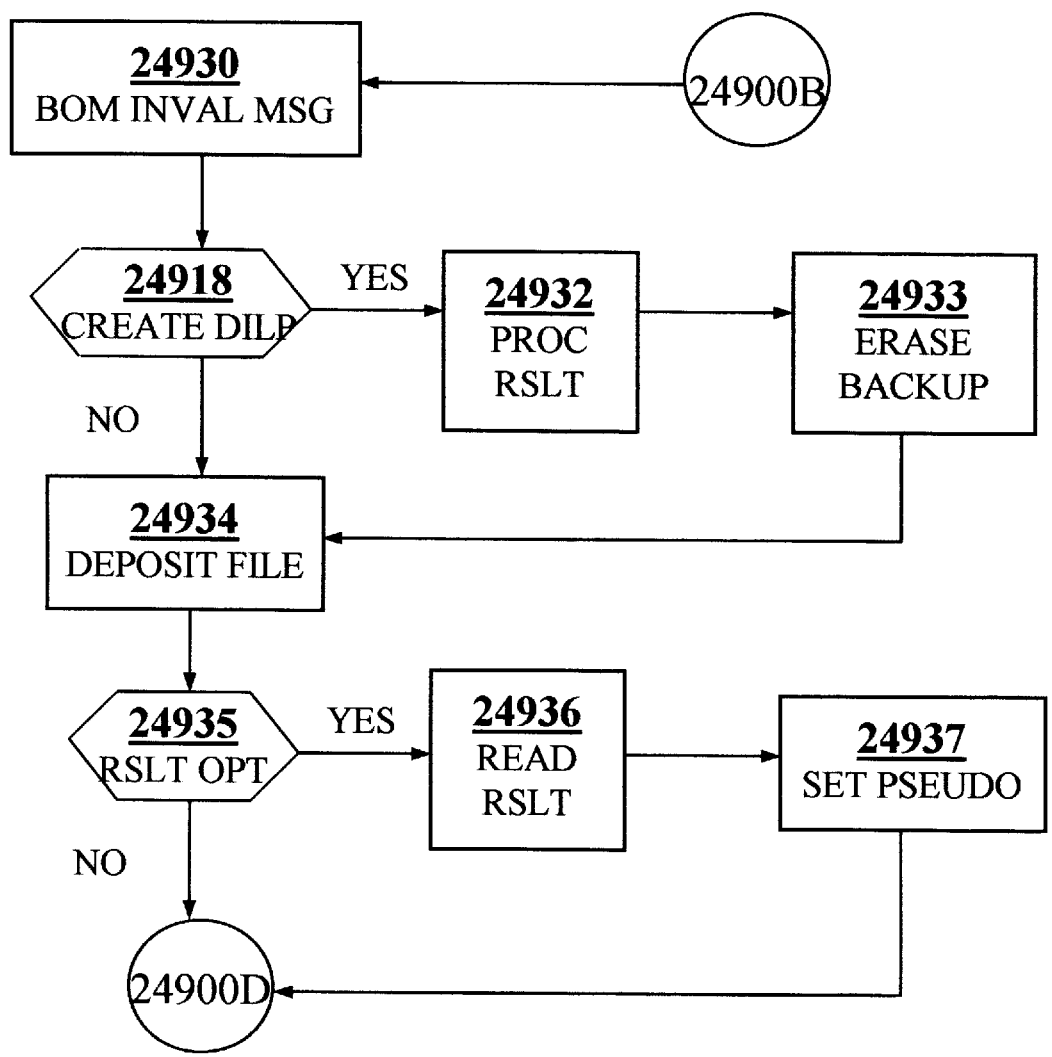

If no severe errors occurred during Step 24928, then control proceeds to Step 24930 in FIG. 33c. Here the return code of QRSUPGEN is examined for a Bill of Materials (BOM) Invalidation Message. Two types of warnings exist. One case is when the subject file overlays an existing file which happens to be the Anchor of a BOM. In this case, the BOM is deleted and the owner of the BOM is notified. The other case is when the subject file overlays a file which is the member of a BOM. In this case, the BOM becomes invalid and the owner of the BOM is again notified.

Next the program again invokes Step 24918 to test the Create DILP option. If this is a Create DILP install, then Step 24932 is employed to store the Process Result into the Control Repository. This result, along with the Process and Log Reference Numbers are contained in the Create DILP file. Since a Create DILP requires the Library Process result to be recorded against a file that doesn't exist when the process completes, the Process Manager must forfeit the setting of the LP result to the Install algorithm. Once the result is set in the Control Repository, Step 24933 checks to see if an overlaid backup file exists from Step 24921, and if so, it Erases the Backup file. It also erases the Create DILP recovery file, since all the steps that can be recovered have succeeded.

Control eventually reaches Step 24934 which Deposits the File into the data repository. The program checks to see whether the current ALM is an Actor. If so, and the environment allows the Actor to have direct write authority to the repository (such as Unix/AIX), the ALM copies the subject file from the Actor's working space to the target repository. If it's an environment such as VM, then the Actor establishes a communication link with the corresponding Object ALM, and requests the file copy. If the current ALM is not an Actor, then it must have write authority to the repository, so it simply copies the file from the working space to the physical location. If the current install request is for a High Performance install, the same steps are run against each file in the file list except for the Anchor. The Anchor is bypassed since the definition of a High Performance install requires the Anchor to be installed separately using a regular install request.

Next, Step 24935 is performed to test for the Result Option. If this option is passed, then there are Pseudo Process results which need to be recorded against the subject file. Step 24936 is employed to Read the Results File which contains the Pseudo-Process Name, the result, an optional message, and the name and PFVL information of the file for which the result should be recorded against. The code looks through the file for a matching file name and PFVL, and if one is found, it calls upon Step 24937 to Set the Pseudo. This is done via a function in the Process Manager to set the Pseudo-Process result into the Control Repository. Disclosure # PO996-0009 contains more information on Pseudo-Processes and the Application Program Interface that allows other routines to set them.

Figure 33D:
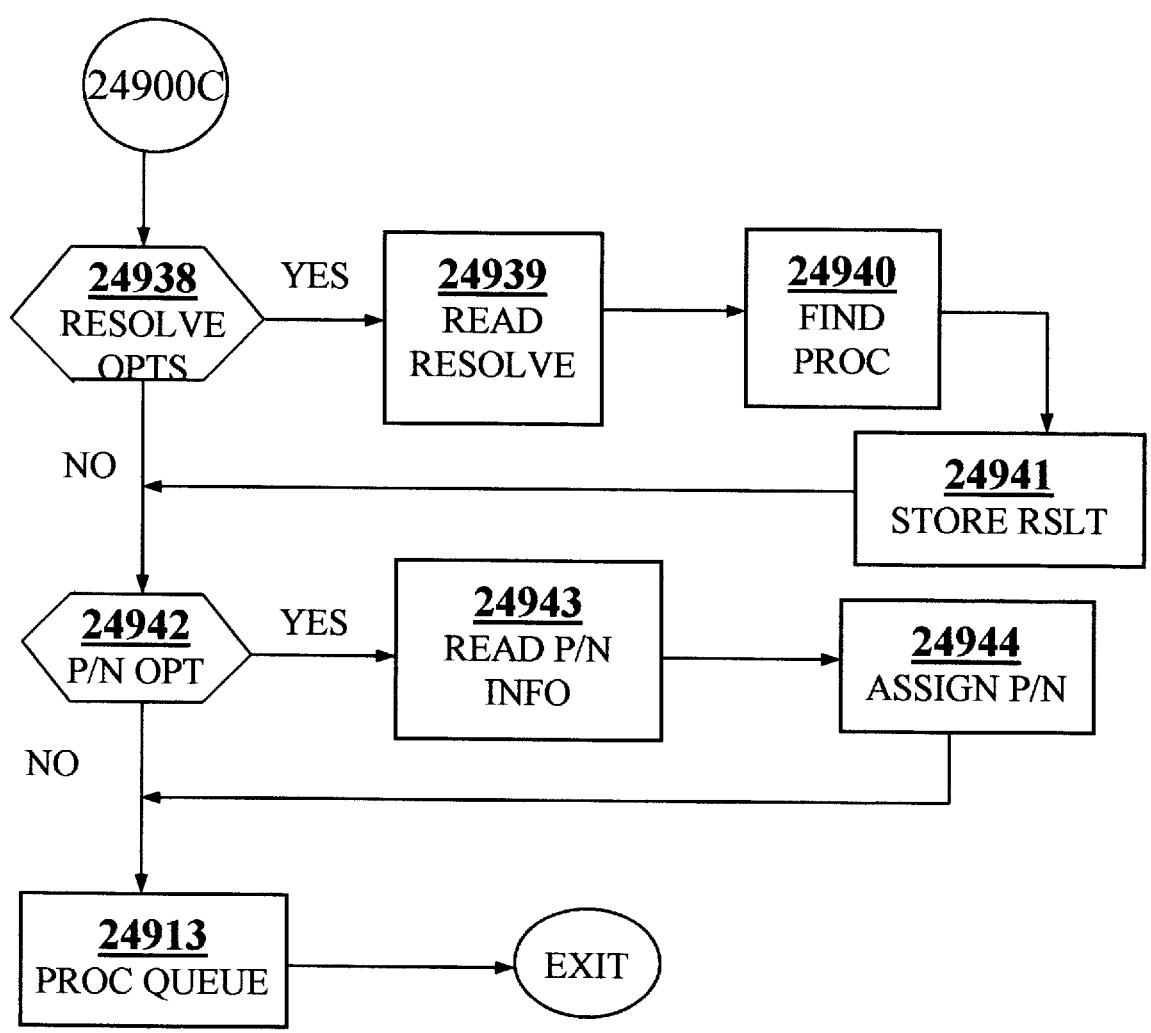
Figure 34A:
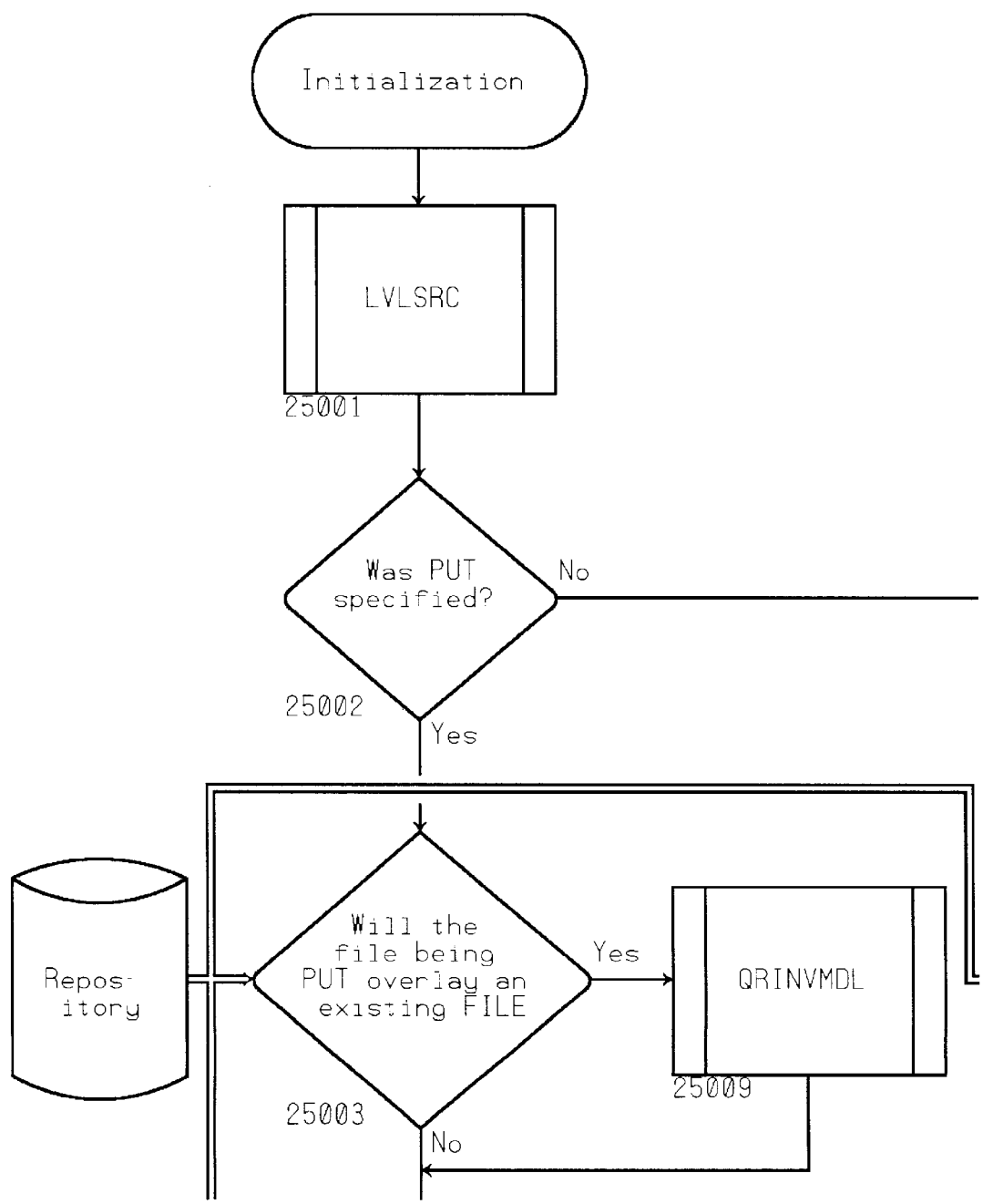
FIG. 34a thru 34f describes the QRSUPGET Process.
Figure 34B:
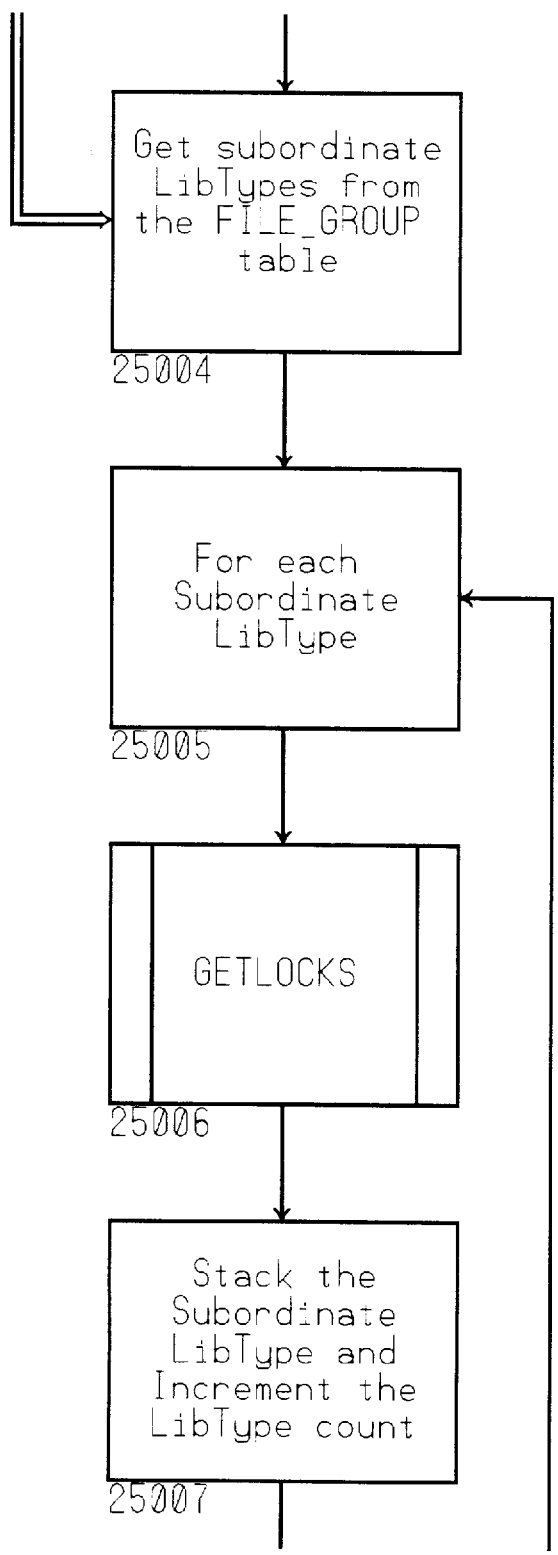
Figure 34C:
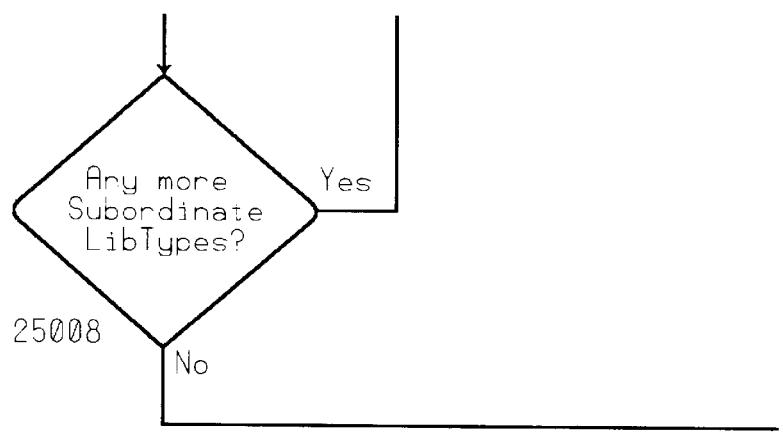
Figure 34D:
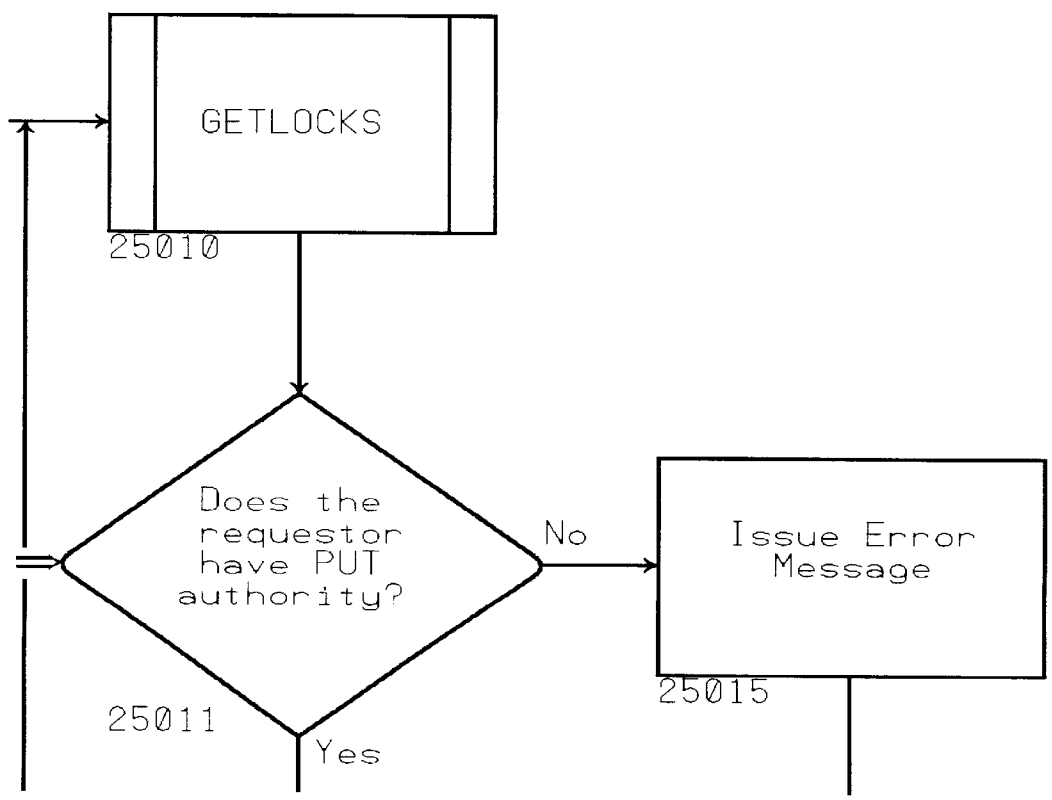
Figure 34E:
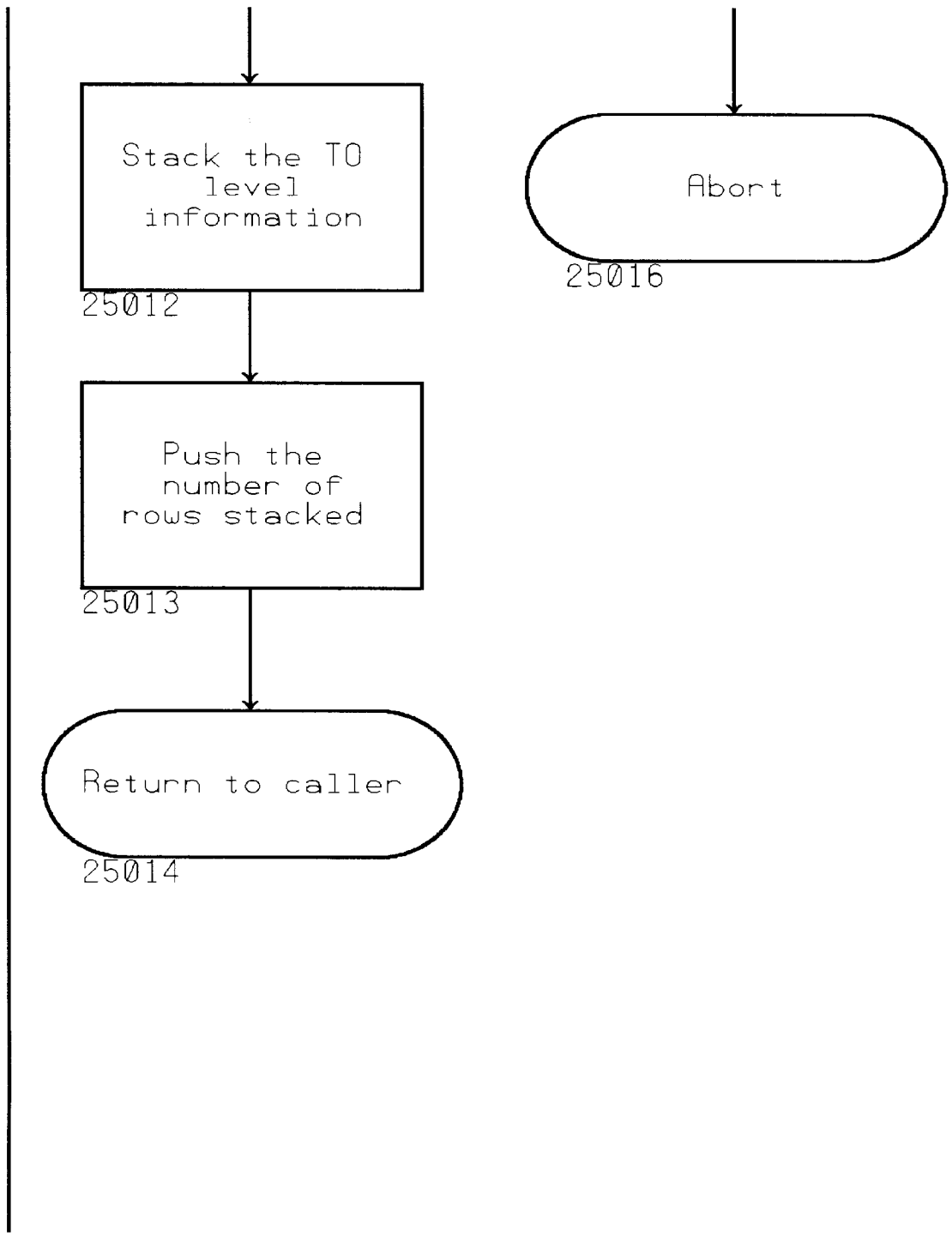
Figure 34F:

Eventually control passes to Step 24938 in FIG. 33*d* which tests for the Resolve Option. This option allows Library Process results from a different PFVL to be recorded against identical processes for the subject PFVL. If this option is passed, Step 24939 Reads the Resolve File which contains the Process Name, Process Reference Number, PFVL information where the source process resides, the Process Result to be recorded, the File Name and PFVL of the subject file and an optional Process Message.

Step 24940 is then employed to Find the Matching Process. This is done by querying the Control Repository for all processes defines for the source PFVL. The code loops through the process definitions until it finds one whose Process Name and Reference Number match the information in the Resolve File. If no match is found, the information in the Resolve File is inaccurate, and the program terminates with a message sent to the user. If a matching process is found, the exact location in the process structure is saved. Next, the control repository is queried for the process structure defined for the subject PFVL. The same location in the process structure is examined to ensure the Process Name is identical to that listed in the Resolve File. If not, then the structures are different, and the rule regarding use of this option is violated, thus causing the process to abort. If the Process Names match, the Process Reference of the subject PFVL is used to query the Control Repository and store the Process Result and Message against the file being installed. Step 24941 interacts with the Process Manager to Store the Result into the Control Repository.

Eventually, Step 24942 is invoked to test for the Part Number Option. This option is used to store P/N information against the subject file. If this option is passed, Step 24943 is called to Read the Part Number File which contains the Part Number, the File Name and PFVL for whom the Part Number belongs, and the owner of the P/N. The program loops through the Part Number File until it finds an entry whose File Name and PFVL match the subject file. Step 24944 is then employed to interact with our Release Control Manager to Assign the Part Number information into the Control Repository.

Note: In the case of a High Performance install, the subject file referred to in Steps 24935 through 24944 would actually be all files in the High Performance File List whose names and PFVLs match those listed in the Results, Resolve and Part Number files.

Finally, Step 24913 is executed in the event that a Process Queue entry requires clean-up. If the install request was received from an ALM other than the current ALM, then the sending ALM set an entry in the Process Queue. That Process Queue Reference number is included in the install request, and is used to remove the entry from the queue. In addition, if the Process Phase is a Pre-Process, and any part of the algorithm failed to complete successfully, then a special entry is added to the Process Queue to prevent any subsequent Library Processes from executing against the source files. In addition, the source files are prohibited from moving through the DMS until the install can be successfully retried.

File Check Out Utility

Our embodiment permits the user to request ownership of any file in the DMS and associate that ownership with an entry point into the library. This concept of ownership by entry point allows a sophisticated environment to exist where one owner can modify data at one level, promote the data to a higher level, and a second owner can make further modifications. The DMS Architecture also permits a user to set Update Locks at non-entry Levels, or set locks on ALL Levels which prevents another user from modifying or moving the file. However, these actions are not part of the File Check Out Utility and must be performed through a lock setting utility in the Lock Manager.

The user is also given the option to physically copy the file from a public library into their private library. The entire operation runs in the user's environment without the aid of an Automated Library Machine. The request will be honored or rejected depending on the current state of ownership and the relationship of the user to the current owner. The user initiates the operation with the File Check Out menu shown in FIG. 37.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2(tm) application environments.

The screen contains six data entry fields, labeled 25901 thru 25906. Field 25901 is where the user types in the name of the file. Fields 25902 thru 25904 are used to denote the Library Name, Library File Type and Version in which the data permanently resides. If the file is currently in a private library, the user enters the name of the public library to which the file will be promoted to in the future. Drop down menu buttons 25907 can be used to display a list of all the known public libraries in the DMS. Button 25908 will display a list of the valid Library File Types used in the library. Likewise, button 25909 will show all valid Versions for the given library. If no library name is entered, then clicking on either button 25908 or 25909 will produce an empty selection list.

Field 25905 represents the Starting Level for the library search engine to conduct the search. This doesn't mean the file must exist at this Level, it's simply where the user desires the search to begin. This can be any valid Level associated with the Library entered in field 25902, or it can be the keyword user. This keyword instructs the search engine to first inspect the user's private library for the file. If it's not found there, then the search engine should traverse the library structure beginning with the Entry Level denoted by field 25906. Drop down menu button 25910 can be used to acquire a list of all available Levels for the Library, Version, and Type entered in fields 25902 thru 25904. One of the choices is always the keyword user.

The Entry Level field, 25906, serves two purposes. The first is to provide direction for the library search engine in the event that field 25905 indicates user, but the file is not found in the user's private library. In this case, the search engine will begin at the level entered in field 25906 and traverse through the library structure until the file is located. The second purpose is to determine which level the Update Lock is to be associated with. Our embodiment permits multiple users to hold Update locks on the same file, but at different entry points into the DMS. Button 25911 displays a list of all valid Levels for the given Library, but unlike field 25905, the keyword user is not permitted.

Figure 37:
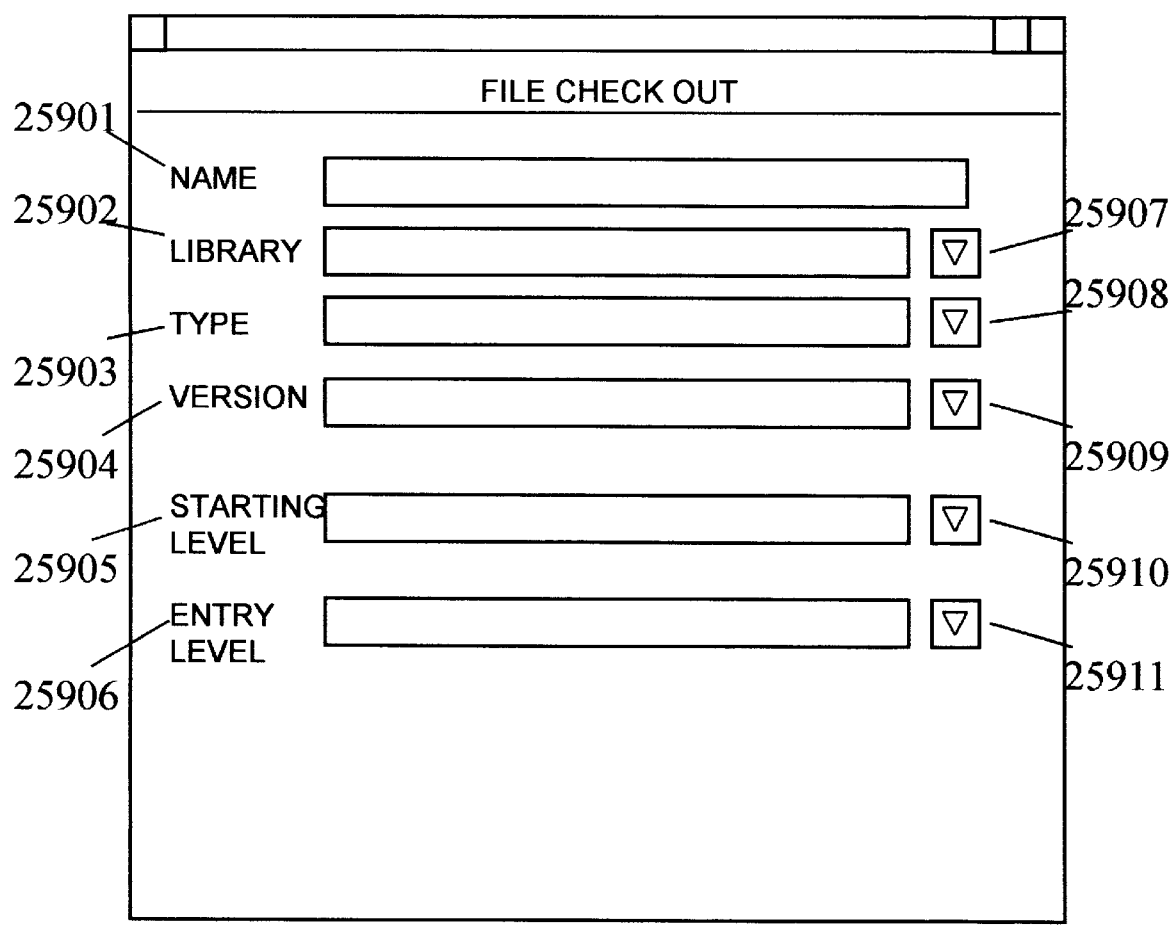
FIG. 37 shows a data entry screen for checking files out of the DMS.
Figure 38A:
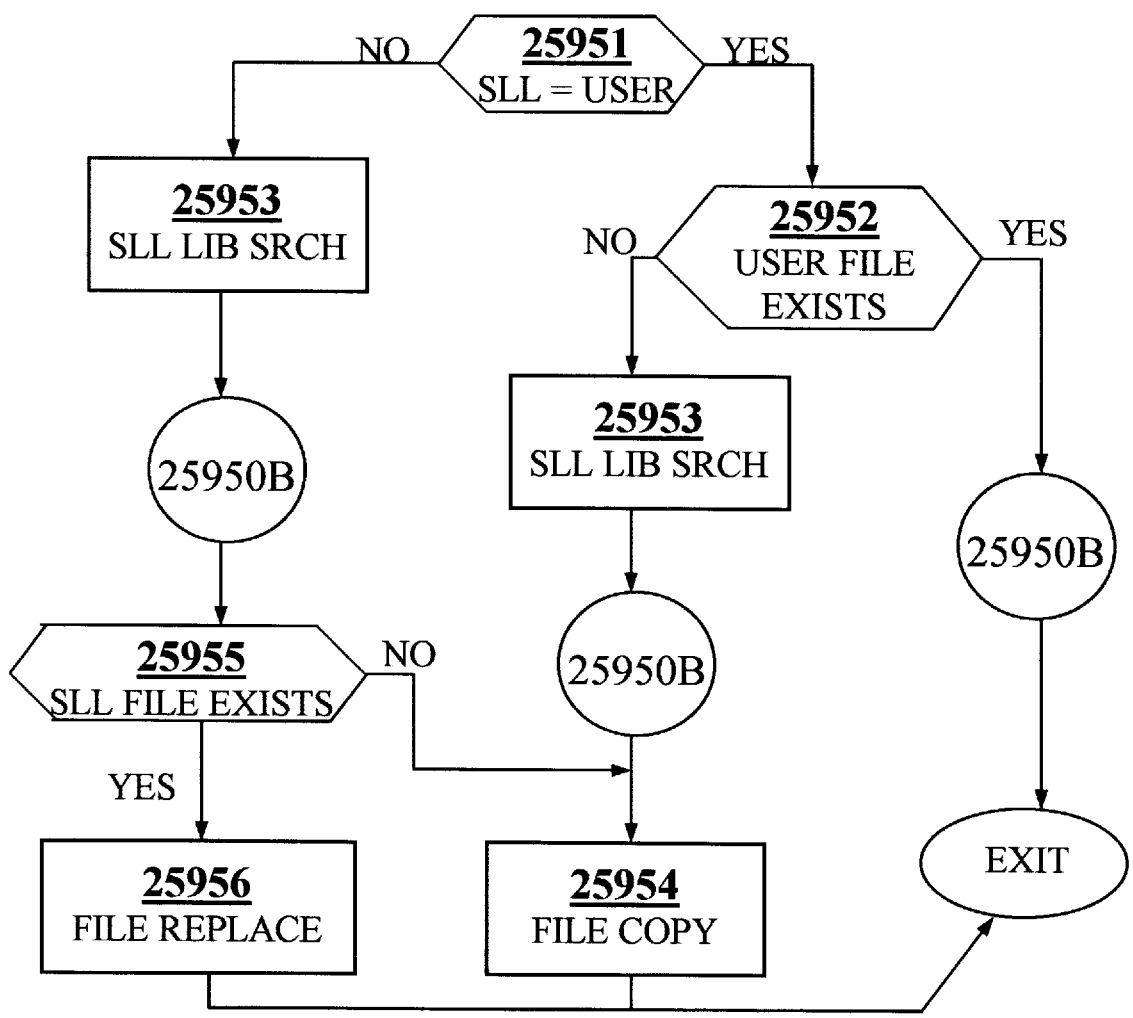
FIG. 38a thru 38b describes the algorithm for checking files out of the DMS.
Figure 38B:
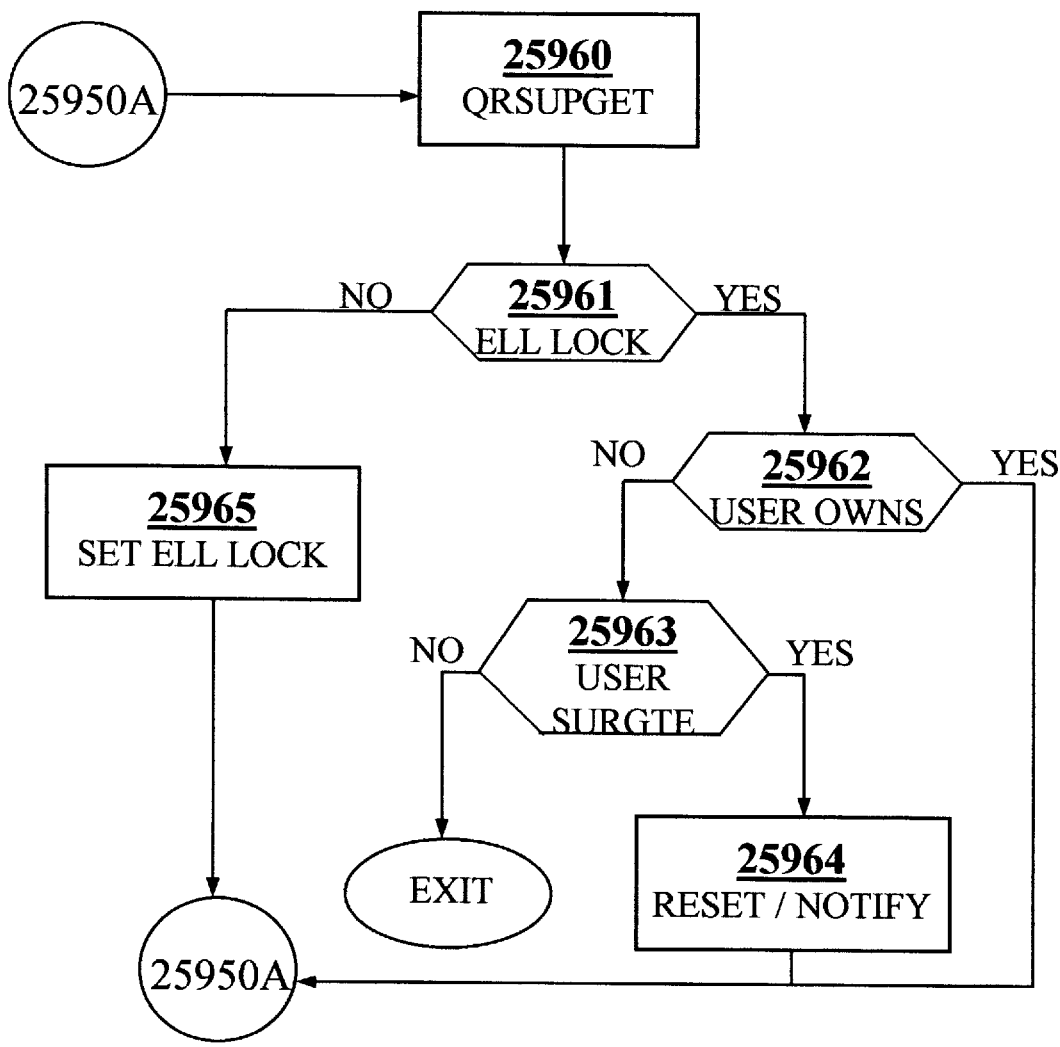
Figure 39A:
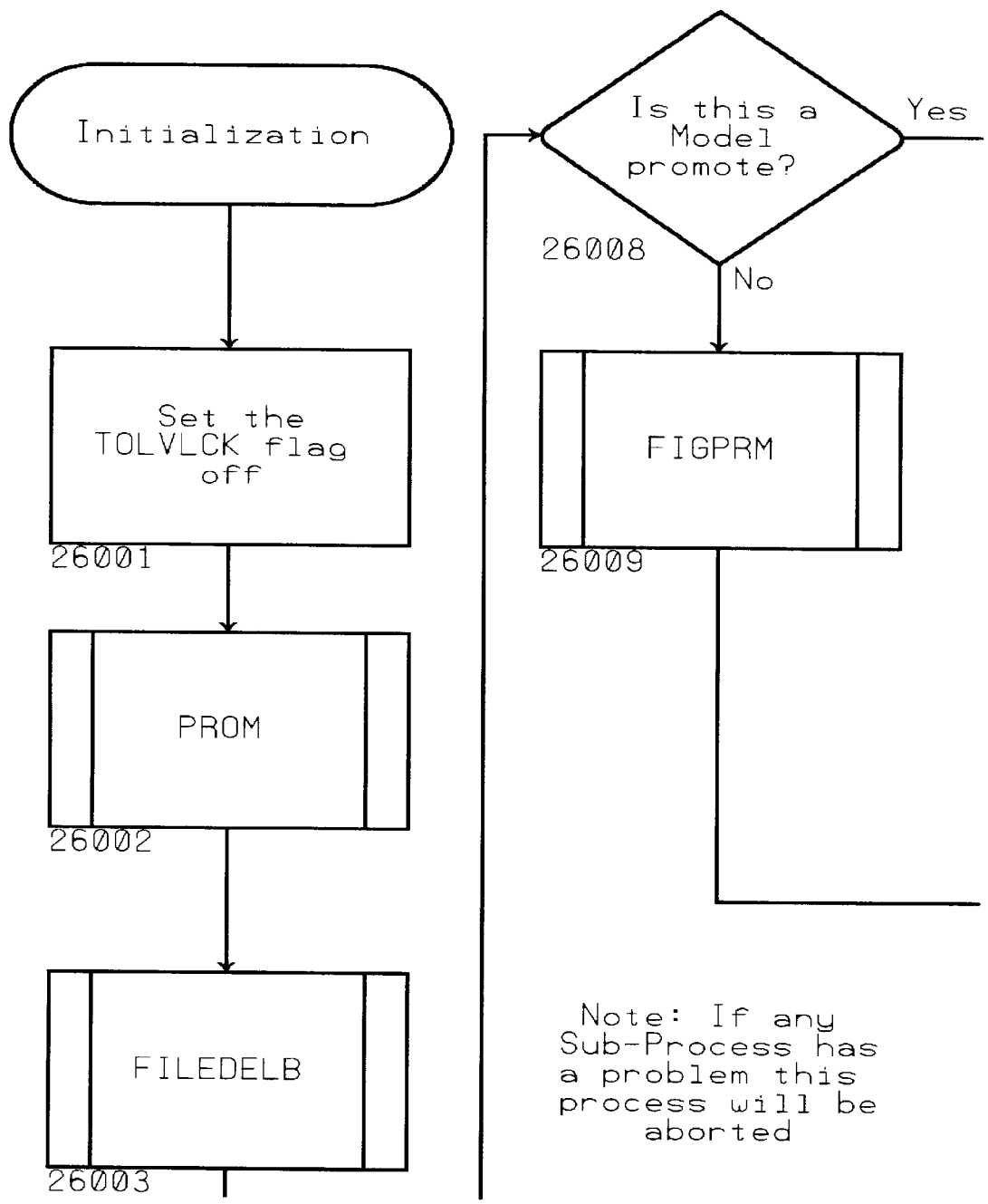
FIG. 39a thru 39d describes the QRSUPPRM Process.
Figure 39B:
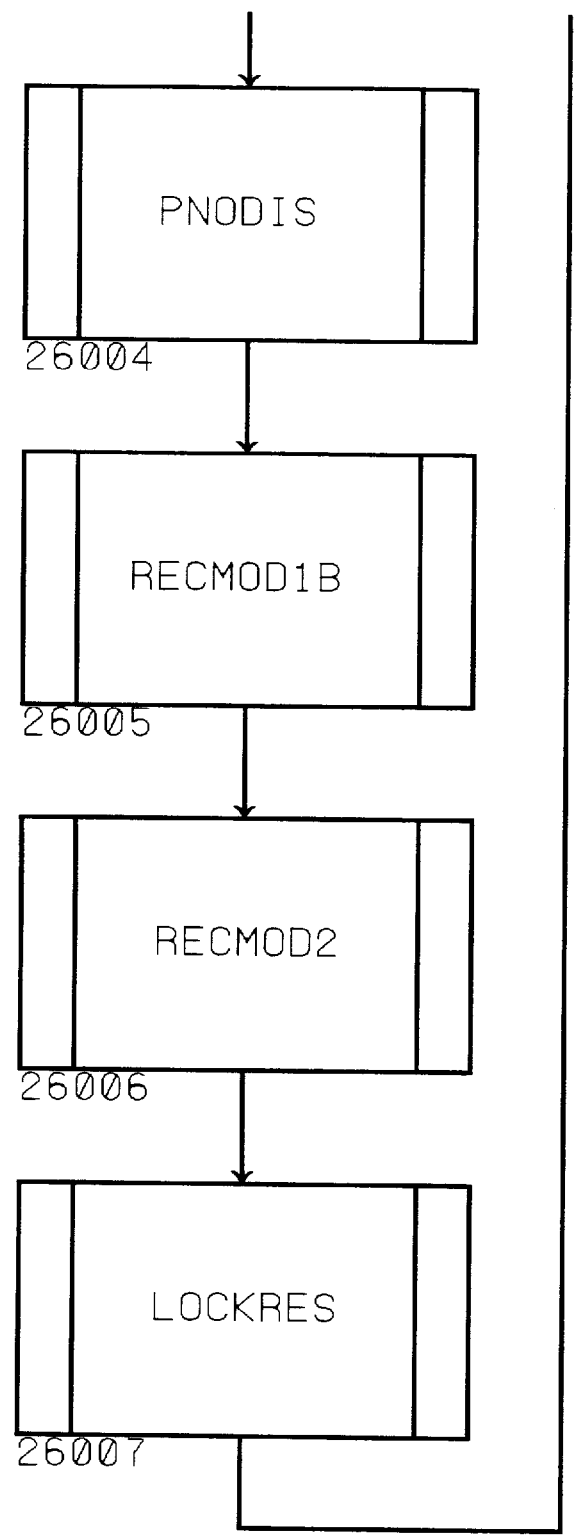
Figure 39C:
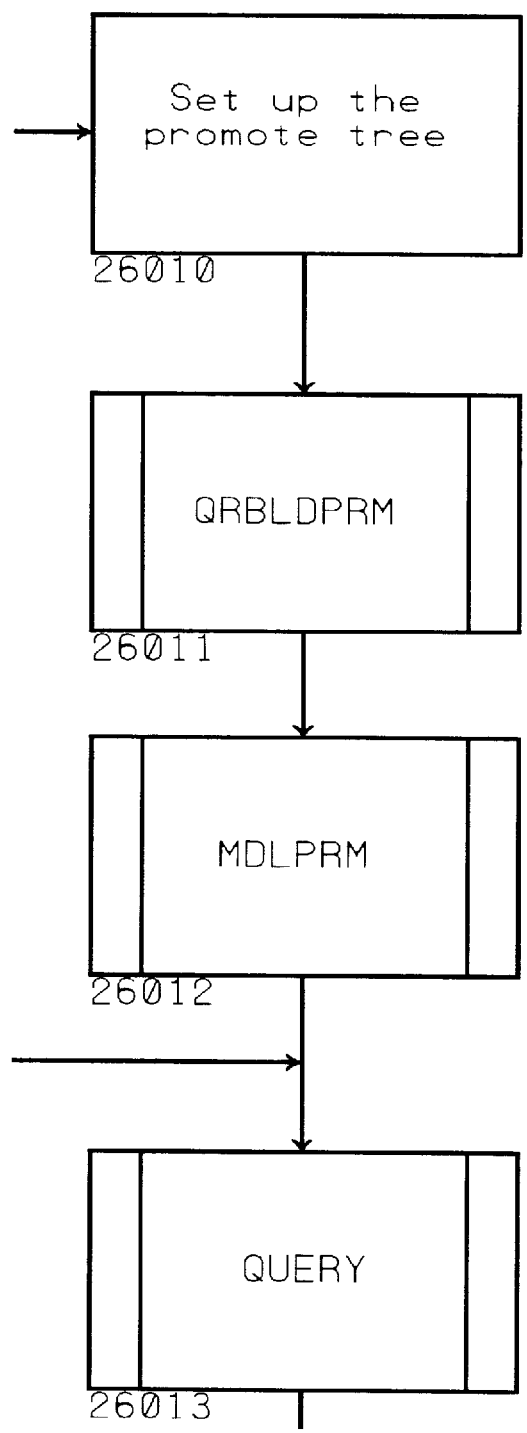
Figure 39D:
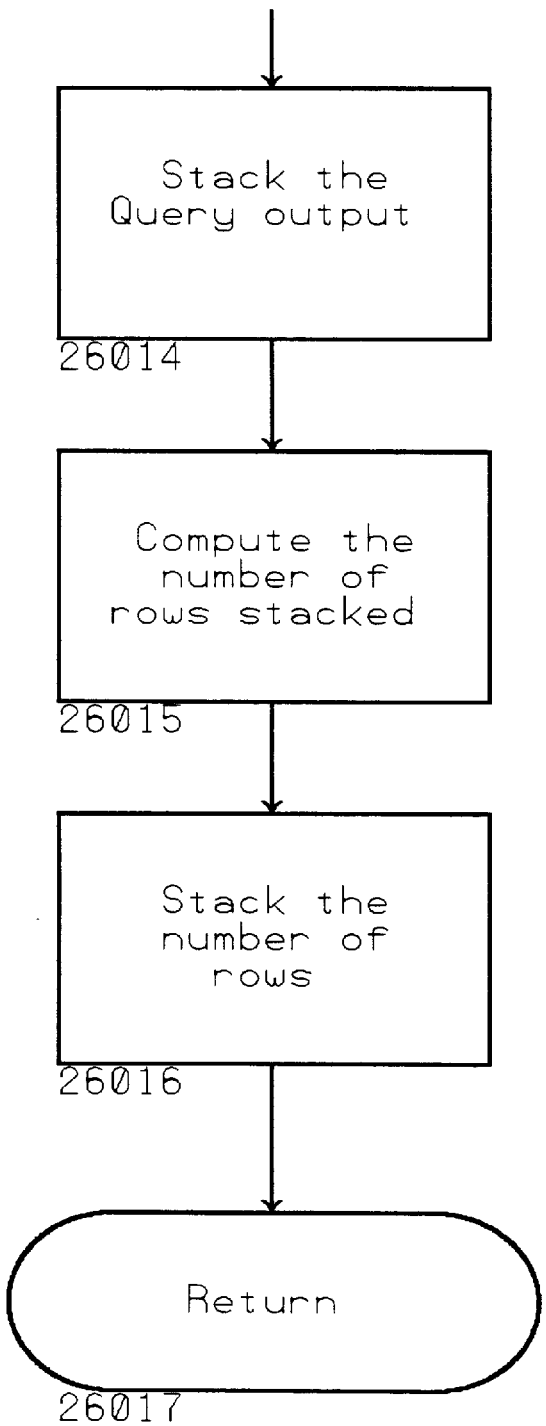
Figure 40A:
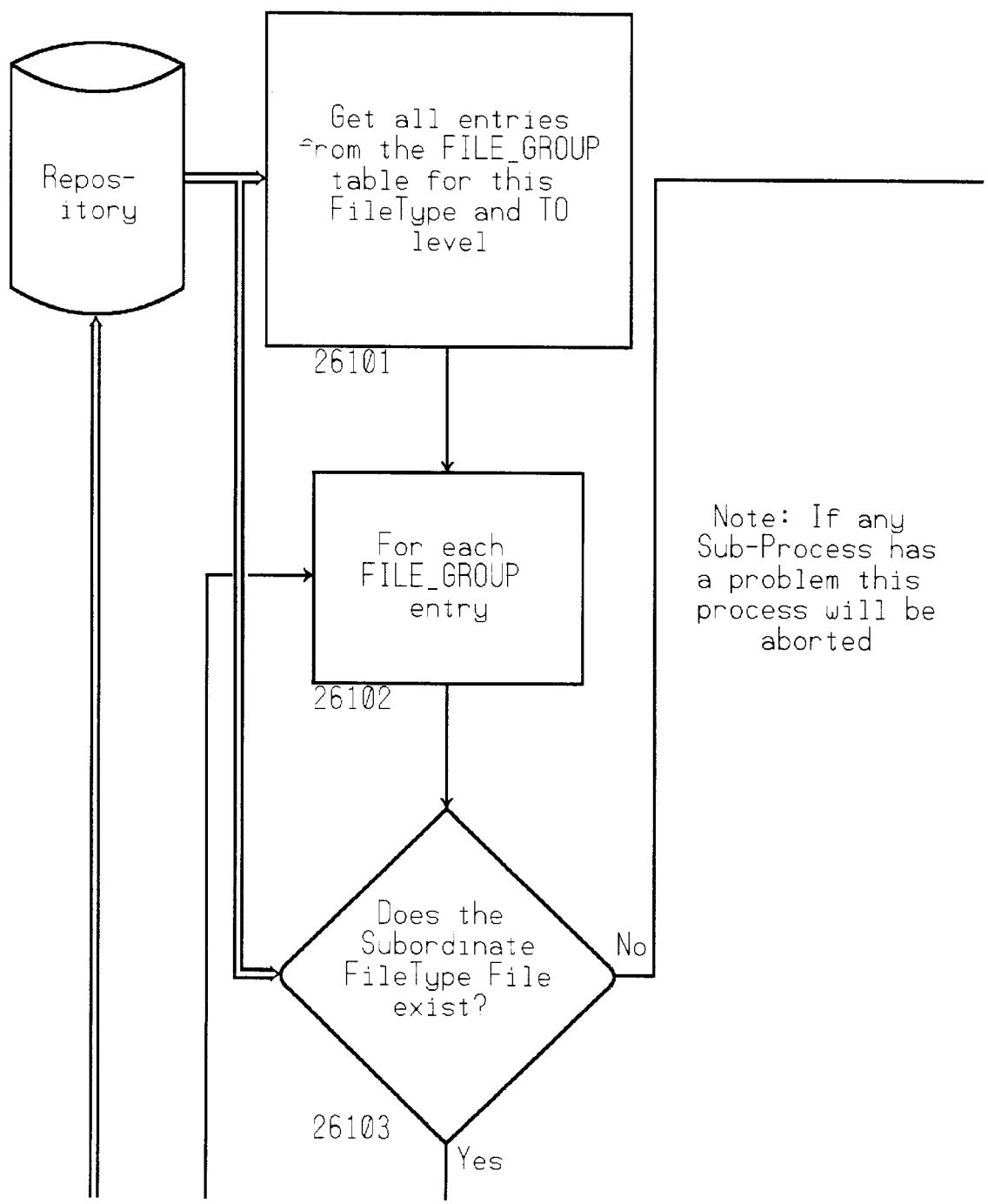
FIG. 40a thru 40d describes the FIGPRM Process.
Figure 40B:
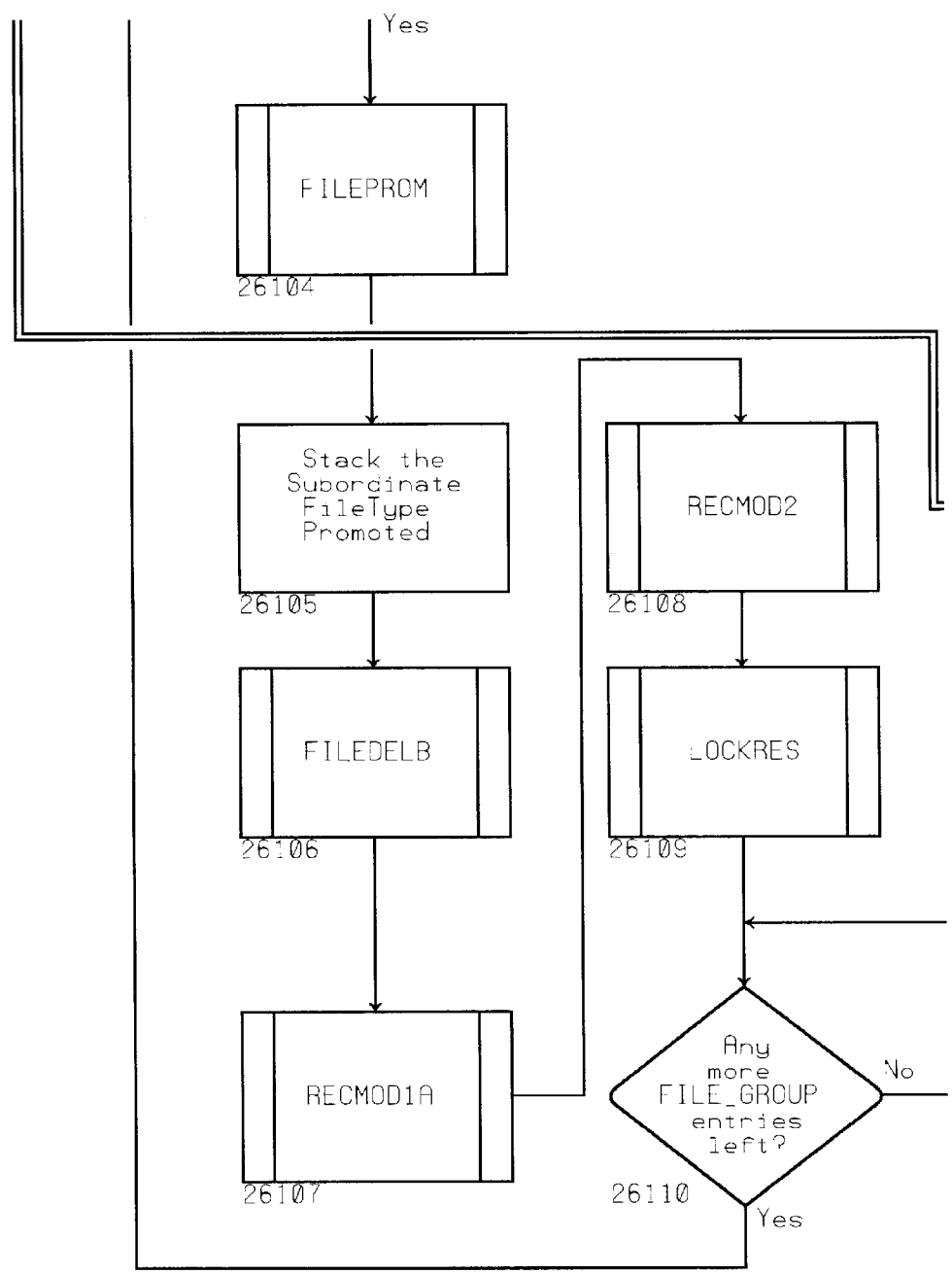
Figure 40C:
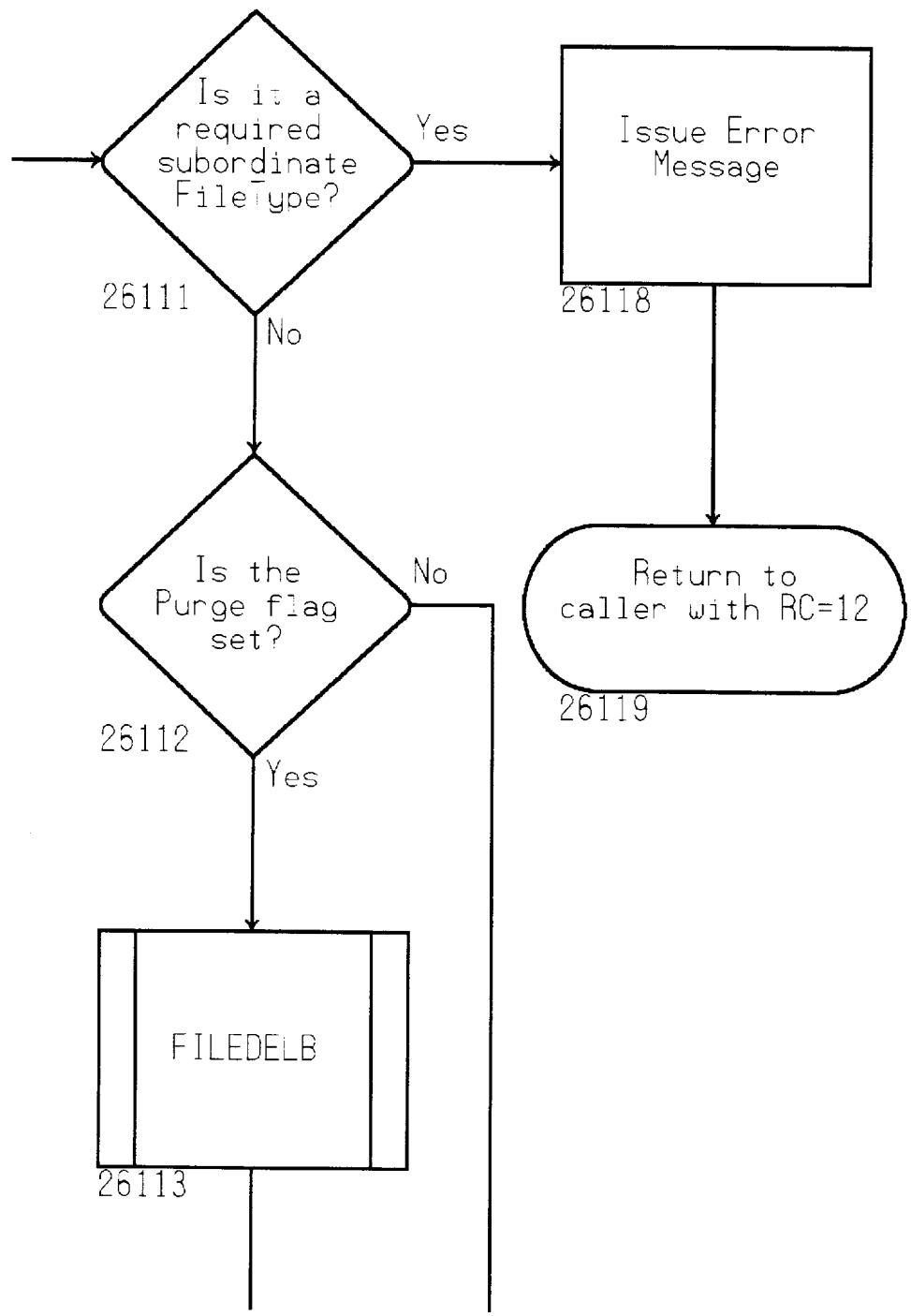
Figure 40D:
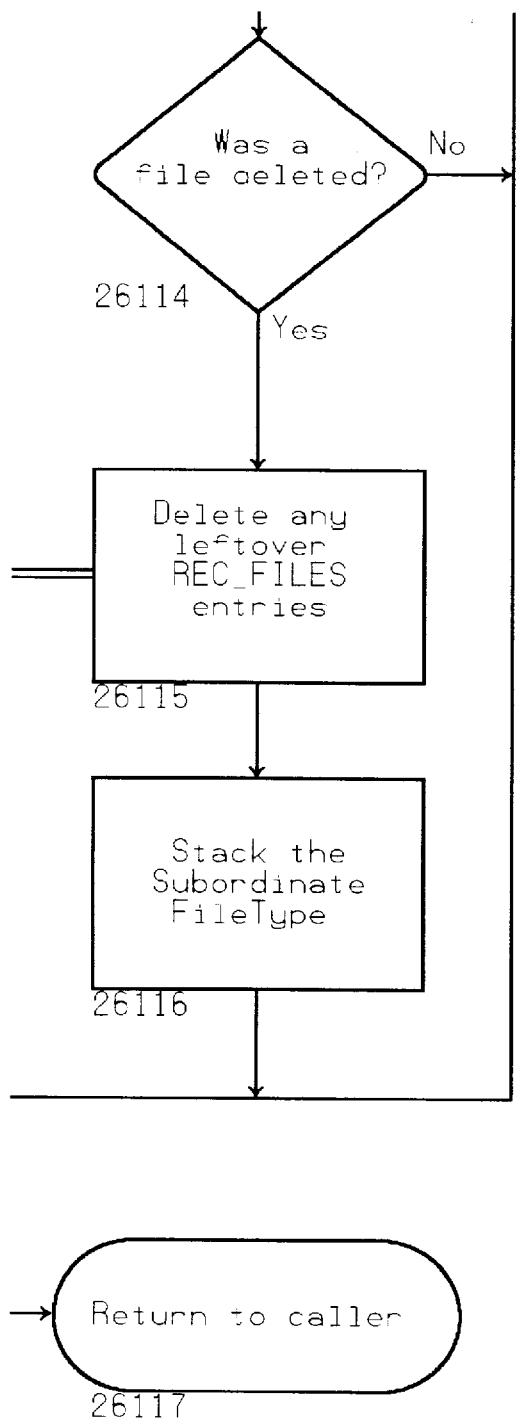

The algorithm for checking data out of the library begins with Step 25951, SLL=User, on FIG. 38*a*. Here the Starting Library Level entered in field 25905 of FIG. 37 is checked to see if it's the User level of a private library. If so, the user's private library is examined to see if the User File Exists in Step 25952. If so, the Lock Check subroutine illustrated in FIG. 38*b* is invoked and the program completes. The Lock Check routine is discussed in greater detail later.

If the file doesn't already exist in the User's private library, then the SLL Library Search is employed. The standard library search engine is used to seek out the most recent copy of the file starting at the User Level. The search engine also uses the Entry Library Level entered in field 25906 of FIG. 37 to direct the search through the proper entry point. If no file is found, the user is asking for an Update lock on a non-existent file which is an error condition that terminates the program. At the conclusion of the search the user is shown the solution of the search. The Lock Check subroutine of FIG. 38*b* is again used to establish an Update lock. Upon return from the Lock Check routine, Step 25954, File Copy, is invoked. The program asks the user for permission to copy the file from the Library Level into the User's private library. The file is renamed to the SLL, which is user in this case, and the program completes.

Returning to Step 25951, if the SLL is not the User level, it's assumed to be a valid Level for the Library, Library File Type and Version entered on the menu in FIG. 37. This Starting Library Level is used to initiate the library search engine. Upon completion of the search, the solution to the search is shown to the user. The Lock Check subroutine is invoked, and upon return, Step 25955 is employed to see if the Starting Library Level File Exists. If not, Step 25954 is again invoked to copy the file to the user's private library and rename it to the Starting Library Level. The user is given the opportunity to confirm this operation.

If a file already exists with the same Starting Library Level, the program indicates this to the user, in Step 25956, by showing the solution of the search along with the file in the user's library. The user is given the opportunity to replace the private copy of the file with the library copy. If the user accepts it, the file is copied and renamed using the Starting Library Level. If the user rejects it, the program terminates with the end result being an Update Lock set on the existing file in the private library.

Turning to the Lock Check Subroutine in FIG. 38*b*, the algorithm begins with Step 25960 which calls upon the QRSUPGET function described in FIG. 34, to return all the lock and authority information about the file. Next, Step 25961, ELL Lock examines these locks to see if any are owned by someone other than the user. If so, these other locks are displayed so the user can see who else claims ownership of the file. If another user has any ownership locks (at the same or different level), the user is given the opportunity to abort the check out. In addition, the user is also notified whether they have the proper authority to promote this file into the desired Entry Library Level.

If a lock exists for the Entry Library Level, it's checked in Step 25962 to see if the User Owns It. If so, the user officially owns the "key" to this "entry door" and the routine passes control back to the main algorithm in FIG. 38*a*. If the user doesn't own the lock, then Step 25963, User Surgte, is invoked. Here, the database is queried to see if the user is a valid surrogate for the current owner of the lock. If not, then the user is told why the lock can't be set in their favor and the program terminates. If the user is a valid surrogate, then Step 25964, Reset/Notify is employed. In this step, the user is told who currently owns the lock and is given the opportunity to take ownership. If the user accepts it, the DMS sends a notification to the previous owner indicating that the user has now taken ownership of this entry point. The routine returns control to the check out algorithm.

Returning to Step 25961, if no Update lock corresponding to the Entry Library Level exists, then an Entry Library Level Lock is Set in Step 25965 for the user. This is done via interaction with our various Lock Manager functions.

At this point the program returns control to the main algorithm in FIG. 38*a*.

File Deletion Utility

Since data integrity can be easily compromised by uncontrolled file deletion, our embodiment provides a robust utility for deleting data in a safe and orderly manner. It also ensures that the control information such as Problem Fix Numbers and Part Numbers are correctly handled. The preferred embodiment depicts the overall flow of the delete or data removal in FIG. 51.

Figure 51:
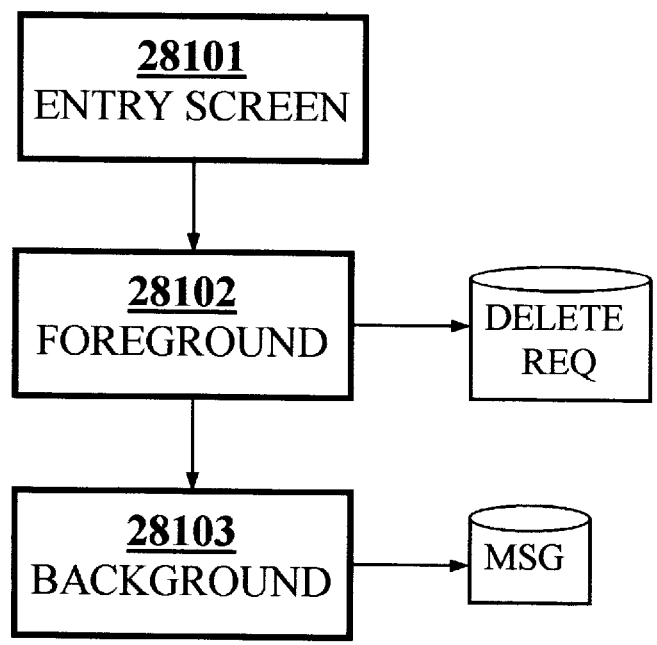
FIG. 51 shows the overall diagram of the File Deletion process.
Figure 52:
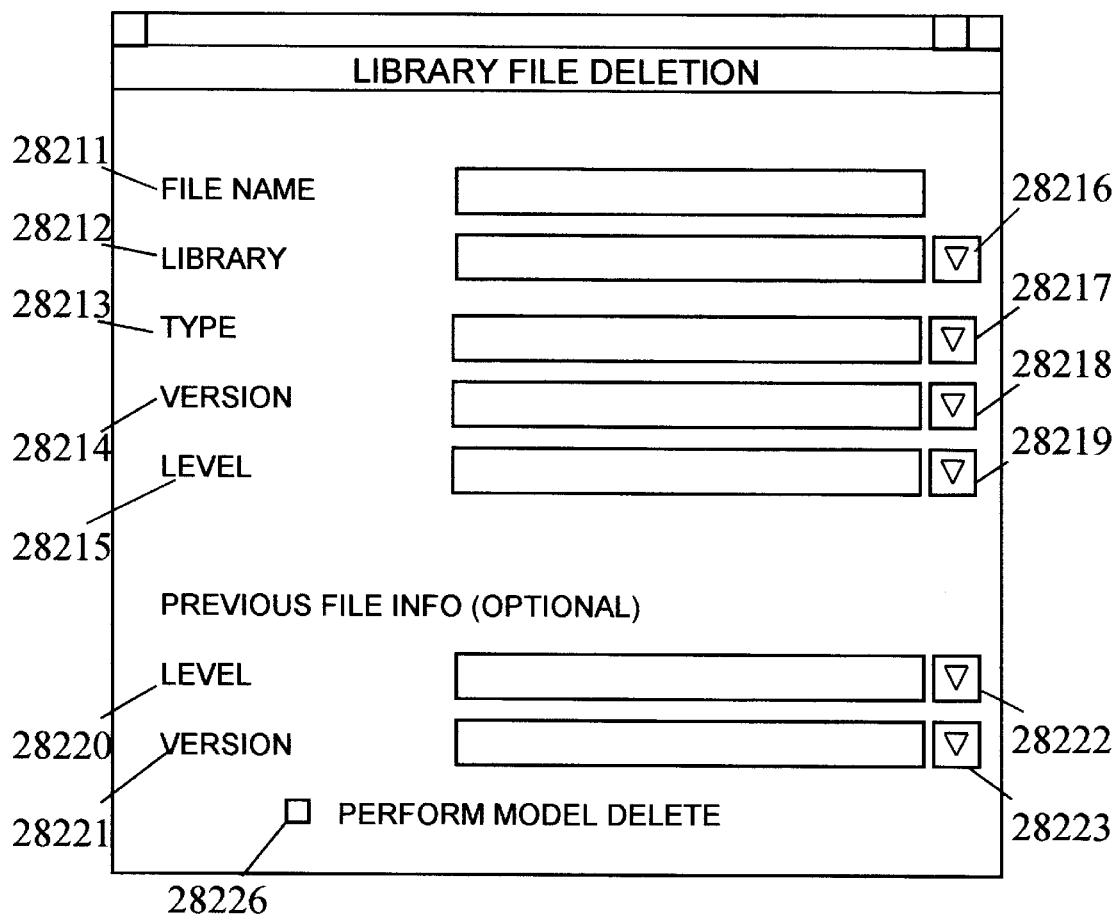
FIG. 52 depicts a data entry screen for File Deletion.

The flow begins with Step 28101, Entry Screen, in FIG. 51 where the user is presented with the File Deletion Screen. FIG. 52 shows this screen, which permits the user to enter information about the file(s) they wish to process. In Step 28102, Foreground, the information gathered in Step 28101 is processed and additional information may be requested. Some basic checks are performed before passing control to Step 28103. In Step 28103, Background, our preferred embodiment processes the request on an Automated Library Machine since these are the only users with the proper permission to edit or delete data within the DMS.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2(tm) application environments.

The screen, depicted in FIG. 52, contains five data entry fields, labeled 28211 thru 28215. Field 28211 is where the user types in the Name of the file. The user may type the name in directly or leave it blank to generate a selection list which allows the user to choose multiple files to delete. Field 28212 denotes the Library where the file(s) reside. This function is only intended for data tracked in a public library, therefore this field must contain the name of a valid public library. Drop down menu button 28216 can be used to obtain a list of all the public libraries in the DMS.

Fields 28213 thru 28215 are used to enter the Library File Type, Version and Level where the file(s) reside. Button 28217 will display a list of the Library File Types used in the Library, button 28218 will show all valid Versions and button 28219 will display all valid Levels. This information is used to initiate a library search for the file specified in field 28211. In the event the file doesn't exist at the specified Level and Version, a dialog box will display the closest file found in the library search. The user is given the opportunity to accept or reject the result of the search. If field 28211 is left blank, a selection list resulting from the library search will be displayed and the user may select as many files as desired.

In the cases where the file being processed is under Part Number or Problem Fix Control, the user can explicitly specify the Level and/or Version of the previous file which should be used to reassociate the Part Number and/or reactivate the Fix Management data. The Level and Version are entered in fields 28220 and 28221 respectively. These fields are optional, and if left blank will cause the Foreground process to interact with the user to obtain the information. Drop down menu buttons 28222 and 28223 can be used to show a list of valid Levels and Versions for the corresponding Library.

The only option for this operation is the Model option which the user can specify via push button 28224. This is the means by which the user acknowledges that deletion of the file will cause either Bill of Materials deletion or invalidation.

Figure 53A:
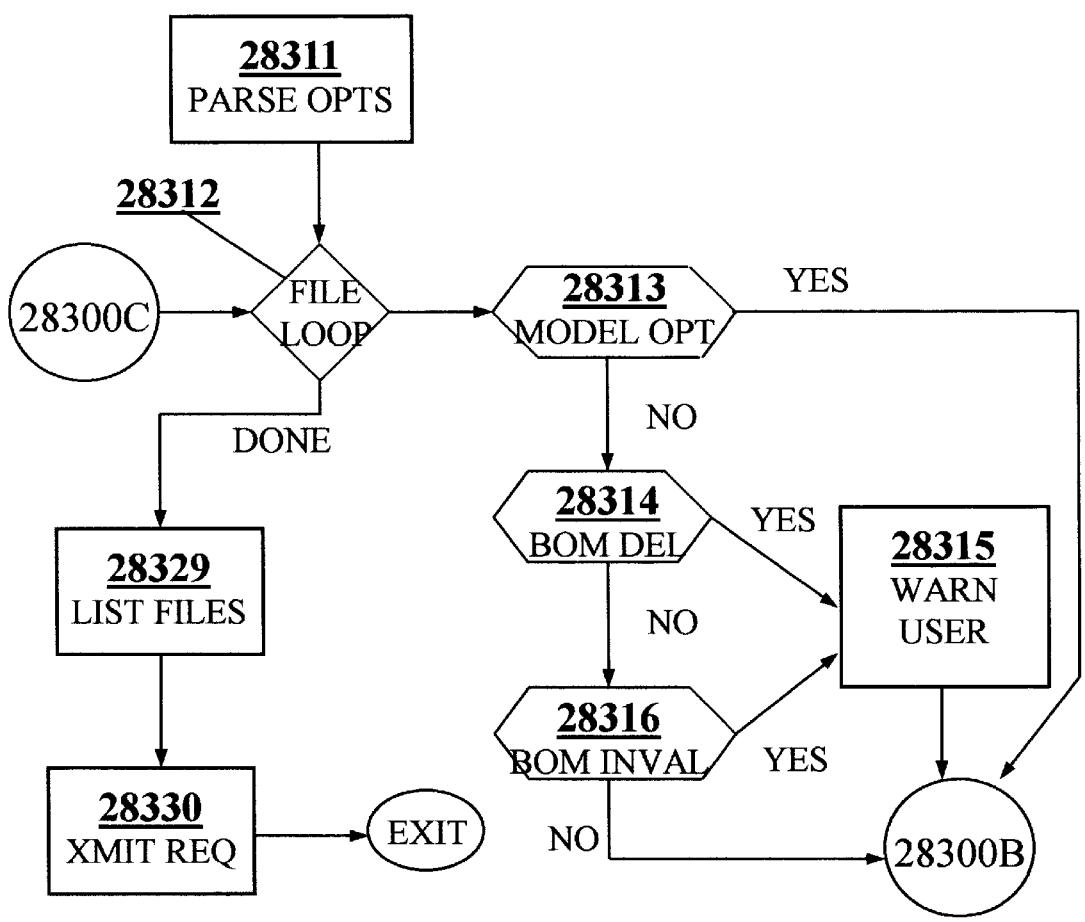
FIGS. 53a thru 53c describes the algorithm for File Deletion Foreground Processing.

Returning to the overall flowchart in FIG. 51, information entered in Step 28101 is now passed to Step 28102, Foreground Processing. The detailed algorithm for generating file deletion requests is described in FIGS. 53a thru 53c. It begins with Step 28311 of FIG. 53a, Parse Opts. Here all the options are examined to ensure they are recognized and the values are acceptable. If Previous File Info is passed as an option, the values are checked to ensure they exist for the given Library.

In Step 28312, a File Loop is initiated in the event the user selected multiple files from the user screen in Step 28101. In this case each file must be subjected to the same checks and tests since each file possesses individual characteristics.

The next series of steps pertain to handling Bill of Materials (BOMs), if they exist. Beginning with Step 28313, Model Opt, the program tests the Model Option flag. If this flag is true, it indicates the user accepts the possibility of BOM Deletion or Invalidation and does not wish to be warned in advance of the consequences. One example is the act of deleting a file which is an anchor to a BOM. If the user knows this in advance, they can pass this option to avoid unnecessary checks. In this case control proceeds to Step 28317.

However, if this option is absent, Step 28314 is invoked to check for BOM Deletion. Here, the Control Repository is queried to see if the current file is a BOM. If so, Step 28315, Warn User is employed to notify the user of the impending BOM deletion. The user is given an opportunity to abort the process. The next step, 28316, queries the repository for any BOM Invalidation. This tests for the situation where the current file belongs to some other BOM, so its removal will result in a BOM becoming invalid. Our Aggregate Manager is used to quickly locate any BOMs in the DMS which contain this file.

Once again, if an invalidation will occur, Step 28315 is employed to notify the user and give them the chance to abort the deletion.

Figure 53B:
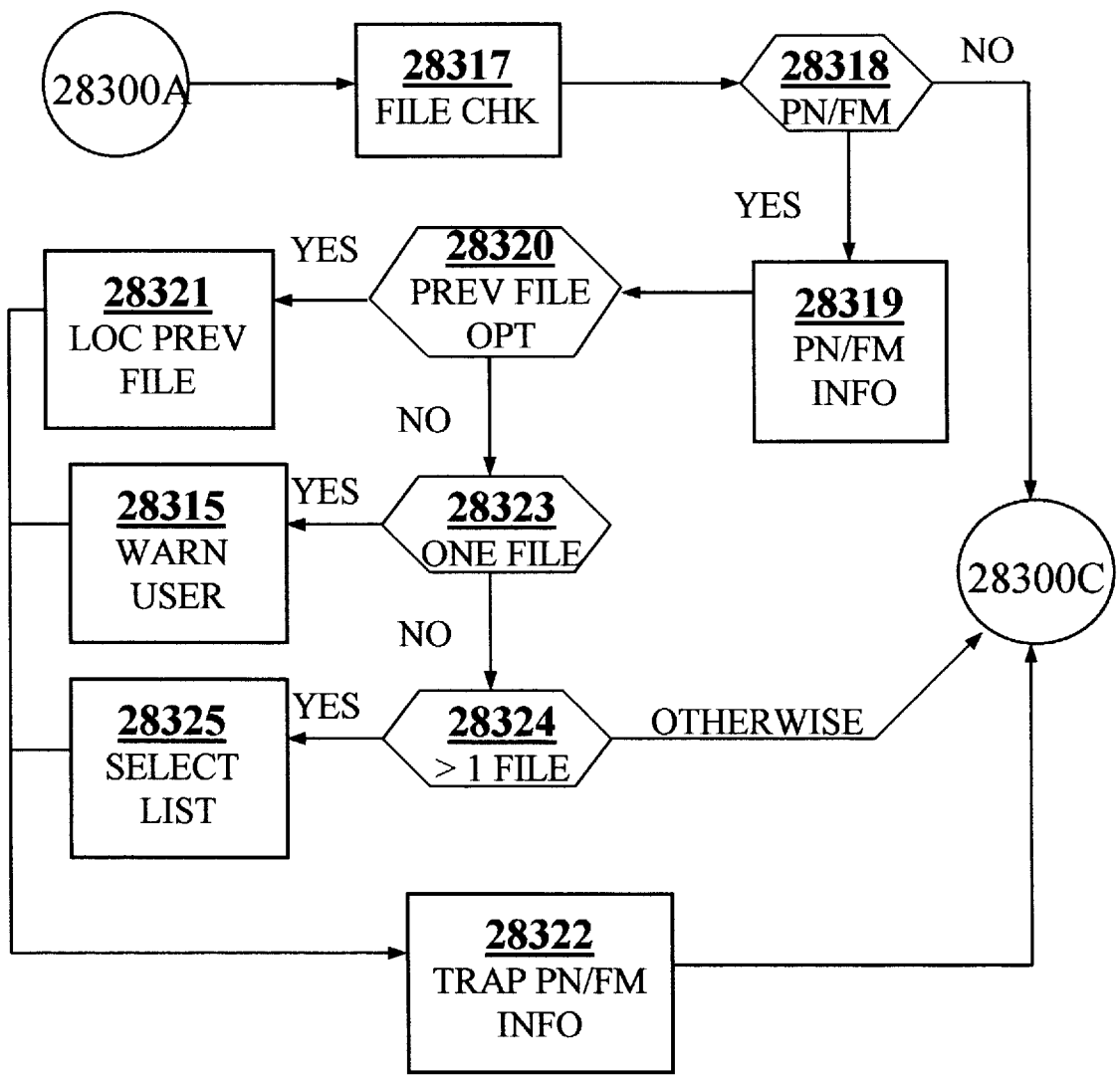

Regardless of the setting of the Model Option flag, control eventually proceeds to Step 28317 in FIG. 53b, File Check. In this step, the algorithm queries the database to ensure the file exists in the Control Repository and the repository agrees on the Level and Version. If the Level and Version returned by the Control Repository are not identical to that indicated by the user in Step 28101, an error occurs which notifies the user and aborts the program.

The algorithm proceeds to Step 28318 where the Part Number and Fix Management Flags are obtained from the Control Repository and examined for the Library File Type being processed. If the LFT is under Part Number Control, Single Fix Tracking or Engineering Change Mode, control proceeds to Step 28319. In Step 28319, PN/FM Info, all Part Number and Fix Management information is obtained for the file being processed. In addition, all obsolete files, of the same name, and at higher levels, which are attached to the same part number and/or attached to the same EC Number are also returned.

At this point the algorithm determines which dormant file, if any, will be used to reassociate the Part Number and/or reactivate the Fix Management information. First, the Previous File Info fields 28220 and 28221 from FIG. 52 are examined in Step 28320. If the user specifies a particular level or version, they are expecting the corresponding file to be used to reassociate the PN and/or revalidate the problem fix numbers. In this case, the program employs Step 28321, Locate Previous File, to sift through the data returned in Step 28319 in search of the expected file. If the file is not in the list, it's an error condition and the program terminates. Assuming the file exists, the program proceeds to Step 28322, Trap PN/FM Info. In this step, the algorithm sets a flag and remembers all the information necessary to disassociate the old Part Number and Fix Management data from the file about to be deleted. It also captures the information about the file selected for re-association. Although the information is captured, the actual updating of the Control Repository is done in a later step.

If the Previous File Info fields are empty, the programs checks to see if the list returned in Step 28319 only contains a single entry. If so, Step 28315 is invoked to warn the user that the file in the list will be the one used for PN/FM reassociation. It also provides an opportunity to abort the process. If the user accepts this, Step 28322 is employed to capture the information.

The last possible case for PN/FM re-association, Step 28324, involves a list with >1 File being returned in Step 28319. If this is the situation and no Previous File Information is provided, the program uses Step 28325 to present the user with a Selection List. The user may select only one entry or abort the operation. Assuming one is selected, Step 28322 is invoked to capture the information.

Figure 53C:
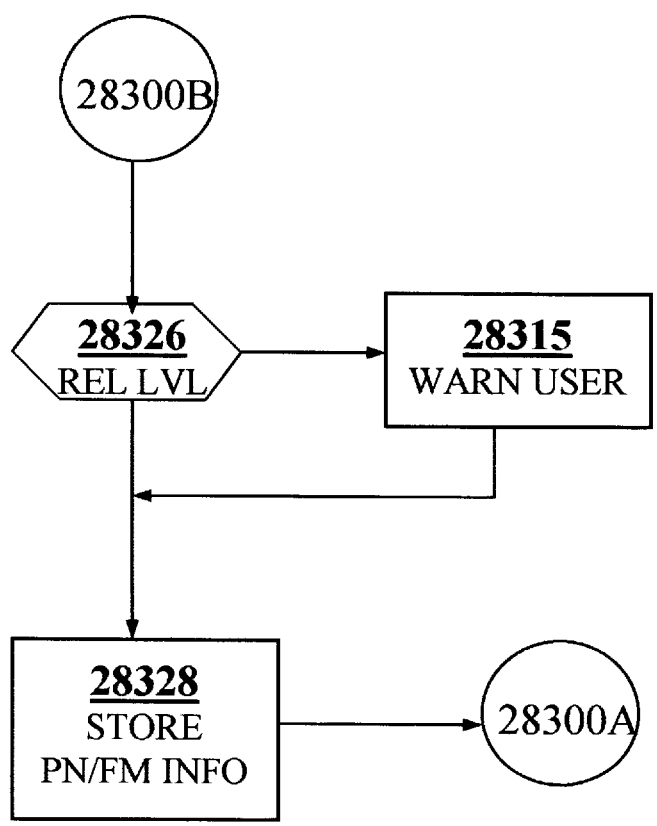

If the Part Number and Fix Management Flags in Step 28318 are off, or no files were returned in Step 28319, or any PN/FM information was trapped in Step 28322, control proceeds to Step 28326 in FIG. 53c. In this step, the Level of the file being deleted is checked to see if it's a Release Level. This includes active or frozen Release or Sideways Levels. If the Level is any of the aforementioned types, Step 28315 is invoked to warn the user and provide an opportunity to abort.

Control eventually proceeds to Step 28328, PN/FM Re-assoc. In this step, the algorithm uses the information trapped in Step 28322 to interact with the Control Repository. It eliminates all Part Number information associated with the file about to be deleted, and reincarnates all Part Number information pertaining to the file found in the previous step. In addition, the superseded Problem Fix numbers attached to the file are converted to an active state. All appropriate Part Number and Fix Management tables within the repository are updated to reflect a state whereby the previous file assumes the role of the file being deleted.

At this point control returns to the top of the File Loop in Step 28312. Once all files have been processed through Steps 28313 thru 28325 control proceeds to Step 28329, List Files. Here the Filenames, Library, Level, Version, Library File Type, and File Reference numbers are written into a Library Delete List which will be transmitted to the Automated Library Machine in the next step.

In step 28330, Xmit, the program gathers and transmits all of the necessary data to the Design Control System. In our preferred embodiment, the destination would be an Automated Library Machine which would "receive" the information from the user via an AutoReader. The following information need to be transmitted in the delete request:

The type of request: Delete

The list of files being promoted. The following information must exist for each file in the list:
The Filename
The Library File Type
The Package
The Version
The Level
Any user selected options that pertain to the background operation.
The user's electronic id or e-mail address.

This file is transmitted to the ALM for use in the Background Processing step of FIG. 51.

Returning to the overall process in FIG. 51, the foreground information in Step 28102 is transmitted to an Automated Library Machine for background processing. The detailed algorithm for Step 28103, Background is illustrated in FIG. 54.

Figure 54A:
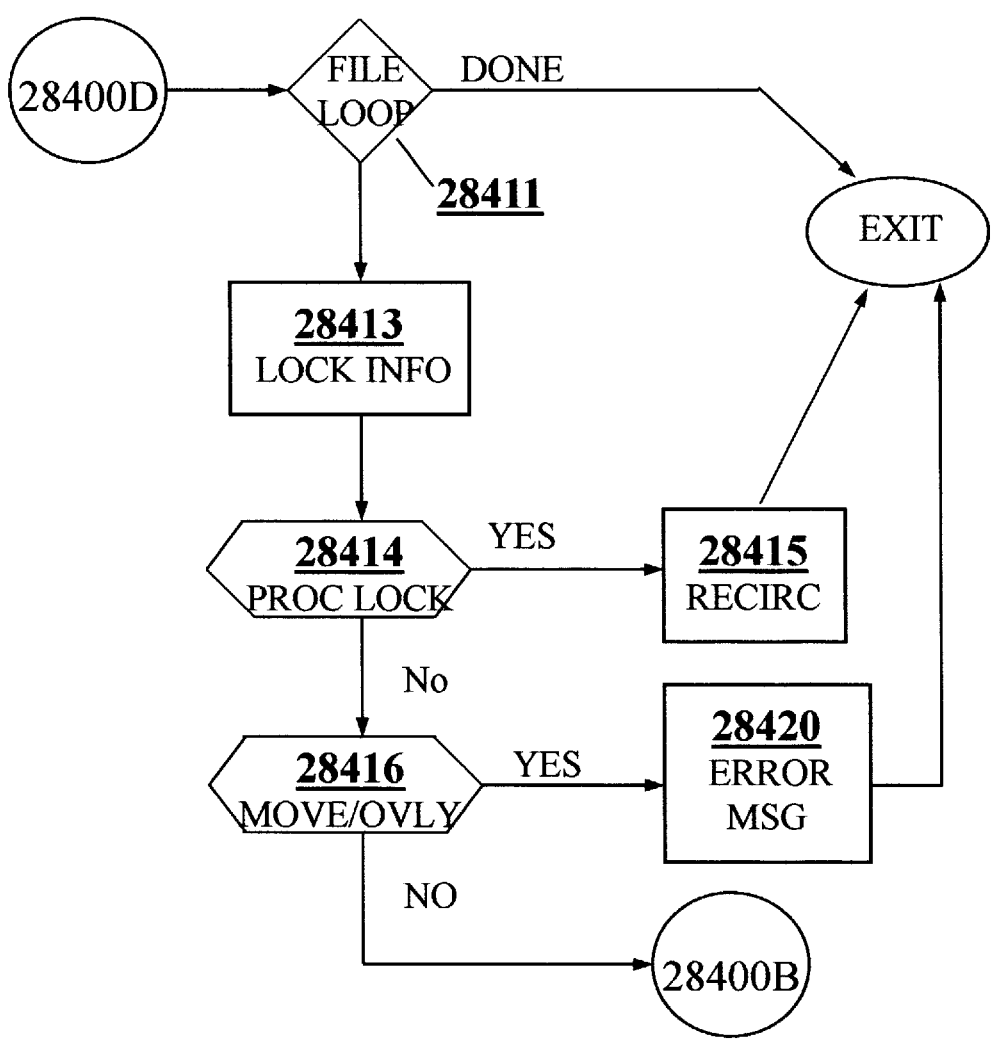
FIGS. 54a thru 54c describes the algorithm for File Deletion Background Processing.

Beginning with FIG. 54a, the algorithm enters a File Loop, in Step 28411, where the list of files transmitted from the Foreground are processed into a data structure. Each step in this algorithm must be performed against every file in the list.

Step 28413 obtains the Lock Information for the file from the Control Repository. This includes information about every possible lock the file possesses at any Level within this Version. In the subsequent steps, the list of locks are examined and different actions are taken depending on the types of locks in existence.

Step 28414 checks to see if any Processing Locks exist on the file at the specified Level. This would indicate a Library Process is currently dependant on the existence of the file, so Step 20415 is invoked to Recirculate the delete request. In our preferred embodiment this entails re-writing the delete request file with the names of all the unprocessed files, and sending it back to the main queue of the DMS. In a simple system without Automated Library Machines, the necessary action would be to introduce the request back into the DMS queue or inform the user to try again at a later time. At this point the processing is complete.

If no processing locks exist, Step 28416 checks for Move or Overlay Locks at the Level where the file exists. In either type exists, Step 28420 Sends an Error Message to the user indicating that the file can't be erased. The program terminates after the notification is sent.

Figure 54B:
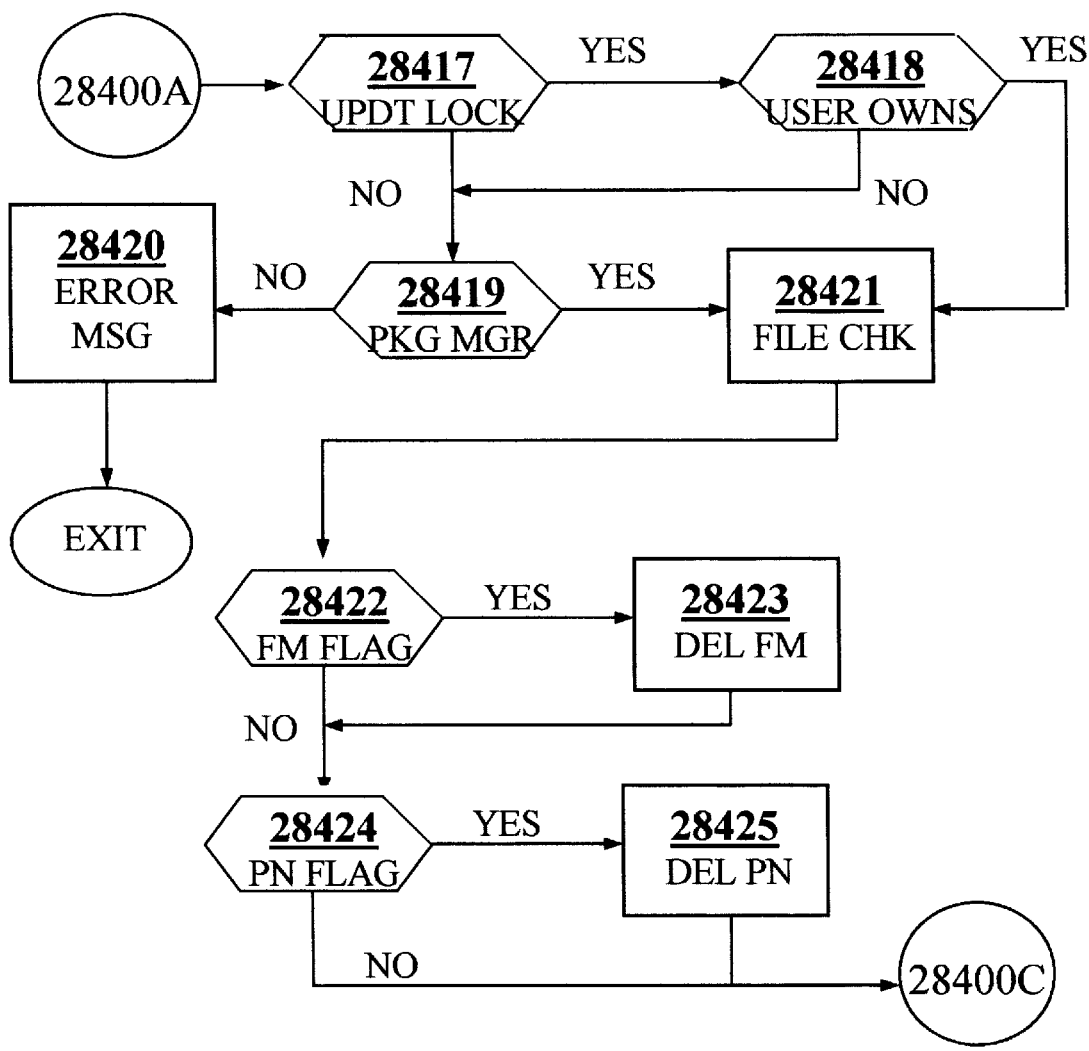

If no Move or Overlay Locks exist the program proceeds to FIG. 54b where Step 28417 examines any Update Locks that exist. In this step all Update locks are examined regardless of the Level. In Step 28418 a determination is made as to whether the User Owns All the Update Locks. If this is true, then the user is the official owner of the file according to the rules of the DMS. In this case, control can proceed to Step 28421.

If there are some Update Locks which the user doesn't own, or no Update Locks exist at all, then the program checks to see if the user is the Package Manager or Alternate in Step 28419. As long as the user is the Data Manager or a valid alternate, the program is allowed to proceed to Step 28421. If the user is not a Data Manager, Step 28420 is invoked to send an Error Message indicating the situation, and the program terminates.

Assuming that the user meets one of the authority criteria, control proceeds to Step 28421 where the File is Checked to ensure the Control Repository agrees that it exists at the specified Level and Version, and ensure the file doesn't reside in a frozen Release Level.

Next, the algorithm checks the Fix Management Flag in Step 28422. This consists of querying the Control Repository to see if the FM flag exists for that Library File Type. If so, Step 28423 is invoked to Delete the Fix Management Information pertaining to the file. This is done via our Fix Management routines.

Step 28424 performs a similar function with the Part Number Flag. The repository is queried to see if the PN flag exists for the LFT being processed. If so, Step 28425 is implemented to Delete the Part Number Information pertaining to the file. This is done via our Part Number routines.

Figure 54C:
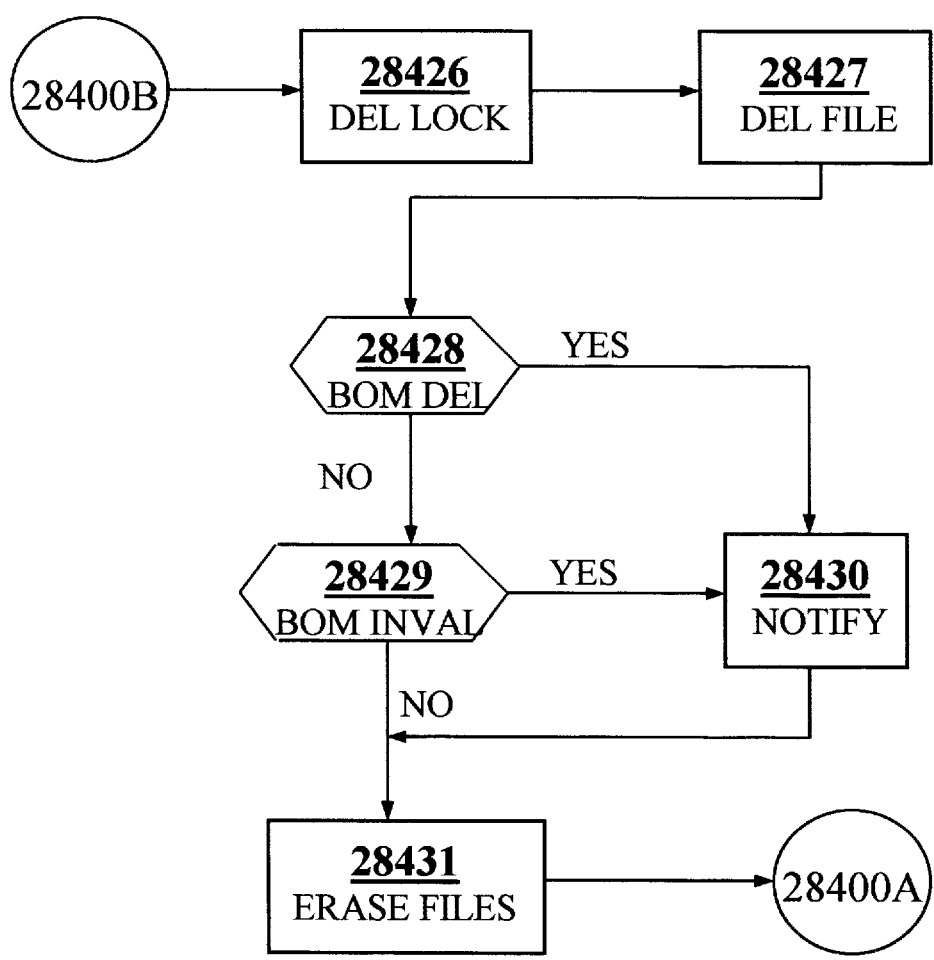

At this point control is passed to Step 28426 in FIG. 54c to Delete the Lock Information pertaining to the file. This is done via our Lock Management routines.

If the user is a Data Manager, it is possible for the file to be in a completely unowned state. In this case, the DMS will not abort, but will continue with the next step.

In Step 28427, the QRFILDEL routine, described in FIG. 11, is employed to Delete the File from the Control Repository. This entails updating the necessary files tables to eradicate any associated entries.

Steps 28428 thru 28430 are designed to handle any Bill of Materials associated with the file. In Step 28428, the DMS checks to see if the file itself is the anchor file of a BOM. If so, BOM Deletion will occur for all BOMs associated with the file. Step 28430 is invoked to Notify the owners of all the BOMs about the elimination. BOM deletion is performed via our Aggregation Management routines.

In Step 28429 the DMS checks to see if any BOMs are Invalidated by the removal of the file. If so, Step 28430 is again invoked to notify all owners of any affected BOMs. BOM invalidation is performed via our Aggregation Management routines.

The last step in the File Loop is Step 28431 which will Erase the File. This includes obtaining the physical location of the file from the Control Repository and performing the deletion. Depending on the environment, the Automated Library Machine may have the proper permission to perform a direct removal, or it may have to transmit a request to an agent which is capable of performing the removal. In our preferred embodiment, the method of removal depends on the ALM configuration employed. In a Conventional System or any arrangement running on a Unix/AIX platform, the ALM can delete the file without assistance. However, in an Actor/Object configuration running on a system such as VM, or a complex system involving multiple computer platforms, the ALM may need to request the Object to perform the file removal.

Control returns to the top of the File Loop in Step 28411 until all files in the request are processed successfully. The operation then exits with a success message sent to the user.

Automated Library Machines (ALMs)

Our embodiment contemplates the use of Automated Library Machines (ALM) to process the work requests on behalf of the users. Although this embodiment is ideally suited for the various process and methods described in the other sections of the Preferred Embodiment, ALMs are not confined to running only those processes. ALMs may exist in Data Management Systems running processes and algorithms outside of those mentioned in this disclosure.

Our embodiment employs an Automated Library Machine (ALM) to service data management requests on behalf of the users. This enables the user to initiate a library job such as a promotion request, Designer Initiated Library Process, or delete request without requiring significant client resources. The ALM provides continuous service by utilizing the concept of a reader to queue and prioritize users' requests. Performance of the Control Repository may also benefit since most of the communication is with a relatively small number of ALMs compared to the larger number of individual users.

The preferred embodiment uses ALMs to execute all the Background algorithms included in the embodiment. One skilled in the art would appreciate that an alternate embodiment doesn't require ALMs by eliminating all the transmittal steps in the various Foreground algorithms, and simply running the Background algorithms on the client machines. As eluded to above, this may require substantial client resource and may compromise performance of the Control Repository.

For large Data Management Systems, our embodiment permits the creation of multiple ALMs to service a single library. This enables large user groups to redeem faster results through the use of parallel processing. The Data Manager has the option of arranging the pool of ALMs in one of three configurations depending on the expected type and volume of data management requests. The basic configuration is known as a Conventional System where a single ALM accepts all work requests and handles all services for the Library Manager, including any Automated Library Processing. The second configuration is Remote Execution Machines which is an extension of the Conventional System. Here, a single ALM receives all work requests from the user, and processes all promotion, installation, movement, and removal of data. However, additional ALMs may exist to perform Automated Library Processing. The ALMs interact with the Library Manager, Communication Manager and Promotion Algorithm to dispatch any desired library processing to a Remote Execution Machine, which executes the task and returns the results to the master ALM. The most powerful configuration is known Actor/Objects and this arrangement employs a pool of ALMs which serve as general purpose machines. They can perform any desired Library Management function, including Automated Library Processing. They can even interface with Remote Execution Machines to provide an environment with both general purpose machines and dedicated service machines. Each Actor can be programmed by the Data Manager to define the type of work requests it can process. This arrangement even includes a special Dispatcher ALM whose sole purpose is to dispatch user work requests to the next available Actor machine.

The means by which data is physically moved between, added to, or deleted from, the repositories depends on the chosen configuration. In a Conventional System, the primary ALM is the only ALM with the proper authority to manage files on any repository within its own library. Remote Execution Machines may only receive work requests and return data and results to the Primary ALM. Our embodiment does not permit Conventional Systems to process file transfers across multiple platforms.

In this system, all actions are initiated by job requests. These may be include:

Class A: Requests to promote data from a user's private library into the public library or invoke Designer Initiated Library Processes.

Class B: Requests to promote data through the public library.

Class C: Requests for Automated Library Processing on a Remote Execution Machine or responses from Remote Execution Machines to indicate completed Library Processes.

Class D: Requests to install new data generated by Library Processes on Remote Execution machines, delete files from the DMS, or perform Data Management functions.

The classes represent priorities with Class D being tho highest and Class A being the lowest. Every ALM in the library (Primary ALM and all Remote Execution Machines) runs the ALM algorithm described in FIG. 55 as an AutoReader task. AutoReader automatically invokes the algorithm whenever a file is received in the reader.

In an Actor/Object system, either the Actors have the ability to directly manipulate files in the repositories (such as Unix/AIX), or they must rely on a dedicated ALM known as an Object to handle all file management tasks. The Object has the proper authority for all repositories in the library. The Actors run the ALM algorithm as an AutoReader task, just like the primary ALM in a conventional system. However, many of the Class C and D jobs related to file management are replaced by the Actor performing its own file manipulations (if the environment allows it), or by communication with the Object (such as a VM Actor/Object system).

In systems requiring an Object, communication between the Actor and Object is accomplished by an asynchronous messaging system where the Actor initiates a request to the Object and waits for a response message from the Object. The message consists of a command line which includes the:

Function to be Performed

Source File Name

Source File Type

Target File Name

Target File Type

Source Repository

Target Repository

The repository fields include enough information to physically locate the file regardless of the platform or environment. The Object, in turn, runs a continuous routine implemented as an AutoReader interrupt hook. Whenever it receives a message, the routine "wakes up" and checks to ensure the message is from a valid Actor, and contains one of the supported functions. It then executes the appropriate function and sends a completion message to the Actor. If either the Actor or Object fails to transmit or respond to a message successfully, a mechanism will resend the message until the handshaking is complete.

Regardless of the environment, all Actor/Object systems support the following functions:

Rename Move or Rename the file from the source to the target location. This is only used on environments which support it such as Unix/AIX, or VM when the source and target are the same minidisk.

Copy Copy the file from the source to the target location. This is used to install an output file from an Actor into the repository, or as the first part of promotions involving a Cross-Platform file movement, Cross-Account or Cross-Minidisk file movement on VM.

Delete Delete the file from the source location. This is used for File Delete requests or as the second part of promotions involving a Cross-Platform file movement, Cross-Account or Cross-Minidisk file movement on VM.

Batch Used for multiple files which must be manipulated as part of the same task. A batch file is generated listing each file along with it's corresponding command line. The commands must be one of the three supported commands (Rename, Copy or Delete). The ALM loops through each line of the batch file and processes each file successively.

Note: ALMs only deal with file manipulation requests. In the preferred embodiment, it's up to the DMS algorithm overseeing the file movement (such as the Promotion or File Installation algorithm) to determine which type of library arrangement exists and whether job requests should be created and transmitted to a Conventional ALM or Actor/Object commands should be generated and executed. Therefore, the underlying code for all these algorithms must query the DMS for the type of library arrangement. If it's Actor/Object, the code must also determine whether the environment utilizes an Actor/Object messaging scheme, or whether the Actor can execute the Rename, Copy and Delete functions directly.

Automated Library Machines are based on the concept of an Automated Reader where the Reader is a temporary storage area which accepts library requests. A Reader, may simply be a directory where data is copied into, or it may be part of the environment such as the VM system. A simplistic implementation of an Automated Reader would incorporate a continuous loop with a timer to view the files in the Reader at specified intervals, and upon finding one, initiating the ALM algorithm in FIG. 55*a* thru 55*f*. However, our preferred embodiment implements an Automated Reader by using an AutoReader service machine. This software machine is capable of performing many tasks outside the arena of Data Management, as well as providing the Automated Reader function.

Once a file is detected in the Reader, the ALM algorithm in FIG. 55 is invoked. It begins with Step 29120 in FIG. 55*a* where a registration check is performed. All ALMs must be registered with the Control Repository, and when registration is complete a flag is set. In Step 29120, Reg. Flag, this flag is tested to ensure it's set. If not, Step 29121 is invoked to Register the ALM. The ALM is first checked to ensure it's an authorized user of the Control Repository, and if so, it updates the repository with certain environmental information such as user id, system address, etc.

Upon completion of the registration, Step 29122 is executed to test for a Startup command. This is passed into the ALM algorithm as an AutoReader parameter whenever the machine is re-started. This could be the result of a system crash or a manually initiated command. In the case of an ALM Startup, various tests are made to attempt to recover any interrupted or incomplete tasks. The first test, done in Step 29125, is for a Process Crash. This is done by looking for the existence of a Bucket in the ALM's work space. Our Process Manager writes a Bucket file each time it begins running an Automated Library Process. If the process completes normally, the Bucket is erased. The existence of a Bucket signifies a Mid-Process crash, which results in Step 29126 being executed to Send a Message to the user who requested the Library Process. This information is contained in the header of the Bucket file.

Figure 55B:
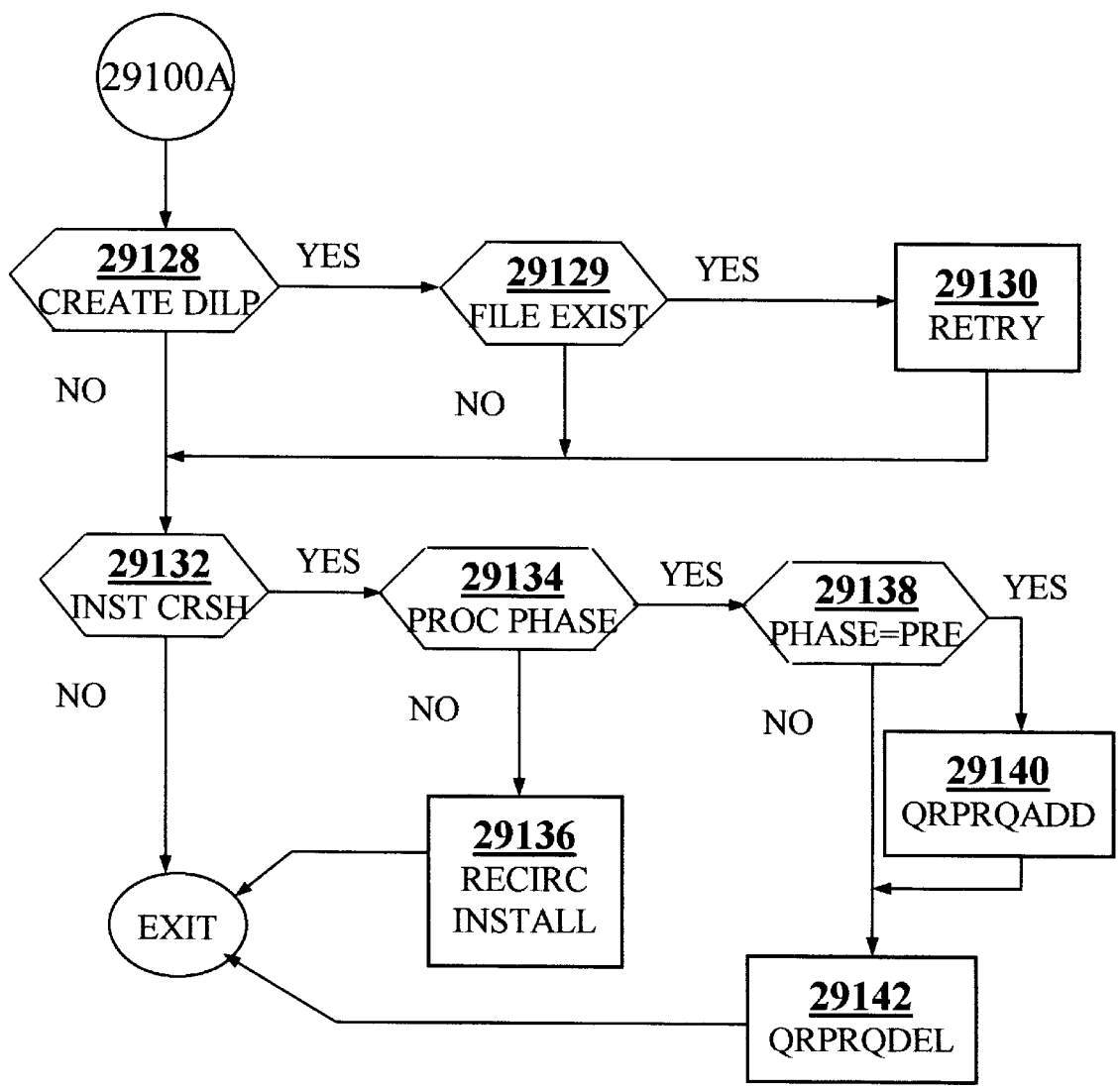
Figure 55C:
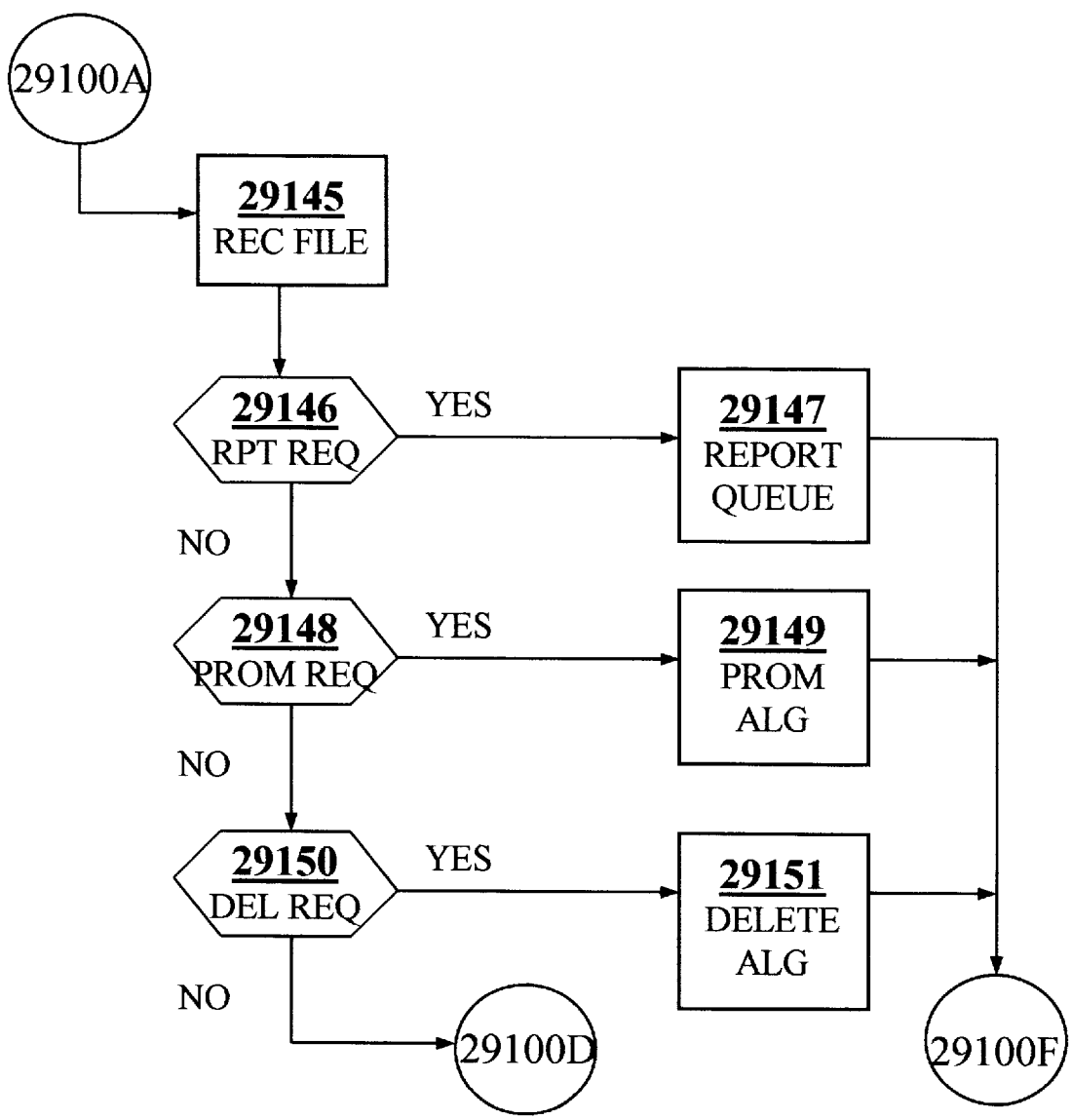

Control proceeds to Step 29128 of FIG. 55*b* to test for a Create DILP Recovery file. This file is created during the installation of the output of a special Automated Library Process known as a Create DILP. In the event of an ALM interruption, this file contains all the information necessary to retry the file installation. Next, Step 29129 checks for the File Existence of the Create DILP output. Assuming it's present in the ALM's work space, Step 29130 in invoked to Automatically Retry the installation of all Create DILP output. The installation entails calling the QRSUPGEN function to update the necessary files tables as well as calling QRRESADD to add the Library Process result.

The third test is for a regular Install Crash in Step 29132. This is accomplished by testing for the existence of an Install Recovery file. Like the Create DILP Recovery file, this file is written as part of the file installation algorithm to aid in automatic recovery. If it exists, the recovery action is determined by the existence of the Process Phase parameter in the Install Recovery File. Step 29134 tests for the Process Phase. If it is absent, the installation was not initiated by an Automated Library Process, therefore Step 29136 simply Recirculates the Install Request. If the phase does exist and the originator of the request is an ALM other than the current machine, then Step 29138 is executed to test if the Phase= Pre Process. If so, then Step 29140 will be invoked to call the QRPRQADD function to add a special entry to the Library Process Queue. This prohibits the file undergoing Pre-Processing from moving through the DMS, or executing any further Library Processes, until the installation can be performed successfully. Regardless of the phase, Step 29142, QRPRQDEL, will eventually be called to delete the entry from the Library Process Queue that was created by the Install Algorithm to prevent any file creation or movement while the installed file is in transit.

Once the appropriate recovery action is completed, or if none of the three types of recoverable scenarios are satisfied, control exits the algorithm and returns to the AutoReader machine.

Returning to Step 29122 in FIG. 55*a*, if the current request is not a Startup then control proceeds to Step 29123 to Order the Reader. This step incorporates a combined algorithm to provide first-come-first-serve processing for non-Data Management requests, while ensuring Data Management jobs are handled in order of priority. First the file is examined to see if it's possesses a higher priority than a library request. The type of request is also checked to see if it's a supported library request. All library requests contain a LIB keyword in the job type. If none of these conditions are satisfied, the program immediately returns control to the AutoReader algorithm to process the non-Data Management request. Otherwise, this is assumed to be a library work request. In order to maintain data integrity, all library requests are processed in order of highest to lowest priority. Step 29123 accomplishes this by sorting all reader files, which possess one of the four job classes, in descending priority order. If multiple files contain the same priority, they are sorted by time from oldest to most recent. This yields the oldest, highest priority file. The program then determines if the type is a library request. If so, it will be processed, otherwise, the sorted list is searched until the oldest, highest priority library request is found. This ensures that the library requests are done in the proper order, but still permits non-library work to be intermixed.

Next, Step 29124 is invoked to Resolve the Sender of the library request. This entails reading the sender's id and electronic address from the header portion of the work request. At this point control proceeds to Step 29145 in FIG. 55*c* to Receive the File. Receiving the file refers to moving the file from the reader to the ALM's workspace so downstream programs can access it. These downstream programs may be the Promotion algorithm or an Automated Library Process, but our embodiment ensures all ALM's use identical work spaces, which are environment specific, so any downstream process can easily find the data. For example, in an aix/unix environment, a nomenclated subdirectory is used as the ALM's work space, whereas temporary DASD is used in a VM system.

Steps 29146 through 29163 are used to direct the library request to the proper algorithm. It can best be handled with a case or select statement, and the FIGS. 55*c* thru 55*e* don't imply any order for these steps. Step 29146 tests for a Report Request. Our embodiment permits the user to send requests for various nightly reports. If Step 29146 tests positive, then Step 29147, Rpt is invoked to add the request to the nightly report queue file. At a pre-determined time, a service machine wakes up and processes all the requests in the queue.

Step 29148 tests for a Promote Request. These can be requests to transfer data into a public library from a private library, or move data through a public library. The data may be an individual file, a group of files, or an aggregate grouping. Regardless of the type of promote, control is passed to the Promotion algorithm in Step 29149. This algorithm is detailed in FIGS. 14 and 15.

Step 29150 tests for a Delete Request. These are requests to delete data from a shared library, and they can be initiated by the owner of the data or the Data Manager. Delete requests are handled by the Delete algorithm in Step 29151. This algorithm is described further in FIGS. 53 and 54.

Figure 55D:
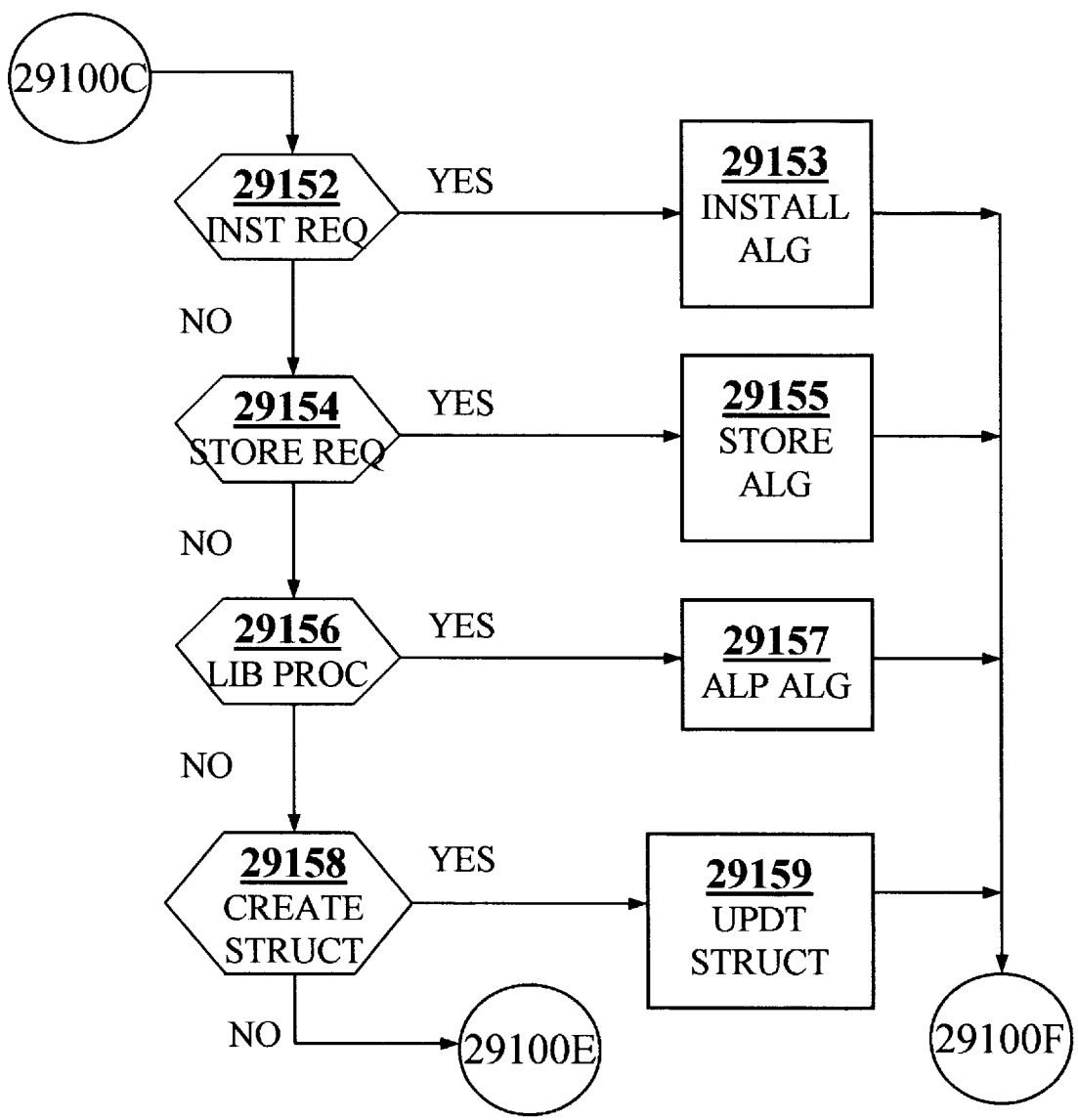

The case structure continues in FIG. 55d with Step 29152 which tests for an Install Request. This type of request originates from an ALM acting as a Remote Execution Machine in a Conventional Library System. Since the Remote Execution Machine can only execute Library Processes, but not manipulate data, it must send a request to the Primary ALM to store the data into the repository. In this case, control is passed to the Install algorithm in Step 29155. This algorithm is detailed in FIG. 33.

Step 29154 tests for a Store Request. This is almost identical to the Install Request in Step 29152, except that the data is not tracked in the Control Repository. It's simply deposited into the data repository without any affiliation to the library structure. These requests originate under the same circumstances as Install Requests, but they are handled by the Store algorithm in Step 29155.

The Store Algorithm in Step 29155 simply consists of reading the file information out of the request file and determining exactly which repository the file should be stored on. This information is contained within the job request. Next, the code receives the file from the reader and copies it into the appropriate repository. Since the file is not tracked by the DMS, no queries are made to the Control Repository. Furthermore, the nomenclature on the file consists only of a Filename, Library File Type and Version. There is no Package, Level, or File Reference Number.

In Step 29156, the program checks for one of the many types of requests associated with Automated Library Processes. Due to the many different library arrangements supported by our embodiment, any given ALM may be playing the role of a Conventional ALM, Remote Execution ALM, or an Actor. This means that any ALM must be capable of receiving a job request to initiate an Automated Library Pre-Process, Post-Process, or a Designer Initiated Library Process (DILP). Additionally, it may receive responses from completed Pre, Post or DILPs. All requests related to Library Processing are handled by our Automated Library Processing algorithm in Step 29157.

Step 29158 is designed to handle requests which Create a Structure File. Our preferred embodiment uses Structure Files to supplement the Structure Tables in the Control Repository. These files contain a formatted list of all the Levels and Versions installed for this Package, their repositories, and the information linking the Level and Version tree. This permits many of the Data Management functions to reference this file instead of querying the repository, thereby increasing availability and possibly improving performance. In order to assure that these files are kept in sync with the Control Repository, any changes made by the Data Manager to the library structure result in a Create Structure File Request being sent to the library's main ALM. Upon receiving it, Step 29159 is invoked to Update the Structure File using the latest information in the DMS. This step extracts the structure information from the Control Repository and writes it into the Structure File with the proper format.

Figure 55E:
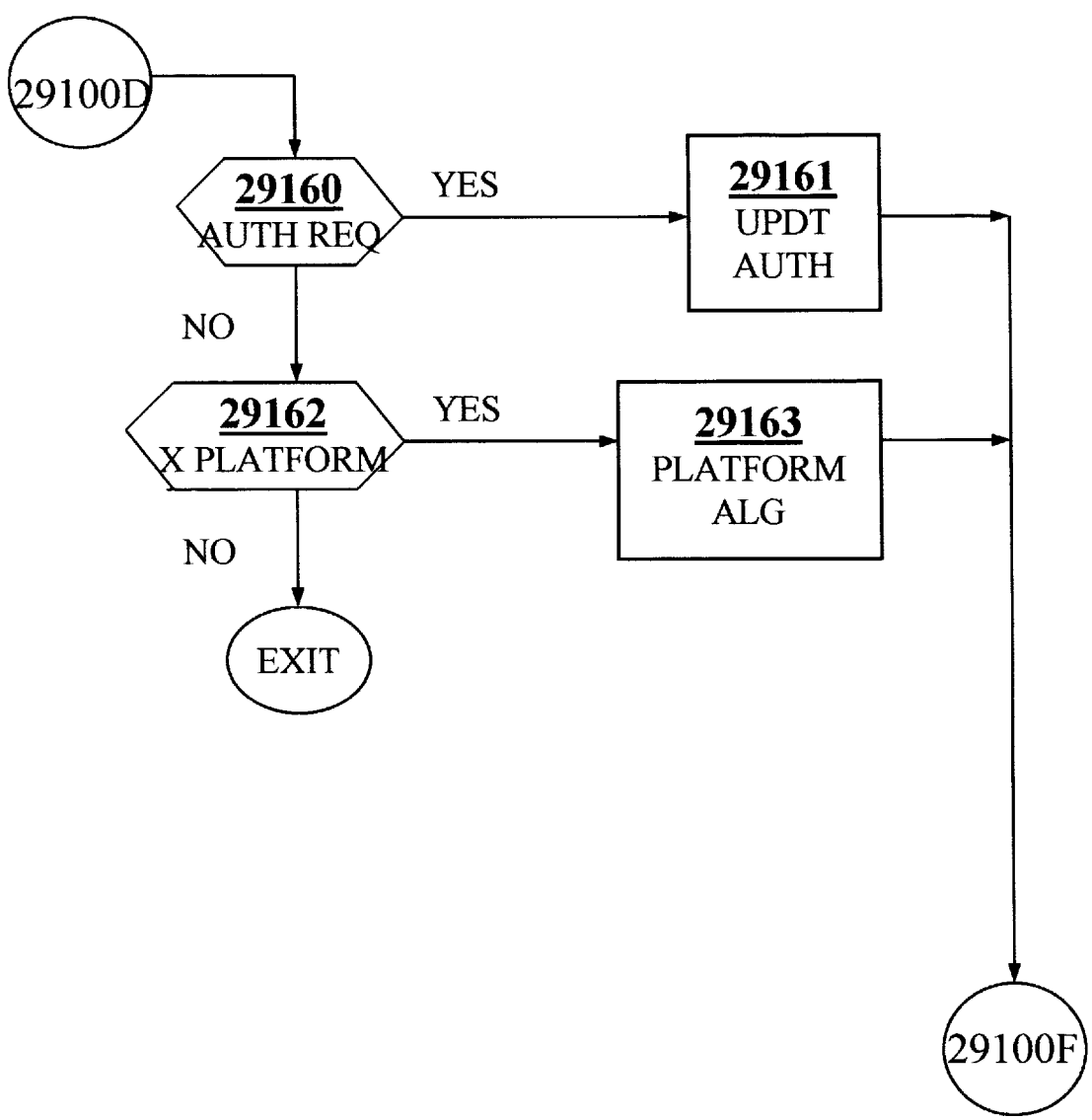
Figure 55F:
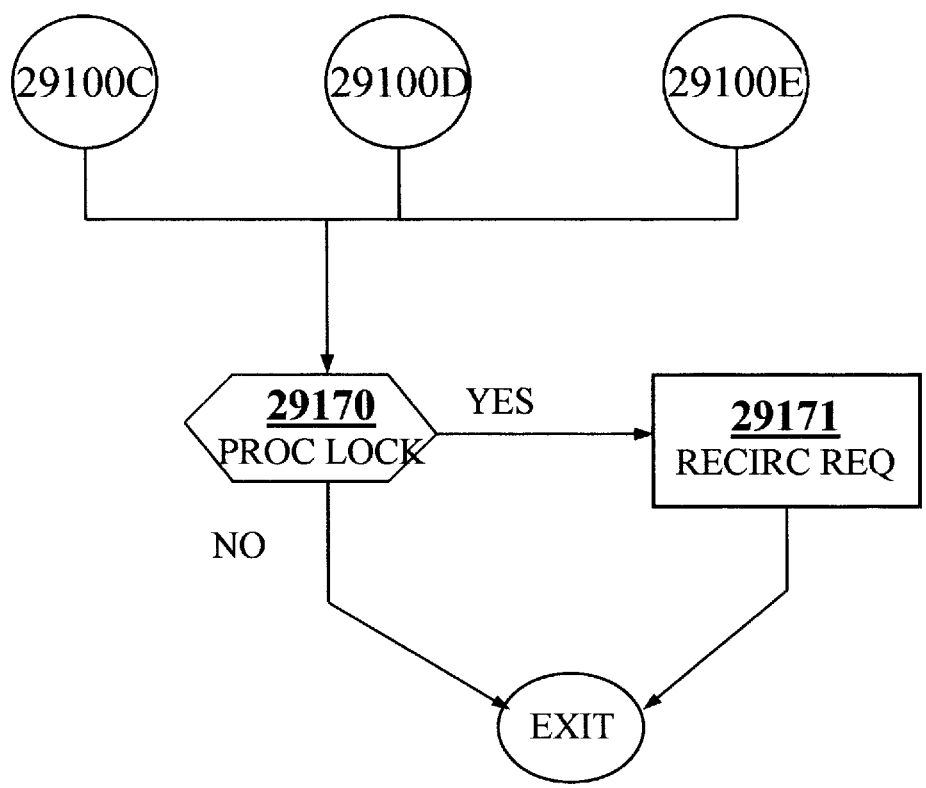

The case structure continues with Step 29160 in FIG. 55e which tests for an Authority Request. Data Managers may elect to use Authority profiles to generate a master list of authorized users for their Package. Every time this list is generated, it's sent to the master ALM for the Package, where upon receiving it, Step 29161 is invoked to Replace the Authorized Users List. This simply consists of copying the newly received file over the existing user list. Detailed information regarding Authority Profiles can be found in our Authority Manager.

Step 29162 tests for a Cross Platform data transfer such as a file being promoted from a Unix/AIX platform to a VM platform. Step 22432 of our Promotion algorithm, describes how files are moved from the source repository to the destination. In many cases the ALM running the algorithm has the proper access to perform the necessary file transfer functions without any assistance. However, cases such as this one, don't permit the proper access to the ALM on the source platform. Therefore, the source ALM suspends running the Promotion algorithm and uses a special ALM, running on the target platform, as a communication agent to forward a Cross-Platform job request to any ALM on the target platform capable of writing to the target repository. This ALM on the target platform receives the Cross-Platform Data Transfer job request which requires the special algorithm in Step 29163 to be invoked.

Step 29163 runs the Cross Platform Algorithm which begins by reading the header line from the Cross-Platform job request file. Next a loop is established to process each file listed in the request. For each file the source repository is linked in a read mode, and the destination repository is linked in a writable mode. The appropriate file transfer protocol is established and the file is copied to the target repository. The copy of the file residing in the source repository is then deleted.

At this point the file movement is completed, so control returns to the top of the file loop until all files are moved to their target locations. The code then executes the same steps in the Promotion Algorithm that would've taken place if the source ALM performed the file movement. These consist of Step 22433 in FIG. 15d and all the steps in FIG. 15e.

If the request keyword doesn't match any of the tests, then control is returned to the AutoReader and a message is sent to the sender indicating a non-supported library request. It should also be noted that this structure easily permits additional types of library requests to be added. For example, other environments may require a type of library processing not discussed in the preferred embodiment. By simply assigning a keyword to that type of request, any algorithm or program can be exercised upon receipt of the work request.

On the other hand, if any of the supported algorithms are executed, they will eventually return control to Step 29170 to test for a Processing Lock. Some of the algorithms such as the Promotion and Library Processing algorithms may not be able to process the current request if it involves data currently locked in the DMS. In this case, the algorithms return a unique return code, which Step 29170 detects. If it tests positively, then Step 29171 is invoked to Recirculate the request. This entails placing the request back into the Reader with the same priority, but a current time stamp. If there are no other work requests in the Reader, then this request will continuously loop through the Reader until the Processing Lock is relieved and the appropriate algorithm can service the request.

In a DMS utilizing ALMs, all Foreground algorithms transmit job requests to the ALMs which execute the Background algorithms. In order to assist these Foreground algorithms in locating the proper ALM to send the request to, our embodiment provides the following means. The preferred embodiment contemplates the use of a Master Library Directory which retains information about every library in the DMS. The listing is sorted by Package ID, and each record indicates whether the libraries for that Package are running in Conventional mode or Actor/Object mode. Additionally, the record indicates the primary repository for that library. This repository holds any data with library-specific data such as Library Logs, AutoReader control files, Actor lists, etc. User data may or may not be located in this repository.

The Master Library Directory may be maintained within the Control Repository or as a separate flat file kept in a commonly accessible location. Since any authorized user of the DMS may invoke a Foreground algorithm, all users' client environments must have access to this information. Regardless of its location, the Foreground algorithms always follow this procedure for transmitting job requests. First, the Package is checked to see if it's running a Conventional or Actor/Object system. If it's Conventional, then the primary repository is the Primary ALM where all job requests should be transmitted. Using the four level Class system explained above, the Foreground algorithm directs the job request to the Primary ALM's reader queue. Eventually, the Auto-Reader accepts the job request and initiates the ALM algorithm in FIG. 55 to process it.

If the Foreground algorithm detects an Actor/Object system, then it must locate the Actor List. This is a listing of all the Actors servicing a given library. For each Actor in the list, information exists denoting the type of work requests it's allowed to receive. The Actor List is established by the Data Manager using our Data Management Configuration Utilities. A utility exists which permits the Data Manager to easily define a multiplicity of Actors with their corresponding qualifications. This information is stored in the Control Repository and may be duplicated in a text file which is stored in the primary repository.

Once the information in the Actor List is acquired, the Foreground Algorithm looks for a special Actor called a Dispatcher. In systems without dispatchers, the algorithm simply scans the Actor List until it finds an Actor capable of accepting the type of work request being transmitted. If more than one work request is being generated, and more than one Actor is capable of accepting that type of work, the requests are distributed evenly between the Actors in a simple round robin scheme. However, our embodiment incorporates the use of a Dispatcher to maximize efficiency by receiving all work requests from all users into a single "Bank Teller" queue. The Dispatcher is a special purpose ALM whose sole job is to accept work requests from users client machines, and dole them out to the next available Actor capable of servicing that particular request. The Dispatcher ALM runs a special Dispatching algorithm which is described below. Once the work request reaches the Actor, it's handled in the same manner as a Conventional System whereby the request is received and processed by the ALM algorithm.

Note: Work requests generated in the users' environment are never sent directly to Remote Execution Machines. The use of a Remote Execution Machine is specified for Automated Library Processes by the Data Manager. When a user initiates one of these special Library Processes, the work request is first analyzed by the Primary ALM, in a Conventional system, or an Actor ALM. The ALM algorithm decodes the work request and calls upon our Library Process Manager to direct it to the appropriate Remote Execution Machine.

Our embodiment further enhances libraries arranged in an Actor/Object configuration by contemplating the use of a Dispatcher ALM. The Dispatcher is a special purpose Actor which accepts job requests from the user and holds them until an Actor capable of processing that work request is available to service it. Throughput is enhanced by ensuring all Actors are kept busy whenever possible, and the workload is balanced across all of them. Configurations using a Dispatcher identify the userid in the Library's Actor List with a special entry denoting it as a Dispatcher. All foreground algorithms which generate work requests check for this entry upon detection of an Actor/Object configuration. If it exists, the job request is sent to the corresponding userid. Otherwise, the Actor List is examined for the first Actor in the list capable of servicing that request. The job is then dispatched directly to that Actor. If multiple jobs need to be dispatched, the jobs are distributed to all the Actors, capable of handling the task, in a round-robin fashion. This scenario may lead to an unbalanced workload among several Actors if the job requests have a large disparity in processing times. The Dispatcher is designed to eliminate this.

The preferred embodiment permits any ALM to act as a Dispatcher simply by configuring the Autoreader to run a special Dispatcher algorithm. This algorithm is detailed in FIG. 56. It works on the premise that Autoreader permits three types of interrupts:

1. A new request arriving in the Reader causes a PreCheck interrupt.
2. A message or command may be used as an interrupt.
3. AutoReader's built in timer acts as an interrupt when it "wakes up".

Figure 56A:
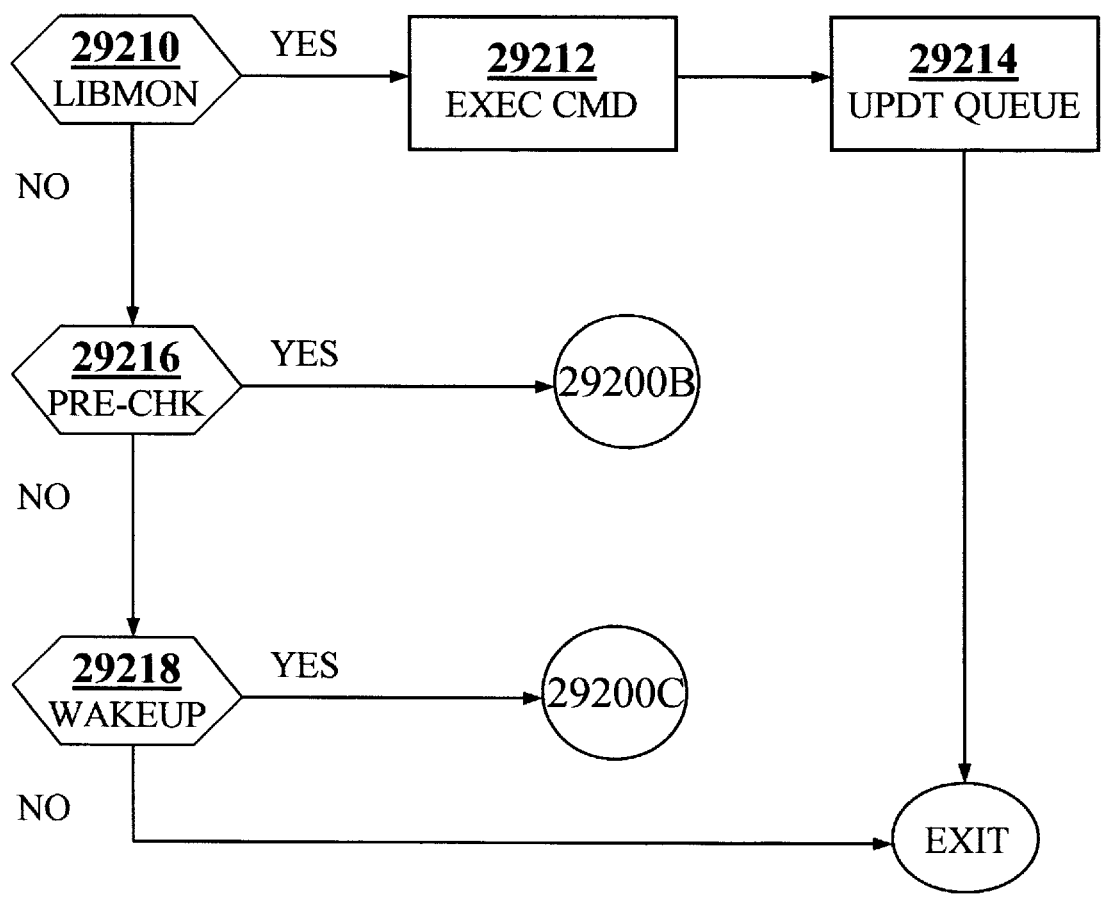
FIGS. 56a thru 56d describes the special dispatcher algorithm for an Autoreader.
Figure 56B:
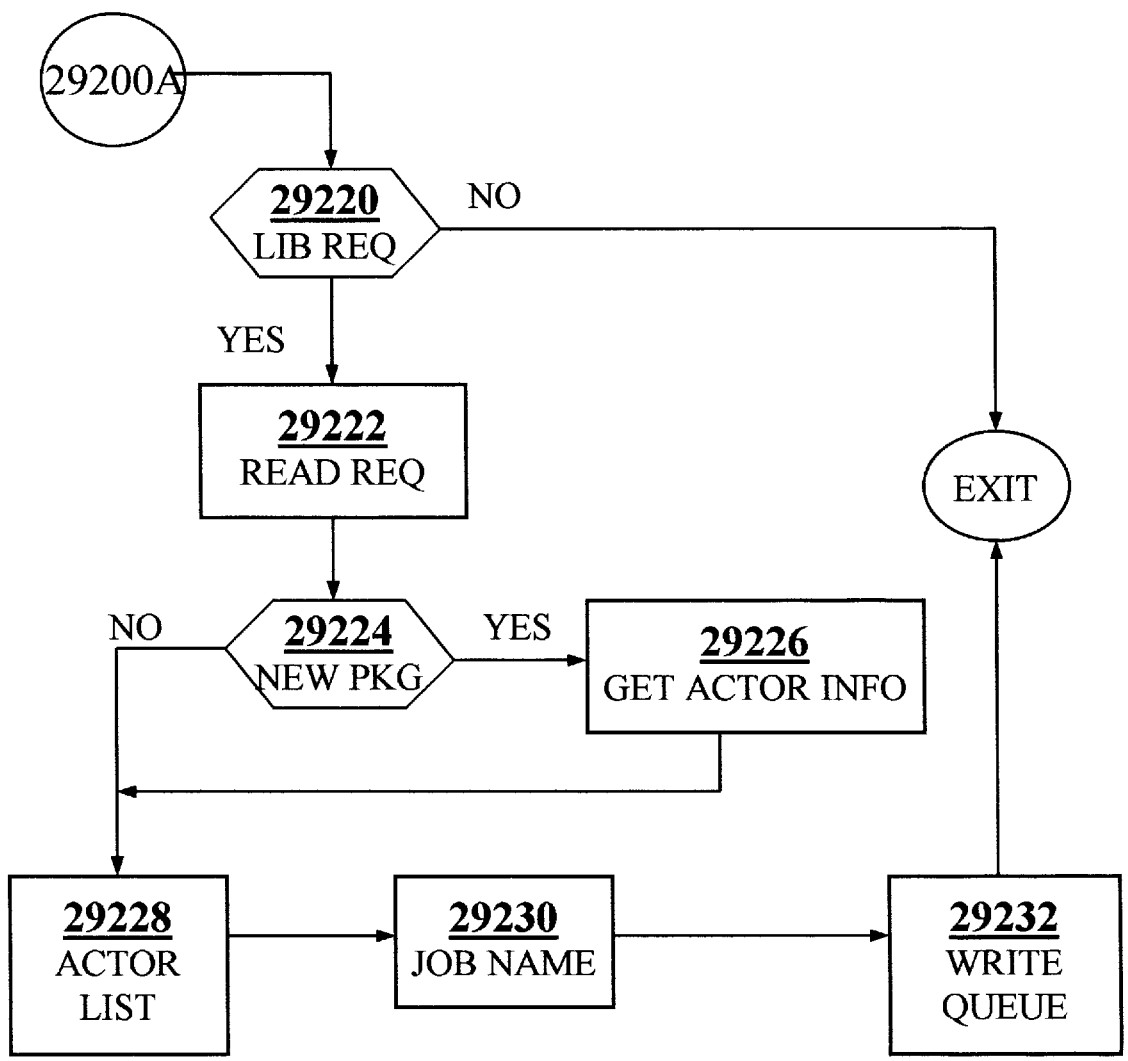

The algorithm continuously monitors for any type of interrupts. Upon receiving one, it must check to see if it's one of the three aforementioned types. There are other types of interrupts, but they don't pertain to the Dispatcher function. FIG. 56*a* uses the decisions in Steps 29210, 29216, and 29218 to check the type of interrupt, but one skilled in the art would clearly see that this lends itself to a Case or Select structure where no order is implied.

In the embodiment, Step 29210 Checks for a special message or command known as a LibMon command. LibMon refers to a series of utility functions available to the Data Manager to control the Dispatcher. The following commands may be sent to the Dispatcher:

Delete Permits an entry to be deleted from the Dispatcher's Job Queue.

Jump-to-Top Will reorder the Job Queue entries such that the selected job request will be placed at the top of the list for its job class.

Change Class Allows a job request's class to be changed. Valid classes are A, B, C, D, where D is the highest priority.

If Step 29210 detects a LibMon command, Step 29212 is invoked to Execute the Command. This entails first querying the Control Repository to ensure that the sender is a Data Manager, or valid alternate, for this Library. Upon confirmation, the command is executed as stated in the aforementioned definitions. Step 29214 Updates the Job Queue and rewrites the file based on the command executed in the previous step.

Returning to Step 29210, if it's not a LibMon command, the interrupt is checked in Step 29216 to see if it's a PreCheck. This indicates a new item has arrived in the Reader, and if so, control proceeds to Step 29220 in FIG. 56*b*. Step 29220 examines the request to see if it's a valid Library Job Request. A valid Library Request can be determined by a keyword embedded in the name of the request.

If the request is not a Library Request, then the algorithm exits and control is returned to AutoReader to process it as a non-Dispatcher request.

Otherwise control proceeds to Step 29222 which Reads the Request File and performs a comparison between the sender of the job request and the requester contained within the request. The requestor's id is embedded into the job request by one of the foreground algorithms which generate work requests for ALMs. If the compare detects a mismatch, this indicates the job request was sent to an intermediary prior to reaching the Dispatcher. Since a possible data integrity violation may ensue, Step 29222 rejects the request and sends a notification to the sender. The program then exits.

If the comparison is successful, Step 29224 is employed to test for a New Package ID. In order to improve performance, the Dispatcher maintains a list of all Packages and Actors (along with their electronic address) it services. Periodically this list is refreshed since the Data Manager may revise the Actor list or change an electronic address. Step 29224 tests to see if the Package ID of the current job request is contained in this list. If it's a new Package, then Step 29226 is called to Obtain the Actor Information for the Package. In our preferred embodiment, this information is obtained by querying the Control Repository or reading the information from the Library's Actor List.

Control eventually proceeds to Step 29228 where the Library's Actor List is examined for all Actors capable of handling the current request. If there are multiple candidates, each one is remembered in a list. Step 29230 is then invoked to transfer the job request from the Reader into the Dispatcher work area and assign a unique Job Name. Due to the generic style of nomenclating library job requests, it is possible for a dispatcher to receive multiple job requests with similar job names. Therefore, in order to avoid overlaying a request, each is given a unique name based on a time-stamp prior to transferring it to the work area. The original name is remembered as it is required for dispatch to the Actor. Finally, Step 29232 Writes an Entry into the Dispatcher's Job Queue. The entry consists of:

The current date and time

The original job request name

The unique job name

The sender

The job class

The list of Actor candidates who may accept this job

The algorithm exits and control is returns to AutoReader.

Returning to Step 29216 in FIG. 56*a*, if the interrupt is not caused by a PreCheck, Step 29218 tests for a Wakeup interrupt. This interrupt is caused by AutoReader's internal timer mechanism which can be set by a variety of sources, including the dispatcher algorithm.

Figure 56C:
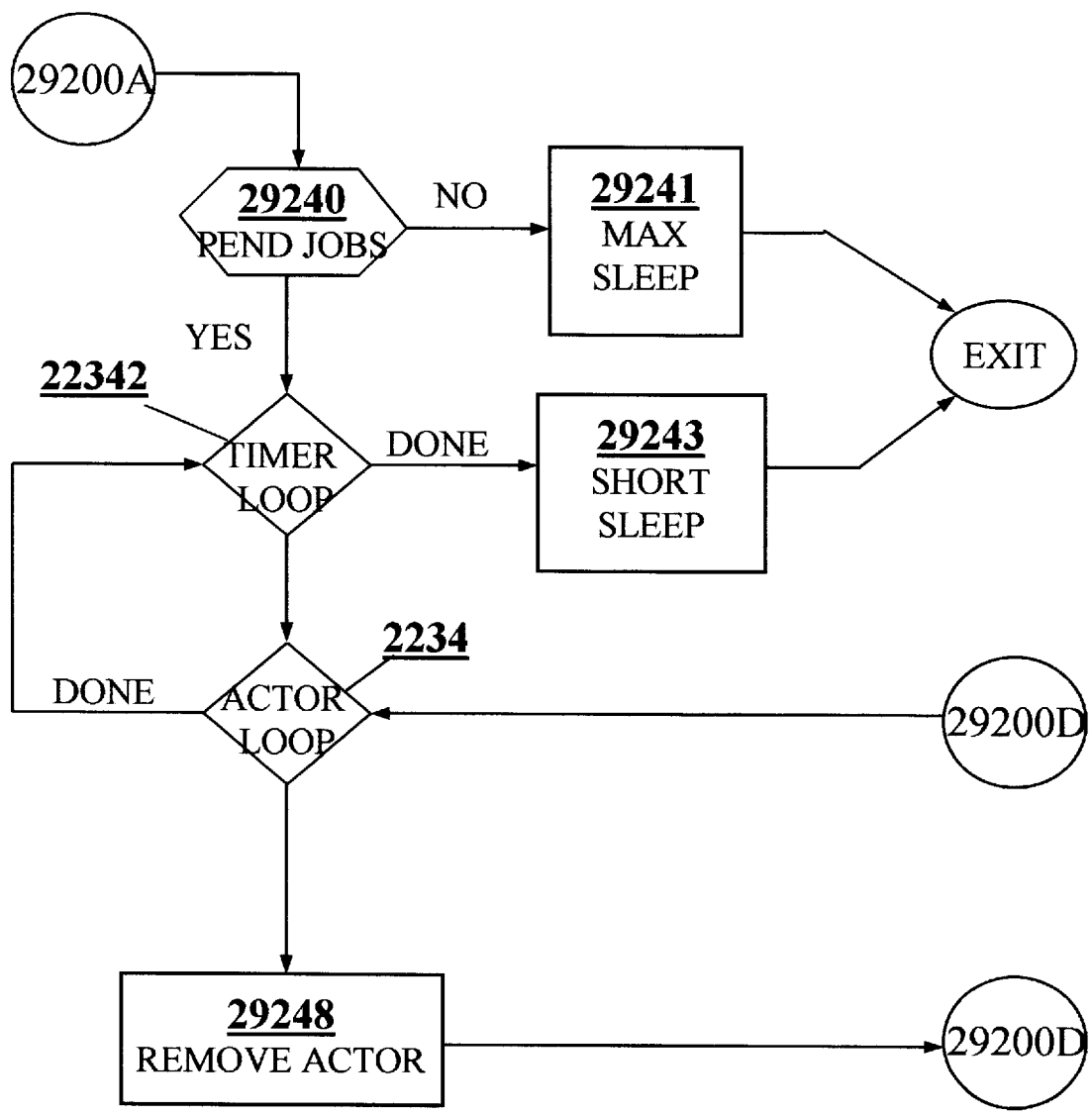

If a Wakeup interrupt is detected, control proceeds to Step 29240 in FIG. 56*c*. This step looks for Pending Jobs by testing for any entries in either the Dispatcher's Job Queue or the Dispatched Jobs List. If there are no Pending Jobs, then the program sets AutoReader's internal timer for a specified period of Maximum Sleep. In our preferred embodiment this time period is ten minutes, but the amount is a function of the amount of library traffic, the number of Actors, the computer platform, size of the user community, etc. Regardless of the specific amount of sleep time, Step 29241 is designed to set the timer and exit the algorithm, thereby pausing the Dispatcher until it's time to "wake up" again, or the sleep is disturbed by one of the other types of external interrupts.

If either list has entries then there are Pending Jobs which may require action on the part of the Dispatcher. This results in Step 22342 invoking a Timer Loop. This step utilizes AutoReader's internal timer to step up a series of one minute intervals. At the beginning of each minute, the program tests for any entries in either the Job Queue or Dispatched Jobs List. If both are empty, the loop exits to Step 29243. If there are jobs in either list, then 22344 is invoked to set up an Actor Loop.

In Step 22344, each actor in the Dispatcher's list of Actors is checked to see if it's available to accept new work. This means the Actor is not busy and the ALM is operational. The program then invokes Step 29248 to examine the Dispatched Job's List to see if a previous job was assigned to this Actor. If so, it Removes the Actor from the Dispatched Jobs List. This allows new work to be sent to this Actor.

Figure 56D:
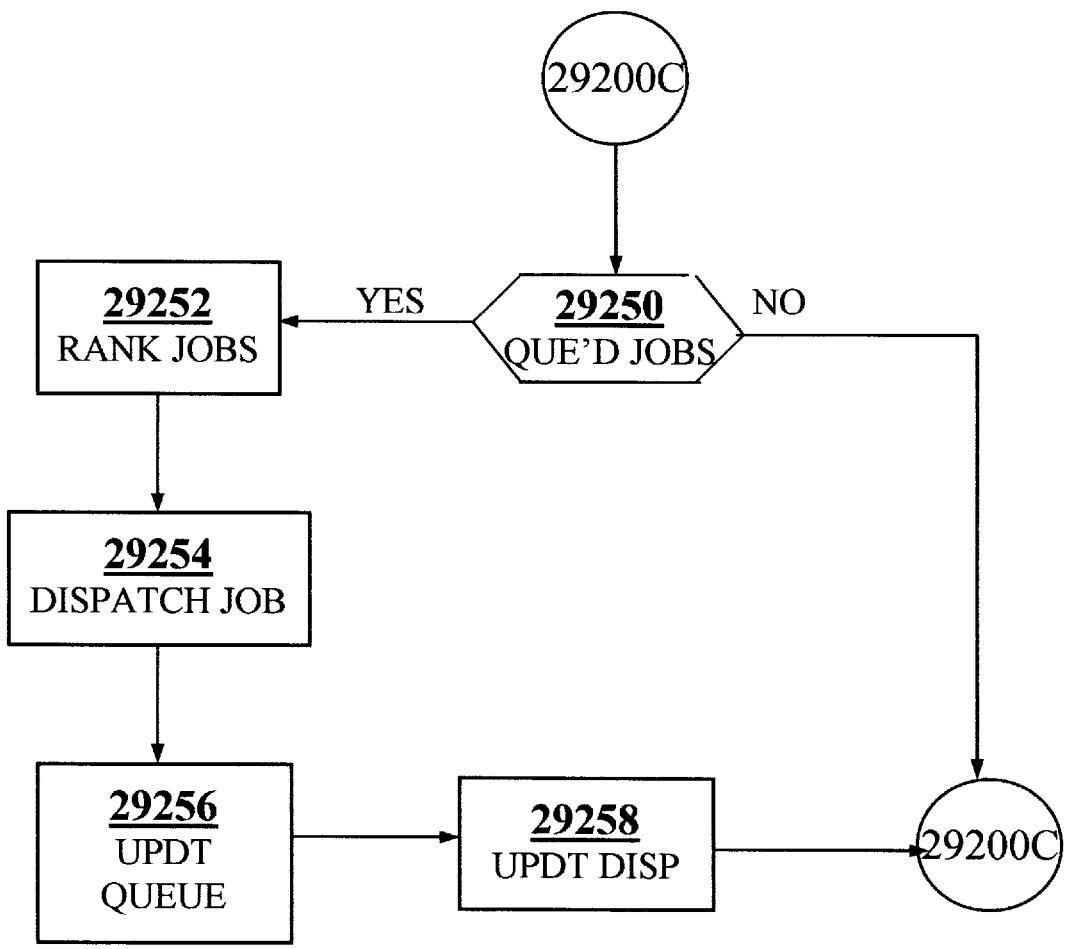

Control proceeds to 29250 in FIG. 56*d* where each of the Queued Jobs in the Dispatcher's Job Queue is examined to see if they can be dispatched. First, Step 29252 Ranks the Jobs by class where class D is the highest and class A is the lowest. Next, Step 29254 loops through each of the four classes and attempts to match each entry with a free Actor. It does this by extracting the job class and list of candidate Actors from the Job Queue, one record at a time. This information is compared against the current Actor and current class being worked on. If a match is found, the Job Request is renamed from the unique Job Name to the original name and transmitted to the Actor.

At this point Step 29256 Updates the Dispatcher Job Queue by removing the job dispatched in the previous request. Step 29258 performs the complementary operation by adding the job request to the Dispatched Jobs List. The Updated Dispatched Jobs List contains records which track each job dispatched along with the Actors to which the work is assigned. This prevents one Actor from being assigned a job while it's currently working on another one.

Control returns to the top of the Actor Loop in Step 22344 and Steps 29248 thru 29258 are repeated for all Actors serviced by the Dispatcher. Once the Actor Loop is exhausted, control returns to the Timer Loop in Step 22342. This series of loops continues until the first of two events occurs. Either all Actors have been matched with compatible work in the Job Queue, or the maximum 10 minute time period has elapsed.

At this point control proceeds to Step 29243 where a Short Sleep may be required. Basically, the elapsed time from the beginning of the Timer Loop is compared to the 10 minute threshold. If all 10 minutes have elapsed, the program exits back to AutoReader. Otherwise, AutoReader's internal timer is set for the remainder of time between the elapsed time and the 10 minute threshold. For example, if there was only one entry in the Job Queue, and it was able to be dispatched during the first pass of the Timer Loop, then Step 29243 would set the internal timer for 9 minutes. On the other hand, if there were so many queued jobs that the Timer Loop kept processing for the full 10 minutes, then Step 29243 would essentially do nothing and exit.

Library Manager functions in Data Management Control Utilities

This following describes the processes that support the Library Manager functions in Data Management Control Utilities. The processes are depicted in FIGS. 11 to 53. To support these processes the Library Manager maintains the following tables in the Control Repository.

CRITERIA_EXCEPTION

TABLE 1

CRITERIA_EXCEPTION - Criteria exceptions

| Column | Description |
|---|---|
| REF | Reference |
| PROCESS_REF | Pointer to process for which there is an exception |
| PROCESS_LOG_REF | Pointer to process log reference for which there is an exception |
| LEVEL_REF | Pointer to level for which there is an exception |
| FILE_REF | Pointer to file for which there is an exception |
| LOG_REF | Pointer log entry |

CRITERIA_PROCESS

TABLE 2

CRITERIA_PROCESS - Join of CRITERIA and PROCESS tables

| Column | Description |
|---|---|
| CRI_REF | Pointer to Criteria entry |
| PRO_REF | Pointer to Process entry |
| EXPRESSION | Expression to interpret result |
| LVL_REF | Pointer to level |
| LOG_REF | Pointer to process log entry - used for consistency check |
| POSITION | B before promote, A after promote, P sometime after promote |
| PROCNAME | Process name |

FILE_GROUP

TABLE 3

FILE_GROUP - File Groups

| Column | Description |
|---|---|
| REF | Reference number |
| LEVEL_REF | Reference of master level |
| MASTER_LFT | Master library filetype |
| PACKAGE | Master Package id |
| VERSION | Master Version |
| LEVEL | Master Level id |
| SUB_LFT | Subordinate Library File type |
| REQUIRED | Y, if subordinate filetype is required. N, if not |
| PURGE | |
| SUB_LEVEL_REF | Reference of subordinate level |

FILE_LEVEL

TABLE 4

FILE_LEVEL -

| Column | Description |
|---|---|
| FILEREF | File Reference number |
| FILENAME | Filename |
| CMSTYPE | CMS Filetype |
| LVLREF | Level reference number |
| LEVEL | Level name |
| LIBTYPE | Library file type |
| PACKAGE | Package id |
| VERSION | Version |
| LIBUSER | USERID where level resides |
| LIBCUU | MINIDISK where level resides |

TABLE 4-continued

FILE_LEVEL -

| Column | Description |
|---|---|
| LIBLAB | MINIDISK label where level resides |
| SRCREF | Source file reference number for generated files |
| FLAG | File flag - V if a virtual file, otherwise blank |
| NEXTLVL_REF | Reference number of next level |
| PUTABLE | Files can be put to this level |
| PROMOTABLE | File can be promoted from this level |
| PLATFORM | Platform where level resides |
| DIRECTORY | Directory under which level resides |

FILE_LOG

TABLE 5

FILE_LOG - File log

| Column | Description |
|---|---|
| REF | Reference number |
| LOG_TYPE | Type of log entry |
| FILENAME | Filename |
| FILETYPE | CMS Filetype |
| SOURCE_LEVEL | Source Library Level |
| SINK_LEVEL | Sink Library level |
| FILE_REF | Pointer to file entry |
| LIBTYPE | Library file type |
| PACKAGE | Package |
| VERSION | Version |
| USERID | ID of user initiating the action |
| DATE | Date stamp |
| TIME | Time stamp |
| INVOKER | ID of user generating the log entry |

FILES

TABLE 6

FILES - File data

| Column | Description |
|---|---|
| REF | Reference number |
| FILENAME | Filename |
| FILETYPE | CMS Filetype |
| LVL_REF | Pointer to Library Level |
| LOG_REF | Pointer to last log entry |
| OBSOLETE | Y if file is Obsolete, V if file is Virtual |
| SOURCE_REF | Pointer to source file if this is a generated file |

LEVELS

TABLE 7

LEVELS - Library Levels

| Column | Description |
|---|---|
| REF | Reference number |
| LEVEL | Level id |
| PACKAGE | Package id |
| FILETYPE | Library file type |
| VERSION | Version |
| USERID | USERID where level resides |
| CUU | MINIDISK where level resides |
| LABEL | Label of MINIDISK where level resides |
| NEXTLVL_REF | Pointer to next level |
| PUTABLE | Files can be put to this level |

TABLE 7-continued

LEVELS - Library Levels

| Column | Description |
|---|---|
| PROMOTABLE | File can be promoted from this level |
| LOG_REF | Pointer to log entry |
| AUXDISK | If "Y", then level is on auxiliary disk |
| PLATFORM | Platform where level resides |
| DIRECTORY | DIRECTORY under which level resides |

LIB_MACHINES

TABLE 8

LIB_MACHINES - Library Machine information

| Column | Description |
|---|---|
| REF | Reference number |
| USERID | USERID where level resides |
| NODE | |
| DATE | Date of last update |
| TIME | Time of last update |
| AIX_IP_ADDR | AIX_IP_ADDR AIX Internet Protocol address |

LOCKS

TABLE 9

LOCKS - Locks

| Column | Description |
|---|---|
| REF | Reference number |
| DOMAIN | Lock domain - FILE or PROCESS |
| PACKAGE | Package for which the lock is set - * = all, % = none |
| LIBTYPE | Lib. filetype for which the lock is set - * = all, % = none |
| VERSION | Version for which the lock is set - * = all, % = none |
| LEVEL | Lib. level for which the lock is set - * = all, % = none |
| FILENAME | Filename for which the lock is set - * = all, % = none |
| LOCKNAME | Lock name - UPDATE, OVERLAY, MOVE for FILE, Process name for PROCESS |
| LOCKER_ID | USERID that set the lock |
| DATE | Date when the lock was set |
| TIME | Time when the lock was set |
| REASON | Reason for lock |

MEC_LEVEL

TABLE 10

MEC_LEVEL - Relates MECS to levels

| Column | Description |
|---|---|
| REF | Reference number |
| MEC_REF | MEC reference number |
| LEVEL_REF | Reference number of associated level |
| FROZEN | Y if level is frozen |

PART_NUMBERS

TABLE 11

PART_NUMBERS - Part numbers

| Column | Description |
|---|---|
| REF | Reference number |
| PARTNO | Part number |
| FILEASSOC | U—unassociated, A—on A disk, L—in Library, S—Superseded |
| FILEREF | Pointer to file if in library, else 0 |
| FILENAME | File name |
| LIBTYPE | Library file type |
| REQUESTOR | Userid who requested the part number |
| LOGREF | Pointer to log entry |

PEDIGREE

TABLE 12

PEDIGREE - Pedigree of an object file

| Column | Description |
|---|---|
| REF | Reference number |
| OBJECT_REF | Pointer to object file |
| OBJECT_TYPE | Object file type, L = Libraried file, S = Stored file |
| SOURCE_REF | Pointer to source file |

REC_FILES

TABLE 13

REC_FILES - Mapping of files to RECs

| Column | Description |
|---|---|
| REF | Reference number |
| REC_REF | Pointer to REC |
| FILENAME | File Name |
| FILETYPE | CMS file type |
| FILE_REF | Pointer to file |
| ORIGIN | Entry Origin - D = Done, I = Implicit, L—Libraried, P = Planned, W—Working |
| SUPERSEDED | If "Y" this entry has been superseded |

REC_HEADER

TABLE 14

REC_HEADER - REC header information

| Column | Description |
|---|---|
| REF | Reference number |
| PACKAGE | Package Id |
| ORIGINATOR | Userid of Originator |
| MEC_REF | Pointer to MEC to which this REC is assigned |
| PROB_NO | Problem number which this REC fixes |
| DATE | Origination date |
| TITLE | REC title |
| MEC_NO | MEC number |
| REQUEST_NO | Request number |
| FIX_REASONS | FIX REASON CODES (CONCATENATED) |

RESULTS

TABLE 15

| | RESULTS - Auto_Process results |
|---|---|
| Column | Description |
| REF | Reference number |
| PROCESS_REF | Pointer to process |
| FILE_REF | Pointer to file |
| LOG_REF | Pointer to process log entry - used for consistency check |
| RESULT | Auto_process result |
| USERID | User who is recording results |
| DATE | Date stamp |
| TIME | Time stamp |
| REMARKS | Additional remarks |

VALID_PROBLEMS

TABLE 16

| | VALID_PROBLEMS - Valid problem numbers |
|---|---|
| Column | Description |
| REF | Reference number |
| REQUEST_NO | Request number |
| REMARKS | Remarks |

The QRFILDEL Process FIG. 11. This process is used to delete a file from the Control Repository.

After initialization, a query 21001 is made to get the FILES table entry from the Control Repository. If the file information was not found 21002, an error message is issued 21008 and the process aborted 21009. If found, a query 21003 is made to get the PART_NUMBERS entry for the file from the Control Repository If there is a "Libraried" association 21003, an Error message is issued 21008 and the process aborted 21009. If not, a query 21005 is made to determine if there is a "Frozen" MEC_LEVEL entry in the Control Repository. If there is a "Frozen" entry, a check 21010 is made to determine if the requester is a package manager, alternate or surrogate. If not, an Error message is issued 21008 and the process aborted 21009. If there is no "Frozen" entry, an information message is issued 21011 and the return code is set to 4. Next, the QRDELMDL Process described in FIG. 59 in Section 3.0 is invoked 21006. Upon return from this process, a check 21007 is made to determine if a model was deleted. If so, an informational message flag is set 21012. In any case, the model count is pushed 21013 onto the stack. Next a reference is obtained 21014 for a FILE_LOG entry. Then the FILES table entry in the Control Repository is updated 21015 with the FILE_LOG reference and with the Obsolete flag set. Next, a new FILE_LOG entry is inserted 21016 into the Control Repository and the process returns 21017 to the invoker.

The QRSUPCHK Process FIG. 16: The process is used to check whether the specific action (PUT,PROMOTE or MDLPROM) is valid for a given file.

Figure 19:
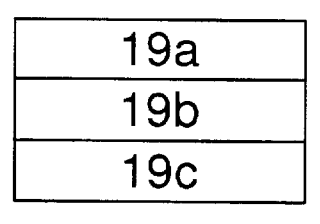
Figure 19A:
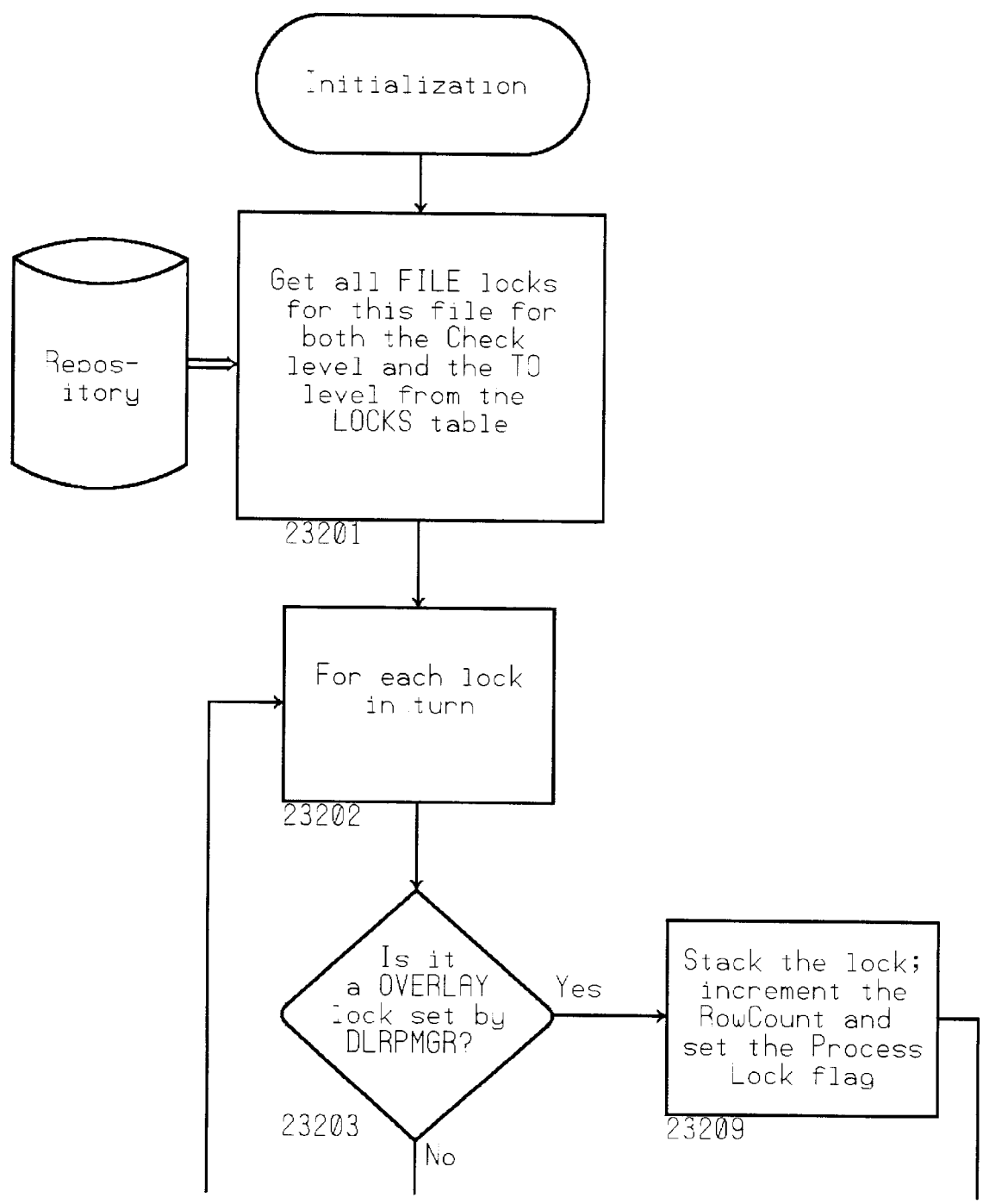
FIG. 19a thru 19c describes the LOKCHKA Process.
Figure 19B:
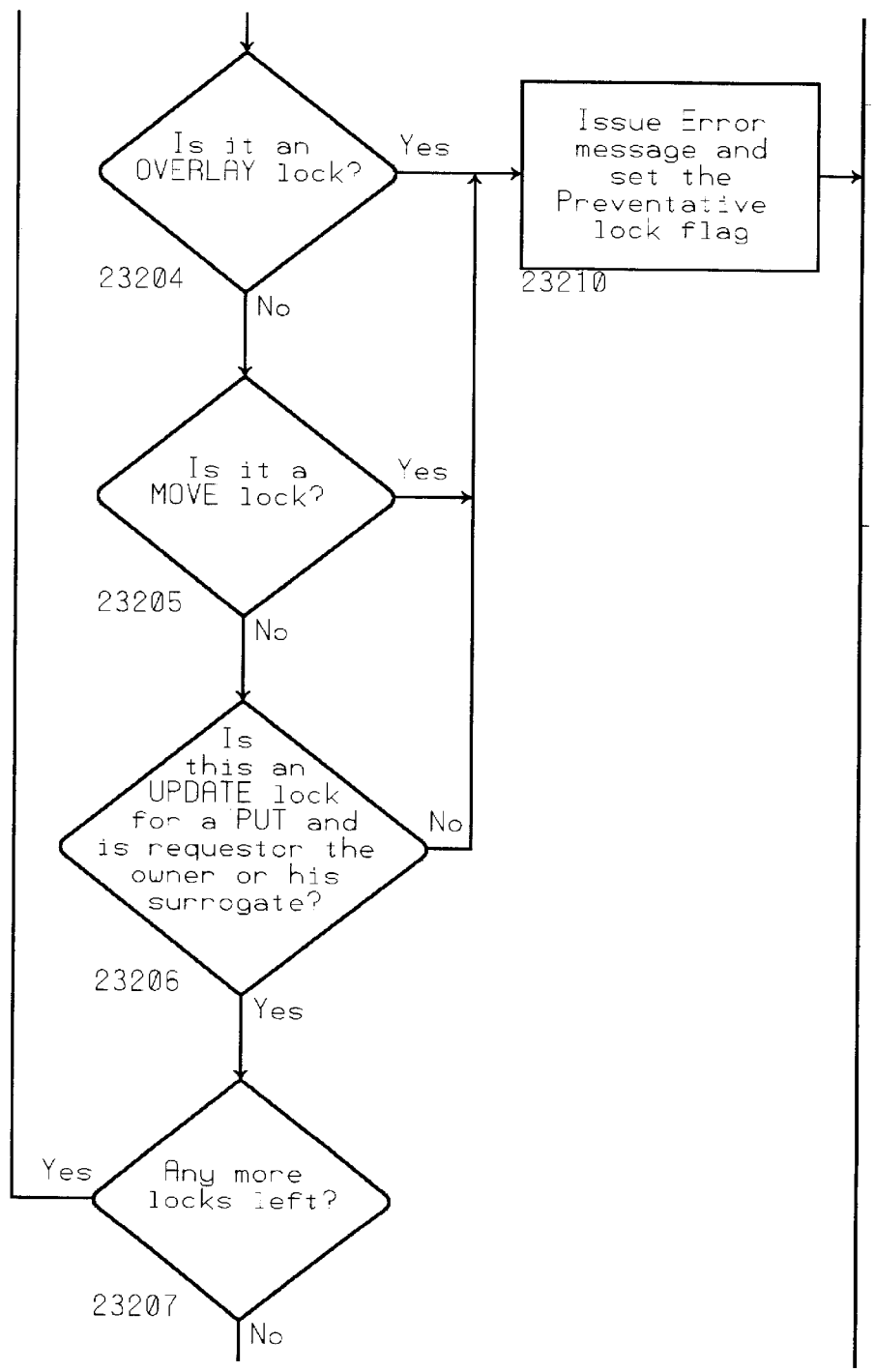
Figure 19C:
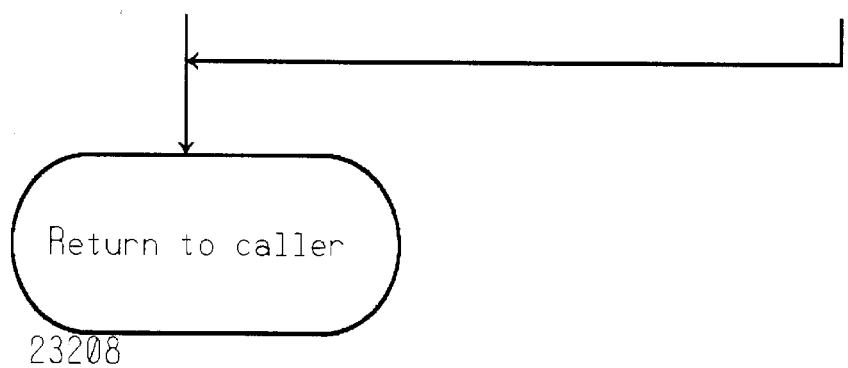
Figure 20:
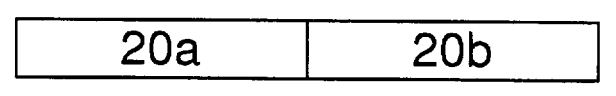
Figure 20A:
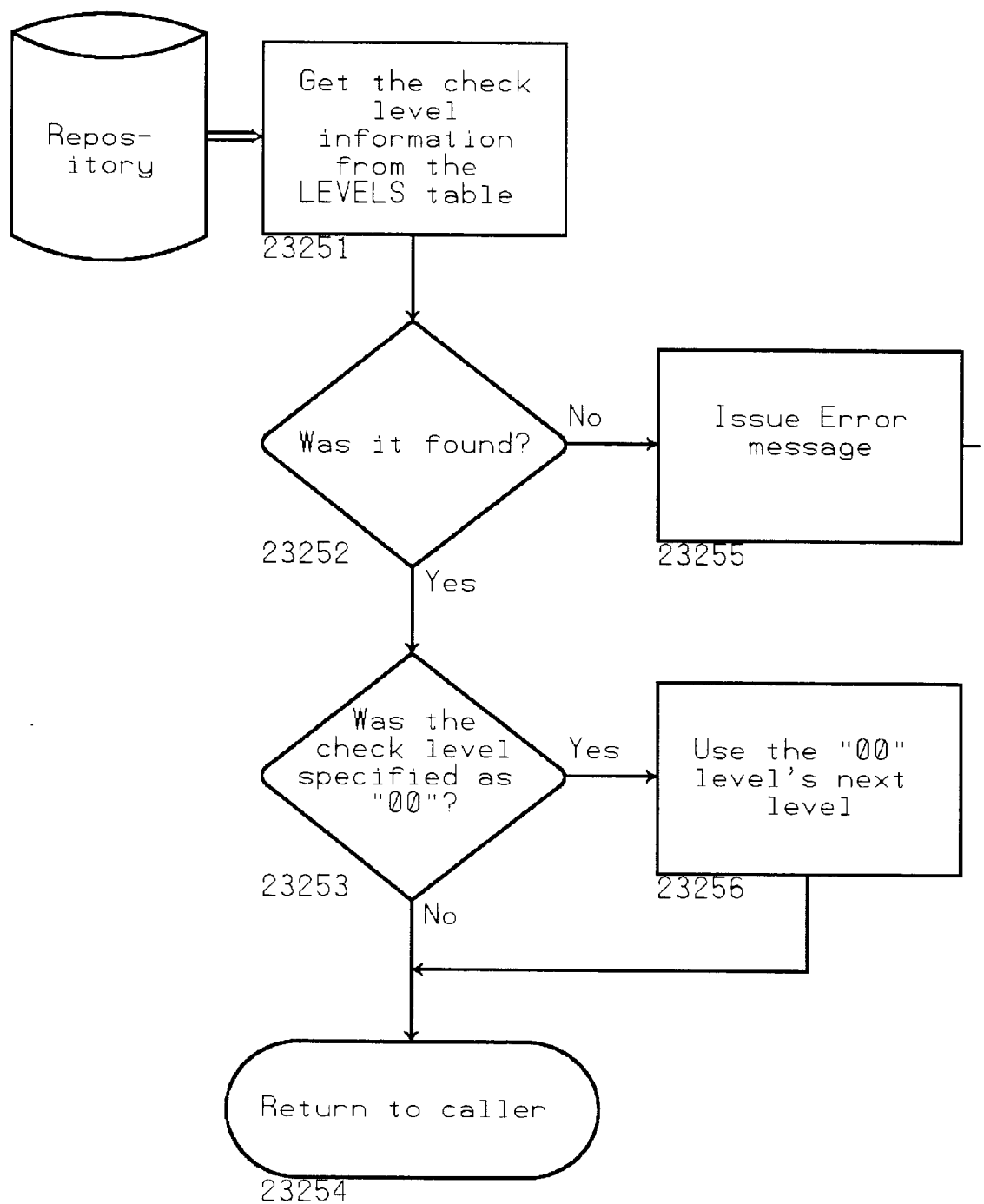
FIG. 20a and 20b describes the LVLINFO Process.
Figure 20B:
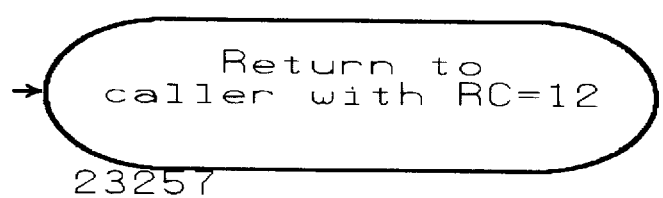
Figure 21:
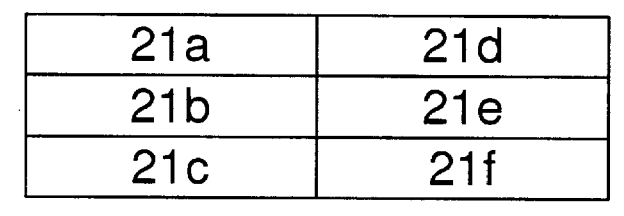
Figure 21A:
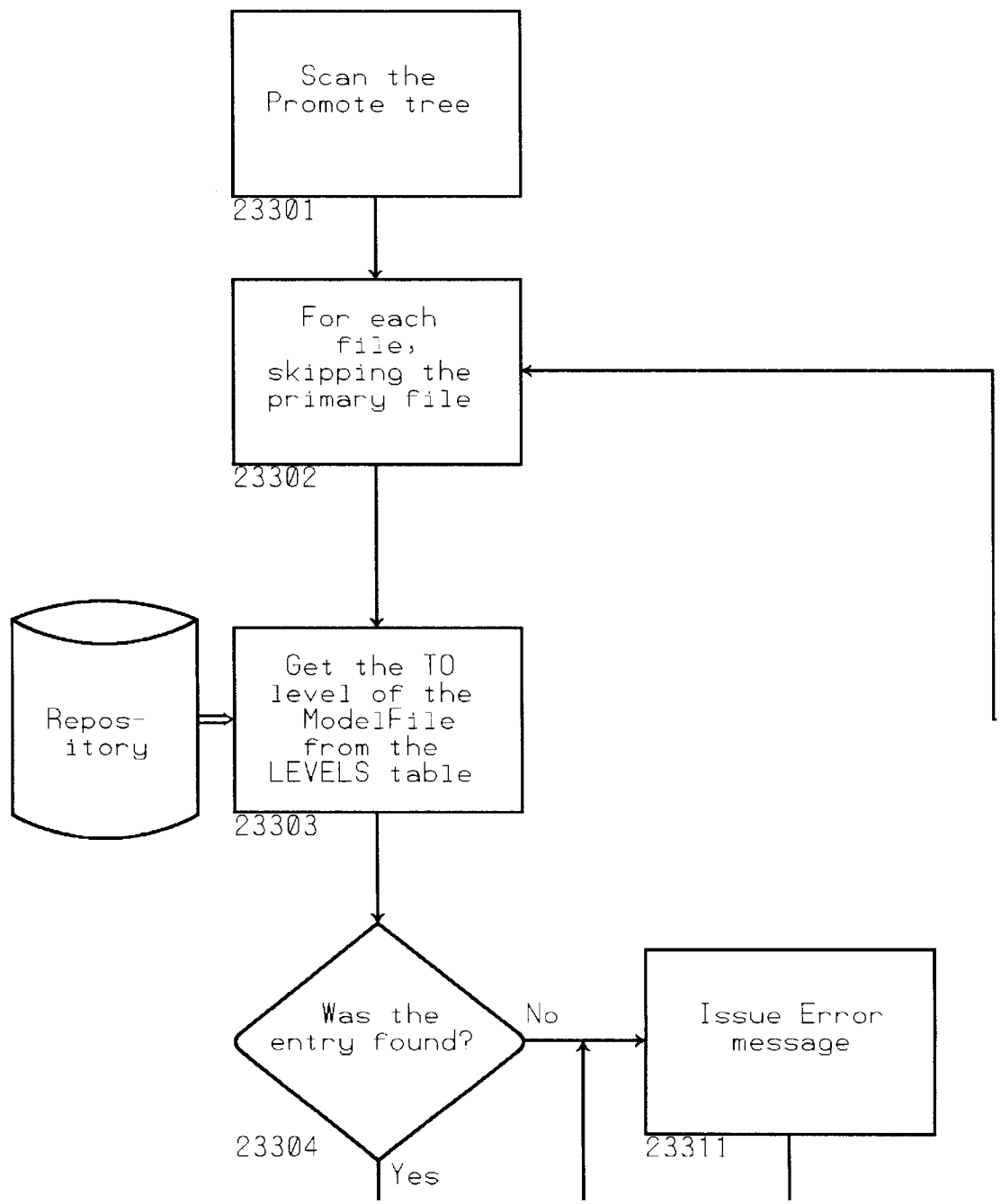
FIG. 21a thru 21f describes the MDLPROM Process.
Figure 21B:
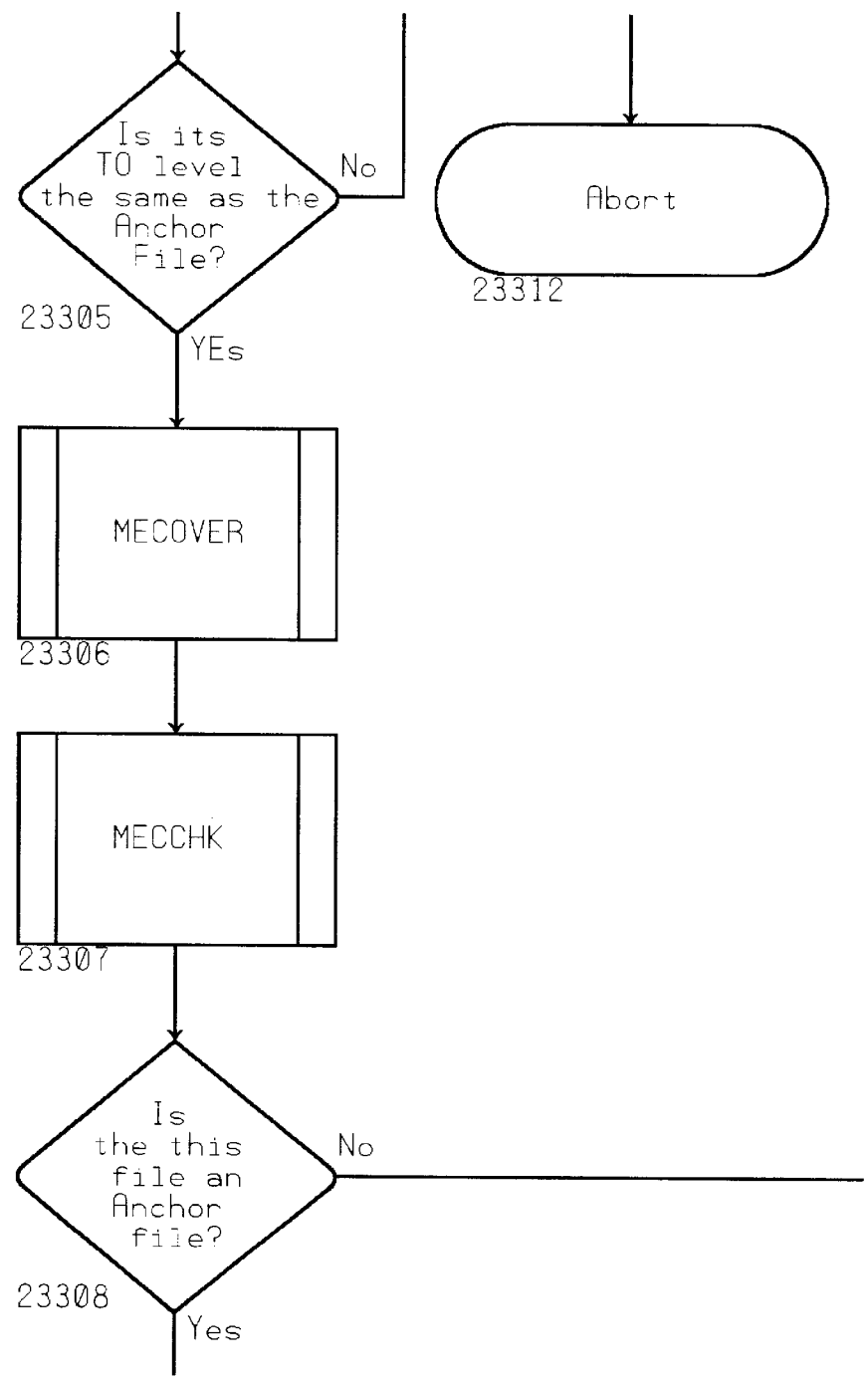
Figure 21C:
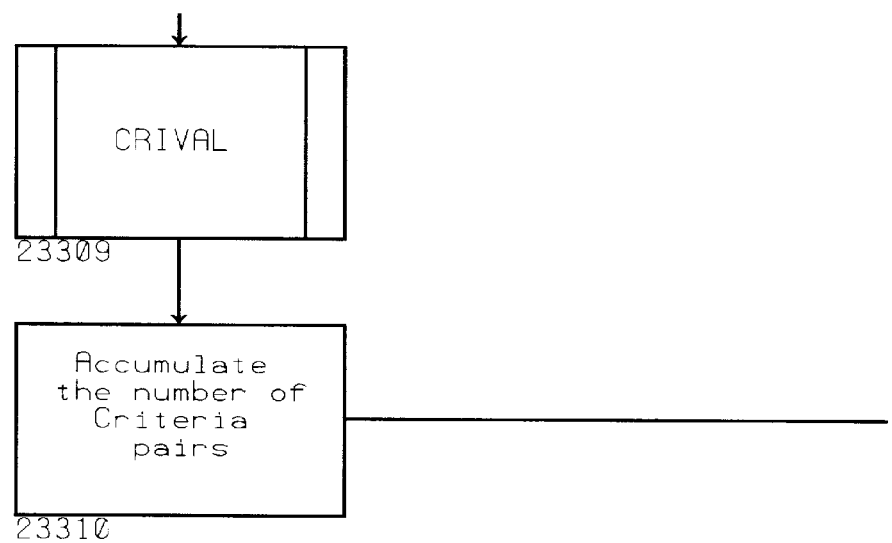
Figure 21D:
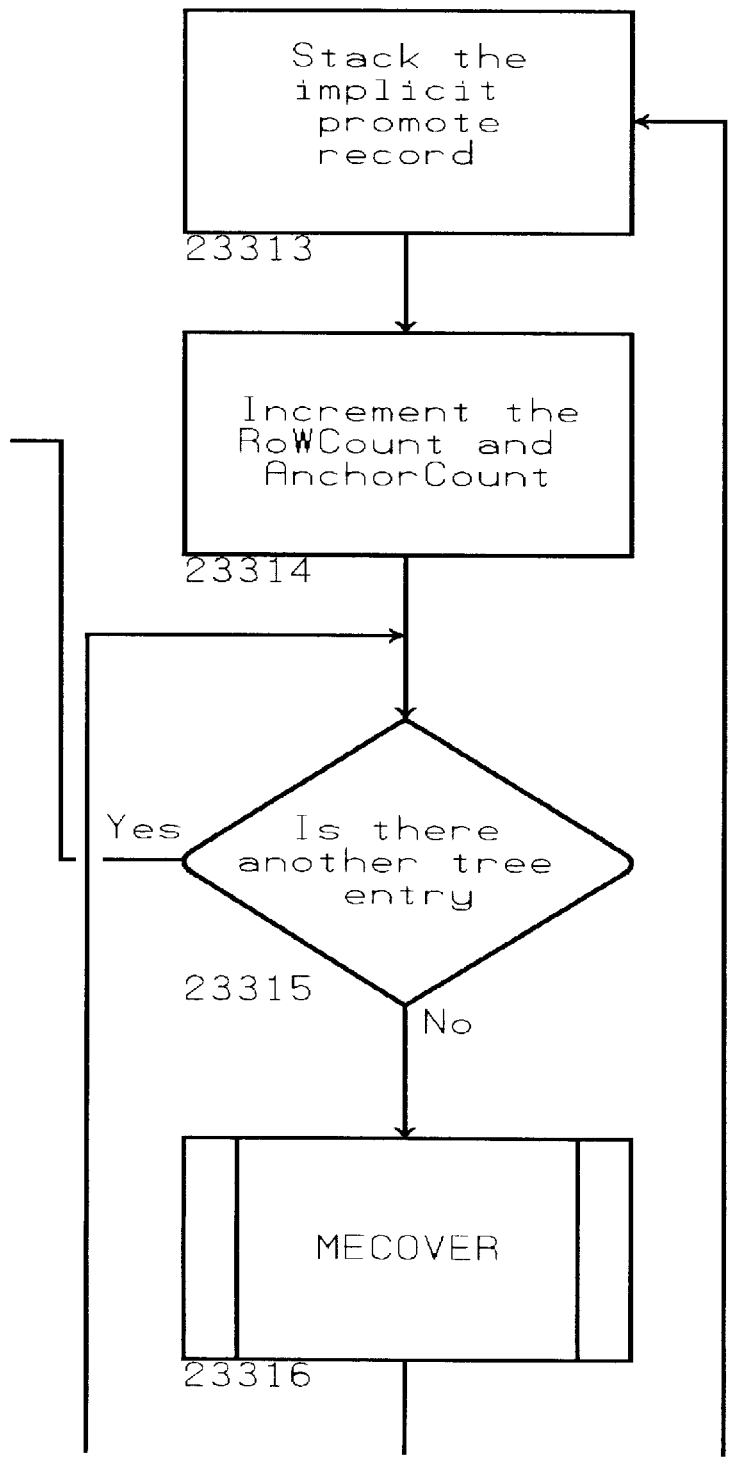
Figure 21E:
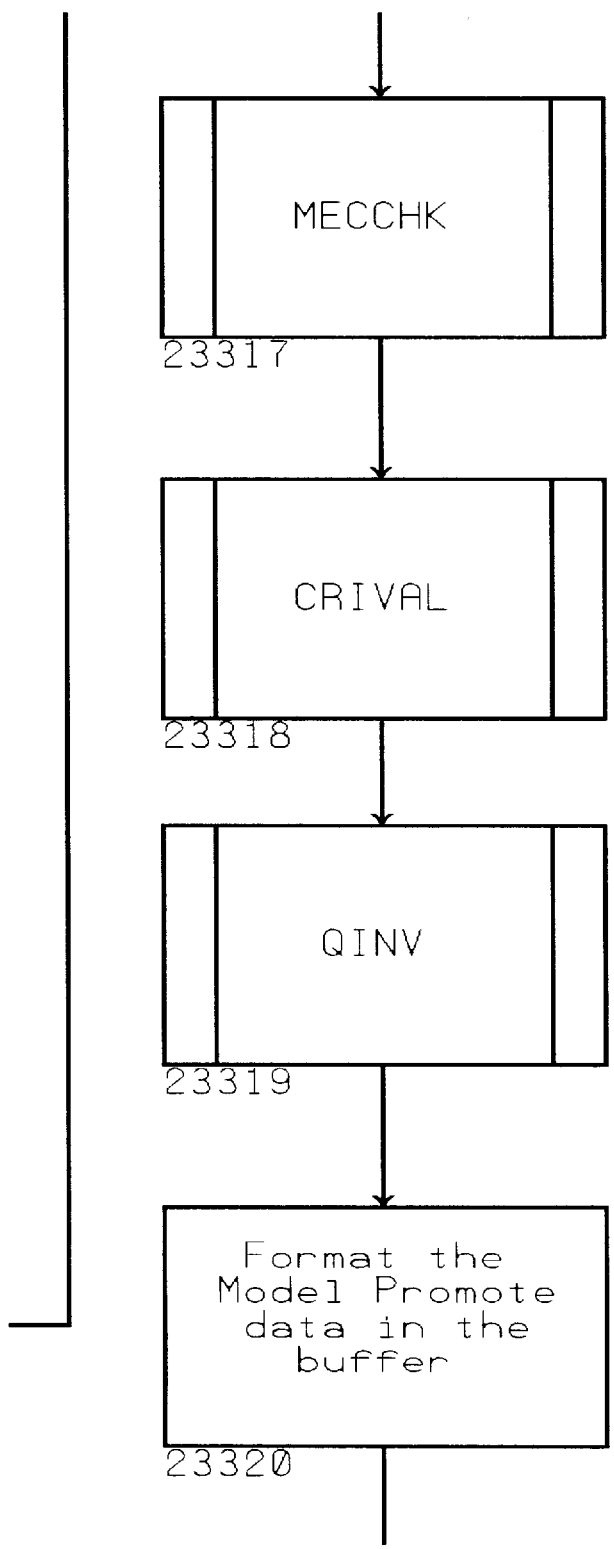
Figure 21F:
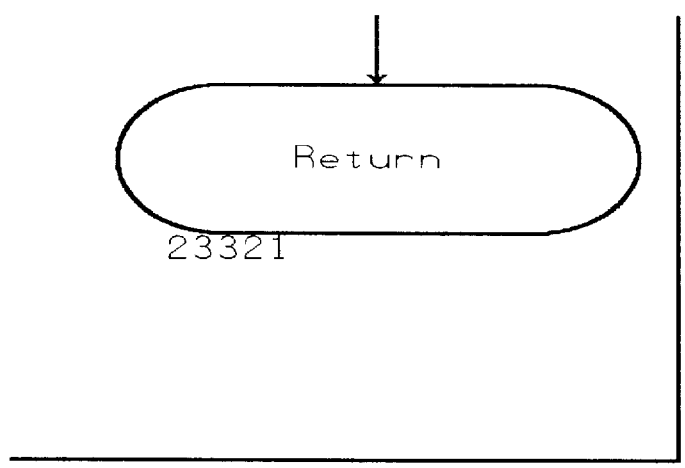
Figure 22A:
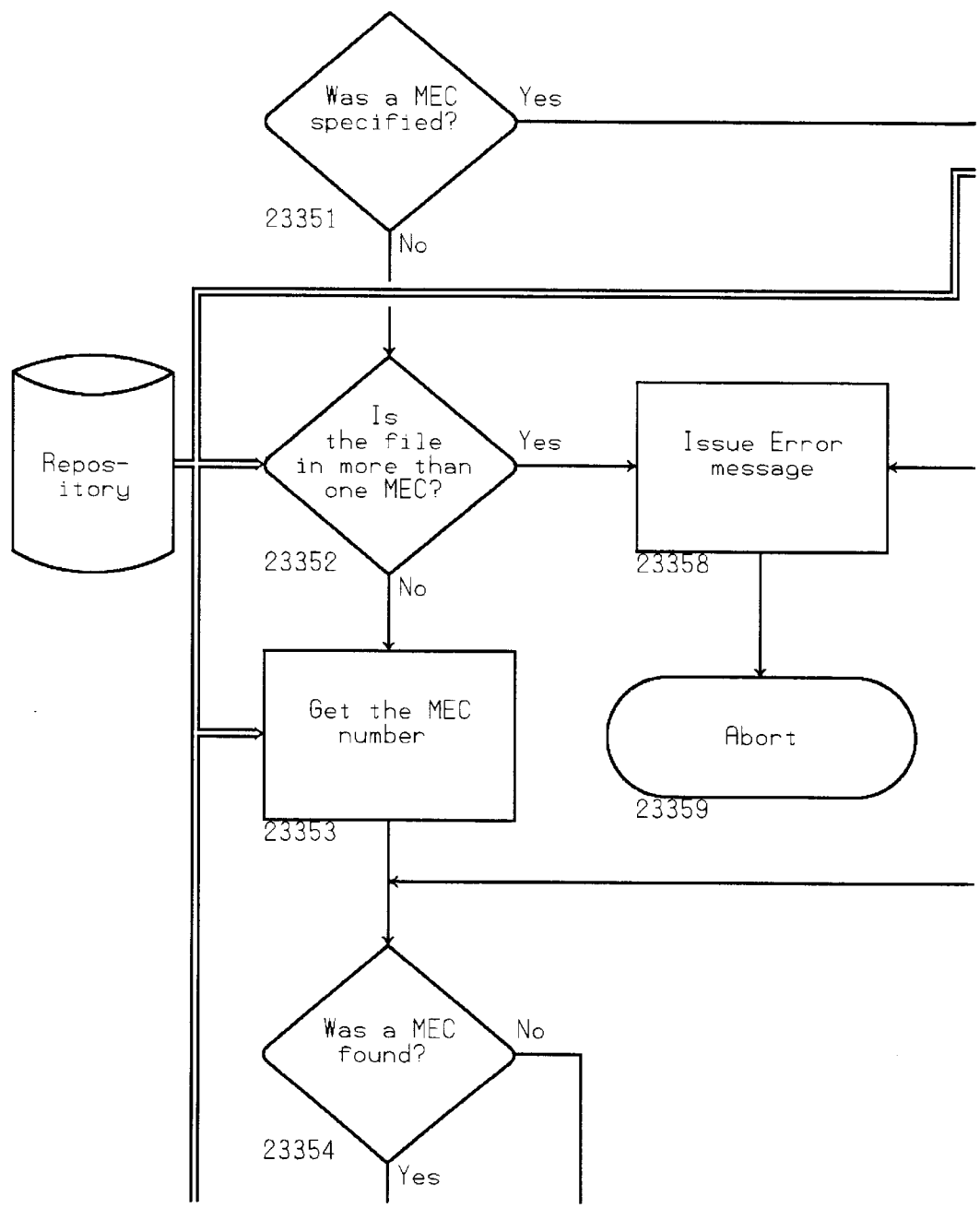
FIG. 22a thru 22d describes the MECCHK Process.
Figure 22B:
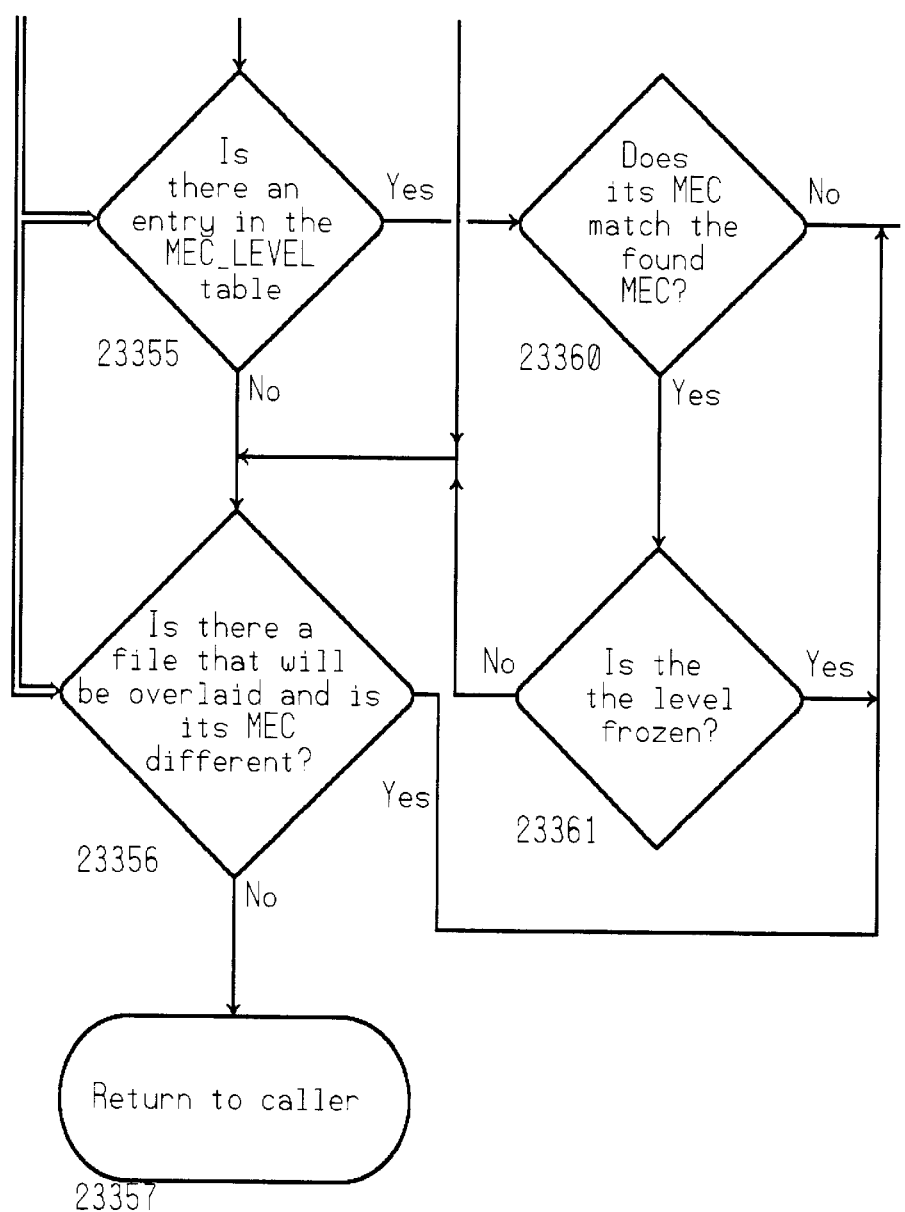
Figure 22C:
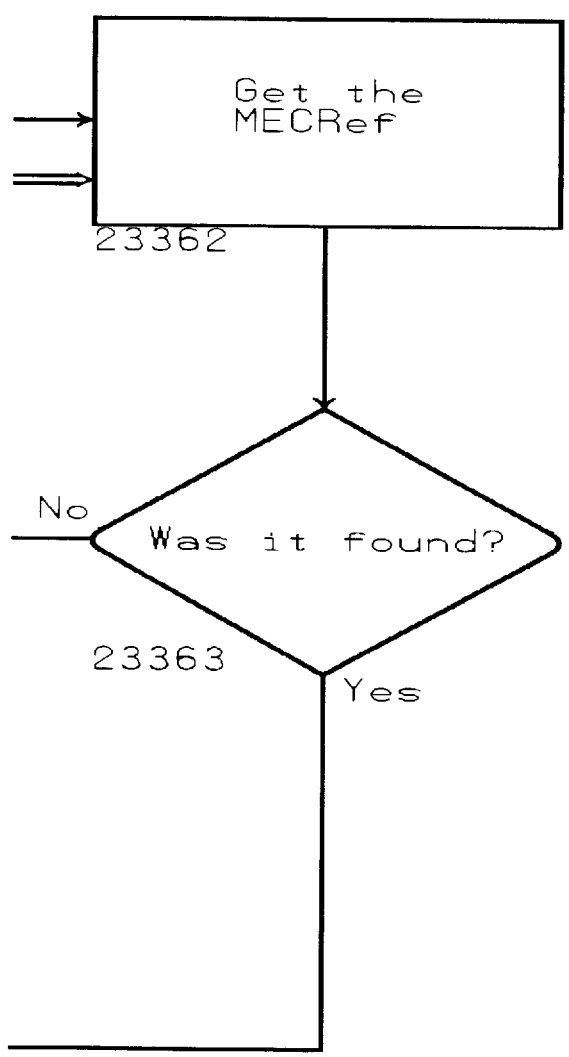
Figure 22D:
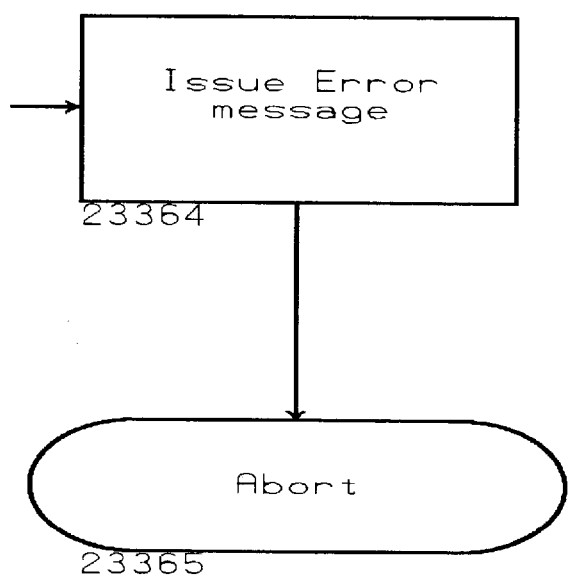
Figure 25:
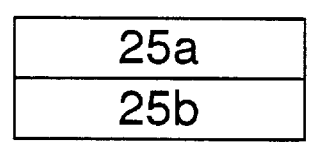
Figure 25A:
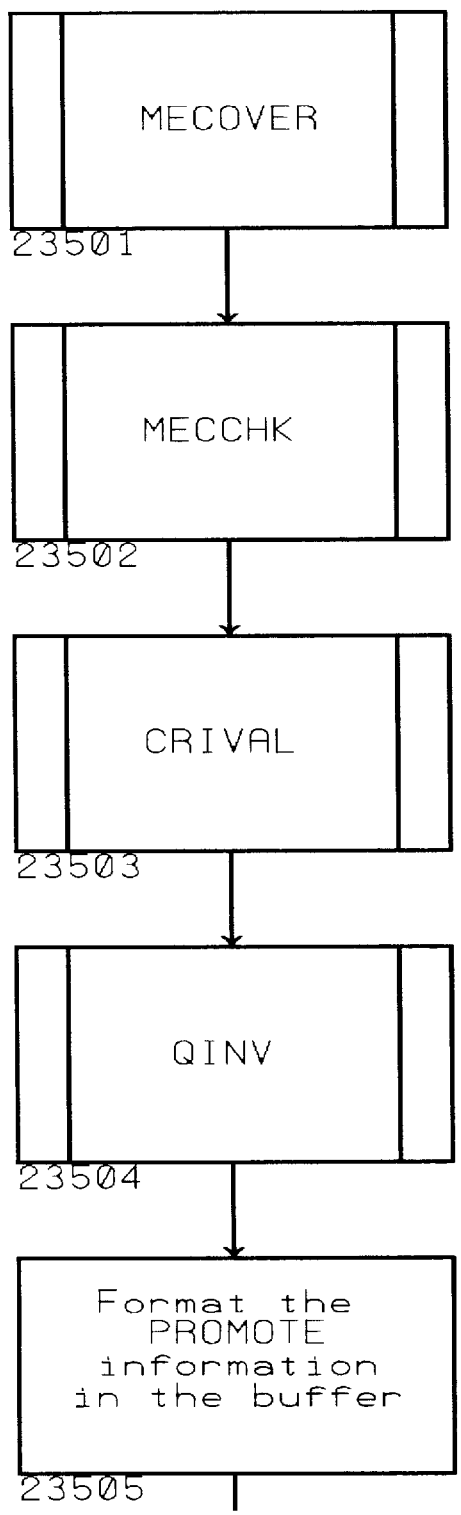
FIG. 25a and 25b describes the PROMOTE Process.
Figure 25B:
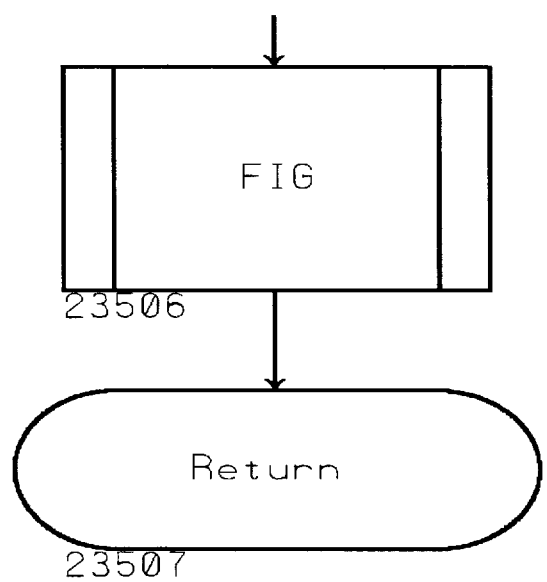
Figure 26:
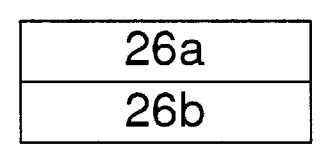
Figure 26A:
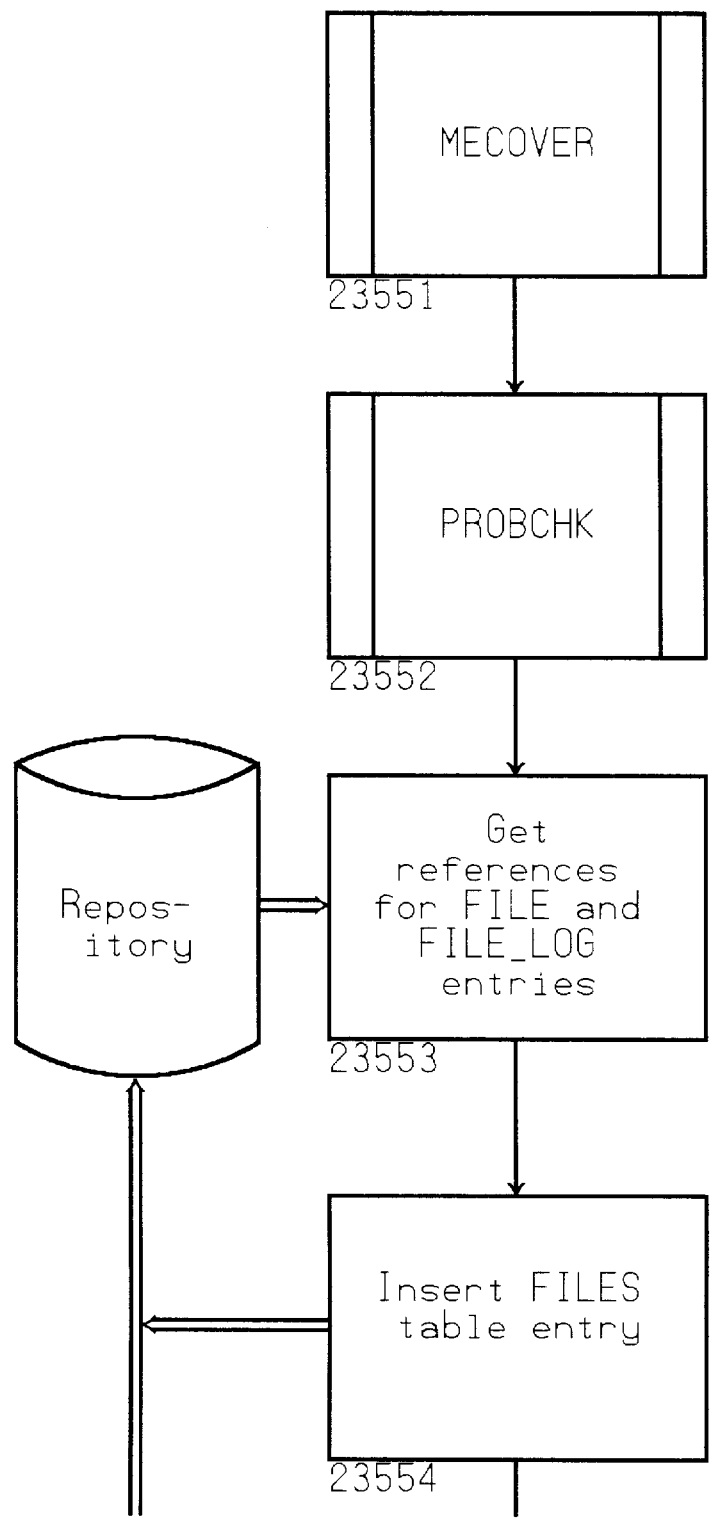
FIG. 26a and 26b describes the PUTB Process.
Figure 26B:
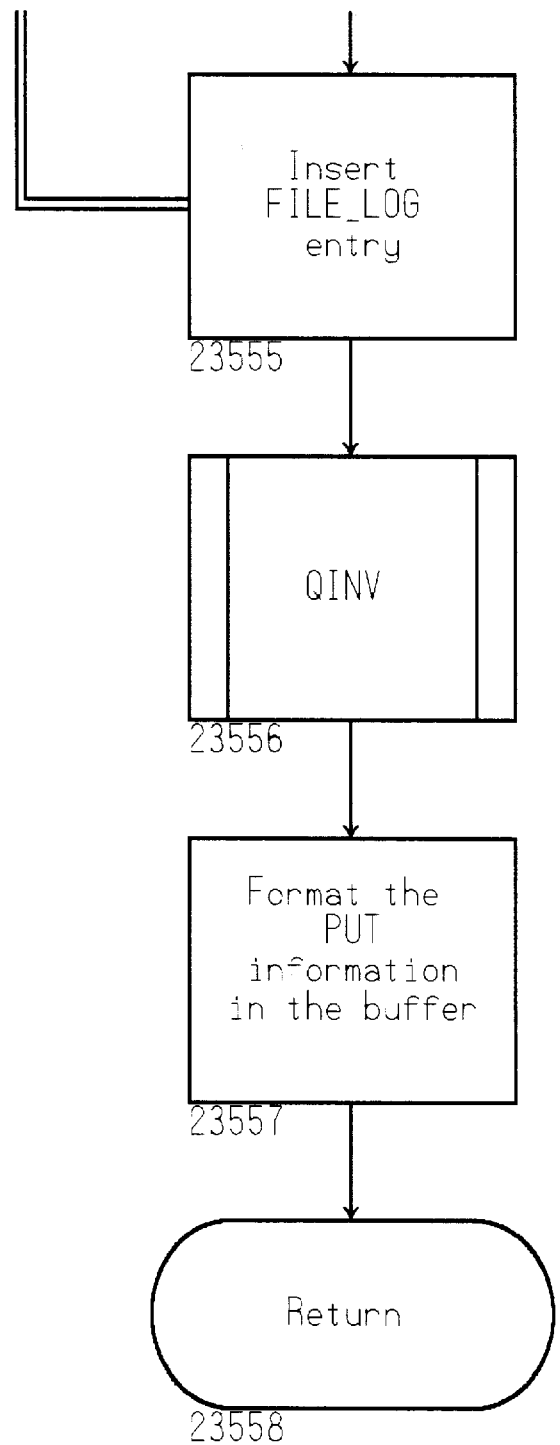

After initialization, a query 23001 is made to determine if the requester has authority for the specified action. If not, an error message is issued 23008 and the process aborted 23000. If so, the LVLINFO Process described in FIG. 20 is invoked 23002. Upon return from that process the Promote tree is created 23003 and the primary entry is inserted 23004, a check 23005 is made to determine if the action is MDLPROM. If so, QRBLDPRM Process described in FIG. 70 in Section 3.0 is invoked 23010. In any case the tree is scanned 23006, and the LOKCHKA Process described in FIG. 19 is invoked 23007. Upon return from the above process, a check 21011 is made to determine if a process lock has been set. If so, an indication (Return code=4) is made 23022 that a process lock has been set and the process is aborted 23024. If a process lock has not been set, a check 23012 is made to determine if a preventative lock has been set. If so, an indication is made 23023 that a preventive lock has been set and the process is aborted 23024. If a preventative lock has not been set, the invalid tree is initialized 21013. Next, a check 23014 is made to determine the action specified. If PUT was specified, the PUTB process described in FIG. 26 is invoked 23015. If PROMOTE was specified, the PROMOTE process described in FIG. 25 is invoked 23016. If MDLPROM was specified, the MDLPROM process described in FIG. 21 is invoked 23017. Upon return from the above process, the contents of the buffer are pushed 23018 onto the stack. Next the RowCount is pushed 23019 onto the stack and the trees discarded 23020. The process then returns 23021.

Figure 17:
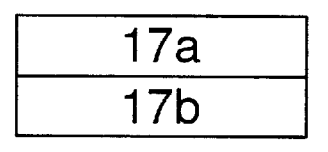
Figure 17A:
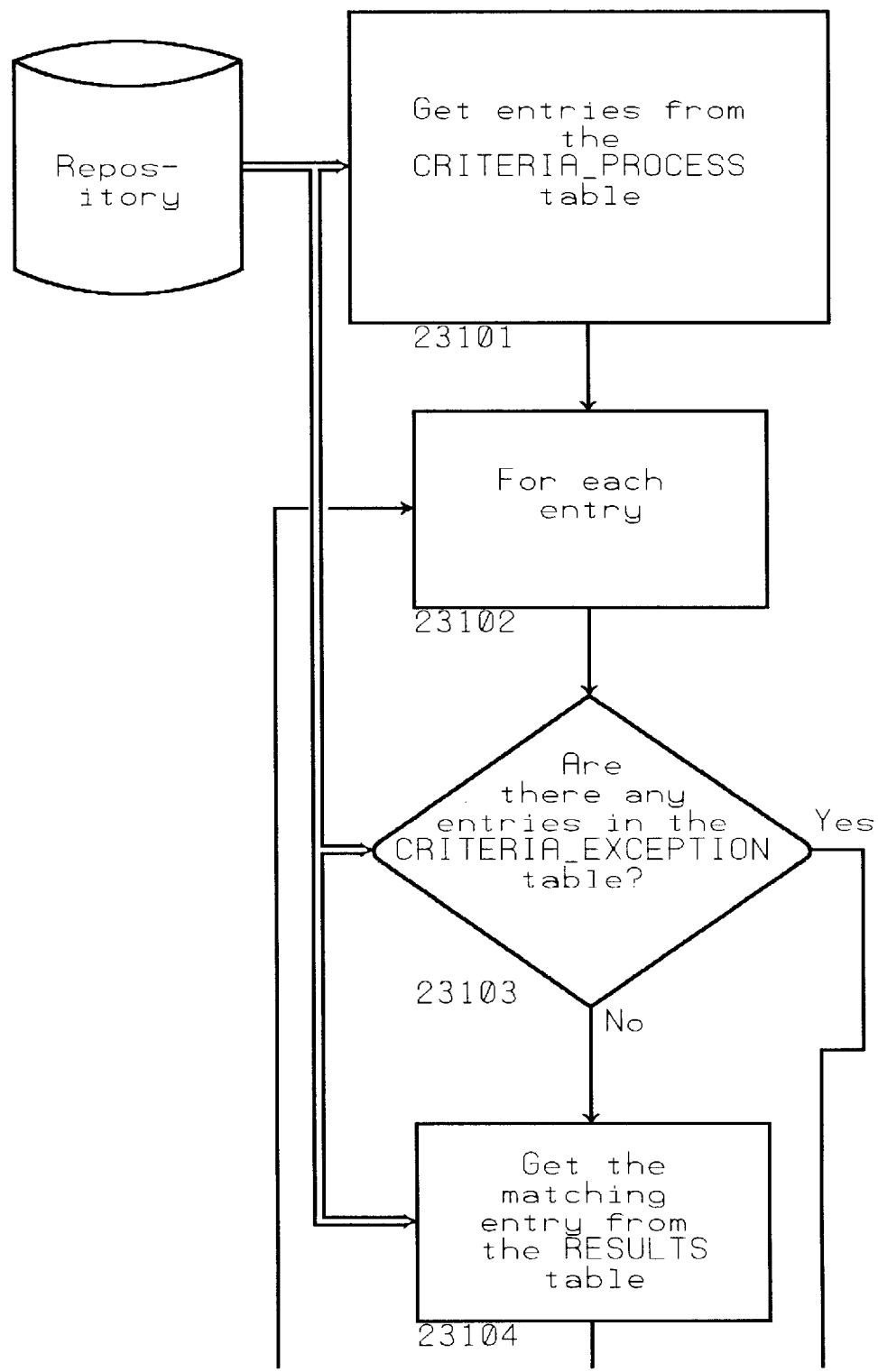
FIG. 17a thru 17b describes the CRIVAL Process.
Figure 17B:
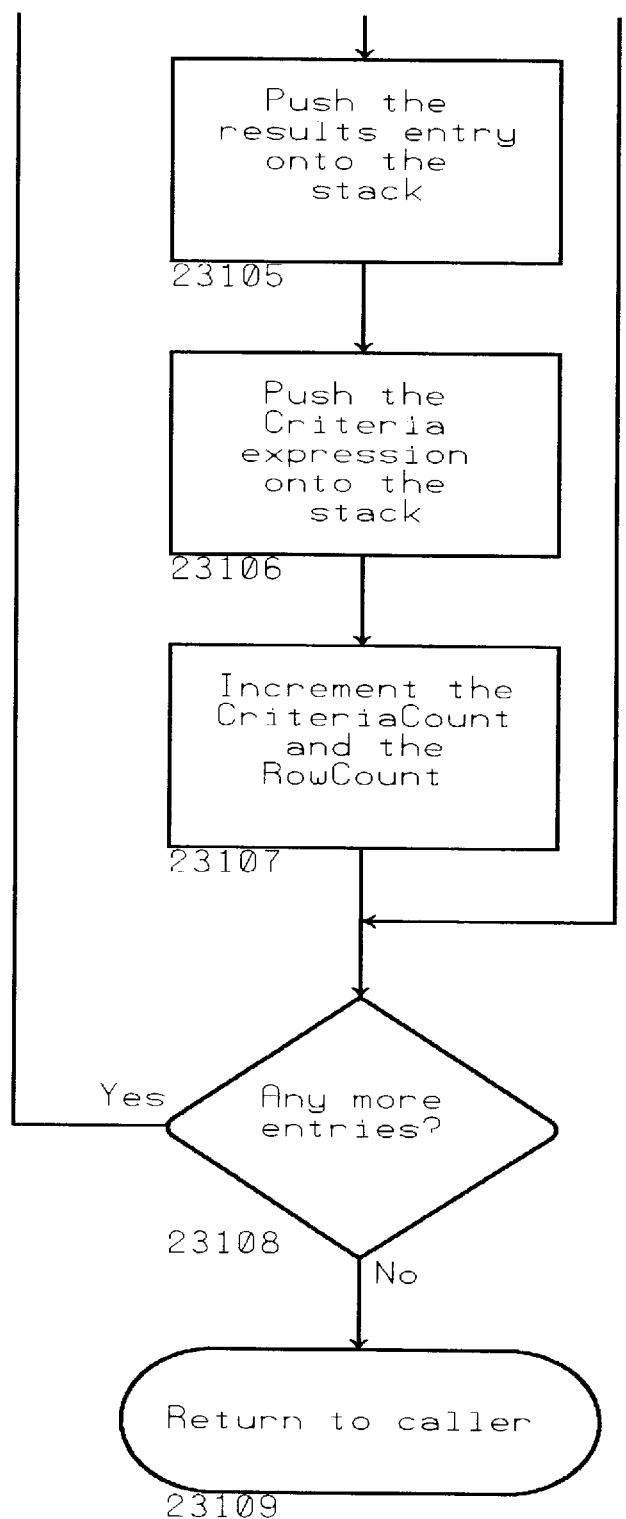
Figure 18A:
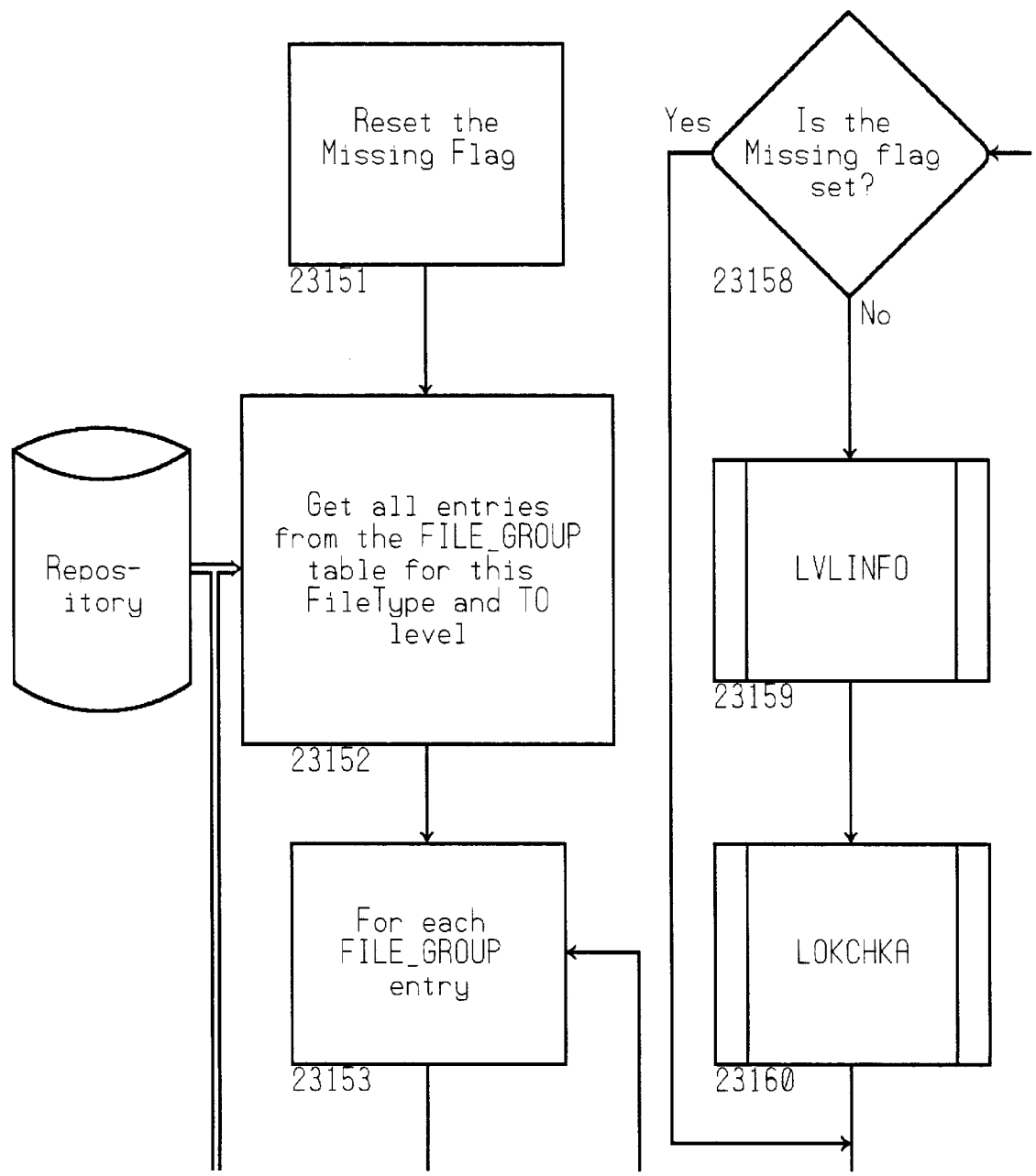
FIG. 18a thru 18d describes the FIG Process.
Figure 18B:
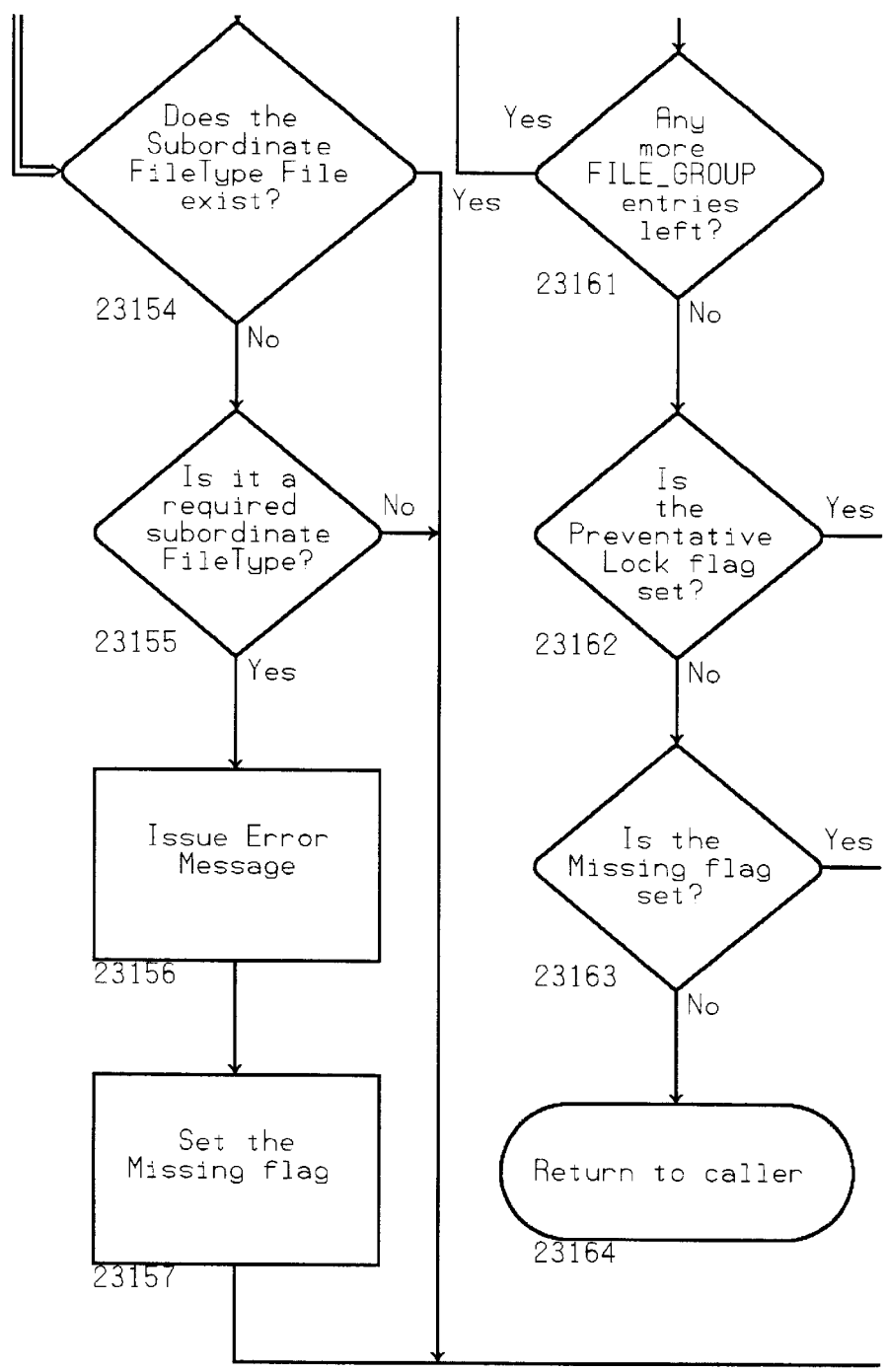
Figure 18C:
Figure 18D:
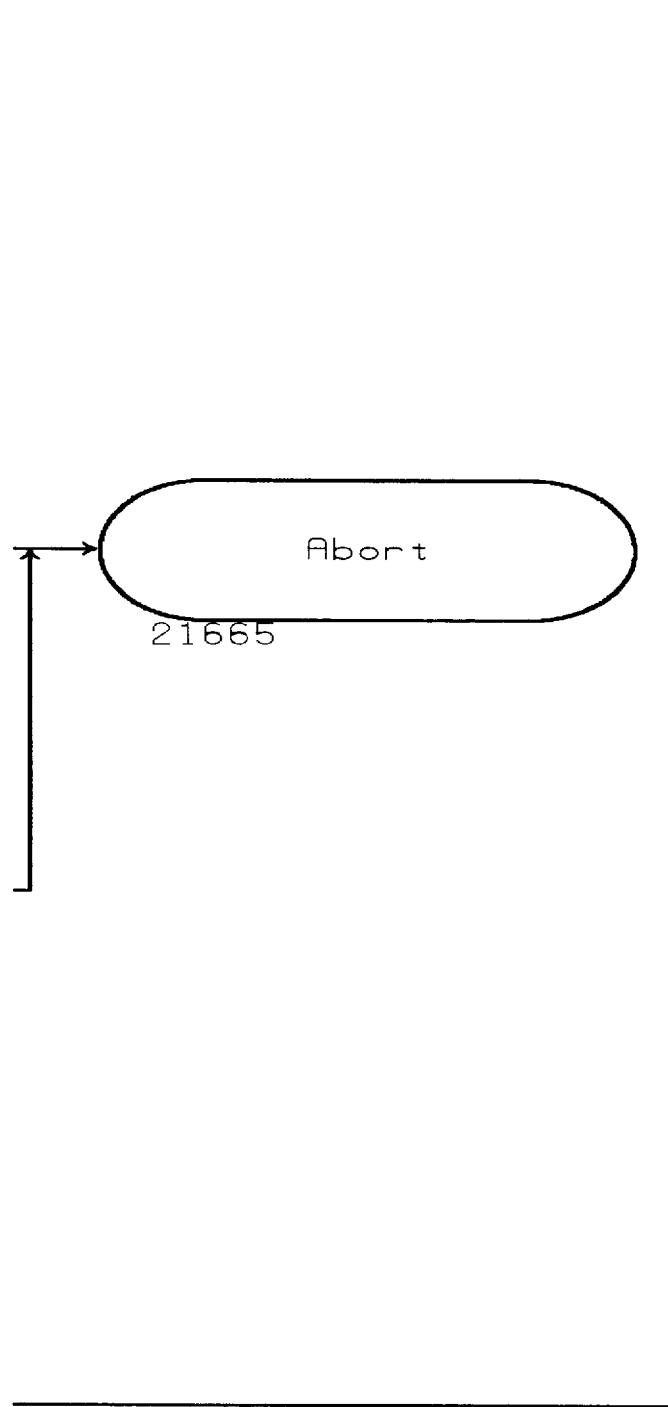

The CRIVAL Process FIG. 17: This process is used by the QRSUPCHK process to stack the Criteria and Results information. A query 23101 is made to get the CRITERIA_PROCESS table entries from the Control Repository.

For each entry returned 21102: A query 23103 is made to determine if there are any CRITERIA_EXCEPTION entries. If not, the matching RESULTS table entries are retrieved 23104 from the Control Repository, and pushed 23105 onto the stack. Next, the Criteria Expression is pushed 23106 onto the stack and the CriteriaCount and the RowCount are incremented 23107. A check 23108 is made to determine if there are any more CRITERIA_PROCESS entries. If so, the process flows back to 23102. If not, the process returns 23019 to the caller.

The FIG Process FIG. 18: This process is used by the QRSUPCHK process to handle FileGroups.

First, the Missing flag is reset 23151. Next, a query 23152 is made to get all the FILE_GROUP table entries from the Control Repository.

For each FILE_GROUP entry: A check 23154 is made to determine of the Subordinate FileType exists. If not, a check 23155 is made to determine if it was a required FileType. If so, an error message is issued 23156 and the missing flag is set 23157. If the subordinate FileType does exist or the Missing FileType was not required, a check 23158 is made to see if the Missing flag has been set. If not, the LVLINFO Process described in FIG. 20 is invoked 23159. Upon return from the above process, the LOKCHKA Process described in FIG. 19 is invoked 23160. Upon return from the above process, a check 23161 is made to determine if any more FILE_GROUP entries are left. If so, the process flows back to 23153.

Next, a check 23162 is made to determine if the Preventative Lock flag has been set. If so, the process is aborted 21665. If not, a check 23163 is made to determine if the Missing flag has been set. If so, the process is aborted 21665. If not, the process returns 23164 to the caller.

The LOKCHKA Process FIG. 19: This process is used by the QRSUPCHK process to check the Locks.

After initialization, a query 23201 is made to get all the FILE locks for the subject file for both the Check and the TO level from the Control Repository.

For each lock 23202 in turn: A check 23203 is made to determine whether it is an OVERLAY lock set by the Process Manager. If so, the lock data is stacked 23209: the RowCount incremented; the Process Lock flag set and the process returns 23208 to the caller.

Next, a check 23204 is made to determine if the lock is an OVERLAY lock. If so, an error message is issued 23210; the Preventative Lock flag is set and the process returns 23208 to the caller. Next, a check 23205 is made to determine if the lock is an MOVE lock. If so, an error message is issued 23210; the Preventative Lock flag is set and the process returns 23208 to the caller. If not, a check 23206 is made to determine if the lock is an UPDATE lock for a PUT and whether the requestor is the Lock owner or surrogate. If not, an error message is issued 23210; the Preventative Lock flag is set and the process returns 23208 to the caller. If so, a check 23207 is made to determine if there are any more locks. If so, the process flows back to 23202. If not, the process returns 23208 to the caller.

The LVLINFO Process FIG. 20. This process is used by the QRSUPCHK process to get the TO level information.

First, a query 23251 is mad to get the Check level entry from the LEVELS table in the Control Repository. Next, a check 23252 is made to determine if the information was found. If not, an error message is issued 23255 and the process returns 23257 to the caller with return code=12. If found a check 23253 is made to determine if the Check level was specified as "00". If so, the "00" level's NextLevel information will be used. In either case, the process returns 23254 to the caller.

The MDLPROM Process FIG. 21: This process is used by the QRSUPCHK process specifically for the MDLPROM action.

First, The Promote tree is scanned 23301.

Figure 23:
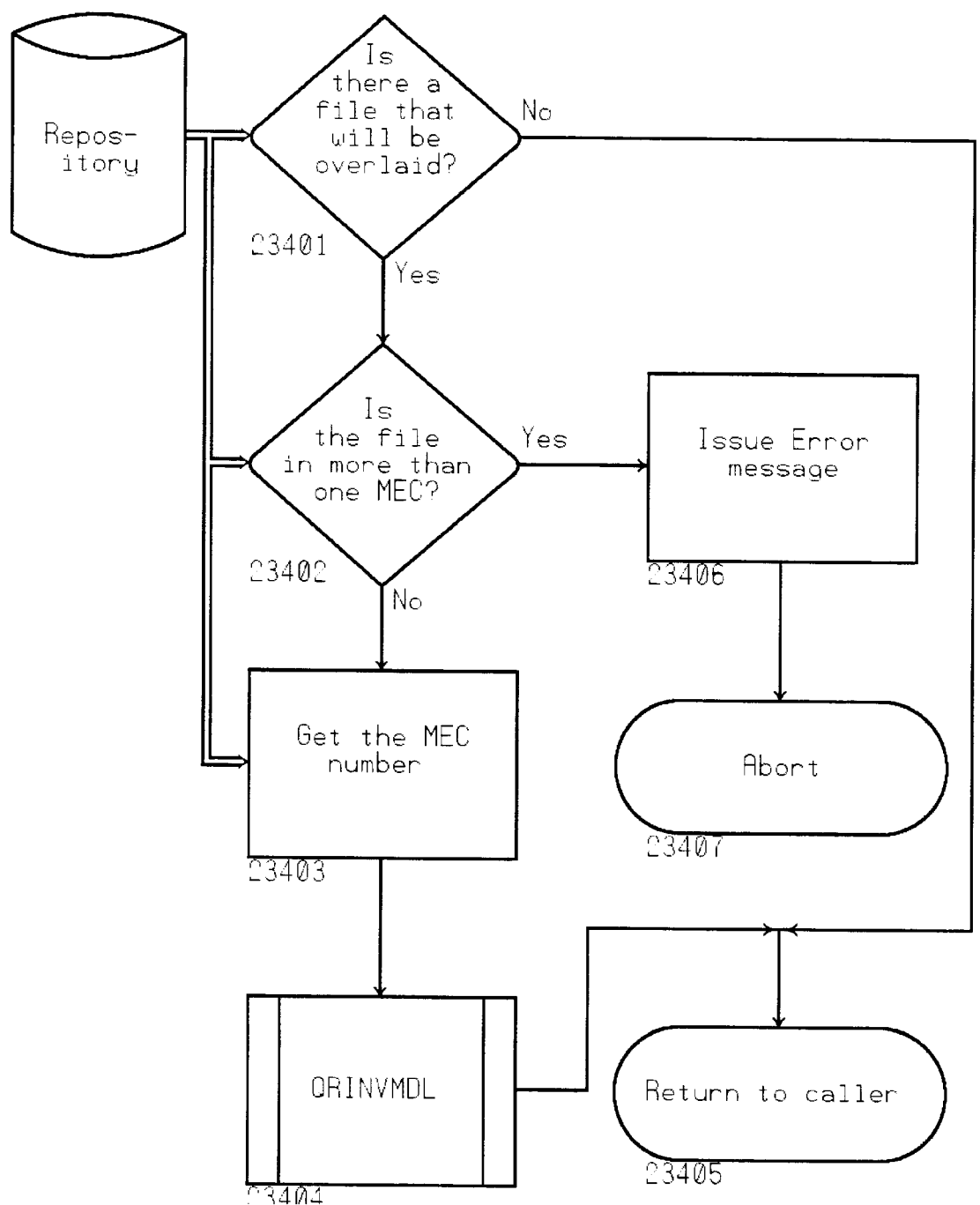
FIG. 23 describes the MECOVER Process.
Figure 24A:
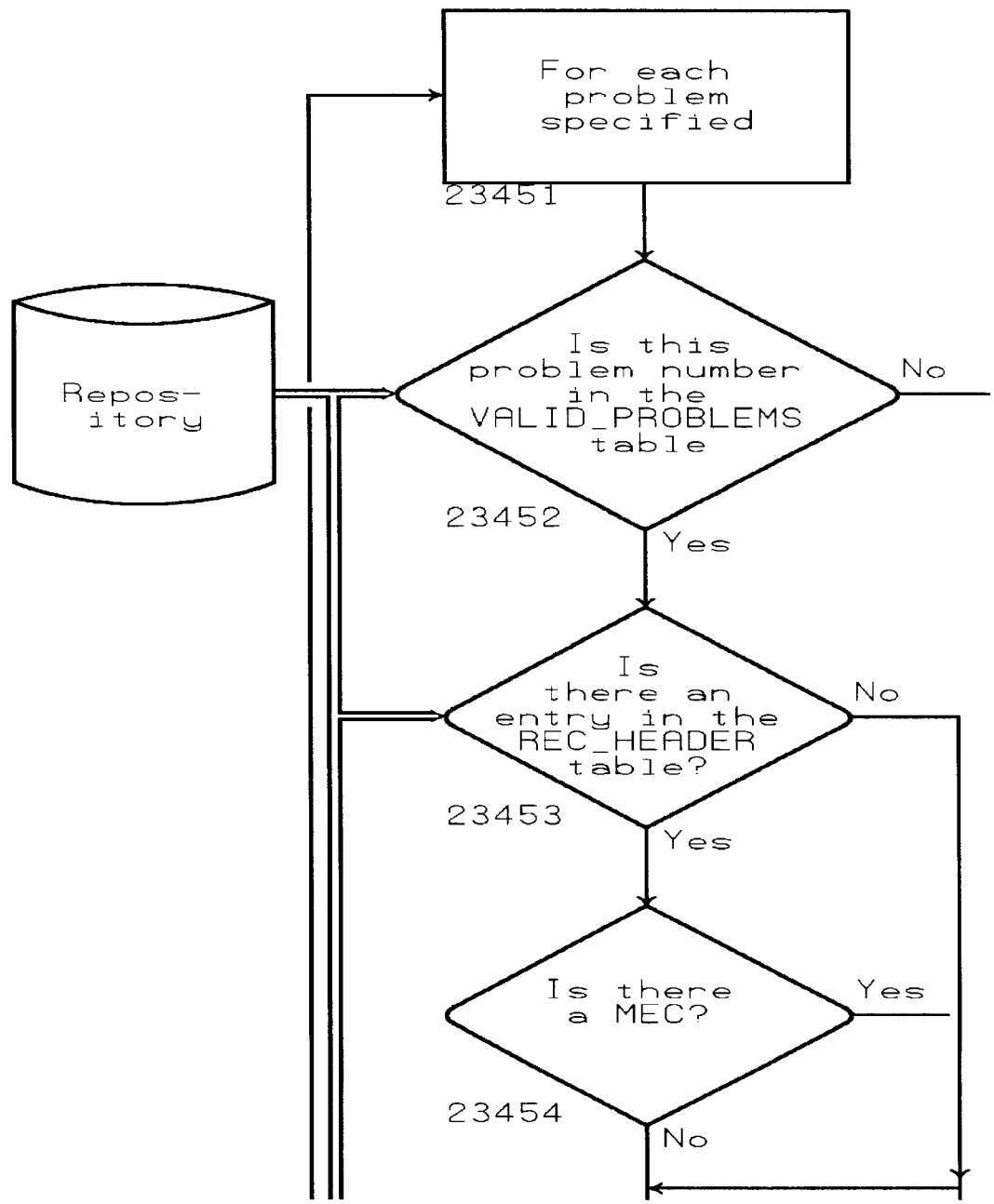
FIG. 24a thru 24d describes the PROBCHK Process.
Figure 24B:
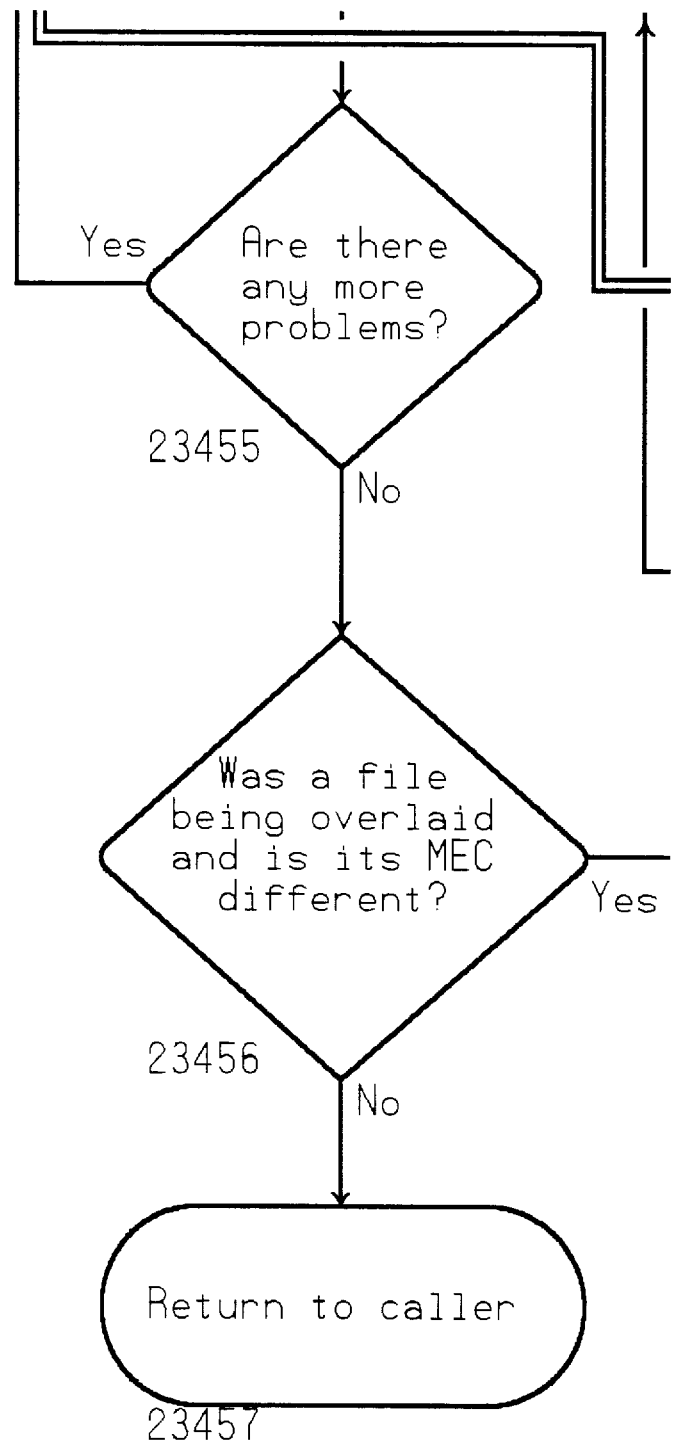
Figure 24C:
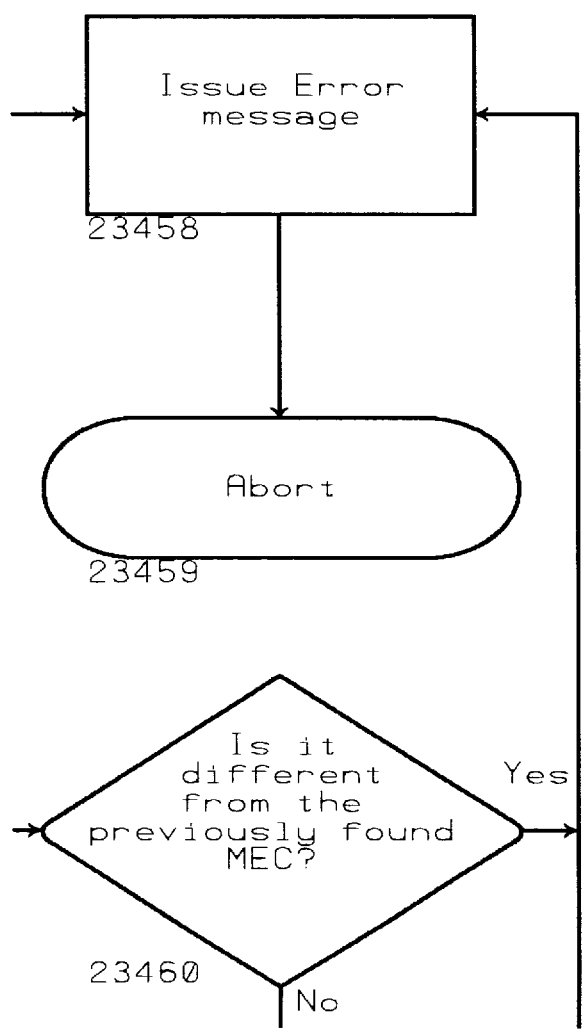
Figure 24D:
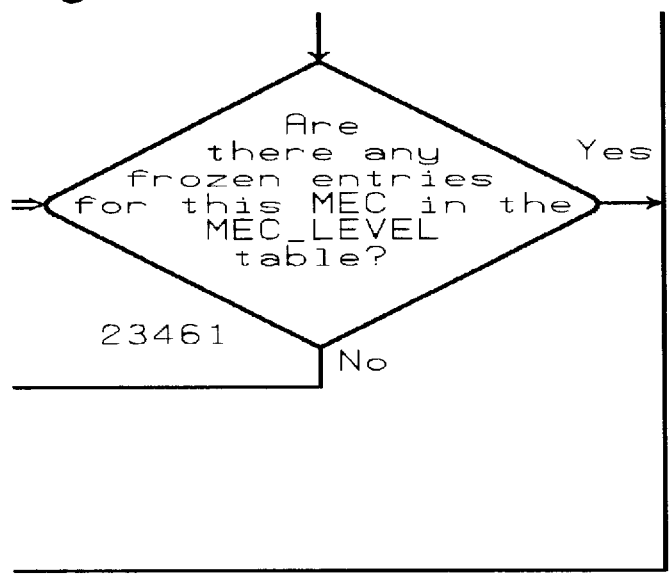

For each entry 23302 with the exception of the primary file entry: A query 23303 is made to get the level of the ModelFile from the LEVELS table. A check 23304 is made to determine if the entry was found. If not, an error message is issued 23311 and the process is aborted 23312. Next, a check 23305 is made to determine if its TO level is the same as the primary file's TO level. If not, an error message is issued 23311 and the process is aborted 23312. If so, the MECOVER Process described in FIG. 23 is invoked 23306. Upon return from that process, the MECCHK Process described in FIG. 22 is invoked 23307. Upon return from that process, a check 23308 is made to determine if the current entry is itself an anchor file. If it is an anchor file, the CRIVAL Process described in FIG. 17 is invoked 23309. Upon return from that process, the number of Criteria Pairs is accumulated 23310. Next, the implicit promote record is stacked 23313, and the RowCount and AnchorCount are incremented 23314. In either case, a check 23315 is made to determine if there are any more tree entries. If so, the process flows back to 23302.

Figure 27:
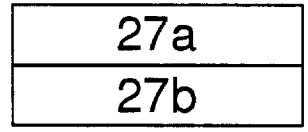
FIG. 27 shows the interconnection of FIG. 27a and 27b.
Figure 27A:
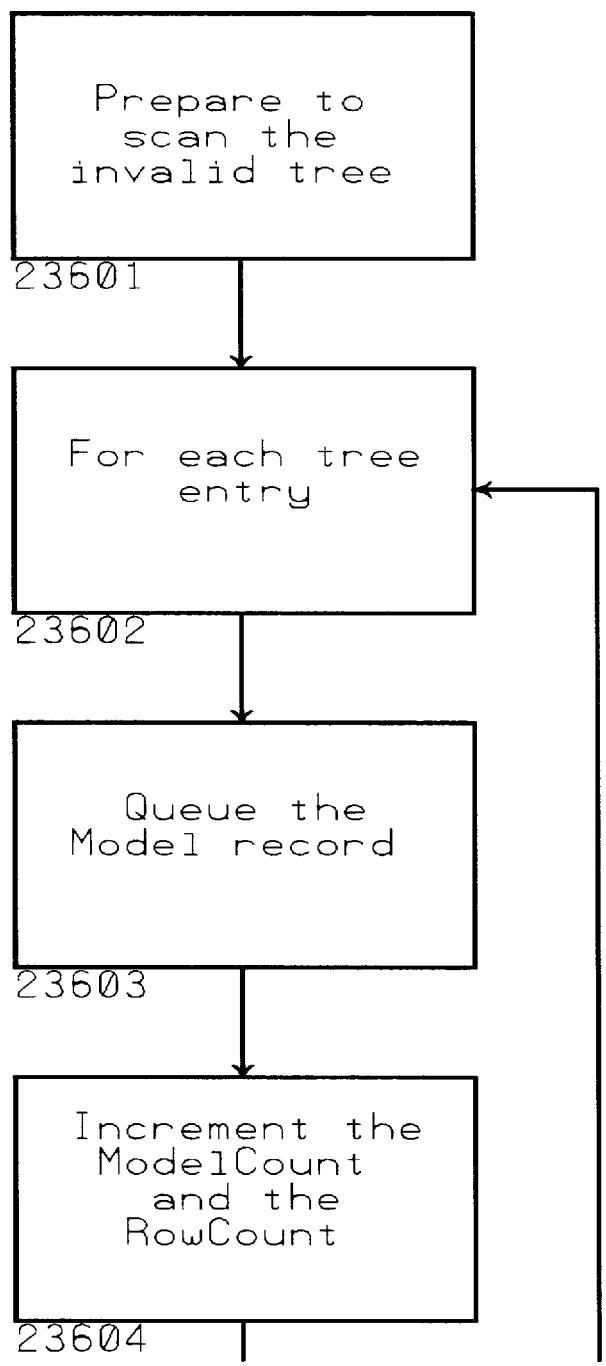
FIG. 27a and 27b describes the QINV Process.
Figure 27B:
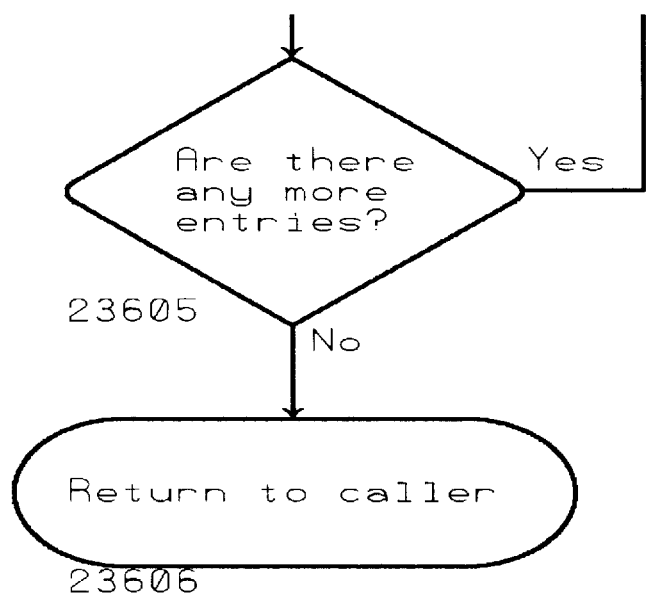
Figure 28A:
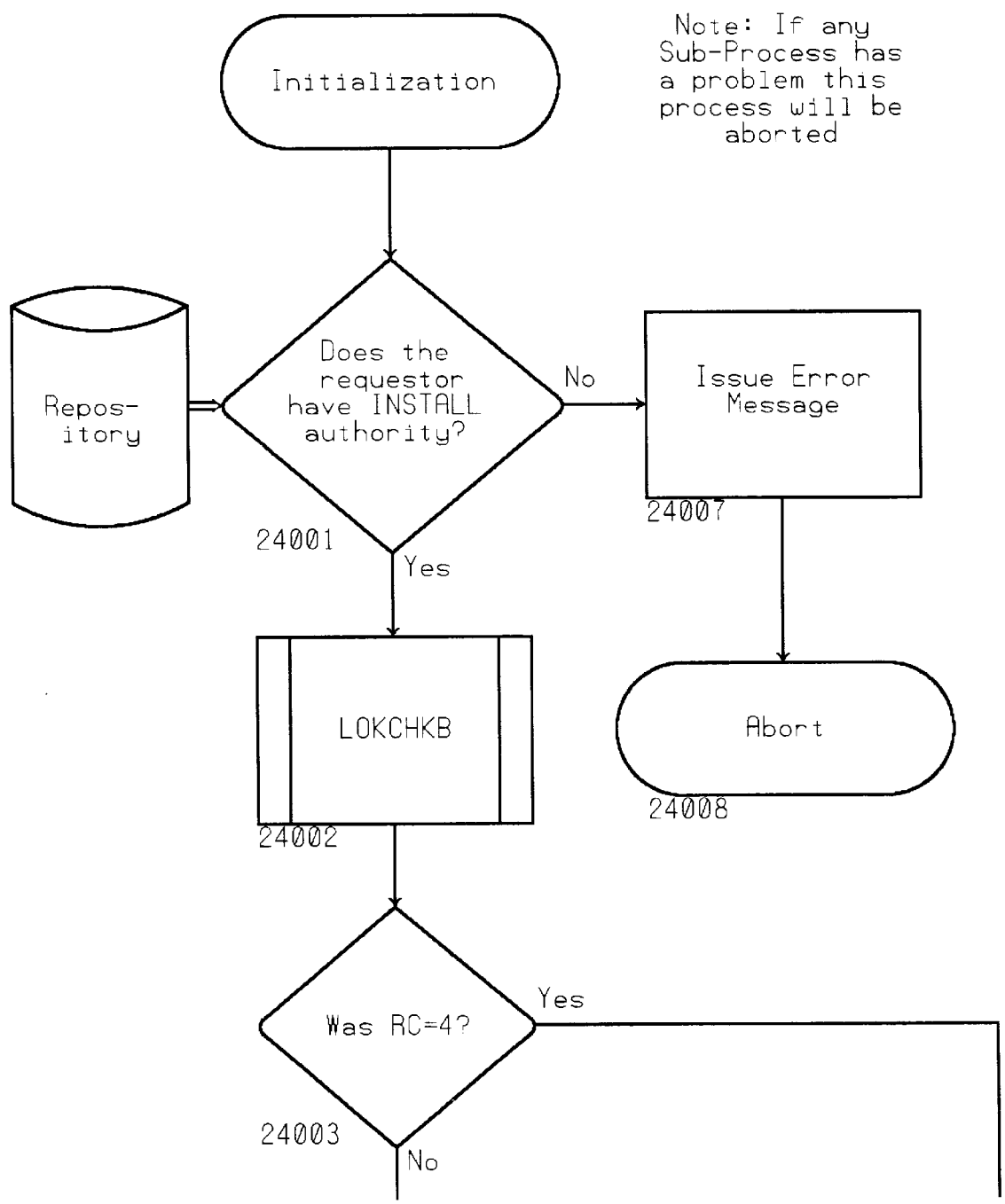
FIG. 28a thru 28d describes the QRSUPGEN Process.
Figure 28B:
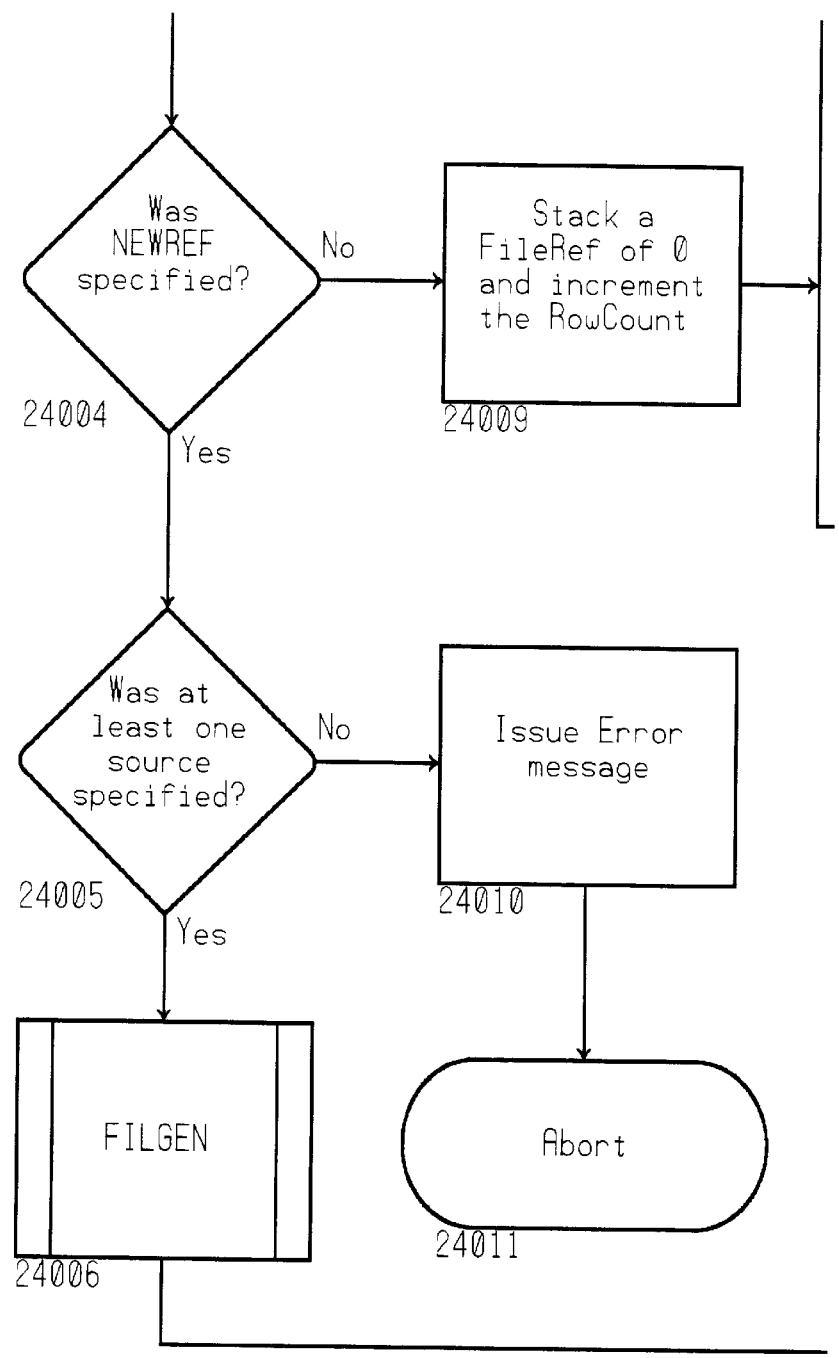
Figure 28C:
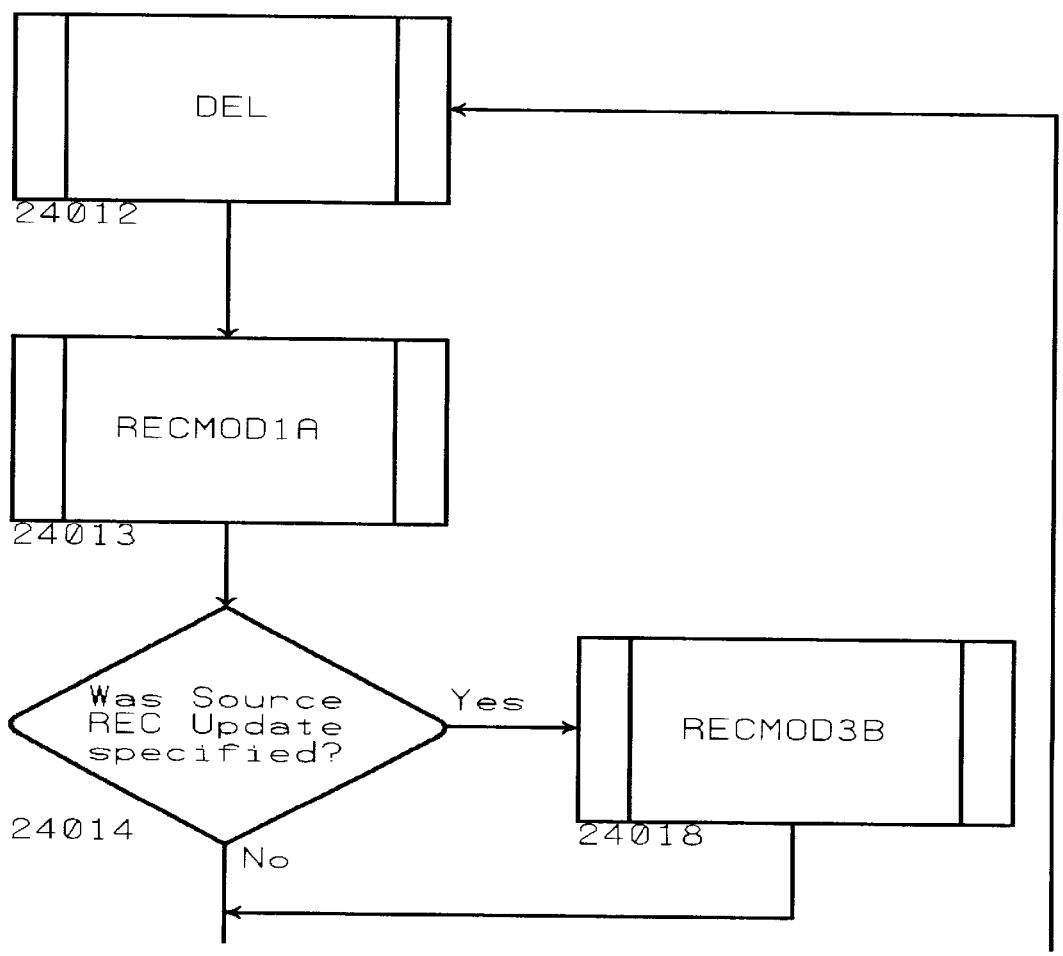
Figure 28D:
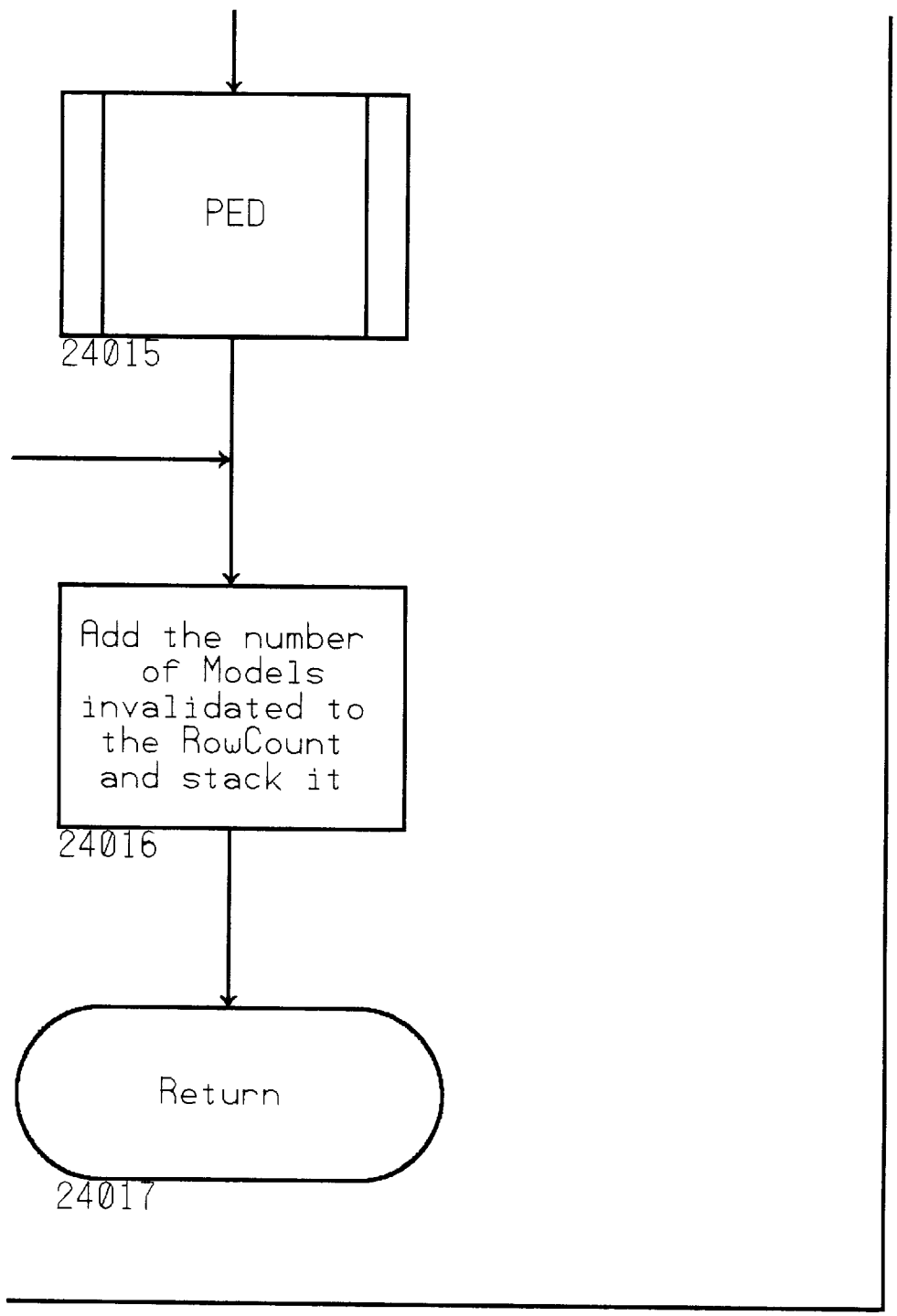

Next, the MECOVER Process described in FIG. 23 is invoked 23316. Upon return from that process, the MECCHK Process described in FIG. 22 is invoked 23317. Upon return from that process, the CRIVAL Process described in FIG. 17 is invoked 23318. Upon return from that process, the QINV Process described in FIG. 27 is invoked 23319. Upon return from that process, the Model Promote data is formatted 23321 in the buffer and the process returns 23321 to the caller.

The MECCHK Process FIG. 22: This process is used by the QRSUPCHK process to check the MEC number.

First, a check 23351 is made to determine if a MEC number was specified. If so, the MECRef is retrieved 23362 from the Control Repository. Next, a check 23363 is made to determine if it was found. If not, an error message is issued 23358 and the process is aborted 23359. If a MEC was not specified, A query 23352 is made to determine if the file is currently in more than one MEC. If so, an error message is issued 23358 and the process is aborted 23359. If it is not in more than one MEC, the MEC number is retrieved 23353 from the Control Repository. In any case, a check 23354 is made to determine if a MEC has been found. If so, a check 23355 is made to determine if there is a corresponding entry in the MEC_LEVEL table in the Control Repository. If there is an entry, a check 23360 is made to determine if its MEC matches the found MEC. If not, an error message is issued 23364 and the process is aborted 23365. If it does match the found MEC, a check 23361 is made to determine if the level is "frozen". If so, an error message is issued 23364 and the process is aborted 23365. If no MEC was found, or if there is no MEC_LEVEL entry, or there is no "frozen" MEC_LEVEL entry, a check 23356 is made to determine if a file will be overlaid and if its MEC is different. If so, an error message is issued 23364 and the process is aborted 23365. If not, the process returns 23357 to the caller.

The MECOVER Process FIG. 23: This process is used by the QRSUPCHK process to get the MEC number of a possible overlaid file.

First, a query 23401 is made to determine if a file will be overlaid. If not, the process returns 23405 to the caller. If so, a check 23402 is made to determine if the file is in more than one MEC. If so, an error message is issued 23406 and the process aborted 23407. If not, a query 23403 is made to get the MEC number from the Control Repository. Next, the QRINVMDL Process described in FIG. 61 in Section 3.0 is invoked 23404. Upon return from that process, this process returns 23405 to the caller.

The PROBCHK Process FIG. 24: This process is used by the QRSUPCHK process to check the problem numbers.

For each problem specified 23451: A query 23452 is made to determine if the problem number is in the VALID_PROBLEMS table in the Control Repository. If not, an error message is issued 23458 and the process is aborted 23459. If it is, a query 23453 is made to determine if there is a corresponding entry in the REC_HEADER table in the Control Repository. If so, a check 23454 is made to determine if there is a associated MEC. If so, a check 23460 is made to determine if it is different from the previously found MEC. If so, an error message is issued 23458 and the process is aborted 23459. If not, a check 23461 is made to determine if there are any "frozen" entries for this MEC in the MEC_LEVEL table. If so, an error message is issued 23458 and the process is aborted 23459. If there is no REC_HEADER entry, or there is no associated MEC, or there are no "frozen" entries, a check 23455 is made to determine if there are any more entries. If so, the process flows back to 23451.

Next, a check 23456 is made to determine if a file is being overlaid and its MEC is different. If so, an error message is issued 23458 and the process is aborted 23459. If not, the process returns 23457 to the caller.

The PROMOTE Process FIG. 25: This process is used by the QRSUPCHK process specifically for the PROMOTE action.

First, MECOVER Process describe in FIG. 23 is invoked 23501. Upon return from that process, the MECCHK Process describe in FIG. 22 is invoked 23502. Upon return from that process, the CRIVAL Process describe in FIG. 17 is invoked 23503. Upon return from that process, the QINV Process describe in FIG. 27 is invoked 23504. Upon return from that process, the PROMOTE data is formatted 23505 in the buffer and the FIG Process described in FIG. 18 is invoked 23506. Upon return from that process, the process returns 23507 to the caller.

The PUTB Process FIG. 26: This process is used by the QRSUPCHK process specifically for the PUT action.

First, the MECOVER Process describe in FIG. 23 is invoked 23551. Upon return from that process, the PROBCHK Process describe in FIG. 24 is invoked 23552. Upon return from that process, reference numbers for FILE and FILE_LOG entries are obtained 23554 from the Control Repository. Then, an entry is inserted 23554 into the FILES table in the Control Repository. Next, an entry is inserted 23555 into the FILE_LOG table in the Control Repository. Then QINV Process describe in FIG. 27 is invoked 23556. Upon return from that process, the PUT data is formatted 23557 in the buffer and the process returns 23558 to the caller.

The QINV Process FIG. 27: This process is used by the QRSUPCHK process to queue the invalid model records.

First, prepare 23601 to scan the invalid tree.

For each entry 23602: Queue 23603 the Model record. Then, increment 23605 the ModelCount and RowCount. Next, a check 23605 is made to determine if there are any more entries. If so, the process flows back to 23602. If not, the process returns 23606 to the caller.

The QRSUPGEN Process FIG. 28: This process is used to install a generated file in a library level and update existing REC entries as well as update the collection REC. In addition, the PEDIGREE table is updated. Prior to doing the install authority and locks are checked.

Figure 29:
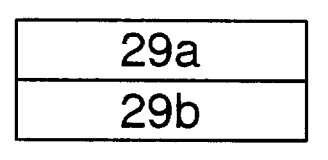
Figure 29A:
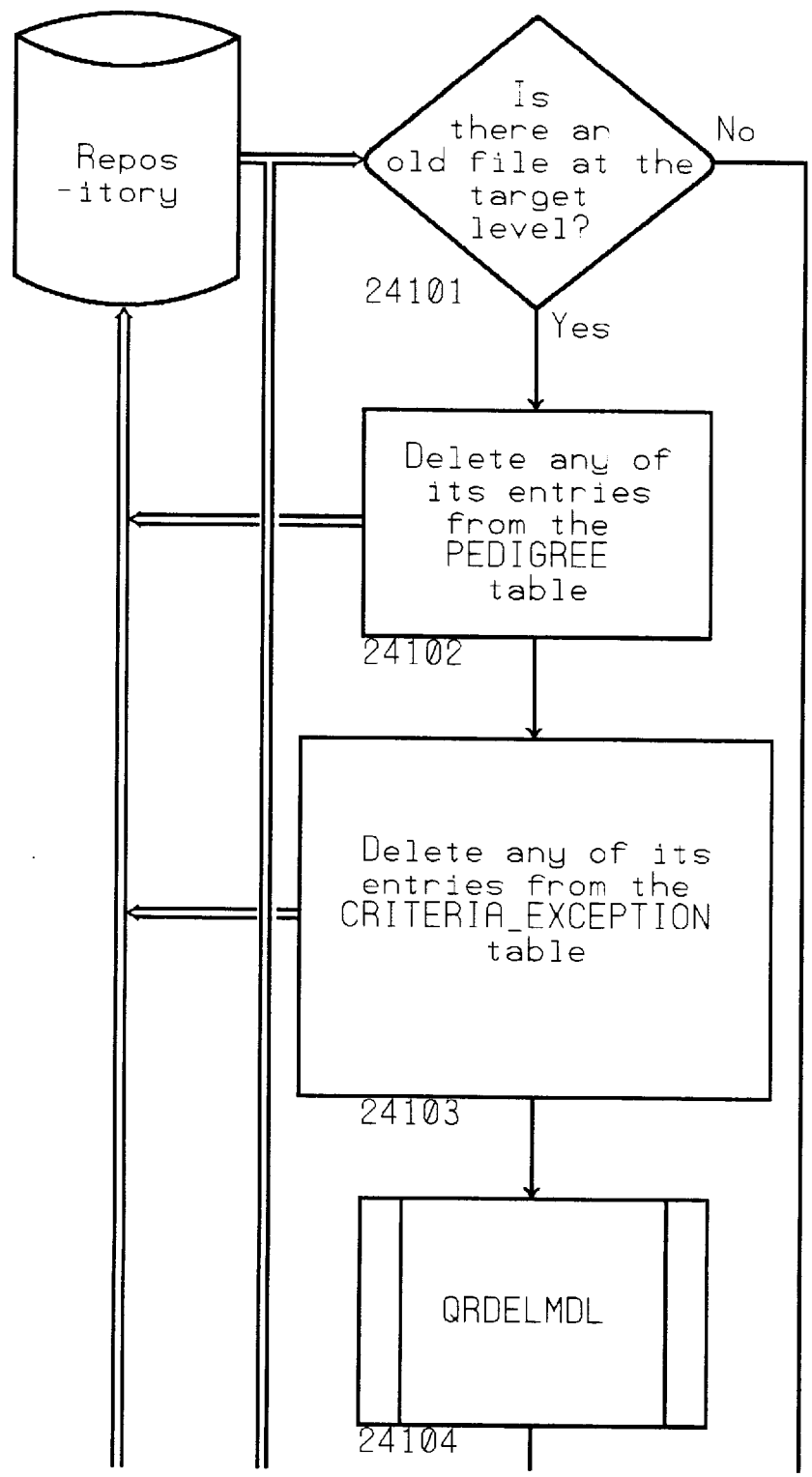
FIG. 29a and 29b describes the DEL Process.
Figure 29B:
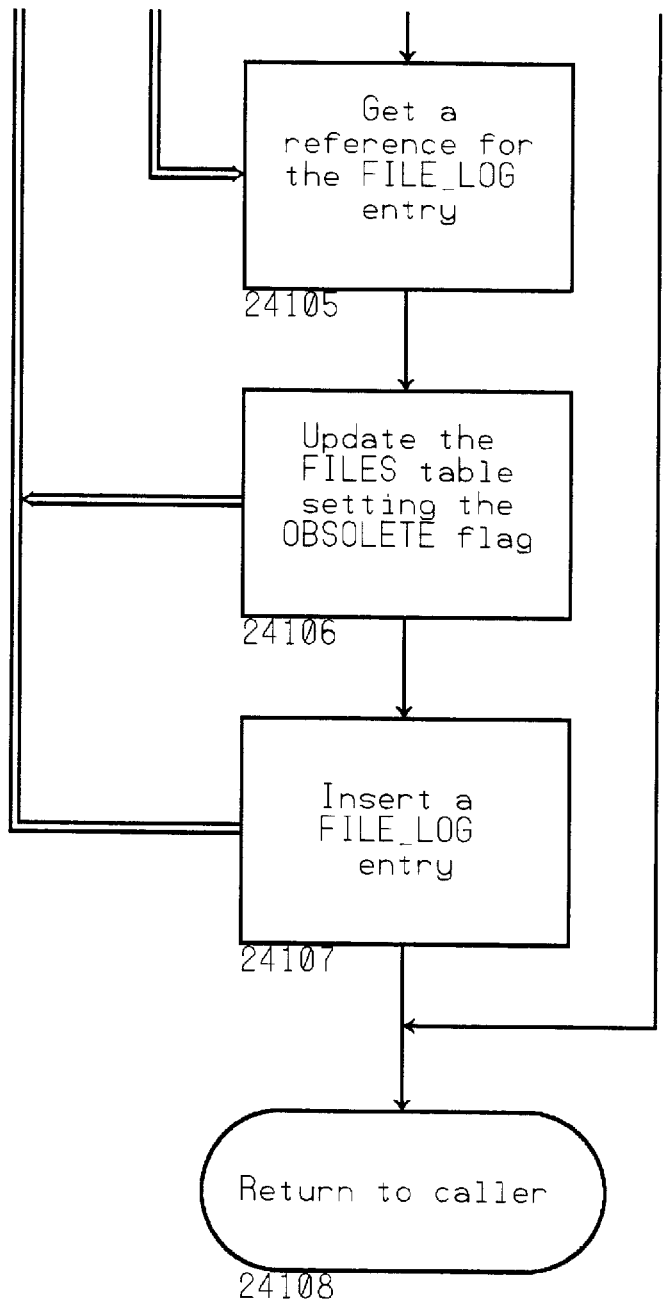
Figure 30:
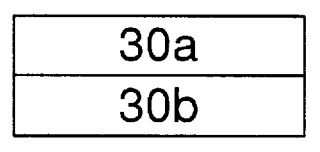
Figure 30A:
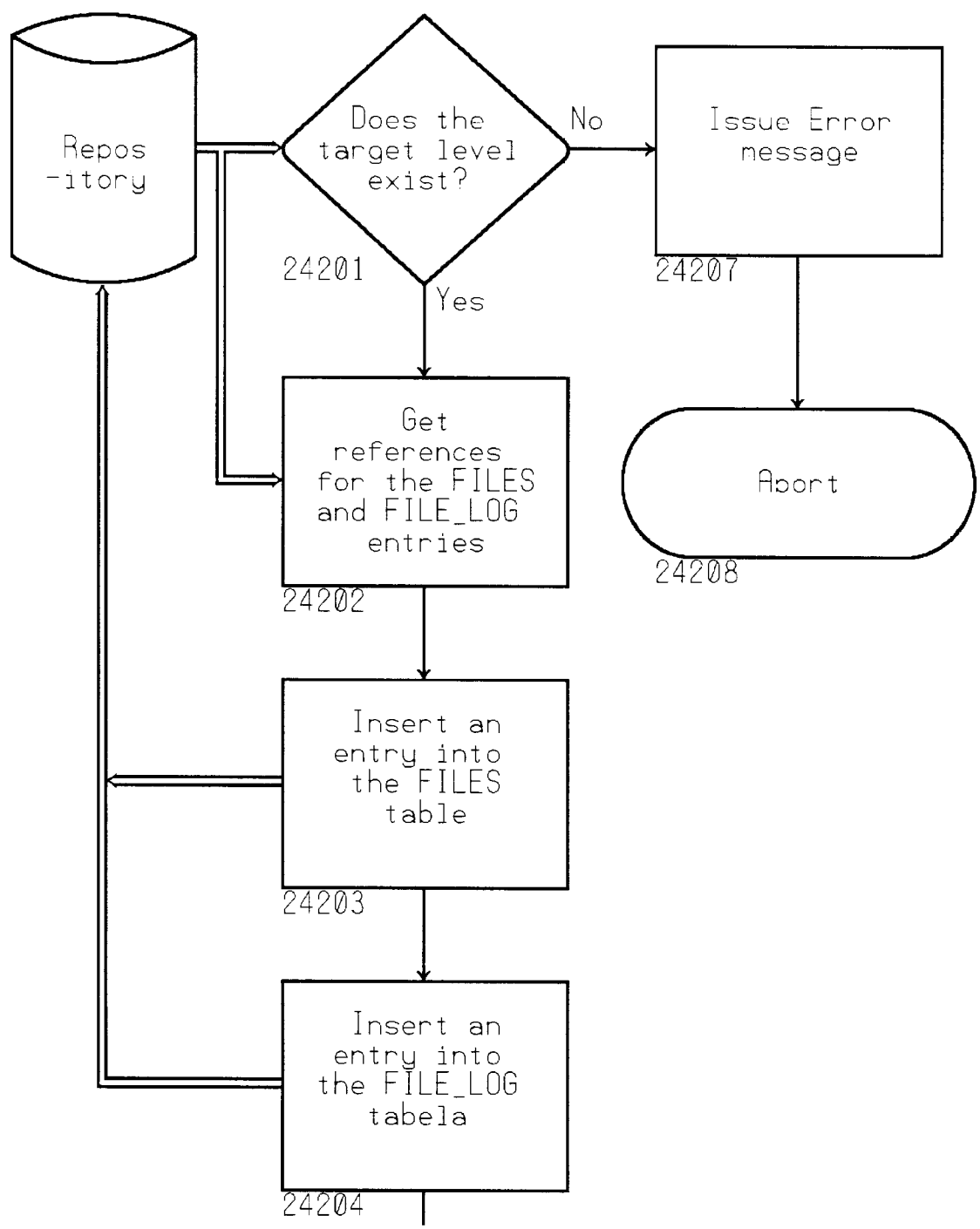
FIG. 30a and 30b describes the FILGEN Process.
Figure 30B:
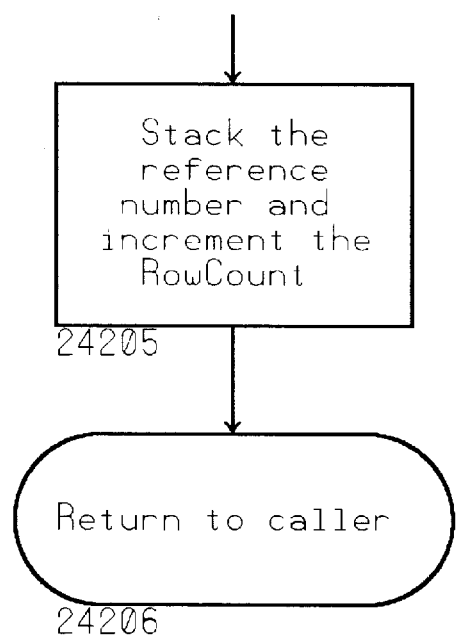
Figure 31:
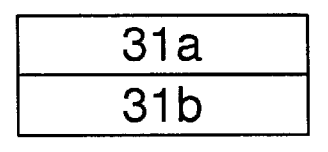
Figure 31A:
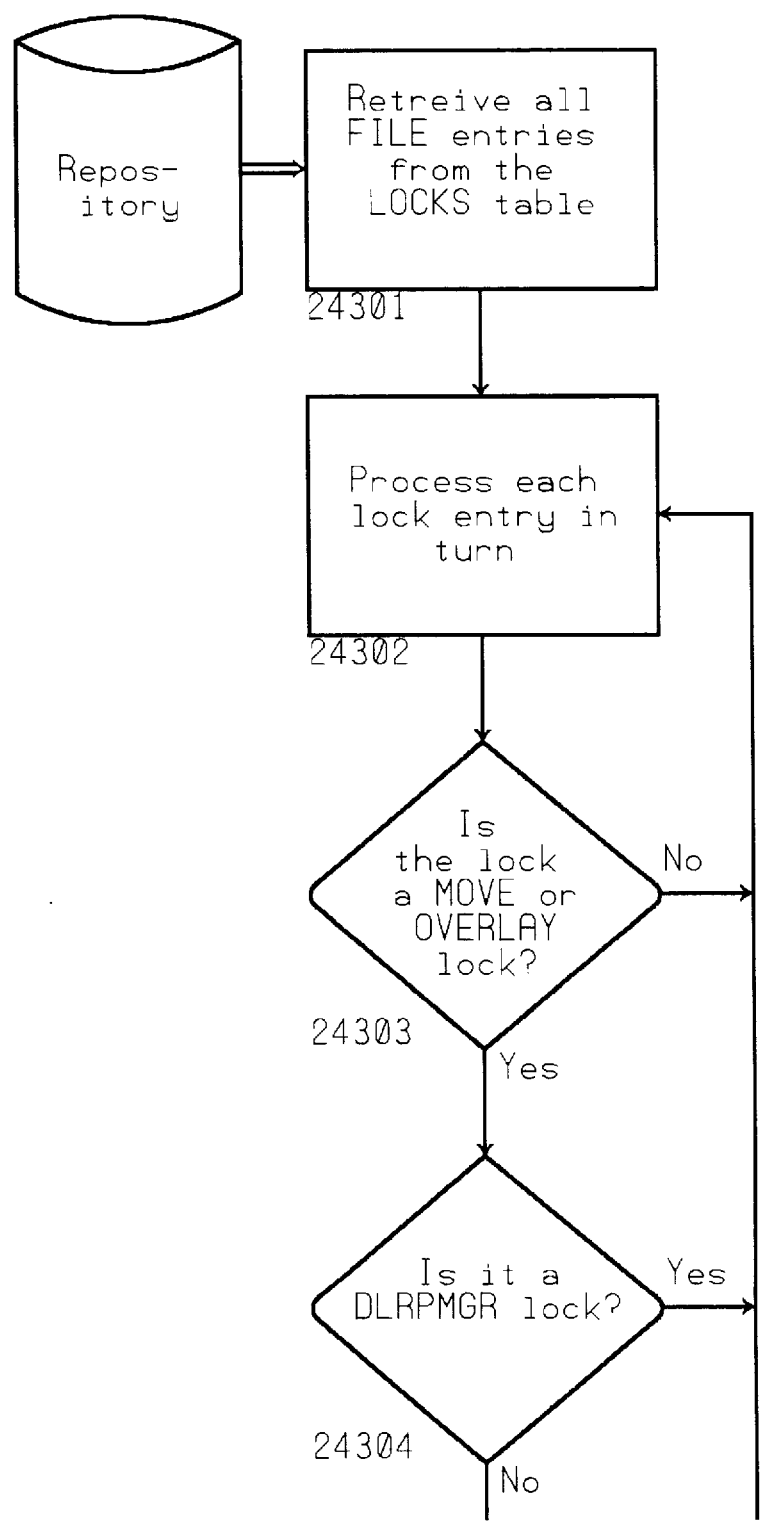
FIG. 31a and 31b describes the LOKCHKB Process.
Figure 31B:
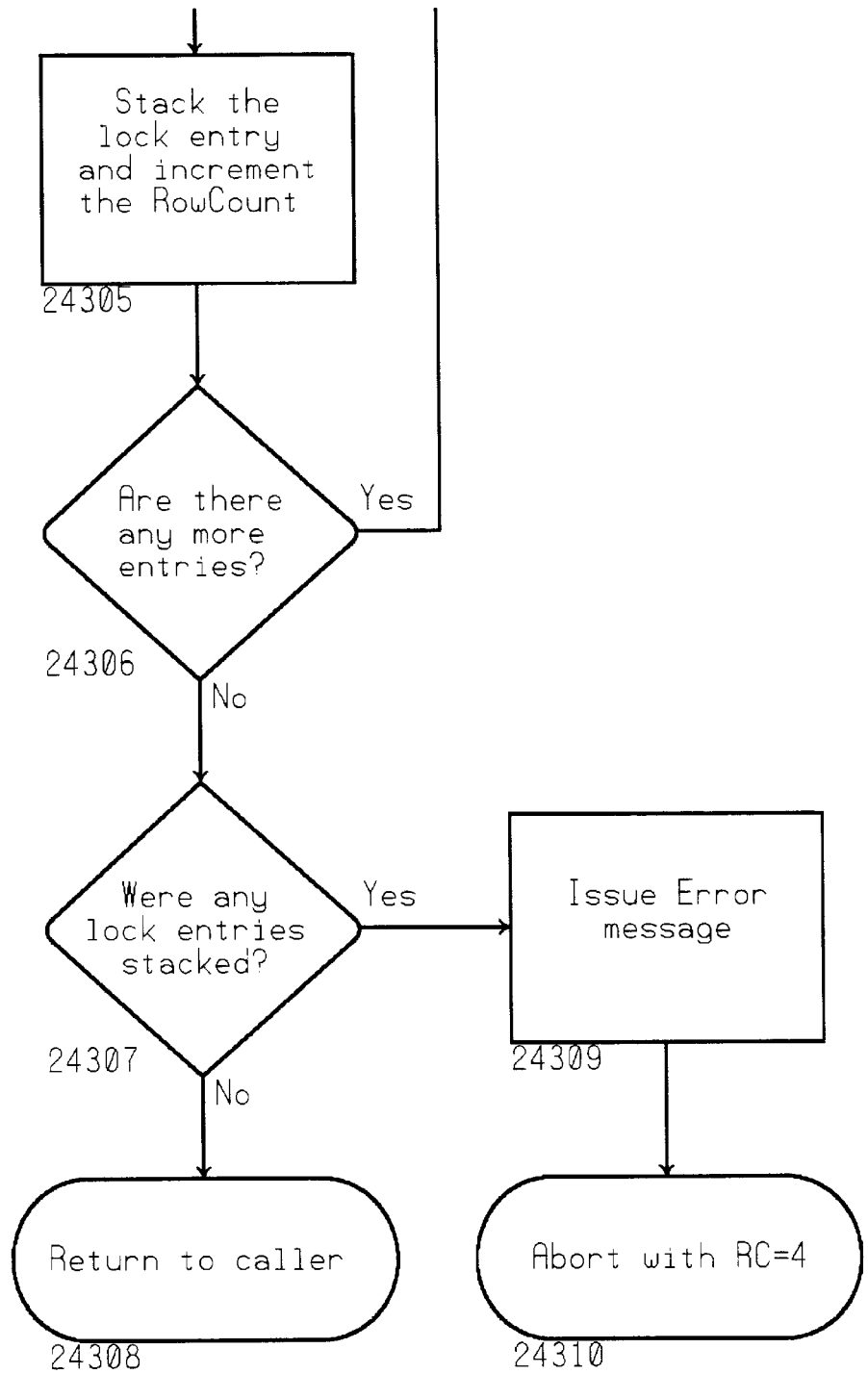
Figure 32A:
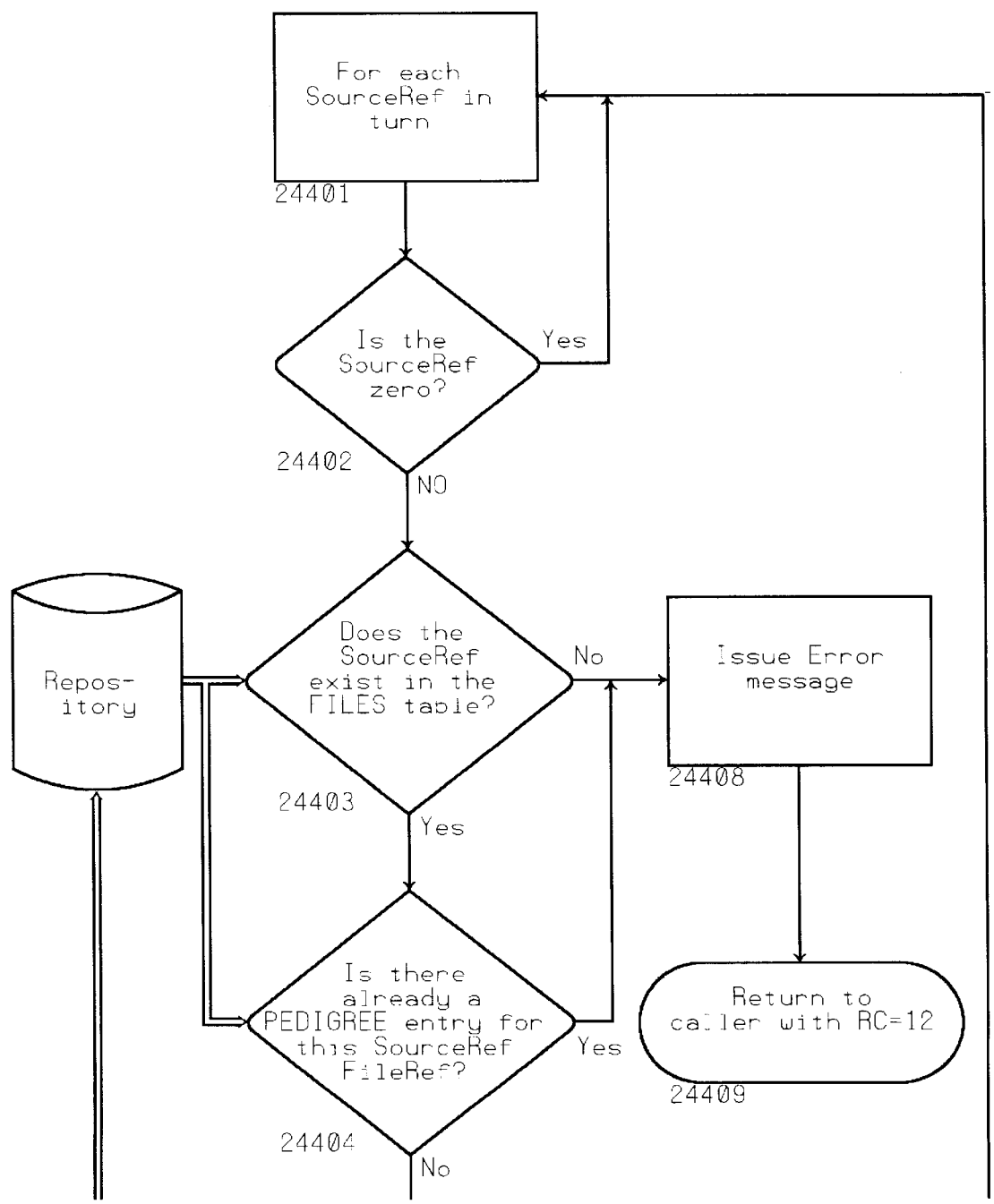
FIG. 32a and 32b describes the PED Process.
Figure 32B:
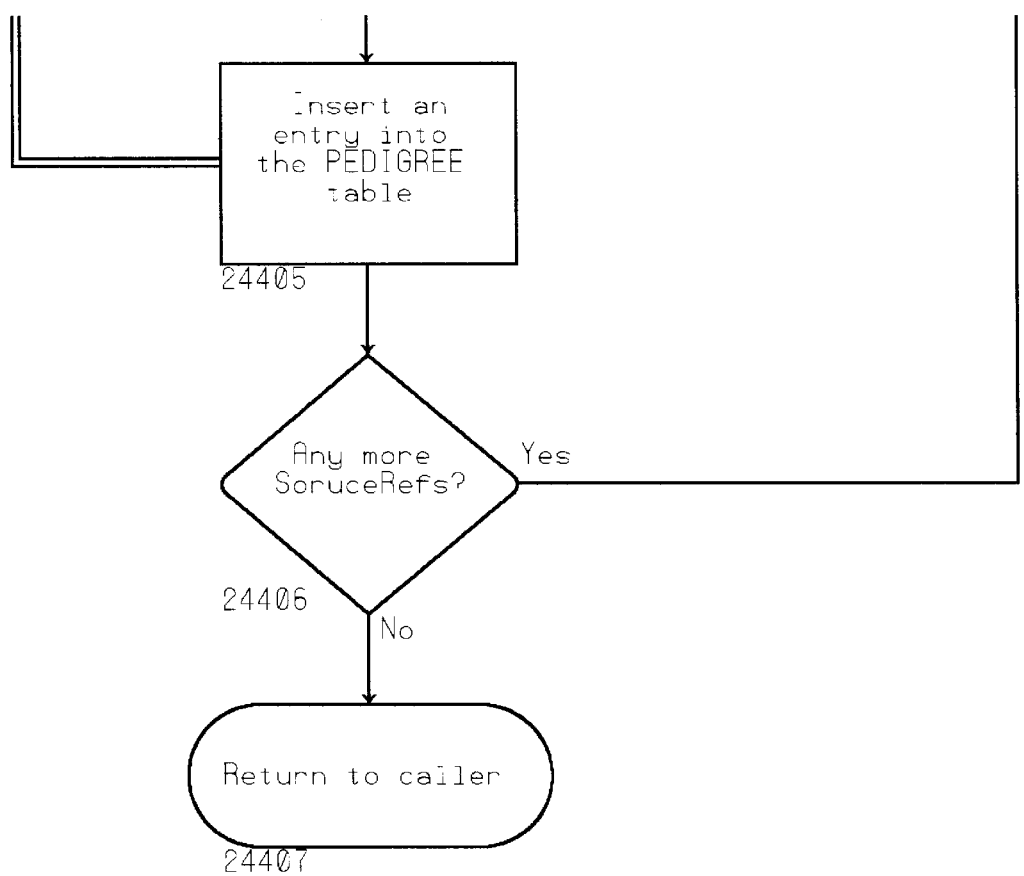

After initialization, a query 24001 is made to determine if the requestor has INSTALL authority. If not, an error message is issued 24007 and the process is aborted 24008. If so, the LOKCHKB process described in FIG. 31 is invoked 24002. Upon return from that process, a check 24003 is made to determine if the Return code=4. If so, the process flows forward to 24016. If not, a check 24004 is made to determine if NEWREF was specified. If not, a FileRef of 0 is stacked and the RowCount incremented 24009 and then the process flows forward to 24016. If so, a check 24005 is made to determine if at least one source is specified. If not, an error message is issued 24010 and the process is aborted 24011. If so, the FILGEN Process described in FIG. 30 is invoked 24006. Upon return from that process, the DEL Process described in FIG. 29 is invoked 24012. Upon return from that process, the RECMOD1A Process described in FIG. 92 of Section 4.0 is invoked 24013. Upon return from that process, a check 24014 is made to determine if Source REC Update was specified. If so, the RECMOD3B Process described in FIG. 96 of Section 4.0 is invoked 24018. In either case, the PED Process described in FIG. 32 is invoked 24015. Upon completion of that process, the number of models invalidated is added to RowCount which is then stacked 24016 and the process returns 24017.

The DEL Process FIG. 29: This process is used by the QRSUPGEN process to delete the old file at the target level.

First, a query 24101 is made to determine if there is an old file at the target level. If not, the process returns 24108 to the caller. If there is a file at that level, any associated PEDIGREE table entries in the Control Repository are deleted 24102. Next, any associated CRITERIA_EXCEPTION table entries in the Control Repository are deleted 24103. Next, the QRDELMDL Process described in FIG. 59 in Section 3.0 is invoked 24104. Upon return from that process, a reference number for a FILE_LOG entry is obtained 24105 from the Control Repository. Next, the FILES table entry for the old file is updated 24106 with the Obsolete flag set. Then, a FILE_LOG entry is inserted 24107 into the Control Repository, and the process returns 24108 to the caller.

The FILGEN Process FIG. 30: This process is used by the QRSUPGEN process to record the new file in the Control Repository. First query 24201 is made to determine if the target level exists in the LEVELS table in the Control Repository. If not, an error message is issued 24207 and the process aborted 24208. If it is, reference numbers for the FILE and FILE_LOG entries are obtained 24202 from the Control Repository. Next, an entry for the new file is inserted 24203 in the FILES table in the Control Repository. Then, an entry is inserted 24204 in the FILE_LOG table in the Control Repository. Next, the FileRef is stacked 24205 and the RowCount incremented. Then, the process returns 24206 to the caller.

The LOKCHKB Process FIG. 31: This process is used by the QRSUPGEN process to check the for Locks that would prevent installation of the file.

First, a query 24301 is made to retrieve all the associated FILE entries from the LOCKS table in the Control Repository.

For 24302 each lock entry in turn: A check 24303 is made to determine if the lock is a MOVE or OVERLAY lock. If not, the process flows back to 24302. Next, a check 24304 is made to determine if it was set by DLRPMGR. If so, the process flows back to 24302. If not, stack 24305 the lock entry an increment the RowCount. Next, a check 24306 is made to determine if there are any more entries. If so, the process flows back to 24302.

Next, a check 24307 is made to determine if any lock entries were stacked. If so, an error message is issued 24309 and the process aborted 24310 with return code=4. If not, the process returns 24308 to the caller.

The PED Process FIG. 32: This process is used by the QRSUPGEN process to add Pedigree entries for the installed file.

For each SourceRef 24401 in turn: A check 24402 is made to determine if the SourceRef is zero. If so, the process flows back to 24401. If not, a query 24403 is made to determine if the SourceRef exists in the FILES table in the Control Repository. If not, an error message is issued 24408 and the process returns 24409 to the caller with return code=12. If so, a query 24404 is issued to determine if there already exists an entry in the PEDIGREE table for this SourceRef/FileRef combination. If so, an error message is issued 24408 and the process returns 24409 to the caller with return code=12. If not, an entry is inserted 24405 into the PEDIGREE table in the Control Repository. Next, a check 24406 is made to determine if there are any more SourceRefs. If so, the process flows back to 24401. If not, the process returns 24407 to the caller.

The QRSUPGET Process FIG. 34: This process is used to get information required to do a GET of a file. This includes the "TO" level, verification that the user is authorized to "PUT" the file, and a list of "UPDATE" locks for that file. In addition, information about any MODEL file(s) that will be invalidated by the "PUT" is provided. This process may also be used to get information required to do a PUT of a master file of a File Group. In addition to the above information, a list of the subordinate Filetypes with their required flags as well as their "UPDATE" locks is provided.

Figure 36:
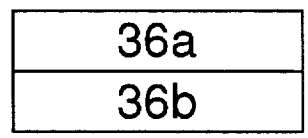
FIG. 36 shows interconnection of 36a and 36b.
Figure 36A:
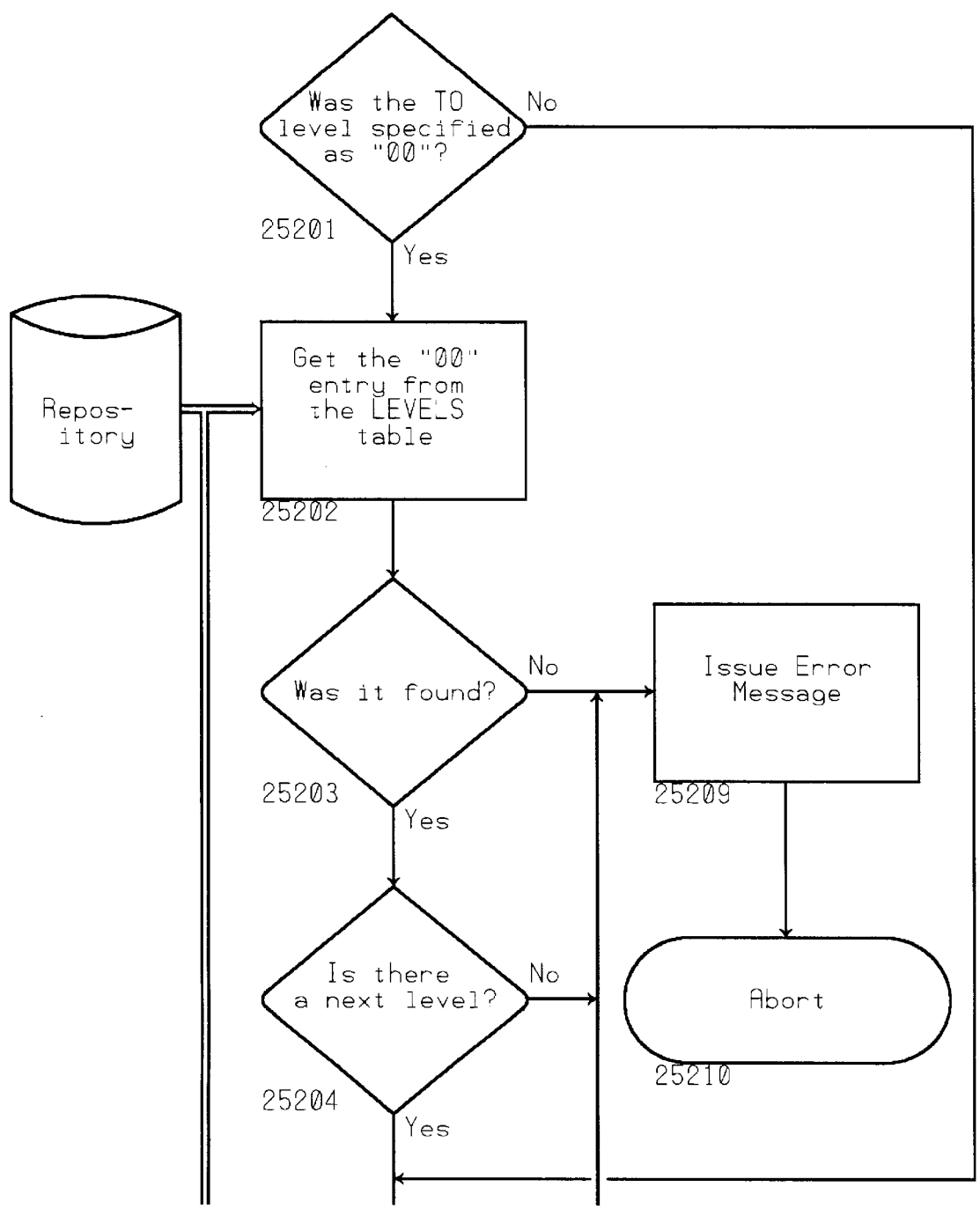
FIG. 36a and 36b describes the LVLSRC Process.
Figure 36B:
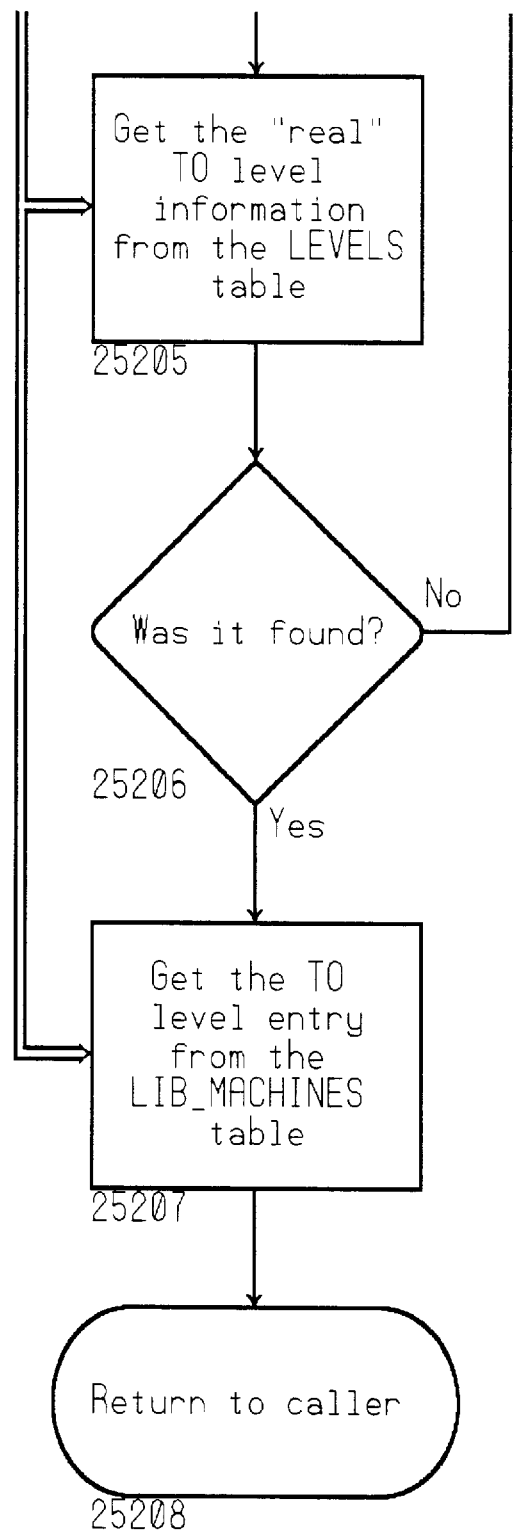

After initialization, the LVLSRC Process described in FIG. 36 is invoked 25001. Upon return from that process, a check 25002 is made to determine if PUT was specified. If not, the process flows forward to 25010. If it was, a query 25003 is made to determine if the file being PUT will overlay an existing file. If so, the QRINVMDL Process described in FIG. 61 in Section 3.0 is invoked 25009. If not, or upon return from the above process, a query 25004 is made to get the Subordinate LibTypes from the FILE_GROUP table in the Control Repository.

Figure 35:
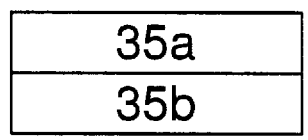
FIG. 35 shows interconnection of 35a and 35b.
Figure 35A:
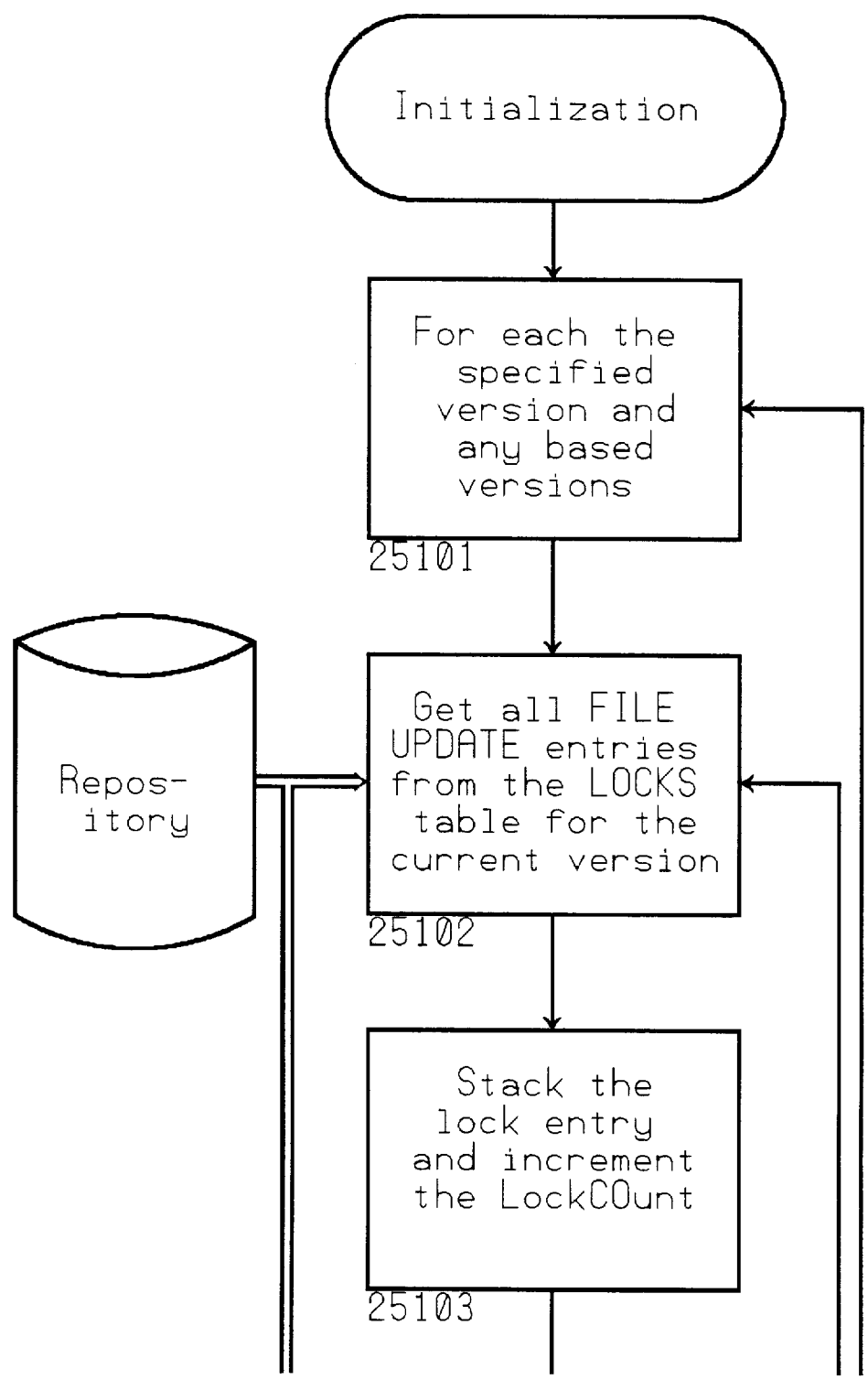
FIG. 35a and 35b describes the GETLOCKS Process.
Figure 35B:
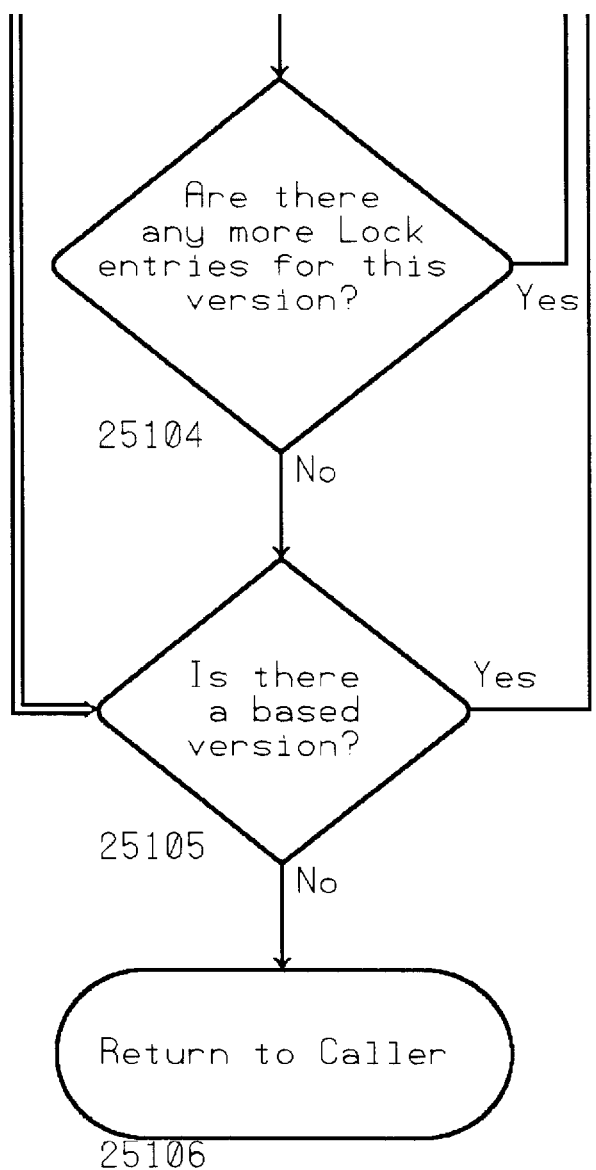

For each subordinate LibType 25005: The GETLOCKS Process described in FIG. 35 is invoked 25006. Upon return from the above process, the Subordinate LibType is stacked 25007 and the LibType count is incremented, a check 25008 is made to determine if there are any more Subordinate LibTypes. If so, the process flows back to 25005.

Next, or if PUT was not specified, the GETLOCKS Process described in FIG. 35 is invoked 25010. Upon return from the above process, a check 25011 is made to determine if the requester has PUT authority. If not, an error message is issued 25015 and the process aborted 25016. If so, the TO level information is stacked 25012. Next, the number of rows stacked is pushed 25013 and the process returns 24014 to the caller.

The GETLOCKS Process FIG. 35: This process is used by the QRSUPGET process to get and stack lock information.

After initialization,

For each 25101 specified version and any based versions: A query 25102 is made to get all FILE UPDATE entries from the LOCKS table in the Control Repository. Then, the lock entry is stacked 25103 and the LockCount incremented. Next, a check 25104 is made to determine if there are any more Lock entries for this version. If so, the process flows back to 25102. If not, a check 25105 is made to determine if there is a based version. If so, the process flows back to 25101. If not, the process returns 25106 to the caller.

The LVLSRC Process FIG. 36: This process is used by the QRSUPGET process to get the TO level information.

First, a check 25201 is made to determine if the TO level was specified as "00". If so, a query 25202 is made to get the "00" entry from the LEVELS table in the Control Repository. Next, a check 25203 is made to determine if it was found. If not, an error message is issued 25209 and the process aborted 25210. If so, a check 25204 is made to determine if there is a next level. If not, an error message is issued 25209 and the process aborted 25210. If so or if the TO level was not specified as "00", a query 25205 is made to get the "real" TO level information from the LEVELS table from the Control Repository. Next, a check 25206 is made to determine if it was found. If not, an error message is issued 25209 and the process aborted 25210. If so, a query 25207 is made to get the library machine information for the TO level from the LIB_MACHINES table in the Control Repository. Then, the process returns 25208 to the caller.

The QRSUPPRM Process FIG. 39: This process is used to promote a file from one library level to another, update existing REC entries.

Figure 41:
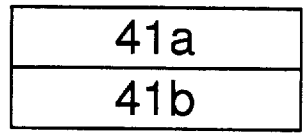
FIG. 41 shows the interconnection of FIG. 41a thru 41b.
Figure 41A:
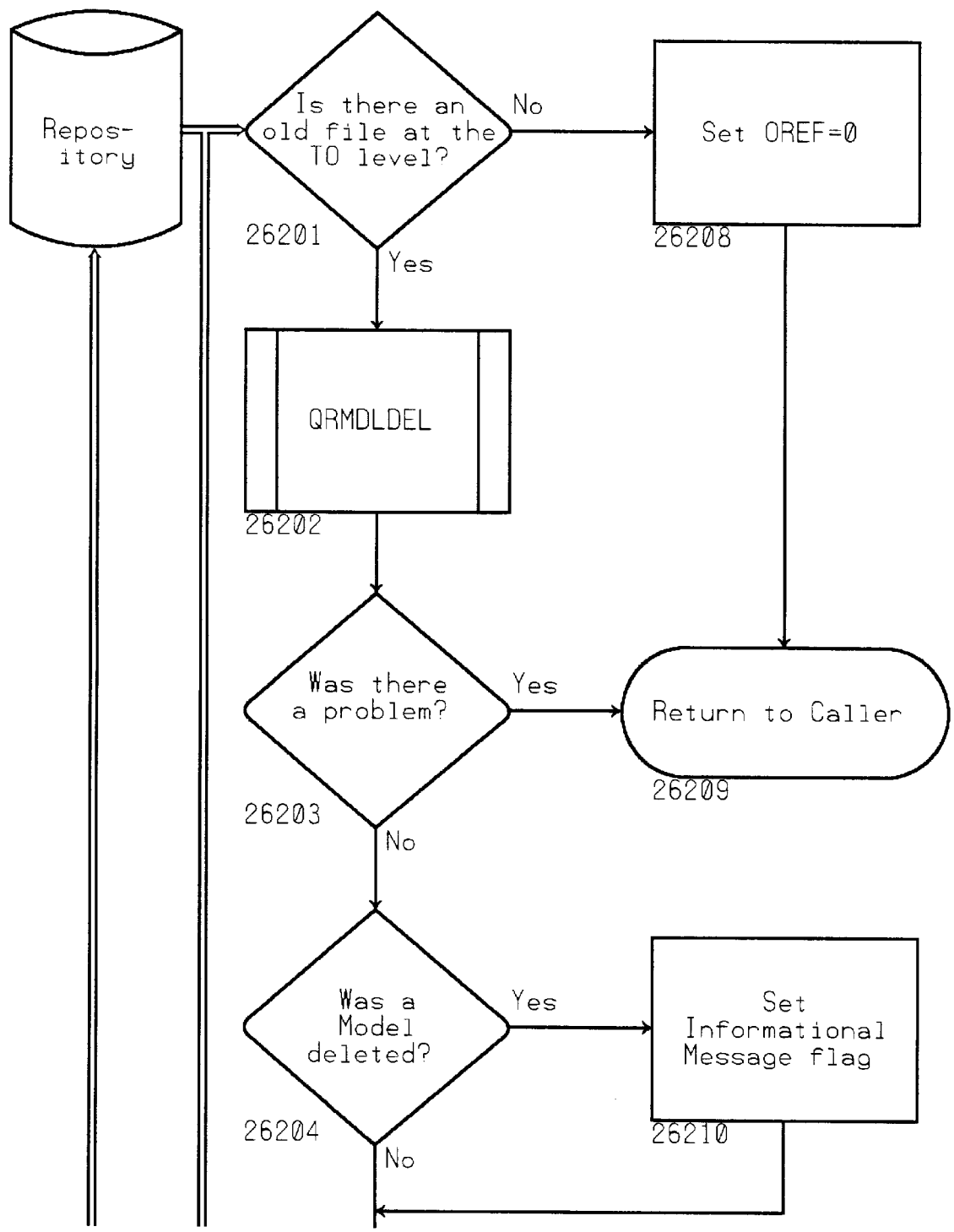
FIG. 41a thru 41b describes the FILEDELB Process.
Figure 41B:
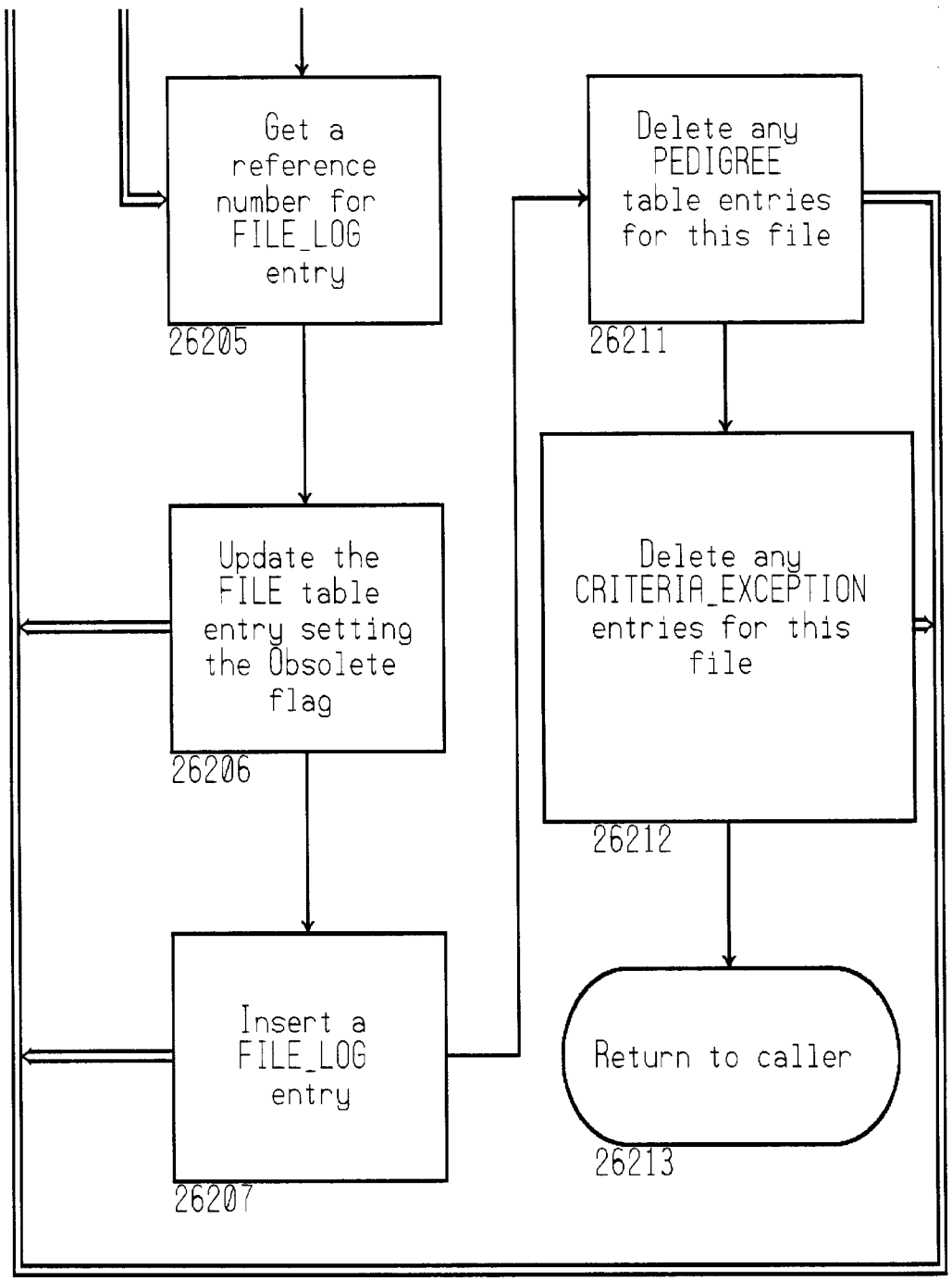
Figure 43:
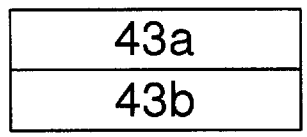
FIG. 43 shows interconnection of FIG. 43a and 43b.
Figure 43A:
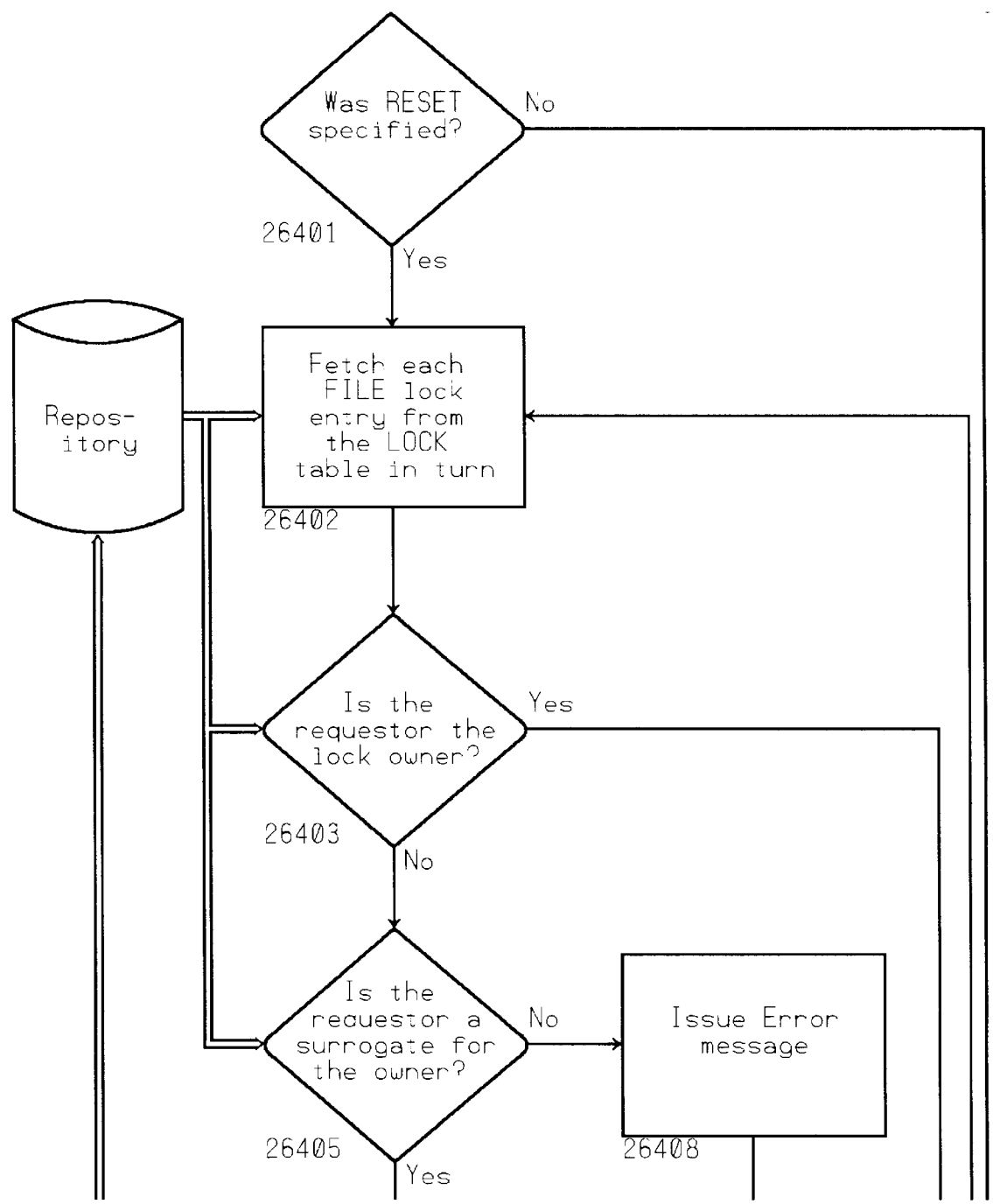
FIG. 43a and 43b describes the LOCKRES Process.
Figure 43B:
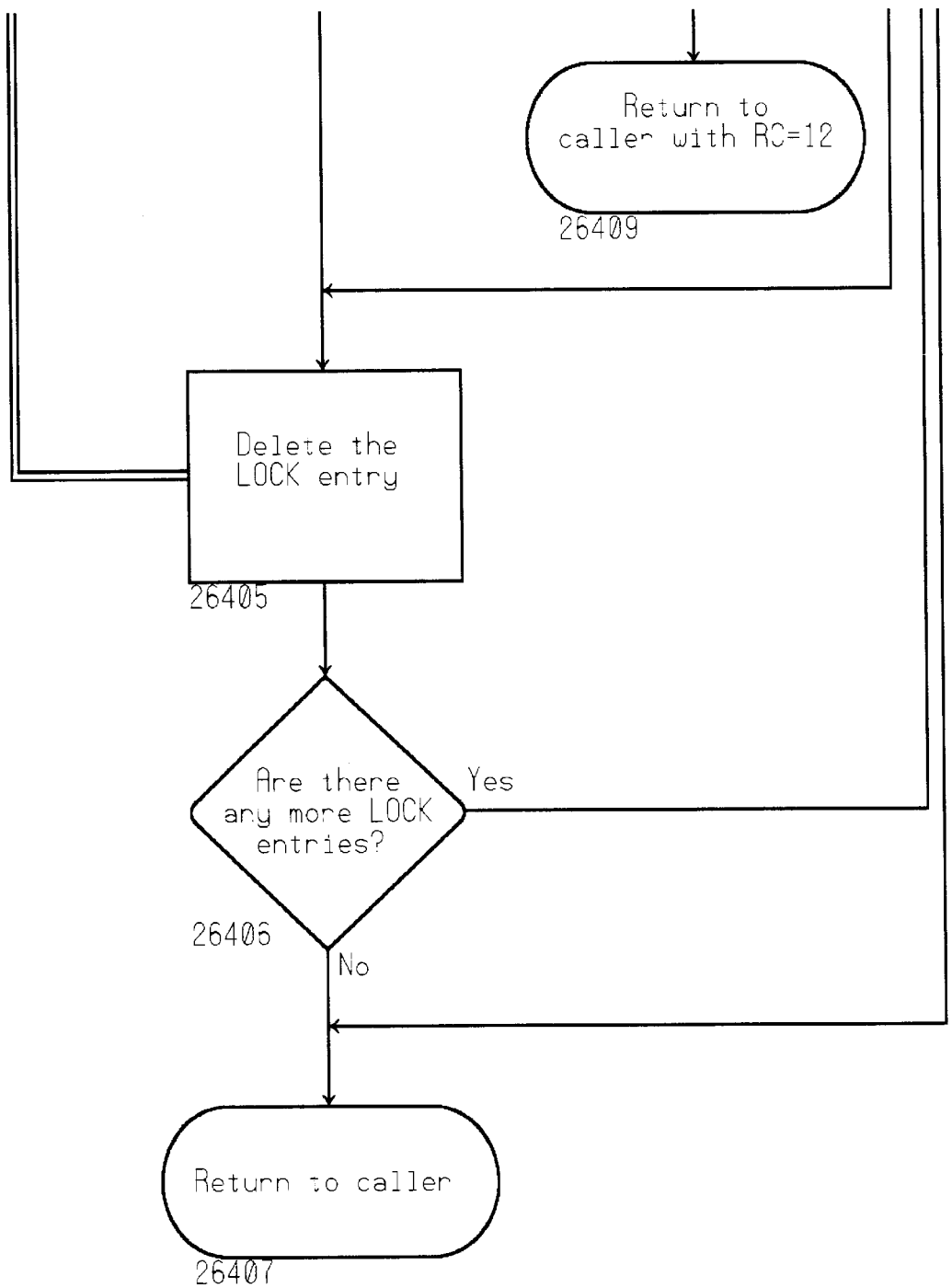
Figure 44:
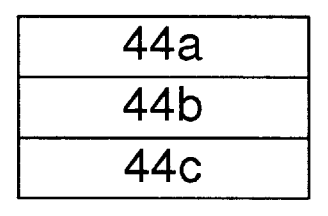
Figure 44A:
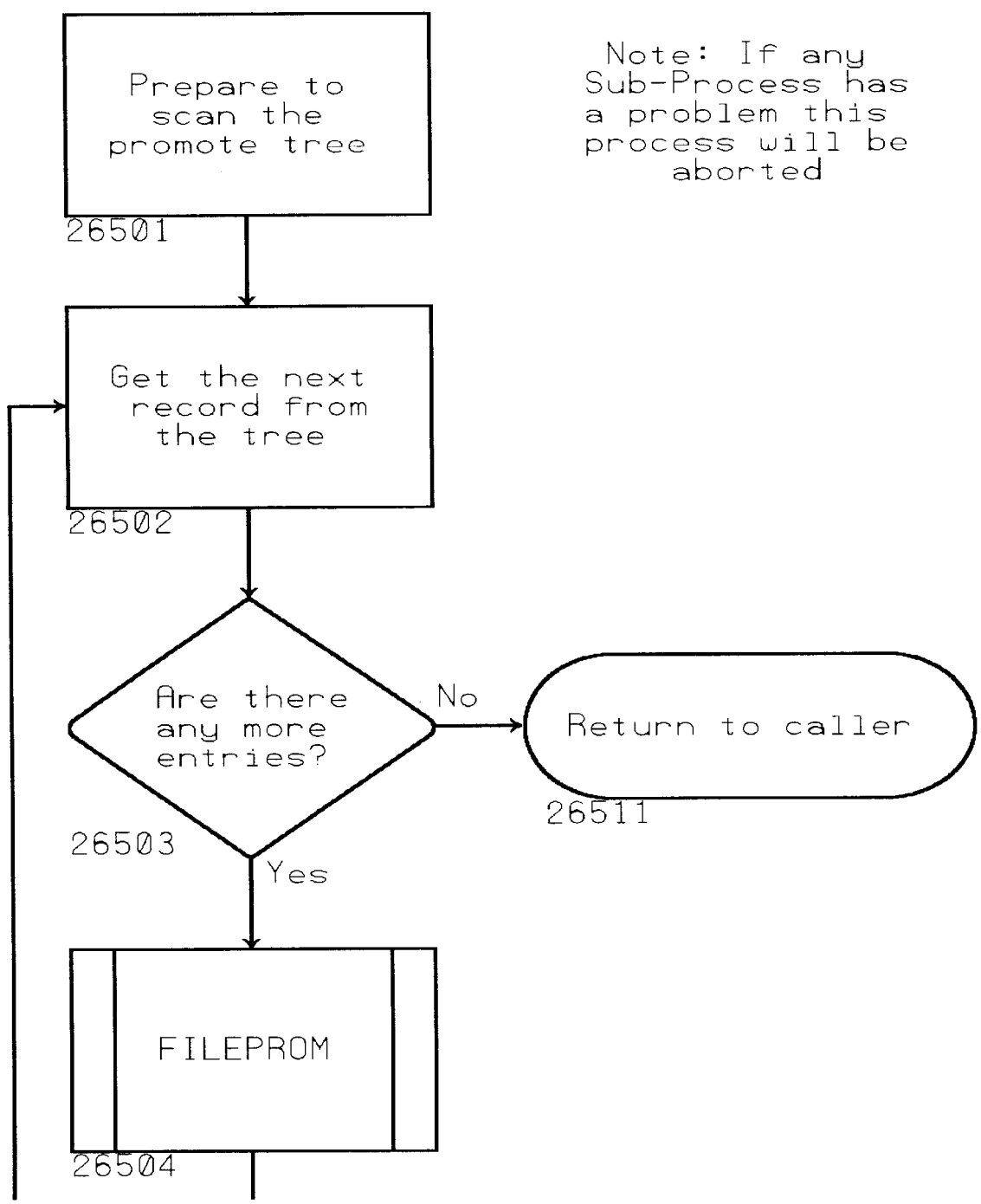
FIG. 44a thru 44c describes the MDLPRM Process.
Figure 44B:
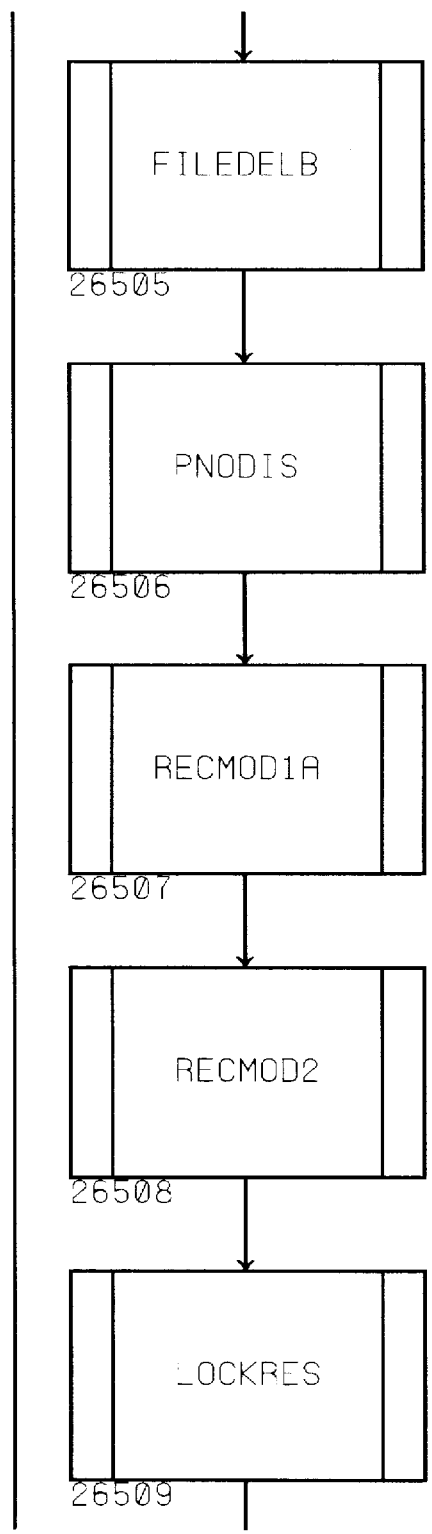
Figure 44C:
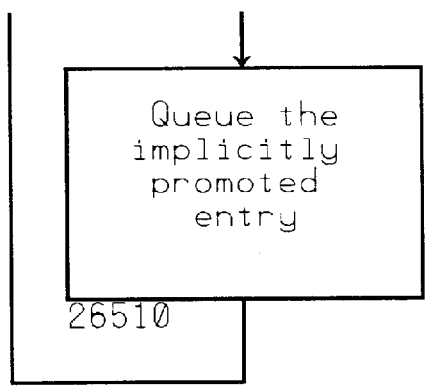
Figure 45:
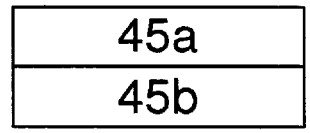
FIG. 45 shows interconnection of FIG. 45a and 45b.
Figure 45A:
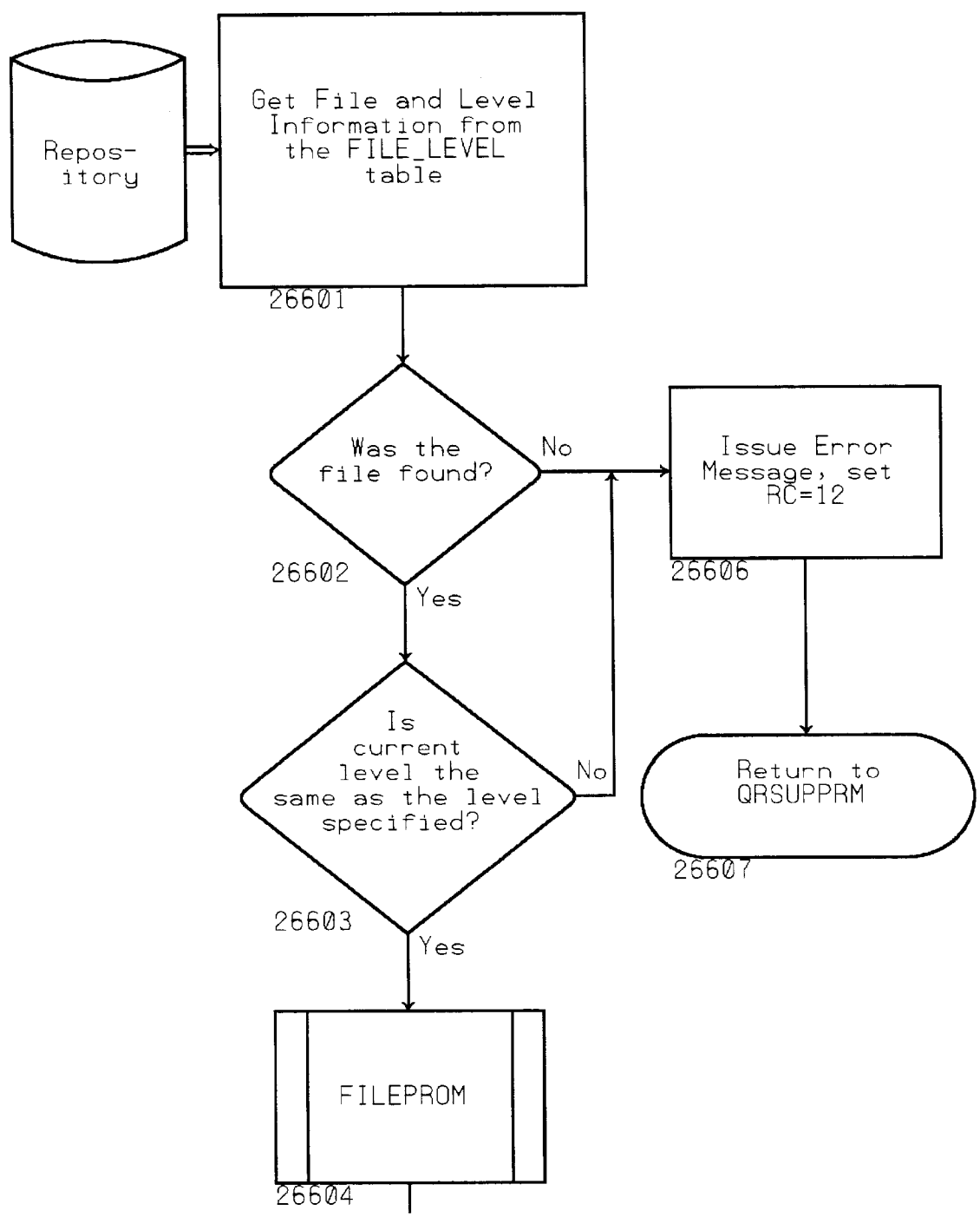
FIG. 45a and 45b describes the PROM Process.
Figure 45B:
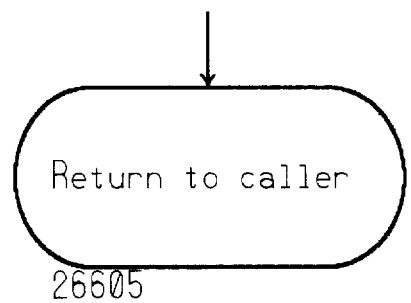
Figure 46:
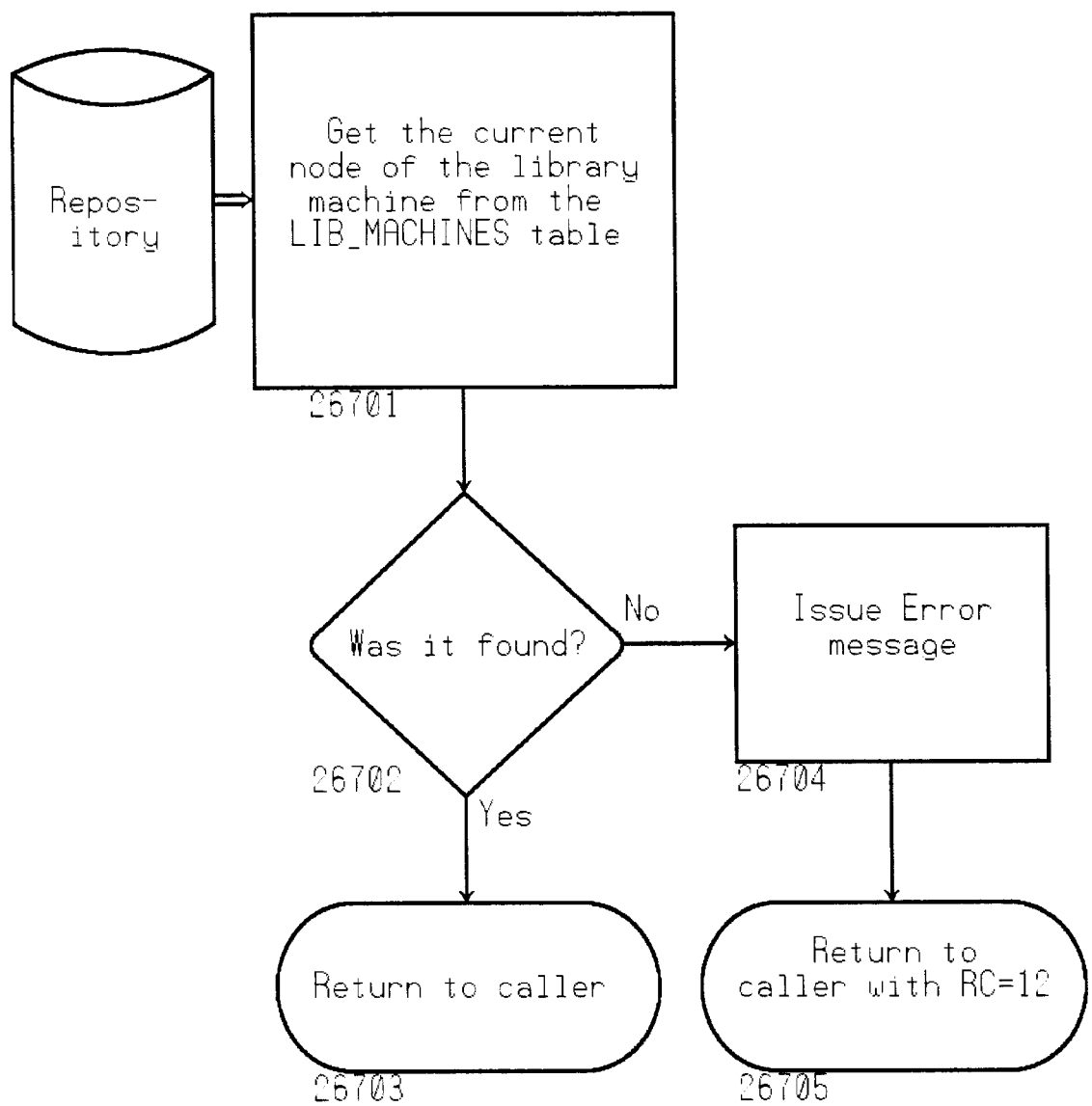
FIG. 46 describes the QUERY Process.

After initialization, the TOLVLCK flag is set 26001 to off. Next, the PROM Process described in FIG. 45 is invoked 26002. Upon return from the above process, the FILEDELB Process described in FIG. 41 is invoked 26003. Upon return from the above process, the PNODIS Process described in FIG. 91 of Section 4.0 is invoked 26004. Upon return from the above process, the RECMOD1B Process described in FIG. 93 of Section 4.0 is invoked 26005. Upon return from the above process, the RECMOD2 Process described in FIG. 94 of Section 4.0 is invoked 26006. Upon return from the above process, the LOCKRES Process described in FIG. 43 is invoked 26007. Upon return from the above process, a check 26008 is made to determine if this is a Model promote. If not, the FIGPRM Process described in FIG. 40 is invoked 26009. Upon return from the above process, the process flows forward to 26013. If it is a model promote, the promote tree is setup 26010. Next, the QRBLDPRM Process described in FIG. 70 in Section 3.0 is invoked 26011. Upon return from the above process, the MDLPRM Process described in FIG. 44 is invoked 26112. Upon return from the above process, or if not a model promote, the Query Process described in FIG. 46 is invoked 26013. Upon return from the above process, the Query output is stacked 26014, Next, the number of rows stacked is computed 26015, that number is stacked 26016 and the process returns 26017 to the caller.

The FIGPRM Process FIG. 40: This process is used by the QRSUPPRM process to handle the FileGroup promotions.

First, a query 26101 is made to get all the entries from the FILE_GROUP table for the indicated FileType and level.

Figure 42:
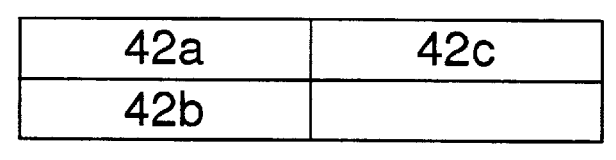
Figure 42A:
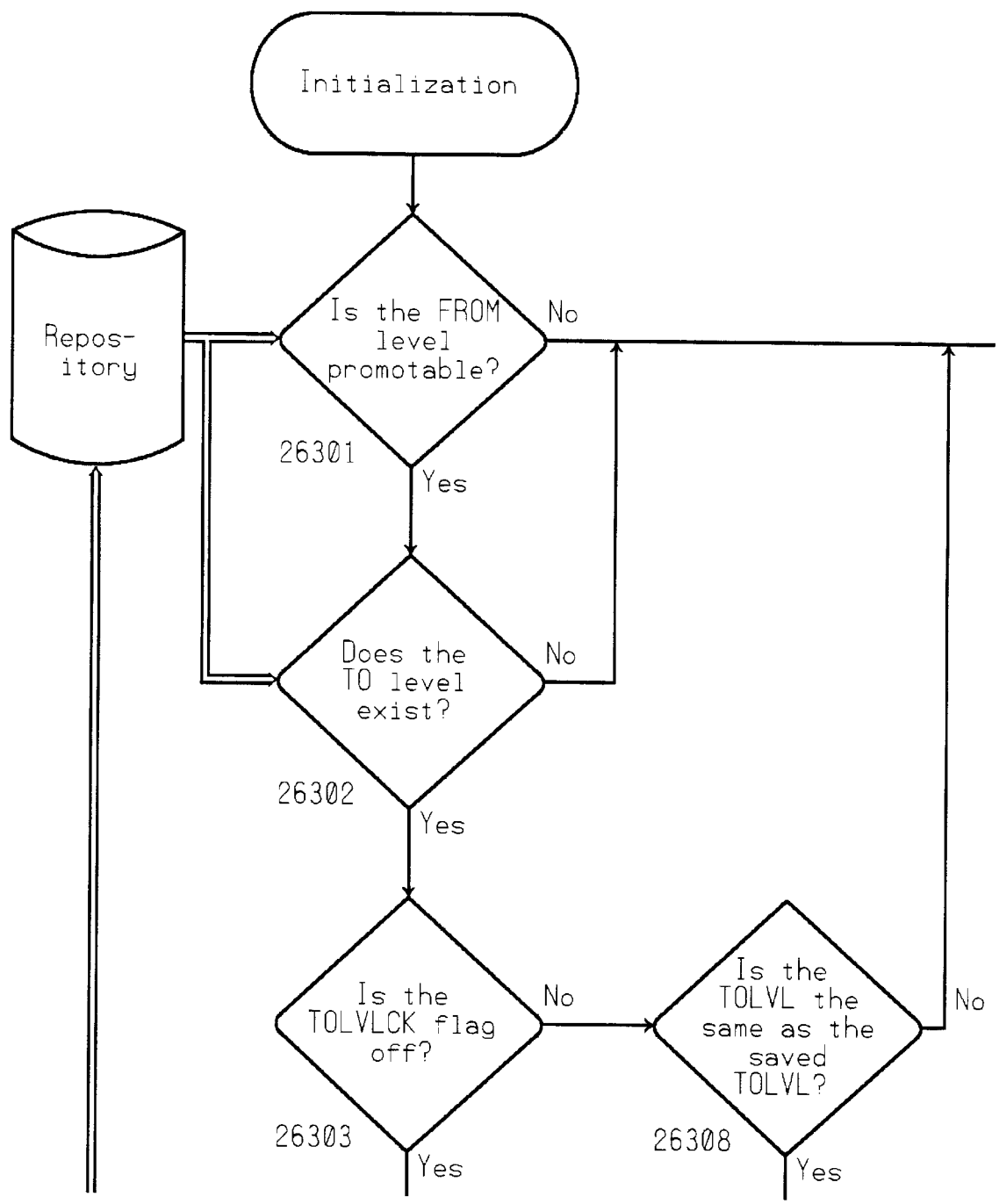
FIG. 42a thru 42c describes the FILEPROM Process.
Figure 42B:
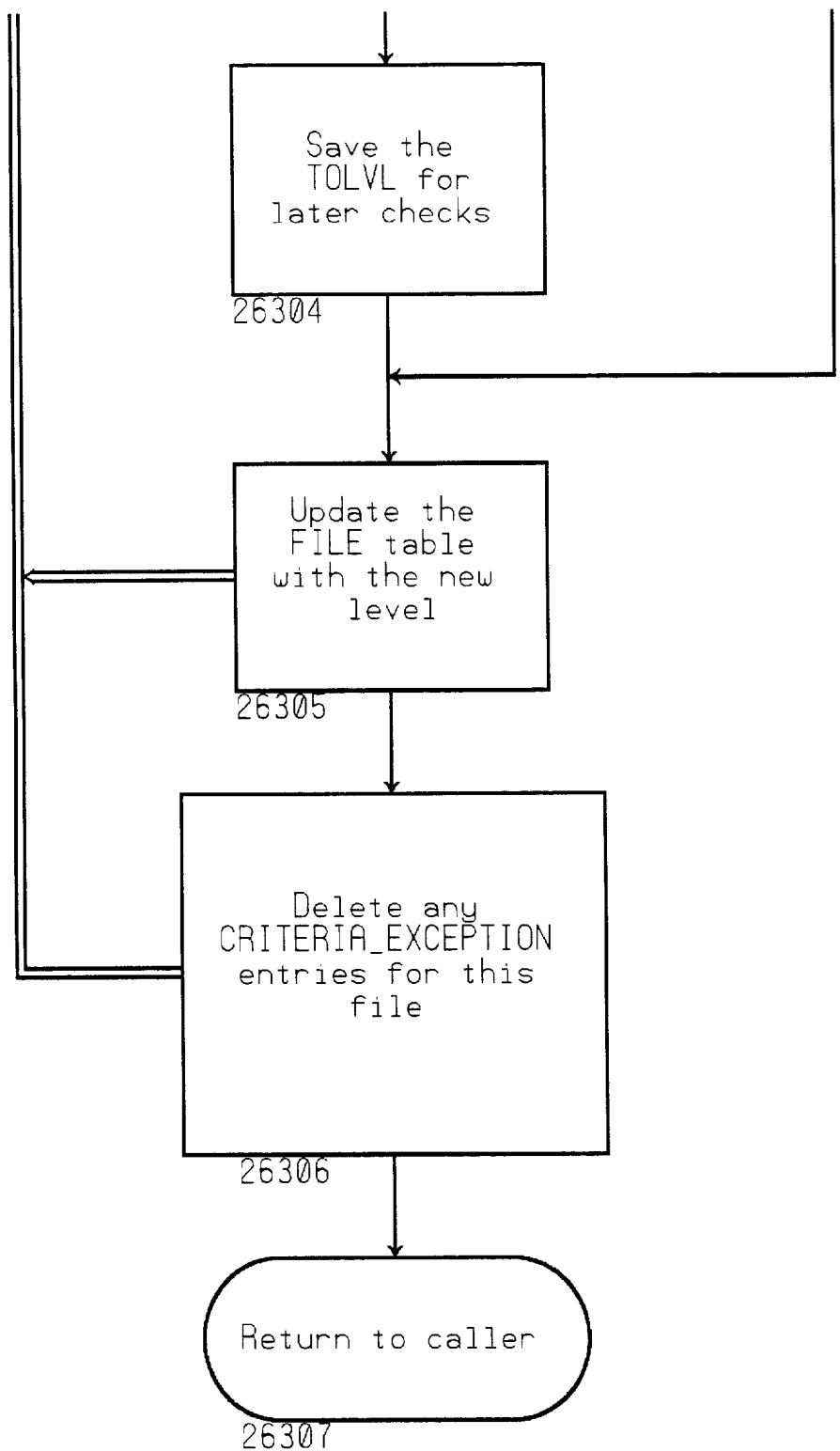
Figure 42C:
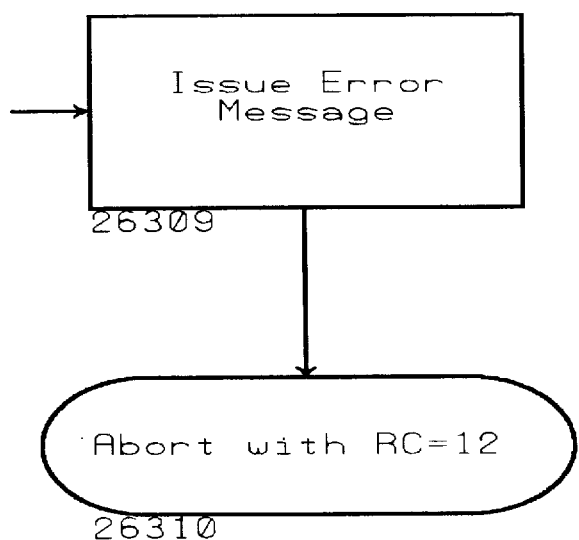

For each FILE_GROUP entry: a check 26103 is made to determine if the Subordinate FileType File exists in the FILES table in the Control Repository. If so, the FILEPROM Process described in FIG. 42 is invoked 26104. Upon return from the above process, the Subordinate FileType promoted is stacked 26105. Next, the FILEDELB Process described in FIG. 41 is invoked 26106. Upon return from the above process, the RECMOD1A Process described in FIG. 92 of Section 4.0 is invoked 26107. Upon return from the above process, the RECMOD2 Process described in FIG. 94 of Section 4.0 is invoked 26108. Upon return from the above process, the LOCKRES Process described in FIG. 43 is invoked 26109. Upon return from the above process, a check 26110 is made to determine if there are any more FileGroup entries. If so, the process flows back to 26102. If not, the process returns 26117 to the caller.

If the Subordinate FileType file does not exist, a check 26111 is made to determine if it is a required Subordinate FileType. If so, an error message is issued 26118 and The process returns 26119 to the caller with Return code=12. If not, a check 26112 is made to determine if the Purge flag is set. If so, the FILEDELB Process described in FIG. 41 is invoked 26113. Upon return from the above process, a check 26114 is made to determine if a file was deleted. If not or if the Purge flag was not set, the process flows back to 26110. If so, any left over REC_FILE entries are deleted 26115 from the Control Repository. Next, the Subordinate FileType is stacked 26116 and the process flows back to 26110.

The FILEDELB Process FIG. 41: This process is used by the QRSUPPRM process to delete an old file at the TO level.

First, a query 26201 is made to determine if there is an old file at the TO level. If not, OREF is set 26208 to zero and the process returns 26209 to the caller. If so the QRMDLDEL Process described in FIG. 58 in Section 3.0 is invoked 26202. Upon return from the above process, a check 26203 is made to determine if there was a problem. If so, the process returns 26209 to the caller. If not, a check 26204 is made to determine if a Model was deleted. If not, an informational flag is set 26210. In either case, a reference number for a FILE_LOG entry is obtained 26205 from the Control Repository. Then, the FILE table entry is updated 26206 setting the Obsolete flag. Next, a FILE_LOG entry is inserted 26207 into the Control Repository. Next, all PEDIGREE table entries for this file are deleted 26211 from the Control Repository. Then, all CRITERIA_EXCEPTION table entries for this file are deleted 26212 from the Control Repository and the process returns 26213 to the caller.

The FILEPROM Process FIG. 42: This process is used by the QRSUPPRM process to do the promote of the file.

After initialization, a query 26301 is made to determine if the FROM level is promotable. If not, an error message is issued 26309 and the process aborted 26310 with Return code=12. If so, a query 26302 is made to determine if the TO level exists. If not, an error message is issued 23609 and the process aborted 26310 with Return code=12. If so, a check 26303 is made to determine if the TOLVLCK flag is off. If not, a check 26308 is made to determine if the TOLVL is the same as the saved TOLVL. If not, an error message is issued 23609 and the process aborted 26310 with Return code=12. If so, the process flows forward to 26305. If the TOLVLCK flag was not set, it is saved 26304 for later checks. Next, The FILE table entry is updated 26305 to reflect the new level. Next, any CRITERIA_EXCEPTION table entries for the file are deleted 26306 from the Control Repository and the process returns 26307 to the caller.

The LOCKRES Process FIG. 43: This process is used by the QRSUPPRM process to reset locks if RESET was specified.

First, a check 26401 is made to determine if RESET was specified. If not, the process returns 26407 to the caller. If so, a query 26402 is made to get each FILE LOCK entry from the LOCK table in the Control Repository. Next, a check 26403 is made to determine if the requestor is the lock owner. If not, a check 26404 is made to determine if the requestor is a surrogate for the owner. If not, an error message is issued 26408 and the process returns 26409 to the caller with Return code=12. If the requestor is the owner or its surrogate, the Lock entry is deleted 26405 from the LOCK table in the Control Repository. Next, a check 26406 is made to determine if there are any more Lock entries. If so, the process flows back to 26401. If not, the process returns 26407 to the caller.

The MDLPRM Process FIG. 44. This process is used by the QRSUPPRM process to the Model Promote process.

First, Prepare 26501 to scan the promote tree. Then, get 26502 a record from the promote tree Next, a check 26503 is made to determine if there are any more entries. If not, the process returns 26511 to the caller. If there are, the FILEPROM Process described in FIG. 42 is invoked 26504. Upon return from the above process, the FILEDELB Process described in FIG. 41 is invoked 26505. Upon return from the above process, the PNODIS Process described in FIG. 91 in Section 4.0 is invoked 26506. Upon return from the above process, the RECMOD1A Process described in FIG. 92 in Section 4.0 is invoked 26507. Upon return from the above process, the RECMOD2 Process described in FIG. 94 in Section 4.0 is invoked 26508. Upon return from the above process, the LOKRES Process described in FIG. 43 is invoked 26509. Upon return from the above process, the implicitly promoted entry is queued 26510. Then, the process flows back to 26502.

The PROM Process FIG. 45: This process is used by the QRSUPPRM process to do the promote process.

First, a query 26601 is made to get the File and Level information from the FILE_LEVEL table in the Control Repository. Next, a check 26602 is made to determine if the file information was found. If not, an error message is issued 26606 and the process returns 26607 to the caller. If so, a check 26603 is made to determine if the current level is the same as the specified level. If not, an error message is issued 26606 and the process returns 26607 to the caller. If so, the FILEPROM Process described in FIG. 42 is invoked 26604. Upon return from the above process, the process returns 26605 to the caller.

The QUERY Process FIG. 46: This process is used by the QRSUPPRM process to get information on the library machine where the level resides.

First, a query 26701 is made to get the current node of the Library machine from the LIB_MACHINES table in the Control Repository. Next, a check 26602 is made to determine if the information was found. If not, an error message is issued 26704 and the process returns 26705 to the caller with return code=12. If so, the process returns 26703 to the caller.

Figure 47:
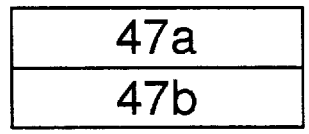
FIG. 47 shows interconnection of FIG. 47a and 47b.
Figure 47A:
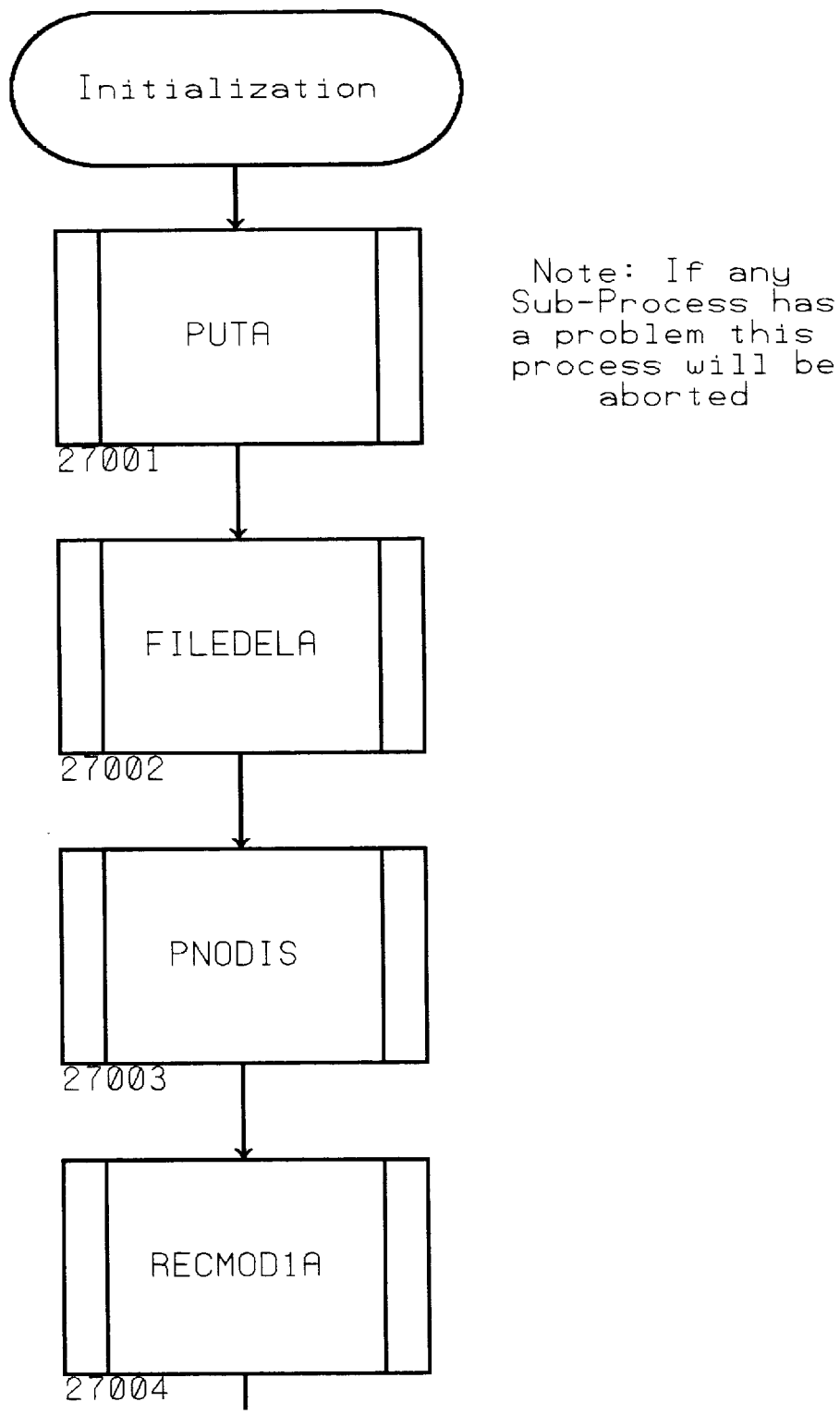
FIG. 47a and 47b describes the QRSUPPUT Process.
Figure 47B:
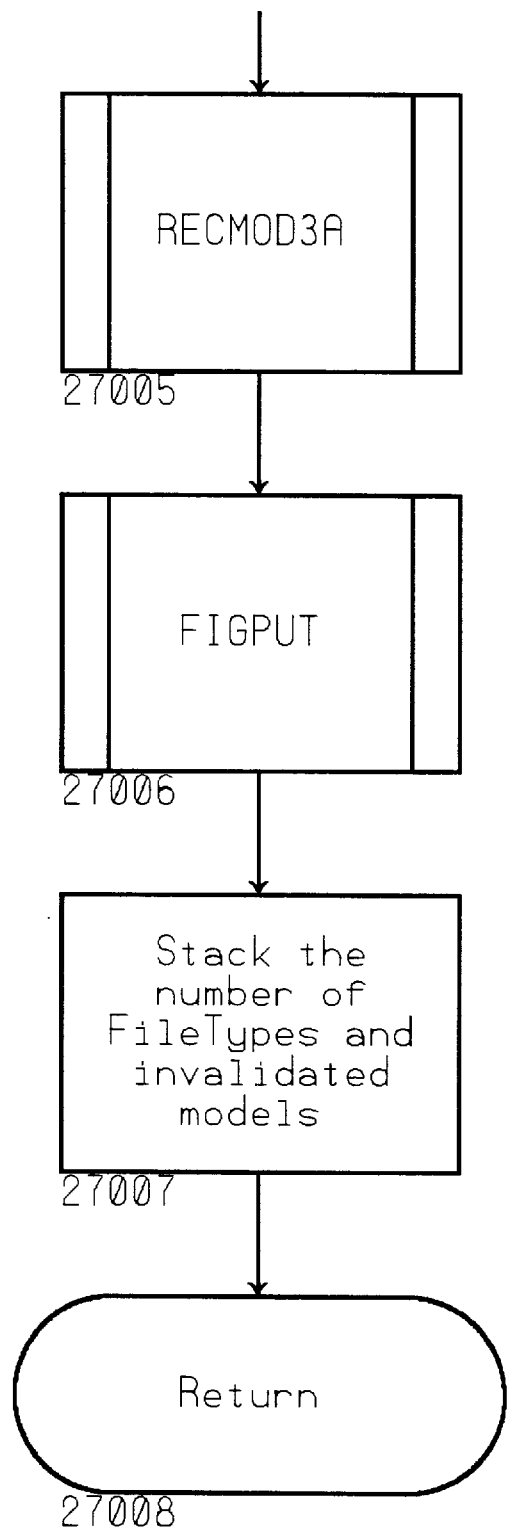
Figure 48A:
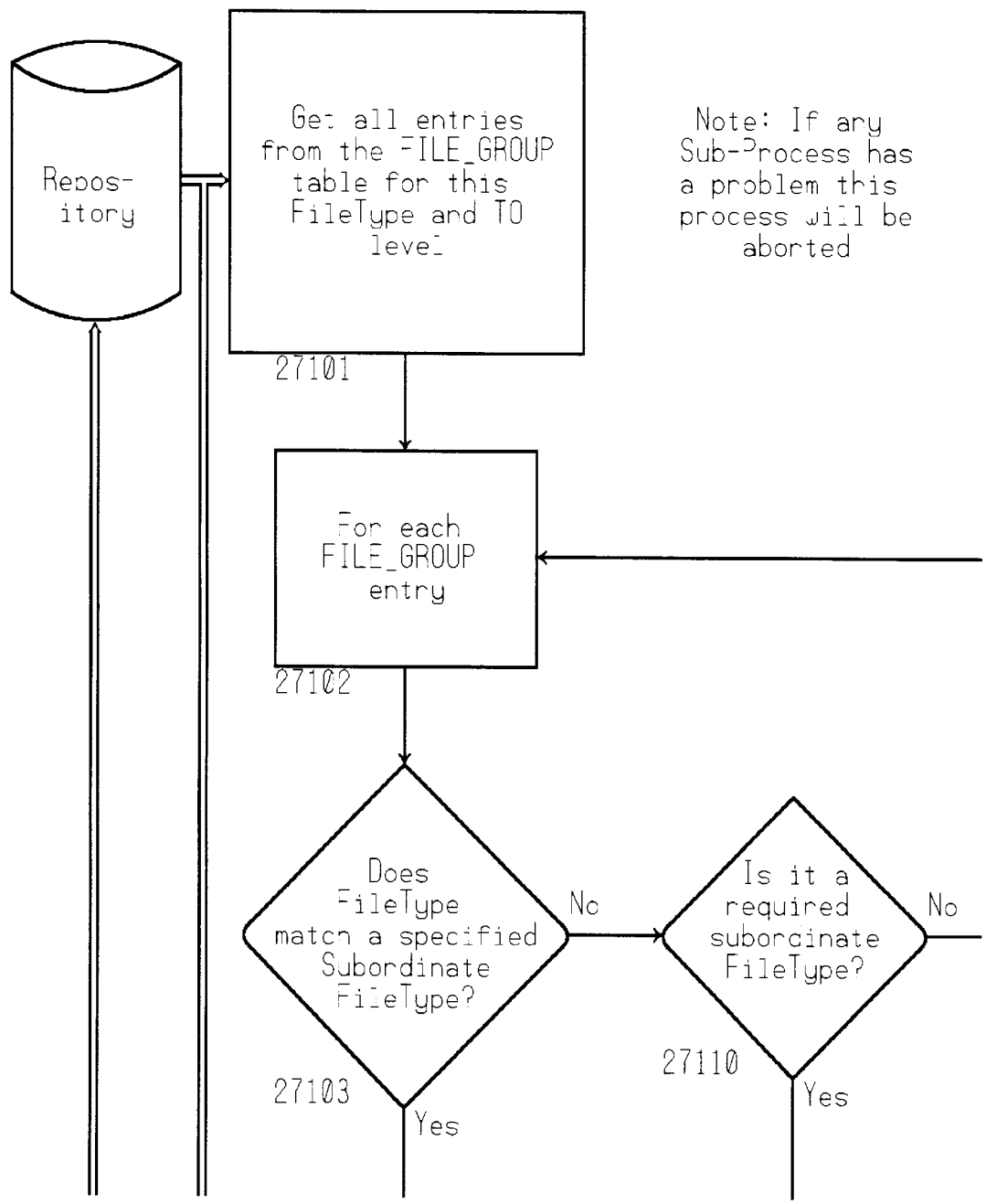
FIG. 48a thru 48f describes the FIGPUT Process.
Figure 48B:
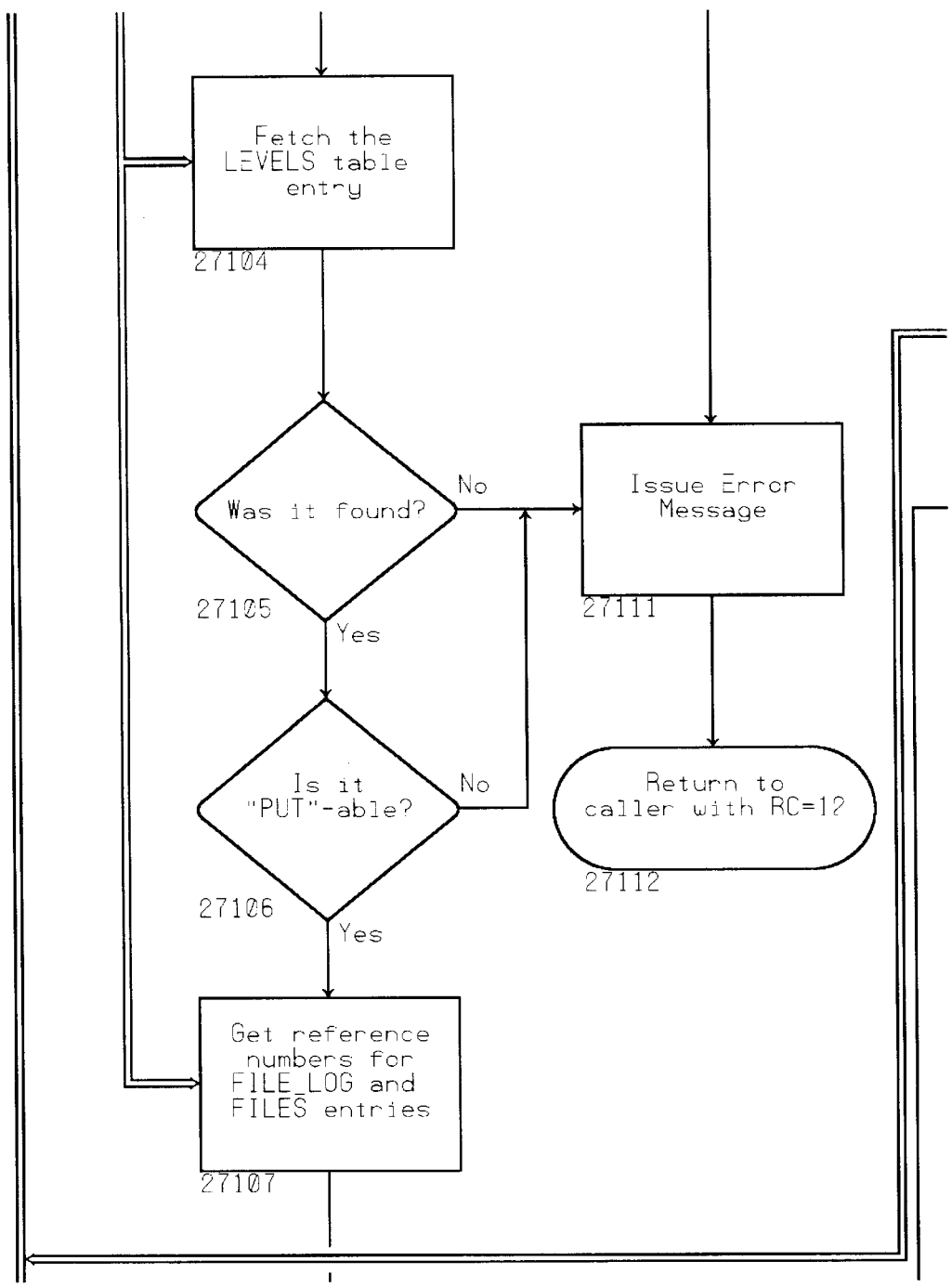
Figure 48C:
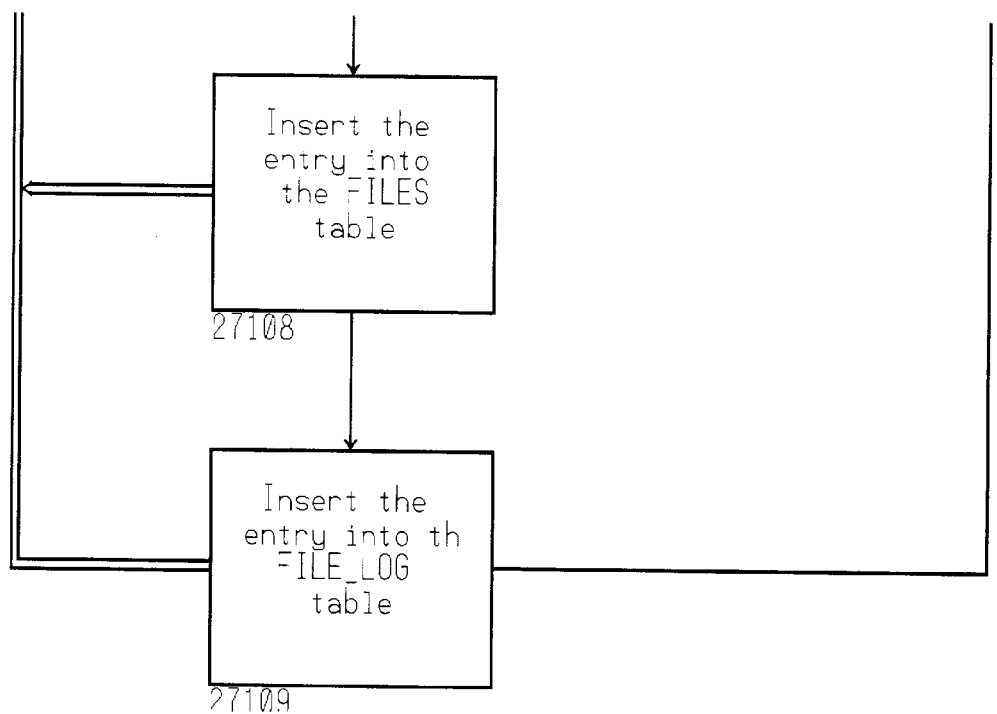
Figure 48D:
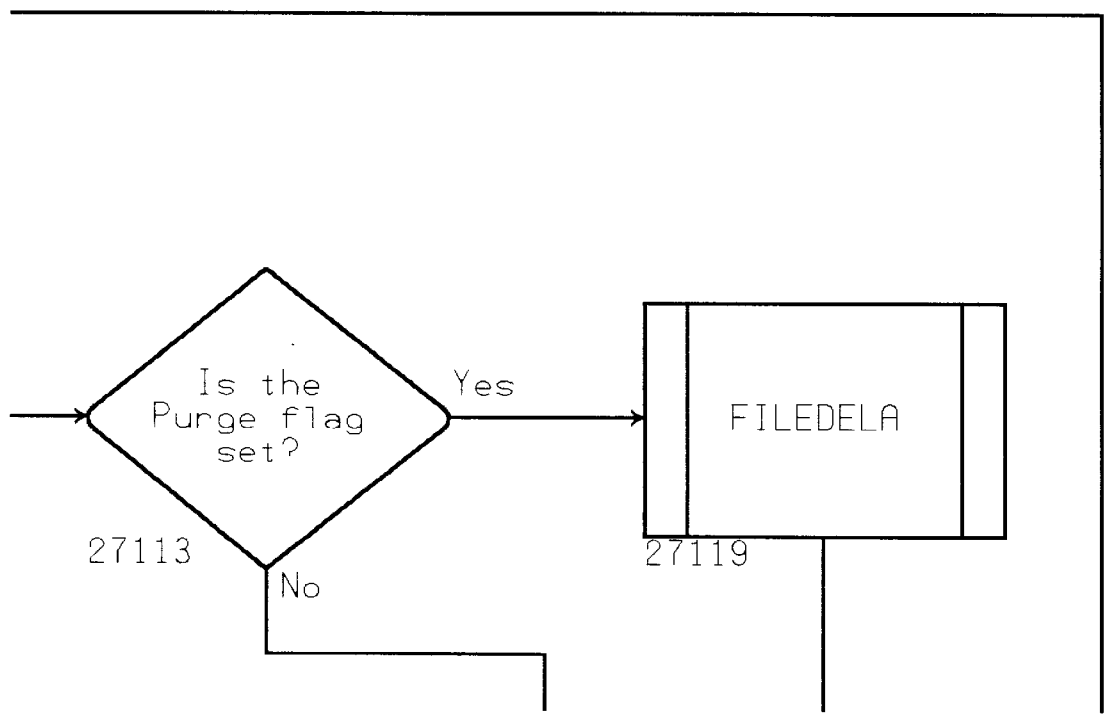
Figure 48E:
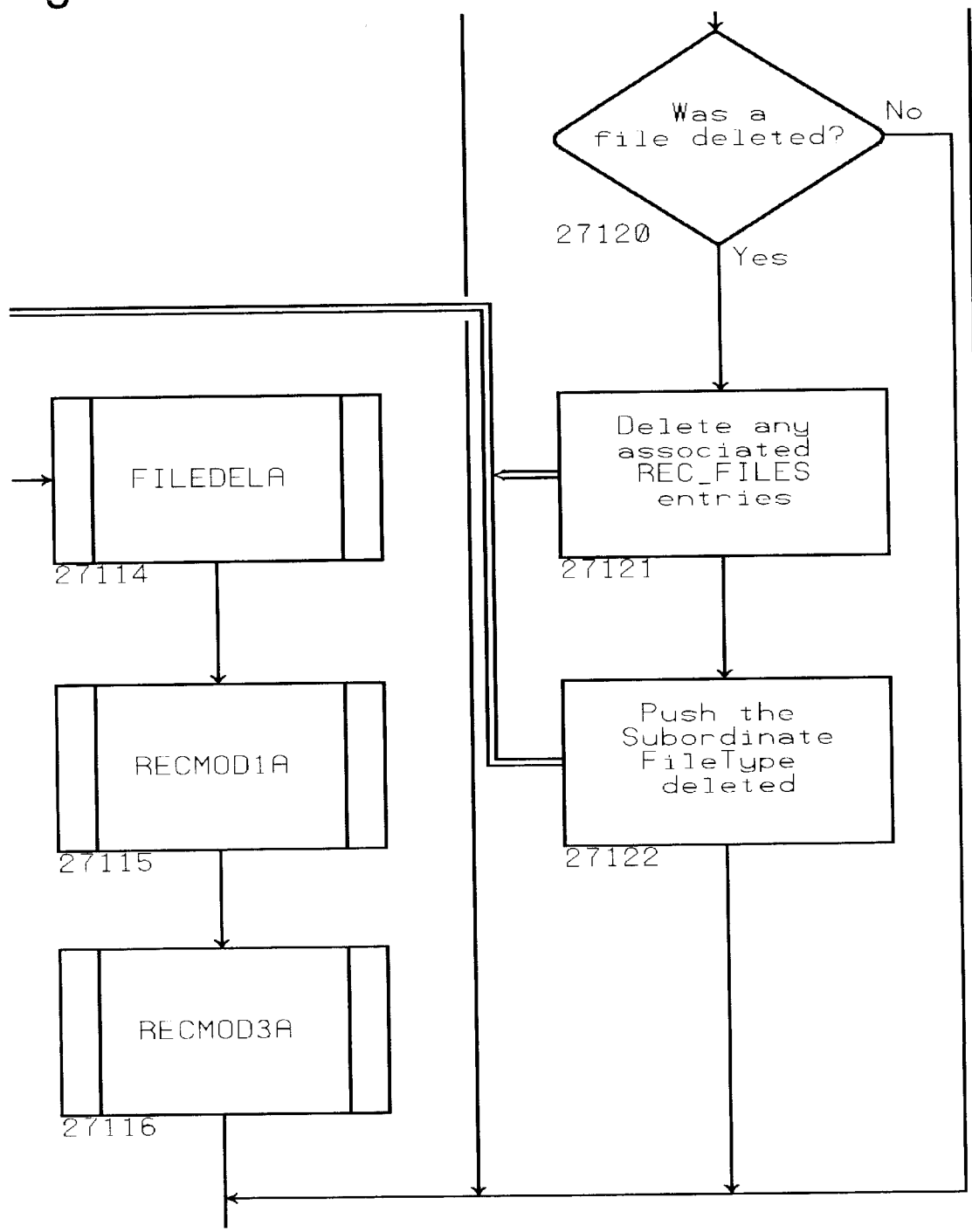
Figure 48F:
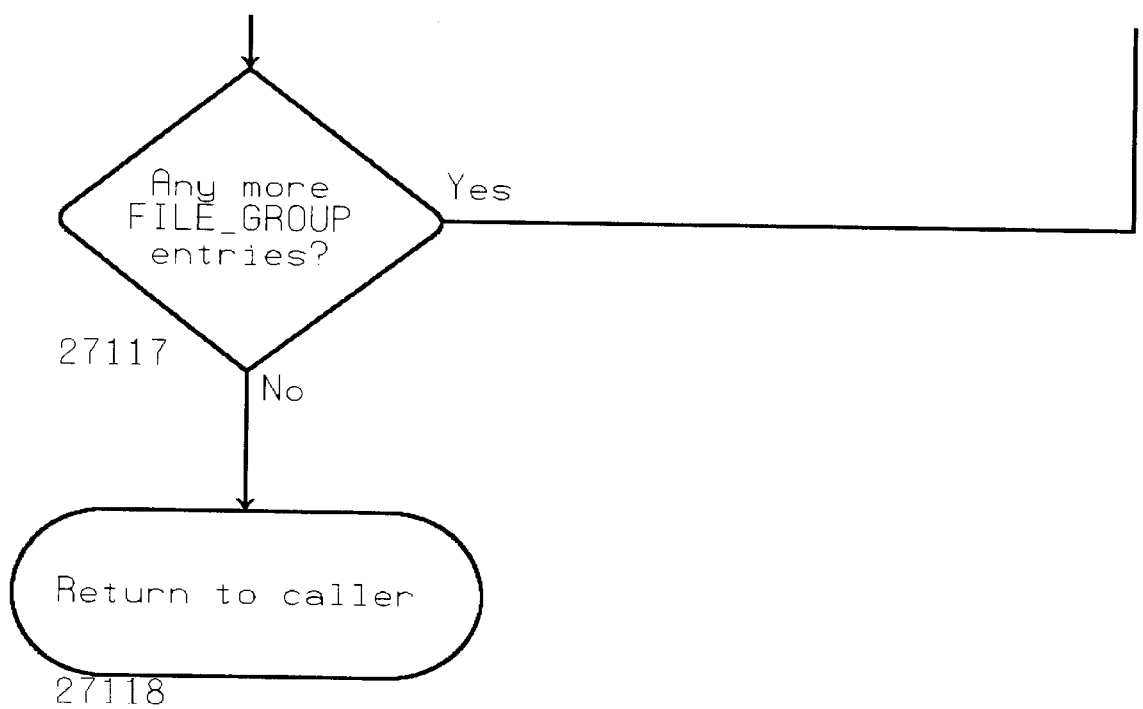

The QRSUPPUT Process FIG. 47: This process is used to put a file into a library level, and update existing REC entries as well as update the collection REC.

Figure 49:
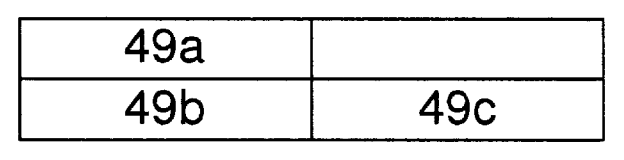
Figure 49A:
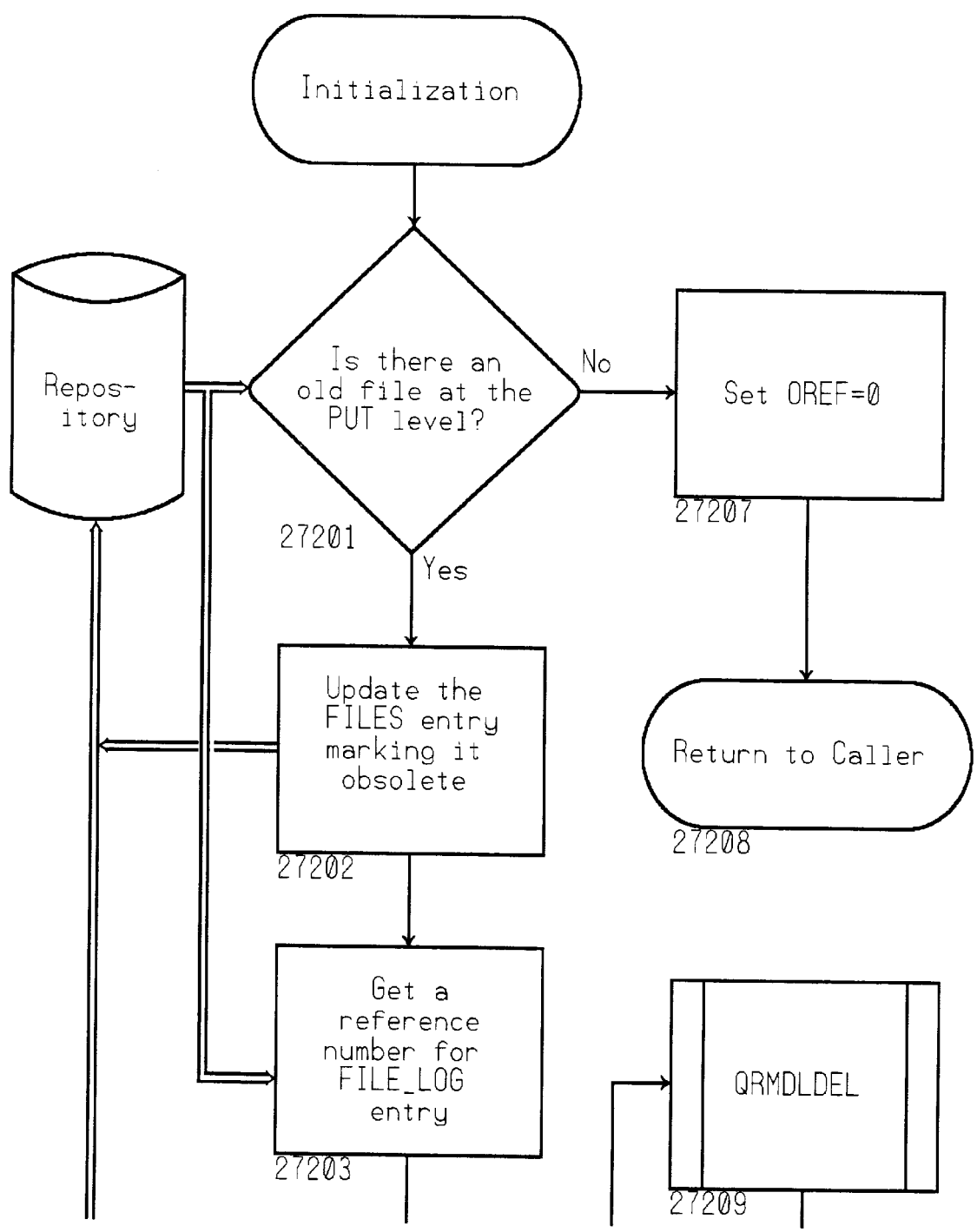
Figure 49B:
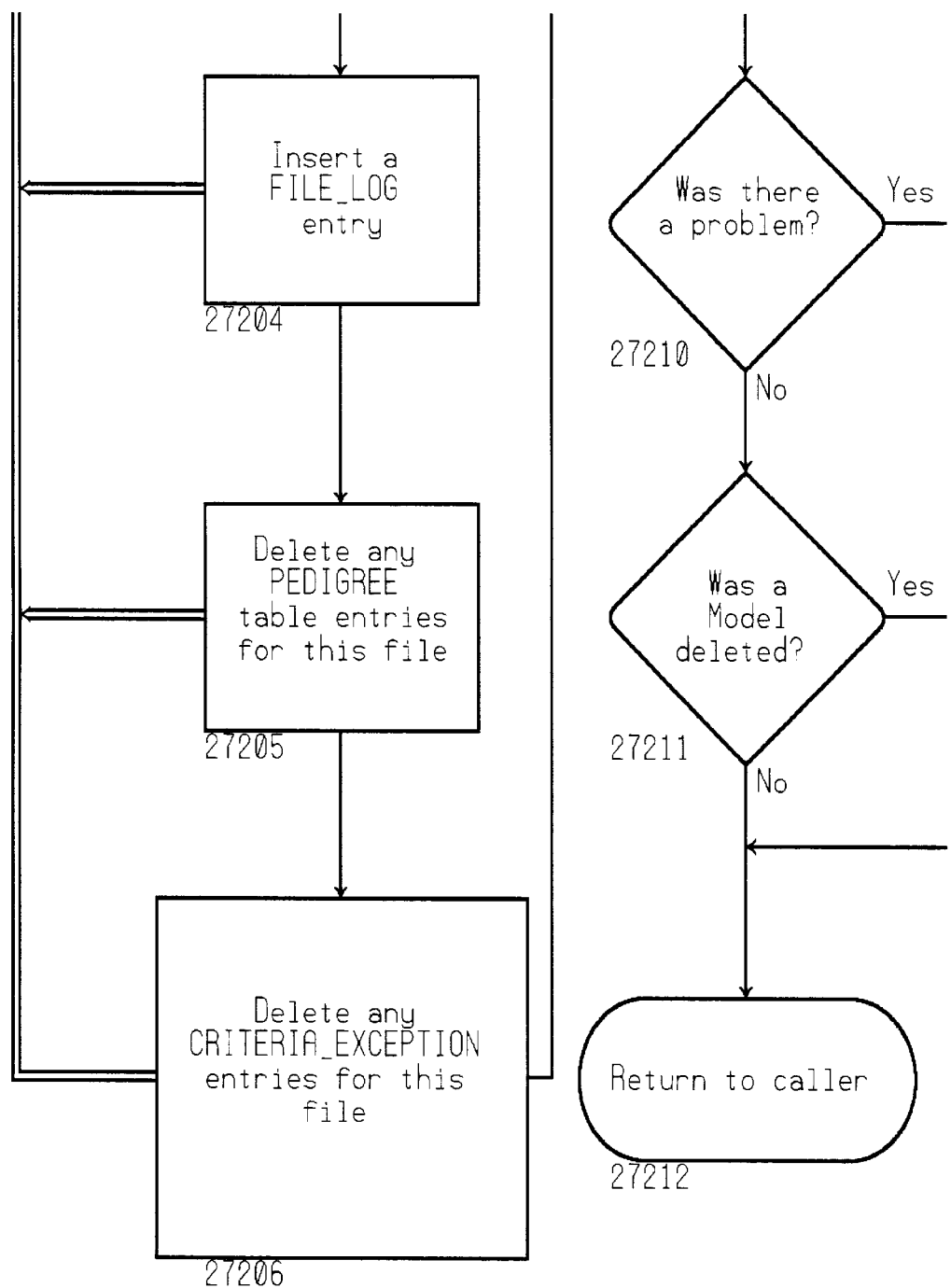
Figure 50:
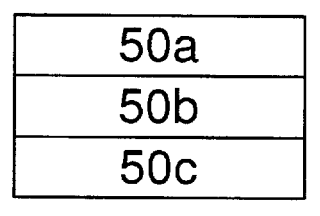
Figure 50A:
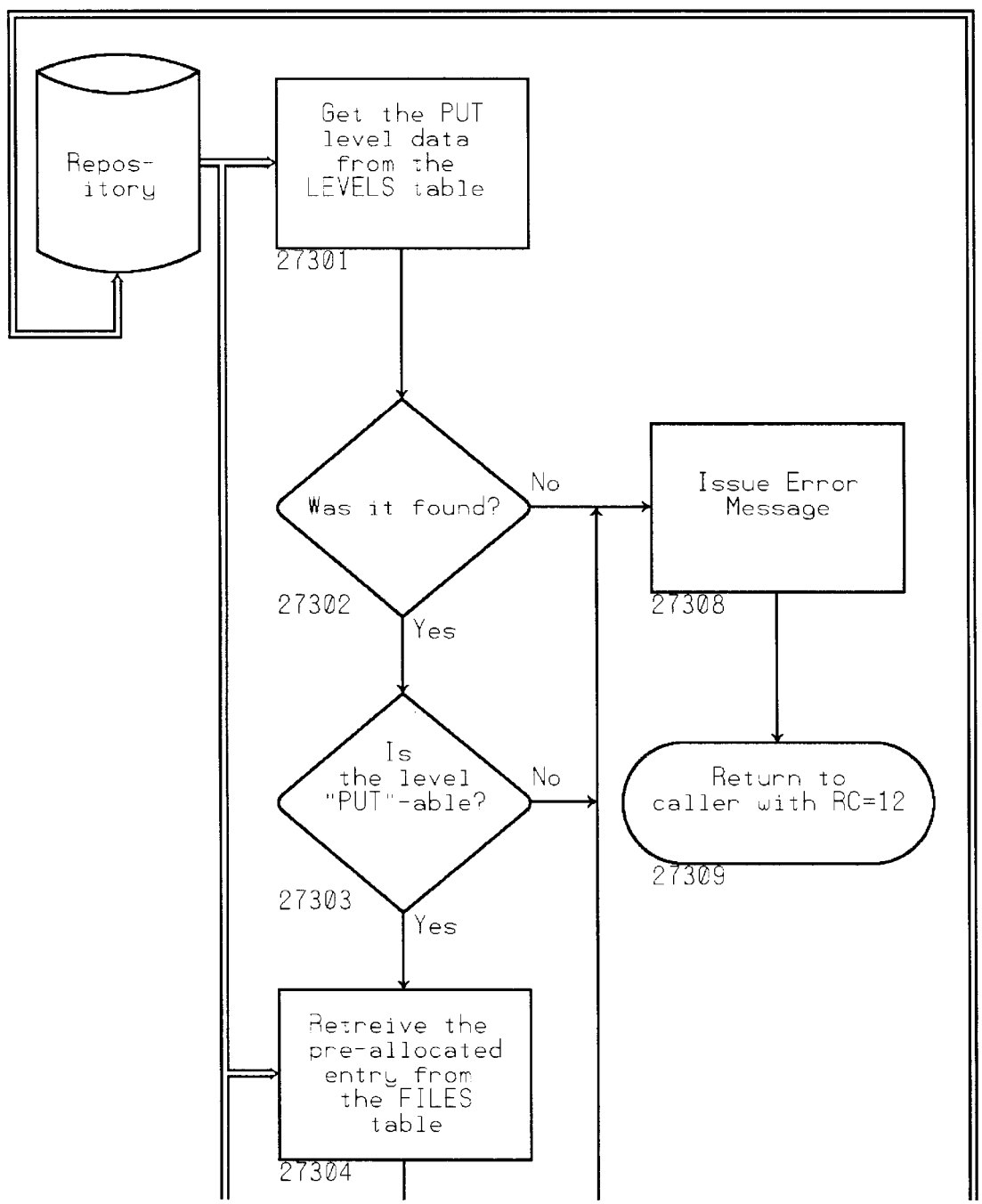
FIG. 50a thru 50c describes the PUTA Process.
Figure 50B:
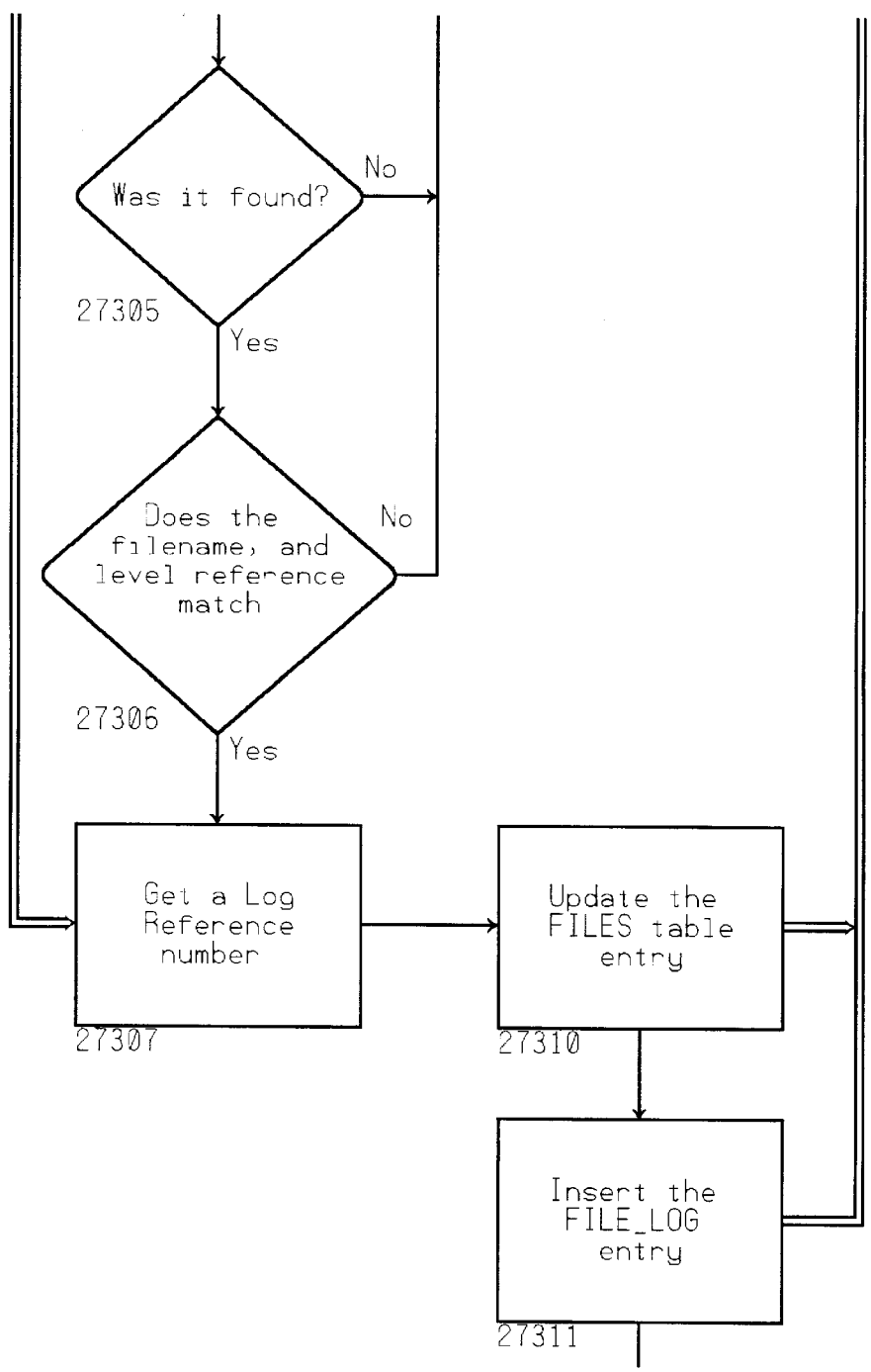
Figure 50C:
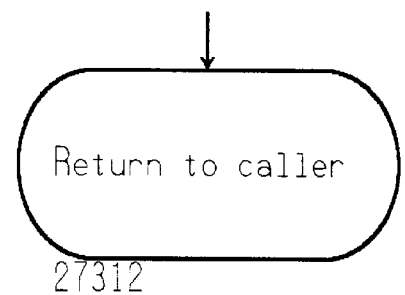

After initialization, the PUTA Process described in FIG. 50 is invoked 27001. Upon return from the above process, the FILEDELA Process described in FIG. 49 is invoked 27002. Upon return from the above process, the PNODIS Process described in FIG. 91 in Section 4.0 is invoked 27003. Upon return from the above process, the RECMOD1A Process described in FIG. 92 in Section 4.0 is invoked 27004. Upon return from the above process, the RECMOD3A Process described in FIG. 95 in Section 4.0 is invoked 27005. Upon return from the above process, the FIGPUT Process described in FIG. 48 is invoked 27006. Upon return from the above process, the number of Filetypes and invalidated models is stacked 27007, the process returns 27008 to the caller.

The FIGPUT Process FIG. 48. This process is used by the QRSUPPUT process to handle FileGroups.

First, a query 27101 is made to get all the entries from the FILE_GROUP table in the Control Repository.

For each FileGroup entry: A check 27103 is made to determine if the FileType matches a Subordinate FileType. If not, a check 27110 is made to determine if it is a required subordinate FileType. If so, an error message is issued 27111 the process returns 27112 to the caller with Return code=12. If the FileType matches a Subordinate FileType, a query 27104 is made to get the LEVELS table entry from the Control Repository. Next, a check 27105 is made to determine if the Level entry was found. If not, an error message is issued 27111 the process returns 27112 to the caller with Return code =12. If so, a check 27106 is made to determine if the level is PUT-able. If not, an error message is issued 27111 the process returns 27112 to the caller with Return code=12. If so, a query 27107 is made to get reference numbers for the FILE and FILE_LOG entries. Next, an entry is inserted 27108 into the FILES table in the Control Repository. Then, an entry is inserted 27109 into the FILES_LOG table in the Control Repository. Next, the FILEDELA Process described in FIG. 49 is invoked 27114. Upon return from the above process, the RECMOD1A Process described in FIG. 92 in Section 4.0 is invoked 27115. Upon return from the above process, the RECMOD3A Process described in FIG. 95 in Section 4.0 is invoked 27116. Upon return from the above process, a check 27117 is made to determine if there any more FileGroup entries. If so, the process flows back to 27102. If not, the process returns 27718 to the caller. If the FileType is not a required Subordinate, a check 27713 is made to determine if the Purge flag is set. If not, the process flows back to 27117. If so, the FILEDELA Process described in FIG. 49 is invoked 27119. Upon return from the above process, a check 27120 is made to determine if a file was deleted. If not, the process flows back to 27117. If so, any associated REC_FILES table entries are deleted 27121 from the Control Repository. Then, the Subordinate FileType deleted is pushed 27112 on the stack and the process flows back to 27117.

The FILEDELA Process FIG. 49: This process is used by the QRSUPPUT process to delete an old file at the PUT level.

After initialization, a query 27201 is made to determine if there is an old file at the PUT level. If not, OREF is set 27207 to zero and the process returns 27208 to the caller. If so, the FILES table entry is updated 27202 setting the Obsolete flag. Next, a query 27203 is made to get a reference number for a FILE_LOG entry from the Control Repository. Then, a entry is inserted into the FILE_LOG table in the Control Repository. Next, any PEDIGREE table entries for this file are deleted 27205 from the Control Repository. Then, any CRITERIA_EXCEPTION table entries for this file are deleted 27206 from the Control Repository. Next, the QRMDLDEL Process described in FIG. 58 in Section 3.0 is invoked 27209. Upon return from the above process, a check 27210 is made to determine if there was a problem. If so, the process returns 27213 to the caller. If not, a check 27211 is made to determine if a model was deleted. If so, the informational message flag is set 27214. In either case, the process returns 27212 to the caller.

The PUTA Process FIG. 50: This process is used by the QRSUPPUT process to do the PUT process.

First, a query 27301 is made to get the PUT level data from the FILES table in the Control Repository. Next, a check 27302 is made to determine if the level information was found. If not, an error message is issued 27308 the process returns 27309 to the caller with Return code=12. If it was found, a check 27303 is made to determine if the level is PUT-able. If not, an error message is issued 27308 the process returns 27309 to the caller with Return code=12. If so, a query 27304 is made to get the pre-allocated entry from the FILES table in the Control Repository. Next, a check 27305 is made to determine if it was found. If not, an error message is issued 27308 the process returns 27309 to the caller with Return code=12. If it was found, a check 27306 is made to determine if the Filename, Level and FileRef match. If not, an error message is issued 27308 the process returns 27309 to the caller with Return code=12. If so, a query 27307 is made to get a reference number for a FILE_LOG entry from the Control Repository. Next, the FILES entry is updated 23710 in the Control Repository. Then, the an entry is inserted into the FILE_LOG table in the Control Repository. The process then returns 27312 to the caller.

Our Aggregation Manager for a Data Management System (3.0)

Our Aggregation Manager provides a process for creating, modifying and tracking aggregates of data in a Data Management System running in a client server environment and is part of our overall Computer Integrated Design Control System, but can be organized as a separate Data Management Systems Aggregation Manager, so we will describe this part as applicable to a Data Management System. Our Aggregation Manager provides the process functions set forth in our Design Control System Section 1.8, and interacts with the other processes we have described. Specific aspects of our process flow for our Aggregation Manager which we described are shown in FIGS. 57 through 77.

Elements of the system may exist on a homogenous computer platform, or the elements may be scattered across multiple platforms. The Data Management system may incorporate processes for hardware design, software development, manufacturing, inventory tracking, or any related field which necessitates execution of repetitive tasks against multiple iterations of data in a quality controlled environment.

The present Aggregation Manager permits a user or a third party tool to create an aggregate collection of objects, encompassing those used as a Bill of Materials. In our preferred embodiment these objects are files residing in a Data Management System, but one skilled in the art could apply this definition to other types of data such as results, database tables, or any items that can be identified, tabulated and tracked by some organizational means. The remainder of this text refers to an aggregate collection by the simple pseudonym of Model.

By definition a Model consists of one master or Anchor and one or more members or Components. In our preferred embodiment, the anchor and components are pieces of data in the DMS. The components can belong to any level and version of any library in the DMS, and they are not restricted to the same library, level and version as the anchor. In addition, the members can consist of multiple data types, including data generated by disparate tools. Each component is labeled as an input or output in relation to the anchor file.

In general our model comprises one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said such component acting as one anchor and further consisting of one or more associated components each of which is a data object in said data management system. In accordance with our invention our components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file.

All components of a model are either static (and thus does not move through said data management system but is tracked by the system) or dynamic (and moves through said data management system with its associated model as part of an action of promoting a model when a model is promoted, a dynamic member being labeled as an input or an output with respect to its associated anchor).

Anchors are always dynamic and they themselves can be dynamic members (input or output of another anchor) or a hierarchical BOM.

Components may be dynamic or static. If they are dynamic they are classified as input or output files and they move with the BOM during a promote. If they are static, they are called "support" objects and they don't move. All components (dynamic or static) cause BOM invalidation if they are modified or deleted.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

Our Aggregation Manager permits hierarchical Models whereby a component of one BOM may in fact be an anchor to a different Model. There is theoretically no limit to the levels of hierarchy supported by our Aggregation Manager. Once again these components can belong to libraries, levels and versions other than that of the top-level Model.

Models can be created by interactive data entry on the part of the user, by importing a text file listing all the members of the Model in a prescribed way, or by an innovative library search feature. This mechanism provides an expedient and convenient way to search through a Data Management System for a particular type of data residing at or above a given control level. This features permits the user to quickly build large Models with hundreds or thousands of members. Furthermore, an Application Program Interface allows third party tools to couple the library search mechanism with the file importing scheme to automatically create Models as an extension of the process.

Upon creation of a Model our Aggregation Manager provides continuous tracking of the anchor and the components. To begin with, the present Aggregation Manager incorporates powerful algorithms which monitor all the members of all the Models in real time. If any member is overlaid with a modification, or deleted altogether, an immediate notification is sent to the owner of the Model. This notification clearly states the Model being invalidated, the member which caused the invalidation and time-date information for providing an audit trail. In addition to simple Models, these algorithms will traverse Model hierarchies and notify the owners of all Models affected by disturbance of any lower level member. Our Aggregation Manager also permits the Models themselves to move through the Data Management System. In a similar fashion to ordinary file movement, Model movement which disturbs another Model will result in the proper notification.

The present Aggregation Manager also permits the Aggregate Manager to interact with the Library Manager, Process Manager, and Lock Manager in order to promote an entire Model of files through the DMS, initiate Library Processes against a Model or set Move and Overlay locks on an entire Model. This facilitates data management of large inventories of objects which require identical actions to a group of pieces.

Our preferred embodiment interacts with the Authority Manager to control who can create Models and who can promote them through the DMS. Model Create and Promote authority can be granted in a broad fashion where a user can create and move any Model in the system, or a user's authority can be restricted down to a specific library, level, version and type of data. Our Aggregation Manager also includes utilities to delete Models, delete components of an existing Model, transfer ownership of a Model to another user, incrementally add new members to an existing Model, and view the current status of the Model. If the Model is invalid, the utility clearly indicates which members are invalid with time-date information regarding the invalidation. An authorized user can even override an invalid Model and reset the status back to valid.

Our Aggregation Manager provides a means to create, modify and track an aggregation of items hereafter referred to as a Model. In the preferred embodiment, a Model consists of one Anchor and one or more Components. Together, the Anchor and Components comprise the members of the Model and they all reside in the DMS using our PFVL method.

Our Aggregation Manager contemplates interaction with our Library Manager to permit Models to be promoted through the DMS. This provides a means for moving large volumes of data through a data management system with high performance. Additionally, the present Aggregation Manager also contemplates interaction with the Authority Manager to provide a means for authorizing users to create and/or promote Models in the DMS. These authorities are controlled by the Data Manager using the DMS configuration utilities. The Aggregation Manager also interacts with the Lock Manager to permit a user to lock an entire Model with a single invocation.

Additionally, our Aggregation Manager permits Automated Library Processing to be executed against a Model, whereby the Anchor can be subjected to any Library Processing available to regular data objects. The Process Manager treats the Anchor like any other file thus permitting it to attain process results which must meet pre-defined promotion criteria.

All Components of a Model are either static or dynamic. A dynamic component is one that moves through the DMS with the Model as part of a Model promote. A static member does not move through the DMS, but it is tracked like all other members. Dynamic members are denoted by an I or O flag for Input or Output data with respect to the Anchor. The Anchor is denoted by an A flag and static members are denoted by S flags.

Models can be created interactively by authorized users or in the background using the Application Program Interface provided by the Aggregation Manager. Once created, the Aggregation Manager continuously tracks the Model and allows the user to modify it by adding members, deleting members, changing the status or deleting it. Anchors of one Model can be a Component of another Model, thereby creating hierarchical models.

The preferred embodiment contains a collection of Model Management Utilities arranged under a hierarchy of menus. FIG. 75 illustrates the main screen with Main Menu Bar, 72910, at the top. This menu bar affords the user the chance to Exit and also provides on-line Help, which is presented through one or more subsequent screens. Directly under the Main Menu Bar lies the primary window which consists of fields 72911–72915. Field 72911 is the Name of the model which is identical to the name of the data object serving as the anchor. Field 72912 is the Library or Package where the anchor resides. Drop down menu button 72917 displays a list of all known libraries in the DMS. Field 72913 represents the Type of data object. In our preferred embodiment, this would be the file type of the anchor file. Drop down menu button 72918 displays all installed data types in the Package. Fields 72914 and 72915 are for the user to enter the Version and Level of the anchor, respectively. Drop down menu buttons 72919 and 72920 present a list of available Versions and Levels for the Package.

The lower portion of the screen depicts radio buttons, 72923, which offer the user three operations related to Models. The first button permits the user to Delete the Model. This function can only be performed by the owner of the Model or the Data Manager. Upon selecting this function, a subsequent dialog box permits four possible operations by way of two optional push buttons. They are:

Anchor This results in the removal of the Model and the deletion of the Anchor data object from the library.

Files Results in the removal of the Model and all Component data objects.

Pushing none of the buttons results only in Model deletion with all data objects remaining in tact in the DMS. Pushing both buttons results in the Model and all objects comprising the model to be deleted. Upon hitting enter, the program will automatically check for, and invalidate, any higher level Models which is comprised of this Model. The user is always given the opportunity to cancel prior to deletion of the Model. Model and component deletion are performed respectively by the QRMDLDEL and QRMFIDEL routines described in FIGS. 58 and 72.

The second option is for Editing or Viewing an Existing Model. Selection of this button reveals FIG. 77 which depicts Menu Bar, 72926, at the top. It offers the following selections: File, Return, Filter, Owner, Status, and Help. Below the Menu Bar is the Model information fields, 72927, which display the current Model Owner and Model Status. Under fields 72927, is the header information, 72928. This field denotes column headings for the Model information depicted in field 72929. Field 72929 displays one record for each member of the Model. The top record is the Anchor file of the Model, and the remaining records are the Components, any of which may be an Anchor to a lower level Model. Each record consists of the object Name, Data Type, Library, Version, Level and Status. Just to the left of the Name is a single character denoting the relationship to the Model. It may be:

Anchor of a Model

Input of the Model denoted by the Anchor above it.

Output of the Model denoted by the Anchor above it.

Static member of the Model denoted by the Anchor above it.

Figure 73:
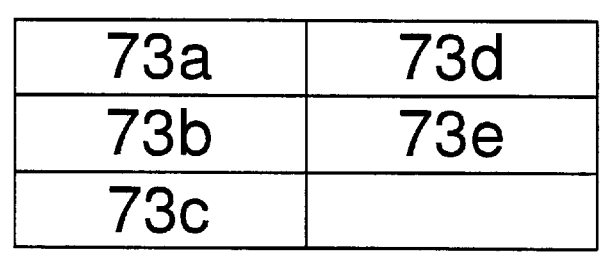

Field 72929 also serves as a line editor to permit the user to perform editing functions on individual members of the Model such as deleting them, using QRMFIDEL or changing the status via the QRMFIMOD routine described in FIG. 73. The removal of a member or, conversion of a status to Invalid, would result in the overall Model status converting to Invalid. Additionally, detailed information may be previewed for Anchor records such as number of Components, and the level at which the selected Anchor resides in the overall Model hierarchy. Our preferred embodiment entails using single character commands typed on the desired line number, in order to invoke the proper action. However, one skilled in the art could appreciate how other means such as cut and paste, selection using a pointer device such as a mouse, and/or menus or tool bars could be used to achieve the same means. Scroll bars 72930 and 72931 are present to permit the user to view additional records which may not fit on the screen, or the remainder of records too wide to fit on the screen.

Additional functions are provided on Menu Bar 72926. Upon selecting Filter, the user is presented with a dialog box offering radio buttons to select either Hierarchy or No Hierarchy. These buttons determine whether the model information is displayed in Window 72929 with all Anchors and Components or just the Anchors. There's also a push button to select Indented display which formats the output in a manner such that every hierarchical level of the Model is indented. Additionally, push buttons exist to allow the user to format the display information. These buttons are used to display any combination of our PFVL with the following:

Name

Type

Library

Version

Level

Status

Reason for Invalidation

Time Stamp of Invalidation

User Causing Invalidation

File Reference Number

Model Reference Number

Our preferred embodiment also includes a field where the user can specify the Maximum Number of Levels displayed on the screen. Upon hitting enter, the display window 72929 is immediately updated.

The user may also select Owner from menu bar 72926 to change the Model ownership. This results in a dialog box showing the current owner in an editable field. The user may fill in a new user and upon hitting enter, the program will verify that the user is the owner. If so, it will switch the ownership. The user may also select Status from Menu Bar 72926 in order to update the Model status. A subsequent dialog offers two radio buttons labeled Anchor Only or All Members. Upon choosing one of the options, the algorithm ensures the user is the Model owner, and proceeds as follows: if the current status is valid, it will change it to invalid. If the All Members option is selected, all Components will change to Invalid as well as the Anchor. Additionally, the program will check for any higher level Models which contain this Model. If any are found, the user is warned, as they will be invalidated upon commit of the changes to the DMS. If the current status is Invalid, the program will switch either the Anchor or the Anchor and all Components to Valid depending on the option chosen. Model ownership and status is altered via QRMDLMOD and component status is changed by the QRMFIMOD routines described in FIGS. 67 and 73 respectively.

Returning to Menu Bar 72926, the File selection results in a drop down menu offering the following choices:

Save Changes Commits any edits made on the current Model to the DMS. These changes can only be made by the Model owner or the Data Manager.

Reports Offers a variety of formatted reports that can be generated for the current Model. Our preferred embodiment includes replication of window 72929 with hierarchical or non-hierarchical formatting. Additional information beyond that shown in window 72929 may also be included in the reports. Some examples are model reference numbers, date/time of invalidation, user causing the invalidation, reason for invalidation, etc. Our Aggregation Manager also contemplates the export of the report data in popular commercial spreadsheet and database formats.

Print Prints the current view in window 72929 to an attached printing device or to a file in a printer-specific format (i.e. PostScript).

Exit Leaves the utility without saving any modifications to the Model. The user must answer positively to a confirmation dialog box before the program exits.

At any time during the editing process, the user may return to the main screen in FIG. 75 by selecting the Return option on Menu Bar 72926. The user is given the opportunity to commit any unsaved changes to the DMS.

Returning to the main user screen in FIG. 75, the user may elect to create a new Model or add members to an existing Model using the radio buttons, 72923. Only authorized users can create Models, and only users who own an existing Model can add members. The only exception is the Data Manager. Upon selection of the Create/Add to Model via button, the user may also use cyclic field drop down menu 72924 to select the input method.

The first choice is via a Library Search. This results in the appearance of the user screen in FIG. 76. The top of the screen contains menu bar 72925 with choices File and Return. Return may be used to leave this function and return to the main screen in FIG. 75 at any time. No new Models or modifications to existing Models will be saved. Upon selecting File, the user is presented with a drop down menu with the choices Commit and Exit. Commit is the means for the user to communicate to the DMS that the data selected from the library search should be permanently added to the model. Exit allows the user to completely exit the Model Management Utilities at any time. The user is given the opportunity to commit any unsaved work.

The main portion of the screen in FIG. 76 is comprised of data entry fields 72912 thru 72915 with supporting drop down menu buttons 72917 thru 72920. These serve the identical purpose to those found in FIG. 75, but they are used to select the members of the Model. The program interacts with the Search Manager to invoke a library search using the data entered in fields 72912 thru 72915. This data can be entirely different from that entered in fields 72912 thru 72915 of FIG. 75. Hence, a Model in one Library, Version, Level and Filetype can contain members of a completely different Library, Version, Level and Filetype.

The only option on FIG. 76 is push button 72940. This permits the user to explicitly request that any selected data be Added to the Existing Model. In certain instances the user is already aware of an existing Model to which additional members are desired. The presence of this button allow positive confirmation in advance, thus avoiding a subsequent warning dialog box.

Upon filling in all the information and hitting enter, the program embarks on the library search and presents a selection screen with all the data that was located. The user may select as many items as desired. The selection is performed by placing one of the following characters (I O S A) next to the desired data object to denote it as an Input, Output, Anchor, or Static member. Upon hitting enter, the following algorithm is implemented. If no Model identified by the main screen in FIG. 75 exists, then it's assumed that the user is creating a brand new Model. Thus, the program expects push button 72940 to be deselected. If those assumptions are satisfied, the program proceeds to create the new model. On the other hand, if push button 72940 is selected, this indicates the user believes a model exists that really doesn't. Therefore an error message is displayed and the user is given the opportunity to quit or have the new model created.

If a Model identified by the information in FIG. 75 does exist, the program assumes the user is adding new information. Therefore, it expects push button 72940 to be selected. If so, then the program proceeds with adding the selected data objects to the Model. If push button 72940 is not selected, the user is presented with a dialog box indicating two possible choices via mutually exclusive radio buttons.

1. Since a Model already exists, the user may add the selected data objects to it by pushing this button.
2. The user may elect to replace the existing Model with a brand new one comprised only of the selected data objects. This is permitted by this button.

Note: During the creation of the model, the program ensures that if an Anchor was identified, it's the same one denoted by FIG. 75. Otherwise, an error condition ensues, and the user is told that the Model may not possess multiple Anchors.

The user may utilize FIG. 76 multiple times to perform different library searches and accumulate a list of members which can be committed to the DMS at any time by selecting the File, Commit selection from menu bar 72925 on FIG. 76. Each time a library search is invoked, the program requests the Control Repository to return the File Reference numbers as part of the search results. These numbers are used to drive the actual Control Repository queries responsible for updating the Models.

The second method of inputting data into a Model is via the ASC List selection on cyclic field menu 72924 of FIG. 75. Upon hitting enter, the user is presented with a dialog box requesting the name of a formatted text file like the one shown in FIG. 78. Our preferred embodiment uses the following format, although one skilled in the art would clearly see that the same information can be conveyed to the program in numerous other formats. FIG. 78 indicates five records to show a sample Model containing an Anchor in Record 72951 and four Components in records 72952 thru 72955. Our Aggregation Manager supports any number of records, and the Anchor is not required to be listed first. The preferred embodiment shows each record comprising the same format which consists of six or seven tokens. The first six tokens are required and represent:

Name of the object
Type of the object
Library
Version
Level
I O S A flag

The seventh token is a File Reference number and it's optional. In certain instances, especially those involving creation of Models through third party tools, a File Reference number may be provided to improve performance. All records must have six tokens, and any record may have the seventh token.

Once the user has specified the name of the text input file, the program immediately begins processing it. If it encounters any Anchor records, they must match the Model identified in main menu FIG. 75, otherwise it's an error and processing aborts. If a Model already exists, the user is given the opportunity to replace or append the information in the text file to the existing Model.

Since the file may contain a mixture of records with and without File References, the underlying algorithm performs intelligent querying of the Control Repository to improve performance. In cases where File References are provided, no query is necessary since the File Reference number is the type of identifier required for creating Models or adding members to Models. For all records where the File Reference token is absent, the algorithm groups them by Package, Version, Level and File Type. It invokes separate queries for each PFVL, but a single query within a PFVL can return a list of all File References for that PFVL. The program filters the list to find the matching members and saves the File Reference number into a data structure. To further improve performance, if a given PFVL has only a small number of members (i.e. five or less), then separate queries are done on each member as opposed to one giant query for the overall PFVL. Our preferred embodiment uses a threshold of 5 to determine the cutoff between one giant query and multiple smaller queries, but the number is really a function of the embodiment's environment, implementation of the Control Repository, bandwidth, size of user community, etc. Once the File Reference numbers are obtained for all the data objects in the list, the program proceeds with updating the DMS automatically.

Returning to FIG. 75, the user's third method for inputting Model data is via the Data Entry choice on cyclic menu 72924. This results in a simple data entry screen where the user must interactively type in the same information which is provided by the text file method previously described. In our preferred embodiment, the information is entered in the same format as FIG. 78 which enables the same algorithm to process it. If the user has File Reference numbers on hand, they can be entered as optional seventh tokens. Once the user finishes typing all the desired records into the data entry screen, a Commit button is provided to install the modifications into the DMS. Once again, if an Anchor is detected, it must match the Model identified in FIG. 75. Also, if a model already exists, the user is given the opportunity to replace it or append the information to it.

Regardless of the method of inputting Model data (Library Search, ASC List, or Data Entry), the program proceeds identically from this point on. In the case where the current Model is replacing an existing one, the following 3 steps are performed:

1. A query is made to the Control Repository to delete the old Model first using QRMDLDEL in FIG. 58.
2. The new Model is created using QRMDLADD in FIG. 57.
3. Depending on the number of components, either QRMFIADD described in FIG. 71, or QRSUPMFI, described in FIG. 74, is used to add all the members.

Note: QRSUPMFI is a high performance method for adding multiple components with a single query.

In the case where a new Model is being created, and no Model with the same name exists, only Steps 2 and 3 are executed. Finally, if members are being added to an existing Model, only Step 3 is performed. In all three cases, Step 3 is a special high performance query which allows a theoretically infinite list of File Reference numbers to be passed to the Control Repository using a single invocation. The list consists of a File Reference/IOSA pair separated by a special delimiter. This arrangement permits large Models to be created in a timely manner without causing severe bottlenecks at the Control Repository.

In addition to interactive use, our Aggregation Manager allows all of the aforementioned Model Management Utilities to be executed from a command line or called by a third party tool. An Application Program Interface exists to allow every action that can be initiated interactively. Some additional parameters exist to enable the calling routine to instruct the Model Management algorithms on how to handle cases where user interaction may be required. For example, a parameter can be passed to instruct the program to automatically delete any old Model found during the creation of a new Model. The ability to be exercised by a third party tool makes the Aggregation Manager a powerful data management addition to tools such as hierarchical design systems.

When a Model is created, it begins with a Valid status. Our Aggregation Manager incorporates algorithms which constantly track the status of all Models in the DMS through the use of tables in the Control Repository. The algorithms automatically invalidate a Model if any member is overlaid or deleted from the DMS. The Aggregation Manager automatically notifies the owner of the Model via electronic mail of the invalidation. The owner receives information containing the identity of the Invalid Model, the date and time of the invalidation, the reason and the user who caused it.

This following describes the processes that support the Aggregation Manager functions in Data Management Control Utilities. The processes are depicted in FIGS. 57 to 74. To support these processes the Aggregation Manager maintains the following tables in the Control Repository.

TABLE 17

MODEL - Model components

| Column | Description |
|---|---|
| REF | Reference number |
| ANCHOR_REF | File reference of anchor file of model |
| OWNER | Userid of owner of the model |
| INVALID | Y=model is invalid |
| INVALIDATOR | Userid causing invalidation |
| DATE | Date when invalid flag set |
| TIME | Time when invalid flag set |

TABLE 18

MODEL_FILES - Mapping of files to a model

| Column | Description |
|---|---|
| REF | Reference number |
| MODEL_REF | Pointer to model |
| FILE_REF | Pointer to file |
| IO_FLAG | I = Input file; O = Output file; S = Support file |
| INVALID | Y = file is invalid |
| INVALIDATOR | Userid causing invalidation |
| DATE | Date when invalid flag set |
| TIME | Time when invalid flag set |

Figure 57:
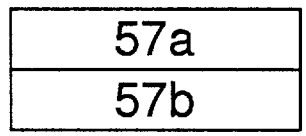
FIG. 57 shows the interconnection of FIG. 57a and 57b.
Figure 57A:
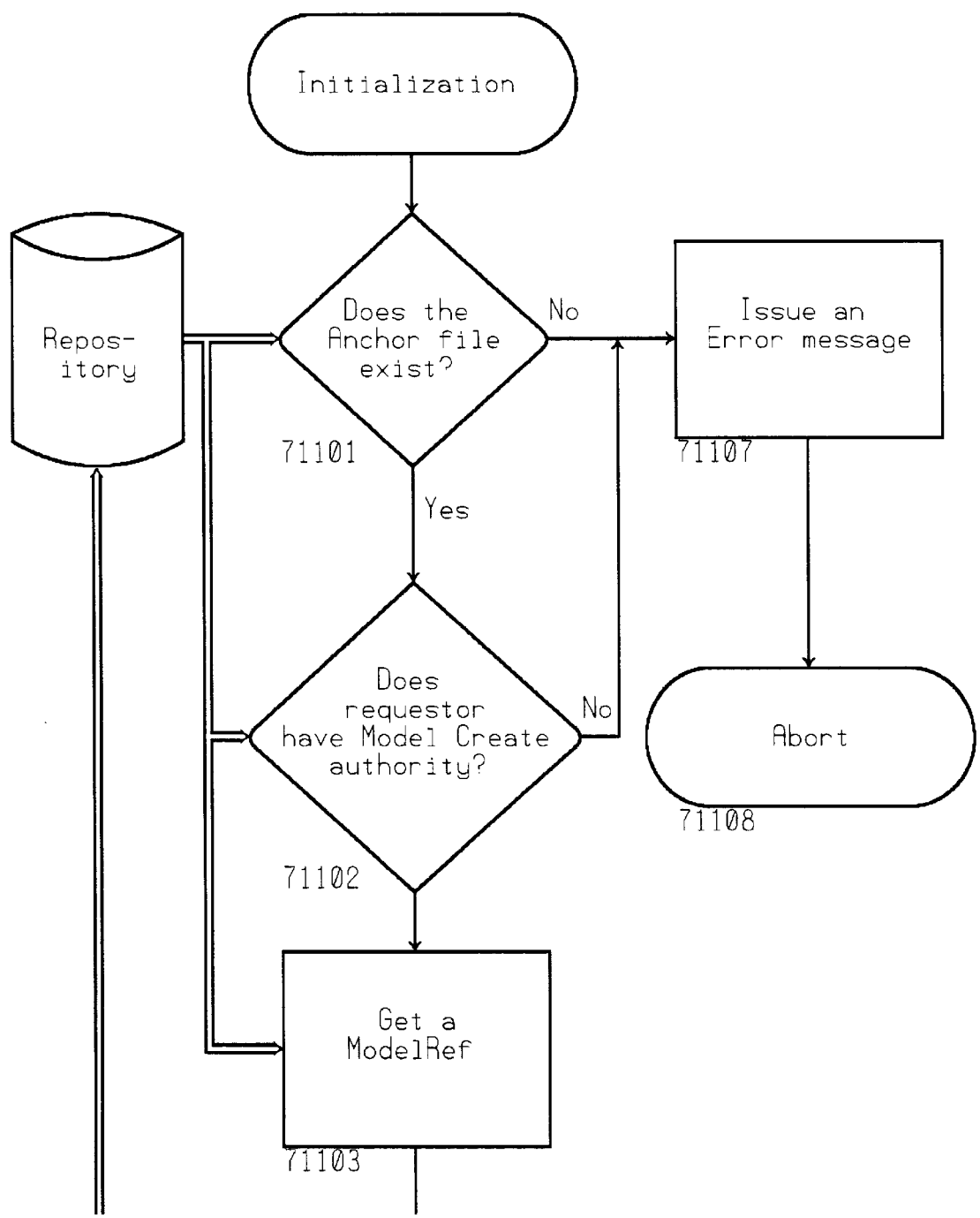
FIG. 57a and 57b describes the QRMDLADD Process.
Figure 57B:
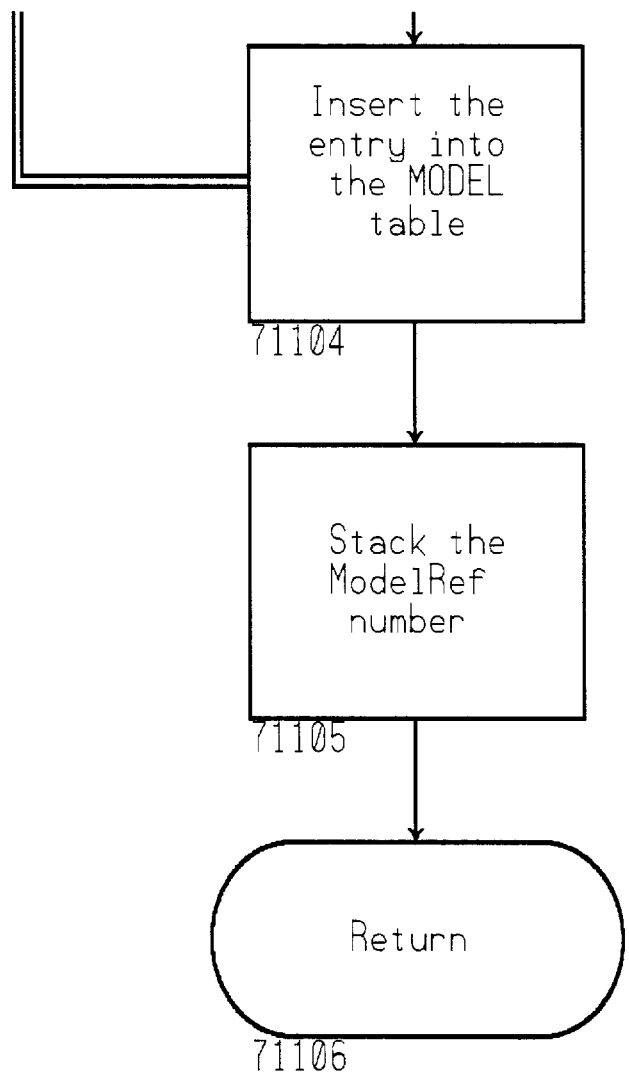

The QRMDLADD Process FIG. 57: This process is used to add a new Anchor file to the MODEL table in the Control Repository. After initialization, a query 71101 is made the Control Repository to determine if the anchor file exists in the FILES table. If not, an Error Message is issued 71107 and the process is aborted 71108. If it does exist, the Control Repository is checked 71102 to make sure that the requester has MODEL CREATE authority. If not, an Error Message is issued 71107 and the process is aborted 71108. Next a new Model reference number is obtained 71103 from the Control Repository. The new Model is then entered 71104 into the MODEL table in the Control Repository. The Model Reference number is stacked 71105 for use by the requestor, and the process returns 71106 to the requestor.

Figure 58:
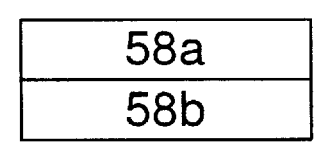
Figure 58A:
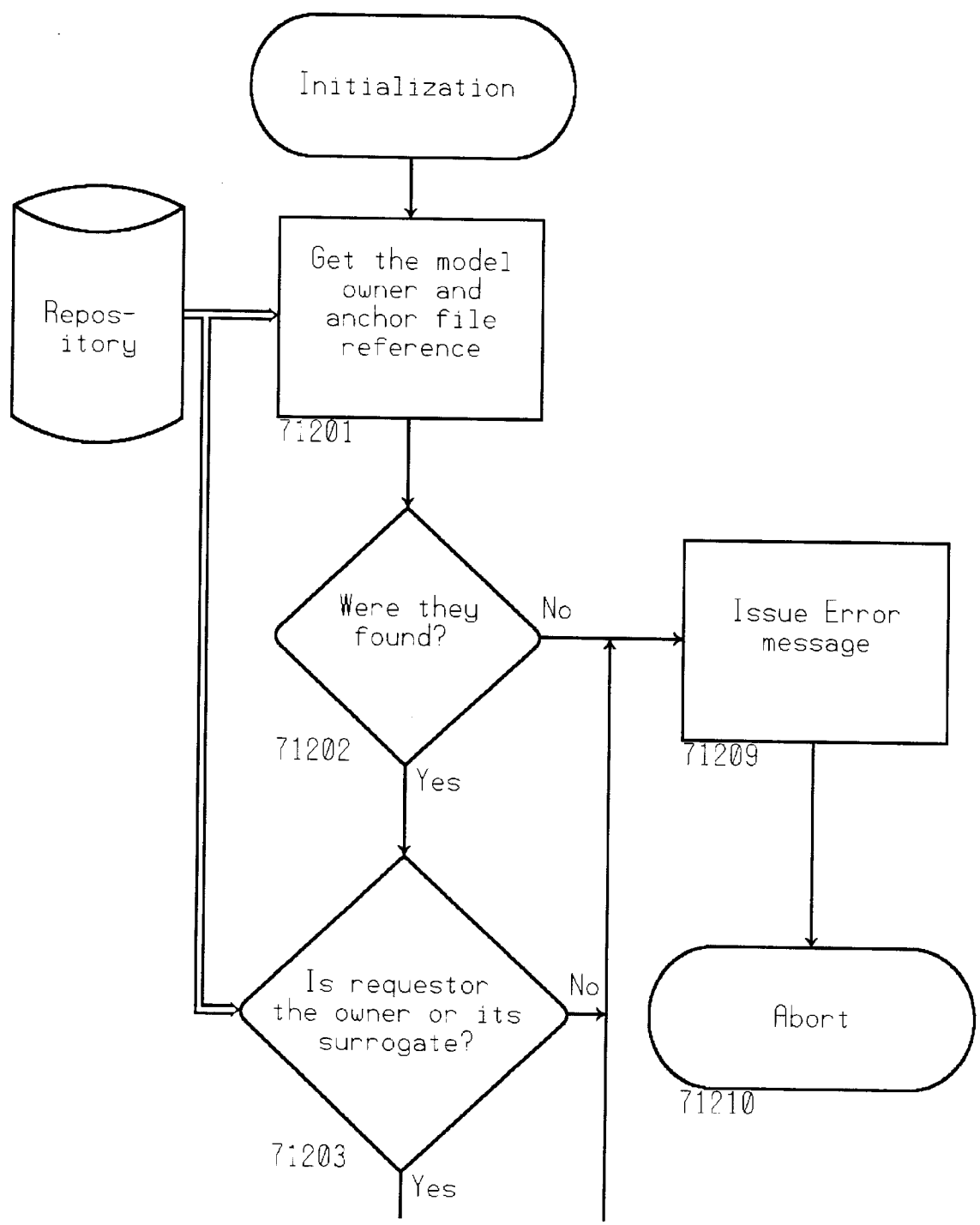
FIG. 58a and 58b describes the QRMDLDEL Process.
Figure 58B:
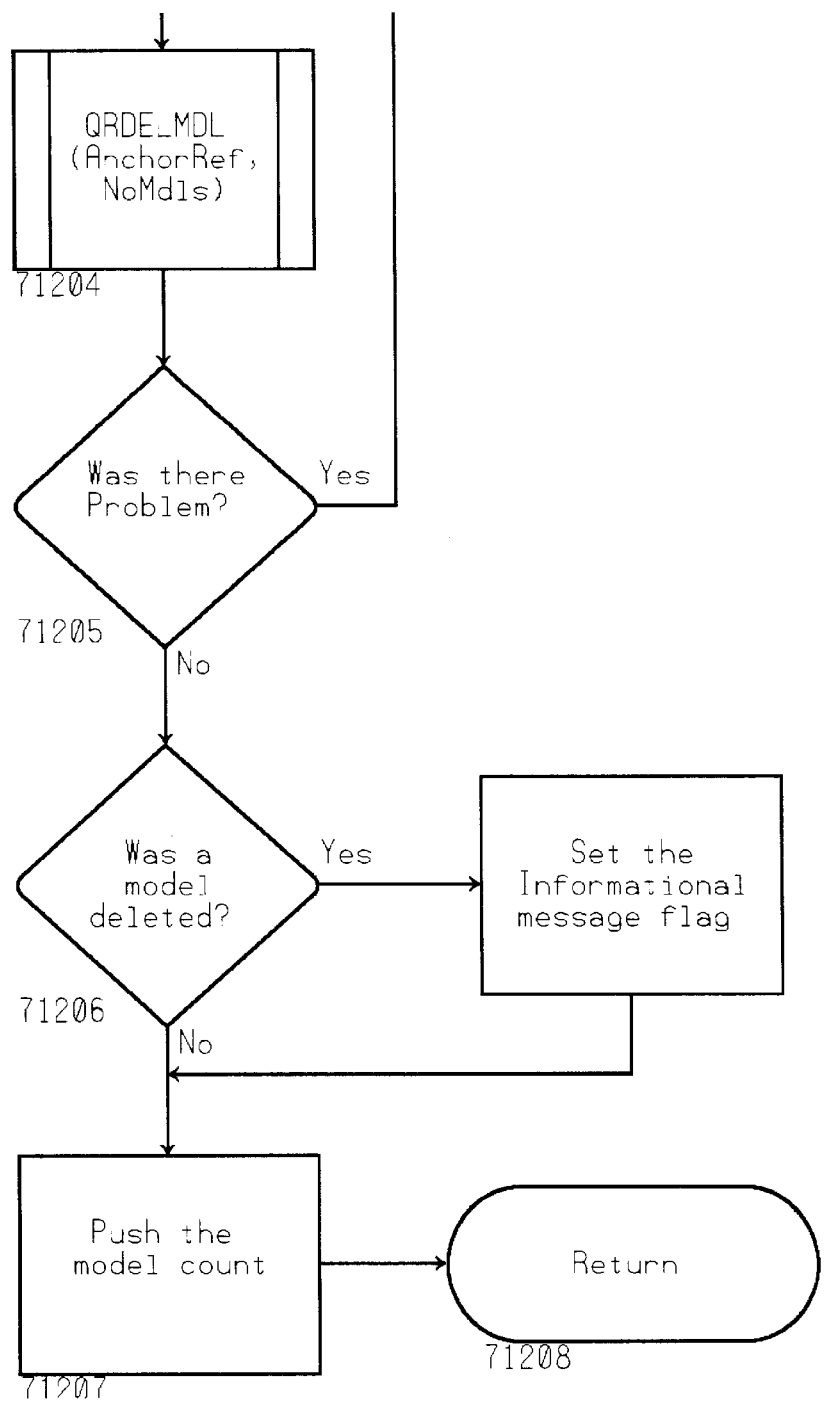
Figure 59:
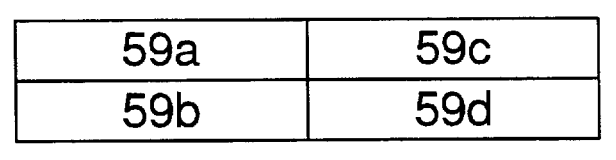
Figure 59A:
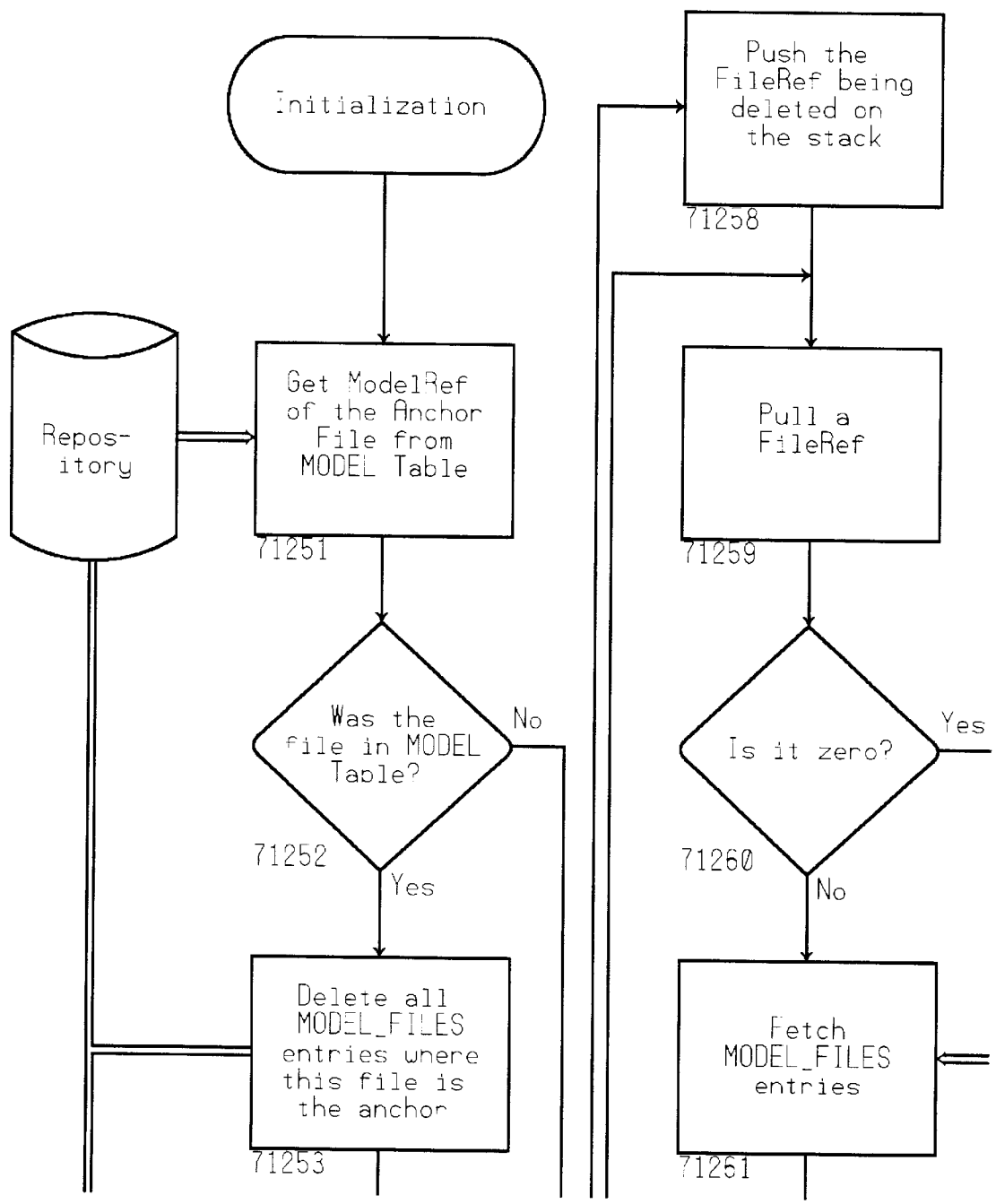
FIG. 59a thru 59d describes the QRDELMDL Process.
Figure 59B:
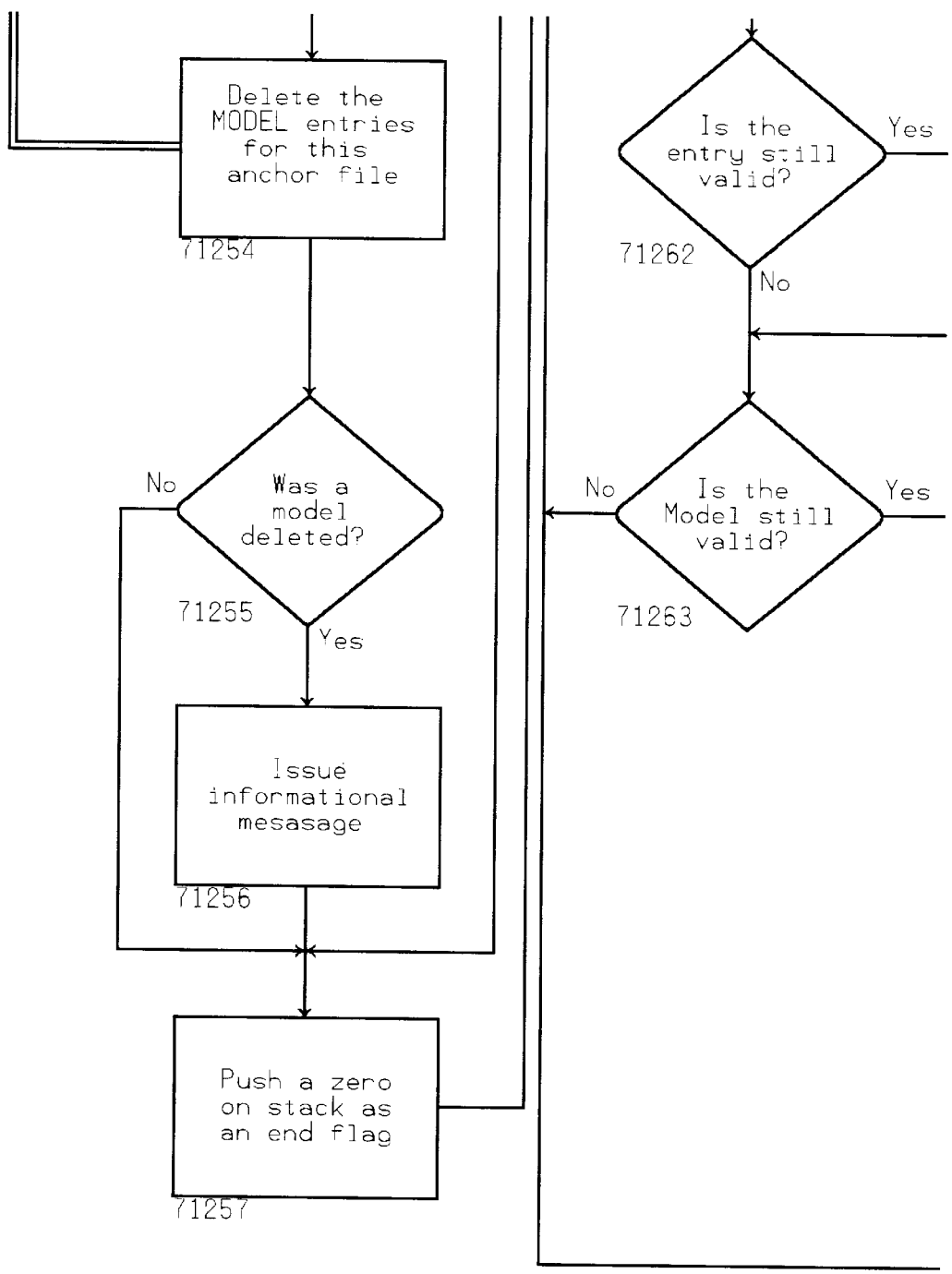
Figure 59C:
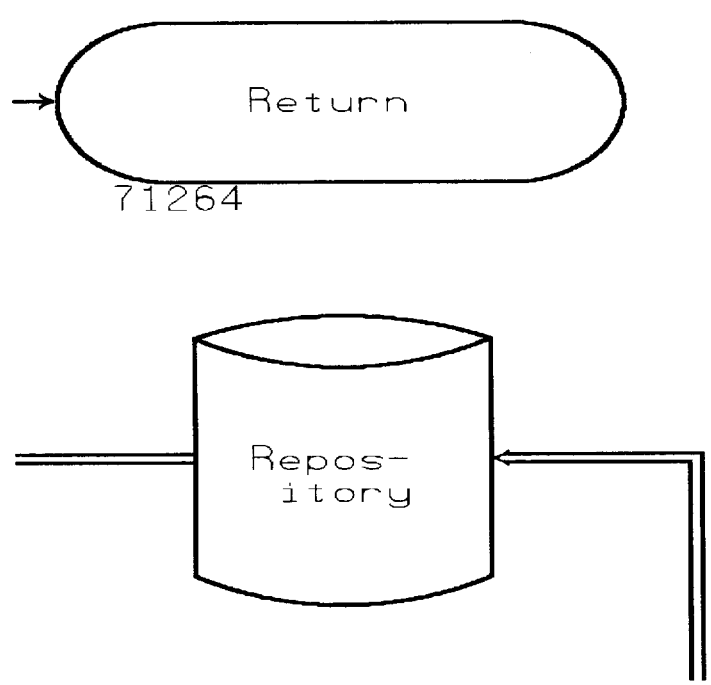
Figure 59D:
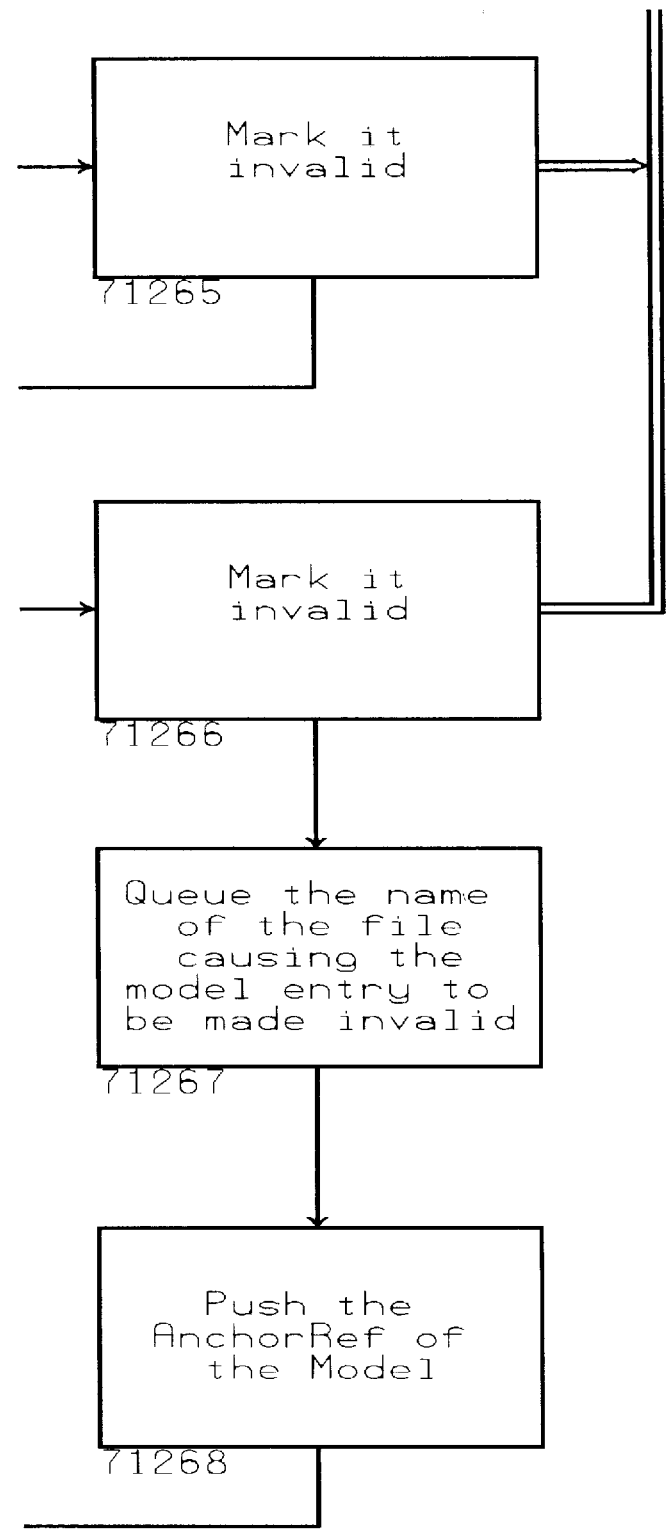

The QRMDLDEL Process FIG. 58: This process is delete an Anchor file from the MODEL table in the Control Repository. After initialization, a query 71201 is made to the Control Repository to get the Model owner and Anchor Reference. If they are not found 71202, an Error Message is issued 71209 and the process is aborted 71210. If they do exist, the Control Repository is checked 71203 to make sure that the requester has MODEL DELETE authority. If not, an Error Message is issued 71209 and the process is aborted 71210. Next 71204, the QRDELMDL Process described in FIG. 59 is invoked. Upon return from that process, a check is made 71205 to determine whether it completed with out problem. If not, an Error Message is issued 71209 and the process is aborted 71210. If it completed, without problem, a check 71206 is made to determine if a model had been deleted by the QRDELMDL process. If so, a flag is set to issue an informational message. In any case, the count of the number of models deleted is put on the stack 71207 and the process returns to the requester.

The QRDELMDL Process FIG. 59: This process receives the Anchor Reference of the model to be deleted. After initialization, a query 71251 is made the Control Repository to get the ModelRef for the Anchor file from the MODEL table. A check 71252 is made to determine if the file was in the MODEL table. If not, the process flows to 712257. If it does, all entries in the MODEL_FILES table that have the given ModelRef are deleted 71253. Next 71254, the MODEL table entry is deleted. A check 71255 is made to determine if the delete was successful. If not, an informational message is issued 71256. In any case, a zero is pushed 71257 on the stack as an end flag and then the AnchorRef just deleted is pushed 71258 on the stack.

The following steps will recursively examine all the nested model and model-files to set the invalid flags. First, pull 71259 a FileRef from the stack. Check 71260 to see if it is the zero end marker. If so, return 71264 to the caller. If not Fetch 71261 MODEL_FILES entries from the Control Repository. If the entry is still valid 71262, mark 71265 it as invalid. Next, check 71263 if the Model is still valid. If not, the process flows back to 71259 to pull a new FileRef. If the Model is still valid, mark 71266 it invalid, queue 71267 the name of the file causing the model entry to become invalid and push 71268 the AnchorRef of that Model on the stack.

Figure 60:
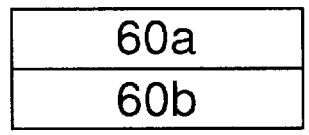
FIG. 60 shows the interconnection of FIG. 60a and 60b.
Figure 60A:
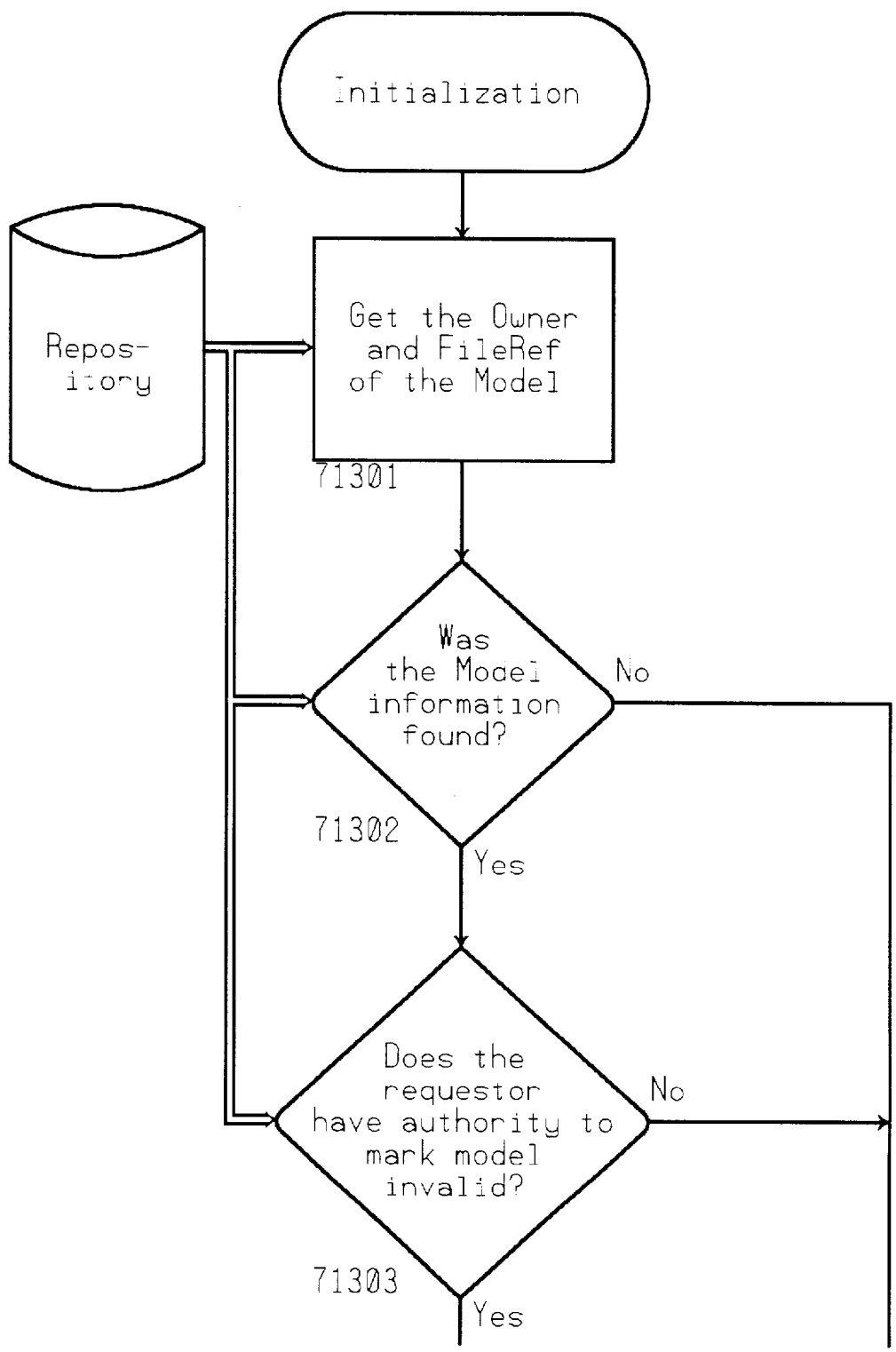
FIG. 60a and 60b describes the QRMDLINV Process.
Figure 60B:
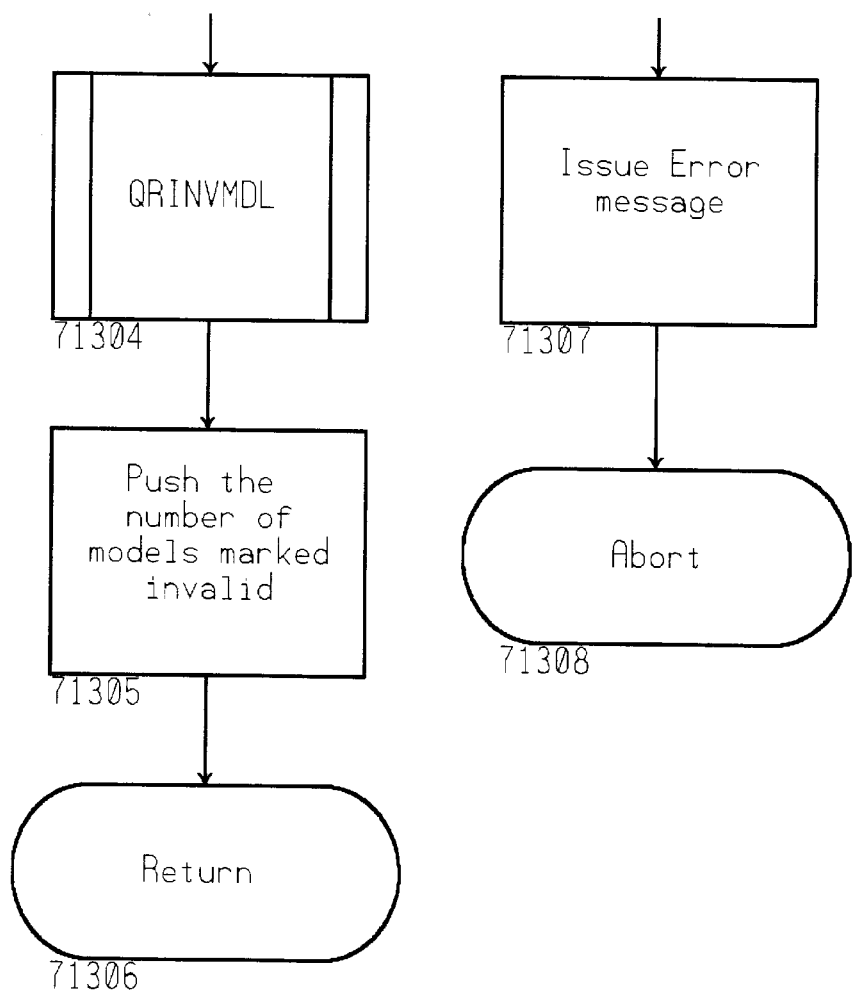
Figure 61:
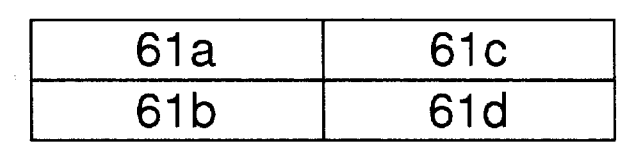
Figure 61A:
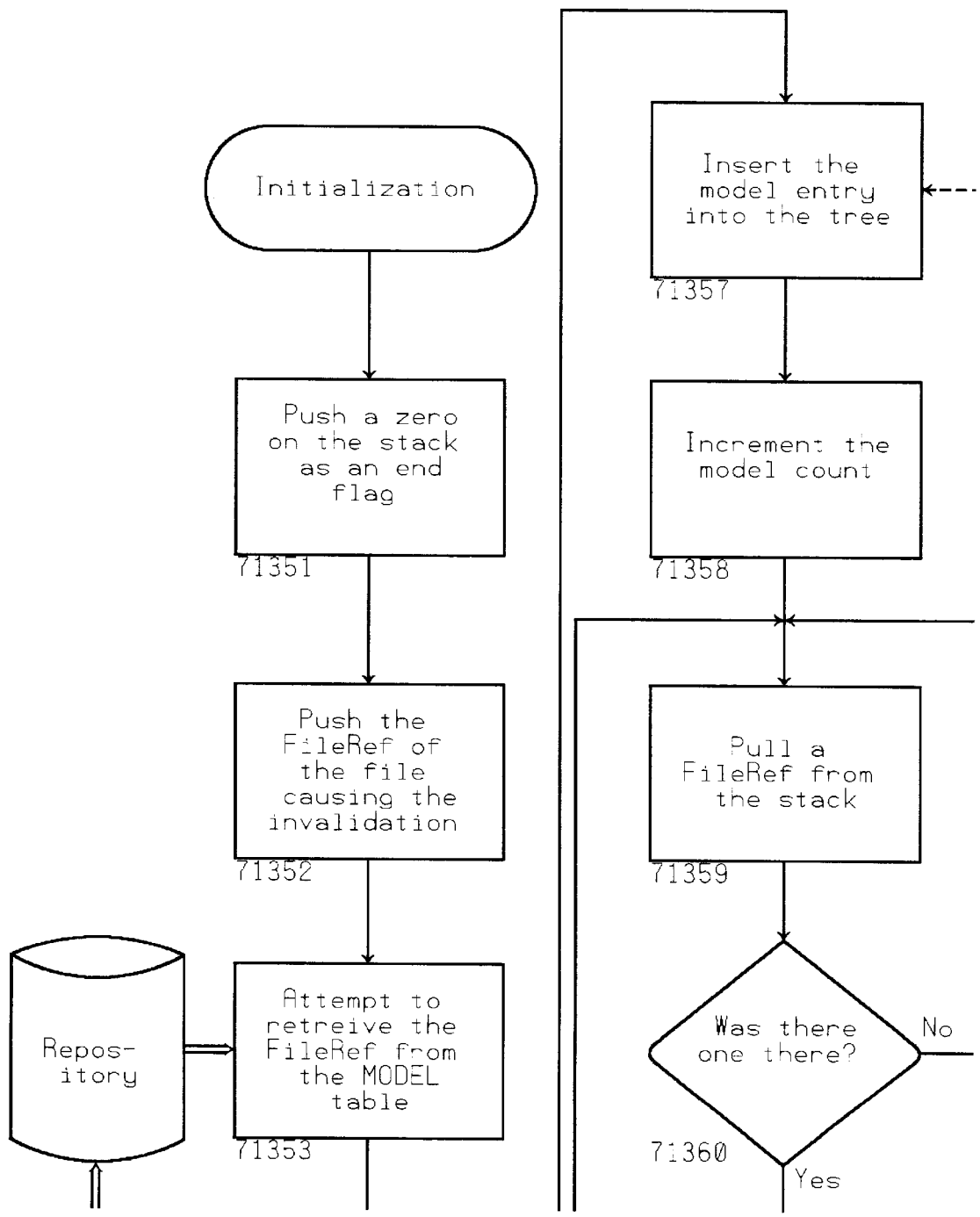
FIG. 61a thru 61d describes the QRINVMDL Process.
Figure 61B:
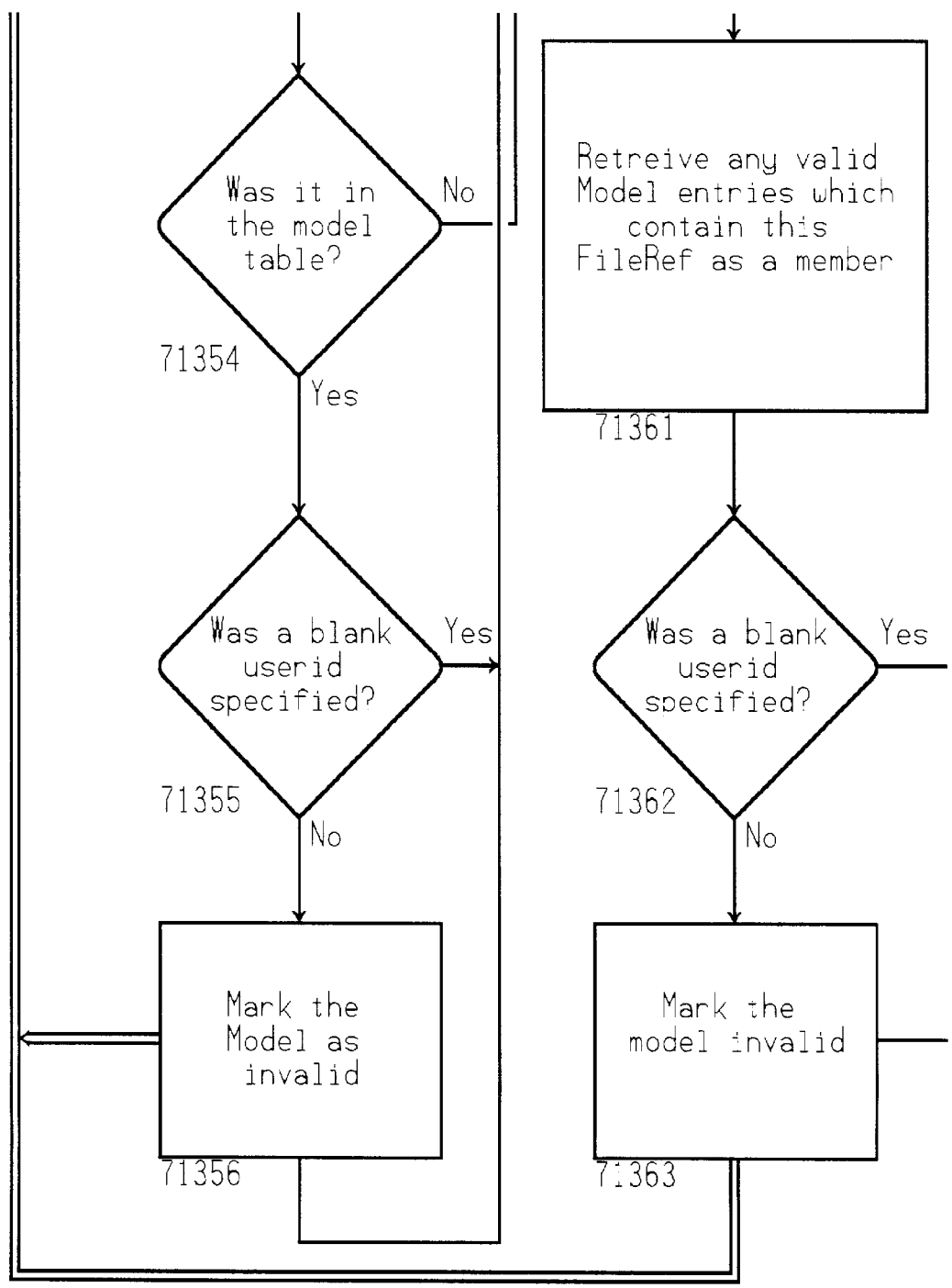
Figure 61C:
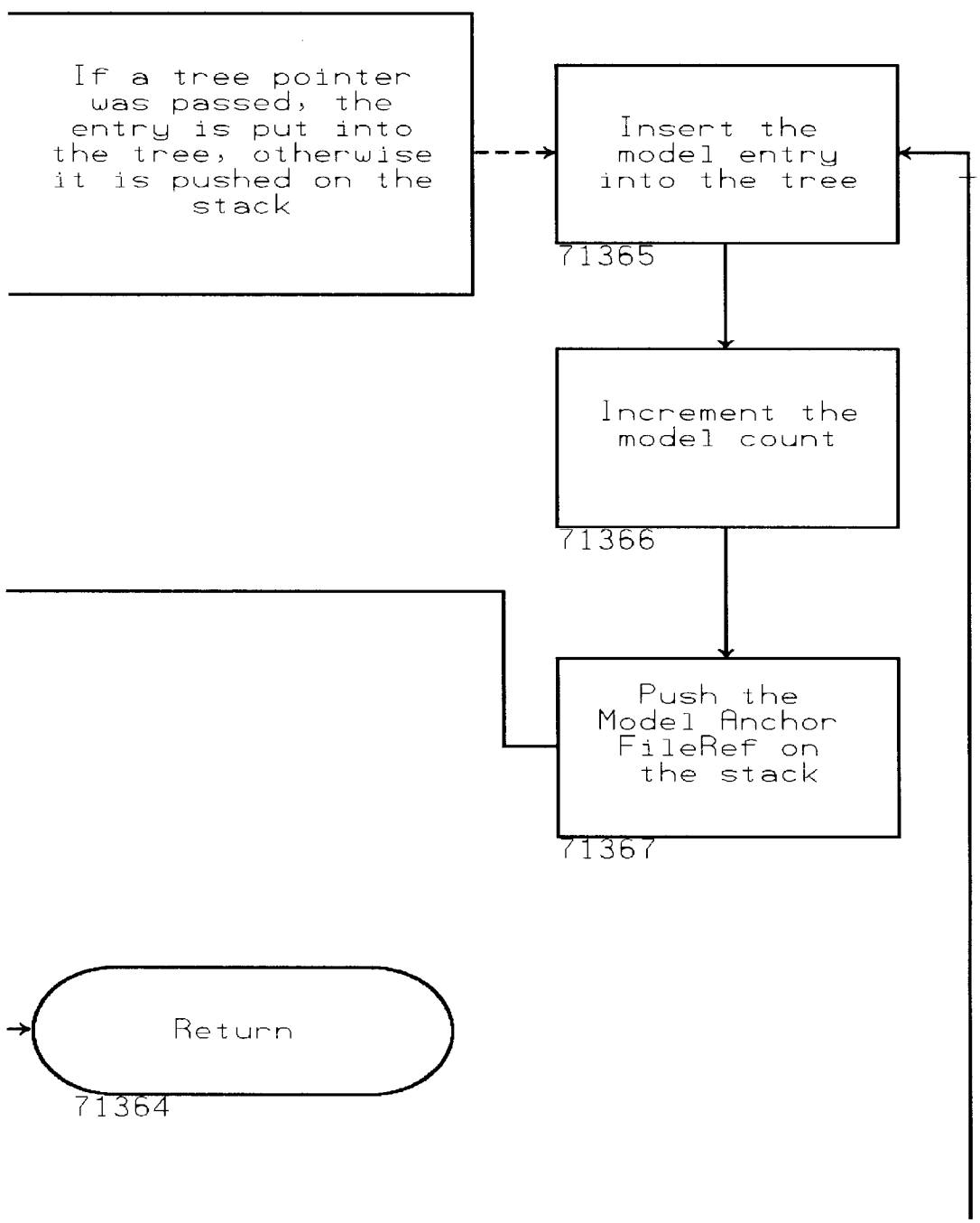
Figure 61D:
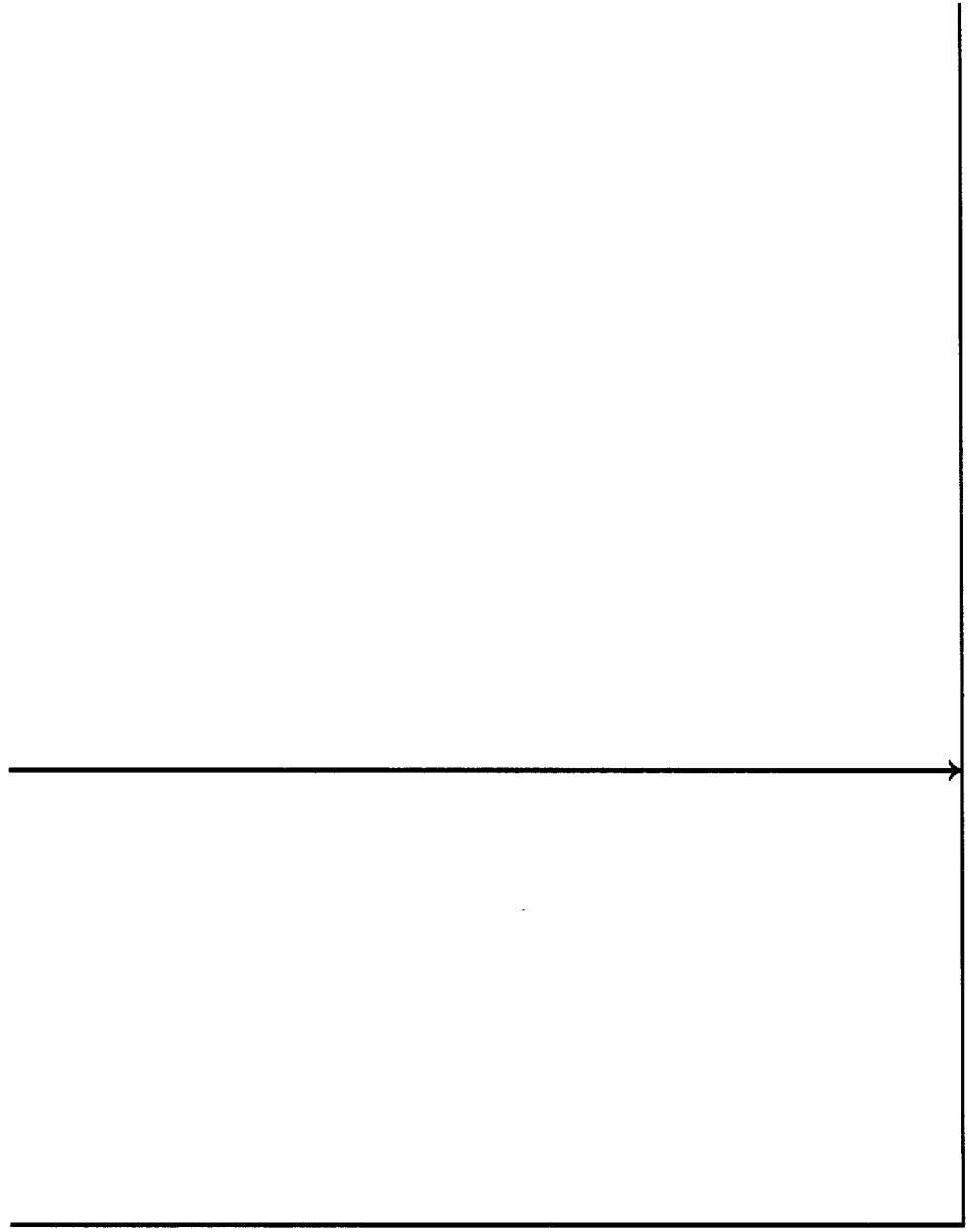

The QRMDLINV Process FIG. 60: The QRMDLINV process is used to mark a model as invalid in the Control Repository. After initialization, a query 71301 is made to the Control Repository to get the Model owner and Anchor Reference. If they are not found 71302, an Error Message is issued 71307 and the process is aborted 71308. If they are found, the Control Repository is checked 71303 to make sure that the requester has MODEL INVALIDATION authority. If not, an Error Message is issued 71307 and the process is aborted 71308. If the requestor has the authority, the QRINVMDL Process described in FIG. 61 is invoked 71304. Upon return from that process, the number of models marked invalid is pushed 71305 on the stack and the process returns 71306 to the requester.

The QRINVMDL Process FIG. 61: This process receives the FileRef of the file as well as the USERID requesting or causing the invalidation. The USERID may be specified as a blank in which case no invalidations will be made but the Model and its nested models will be traversed. In addition, a pointer to a radix partition tree may be passed. If so, visited entries will be inserted into the tree. If not, the entries will be pushed on the stack.

After initialization, a zero is pushed 71351 on the stack as an end flag. Next 71352, the FileRef is pushed onto the stack. Then, a query 71353 is made to the Control Repository to retrieve entry from the MODEL table for this FileRef. If it was not found 71354, the process flows to 71359. Otherwise, a check 71355 for a blank USERID is made. If it is blank, the process flows to 71357. If not, the model entry in marked 71356 invalid in the Control Repository. Next, the model entry is either pushed on the stack or inserted into the tree 71357 and the model count is incremented 71358.

The following steps will recursively examine all the nested models. First, a FileRef is pulled 71359 from the stack. If there was none there 71360, the process returns 71364 to the requester. Otherwise, all model entries which contain this FileRef are retrieved 71361. Next, a check 71362 for a blank USERID is made. If it is blank, the process flows to 71365. If not, the model entry in marked 71363 invalid in the Control Repository and the model entry is either pushed on the stack or inserted into the tree 71365 the model count is incremented 71366 and the AnchorRef of the Model is pushed 71367 is pushed on the stack. The process then flows to 71359.

Figure 62:
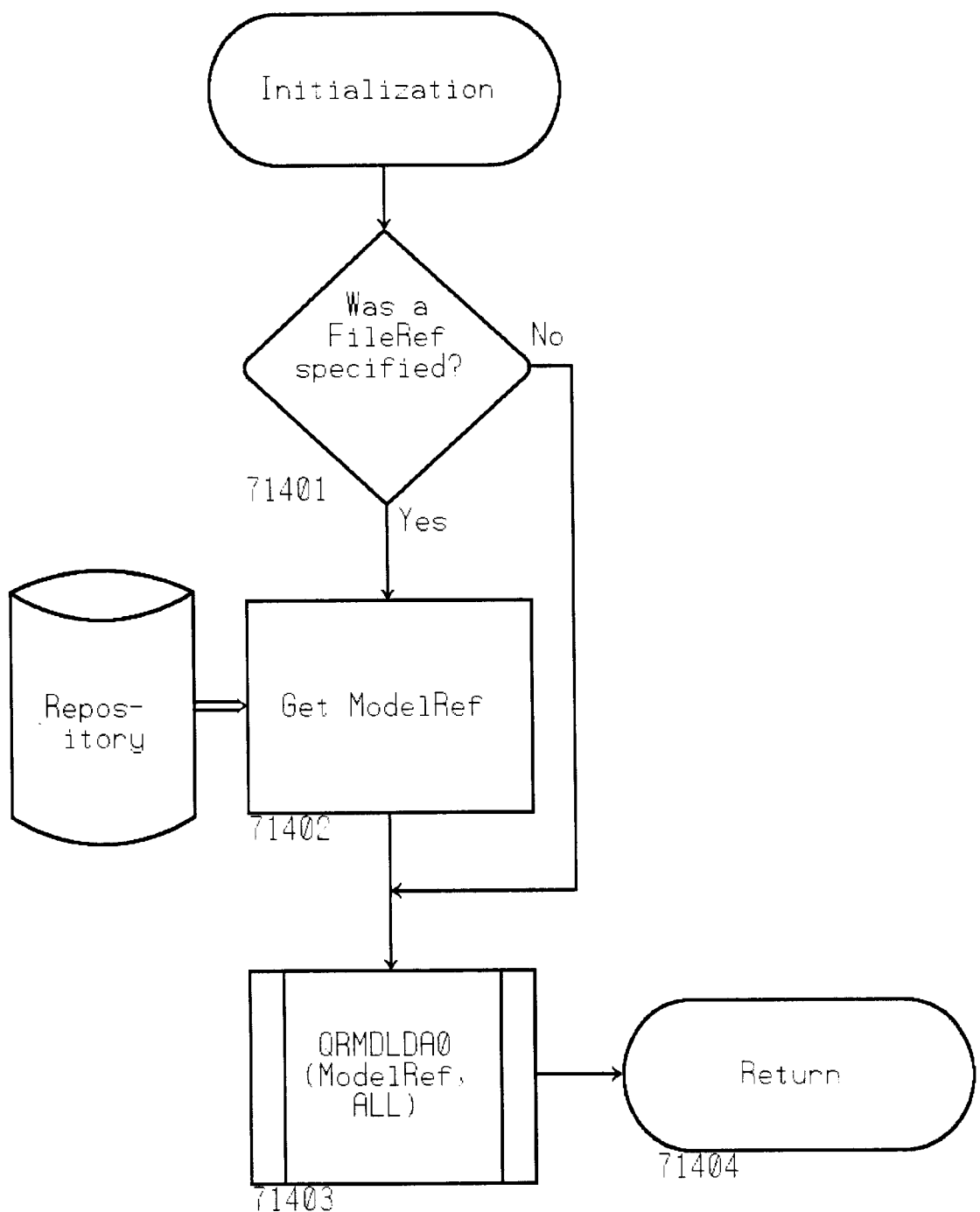
FIG. 62 describes the QRMDLLST Process.
Figure 63A:
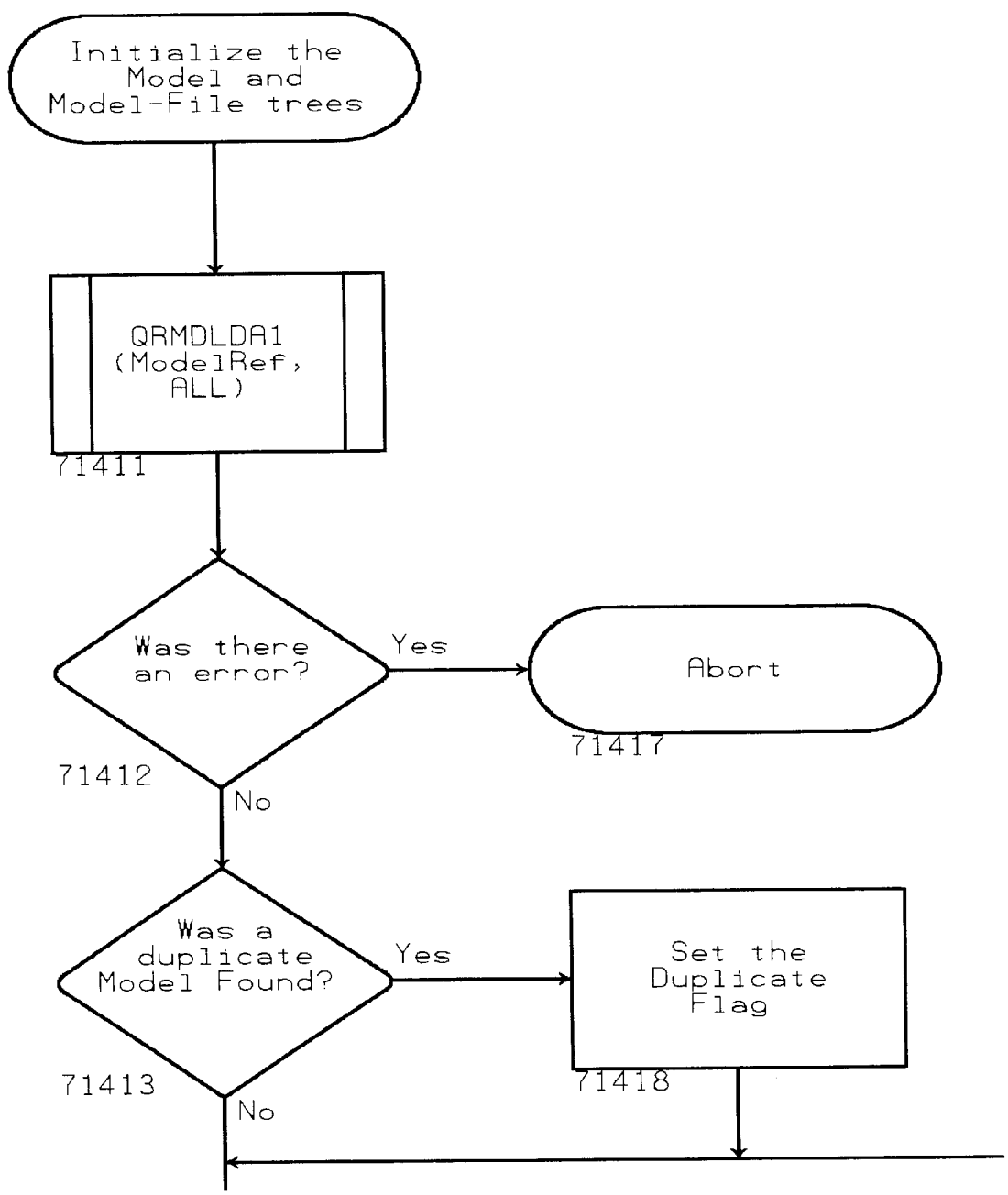
FIG. 63a thru 63d describes the QRMDLDA0 Process.
Figure 63B:
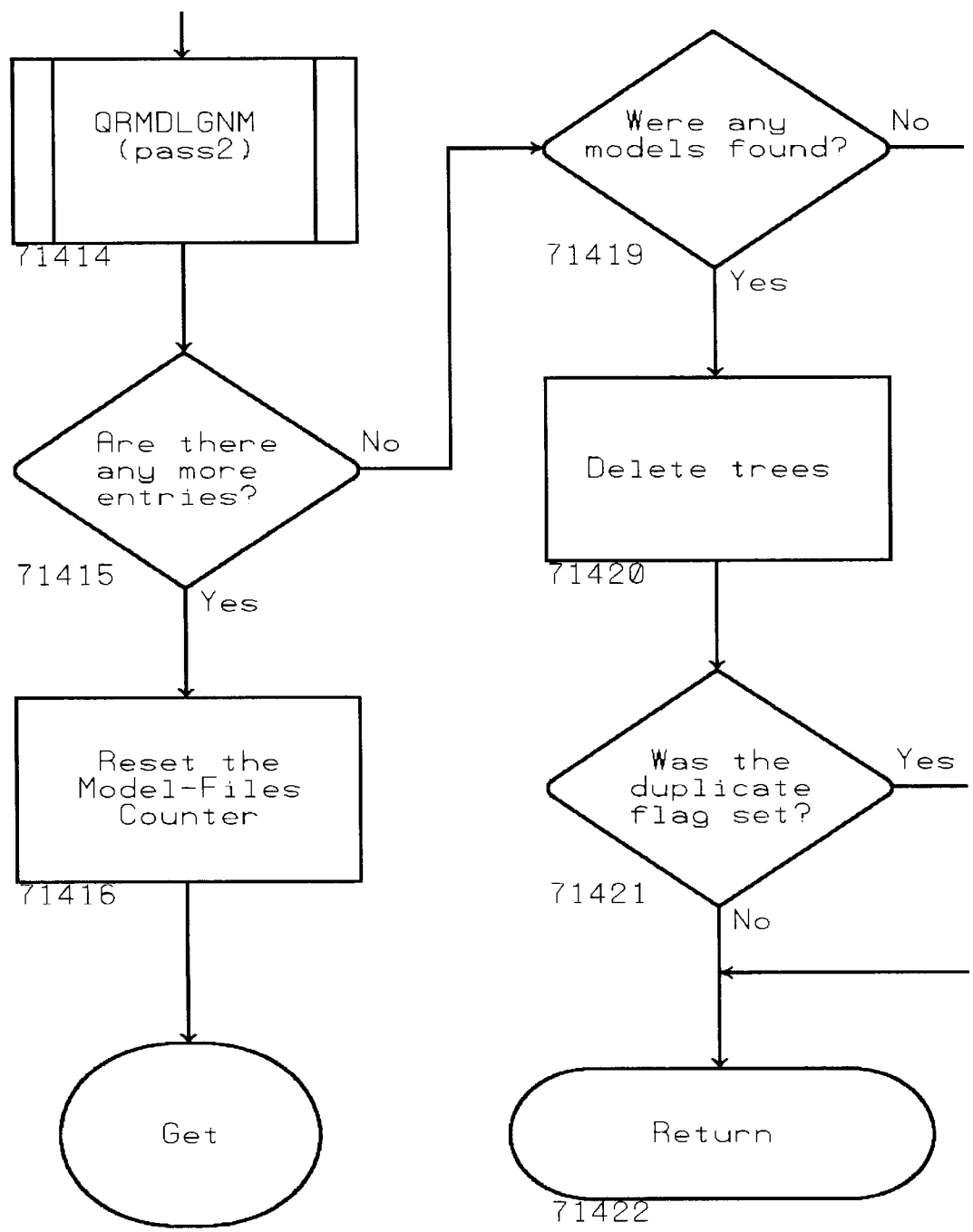
Figure 63C:
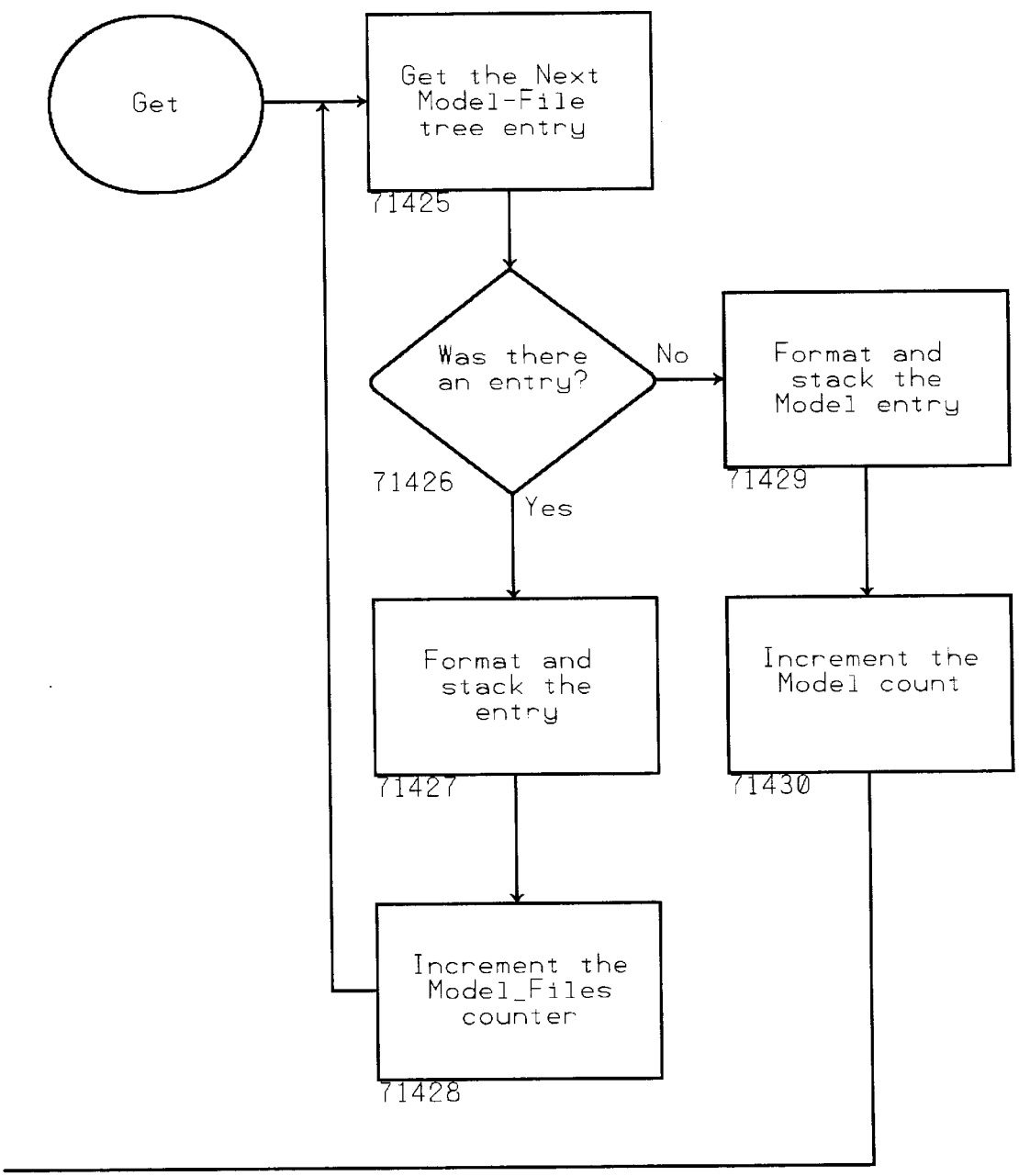
Figure 63D:
Figure 64A:
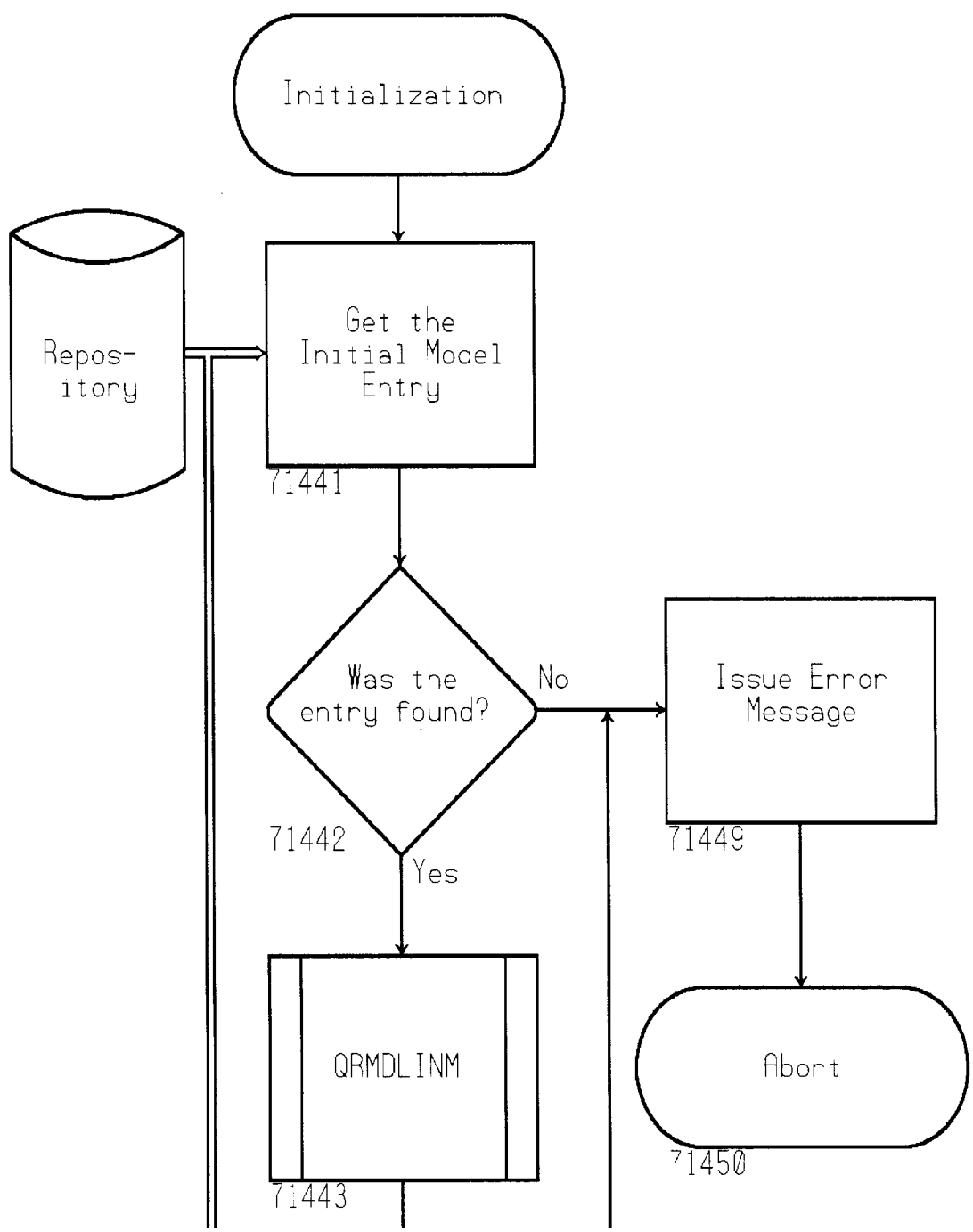
FIG. 64a thru 64e describes the QRMDLDA1 Process.
Figure 64B:
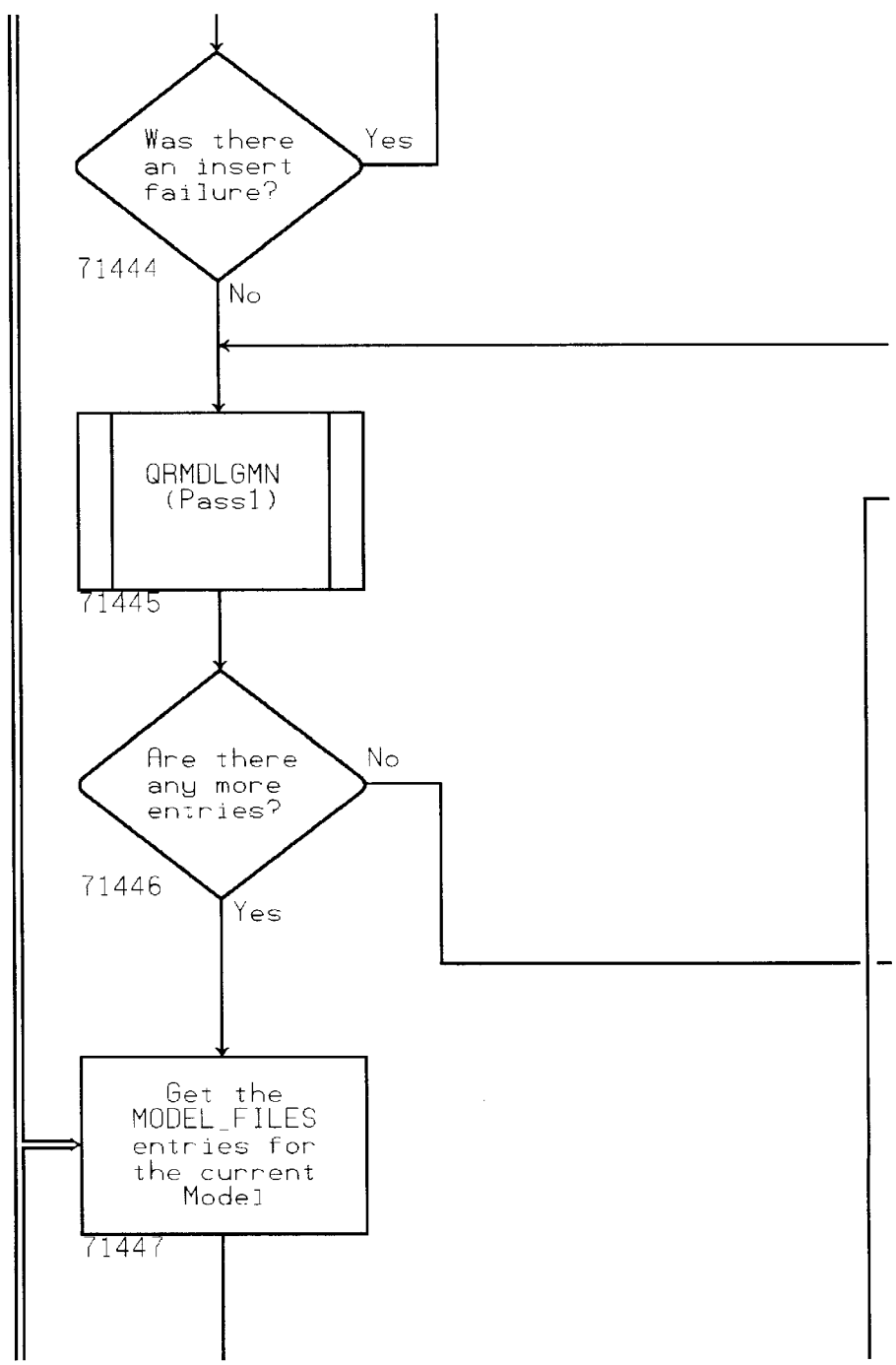
Figure 64C:
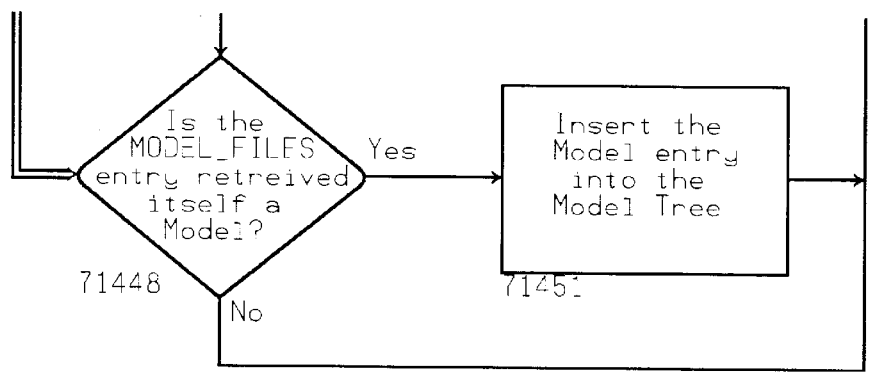
Figure 64D:
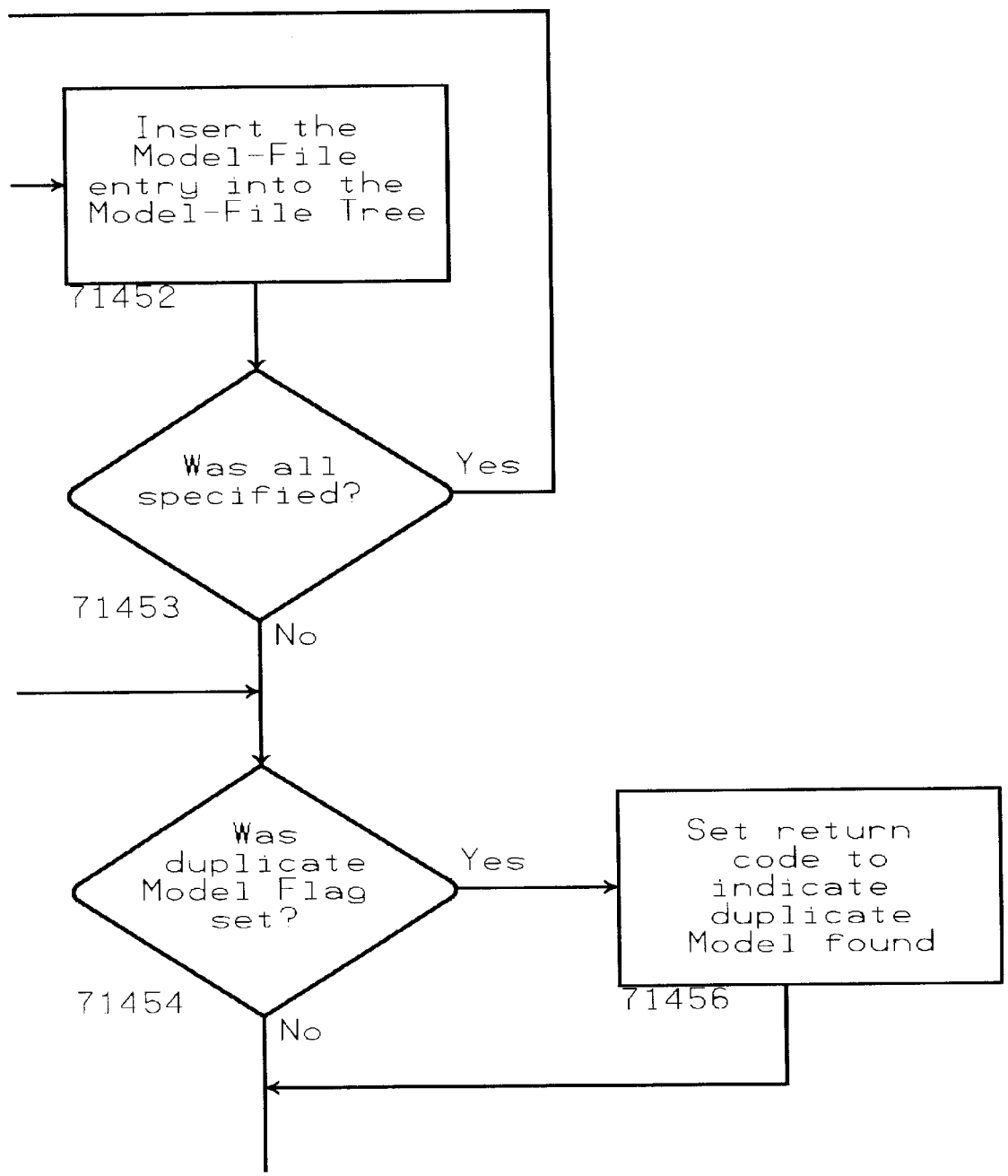
Figure 64E:
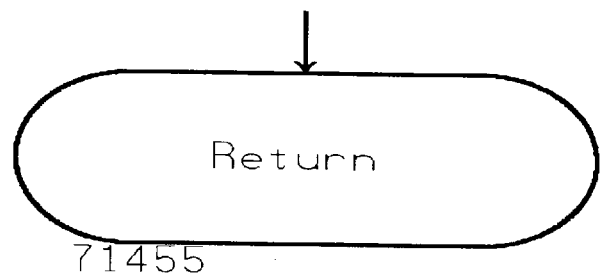
Figure 65A:
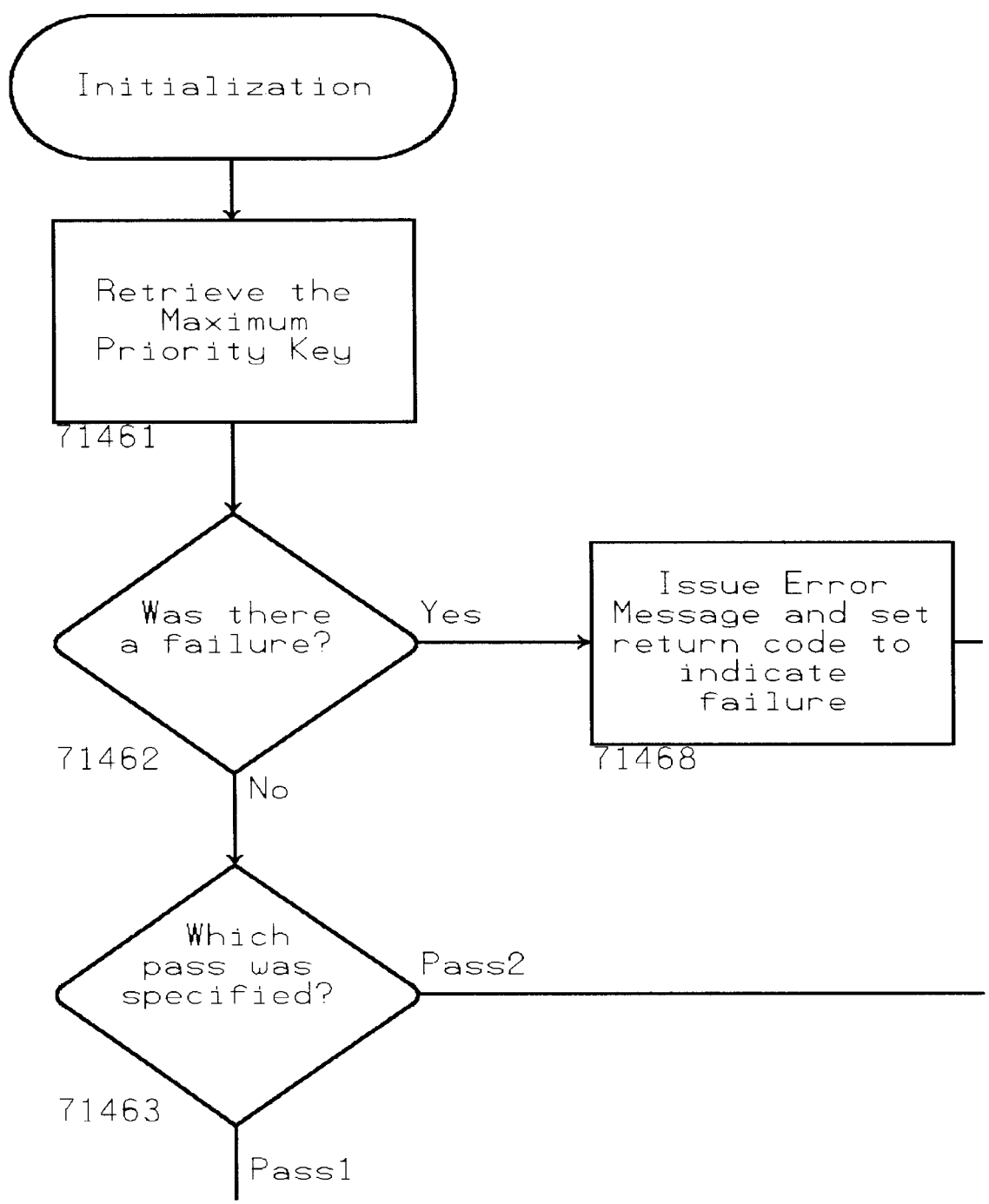
FIG. 65a thru 65d describes the QRMDLGNM Process.
Figure 65B:
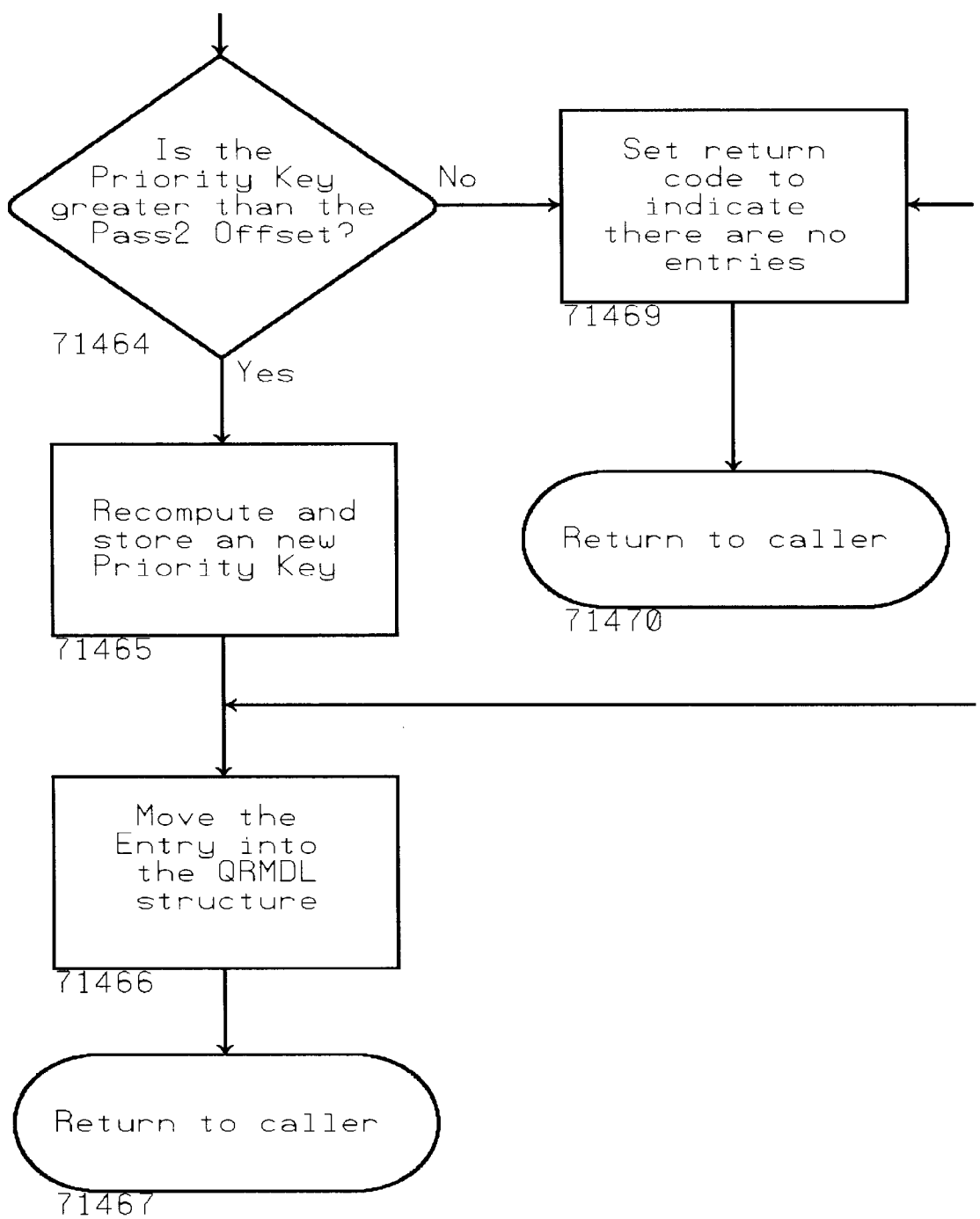
Figure 65C:
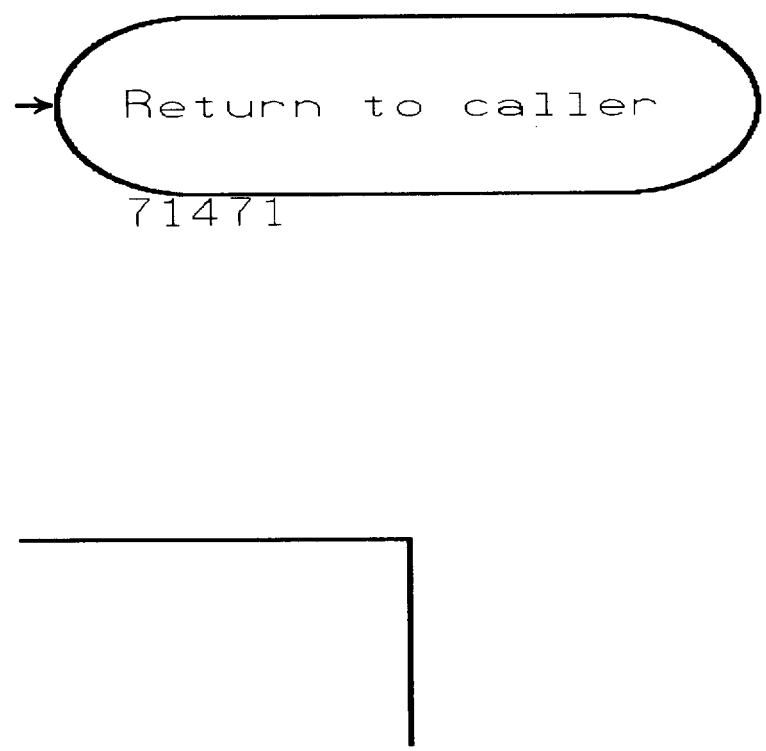
Figure 65D:
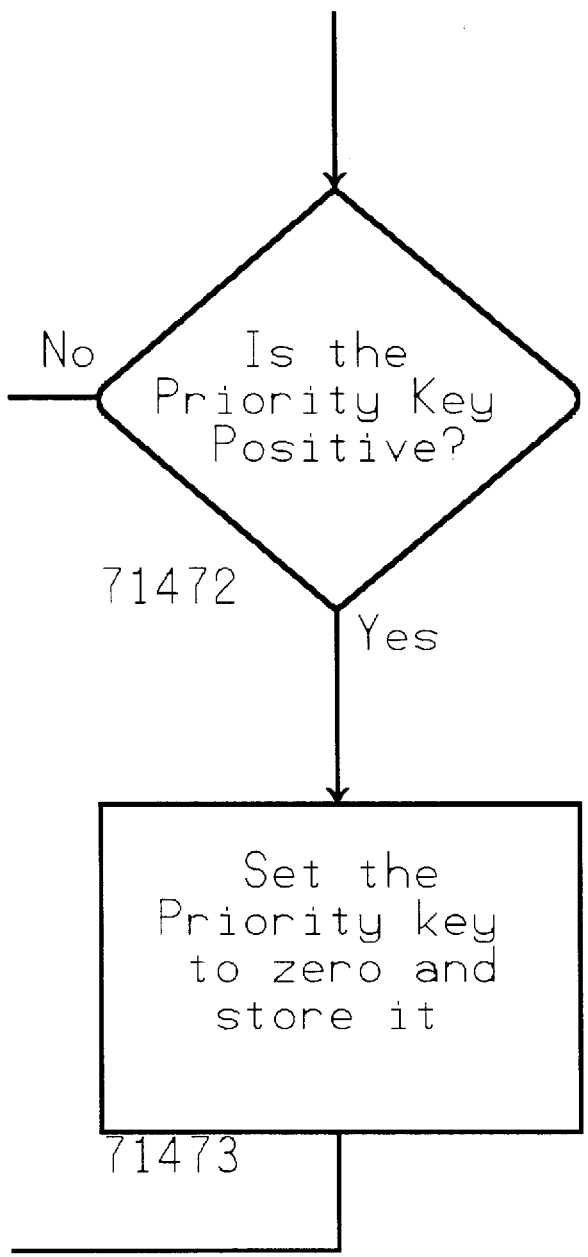

The QRMDLLST Process FIG. 62: The QRMDLLST process is used to get a list of all the component files of a specified model. The model may be specified as either a ModelRef or a FileRef.

After initialization, a check 71401 is made to determine is a FileRef was specified. If so, the ModelRef is retrieved 71402 from the Control Repository. Next 71403, the QRMDLDAO Process described in FIG. 63 is invoked. Upon return from that process, this process will return 71404 to the requester.

The QRMDLDA0 Process FIG. 63: Initialization includes setting up the Model and Model-File radix partitioned trees. To handle the recursion caused by nested models, this process uses Luther Woodrum's Radix Partitioned Tree Services. Two trees are used, the "model" tree will contain one entry for each model file encountered, a priority key related to the model nesting level is associated with each "model" tree entry. The "model_file" tree will contain one entry for each model_file encountered that is not itself in the model table. These model_file entries are stored using the model_ref of the containing model as the key. Retrieval of "model" entries occurs in two passes. In the first pass which is used to build the trees, we wish to retrieve entries from the smallest nesting level to the largest. In the second pass, which is used to retrieve "model_file" entries, we wish to retrieve entries from the largest nesting level to the smallest to accomplish this a pass1 and a pass2 priority key offset was defined ('7FFFFFFF'x, and '3FFFFFFF'x respectively.) On initial insertion the priority key is created by subtracting the nesting level from the pass 1 offset after the "model" entry is used in the first pass it priority key is changed to be its nesting level. After the entry is used in the second pass, the priority key is changed to zero. In this way, the appropriate entry on any pass can be obtained. On the first pass, only priority keys between the pass1 offset and the pass2 offset will be considered. On the second pass, only priority keys above zero will be considered.

```
pass1off ==> '7ffffff'x
nesting level 1
nesting level 2
nesting level . . .
nesting level n
. . .
pass2off ==> '3ffffff'x
. . .
nesting level n
nesting level . . .
nesting level 2
nesting level 1
. . .
zero      ==> '00000000'x
```

After initialization the QRMDLDA1 Process described in FIG. 64 is invoked 71411. Upon return from this process a check 71412 is made to determine if there were any errors. If so, the process is aborted 71417. If not, a check 71413 is made to determine if a duplicate model was found. If so, the duplicate flag is set 71418. If not, the QRMDLGNM Process described in FIG. 65 is invoked 71414 with the Pass2 parameter. Upon return from this process, a check 71415 is made to see if there are any more model entries. If there were, the next Model-File entry is obtained 71425 from the Model File tree. A check 71426 is made to determine if there was a model-file entry. If so, the model-file entry is formatted and stacked 71427. If not, the model entry is formatted and stacked 71429 and the model count is incremented 71430. The process then flows back to 71414. If no more entries were found 71415, a check 71419 is made to determine any models were found. If not, an Error message is issued a return code is set 71423 to indicate a process error and the process returns to the requester 71422. If models were found, the model and model-file trees are deleted 71420. Next a check 71421 is made to see if the duplicate model flag was set. If so, a return code is set 71424 to indicate a duplicate. In either case, the process then returns 71422 to the requester.

Figure 66:
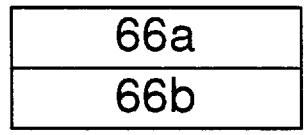
FIG. 66 shows the interconnection of FIG. 66a and 66b.
Figure 66A:
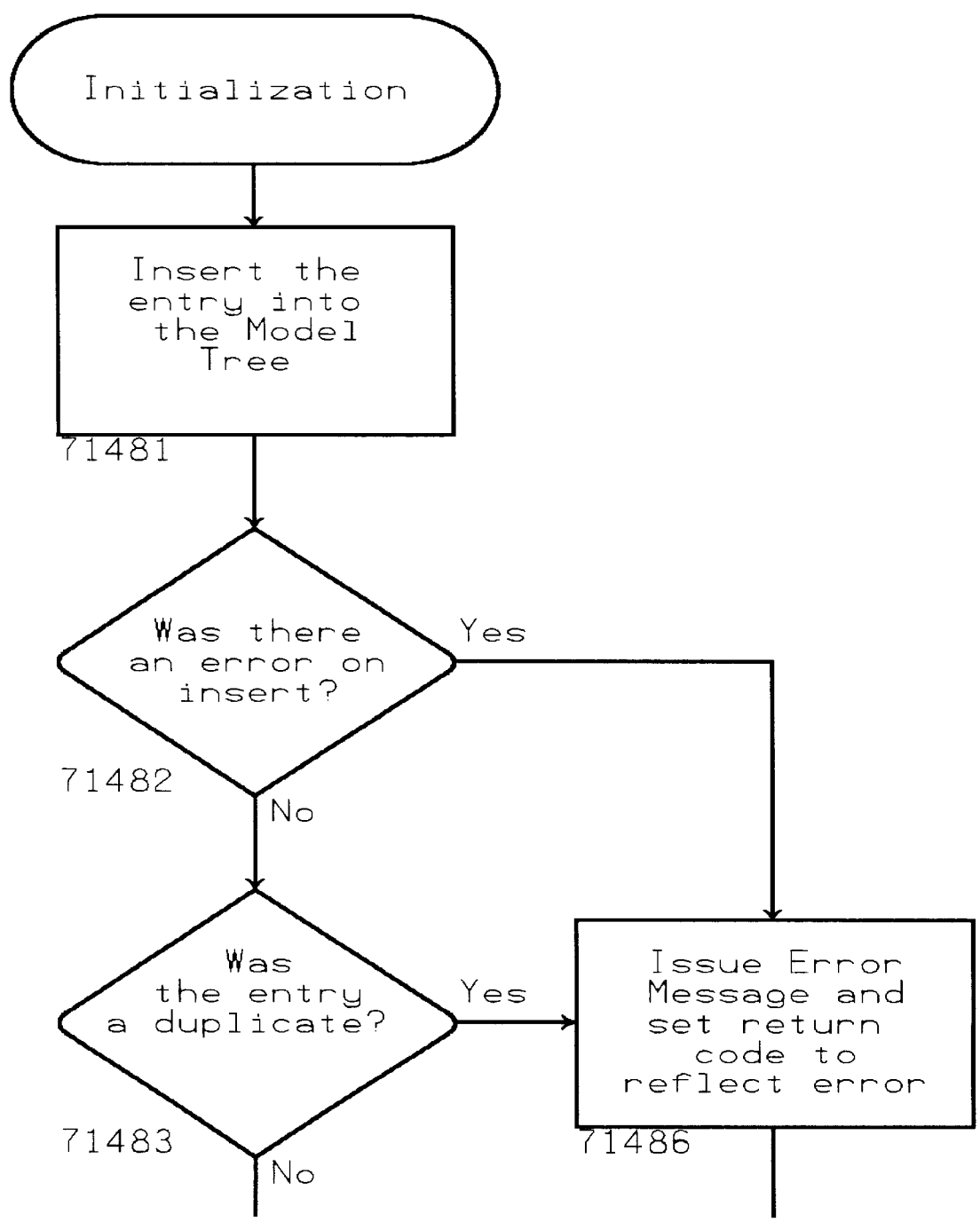
FIG. 66a and 66b describes the QRMDLINM Process.
Figure 66B:
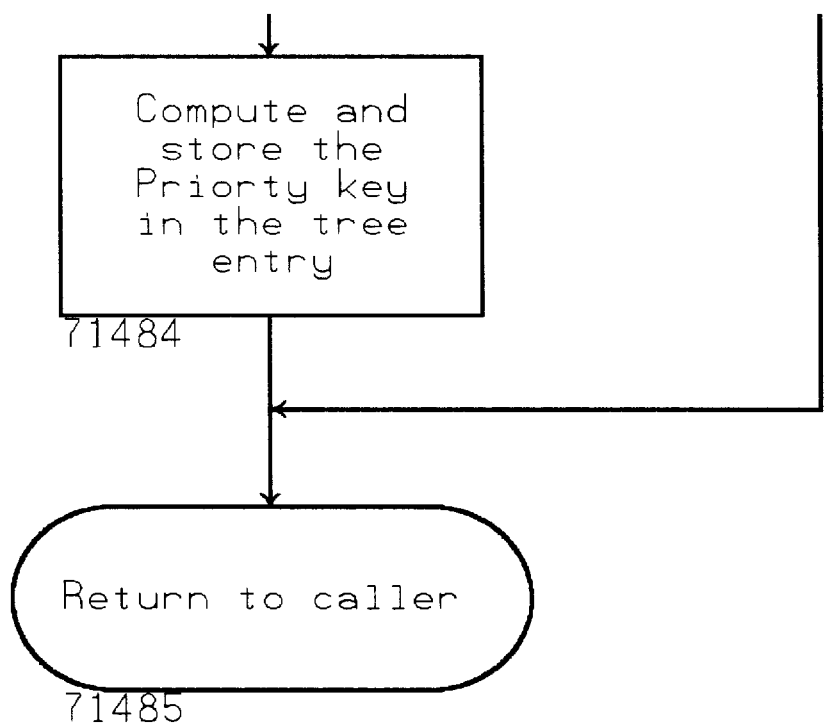

The QRMDLDA1 Process FIG. 64: After initialization, a query is issued 71441 to get the initial model entry from the MODEL table in the Control Repository. A check 71442 is made to determine if it was found. If not, an Error message is issued 71449 and the process is aborted 71450 If it was, the QRMDLINM process described in FIG. 66 is invoked. Upon return from that process a check 71444 is made to determine of an insert failure had occurred. If so, an Error message is issued 71449 and the process is aborted 71450 If not, the QRMDLGNM Process described in FIG. 65 is invoked 71445 with the Pass1 parameter. Upon return from this process, a check 71446 is made to see if there are any more model entries. If not, the process flows to 71454. If there were, a query is issued to retrieve the MODEL_FILE entries for the current model from the Control Repository. Next, a check 71448 is made to determine if the Model-File entry is itself a model. If it is the entry is inserted 71451 into the model tree. In either case, the model-file entry in inserted 71452 into the model-file tree. Next, a check 71453 is made to determine if ALL was specified. If so, the process flows back to 71445. It not, a check 71454 is made to see if the duplicate model flag was set. If so, a return code is set 71456 to indicate a duplicate. In either case, the process then returns 71455 to the requester.

The QRMDLGNM Process FIG. 65: This process is used to get the next entry from the model tree. The process can be invoked either as a PASS1 or a PASS2 process. On PASS1 processing, only priority keys between the pass1 offset and the pass2 offset will be considered. As the items are processed the priority keys will be inverted and based above zero for second pass selection. On PASS2 processing, only priority keys above zero will be considered. As the items are processed the priority keys will be set to zero.

After initialization, the maximum priority key is retrieved 71461 from the model tree. A check 71462 is made to determine if there was a failure. If so, an Error message is issued and a return code set 71468 to indicate failure. The process then returns 71471 to the caller. If it did not fail, a check 71463 is made to determine which pass was specified.

If PASS1 was specified, a check 71644 is made to determine if the priority key is greater than the PASS2 offset. If it is not, then set 71469 a return code to indicate that there are no entries and return 71470 to the caller. Otherwise, recompute and store 71465 a new priority key. Next move 71466, the model entry into the return area and return 71467 to the caller.

If PASS2 was specified, a check 71472 is made to determine if the priority key is positive. If it is not, then set 71469 a return code to indicate that there are no entries and return 71470 to the caller. Otherwise, set the priority key to zero and store it 71473. Next move 71466, the model entry into the return area and return 71467 to the caller.

The QRMDLINM Process FIG. 66: This process is used to insert a model entry into the model tree. After initialization, the model entry is inserted 71481 in the model tree. Next, a check 71482 is made to determine if there was an error on insert. If there was an error, an Error message is issued and a return code is set 71486 to reflect the error and the process returns 71485 to the caller. If there was no insert error, a check 71483 is made to determine whether the entry was a duplicate. If so, an Error message is issued and a return code is set 71486 to reflect the error and the process returns 71485 to the caller. Otherwise, the priority key is computed and inserted 71484 into the tree entry and the process returns 71485 to the caller.

Figure 67:
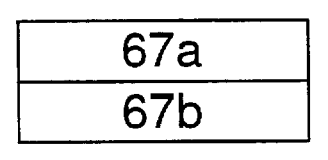
Figure 67A:
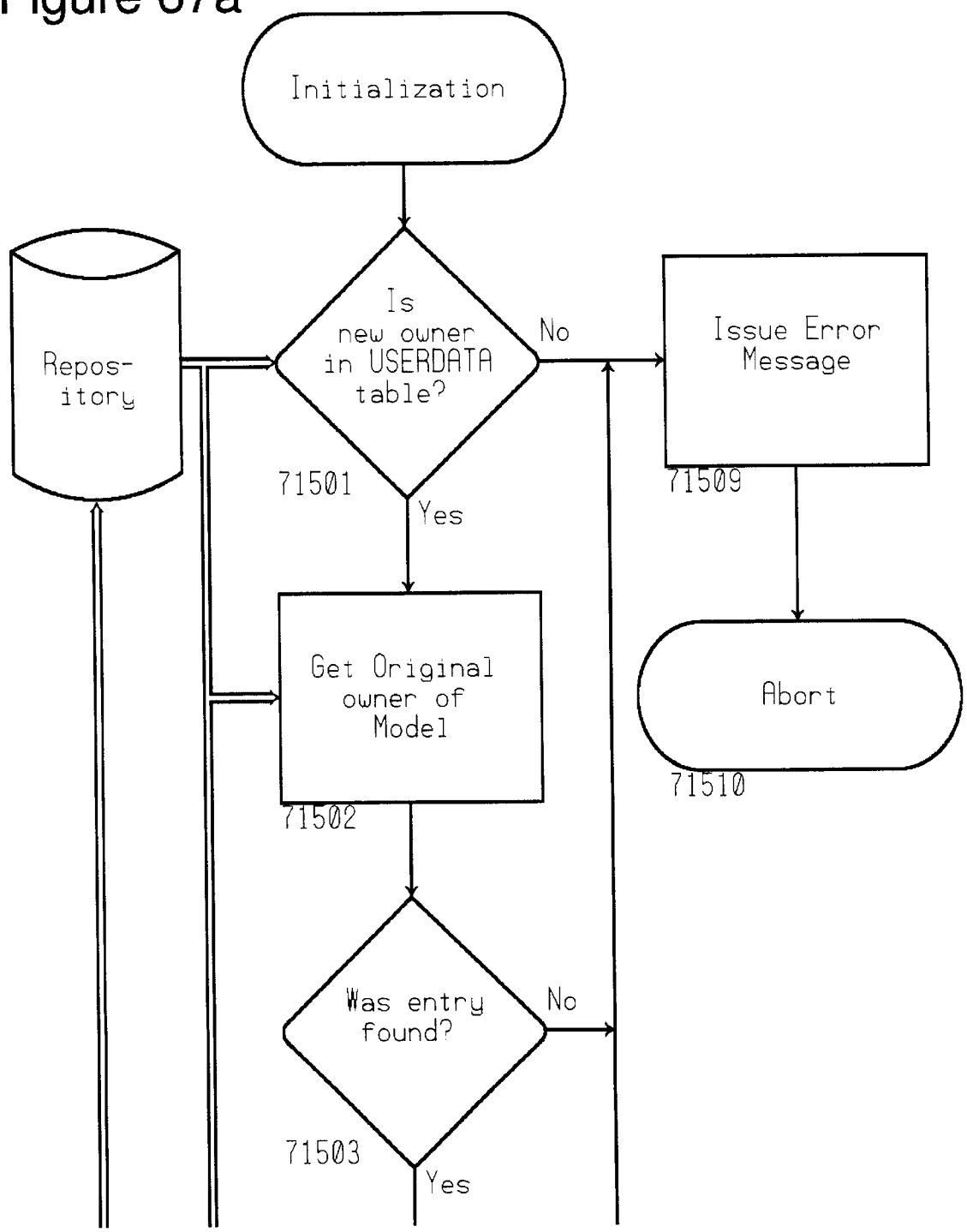
FIG. 67a and 67b describes the QRMDLMOD Process.
Figure 67B:
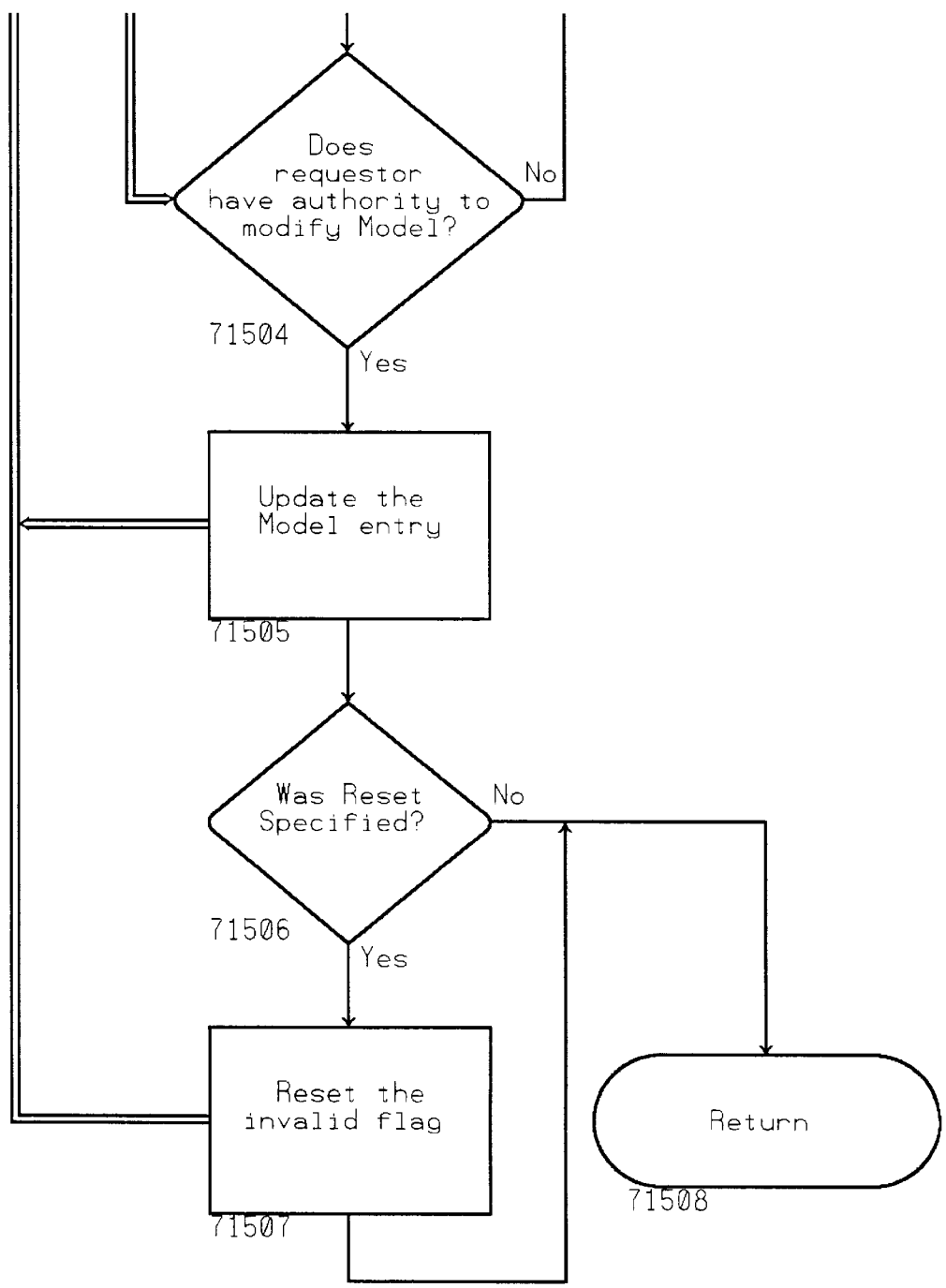

The QRMDLMOD Process FIG. 67: This process is used to modify a Model entry in the MODEL table in the Control Repository. After initialization, A query 71501 is made to determine if the new owner is in the USERDATA table in the Control Repository. If not, an Error message is issued 71509 and the process aborts 71510. If it is, a query 71502 is made to get the original owner of the model. A check 71503 is made to determine whether the entry was found. If not, an Error message is issued 71509 and the process aborts 71510. If it was found, the Control Repository is checked 71504 to make sure that the requester has MODEL MODIFY authority. If not, an Error message is issued 71509 and the process aborts 71510. Otherwise, the model entry in the MODEL table in the Control Repository is updated. Next, a check 71506 is made to determine whether RESET was specified. If so, reset 71507 the invalid flag in the MODEL table in the Control Repository and return 71508.

Figure 68:
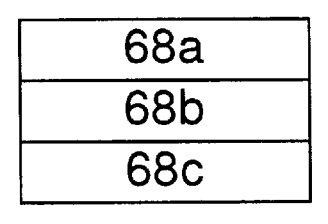
Figure 68A:
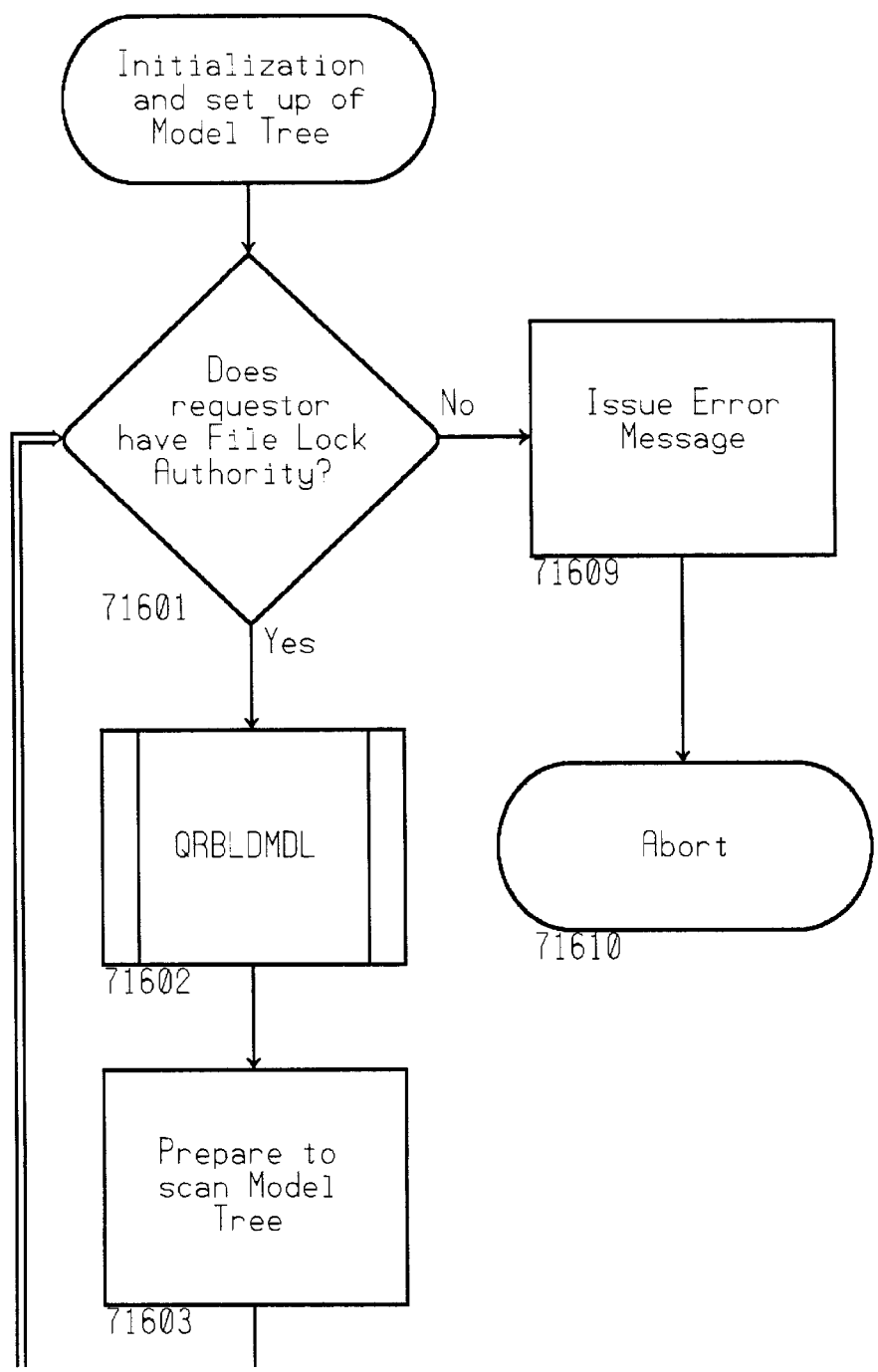
FIG. 68a thru 68c describes the QRMDLRES Process.
Figure 68B:
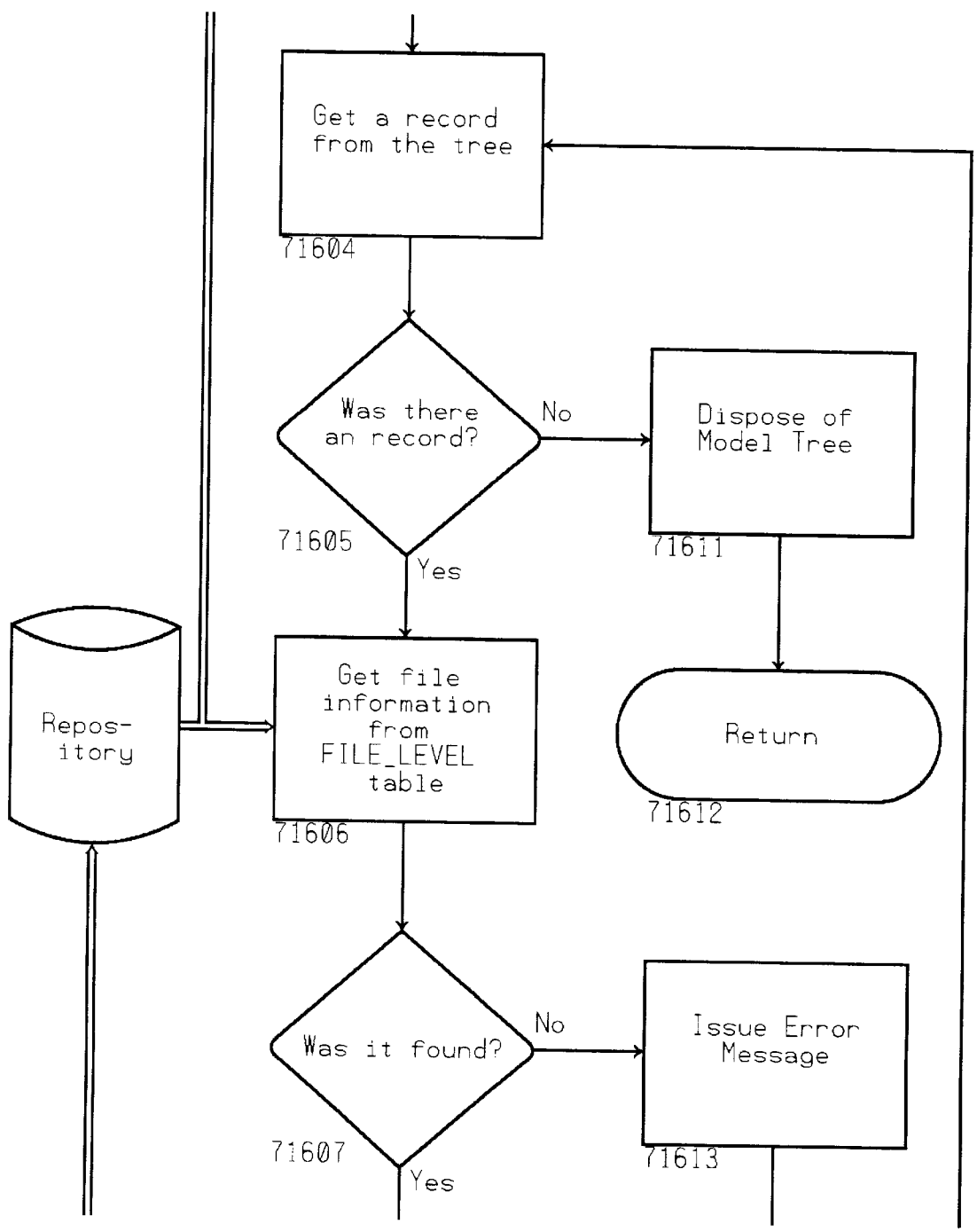
Figure 68C:
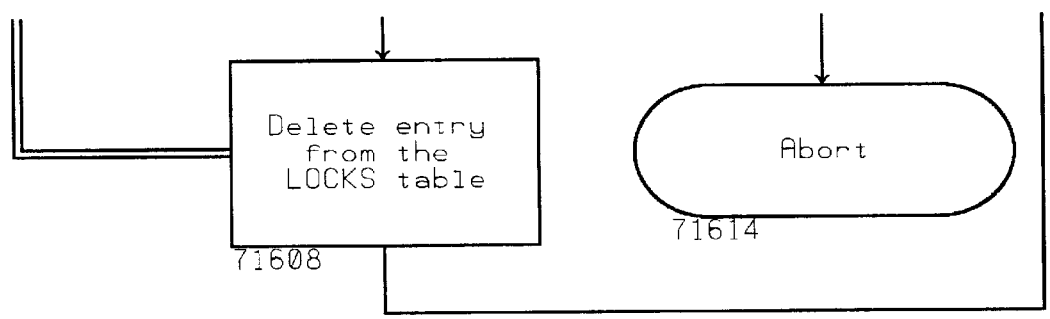
Figure 70:
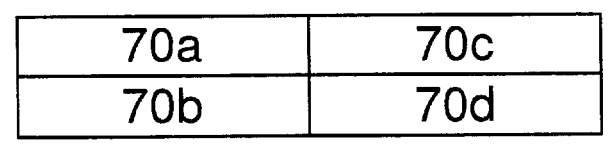

The QRMDLRES Process FIG. 68: This process is used to reset a given FILE lock on all the components of a model. After initialization, a check 71601 is made to make sure that the requester has FILE LOCK authority. If not, an Error message is issued 71609 and the process aborts 71610. Otherwise the QRBLDMDL Process described in FIG. 70 is invoked 71602. Upon return from that process, preparations are made 71603 to scan the model tree. The following steps will process each tree entry. Get 71604 a record from the tree. A check 71605 is made to determine if a record was found. If not, the model tree will be disposed 71611 and the process will return 71611. If a record was found, get 71606 the file information from the FILE_LEVEL table in the Control Repository. A check 71607 is made to determine if the information was found. If not, the model tree will be disposed 71611 and the process will return 71611. If not, an Error message is issued 71613 and the process aborts 71614. If the information was found, delete 71608 the entry from the LOCKS table in the Control Repository. The process will then flow back to 71604.

Figure 69A:
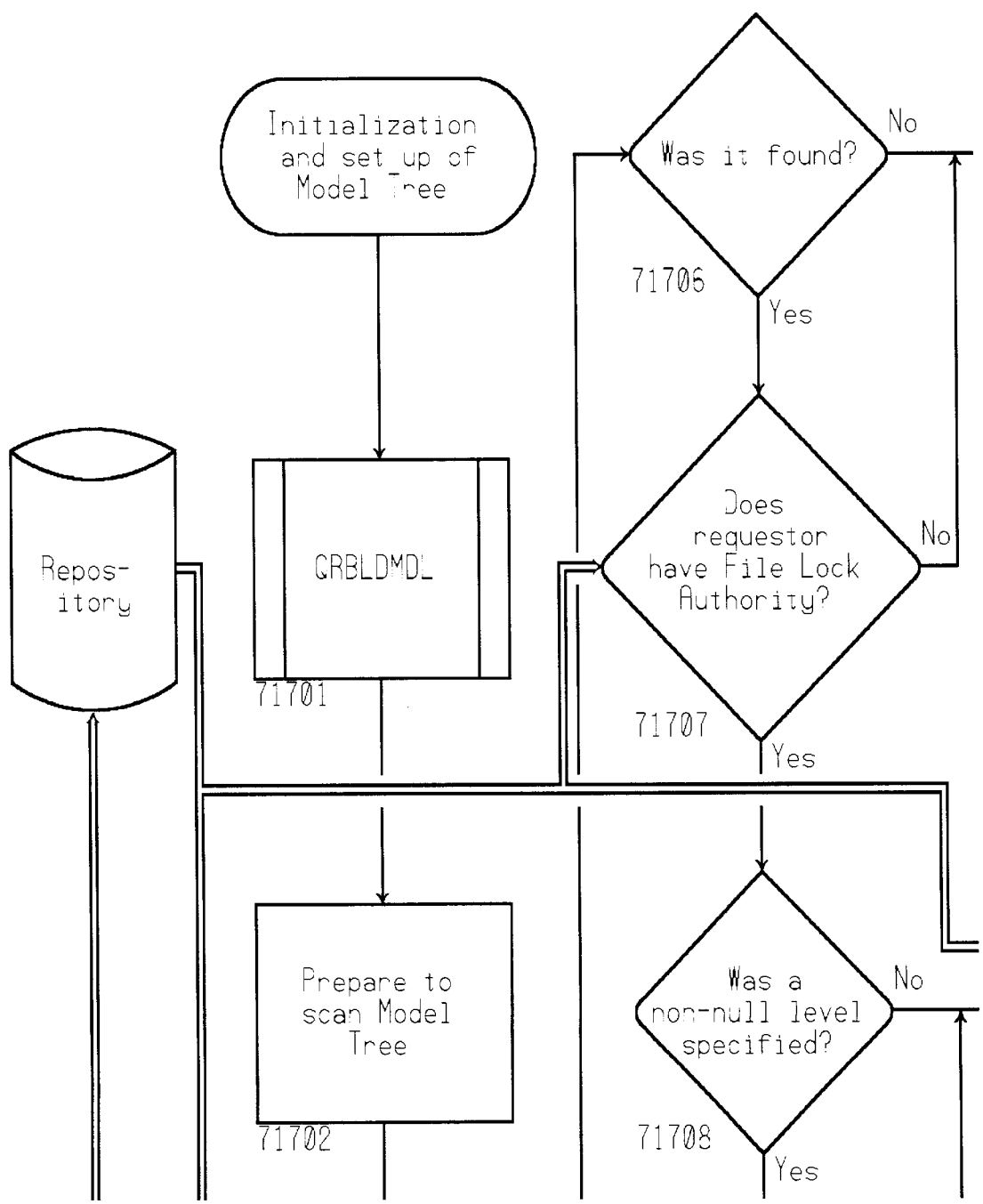
Figure 69B:
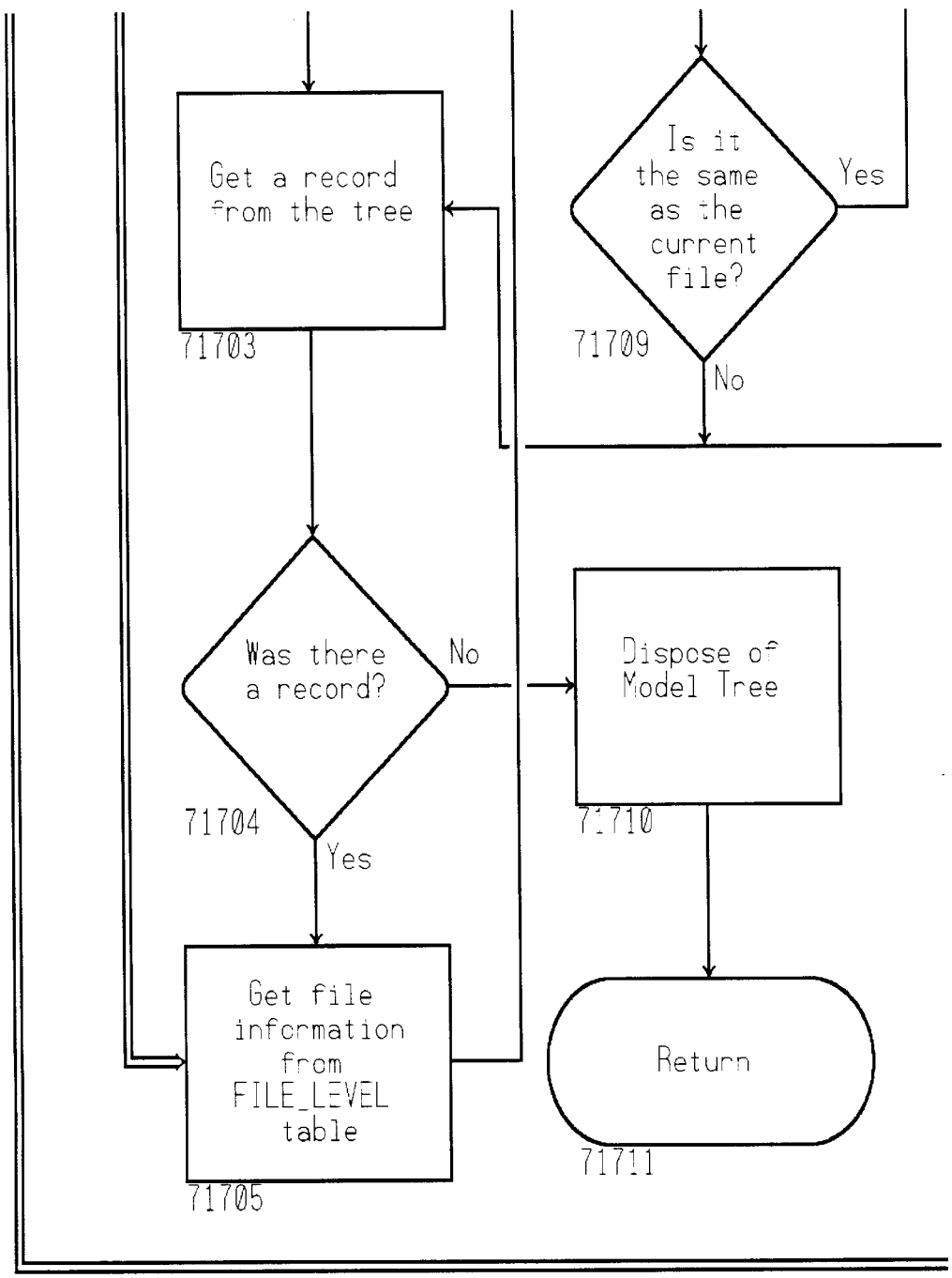
Figure 69D:
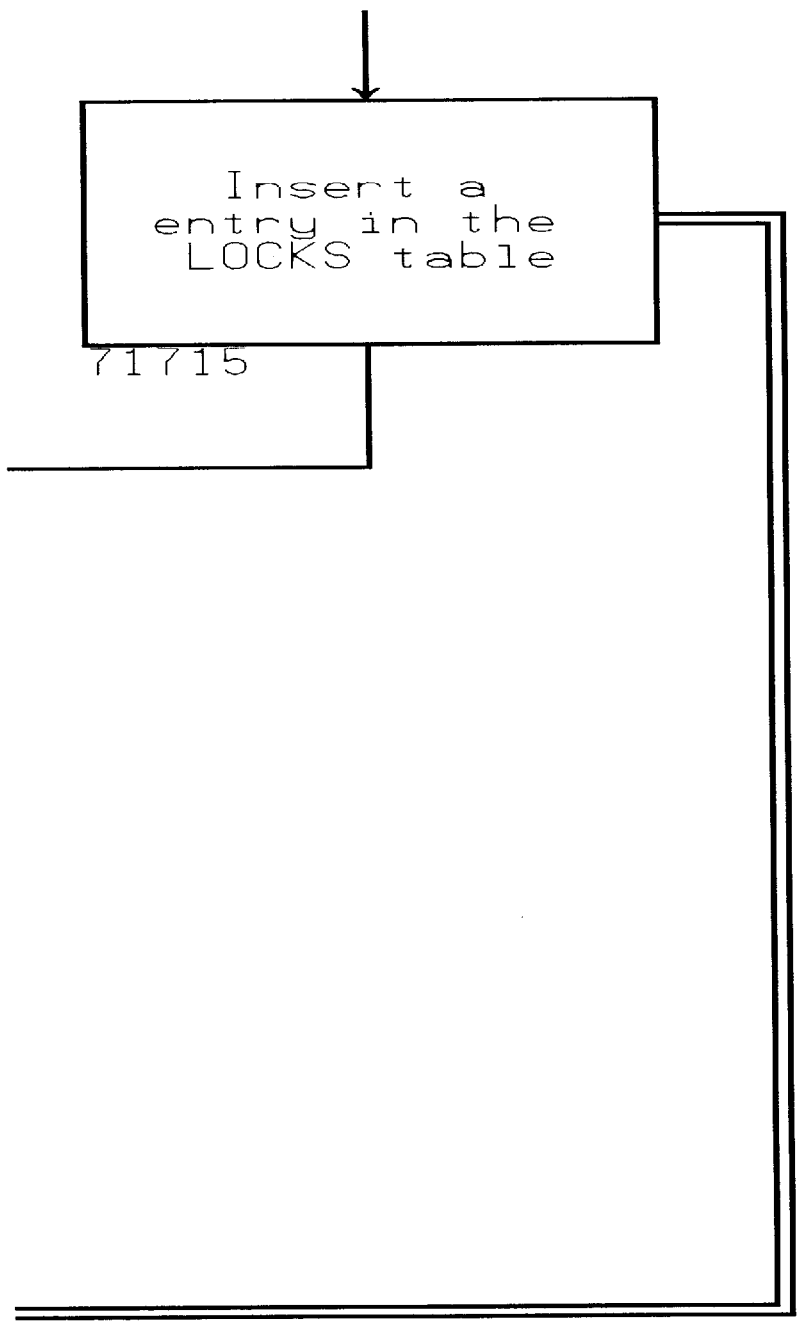
Figure 70A:
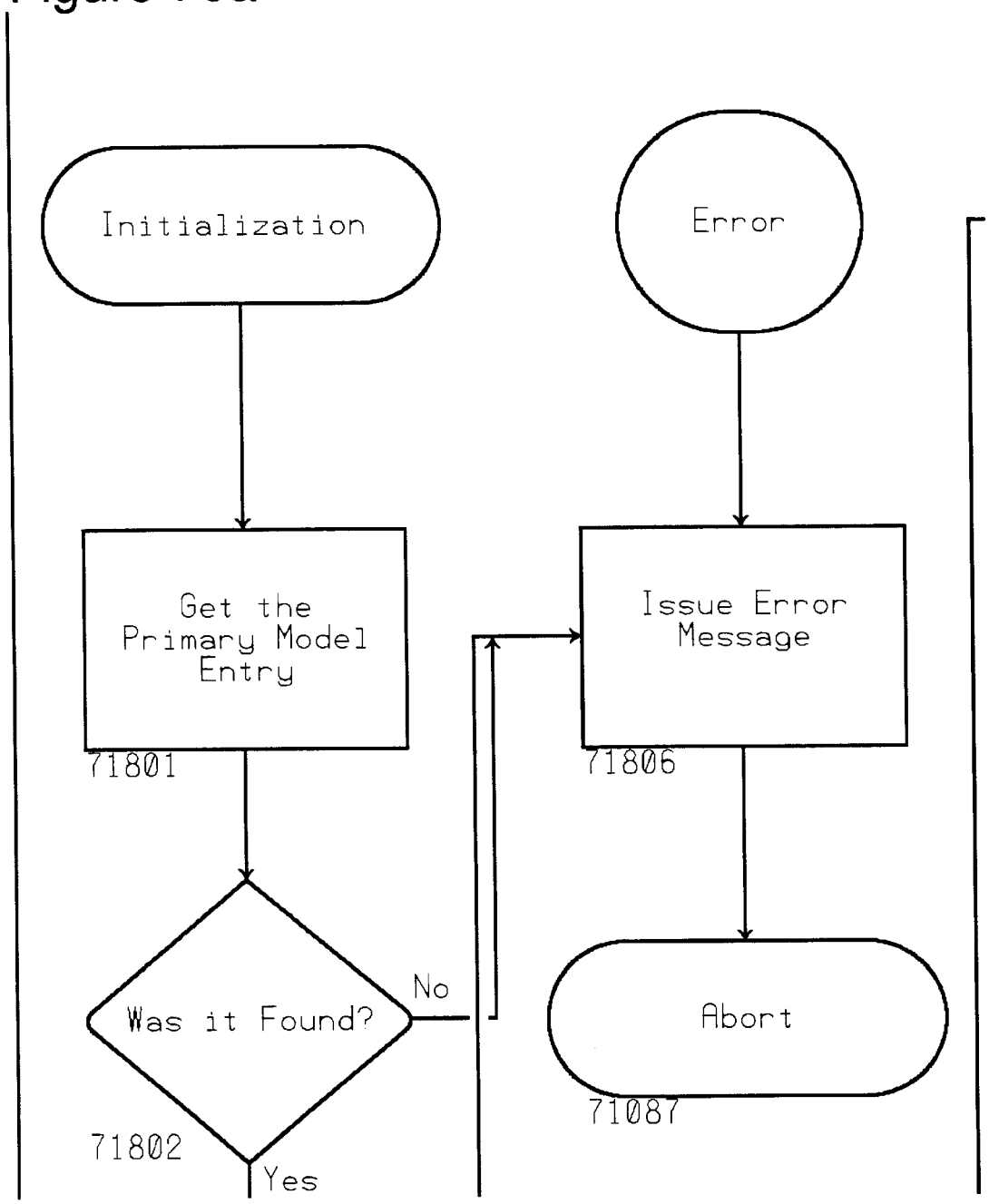
FIG. 70a thru 70d describes the QRBLDPRM Process.
Figure 70B:
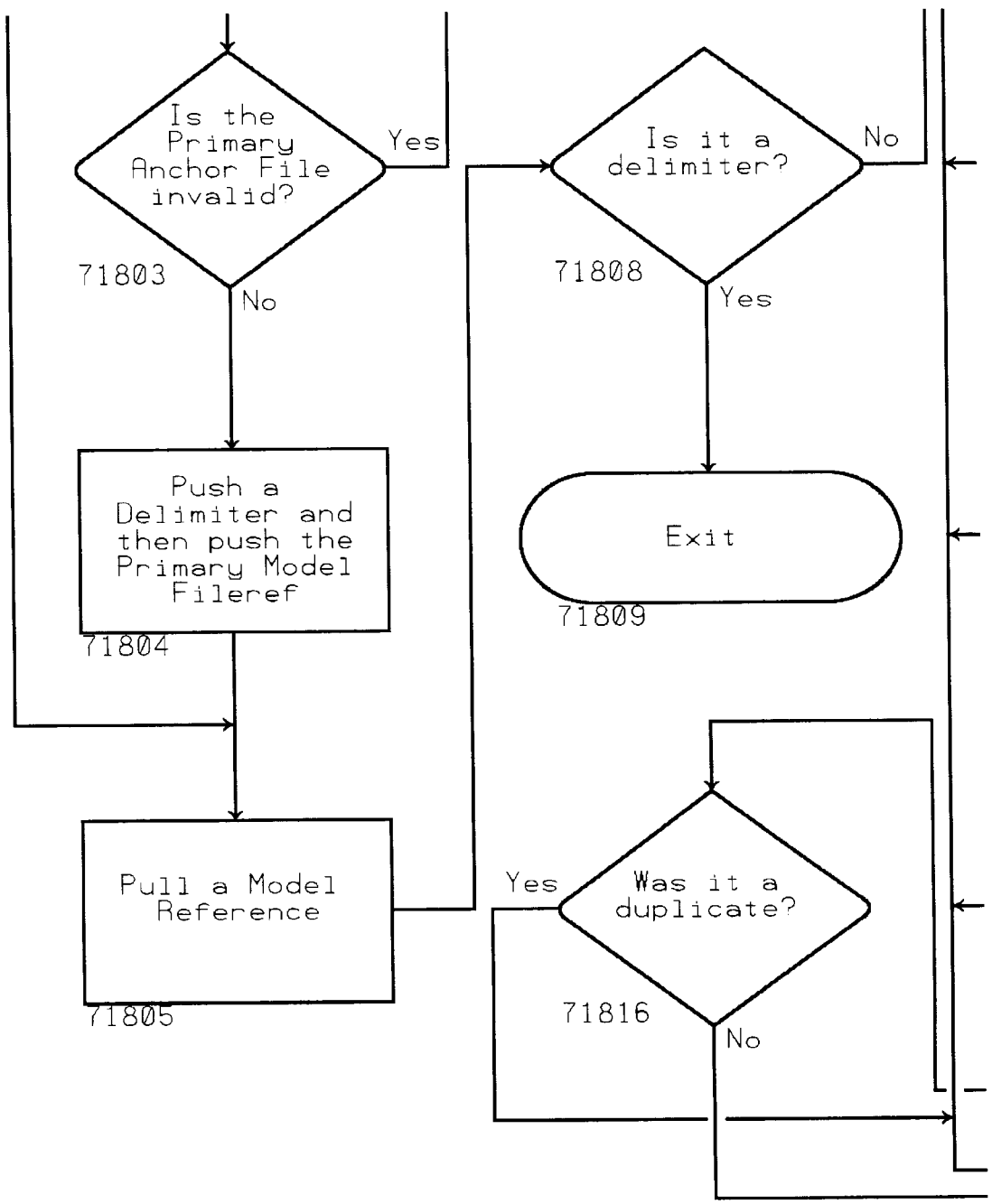
Figure 70C:
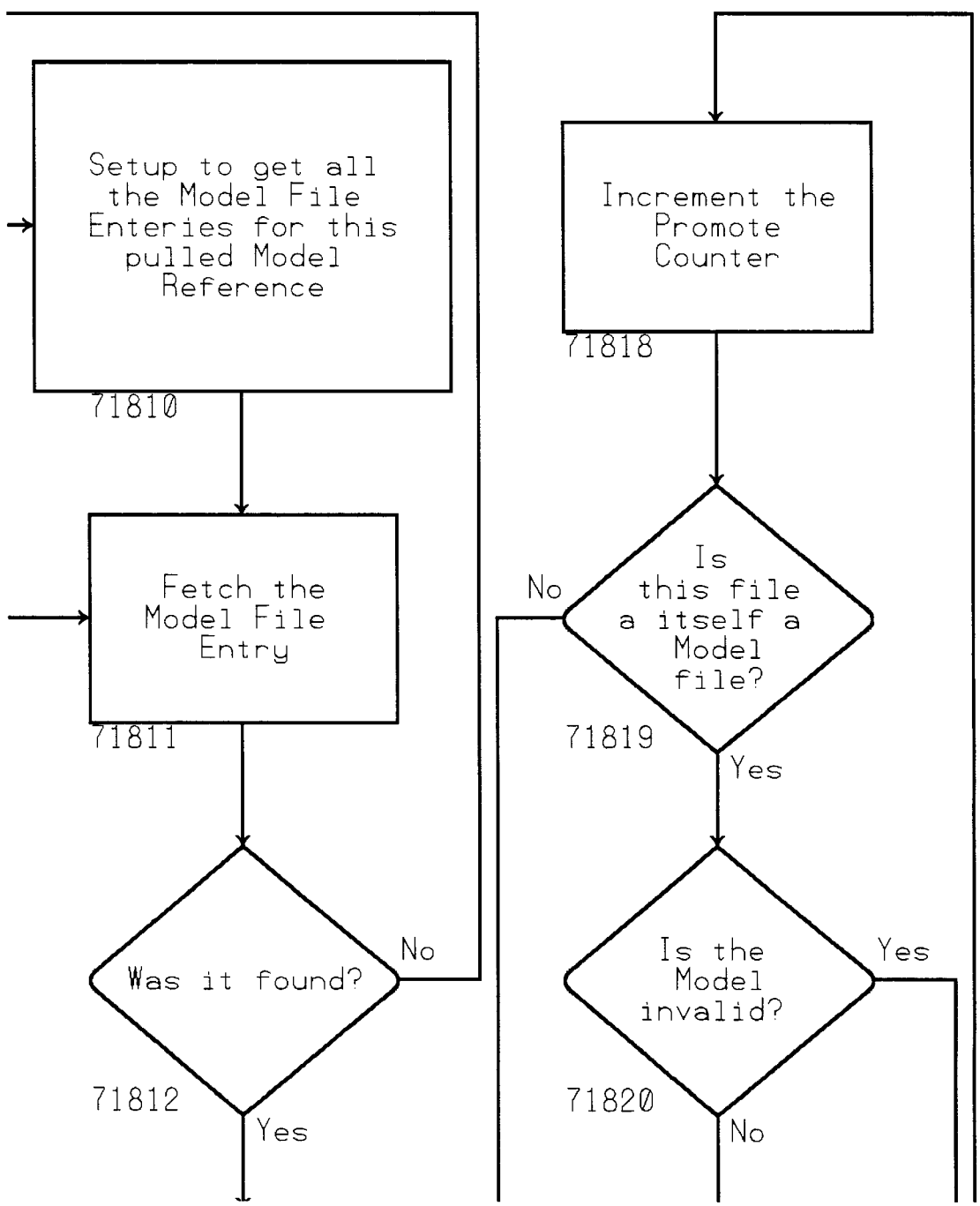
Figure 70D:
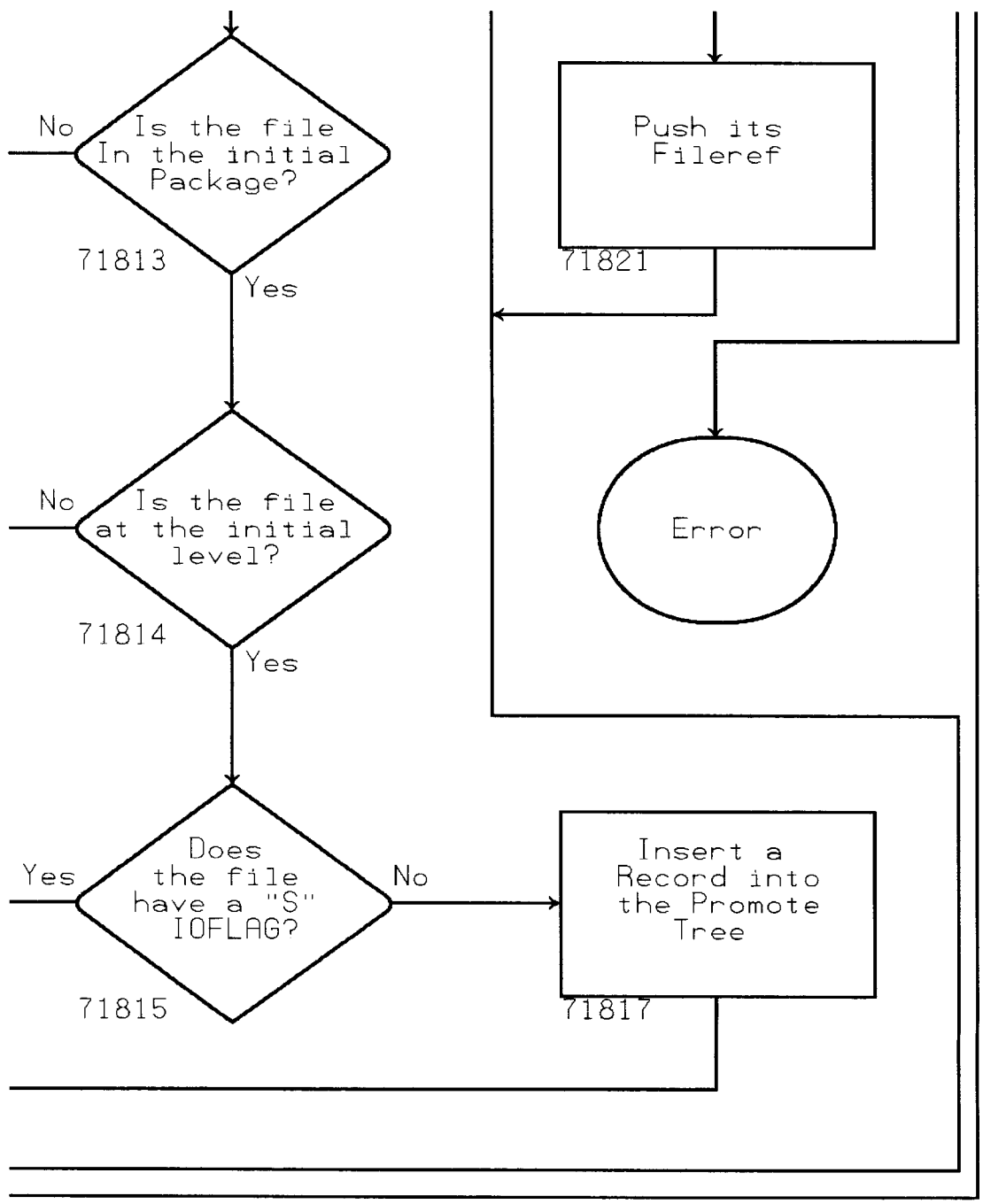
Figure 69:
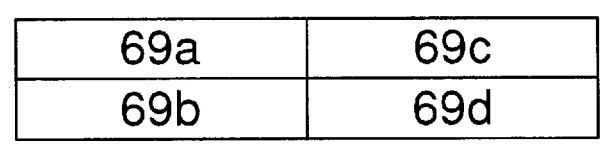

The QRMDLSET Process FIG. 69: This process is used to reset a given FILE lock on all the components of a model. After initialization, the QRBLDMDL Process described in FIG. 70 is invoked 71701. Upon return from that process, preparations are made 71702 to scan the model tree.

The following steps will process each tree entry: Get 71703 a record from the tree. Then, a check 71704 is made to determine if a record was found. If not, the model tree will be disposed 71710 and the process will return 71711. If a record was found, get 71705 the file information from the FILE_LEVEL table in the Control Repository. Next, a check 71706 is made to determine if the information was found. If not, an Error message is issued 71712 and the process aborts 71713. If the information was found, a check 71707 is made to make sure that the requester has FILE LOCK authority. If not, an Error message is issued 71712 and the process aborts 71713. Otherwise, a check 41708 is made to determine if a non-null Level was specified. If not, get 71714 a LockRef from the Control Repository. Next, insert 71715 an entry into the LOCKS table in the Control Repository. The process will then flow back to 71703. If a non-null Level was specified, a check 71709 is made to determine if it is the same as the current file. If so, the process flows forward to 71714. If not, the process flows back to 71703.

The QRBLDPRM Process FIG. 70: This process is used to build a model promote tree to support the Model Promote function to the Library Manager. After initialization, retrieve 71901 the primary model entry from the MODEL table in the Control Repository A check 71802 is made Lo determine if it was found. If not, issue an Error message 71806 and abort 71807 the process. Otherwise a check 71803 is made to determine if the model is valid. If not, issue an Error message 71806 and abort 71807 the process. If it is valid, push 71804 a delimiter and then the primary model FileRef on the stack. The following steps will recursively examine all the nested models and build the promote tree. First, pull 71805 a ModelRef from the stack. Next, a check 71808 is made to determine if it is a delimiter. If so, return 71809 to the caller. Otherwise, prepare 71810 to get all the model-file entries for this model. Fetch 71811 a model-file entry from the MODEL_FILES table in the Control Repository. A check 71812 is made to determine if it was found. If not, the process flows back to 71805. A check 71813 is made to determine if this model-file is in the same package as the primary model file. If not, the process flows back to fetch another model-file entry 71811. A check 71814 is made to determine if this model-file is at the same level as the primary model file. If not, the process flows back to fetch another model-file entry 71811. A check 71815 is made to determine if this model-file has an "S" IOFlag. If it does, the process flows back to fetch another model-file entry 71811. If the model-file has passed the above checks its record is inserted 71817 into the promote tree (duplicate entries are not inserted). A check 71816 is made to determine if this was a duplicate entry. If it was, the process flows back to fetch another model-file entry 71811. If not a duplicate, increment 71818 the promote counter. Next, a check 71819 is made to determine if this model-file is itself a model. If not, the process flows back to fetch another model-file entry 71811. If it is a model, a check 71820 is made to determine if the model is valid. If not, issue an Error message 71806 and abort 71807 the process. If it is valid, push 71821 its FileRef on the stack. The process flows back to fetch another model-file entry 71811.

Figure 71:
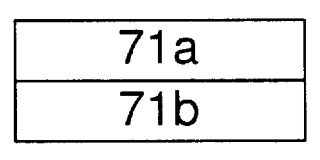
Figure 71A:
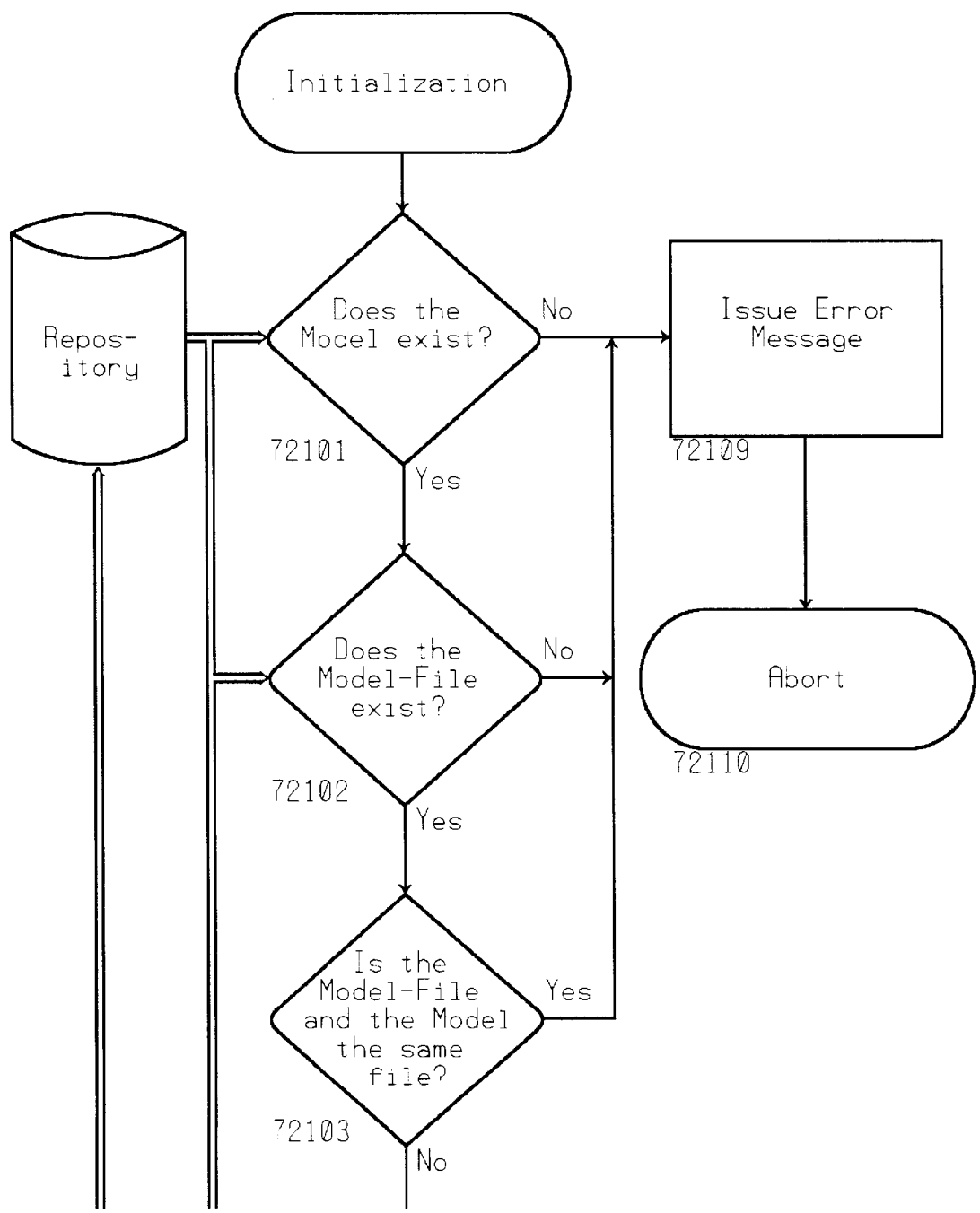
FIG. 71a and 71b describes the QRMFIADD Process.
Figure 71B:
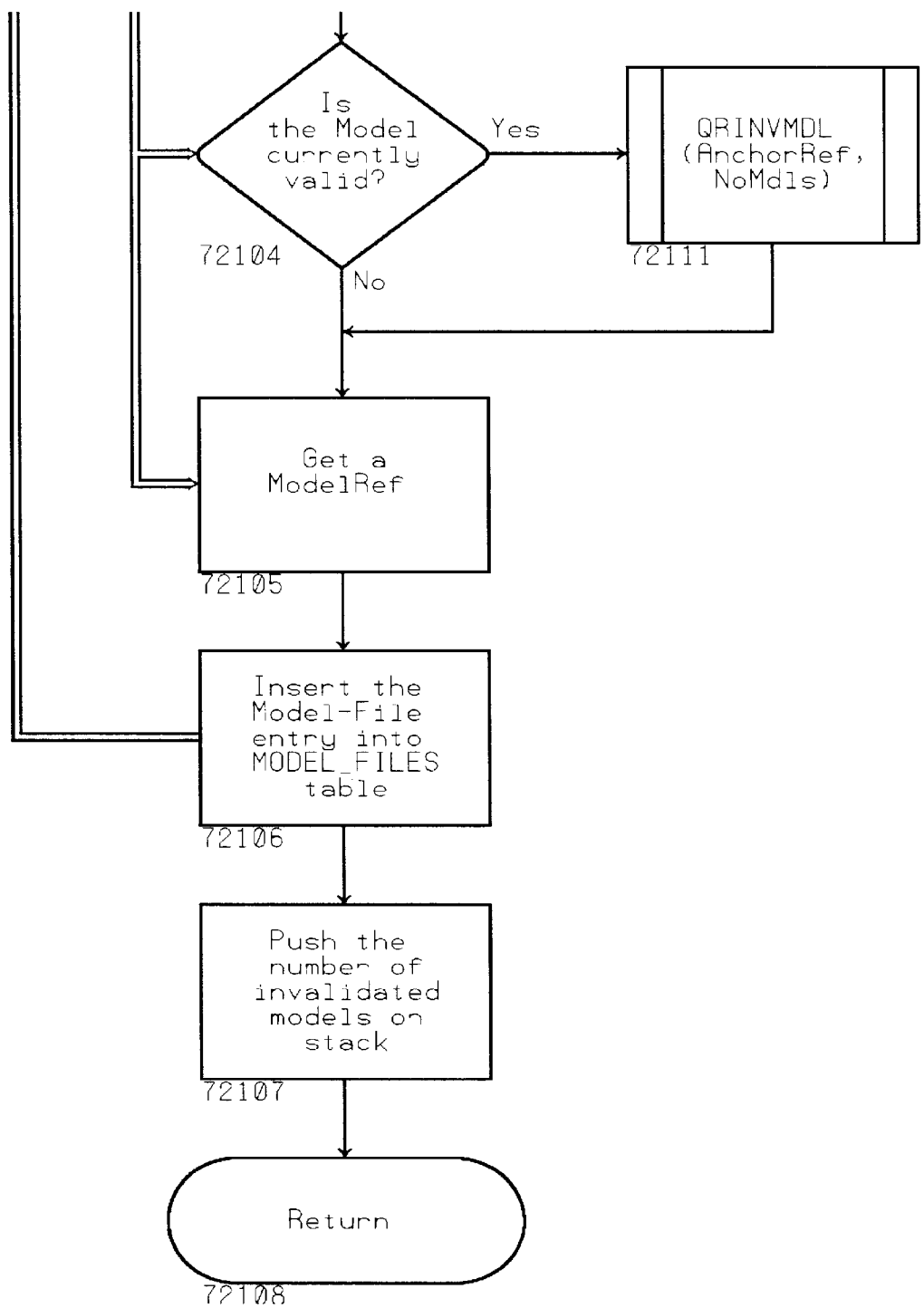
Figure 72A:
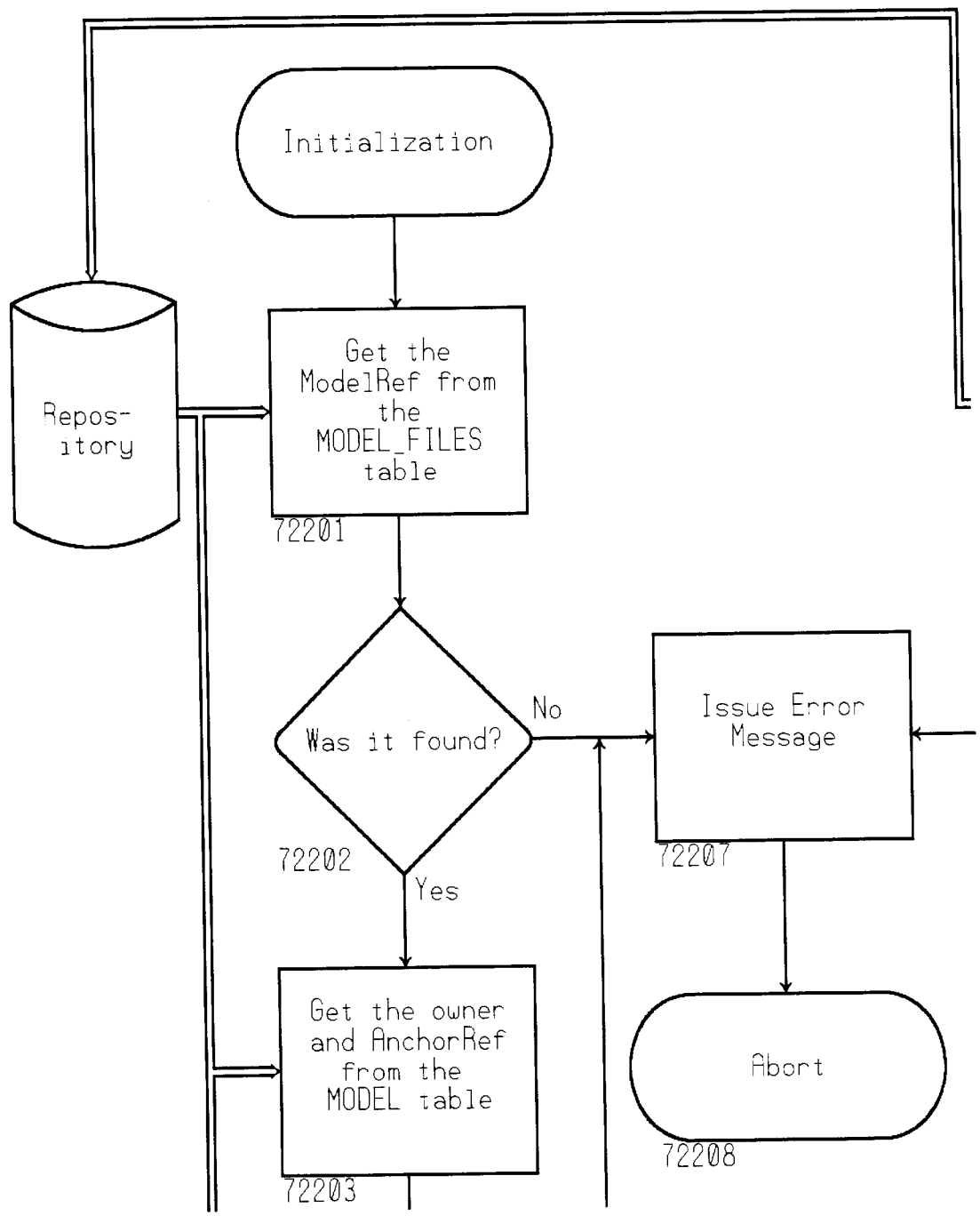
FIG. 72a thru 72d describes the QRMFIDEL Process.
Figure 72B:
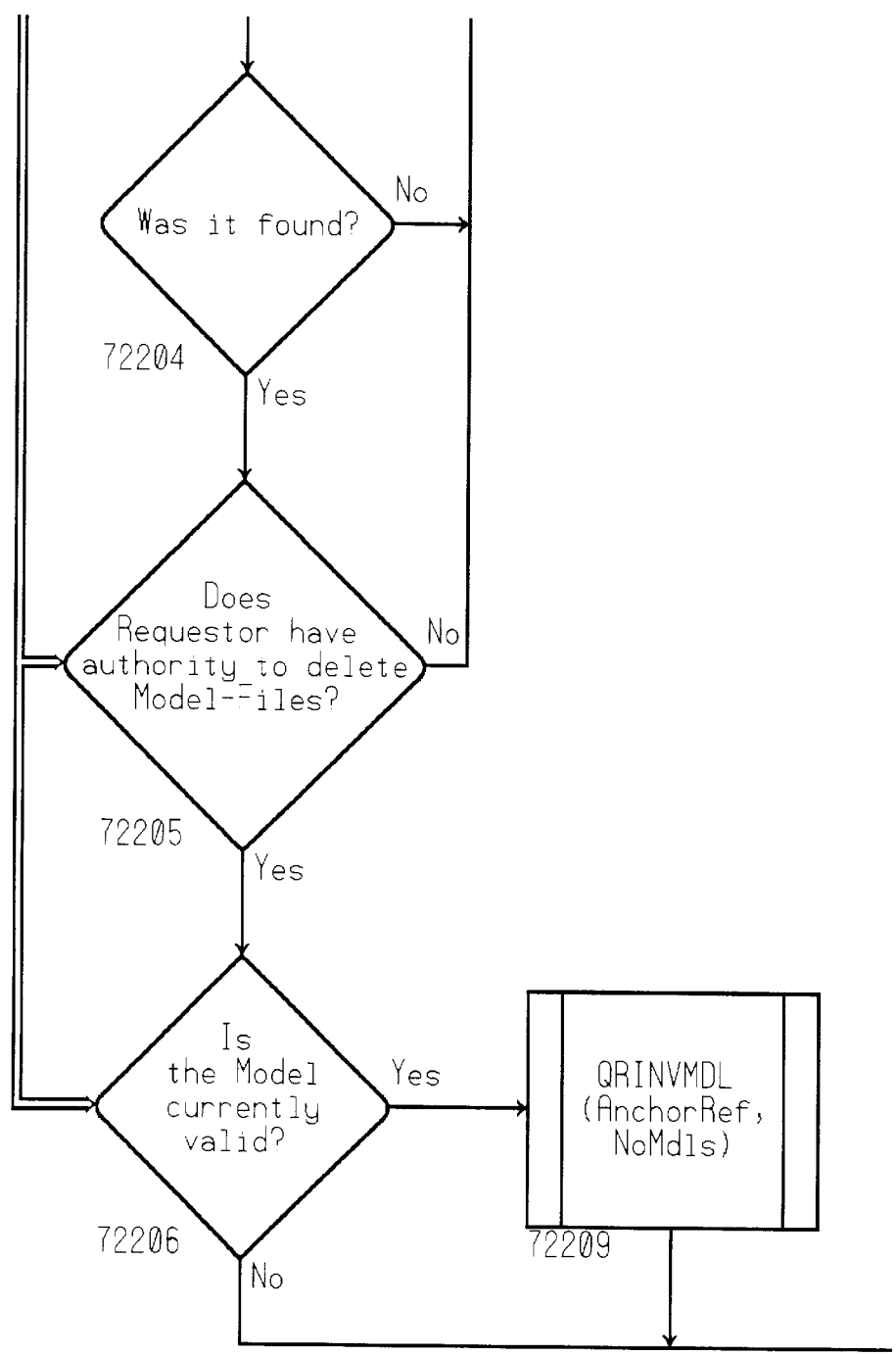
Figure 72C:
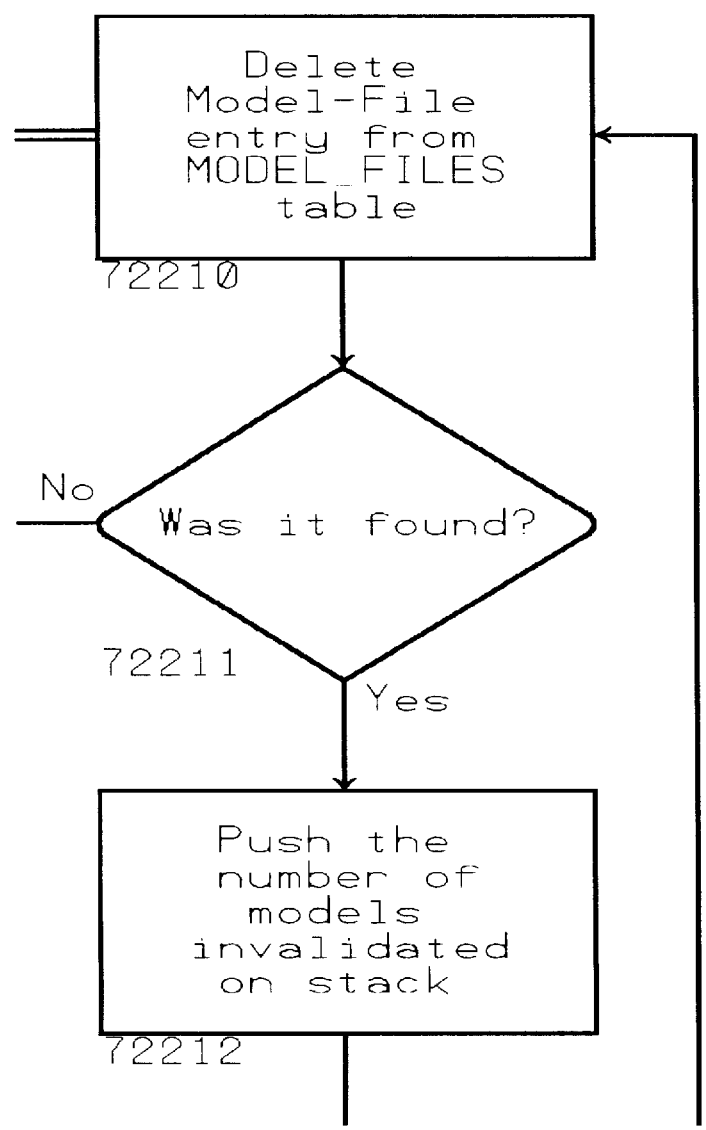
Figure 72D:
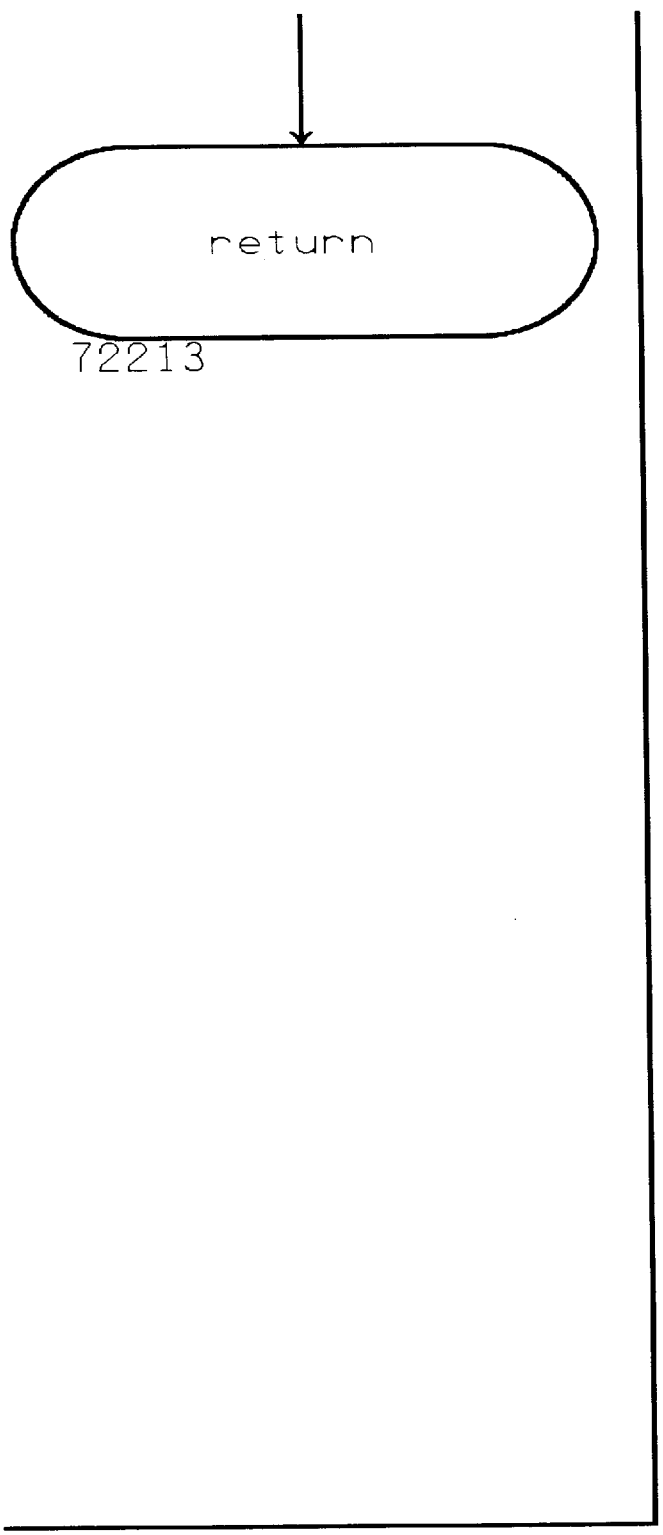
Figure 73A:
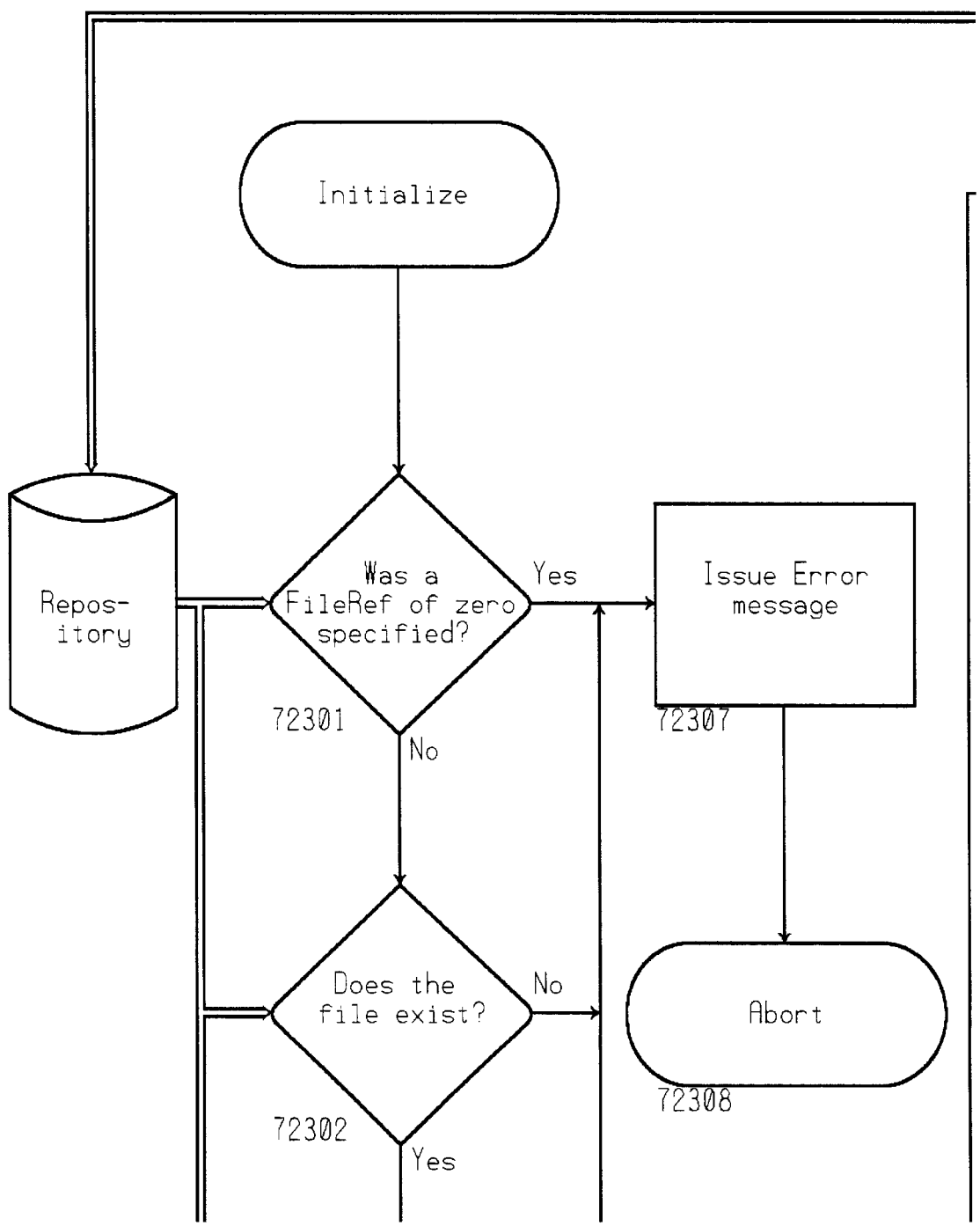
Figure 73B:
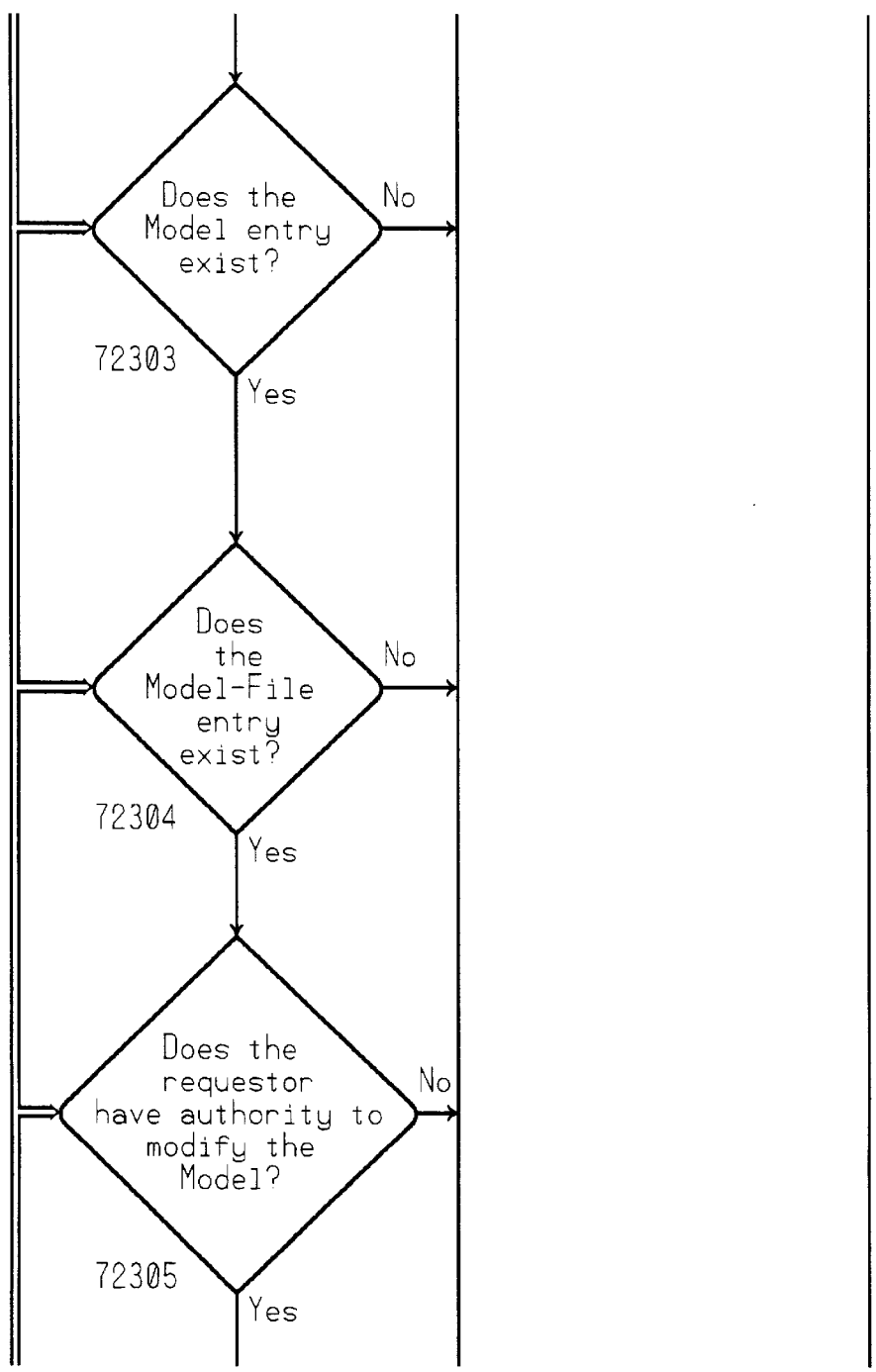
Figure 73C:
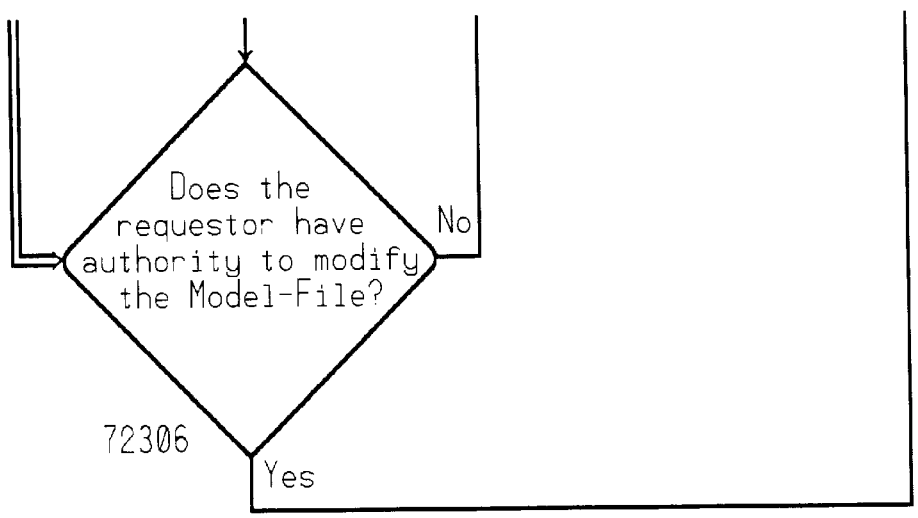
Figure 73D:
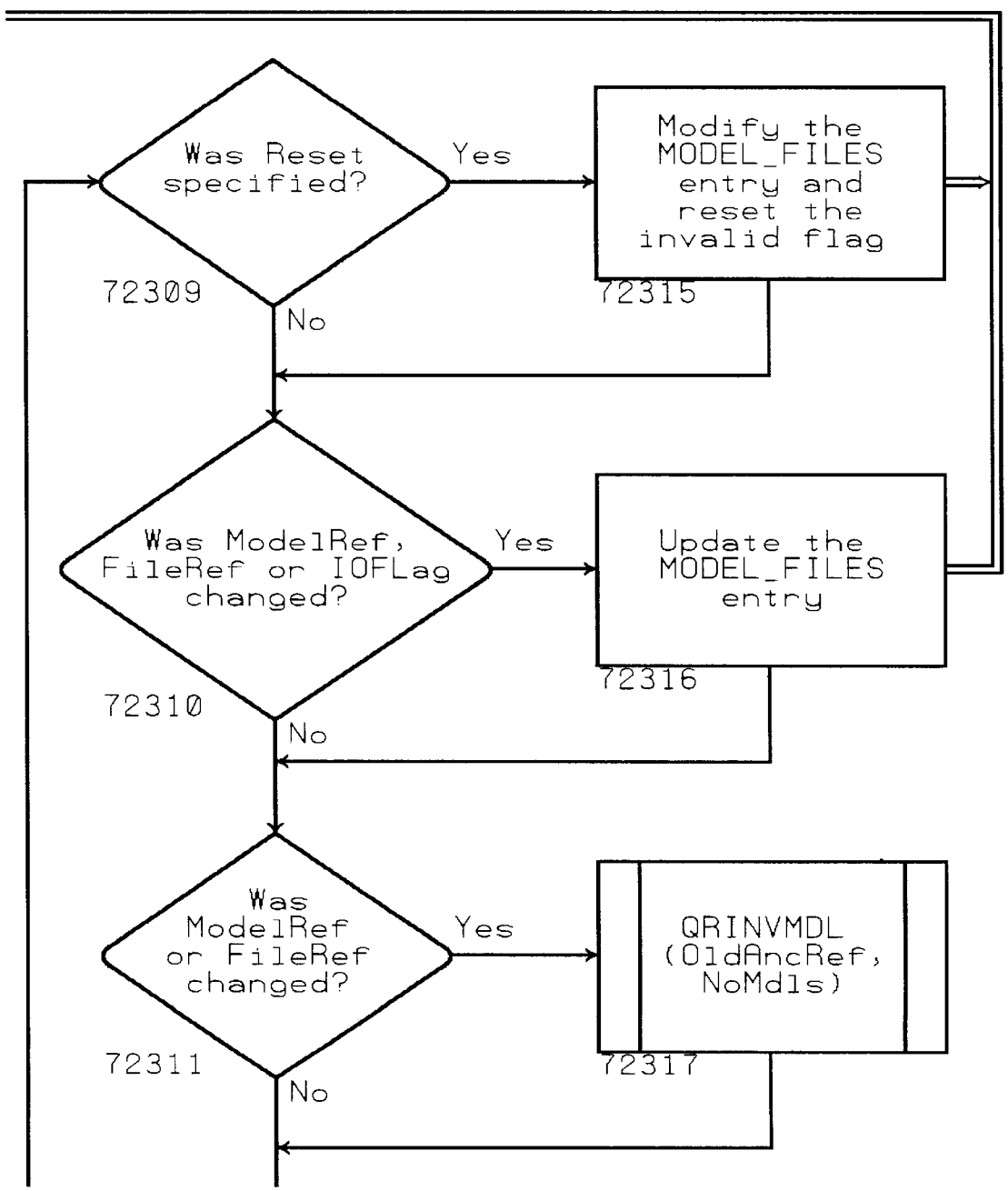
Figure 73E:
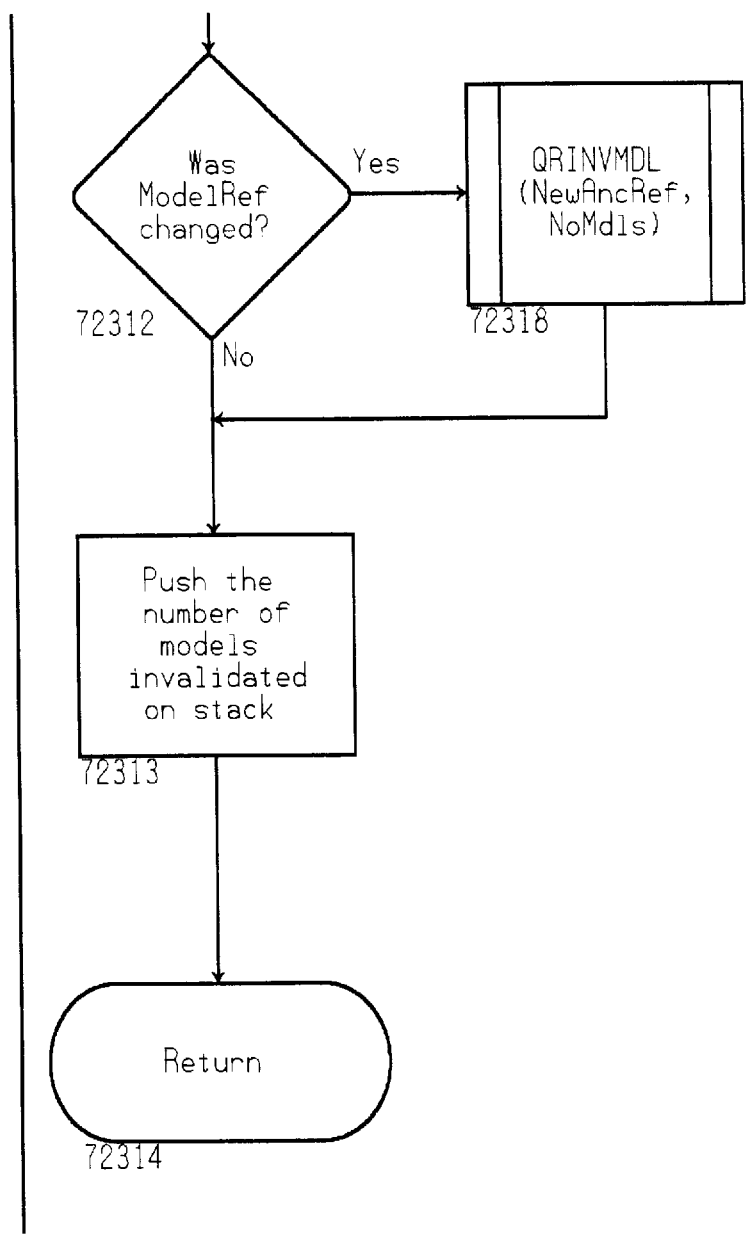
Figure 74A:
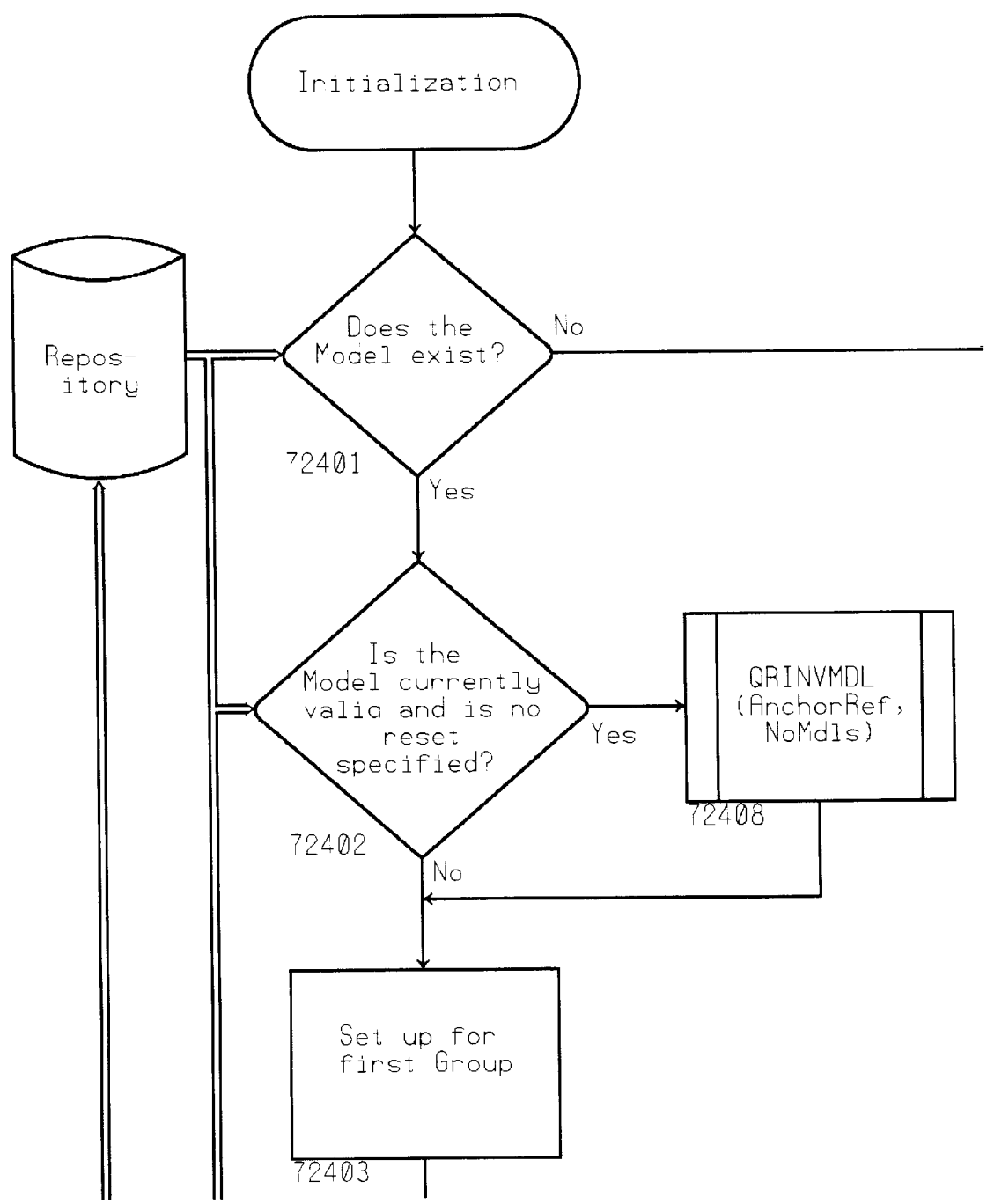
Figure 74B:
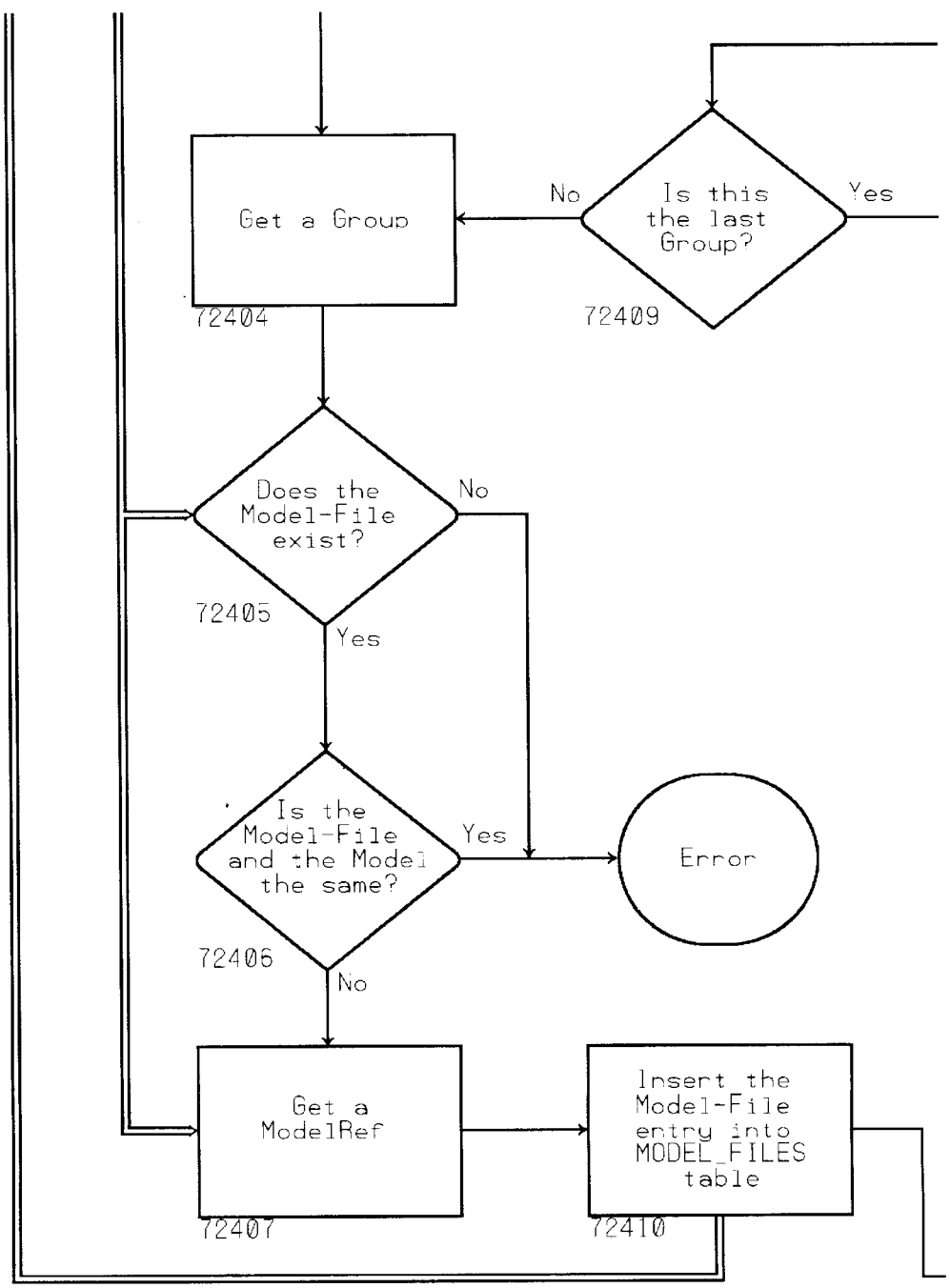
Figure 74C:
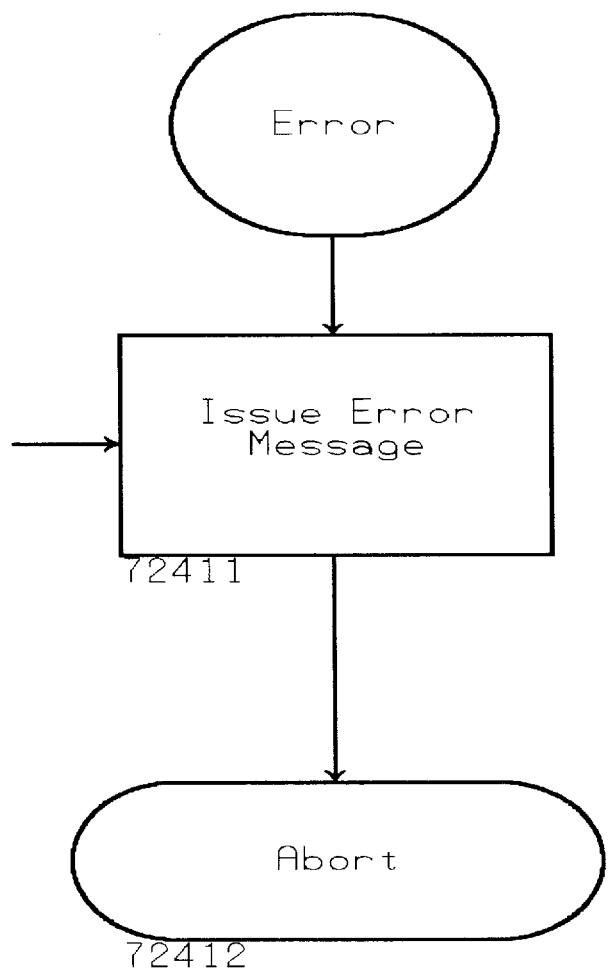
Figure 74D:
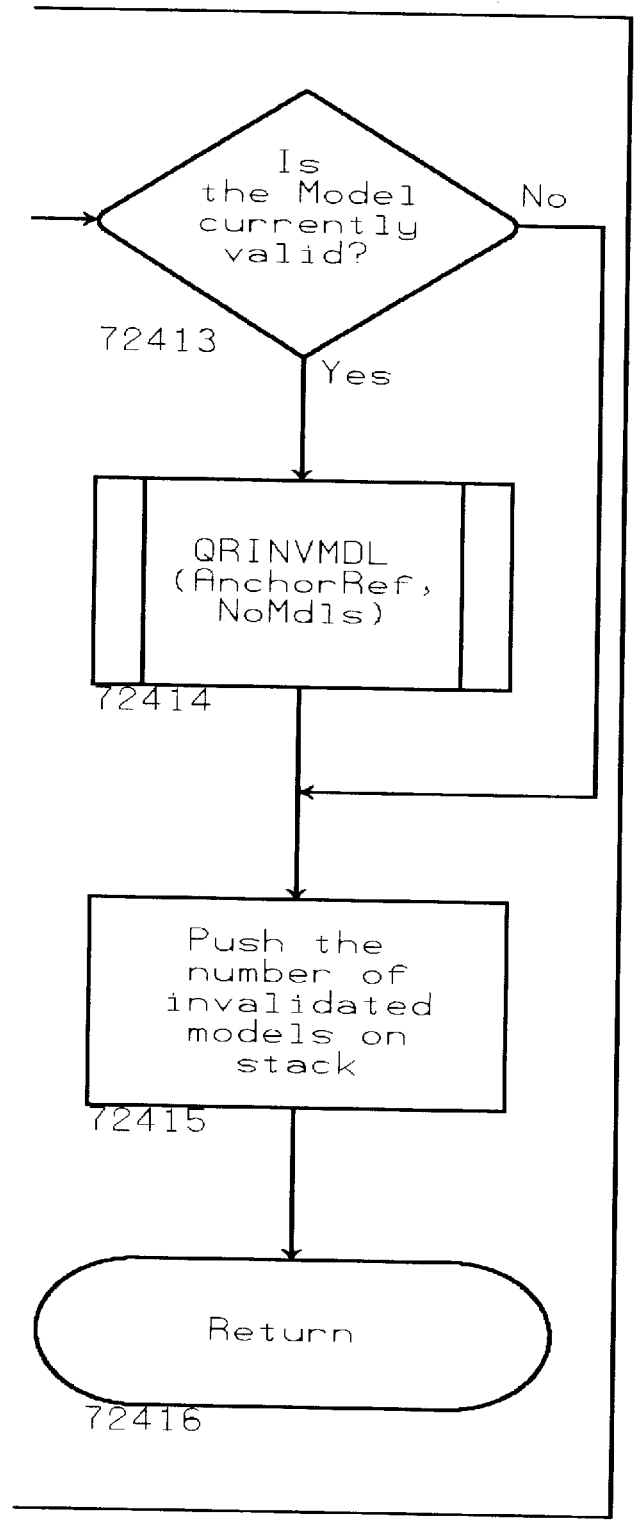

The QRMFIADD Process FIG. 71: This process is used add a file to a specified MODEL. After initialization, A check 72101 is made to determine if the model exists in the MODEL table in the Control Repository. If not, an Error message is issued 72109 and the process aborts 72110. If it does exist, A check 72102 is made to determine if the model-file exists in the FILES table in the Control Repository. If not, an Error message is issued 72109 and the process aborts 72110. Next, a check 72103 is made to determine if the model-file and the model are one and the same (which would cause a loop). If so, an Error message is issued 72109 and the process aborts 72110. Next, a check 72104 is made to determine if the model is currently valid. If so, the QRINVMDL process described in FIG. 61 is invoked 72111. In either case, a ModelRef is obtained 72105 from the Control Repository. The model-file entry is inserted 72106 into the MODEL_FILES table in the Control Repository. Next the number of models invalidated is pushed 72107 on the stack and the process returns 72108 to the requestor.

The QRMFIDEL Process FIG. 72: This process is used to delete a model-file entry from the MODEL_FILES table. After initialization, get 72201 the associated ModelRef from the MODEL_FILES table in the Control Repository. A check 72202 is made to determine if it was found. If not, an Error message is issued 72207 and the process aborts 72208. If it was found, get 72203 the owner and AnchorRef from the MODEL table in the Control Repository. Next, a check 72205 is made to determine whether the requester has MODEL DELETE authority. If not, an Error message is issued 72207 and the process aborts 72208. If so, check 72206 is made to determine if the model is currently valid. If so, the QRINVMDL process described in FIG. 61 is invoked 72209. In either case, The model-file entry is deleted 72210 from the MODEL_FILES table in the Control Repository. A check 72211 is made to determine if it was found. If not, an Error message is issued 72207 and the process aborts 72208. Next the number of models invalidated is pushed 72212 on the stack and the process returns 72213 to the requester.

The QRMFIMOD Process FIG. 73: This process is used to modify a MODEL_FILE entry in the Control Repository After initialization, a check 72301 is made to determine if a FileRef of zero was specified. If so, an Error message is issued 72307 and the process aborts 72308. If not, a check 72302 is made to determine if the file exists in the FILE table in the Control Repository. If not, an Error message is issued 72307 and the process aborts 72308. If so, a check 72302 is made to determine if the model entry exists in the MODEL table in the Control Repository. If not, an Error message is issued 72307 and the process aborts 72308. If so, a check 72304 is made to determine if the model-file entry exists in the MODEL_FILES table in the Control Repository. If not, an Error message is issued 72307 and the process aborts 72308. If so, a check 72305 is made to determine whether the requester has MODEL MODIFY authority. If so, a check 72306 is made to determine whether the requestor has MODELFILE MODIFY authority. Next, a check 72309 is made to determine whether RESET was specified. If so, Modify 72315 the MODEL_FILES entry and reset the invalid flag. Otherwise, a check 72310 is made to determine whether the ModelRef, FileRef or IOFlag was changed. If so, update 72316 the MODEL_FILES entry. Next, a check 72310 is made to determine whether the ModelRef or FileRef was changed. If so, the QRINVMDL Process described in FIG. 61 is invoked. Next, a check 72312 is made to determine whether the ModelRef was changed. If so, the QRINVMDL Process described in FIG. 61 is invoked. Finally, the number of models invalidated is pushed 72313 on the stack and the process returns 72314.

The QRSUPMFI Process FIG. 74: This process is used add a list of MODEL_FILES into a specified MODEL. After initialization, a check 72401 is made to determine whether the model exists in the MODEL table in the Control Repository. If not, an Error message is issued 72411 and the process aborts 72412. If it does exist, a check 72402 is made to determine if the model is currently valid and that RESET was not specified. If so, the QRINVMDL Process describe in FIG. 61 is invoked. In either case, preparations are made 72403 for the first group. The following steps will be followed for each group. First, get 72404 a group. Next, A check 72405 is made to determine if the model-file exists in the FILES table in the Control Repository. If not, an Error message is issued 72411 and the process aborts 72412. Next, a check 72406 is made to determine if the model-file and the model are one and the same (which would cause a loop). If so, an Error message is issued 72411 and the process aborts 72412. If not, a ModelRef is obtained 72407 from the Control Repository. The model-file entry is inserted 72410 into the MODEL_FILES table in the Control Repository. A check 72409 is made to determine if this is the last group. If not, the process flows back to get a group at 72404. If so, check 72413 is made to determine if the model is currently valid. If so, the QRINVMDL process described in FIG. 61 is invoked 72114. In either case, the number of models invalidated is pushed 72415 on the stack and the process returns 72416 to the requester.

The present Aggregation Manager also incorporates a special type of Model known as a File Group. These Models consist of a Master and one or more Subordinate files. These Master and Subordinates share the same Filename, Library, Version, and Level at all times. They are defined by the Data Manager using our Data Management Configuration Utility. Once defined, the File Group is automatically assembled when the Master is promoted into the DMS, and the File Group automatically moves through the DMS whenever the Master is promoted. Subordinates are either Required or Optional, with promotions automatically failing when Required Subordinates are absent. The Data Manager may also elect to have upper-level Subordinates automatically erased prior to the lower-level File Group promoting into that level. This features prohibits an optional member of a lower-level File Group from inadvertently being associated with the Master of an upper-level File Group.

PREFERRED EMBODIMENT OF OUR OVERALL PROCESS MANAGEMENT (4.0)

The present invention is designed to work specifically with a Data Management or Design Control system. It employs various mechanisms for launching processes while data is stable or moving through the system. Data integrity is maintained before, during and after process execution even if processes are executed in parallel, on different software machines, in different environments or in a deferred manner. As illustrated various Library Manager functions can interact with other aspects of our invention as illustrated by FIGS. 80–87. Some interactions are illustrated as discussed in Section 4.100.

Incorporated into this invention are two independent approaches to executing and tracking processes in a quality controlled environment. The first approach, denoted Automated Library Processing, allows any application, program or tool to be launched using input data from a Data Management system. These tools interface with the present invention through a robust Application Program Interface, which enables the process to record results and store output data into any Data Control Repository. This repository may be constructed out of flat files or an apparatus such as an object oriented or relational database.

These process results can be used as criteria to control movement of data through the system, or they can simply be status indicators for informational purposes. The results can even be used to control data movement at levels other than that at which the process is invoked.

Software processes can be invoked and executed in a user's environment, or the user may send requests to automated service machines which actually perform the processing. The Data Manager, who is responsible for defining the processes, has a choice of arranging the service machines in three different configurations to maximize process efficiency.

Processes can be defined to be launched automatically upon movement of data through the Data Management system, or they can be initiated by the user while the data remains stable. A sophisticated interlocking mechanism ensures processes are executed in the proper order regardless of the arrangement of the service machines. In addition, data integrity is maintained throughout the operation, and results are automatically invalidated or eradicated upon updates or removal of the source data. The present invention interacts with the Lock Manager to ensure source data is properly locked while processing is underway.

Different processes may be defined for different types if data or for the same type of data residing at different levels and/or versions of a given Data Management library. Each process has it's own set of criteria, which can be any boolean type of expression that evaluates to true/false state. The criteria can be defined as loosely or as tightly as desired by the Data Manager to achieve an infinitely adjustable quality level for the system. Each process can have a unique set of run-time parameters defined by the Data Manager, but able to be overridden by a user at the time of initiation. Lastly, each process can possess unique run-time environment requirements, such as required disk storage space or memory.

Included in the present invention is a Data Manager utility for defining and editing the processes which can be arranged to run prior to movement among levels, after movement among levels, with no movement of data. In addition each process can be executed upon initiation or deferred to a programmable time. The processes can be defined to run on multiple operating system platforms since our invention incorporates a cross platform communication device for transferring data and work requests to software machines running on different platforms. The utility also interacts with the Authority Manager to provide a means for authorizing users to run any or all of the defined processes and setting results. This authority can be very broad thus allowing a user to initiate any process in the system, or it can be limited to processes for a specific level, version and data type within a particular library.

The second approach employed by the current invention is denoted External Data Control. This apparatus is means of providing a secure controlled environment to transfer results and data into a Data Management system from a process executed outside of a Data Management system. Although the Application Program Interface mentioned in the first apparatus can encapsulate almost any third party tool, there are times when it's advantageous to permit results generated outside of a Data Management environment to be used as quality control records. External Data Control allows this by providing a mechanism to safely package and transport all data and results involved in a process into a Data Management system.

The present invention permits these external results to replace or override any existing Library Process. In certain processes, especially hardware design environments, designs must be iteratively exercised numerous times before a satisfactory result can be achieved. To improve design control, it's often necessary to repeat these tasks under a controlled environment so the result can be officially recorded. External Data Control improves efficiency by allowing the result generated outside of the environment to become the "official" result, thus eliminating the need to repeat the task.

Since significant time may pass from the completion of the task and the desired transfer of results into the Data Management system, a mechanism exists to detect changes made to the data or any critical resources required to execute the process. Thus data integrity is maintained by ensuring that the result corresponding to the data and resources used to achieve the result are still valid.

In addition to simply storing results, it enables results to be compared against predefined criteria prior to entry into the Data Management system. These results can be used as promotion criteria to control data movement through the system, or simply as informational status indicators.

External Data Control provides interfaces to permit the creation of an Aggregate Bill of Materials, ensure proper ownership of data entering the Data Management system, and allow problem, part number and release tracking information to be associated with the data.

Automated Library Processing

Our invention incorporates a concept called Automated Library Processing which enables an Automated Library Machine to launch or execute tasks and record results against files residing in the Data Management System. These tasks can be specifically written to run as Library Processes or they can be third party tools which are encapsulated into a Library Process via the Application Program Interface provided with the Process Manager. Our invention permits Library Processes to reference or modify existing data in the DMS or create new data and deposit it back into the DMS.

In our preferred embodiment, Library Processes run on Automated Library Machines because this gives the Data Manager incredible flexibility in balancing workloads and taking advantage of the various configurations available. The following configurations are supported by the Automated Library Processing algorithm:

Conventional System In this arrangement a single ALM performs all Library Processing as well as file manipulation (promotions, deletes, installing new files, etc.). Suppose a file needs to be moved from Level A to Level B and once at Level B a process is required to run against the file. In a conventional system a single ALM would accept the promote request, promote the file from Level A to Level B, and execute the Library Process. If the process results in new data being generated, this ALM would also install the new file into the DMS.

Remote Execution Machines This arrangement is a Conventional System with additional ALMs who only perform Library Processing. Our invention supports an infinite number of remote execution ALMs. The Data Manager can direct any process to any ALM, including the main ALM, which performs the file manipulation. In this environment all requests begin at the main ALM, and if necessary, Library Processes are distributed to the remote ALMs. Upon completion of the tasks, all output data is returned back to the main ALM for deposit into the DMS.

Actor/Object This environment is the most advanced as it permits an unlimited number of ALMs arranged in any combination of file manipulation and Library Processing machines. The arrangement can consist of a pool of ALMs which handle file manipulation and any Library Processing required as part of the manipulation. In other words, each machine is a full service machine who performs all the steps necessary to manage the data. However, a more complex arrangement would consist of a pool of full service ALMs coupled with a pool of remote execution machines. This allows the Data Manager the flexibility to reserve certain machines for dedicated processing.

Although our invention accompanies all of the Automated Library Machine configurations stated above, it can also support an environment with no Automated Library Machines. Since the algorithm only requires a formatted request file and libraried data as input, one skilled in the art could envision a very simple client/server environment where a Library Process is manually initiated on a client machine, and all communication with the DMS is done directly through the client machine. Of course, some of the more robust features such as automatic recirculation of requests would be replaced with manual intervention.

At the user level there are two methods for initiating a Library Process. One way is automatic processing triggered by file promotion. Our invention permits two types of processing to support Library Initiated Processing:

Foreground Processing refers to any processing run on the user's client machine. This processing is interactive and may require the user to enter information required by the Library Process. For example, a Library Process which performs physical design checks on a circuit may use a Foreground Process to present a menu of available checks for the user to select from. The Foreground Processes are automatically launched as part of the File Promotion algorithm.

Background Processing (Pre and Post) refers to the processing actually executed on the ALM. Pre process are executed prior to the promotion and are used as promotion criteria for the target level. In other words, if the Data Manager defines the physical design checks process as a Pre at Level B, then the file must pass those checks according to defined criteria in order for the promotion to complete successfully. Post processes are executed after the promotion of the file to the target level. These processes are used as criteria for promotion to the next level. Referring to the physical design checks example again, redefining it as a Post would permit the file to be promoted to Level B regardless of whether the checks passed or failed the criteria. However, the file would not be allowed to promote to the level above B if the checks fail the criteria.

The second method is known as Designer Initiated Library Processing or DILP. Unlike the first method which requires file movement to trigger it, this method operates on stationery files residing in the DMS. The user invokes a utility which allows the user to select the desired processes. If the selected processes require foreground processing, it is immediately invoked. In our preferred embodiment a request file is generated and sent to an ALM for background processing. As stated above, an ALM is not required as one skilled in the art could envision the foreground step presenting the request to the background step within the user's client machine.

Air order to facilitate encapsulation of third party tools into Library Processes our invention provides a Library Process Application Interface. This API permits the author of a Library Process to communicate with the Process Manager to acquire the input files to process and deposit the process result and any output data into the Data Management System.

The API addresses input arguments in the form of a standard linkage which acts as a port to enable the Library Process. There are 10 standard parameters plus any optional parameters which the Process Manager makes available to every Library Process. Each parameter may consist of one or more tokens to convey the necessary information depending on the environment. They are described in the following table:

Table 19 on page 229 is a list of the 10 standard input parameters of an LP.

TABLE 19

Standard LP Parameters

| Parm Number | Parm Name | Parm Description / Meaning |
|---|---|---|
| 1 | DIL | Type of Data Information Library. Parm values are:<br>• "DIL-R" - with Relational Database |
| 2 | Temp Space | Location of the temp-disk on which data can be R/W |
| 3 | LIST_FILE | FileID of list of files to be processed |
| 4 | MSG_FILE | FileID of file for messages |
| 5 | OP | Type of DIL-R operation being performed. Parm values are:<br>• "PUT" - Put a file into an 'entry' level of the library<br>• "PROM" - Promote a file to the "next" level of the library<br>• "MPRO" - Promote a BOM to the "next" level of the library<br>• "DILP" - Designer Initiated LP of an already libraried file |

TABLE 19-continued

Standard LP Parameters

| Parm Number | Parm Name | Parm Description / Meaning |
|---|---|---|
| 6 | PP | Indicates WHEN this process is invoked with respect to file movement.<br>Parm values are:<br>• "PRE" - Library account execution prior to file movement<br>• "POST" - Library account execution after file movement<br>• "DES" - Designer account execution (foreground) (for FLIP and foreground part of DILP)<br>• "LIB" - DIL-R Library account execution (background) (for background part of DILP)<br>• "CHECK" - trial execution of LP in "check-mode" for file synchronization |
| 7 | FRLL | From library-level |
| 8 | TOLL | To library-level |
| 9 | REQR | E-Mail address of sender of request, or requestor |
| 10 | '(' | Optional parm delineator |
| 11+ | LP args | DIL-R default parms and override argument parms and/or another '(' plus DIL process options |

Note: For a DILP, "frll" parm equals "toll" parm.

As stated above, the third parameter denotes the input file list. This list is generated by Step 38504, submit Jobs, in FIG. 83a. For any Foreground processing, including the foreground portion of a DILP, the list contains one record for every file being processed. The following information about each file is included in the record:

Filename
Library
Filetype
Version
Level

During Background processing, the list contains all the above for each file plus the File Reference number.

Upon completion of the Library Process, the LP author is required to follow certain rules which ensures the output will be properly handled by the Process Manager's Background Processing Algorithm in FIG. 83.

The LP must complete with a return code which is known as the LP result.

The author may return a 120 character message or comment which must be preceded by the keyword *MESSAGE*. This must be returned prior to any output files, and will be recorded in the process tables with the LP result.

The author may instruct the Library Manager to set a result against a "sister" LP by returning the keyword *OVERRIDE* followed by the name of the LP, the result, and an optional message.

If the LP encounters terminal errors, the author can return error messages in lieu of output data. Otherwise, if the LP completes successfully, the only thing returned after the optional message should be output data.

If the LP generates output files, the filename and filetype must be returned in the same line. If nothing else is specified, then the Version and Level information stored with the process definition will be used to dispose of the file. Otherwise the LP author may use one of the disposition types defined below to specify a different Level and/or Version. The LP may also return a list of 1 or more Source Reference numbers which are the File Reference numbers of the any input files used to generate the output data. These numbers are placed on the same line as the output filename and filetype, but are separated by a left parenthesis. If more than one Source Reference is returned, they should be delimited by commas.

The keyword Now may be used to force an immediate disposition of the file.

The keyword Norefs may be used when an existing file is being modified to force the DMS to retain the same File Reference number while depositing the modified file into the repository.

If the LP author desires to use the High Performance Install, then one file must be installed using the Anchor option and the remaining files can use the Component option. In addition, if the Anchor option is used to install an output file of a different type from that which the process is defined against, a special Inst keyword must also be included in the record.

If the LP is a Create DILP, the output file for which the result should be recorded must use the Create option.

The following disposition types are supported. Keywords in angled brackets "< >", are optional.

Install <Now> <AT Level Version> <Norefs>
Store <Now> On repository
Send To e-mail_address
Anchor <AT Level Version> <Norefs> <Inst>
Component <AT Level Version> <Norefs>
Create <AT Level Version>

Note: The Norefs and Inst keywords are not both permitted with the Anchor type of disposition.

Our LP API provides a pre-check capability which allows the LP author to indicate to the Process Manager any file dependencies which may be required to complete the process. In order to use this capability the first record of the LP must contain the keyword @Check!. Upon encountering this keyword, the Process Manager Background Processing Algorithm will run the LP in check mode which means the sixth argument passed in will be Check. The author should code the LP to immediately return a list of file information, which should include the Package, Version, Level and Filetype of each file required for the LP to succeed. These files are in addition to the input files being processed.

DILPs also serve as recovery mechanisms for failed Post-Processes. Since a failed Pre-Process prevents the promotion of the file, the recovery mechanism is as simple as fixing the problem and retrying the promote. However, for Post-Processes, the file has already reached its destination. If a Post-Process fails, this would necessitate checking the file out of the repository and re-promoting it just to initiate the Post-Process again. DILPs eliminate this inefficiency by allowing the user to initiate the Library Process without requiring file movement. The detailed algorithm demonstrates how a good result from a successful DILP can be used to override a bad result from a failed Post-Process for purposes of promotion criteria.

Most of the time it's desirable for the DILP result to be associated with the input data files used to drive the process. However, there can be occasion where it's advantageous to record the DILP result against the output file created by the DILP. Our invention offers this capability through a feature called a Create DILP. Since all DILPs must execute against libraried files with valid File Reference numbers, our preferred embodiment uses a "dummy" file as the catalyst to drive the steps in FIG. 79. The user enters the name of the output file, and that information is used in the Background Processing Algorithm to invoke a special file disposition routine which not only deposits the information into the Control Repository, but transfers the result of the DILP from the dummy file to the output file. An alternate embodiment could also use a special keyword in place of a "dummy" file, which could permit the DILP to execute and properly associate the DILP result with the output file.

FIG. 79 shows the flow of a DILP. Step 38101, Data Entry, presents the menu illustrated in FIG. 80 to the user. The data entry screen gathers all the necessary information regarding the file(s) to be processed. This information is passed to Step 38102 for Foreground Processing. Our invention also permits Step 38102 to be invoked directly through command line arguments or via a third party tool. The only requirement is that the same information gathered in Step 38101 is included in the invocation. Once the appropriate information is gathered in the foreground, it's transmitted to Step 38103 for Background Processing. Step 38103 is depicted in more detail in FIG. 83a and is also used to execute Library Initiated Processes.

Returning to Step 38101, our preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2 (tm) application environments.

The screen, depicted in FIG. 80, contains five data entry fields, labeled 38211 thru 38215. Field 38211 is where the user types in the Name of the file. The user may type the name in directly or leave it blank to generate a selection list which allows the user to choose multiple files to process. Field 38212 denotes the Name of the Library where the file(s) reside. This function is only intended for data tracked in a public library, therefore this field must contain the name of a valid public library. Drop down menu button 38217 can be used to obtain a list of all the public libraries in the DMS.

Fields 38213 thru 38215 are used to enter the Library File Type, Version and Level where the file(s) reside. Button 38218 will display a list of the valid Library File Types used in the Library, button 38219 will show all valid Versions and button 38220 will display all valid Levels. This information is used to initiate a library search for the file specified in field 38211. If the file is specified, but doesn't exist at the specified location, the program displays an error message and gives the user a chance to correct it or abort the program.

If field 38211 is left blank, a selection list resulting from the library search will be displayed and the user may select as many files as desired. If more than 1 file is selected the user is prompted for the number of requests to be initiated. For example, if the user selects 6 files, and responds to the prompt with an answer of 2, then 2 requests with 3 files in each will be initiated. This feature permits the user to break a grouping of files into multiple jobs to exploit a parallel processing environment. For each request initiated, Steps 38102 and 38103 of FIG. 79 will be executed in their entirety. The File List button, 38216, is used to indicate that Filename field, 38211, contains the name of a text file which contains a list of libraried files to process. This allows third party tools to create a list of files to run DILPs against. In this special case, all the information relating to Library, Version, Level and Filetype is acquired from the text file, and fields 38212 thru 38215 are ignored.

Field 38221 is optional for regular DILPs and only pertains to Create DILPs. It allows the user to fill in the Filename of the Create DILP output file. The user must have advanced knowledge of the Create DILP process to ensure the proper name is filled in. This information is transmitted to the background and used to transfer the process result from the dummy input file to the Specified file, after it is created and safely deposited into the repository.

The only option is button 38222, Override Parms. When selected, this enables a special screen to be displayed which contains the process run-time parameters for any selected processes. The screen is editable and allows the user to override or change these run-time parameters. A notification is sent to the Data Manager from the background processing algorithm. Upon hitting enter, control is transferred to Step 38102 of FIG. 79.

The detailed implementation of Step 38102, Foreground Processing begins with Step 38310 in FIG. 81a. Since a DILP can be requested for a list of files that could belong to different Package, Version, Level and be of different types, Step 38310 is employed to establish a PVFL Loop. If the request is only for a single file, the loop will have a duration of one pass. However, if a list of files is presented, the list will be sorted by Package, Version, Filetype and Level, and all of the steps in this algorithm will be executed for each PFVL.

Step 38312 Checks User Authorization to ensure the user is permitted to request a DILP for the given PFVL. This requires a query to the Control Repository which responds with the authentication. If the user is not authorized, the foreground processing is terminated with an error message displayed to the user. If the user has global DILP authority (i.e. can request a DILP for any Level, Version and Filetype in this Package), this is remembered so any subsequent passes through the PFVL loop for files of the same Package would not require additional queries to the Control Repository.

Once the user has been authenticated, Step 38314 is employed to Acquire Library Processes. Once again a request is made to the Control Repository to return a list of all the DILPs defined at the current Package, Version, Filetype and Level. Step 38316 immediately follows to Arrange Library Processes into single independent processes or dependent process strings. A user is only permitted to select the first process in a dependent string, so this arrangement becomes the basis for a Bucket. Once the processes are arranged into Buckets, Step 38318 is invoked to Eliminate Duplicates Since the DMS permits two identical Library Processes or LP dependent chains to exist in the same Package, Version Level and Filetype, Step 38318 improves user friendliness by ensuring only unique choices will be presented to the user.

At this point the algorithm determines whether a specific Library Process was requested via a command line parameter. Our invention permits Step 38102 of FIG. 79 to be initiated through a command line interface that includes a Nomenu option followed by the name of an existing Library Process. If this invocation is used, Step 38320 results in a single pass loop. On the other hand, if Step 38102 of FIG. 79 is driven by the data entry screen in FIG. 80, then Step 38320, Selection Loop, of FIG. 81a will display a selection screen of the Buckets assembled in Step 38316. The user can select any independent process or the first process in any dependent chain. Any attempt to select any other process in a dependent chain prompts the user to select again.

Upon selecting a valid candidate, Step 38322 checks to see if the Override Option is requested. If so, this results in Step 38324, Edit Args displaying another screen with the process arguments for the selected process. The user can edit any of these arguments, and the new arguments will be transmitted and used in the background. Since these arguments may potentially violate a rule or regulation, notification is sent to the Data Manager when the process executes in the background.

At this point control proceeds to Step 38326 in FIG. 81*b* to Create Buckets. A Bucket is a formatted file containing all the necessary information to execute a single independent Library Process or all the LPs in a dependent string. FIG. 82*b* depicts a Bucket in detail, and the contents are described later.

Note: The File Reference numbers are absent from DILP Buckets due to the fact that a file list can be created without accessing the Control Repository. The Process Manager allows this since Step 38519, in FIG. 83*c*, of the Background Processing Algorithm will acquire and insert the correct File Reference numbers. Once the Bucket is created, all the files selected for processing are written into a DILP LIST. The API requires a DILP LIST to exist for reference by the Library Processes in the Bucket.

Step 38328 establishes a Process Loop in order to execute Steps 38330 and 38332 for each process in the Bucket. Step 38330, Run Library Process, actually runs the Library Process in Foreground mode. This permits the LP to interact with the user in order to gather any information required to run the process on the ALM. The foreground processing is optional and can be bypassed if the LP doesn't require any user input.

In Step 38332, the return code is examined to see if RC=0. The API requires the LP author to return a zero completion code from the foreground portion of the DILP if all requested information is successfully gathered. Otherwise any non-zero return code causes the program to terminate. A return code of zero returns control to the top of the Processing Loop in Step 38328, and the loop repeats until all Library Processes in the Bucket are executed in the foreground.

Upon completion of the Processing Loop, control proceeds to Step 38334 which Creates the DILP Job File. The Job File contains all the Bucket information in addition to a header indicating the type of request and any run-time options to be employed in the background. Control proceeds to Step 38336, Xmit Request, which is responsible for sending the Job File to the appropriate ALM's reader. In our preferred embodiment, this ALM can be a Conventional Library Machine, Remote Execution Machine or an Actor employing an Automated Reader mechanism to queue and process Job Files.

Returning to FIG. 79, the information collected during the Foreground Processing in Step 38102 is transmitted to Step 38103 for Background Processing. In our preferred embodiment, this would be performed on an Automated Library Machine, but one skilled in the art would see this can also be directly executed in a client environment that has access to the DMS. Since this step is identical for Library Processing initiated by a DILP or Promote request, the detailed algorithm is discussed later.

Most of the time it's advantageous to execute Library Processes as soon as they are initiated. However, there are times when it's desirable for the user to request a process to be deferred to a later time. Our invention supports deferred processing whereby the request is received and partially processed. A special deferred request is generated and distributed to the appropriate ALM. The ALM accepts the request, but rather than executing the process it holds onto it. Incorporated into every ALM is an automatic timer that wakes up every hour and looks for any deferred requests. Upon finding one, it reads the first record to determine if the requested start time is equal to, or later, than the current time. If not, then the time hasn't arrived to initiate the process, and the code exits leaving the deferred request intact. However, if the time criteria is met, the code reads the remaining control information into a Job File and separates any foreground processing information into the ALM's working space. Control is then passed to the Background Processing Algorithm at Step 38540 in FIG. 83*e*. This algorithm processes the request as if it were just initiated. It is discussed in more detail later.

Our invention also permits processes to be independent or chained together as a string of dependent processes. This can be illustrated with an example where two Processes A and B are defined for a given Package, Version, Library File Type and Level. If they are defined as independent, then both will be executed regardless of their outcome. If they are defined as a dependent string, then the first one in the chain is executed. It must complete successfully in order for the other process to be attempted. By definition, successful completion of one process in a dependent chain implies that all previous processes in the chain completed successfully.

The Data Manager can define any Library Process to be a Pre, Post, or DILP. In addition, multiple Library Processes can be grouped into any combination of independent and dependent strings. Finally, any independent LP or dependent string of LPs can be defined to run immediately or to run in the deferred mode. The Data Manager uses our Data Manager Configuration Utility to define a Library Process.

Occasionally it's necessary for a file or group of files to be exempt from processing. Our invention provides a simple mechanism to mark files for process exceptions without the need to remove or alter the process definition. It's done through in interactive File Exception Utility. FIG. 84 illustrates the File Exception Screen which depicts fields 38211 thru 38215 which are identical to the DILP data entry screen in FIG. 80. Also present on FIG. 84 are drop down menu buttons 38217 thru 38220 which are also identical to those found in FIG. 80. The difference is the radio buttons, 38623, which comprise the Process Type selection. The user is required to choose Pre, Post or Designer Initiated. Upon hitting enter, the program checks to see whether the Filename field, 38211, is blank. If so, a library search is initiated to present a selection list of files to the user. On the other hand, if a filename is filled in, the Control Repository is queried to ensure the file really exists. If not, the user is notified and the program aborts.

Upon resolving the file(s), the Control Repository is queried to return all the processes of the chosen type for the given PFVL. The user selects the processes that are to be exempt for the selected files. The Control Repository process tables are updated to list the excepted files. Each time the Process Manager invokes a process it compares the exception list to the files being processed. If there's a match, the file is excluded from the processing list.

FIG. 83*a* illustrates the overall flow of a Library Process executing in an Automated Library Machine environment. As previously explained, the process can be initiated by the Promotion algorithm or by the Foreground Processing of a DILP from FIG. 79. Steps 38504 thru 38508 must be executed for any Library Process regardless of point of origination. Step 38502 is only executed for LPs initiated by a promotion in progress. In a simple Conventional Library System or an Actor/Object environment, all steps are executed on the same ALM. However, if Remote Execution Machines are used, Job Files transmit the work request to the remote ALM, and Done Files transmit the results back to the dispatching ALM. Once Step 38508 completes, control is either returned to the Promotion algorithm, or a DILP complete message is returned to the user.

In order to handle processing invoked by the Promotion algorithm, the Process Manager employs Step 38502 to Create Buckets for the processes that need to be executed. Buckets are the means by which all information required to run Library Processes are distributed and communicated among any Automated Library Machines involved in the processing. Step 38502 begins with a list of files being promoted to a certain level. This list may contain files of different types and from different Packages and Versions. In our preferred embodiment, the Promotion algorithm has already broken the request down by level and type (Pre or Post) prior to invoking the Process Manager. The request list is further segregated by Package, Version and Library File Type since this is the manner in which all Library Processes are stored in the Control Repository.

For a given Package, Version, Filetype, Level (PFVL) and process type (Pre or Post), the algorithm queries the Control Repository for the matching Library Processes. The Control Repository returns all the necessary information to run all the Processes. This includes the Process Name, Process Number, the Execution Machine, Results Disposition, Completion Criteria, Run-time Parameters, Environmental Parameters such as required memory or disk space, and the deferred flag. In addition, the information is presented in such a way that identifies any dependent process chains.

Our invention requires each independent process to have its own Bucket. Dependent process strings are contained within a single Bucket. FIG. 82*a* illustrates this by indicating two independent Processes 38410 and 38411 each residing in self-contained Buckets 38401 and 38402. Furthermore, a dependent string consisting of processes 38412 thru 38414 are all contained within Bucket 38403. The algorithm creates the necessary number of Buckets until all PFVLs in original request list are exhausted.

The anatomy of a Bucket is described in FIG. 82*b* which illustrates an example Bucket. Record 38421 contains the number of dependent processes held in the Bucket. The next section contains one record for each process. Thus in this example, records 38422 thru 38424 represent the process information. Each record can be parsed into separate tokens With the following definition:

Done Flag where N indicates process has not yet completed and Y indicates completion.

Process Name

Deferred Flag where N indicates process should be initiated immediately and Y indicates it will be deferred.

Machine Name where the process should execute. It must either be * which indicates the process should run locally or it can be a valid ALM where the process will be dispatched to.

Output Disposition which may be * to indicate no disposition necessary or it can be one of the following:
Install <Now> <AT level version>
Store <Now> <Nobackup>
Create
Anchor
Component
Send To Note: Optional keywords are denoted by angled brackets < >.

Temporary Disk Space is a numerical representation of a disk storage metric applicable to the current environment. A * indicates no special storage requirement for this process.

Temporary Memory is a numerical representation of a random access memory metric applicable to the current environment. A * indicates no special RAM requirement for this process.

Run Time Parameters which can be any number of tokens following a right parenthesis. The parameters are passed directly to the Library Process upon invocation.

The next section contains one record of criteria information for each process. Thus in this example, records 38425 thru 38427 depict the completion criteria for each of the three processes. A completion criteria can be any valid boolean expression where the keyword Result denotes the final return code of the process.

Record 38428 denotes the number of files being processed by this Bucket. The next section contains multiple records for each file being processed. In this example, two files are being processed, so there are two sub-sections. Each sub-section contains one record denoting the file information. Record 38429 denotes the name of the first file in the first token. The second through fourth tokens represent the Package, Filetype, and Version associated with the file.

Immediately following are a block of records equal in number to the number of processes in the Bucket. Our example has three processes, so records 38430 thru 38432 finish the sub-section. This sub-section has three tokens which represent the Process Reference number, File Reference number, and Log Reference number.

Record 38433 is identical to record 38429 but represents the file information for the second file being processed by this Bucket. Records 38434 thru 38436 are identical to records 38430 thru 38432, except they pertain to the second file. As expected the only difference between these sub-sections is the File Reference token. The Process and Log Reference numbers are identical in records 38430 and 38434 since these records refer to Process__12. The same is true for records 38431 and 38435, and also for records 38432 and 38436. The arrangement of the information employed in our invention permits a single format to convey an endless combination of Library Process configurations and parameters.

Step 38504, Submit Jobs, is the first step in the Library Process Background Processing Algorithm. It can be entered from Step 38502 or from the Foreground Processing step in FIG. 79. In either case information is presented in Bucket form. The detailed algorithm for Submit Jobs begins with Step 38510 in FIG. 83*b*. Here a Bucket Loop is established to perform Steps 38511 and 38512 for each bucket. In Step 38511, ALM Check, buckets containing a dependent string of processes are checked to ensure all processes are defined to run on the same Automated Library Machine. If not, the program terminates with a message sent to the user. Step 38512, ALM List, organizes the Buckets by ALM in order to facilitate distribution of any Buckets which will run on a Remote Execution Machine. This step simply consists of creating a data structure for each new ALM discovered in the looping process, and assigning the Bucket to it. Any Buckets containing deferred processes are exempt from the ALM List and a flag denoting their existence is set for future use in Step 38517.

At the conclusion of the Bucket Loop in Step 38510 the algorithm checks the type of processing to see if it's a Pre-Process in Step 38513. If so, Step 38514, Check ALM List is employed to ensure there's only one ALM list. This is because our invention requires all Pre-Processes to run on the same ALM regardless of their dependence or independence on one another. If more than one ALM List was generated in Step 38512, an error message is sent to the user, and the program terminates.

Step 38515 establishes an ALM Loop in order to execute Steps 38516 and 38518 thru 38525 against each ALM List generated in Step 38512. If there is only one ALM List, the Buckets associated with this list may need to be distributed to a Remote Execution Machine or they may be permitted to run locally on this ALM. However, if more than one ALM List exists, some Buckets will be distributed.

Step 38516, Get ALM resolves the exact machine where the current list of Buckets will run. If the Data Manager is running a Conventional System or an Actor/Object system, the default for any process is to run locally unless otherwise specified by the Data Manager. If the Buckets can run locally, a flag is set. For configurations involving Remote Execution Machines, the Data Manager can specify a specific machine name, or a Select List. If a machine name is specified, it will be used for distribution. Otherwise, if a Select List is identified, the algorithm will attempt to locate the list. The list is a text file where each record contains the name of a Remote Execution Machine. Step 38516 will read the first record, use that name as the recipient of the Buckets, and rewrite the list putting the current machine at the bottom. This results in the machines receiving work in a simple round-robin fashion.

Control proceeds to Step 38518 in FIG. 83*c* where a Nested Loop is established. The nested loop consists of an outer loop of all the Buckets within the current ALM List, and an inner loop of files contained in each Bucket. All of this is still occurring within the big overall ALM Loop established in Step 38515. Next, Step 38519 is employed to Create A File List for the current ALM. In most cases where multiple Buckets exist, the same files will be repeated in many of the Buckets. To improve efficiency, the files are grouped into one master list for the ALM. Their records within the various Buckets are replaced by pointers to their respective positions within the master file list. All remaining Bucket information is retained, and travels with the newly created file list if any distribution is required. If the processing is initiated by a DILP request, the File References for the files are absent since DILPs can be initiated without the assistance of the Control Repository. Therefore, the corresponding Bucket records are missing this piece of information. Step 38519 will resolve this by requesting the missing File Reference numbers from the Control Repository and placing them into the appropriate position in the Buckets.

Step 38520 is used to Set Processing Locks against all files belonging to any Buckets that will be distributed to a Remote Execution Machine. These are Overlay Locks set with a specific Reason Code using our lock setting utilities.

Since the request may be delayed in the Remote Execution Machine's queue for some time, the processing lock prevents any movement or overlaying of the files being processed. At the same time the Control Repository is being used to set these locks, it's also returning the Lock Reference numbers for the files. These are inserted into the File List along with the other file information.

At this point the Nested Loop initiated in Step 38518 is repeated until all files within all Buckets are exhausted for this ALM. Step 38521 is then invoked to Write the Job File. The Job File contains all information in the Buckets along with the Master File List. Next, Step 38522 runs to check whether the current list of Buckets can be executed locally. If so, control proceeds to Step 38540 in FIG. 83*e* where processing is initiated immediately. If not, Step 38525 is employed to Distribute the Job File. In order to improve efficiency, the ALM List created in Step 38512 is re-ordered at the beginning of Step 38515 to ensure the local ALM, if it exists, is last in the loop. Since Library Processes can tie up an ALM for a long period of time, it's advantageous to distribute any remote processes prior to executing the local processes. The ALM Loop is repeated until all ALM Job Files are dispatched and/or initiated locally.

If processes can be executed locally, the algorithm passes control from Step 38522 to Step 38540 where all steps in the main body of the algorithm execute until the processing completes. Control is then returned to Step 38515 where the loop exits and proceeds to Step 38517. Otherwise if no local processing can be done, control proceeds immediately to Step 38517.

In Step 38517 a test is performed to see if there are any Deferred Jobs. If any of the deferred flags were set in Step 38512, control proceeds to Step 38526 in FIG. 83*d*. Step 38526 establishes a Deferred Buckets Loop, where all the deferred Buckets can be transformed into deferred job requests.

In Step 38527, Create Deferred Jobs, Jobs Files similar to those formed in Step 38521 are created. These files contain all the Bucket information with the exception of the input file names. Instead a Master File List is created for each ALM, and their records in the Buckets are replaced with pointers to the positions of the file names within the Master File List. The one difference is this Job File contains information in the first record which denotes the time that the process should execute. This information is stored with the process definition in the Control Repository process tables. As the algorithm proceeds through the Deferred Buckets Loop a new File List is created for each new ALM encountered. If the same ALM is encountered multiple times, the file names are appended to the Master List without duplication.

Next, Step 38520 is again invoked to Set Processing Locks against all the input files. This ensures they won't be overlaid before the time comes to execute the deferred process. In Step 38529, Append data any input data that was transmitted from a Foreground Process is also appended to the Deferred Jobs File. This ensures that all the data necessary to run the process will exist in an easily accessible location at the scheduled run time.

Once the Deferred Buckets Loop is exhausted, Step 38530 is employed to Distribute the Deferred Jobs.

For processes requiring distribution to a Remote Execution Machine, FIGS. 83*b* thru 83*d* represent the Job Submission portion of-the algorithm. The Remote Execution Machine would receive a Job File which would initiate the main processing body of the algorithm beginning in FIG. 83*e*. For processes that execute locally, this control is passed to FIG. 83*e* as soon as any distributed processing is handled. In either event, control must eventually encounter Step 38540.

Returning to FIG. 83*a* Step 38506, Do Processing represents the main processing portion of the Background Processing Algorithm. It begins with Step 38540 in FIG. 83*e*. Here the algorithm Reads the Job File and stores the information into various data structures. At this point connections are made with the Library Manager to ensure any information transmitted from a Foreground Process is in a location accessible to this ALM. Regardless of how Step 38540 is initiated (either by receiving a request on a Remote Execution Machine or reading a locally generated Job File), the current ALM now has all the information it needs to run the processes contained in the Buckets.

Step 38541, Check Process Queue, exists mainly for requests that need to be recirculated due to a file interlock. In this step, the Control Repository is queried to see if any files are locked waiting to be installed into the DMS. If so, this list is compared against a dependency list of files required to run the current set of processes. Normally during the first pass of a job request, this dependency list is empty. In some cases, a dependent process relies on the output from the previous process to be installed prior to execution. In this case, the required files would be added to the dependency list and the job request will recirculate until the install completes. It is Step 38541 that determines when the interlock is cleared so processing may continue. If there is a dependency list in the Job File, and any files in that list match those in the Process Queue, the request is simply recirculated.

Frequently, Library Processes require temporary disk space to store transient results and data until the process completes. Our invention allows the Data Manager to specify the required temporary space during process definition. Step 38542 is a safeguard which Checks Disk Space to ensure the current ALM has access to enough total disk storage to satisfy all the processes in all the Buckets. The algorithm loops through all the process information within all the Buckets looking for temp space requirements. For each one found it updates a running total. Once complete, it compares this against the total amount of available space. If the available space is insufficient, the processing is aborted and an error message is returned to the user. This ensures a large Bucket or numerous small Buckets won't abend prematurely and jeopardize data integrity.

At this point, Step 38510 is again executed to establish a Bucket Loop In Step 38543 a File List is created by writing the names of all input files associated with the current Bucket into a special File List. This information is different from the Master File List contained in the Job File in two ways. First, this list only contains files used in the current Bucket which may be a subset of the Master File List. Second, the format is more convenient for the intended user of the list. The sole purpose of this file is to act as the input list to drive the actual Library Processes in the Bucket.

Control is now passed to Step 38544 in FIG. 83*f* where a Process Loop is established in order to execute Steps 38545 thru 38548 against each process in the current Bucket. Step 38545 tests the Done Flag for the current process. If the process has already completed, which could be the case for a recirculated job request, then control is returned to the top of the Process Loop, and the next process is examined.

If the Done Flag is off, Step 38546 is invoked to test if the LP is Checkable. Our invention provides an API which permits the author of a Library Process to write a dependency check. For example, if a Library Process requires some file, other than the input files, to complete successfully, the author can specify this in the LP. The LP is written in such a way that it can be run in Check Mode, which means the LP will only execute the dependency code. Not all LPs have this special dependency, so a keyword is inserted into any LPs that should be run in Check Mode. Step 38546 examines this keyword. If the LP is not checkable, control returns to the top of the Processing Loop.

If the LP is checkable, Step 38547 is invoked to Apply Parameter Override Whenever a user initiates a Library Process either through the DILP menu or via a Promote request, they have the option of overriding any of the processing parameters defined by the Data Manager. This permits processes to be run in a "test" or "experimental" mode without requiring the Data Manager to continually redefine the process. Any overridden parameters are transmitted to the ALM with the other Foreground Processing information. Step 38547 applies those overrides prior to calling the LP in Step 38548.

In Step 38548, Check LP, the algorithm executes the Library Process in Check Mode. The LP will return the dependency list which is used in to employ Step 38541 again to Check the Process Queue If a match is found, the job request is recirculated until the interlock clears.

Once all the LPs in the current Bucket are exhausted, control is returned to the top of the Bucket Loop in FIG. 83*e*. Steps 38543 thru 38548 are repeated until all Buckets are exhausted. Successful completion of this loop indicates that all dependencies for all processes in all Buckets can be satisfied. As seen from FIG. 83*f*, if any dependency can't be satisfied the entire job request is recirculated. The purpose of this is to maintain data integrity by ensuring that any newly created file that is required for a task can be safely deposited into the DMS prior to task execution.

At this point Step 38510 is again invoked in FIG. 83*e* to establish the Bucket Loop. Step 38543 is again employed to create the File List. Control is now passed to Step 38544 in FIG. 83*g* to initiate another Processing Loop. This loop is established to actually run the Library Processes. In preparation for this, Step 38545 and Step 38547 are executed again to test the Done Flag and Apply Parameter Overrides respectively. During this pass of Step 38547, notification is sent to the Data Manager regarding the parameter overrides invoked by the user. A permanent log entry of the event is also recorded for historical tracking.

Next, Step 38550 is invoked to mark any File Exceptions. Our invention permits the user to exclude any files from processing. For example, if a promote request for files A, B and C require an LP to execute as part of the promotion criteria, and for some reason file C can't be subjected to that LP, the user can mark the file for exception prior to initiating the promote request. Step 38550 looks for any file exceptions in tho Bucket information, and for any that exist, the file is temporarily removed from the File List.

Step 38551, Sufficient Memory, is used to query the amount of available RAM. If it's below a threshold amount that the Data Manager can optionally specify when defining an LP, then the request is recirculated. In our preferred embodiment, all Library Processes run on Automated Library Machines constructed as AutoReaders. This permits the Process Manager to send the ALM an instruction in Step 38554 to Re-IPL or re-initialize the environment. In addition control proceeds to Step 38574 in FIG. 83*l* so the current Job File can be recirculated into the ALM's reader. The Re-IPL request is given a higher priority so the ALM will process it first, followed by the current Job File. If the environment doesn't support this, manual intervention will be required to regain the necessary RAM.

Assuming enough RAM exists to run the LP, control proceeds to Step 38552, Run Library Process. The Library Process is launched with the File List (excluding excepted files) and parameters (including overrides) passed in. As stated previously, the LP may be a simple shell which loops through the File List and launches a third party program against each file. The LP can also be a program specifically written to run only as a Library Process. In either case, the API provides a mechanism to pass the input information to the program and capture the results. At the conclusion of the Library Process, the algorithm captures the result of the process and records it into a Process Log.

Since the possibility exists for a Library Process to leave the ALM in a low memory state, Step 38553 is invoked to check for Minimum Memory. Like Step 38551, a memory snapshot is taken, but this time it's compared against a pre-defined threshold established by the Data Manager for this particular ALM. Since ALMs perform many tasks in addition to running Library Processes, they require a certain amount of RAM to function. If Step 38553 determines that the available RAM is too low, it invokes Step 38554 to send a Re-IPL request to the ALM's reader. The pre-defined threshold is calculated such that a Re-IPL will be requested before the ALM memory falls below the minimum amount necessary to perform basic functions.

Whether an IPL is required or not, control proceeds to Step 38555 in FIG. 83h. Step 38555 is designed to handle the case where the current process is a Dependent Process of a Create DILP. Whenever the Data Manager defines a dependant string of processes where the first process is a Create DILP, it is implied that all subsequent processes should have their results set against the output file generated by the Create DILP. If this situation is detected, control passes to Step 38556, Get Real Fref, where the File Reference of the Create DILP output file is acquired from the Control Repository. This File Reference is inserted into the appropriate position in the Bucket and saved for use in later steps.

Next Step 38557 is invoked to Store Results of the Library Process into the Control Repository. This step requires the File Reference number of the file against which the result should be recorded. In all cases except dependant processes of Create DILPs, this File Reference number is contained in the Bucket information. For the aforementioned case, the File Reference was acquired in Step 38556.

Our invention presents a mechanism which enables a process of one type to override the same process of a different type. For example, if the Data Manager defines a process to run as a Post-Process, but also defines the same process to run as a DILP, the mechanism will link them together such that a good result for one will impart a good result on the other. In this example, the processes are referred to as Sister Processes since they are designed to override each other. The most common application of such a mechanism is using a DILP to recover a failing Post-Process. This improves efficiency by eliminating the need to re-library the file just for purposes of initiating the Post-Process a second time.

Step 38558 will determine if there are any Sister Processes defined for the current Library Process. There are two ways Sister Processes can be denoted. The first is via the Library Process itself. The API permits the LP author to specify a Sister Process directly. If the LP does not specify any Sister Processes, the algorithm will automatically look for a matching DILP if the current process is a Post, or a matching Post if the current process is a DILP. If any of these conditions are true, Step 38557 is again employed to Store the Process Results against the Sister Process.

At this point control proceeds to Step 38559, Meets Criteria in FIG. 83i, where the process results are compared against the predefined criteria. This criteria can be any complex boolean expression. Our preferred embodiment allows the Data Manager to define an "optional" process by using the equivalent boolean expression of <boolean expression for result> OR RESULT="%". The DMS will interpret this as "the process meets criteria if any recorded result satisfies the boolean expression for the result OR if no result exists at all. This, in effect, makes the process optional since all new files begin with empty process results. In Step 38559 the process is tested against the criteria. If the process Meets Criteria, control is passed to Step 38560. If not, Step 38562 is employed to Send an Error Message to the user.

If the current process is a Pre-Process of a promote request, then the test in Step 38563 is true and the program terminates. This is because ALL Pre-Processes must satisfy the criteria in order for the promote request to continue. A failing Pre-Process will cause a failing Done file to be sent to the ALM who initiated the process. Eventually control will return to the Promotion algorithm where the promote will cease. For any type of process other than a Pre-Process, the algorithm proceeds with Step 38564, Ensure Order.

Returning to Step 38560, Override Dist, the program checks to see if any special disposition instructions were returned by the LP. The LP API permits the author of an LP to specify exactly where any output should be installed into the DMS. This may not match the default results disposition defined by the Data Manager. If this is the case, the program will use the disposition instructed by the LP.

Step 38561, Sort Files, is designed to improve efficiency by maintaining one overall list of files to be disposed of into the DMS. As the algorithm loops through each process in each Bucket, it adds new output files to the list. Since it's possible for a multiple processes to produce the same output file, Step 38561 is careful not to include duplicates. This improves efficiency by not wasting time installing the same file twice.

Control ultimately arrives at Step 38564, Ensure Order. In this routine, the algorithm looks for an Aggregate Install where a large group of files need to be deposited into the DMS. Our invention permits a special type of install where one file in the group is designated the Anchor and the rest are Components. The Anchor undergoes the same install procedure as regular files, but the components use a special high performance install procedure. Since the Process Manager guarantees that all components are derived from the same source and subjected to the same criteria checks as the Anchor, this high performance install is permitted to skip some of the checking in lieu of performance. The LP author can request use of this special installation procedure through the LP API. Step 38564 will detect this request and ensure that the Anchor file is always disposed of immediately, and ahead of, any related components.

At this point control proceeds to Step 38565 of FIG. 83j where the output from the LP is examined to see if it requires Immediate Disposition. The Library Process API permits the LP author to indicate that the output must be deposited into the DMS before any subsequent LPs can be initiated. This is frequently the case if a string of dependent processes exist where the output of one process is used as input to the next. This step will automatically test positive if an Aggregate Install was detected in Step 38564 because this requires the Anchor file to be disposed of immediately. It will also test positive if the current output file is from a Create DILP, since that output may be used as input to subsequent processes. The Create DILP scenario requires the file name and PFVL of the newly created file to be written into a special file along with the Process and Log Reference numbers and the process result. This file is referenced by the Install algorithm in the Library Manager in order to properly dispose of the file and set the process result.

If Immediate Disposition is required, Step 38566 is employed to establish a Disposition Loop. This allows the algorithm to handle LPs which produce multiple output files.

Next, Step 38567 tests for any Components to be installed into the DMS. If so, Step 38568 is employed to Find the Matching Anchor file. If one can't be found it's an error, and the program terminates with a message being sent to the user. If the matching Anchor file is found, a list is made of all the Components associated with that Anchor. This list is used by the high performance install procedure in the next step. In addition, all the components are removed from the overall disposition list which improves efficiency by reducing the number of passes required through the Disposition Loop The last step in the loop is Step 38569, File Disposition. This step first determines the type of disposition. There are six types of dispositions:

Regular Install Deposits the output into the DMS under full data control. The output file may or may not be assigned a File Reference number and completely tracked by the Control Repository. Once installed, the file can be processed like any other file in the DMS. The install can be immediate, whereby the install is initiated and further processing suspends until it completes, or the install can be delayed which means further processing may continue while the Library Manager processes the install request.

High Performance Install Similar to a Regular Install, except it deals with groups of component files. This occurs during an Aggregate Install which always begins with an Anchor file undergoing a Regular Install, followed by all the related components undergoing a High Performance Install. The information necessary to install the group of files is conveyed through a special file created in Step 38567. This type of install is always delayed.

Create DILP Install Used only on the output file of a Create DILP. This install is identical to a Regular Install with some additional steps that assign the process result to the output file once it's safely in the DMS. The necessary information is passed to the Install algorithm through a special file created in Step 38565. This type of install is always immediate.

Regular Store Deposits the output into the Data Repository, but the file is not tracked by the Control Repository. These files exist for some other reason than data management, and don't require any DMS operations (promote, library processing, problem tracking, etc.). This type of disposition can be immediate or delayed.

Send Simply forwards the output to the designated electronic address. The output is not libraried in any repository. Usually the output is in the form of a notification that something occurred during the Library Process.

DILP Permits the output of one Library Process to be used as input to initiate a DILP on another ALM. The LP author can specify the Library Process which should be initiated. Rather than depositing the current output into the DMS, the Process Manager will use it as an input file to launch a DILP request to the specified ALM. The target ALM will receive the request as if it has been initiated by a user in the normal fashion.

Regardless of the type of install, the code first checks to ensure no lock other than a processing lock exists on the file. This interlock mechanism ensures a particular file is always processed in order if, for example, it is in the process of being promoted while an LP is initiated to update it. Next, an Install Request file is created which contains the target Level and Version, the name and type of the file being installed, the userid for whom the request is servicing, a checksum, the Level Reference number and all Source Reference numbers.

If an immediate install is requested, the Process Manager will determine if the current ALM is capable of performing the install. If so, the Install Algorithm described in FIGS. 33a thru 33d is executed, and control will eventually return to Step 38569. If an error occurs during the install, a message is sent to the user and the program terminates. If the current ALM is unable to perform installs (ie. a Remote Execution Machine in a Conventional System), then a processing lock is set to indicate an outstanding install request. The install request file is then forwarded to the responsible ALM along with any special files such as those needed for Create DILPs or High Performance Install. It is sent with the highest priority so the receiving ALM will service it ahead of all other Promotes or new job requests. In the meantime, the algorithm adds the output file to the dependency list, rewrites the Job File, and recirculates the request. The current ALM will continue receiving the request and executing Steps 38540 and 38541 in FIG. 83e until the dependency list clears the Process Queue.

Steps 38567 thru 38569 are repeated until all output files from the Library Process are disposed of. Control then passes to Step 38570 to Update the Done Flag in the current Bucket. If the request needs to be circulated again after this step, the algorithm will not rerun the current process. Control proceeds to the top of Step 38544, Process Loop, in FIG. 83y until all processes in the current Bucket have been completed.

Upon completion of the Process Loop, control passes to Step 38571 in FIG. 83k. If the current request is a Post-Process or a DILP, Step 38566 and 38569 will be invoked to deposit the output from all processes in the current Bucket. Different Buckets in a Post-Process or DILP are independent of each other, and their output will be disposed of as the Bucket completes.

However, if the process is a Pre-process, control returns to the Bucket Loop, Step 38510, in FIG. 83e to ensure ALL processes in ALL Buckets are executed successfully. This is a prerequisite for promotion to the next level. Once all Buckets are exhausted, Step 38572 in FIG. 83l is invoked to see if the current request is a Pre-Process and Each Process Meets Criteria. In this case, Steps 38566 and 38569 are employed to deposit all output files into the DMS. Otherwise, if any criteria is not satisfied, no time is spent installing the output since the promotion is destined to fail. Once all output is either deposited or sent to the appropriate ALM to be deposited, Step 38573 is invoked to check if the current job is All Done. This entails checking for any pending installs and ensuring no process failed criteria. In this case, the request needs to be Recirculated in Step 38574 until the pending installs complete and the Process Manager can ensure all processing is complete for this job. Step 38574 rewrites the Job File with all updated Bucket information, install dependency lists, error messages, etc.

Once all processing completes, Step 38575, Create Done File constructs a Pre-Done or Post-Done file depending on the type of request. The file consists of header information similar to the initial request, the return code, the number of files being processed, and a list of the files. If the current ALM is an Actor in an Actor/Object environment, or the Master ALM in a conventional system, then the control will be passed to Step 38508 in FIG. 83a where the Done file will be processed based on the type. On the other hand, if the current ALM is a Remote Execution Machine, the Done file is transmitted to the Master ALM.

Returning to Step 38508 in FIG. 83a, the algorithm is identical whether the Done file is generated locally or transmitted from a Remote Execution Machine. If Step 38508 determines that the Done file is a Pre-Done, control proceeds to Step 38576 in FIG. 83m. Otherwise it will be handled by Step 38576 in FIG. 83n.

FIG. 83m begins with Step 38576 Read Done File. Here the contents of the Done file are read into a data structure. Next, Step 38577, Unlock Files, resets the Overlay locks that were set in Step 38520 in FIG. 83c. Control proceeds to Step 38578, Check RC, which reads the result contained in the Done file. If it's non-zero, the processing failed, and Step 38579 is invoked to Send a Failure File to the user. However, if the result is zero, then Step 38580 is employed to Rewrite Prom File. The algorithm regenerates a new promotion request and adds the File Reference numbers to the list of files. In either case, control is returned to the promotion algorithm in the Library Manager.

FIG. 83n is very similar to FIG. 83m. It also begins with Step 38576, Read Done File. Here the contents of the Done file are read into a data structure. Next, Step 38577, Unlock Files, resets the Overlay locks that were set in Step 38520 in FIG. 83c. Control proceeds to Step 38578, Check RC, which reads the result contained in the Done file. If it's non-zero, the processing failed, and Step 38579 is invoked to Send a Failure File to the user. However, if the result is zero, then Step 38581 is employed to check for a DILP-Done. In the case of a DILP, the user is notified that the process completed successfully via Step 38580, Send Message. Successful Post-Processing does not result in any notification since lack of a Failure notice implies the file will be allowed to promote to the next level.

At this point, the Library Process is complete and the Process Manager returns control to the originator which is always the promotion algorithm in the Library Manager or a user.

In addition to regular Library Processes which are always executed and recorded in a controlled environment, our invention supports another type of process known as a Pseudo process. Pseudo processes can be used as promotion criteria or simply as informational indicators. They have criteria like regular processes, but they do not represent programs, third party tools, or any type of executable task. Instead they are pieces of data associated with a Package, Version, Level and Filetype and recorded for a specific file in the DMS. An important and powerful feature is that the Level of the Pseudo process does not have to be the same level where the file resides. For example, if a file is at Level A and runs a process which calculates a piece of data, Pseudo Processes can be used to store that result at Level B. Eventually, when the file reaches Level B, that result can become promotion criteria. Since the level of the Pseudo can be different from the current level of the file, we call this Level Independent Pseudo Processes.

Our invention offers a utility specifically designed to set these Level Independent Pseudo Process results. It can be invoked from a command line by a user, or from any third party tool including Library Processes. The algorithm is illustrated in FIG. 85 and begins with Step 38710, Parse Parms. The utility requires the process and file information which can be any combination of process name or Process Reference number and file name of File Reference number. The invocation must also supply the result to be recorded and our interface also allows an optional 120 character message or comment. If the user elects to use a process name, the name is checked to ensure it's a Pseudo process and not a regular process. Our preferred embodiment requires Pseudo processes to begin with an "*" in the first character. Assuming it's a valid Pseudo process name, the Control Repository is queried to ensure a process by that name is defined for that Filetype in that Package. Otherwise, if a Process Reference number is provided, a Log Reference number must also be present. The Control Repository is checked to ensure it's a valid Process/Log Reference pair and that the pair describes a Pseudo process. The checks for the file information are similar. If a File Reference is provided, it's checked to ensure it's valid. Otherwise, the Control Repository is asked to return File Reference number corresponding to the given file name. The supplied file name must include Package, Version, Filetype and Level as well as the name.

If all checks in Step 38710 are passed without error, control proceeds to Step 38711, User Authority. If any error is encountered anywhere in the algorithm, the program terminates with an appropriate error message. In Step 38711, the Control Repository is queried to ensure the user has the proper authority to set Pseudo process results. This authority is granted by the Data Manager using our Data Management Configuration Utility.

Immediately following Step 38711, Step 38712, Get Level, is invoked to Acquire the Level and Version for the current File Reference number. The Level and Version where the file currently resides will be referenced throughout the remainder of the algorithm.

Step 38713 determines whether a Criteria Check is necessary. This is an option requested during invocation of this utility. If so, Step 38714 is employed to query the Control Repository to return all criteria information for all processes in this Package at this Version. Along with the actual criteria are the corresponding Process and Level Reference numbers which are all stored into a Process Data Structure. Control eventually moves to Step 38715 where a Level Search is performed using the current Level as the starting level. All levels returned by the repository excluding frozen release levels, are saved into a level list. Next, Step 38716 is employed to find all the Matching Processes at or above this level. This is accomplished by querying all processes for this Filetype and Package, and matching the Process Names and Level Reference numbers returned from the Control Repository against the desired Process Name and the level list. Any process that matches are kept in a "hit" list.

Step 38713 is again employed to test if a Criteria Check is required. If so, Step 38717, Criteria Compare is invoked. Here the Process Reference number from the hit list is compared against the Process Reference numbers in the criteria data structure from Step 38714. For each process that matches, the criteria expression is evaluated and the current result is tested. If the result fails the criteria for a process defined at any level, the program terminates with a message sent to the user.

Once all occurrences of the process at the various levels has been checked against the criteria (if so ordered), the Control Repository is queried to set the result. This algorithm works fine for a small number of results that need to be recorded. However, there are times when a large number of Pseudo process results need to be recorded either for the same file or a large group of files. Our invention provides a high performance option which allows the invocation to pass is an infinite list of quads, where a quad consists of process information, file information, a result, and an optional message or comment. The process and file information can be the same combination as previously described. Each quad is separated by a special delimiter.

The same algorithm applies when this high performance option is used, but some extra steps are taken in the interest of performance. Each quad is treated as a separate invocation of the utility whereby Steps 38710 thru 38717 are repeated in a Quad Loop. The difference is any step which queries information from the repository also caches it into a local data structure. Thus, if another file with the same Package, Version, Level and Filetype appears in a later quad, or the same process appears in a later quad, the information can be acquired from the data structure. Once Steps 38710 through 38717 is executed successfully for all quads, a special query is made to the Control Repository in Step 38718 which passes the results for all quads in a single call.

Once a result has been recorded in the Data Management System, our invention offers a utility to view and edit process results. The interactive screen is shown in FIG. 86, and it's almost identical to the Library Process Exception screen in FIG. 84. It contains fields 38211 through 38214 which are supplemented by drop down menu buttons 38217 thru 38219 exactly like FIG. 84. Field 38215 and button 38220 are identical in operation to FIG. 84 even though the field name is expanded to specifically denote the File Level. The bottom of the screen offers radio buttons 38826 to choose the type of process results, Pre, Post, DILP or Foreground. The only difference on this screen is the addition of field 38824, Process Level with supporting drop down menu button 38825. This screen must offer a means for the user to signify the Level where the file should be located and the Level where the process resides. Since the file moves through various levels, it may be necessary to view results from a level where the file no longer resides. Our preferred embodiment uses the level in field 38215 as a starting library level to perform a library search for the file. The user is then told where the file is located. Field 38824 must be entered correctly, as no level search will be done for processes.

Upon hitting enter, the algorithm finds the closest file to the level specified in field 38215 and attempts to retrieve all processes of the type chosen in field 38823 and at the specified Process Level in field 38824. The list of processes with their current results are displayed on a subsequent screen. If the user has the proper authority, our invention permits Pseudo Process results to be edited on this screen. The user may actually change a current value and save it back into the Control Repository. A message is automatically recorded indicating a manual override of the Pseudo process result. This operation is never permitted for regular process results.

To support these processes the Library Manager maintains the following tables in the Control Repository.

CRI_EXCEPTION_LOG

TABLE 20

CRI_EXCEPTION_LOG - Log of changes to Criteria table

| Column | Description |
|---|---|
| REF | |
| REASON | Reason for log entry |
| USERID | User causing entry |
| DATE | Date of log entry |
| TIME | Time of log entry |
| FILEREF | Pointer to file for which there is an exception |
| FILENAME | Name of file for which there is an exception |
| LIBTYPE | Library filetype of file for which there is an exception |
| LEVEL | Level of file for which there is an exception |
| VERSION | Version of file for which there is an exception |
| PROCESS_REF | Process reference for which there is an exception |
| PROCESS_NAME | Process name for which there is an exception |

CRITERIA

TABLE 21

CRITERIA - Promotion criteria

| Column | Description |
|---|---|
| REF | |
| LEVEL_REF | Pointer to level |
| PROCESS_REF | Pointer to process |

TABLE 21-continued

CRITERIA - Promotion criteria

| Column | Description |
|---|---|
| OBSOLETE | Y if this process is obsolete |
| EXPRESSION | Expression to interpret result |

CRITERIA_EXCEPTION

TABLE 22

CRITERIA_EXCEPTION - Criteria exceptions

| Column | Description |
|---|---|
| REF | Reference |
| PROCESS_REF | Pointer to process for which there is an exception |
| PROCESS_LOG_REF | Pointer to process log reference for which there is an exception |
| LEVEL_REF | Pointer to level for which there is an exception |
| FILE_REF | Pointer to file for which there is an exception |
| LOG_REF | Pointer log entry |

CRITERIA_LEVEL

TABLE 23

CRITERIA_LEVEL - Join of CRITERIA and LEVELS tables

| Column | Description |
|---|---|
| CRI_REF | Pointer to Criteria entry |
| LVL_REF | Pointer to level |
| PROC_REF | Pointer to process |
| EXPRESSION | Expression to interpret result |
| PACKAGE | Package id |
| FILETYPE | Library file type |
| LEVEL | Level id |
| VERSION | Version |

CRITERIA_LOG

TABLE 24

CRITERIA_LOG - Log of changes to Criteria table

| Column | Description |
|---|---|
| REF | Reference number |
| CRITERIA_REF | Reference number of criteria being logged |
| REASON | Reason for logging, A—Add, D—Delete, M—Modify |
| LEVEL REF | Pointer to level |
| PROCESS_REF | Reference number of process being logged |
| OBSOLETE | Y if this criteria is obsolete |
| USERID | Userid of person making change to Criteria table |
| DATE | Date Criteria entry was changed |
| TIME | Time Criteria entry was changed |
| EXPRESSION | Expression to be evaluated |

125
CRITERIA_PROCESS

TABLE 25

CRITERIA_PROCESS -

| Column | Description |
|---|---|
| CRI_REF | |
| PRO_REF | |
| EXPRESSION | |
| LVL_REF | |
| LOG_REF | |
| POSITION | |
| PROCNAME | |

PROCESS

TABLE 26

PROCESS - Automatic Processes

| Column | Description |
|---|---|
| REF | Reference number |
| LEVEL_REF | Pointer to level |
| LOG_REF | Pointer to process log entry - used for consistency check |
| OBSOLETE | Y if this process is obsolete |
| NEXT | Pointer to next process in sequence |
| POSITION | B before promote, A after promote, F foreground, P sometime after |
| DEFER | Y process invocation can be deferred |
| ASYNCH | Y if this process is asynchronous |
| PROCNAME | Process name |
| OVERIDES | Parameter list overides |

PROCESS_DEF

TABLE 27

PROCESS_DEF - Process Definitions

| Column | Description |
|---|---|
| REF | Reference number |
| PROCNAME | Process name |
| COMMAND | Process Command |

PROCESS_DEF_LOG

TABLE 28

PROCESS_DEF_LOG - Log of changes to Process definition table

| Column | Description |
|---|---|
| REF | Reference number |
| REASON | Reason for log entry, ADD, DELETE, MODIFY |
| USERID | Userid making change to the Process definition table |
| DATE | Date Process definition entry was changed |
| TIME | Time Process definition entry was changed |
| PROCDEF_REF | Pointer to process definition being logged |
| PROCNAME | Process name |
| COMMAND | Command line |

126
PROCESS_LEVEL

TABLE 29

PROCESS_LEVEL -

| Column | Description |
|---|---|
| REF | Reference number |
| LEVEL_REF | Pointer to level |
| POSITION | B before promote, A after promote, F foreground, P sometime after |
| DEFER | Y process invocation can be deferred |
| ASYNCH | Y if this process is asynchronous |
| NEXT | Pointer to next process in sequence |
| LOG_REF | Pointer to process log entry - used for consistency check |
| PROCNAME | Process name |
| OVERIDES | Parameter list overides |
| PACKAGE | Package id |
| FILETYPE | Library file type |
| LEVEL | Level id |
| VERSION | Version |

PROCESS_LOG

TABLE 30

PROCESS_LOG - Log of changes to the Process table

| Column | Description |
|---|---|
| REF | Reference number |
| REASON | Reason for log entry - ADD, DELETE, MODIFY |
| USERID | Userid of person making change to Process table |
| DATE | Date Process entry was changed |
| TIME | Time Process entry was changed |
| PROCESS_REF | Pointer to process being logged |
| LEVEL_REF | Pointer to level |
| OBSOLETE | Y if this process is obsolete |
| NEXT | Pointer to next process in sequence |
| POSITION | B before promote, A after promote, P sometime after promote |
| DEFER | Y process invocation can be deferred |
| ASYNCH | Y if this process is asynchronous |
| PROCNAME | Process name |
| OVERIDES | Parameter list overides |
| RESULTS_SAVED | Y Results saved on modify |

PROCESS_NAME_LOG

TABLE 31

PROCESS_NAME_LOG - Process Name Log

| Column | Description |
|---|---|
| REF | Reference number |
| REASON | Reason for log entry |
| USERID | Userid causing entry |
| DATE | Date of entry |
| TIME | Time of entry |
| NAMEREF | Reference number of process name entry |
| PROCNAME | Process name |
| AUSERID | Authorized userid |

PROCESS_NAMES

TABLE 32

PROCESS_NAMES - Process Names

| Column | Description |
| --- | --- |
| REF | Reference number |
| NAME | Process name |
| USERID | Userid authorized to add and delete process |

PROCESS_QUEUE

TABLE 33

PROCESS_QUEUE - MVS Process Queue

| Column | Description |
| --- | --- |
| REF | Reference number |
| PROCREF | Pointer to process |
| FILEREF | Pointer to file |
| LOGREF | Pointer to log entry |
| LOCKREF | Pointer to lock entry |
| ACTION | MVS Action |
| FILENAME | CMS filename |
| FILETYPE | CMS filetype |
| MAXTIME | Maxium allowable process time in hours |
| DATE | Date this entry was created |
| TIME | Time this entry was created |

External Data Control

Our invention allows users of the Design Control System to record the results of tasks performed outside of the DMS through the use of External Data Control. The advantage is the user can perform the tasks as often as necessary until desirable results are produced. These results, along with the files that produced them, are then libraried and recorded in the control repository. Although the tasks are performed outside of a controlled environment, our invention maintains data integrity throughout the entire process. The preferred embodiment shown in FIG. 87 consists of four main Steps. In Step 39101 the user runs a task in the usual manner. The task could be a checking program which operates on some input and only produces a result as output, or the task could be the automatic generation of some output data that needs to be tracked by the DMS. If the output fails, or is in some way undesirable, the user can make as many updates as necessary to rectify the problem.

Steps 39102 through 39104 essentially package the tasks results with the data, transport them to the Library, and store them into the DMS. During the entire process, interaction takes place with other routines within the Process Manager, as well as various routines in our Aggregation Manager, Problem Fix Manager, Authority Manager, and Library Manager facilities.

Step 39102 in FIG. 88 can be run each time Step 39101 is executed, or optionally under the control of the user. In Step 39102, the task from Step 39101 creates a Pedigree or PED file. This file holds all the control information necessary to transport the files to the library, record the results in the Control Repository and maintain data integrity. The main components of a PED file are the Header Record, the Member Records, the Results Records, the Support Records and the Master Pedigree Record.

FIG. 88 illustrates an example of a PED file. This example shows 8 tokenized records. Record 39201 must be the Header Record which consists of 3 tokens. The first is an "H" to indicate it's the header record. The second is the filetype that would be used to create a Bill of Materials in the library, if a one is desired. The third token is used to determine the type of BOM if one will be created. Possible values are FULL, INC (for incremental) or NONE. Records 39202 thru 39204 are the Member Records which always begin with an "M" as the first token. The number of member records depends on the task that is executing. There is one record for every input and output file that will be libraried. The second token of a Member record is the actual filename. In a network environment, this is the full path name since input and output files may be scattered across multiple directories. The third token is the library filetype which may not be obvious from the filename. Since the DMS requires that all data be uniquely identifiable by Package, Filetype, Version, and Level (PFVL), the filetype must be determined during PED creation. The fourth token is the BOM Member Type. Possible values are "A" for Anchor file, "I" for Input file, "O" for Output file and "S" for Support file. If the process requires a BOM to be created, the Member records contain all the necessary information. The fifth token is the File Identification Code (FIC). In our preferred embodiment, a Cyclic Reduncany Check is used as the FIC, but any available algorithm that assigns unique identifiers to files, based on their contents, could be used. Record 39205 of the PED file in FIG. 88 is the Result Record. It contains an "R" as the first token. The second token is the name of Process within the Control Repository where the result should be recorded. The third and fourth tokens contain the filename and library filetype of the file for whom the process result should be associated with. The fifth token is the actual result and must be in a form that the Control Repository can accept. Records 39206 and 39207 are Support Records whose first token is always a "K". These are important files that are used in the task, but won't be transported to the library. The most frequent examples are executables, binaries, technology and rules files. These records are simple in format. Besides the first token, the second token is the name of the file, and the FIC is the third token. The last record, record 39208 in FIG. 88, is the Master Pedigree Record. It's denoted by a "P" as the first token. The second token is the filename of the Pedigree file and the third token is the library filetype of the PED file. The fourth token is a special FIC. Aside from the first record being a Header record, the remaining records can be in any order. In our preferred embodiment it is desirable to have the Master Pedigree Record as the last record to simplify the special FIC creation.

In order to assure complete data integrity, all files listed in the PED must have File Identification Codes to ensure the files used in the task in Step 39101 remain unchanged when the result is recorded in the Control Repository. In addition, the PED file itself is given a FIC to ensure the PED file does not change during the interim period. This FIC is stored in the "P" record.

The actual creation of the PED is closely associated with the task performed in Step 39101. The contents of the PED are determined by the type of process being run. Depending on the process and the environment, the PED may be created by the process itself, or it may be created by external code which is executed after the process completes. This code could be written in any language. In a typical automated design environment, tasks are launched from within a frame work. Usually these frameworks offer a script or batch language which can be used to launch the task, and capture all the information necessary to create the PED file.

Step 39103 of the External Data Control method is the act of transporting the PED and all associated data to the Design Control System in a controlled manner. This user may invoke this Step immediately after, or long after, the PED is created in Step 39102. If the delay is substantial, the chances of a data integrity violations increase. Step 39103 is employed by the algorithm illustrated in FIGS. 89a and 89b. Turning our attention to this algorithm, we see 14 major Steps which must be executed. The algorithm can be written in any high level language such as "C" or Rexx, and it must be capable of communicating with the Design Control Repository.

The user begins by invoking the program which executes the algorithm. In our preferred embodiment, the file name of a PED is a parameter passed to the program. The first Step, 39311 in FIG. 89a, is the Merge Step. The preferred embodiment permits the user to repeat Steps 39301 and 39302 of FIG. 88 using different tasks. This may result in multiple PED files being created. Step 39311 begins by presenting a selection list of all PEDs found in the current directory or the search path. Upon selecting the PEDs to be transported, the program requires the Package, Version and Target Level of the PED. The program may be able to determine the Package and Version from the file name, but the Target Level is requested from the user. Upon entering this information, the program detects whether more than one PED was selected. If this tests "true" then a merge process takes place in the following way:

1. Each PED is read and the Pedigree ("P") records are discarded.
2. The remaining records are written into a temporary file.
3. The originally selected PEDs are "backed up" by renaming them.
4. The new merged PED is renamed from the temporary file name to the original file name supplied at the beginning of Step 39311.
5. A File Identification Code is generated for the new merged PED file and inserted as a "P" record in the PED.

In Step 39312 the program queries the Design Control Repository for Package Control Information This query can be as simple as reading the information from a file if the Control Repository is file-based, or it can be a database query. Regardless of the method, the repository must return information about the package regarding Fix Management, Part Number Control and EC Control. The results of these interrogations will determine branching in the next step. It should be noted that Steps 39311 and 39312 can be done in either order since they are independent tasks.

Step 39313 is the decision point where the program must determine whether Control Information is Needed from the user. This is determined by asking the question "is the package under some form of Fix Management, Part Number Control or EC Control"? If any of these tests are true, additional information must be gathered from the user. In the preferred embodiment of our invention these tests consist of examining three flags set in the Package Control Table of the database. If the decision resolves to "yes" the flow proceeds to Step 39314, otherwise it branches to 39321.

Continuing with Step 39314, the program examines all the Member "M" records in the merged PED file, and sorts them by unique library file type. This improves performance by eliminating the need to examine the same flag for multiple files of the same library file type. At this point the program enters an LFT Loopwhich will be repeated for each library file type in the sorted list. Next the program must query the Control Repository for the Fix Management and Part Number flags of each file type in the list. Depending on the implementation, it could be individual queries for each file type, or one large query covering all the filetypes in the list. Once the information (which is usually two flags for each file type) is returned the flow proceeds with Steps 39315 through 39318.

Steps 39315 and 39317 can be processed in either order, and they are used as decision points for Steps 39316 and 39318 respectively. In Step 39315, the program inspects the Fix Management information for the package. If the package is under Single Fix Mode or Engineering Change Mode, then the LFT FM, or Library File Type Fix Management, flag is examined for the LFT being processed. If the flag is on, Step 39316 is invoked, otherwise the program proceeds to Step 39317. In Step 39316, LFT FM Assoc, the program attempts to associate the file being processed with a Problem Fix Number. If the package is under Single Fix Mode, the default Problem Fix Number is associated to the file. If the package is in Engineering Change Mode and the repository already has existing Fix Numbers for that file, they are presented on a user screen. This is usually done with another interrogation of the Control Repository. The user is given the choice of selecting one of the existing ones or entering a new one. If no Fix Numbers exist, the user is prompted to enter a new one.

In Step 39317, the program checks to see if the Part Number Control Level is being crossed by comparing it to the Target Level provided by the user in Step 39311. If the answer is "yes", then the LFT PN, or Library File Type Part Number, flag is examined for each LFT being processed. If the flag is on, Step 39318 is invoked, otherwise the program proceeds to Step 39319. In Step 39318, LFT PN Assoc, the program attempts to associate the file being processed with a Part Number. If the repository already has an existing Part Number for that file, it is presented on a user screen. This is usually done with another interrogation of the Control Repository. The user is given the choice of selecting the existing PN or entering a new one. If no Part Number exists, the user is prompted to select a new one.

Since Steps 39315 through 39318 may be repeated for a large number of files, the Design Control System may be implemented in such a way that the DMS server returns all associated Part Number and Fix Management data for all files being processed with one large query. The client then sifts through the data to find the information necessary to interact with the user. The algorithm states the information that must be obtained from the Control Repository and the user, but permits a great deal of flexibility in the way it is acquired.

Step 39319, EC LVL, is where the program checks to see if the Engineering Change Control Level is being crossed during the transport. This is done by determining if the Target Level entered in Step 39311 is at or above the EC Control Level. If the test resolves to a "yes" answer, the program must perform Step 39320, EC Assoc. Here, it queries the Control Repository for EC information regarding any Problem Fix Numbers and Part Numbers selected or entered in Steps 39316 and 39318. For any Fix Number or Part Number not associated with an EC, the program prompts the user to select an EC from a list of existing EC Numbers or choose a new one.

Note: All queries concerning Problem Fix, Part Number and EC information are discussed in more detail in disclosure #PO996-0008.

Our preferred embodiment employs a client/server environment where it's easy to copy and move files from one physical location to another. Step 39321 in FIG. 89*b*, Copy Possible, may or may not be an actual in the implemented program. If it is, and the answer is "yes", then program proceeds to Step 39324. On the other hand, if the environment can't accommodate a direct copy of the files, or if the program does give the user a choice (ie. for security reasons) and the answer is "no", then the program should perform Step 39322.

Step 39322, Pack PED, is done to improve performance and data integrity. In this Step, the program attempts to gather all the member files ("M" records) listed in the PED and compress them along with the PED. The actual mechanism for this can be a "tar" operation if the environment is unix, a "packlib" if it's VM, or a "zip" file if it's a pc-based system. Here, the program must check for any restrictions imposed by the compression mechanism (such as not being able to compress files already in compressed form). Any files that can be compressed are stored into a temporary file. Files that can't be compressed are left alone, but remembered for the next Step. Once the compression is complete, the uncompressed PED is erased and the temporary compressed file is renamed to the original PED file name. At this point, the program proceeds to Step 39323.

In Step 39323, Send Files, the program sends the compressed PED, and any left over files that couldn't be compressed, to the Design Control System. The final Step in FIG. 89*b* is Step 39324, Xmit Req. Here, the control information is transmitted to the Design Control System. This information includes:

The file name of the PED

A flag indication whether the files should be copied or received.

The list of any other files that had to be sent.

The Package, Version and target Level information.

All Problem Fix, Part Number and EC information collected from the user.

From this point on, the Design Control System can handle it a number of ways. In the preferred embodiment, External Data Control is used in conjunction with Automated Library Processing. In this type of environment, it's easier to configure the DMS to process the PED file as a library process. Our invention permits an alternate approach whereby no library processing exists in the system, so the processing of the PED is "hard coded" into the DMS. In either case, the algorithm for processing the PED file applies.

Returning to the main flow chart in FIG. 88, Step 39104, Process PED, is the last Step. This Step is described in detail using the algorithm in FIGS. 90*a* thru 90*c*. Our preferred embodiment begins with Step 39411 in FIGURE 90*a*, Retrieve PED. In this Step the DMS reads the control information received from Step 39324 of FIG. 89*b*. All files are put into a working area depending on the method used in the system for transferring files. Part of the control information is a list of all PEDs being processed. In most cases there is only one PED file since a single merged file is created in Step 39311 of FIG. 89*a*, however, our invention permits the DMS to work with groups of PED files too.

Step 39412, PED Loop, is the loop which must be set up to process all the PED files listed in the control information. Once again, in most cases, this loop will only be exercised once. Step 39413 is the Packed PED decision where the question "is the PED file compressed?" is asked. If the answer is "yes", the program proceeds to Step 39414, Unpack PED where the same routine used to compress the file in Step 39322 of FIG. 89*b* is used to expand it back to its original state.

Next the program proceeds to Step 39415, Rec Loop, which is another loop nested within the PED Loop in Step 39412. This inner loop is used to process all the records of the current PED file. Processing continues with asking the five questions in decision blocks 39416, 39420, 39426, 39430, 39434. Since this can be easily implemented using case or select statements, the order is not important. Each record must be tested using the first token to determine the type of record.

Step 39416 in FIG. 90*b*, H Rec, determines if the line is a Header record denoted by an "H" as the first token. If so, the header is evaluated in Step 39417, BOM, using the third token to determine whether a Bill of Materials is required. If not, a flag in Step 39418 is set to Skip BOM creation. If so, Step 39419 Increments a BOM index. This index is used in Step 39425 to set up an array or structure of BOM members.

Step 39420, M Rec, determines if the line is a Member record denoted by an "M" as the first token. If so, Step 39421 Basic FIC is executed. This performs a File Identification Check against the file listed in the second token. The fifth token provides the expected answer. In our preferred embodiment the same CRC routine used to calculate the fifth token is run again. It should produce the expected result. If not, this indicates the current image of this file is not the same as the one used in the initial task executed in Step 39101 of flow chart FIG. 88. The DMS would gracefully cease processing and notify the user of the mismatch.

If the CRC check passes, the program asks the question in Step 39422 "is this a New File". A new file is one that is not currently being tracked by the DMS. If the answer is "yes", some additional checks must be performed. Step 39423, Lock Check is designed to ensure that the user has the proper authority to promote the current file into the DMS. Since External Data Control substitutes for a formal promotion, it must comply with certain data integrity rules. The Lock Check essentially ensures that the file is not prohibited from entering the library due to an existing overlay or processing lock. It then checks to see if the file is "owned" by anyone. If so, it must be the user or someone for whom the user is a surrogate. In the latter case, the lock would be reset in favor of the user, and notification would be sent to the original owner. Once the Lock Check is cleared, Step 39424, Inst List is executed. Here the file is added to a list of files to be installed into the library at the end of the processing. The last thing the program must do with an "M" record is Add to BOM in Step 39425. In the preferred embodiment, this is done by parsing the file information from the second and third tokens into the proper format to write it into a temporary file. This file is used in a later by the Aggregation Manager's API which creates BOMs for the DMS. The fourth token, which is the BOM Member Type, is also written along with the file information.

Step 39426 in FIG. 90*c*, R Rec, determines if the line is a Result record denoted by an "R" as the first token. If so, Step 39427 Find Proc is executed. In this Step the third token is parsed into the library filetype. The Target Package, Level and Version contained in the control information transmitted from Step 39324 is used as the PFVL. This information is used to filter the search of all processes in the DMS for that package. The process names are compared against the second token. If a match is found, Step 39428, Crit Chk, is run. Here the criteria for that process is compared against the actual process result in the fifth token. If the result meets the criteria, Step 39429, Rslt List is performed. All information required to store the result is saved for a future Step. This information contains the process name, version, library filetype, Target Level and the result.

Step 39430, P Rec, determines if the line is the Master Pedigree Record denoted by a "P" as the first token. If so, Step 39431 Spec FIC is invoked to perform a special CRC check. The purpose of this check is to ensure that the actual PED file being processed is identical to the one generated by the task in Step 39101 of FIG. 88. In our preferred embodiment, the "P" record is always last, so all records excluding the last one are temporarily stored into a file. The CRC routine is run on this file and the result should match the fourth token of the Master Pedigree Record. If not, then the PED file has been altered since creation and the contents can't be used. If this check passes, the temporary file is discarded, and Step 39432 Chk FN is executed. Here the second token of the Master Pedigree Record is compared against the actual file name being processed. This ensures the contents of two PED files weren't swapped. The final check, Chk FT, is Step 39433. This simply ensures that the library filetype denoted by the third token is indeed that which the DMS expects for External Data Control.

Step 39434, K Rec, determines if the line is a Support record denoted by a "K" as the first token. The files identified by the second token in these records only need to be run through the same Basic FIC check as in Step 39421.

At this point the program returns to the top of the Rec Loop in Step 39415 and repeats Steps 39416 through 39434 until all records of the current PED have been examined. Once the loop is exhausted, control returns to the top of the PED Loop in Step 39412. Once again, all steps from 39411 through 39434 are repeated until all PED files are examined.

Once all PED files have been successfully processed, it's safe to continue with the steps that actually store data in the repository and set results in the DMS. Step 39436, Inst Files, is invoked to deposit the files into the repository. All information required for this task was saved during Step 39424. In our preferred embodiment, this step relies on our Install Algorithm to store the data into the DMS. It should be noted that there is no need to actually save the PED file itself since it is merely a conduit by which other files and results are transported.

Step 39437, Make BOM is initiated to use the Bill of Material information gathered in Step 39425 to actually create the BOM in the DMS. This is done via the Application Program Interface provided by our Aggregation Manager. In Step 39438, Rslt, all the result information gathered in Step 39429 is stored into the DMS. This is done via various functions provided by the Process Manager for setting process results. These are described in the previous section. The program finishes by executing Step 39439, EC Cntl which checks to see if any Problem Fix, Part Number or Engineering Change information was transported with the PED. If so, the information is loaded into the proper tables of the DMS.

Upon completion of the above steps, the data and all results used and/or generated in Step 39101 of FIG. 88 is safely stored into the DMS in a manner consistent with the rules regarding Automated Library Processing.

Library Manager's interactions (4.100)

As we have said, our Library Manager interacts with other processes. Our preferred Data Management System uses its Library Manager to interacts with its Fix Manager to track the problem id/data relationship and update the status in real time until the problem is marked closed.

Our embodiment employs the concept of Programmable Fix Management which allows the Data Manager to determine whether all data in the system should be tracked or only selected data types. The Data Manager can also specify a Fix Management Control Level which activates the Fix Manager when data crosses it, or Automated Library Processes may be used to perform Fix Management on different data types at different levels. The system also offers three modes of operation:

No Fix Tracking Disables all problem fix tracking for all data objects.

Collection Mode Forces all selected data types to be tracked under a single, default problem id.

EC Mode Allows each data object to have a unique set of problem ids. In this mode multiple pieces of data can be associated with the same problem or a single piece of data can resolve multiple problems. Our embodiment further defines a Release as a collection of data objects which must be delivered to an external customer as a cohesive unit. The preferred embodiment discusses an environment where pieces of a design are packaged into a release for delivery to manufacturing. It would be apparent to one skilled in the art how these concepts could be applied to other business applications such a inventory control, distribution and insurance claim processing.

The Release Control system maintains a pool of Release or EC numbers which are associated to problem fix numbers and Part Numbers via close interaction between the Fix Manager, P/N Manager, Release Control Manager and Library Manager. Although most association is done automatically during file movement through the Data Management System, various utilities exist to perform manual associations. The Release Control, Part Number and Fix Management tools aid the Data Manager in planning and tracking large deliverables. It permits the user to view all the problems, data and Part Number information included in the entire release.

The PNODIS Process FIG. 91. Our PNODIS Process illustrated by FIG. 91 process is used by the Library Manager QRSUPPRM, MDLPRM and QRSUPPUT Processes to disassociate Part Numbers from Files.

First, a check 92101 is made to determine if there was an old file being overlaid. Next, a query 92102 is made to get the associated entries from the PART_NUMBERS table in the Control Repository. Next, a check 92103 is made to determine if the file was already RIT. If so, an error message is issued 92109 and the process returns 92110 to the caller with Return Code=12. If the file was not RIT, the Part Number entry is deleted 92104 from the PART_NUMBERS table in the Control Repository. Next, a query 92105 is made to determine if there are any more entries for this Part number in the PART_NUMBERS table. If not, a check 92106 is made to determine if the current entry is an "A" entry. If so, setup 92107 to insert a "U" entry. Then, delete 92113 the corresponding entry from the PART_DATA table in the Control Repository. Then, delete 92118 the corresponding entry from the PART_USAGE table in the Control Repository. Next, a query 92114 is made to get reference numbers for the PART_NUMBERS and PART_NUMBER_LOG tables. Then, insert 92115 the new entry in the PART_NUMBERS table and insert 92116 the new entry in the PART_NUMBER_LOG table. The process then returns 92117 to the caller. If there are more entries for this Part number in the PART_NUMBERS table, a check 92111 is made to determine if they are all "S" entries. If so, the process flows back to 92114. If not, set 92112 to insert an "A" entry. The process then flows back to 92114.

The RECMOD1A Process FIG. 92. Our RECMOD1A Process illustrated by FIG. 92 is used by our Library Manager QRSUPGEN, FIGPRM, MDLPRM, QRSUPPUT and FIGPUT Processes to modify existing REC_FILE entries in the Control Repository.

First, a check 92201 is made to determine if an old file had been overlaid. If not, the process returns 92203 to the caller. If so, modify 92202 existing REC_FILE entries to point to the current file. Then, the process returns 92203 to the caller.

The RECMOD1B Process FIG. 93 Our RECMOD1B Process of FIG. 93 is used by the Library Manager QRSUP-PRM Process to modify existing REC_FILE entries in the Control Repository: First, a check 92301 is made to determine if an old file is being overlaid. If not, the process returns 92306 to the caller. If so, a query 92302 is made to determine if there are any potential duplicate superseded entries in the REC_FILES tables in the Control Repository. If so, delete 92303 those REC_FILES entries. In either case, modify 92304 the remaining REC_FILES entries to point to the new file. Then, the process returns 92305 to the caller.

The RECMOD2 Process FIG. 94 Our RECMOD2 Process of FIG. 94 is used by the Library Manager QRSUPPRM, FIGPRM and MDLPRM Processes to update REC_HEADER entries in the Control Repository.: First, a check 92401 is made to determine if a MEC number was specified. If not, the process returns 92405 to the caller. If so, a query 92402 is made to determine if the MEC is valid. If not, an error message is issued 92406 and the process returns 92407 to the caller with Return Code=12. If the MEC is valid, a check 92403 is made to determine if the MEC is in the same Package as the file. If not, an error message is issued 92406 and the process returns 92407 to the caller with Return Code=12. If so, update 92404 all associated REC_HEADER entries to point to this MEC. Then the process then returns 92405 to the caller.

The RECMOD3A Process FIG. 95 Our RECMOD3A Process of FIG. 95 is used by the Library Manager QRSUPPUT and FIGPUT Processes to update REC information in the Control Repository: First, a check 92502 is made to determine if any problem numbers were specified. If not, a query 92503 is made to get Package data from the PACKAGES table in the Control Repository. Then, a check 92504 is made to determine if the package was found. If so, an error message is issued 92509 and the process returns 92510 to the caller with Return Code=12. If the package was found, a check 92505 is made to determine if there is a collection REC. If not, an error message is issued 92509 and the process returns 92510 to the caller with Return Code=12. If so, a check 92506 is made to determine if this is a Macro Package. If so, the process returns 92508 to the caller. If not, the RECUPDAT Process described in FIG. 97 is invoked 92507. Upon return from the above process, the process returns 92508 to the caller.

If problem numbers were specified, for each problem number 92511, a query 92512 is made to determine if the problem number is in the VALID PROBLEMS table in the Control Repository. If not, an error message is issued 92509 and the process returns 92510 to the caller with Return Code=12. If so, a query 92513 is made to determine if there is an entry in the REC_HEADER table for this Package and problem number. If not, a query 92514 is made to get the Title and text from the REC_HEADER for the problem in a different package. Then, a check 92515 is made to determine if one was found. If not, use 92516 the remarks in found in the VALID_PROBLEMS entry. In either case, insert 92517 a new REC_HEADER and REC_TEXT entry into the Control Repository. If either the insert in the above step was done or if there was a REC_HEADER found in 92513, a query 92518 is made to determine if there are any frozen entries for this MEC, Package, Version and FileType If so, an error message is issued 92509 and the process returns 92510 to the caller with Return Code=12. If not, the updating RECUPDAT Process described in FIG. 97 is invoked 92507. Upon return from the above process, a check 92520 is made to determine if there are any more problem numbers. If so, the process flows back to 92511. If not, the process returns 92508 to the caller.

The RECMOD3B Process FIG. 96 Our RECMOD3B Process illustrated by FIG. 96 is used by the Library Manager QRSUPGEN, QRSUPPUT and FIGPUT Processes to update Source References in the Control Repository FIG. 97 illustrates our RECUPDAT Process.

The RECUPDAT Process FIG. 97: Our RECUPDAT Process illustrated by FIG. 97 is used by the Library Manager RECMOD3A and RECMOD3B Processes to update REC_FILES entries.

After initialization, a query 92702 is made to determine if there are any matching non-superseded REC_FILES entries in the Control Repository. If not, set 92703 the origin to "I" (implicit). If so, a check 92709 is made to determine if it is a "D" (Done) entry. If so, an error message is issued 92715 and the process returns 92716 to the caller with Return Code=12. If it is not a "D" entry, and it is a "P" (planned) set 92710 the origin to "L" (libraried). In any case, if the requestor specified an origin, use 92704 it instead. Next, mark 92705 any existing matching REC_FILES entries in the Control Repository as superseded except the one for the current FileRef. Then, update 92706 any existing non-superseded REC_FILES entries for the current FileRef. Then, a check 92707 is made to determine if an entry was found. If so, the process returns 92708 to the caller. If not, update 92711 an existing matching REC_FILE entry. Next, a check 92712 is made to determine if an entry was found. If so, the process returns 92708 to the caller. If not, a query 92713 is made to get a Reference number. Then, insert 92714 a new entry into the REC_FILES table in the Control Repository. Then, the process returns 92708 to the caller. For each SourceRef 92601, a check 92602 is made to determine if the SourceRef is zero. If so, the process flows back to 92601. If not, a query 92603 is made to get the REC_FILES entry for the SourceRef. Then, the RECUPDAT Process described in FIG. 97 is invoked 92604. Upon return from the above process, a check 92605 is made to determine if there are any more SourceRefs. If so, the process flows back to 92601. If not, the process returns 92606 to the caller.

While we have described our preferred embodiments of our inventions it will be understood that those skilled in the art, both now and in the future, may make various improvements and enhancements which fall within the scope of the claims which follow. These claims should be construed to maintain the proper protection for the inventions first disclosed.

What is claimed is:

1. A data management system for file and database management useful in concurrent engineering processes, comprising: a design control system for fulfilling requests of a user initiated from a computer system client system coupled to a network, including a data management control system for managing a plurality of projects, each project having a data repository for data records and a control repository comprising a common access interface and one or more databases, said control repository communicating with users of said design control system for fulfilling requests of a user and the data repositories of said data management control system through a plurality of managers, each manager performing a unique function, wherein said managers act as building blocks which can be combined in a plurality of manners to support an environment for suitable for multiple users of a user community, and wherein one of said managers is a process manager, and one of said managers is a lock and authority manager for permitting multiple users to possess ownership in a data object, but ensures only one owner is updating an individual instance at any given time, and wherein a check out utility is provided for the user to request ownership to a piece of data, transfer ownership, or take ownership if they are an authorized surrogate of a current owner of said piece of data, and wherein is provided a perform data deletion utility for ensuring only an authorized data manager or a valid data owner may delete their own data so as not to jeopardize any other data, and one of said managers is a library manager enabling automated library processing of any application program or tool to be launched using input data from said data management control system and after processing enabling results to be recorded as output data in any data control repository of said data management control system as a record in said data control repository, and wherein said library manager establishes and processes data for private and public libraries which can be shared by many users and in processing data for said public libraries manages the storage into and movement through a public library and also manages the movement of the data between physical locations in said data management system as specified under an established library structure for said data management system.

2. A data management system for file and database management according to claim 1 wherein each of said records in said data control repository includes data indicating the record filename, library, filetype, version and level.

3. A data management system for file and database management according to claim 1 wherein each of said users may possess ownership of data residing across different computer platforms, and said library manager provides means for handling cross-platform data transfers.

4. A data management system for file and database management according to claim 1 wherein said library manager provides means for moving data objects among private and public libraries wherein a user may initiate a call upon data in said control repository to initiate a move and the control repository responds for invoking said requested move.

5. A data management system for file and database management according to claim 4 wherein said library manager provides means for automated library processing by an automated library machine and for notification to a user for any service rendered by said library manager or an automated library machine processing a user request.

6. A data management system for file and database management according to claim 5 wherein a result of automated data processing created by said automated library machine is stored into said command repository with routines initiated by said library manager.

7. A data management system for file and database management according to claim 6 wherein said library manager employs a plurality of automated library machines to act as independent agents servicing a user community, and said library manager organizes said automated library machines as service machines which use a virtual queue to accept work requests from users and perform Library and non-Library functions, said automated library machines interfacing with said data control repository to store data resulting from said processing in said control repository.

8. A data management system for file and database management according to claim 7 wherein one of said managers of said database management system is a communication manager, and said library manager providing via said communication manager interfaces for said automated library machines interfacing directly with the data control repository through dedicated high speed ports in the communication manager.

9. A data management control program according to claim 7 wherein queued work is prioritized using a class system whereby there exists one or more classes such that work in the highest order class is processed before work in the next lower class, and so on until work in the lowest order class is processed.

10. A data management system for file and database management according to claim 6 wherein said automated library machines are servers which can exist on clients, servers and on different computer platforms with a configuration allowing (1) a single automated library machine to accept all work requests and handle all services for the library manager including any automated library processing, (2) a plurality of remote execution machines wherein a single master automated library machine receives all work requests from the user, and processes all promotion, installation, movement, and removal of data while others of said plural automated library machines perform automated library processing and interact with the library manager, communication manager and where any desired library processing is dispatched to a remote execution machine which executes the tasks and returns the results to the master automated library machines, and (3) a pool general purpose machines enabled for performing any desired management functions, including automated library processing, as Actor/Objects which have in turn an interface with remote execution machines for providing an environment with both general purpose machines and dedicated service machines, whereby each general purpose machine is programmed to define the type of work it can process, including the work of a dispatcher which dispatches user work requests to the next available Actor machine.

11. A data management control program according to claim 10 wherein a Dispatcher will rank order queued work based first on a class system and secondly on First-In-First-Out treatment of work within a class, and provide a library monitor utility (LIBMON) to permit queued work to be reprioritized or deleted by the Data Manager.

12. A data management system for file and database management according to claim 6 wherein said automated library machines are special purpose autoreader service machines having means for performing work entered from a command line independently of said data management control system, enabling said automated library machines to perform a data management request and thereafter a different function, such as a formatting a word processing document for printing the next minute.

13. A data management system for file and database management according to claim 6 wherein said automated library machines are special purpose autoreader service machines having means for enabling automatic recovery in the event of a system crash, whereupon said library manager then retries any aborted library operations suspended due to system problems.

14. A data management system for file and database management according to claim 5 wherein said library manager provides instant notification to a user for any service rendered which notification occurs whether the task is executed in the user's environment or remotely on an Automated Library Machine, and in an event wherein a task fails to complete, error messages provided to a user explain the problem, and wherein successful operations also result in notification to provide users situational awareness for their data.

15. A data management control program according to claim 5 wherein users may override Library Process runtime parameters upon initiation of said promote.

16. A data management control program according to claim 5 wherein said Automatic Library Machines (ALMs) install data created by an Automatic Library Process into the DMS, and said ALMs support various types of installs (regular, high performance, create DILP), regular stores, and options to permit storing of pseudo process results, dynamic Part Number generation, and/or copying of process results associated with the said installed data.

17. A data management system for file and database management according to claim 1 wherein said library manager interacts with authority and lock managers of said data management system to ensure that users transfer data that they own from a private library into a public shared library, and that only authorized users may promote data through the various library levels.

18. A data management system for file and database management according to claim 17 wherein said library manager upon initiating a promote request compares any recorded process results against pre-defined promotion criteria to ensure that only data which meets a quality standard may be elevated to the next level.

19. A data management system for file and database management according to claim 17 wherein said system provides promotion means whereby said library manager provides means for promoting large volumes of data including features which handle heterogeneous types of data from different levels and versions within the same request, and means for interaction with an aggregation manager for promoting Bill of Material (BOM) promotes.

20. A data management system for file and database management according to claim 17 wherein said system provides promotion means whereby said promotion means enables interaction with a Problem Fix and Release Manager to apply problem fix tracking, incremental change, part number and release control to any desired piece of data moving through the data management system, including interaction with the user to gather the appropriate information at promotion time as well as background checking to safeguard against data integrity violations such as a single part being associated with two different releases.

21. A data management system for file and database management according to claim 20 wherein said system provides promotion means wherein said promotion means permits a user to pre-check a work request interactively prior to the request being sent for processing to ensure that the work request will complete successfully by running all the same checks which are normally run prior to data movement.

22. A data management system for file and database management according to claim 20 wherein said system provides promotion means for data to enter, and travel through, the data management system, in which the user is presented with the Promotion Screen which permits the user to enter information about the file(s) they wish to process, including the process of transferring data from the user's private library to a public library or moving data within a public library, putting a file from a private library into the data management system, or promoting a file from one level of the data management system to another as is determined by the user supplied information.

23. A data management control program according to claim 22 wherein a Library Search is provided for generating a list of files to promote.

24. A data management control program according to claim 17 wherein a Lock Manager prevents a promotion of files when data is not promotable with Move, Overlay or Processing Locks.

25. A data management control program according to claim 17 wherein automatic file groupings may be employed by a user for a move of a plurality of files between levels with a single invocation against the master file.

26. A data management control program according to claim 17 wherein the user may specify whether a back-up copy of the file should or should not be retained at the source level during a promote.

* * * * *